US011972164B2

(12) United States Patent
Hulbert et al.

(10) Patent No.: US 11,972,164 B2
(45) Date of Patent: Apr. 30, 2024

(54) USER INTERFACES FOR DEVICES WITH MULTIPLE DISPLAYS

(71) Applicant: Apple Inc., Cupertino, CA (US)

(72) Inventors: Thomas Steven Hulbert, Palo Alto, CA (US); Madeleine Cordier, San Francisco, CA (US); Seung Wook Kim, San Jose, CA (US); Brigit E. Lamberson, San Francisco, CA (US); Gemma Roper, San Francisco, CA (US); Max L. L. McCarthy, Los Altos Hills, CA (US); Mikael Silvanto, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 17/389,041

(22) Filed: Jul. 29, 2021

(65) Prior Publication Data

US 2021/0357169 A1 Nov. 18, 2021

Related U.S. Application Data

(63) Continuation of application No. 16/147,183, filed on Sep. 28, 2018, now Pat. No. 11,079,995.

(Continued)

(51) Int. Cl.

*G06F 3/14* (2006.01)
*G06F 3/0482* (2013.01)

(Continued)

(52) U.S. Cl.

CPC .......... *G06F 3/1423* (2013.01); *G06F 3/0482* (2013.01); *G06F 3/04845* (2013.01);

(Continued)

(58) Field of Classification Search

CPC .. G06F 3/1423; G06F 3/0482; G06F 3/04845; G06F 3/0485; G06F 3/04883;

(Continued)

(56) References Cited

U.S. PATENT DOCUMENTS 5,483,261 A 1/1996 Yasutake
5,488,204 A 1/1996 Mead et al.

(Continued)

FOREIGN PATENT DOCUMENTS

EP 2073514 A2 6/2009
EP 2293531 A1 3/2011

(Continued)

OTHER PUBLICATIONS

Final Office Action received for U.S. Appl. No. 16/147,183, dated Oct. 14, 2020, 18 pages.

(Continued)

*Primary Examiner* — Hien L Duong
(74) *Attorney, Agent, or Firm* — Kubota & Basol LLP

(57) ABSTRACT

In some embodiments, an electronic device displays and allows user interaction with content on multiple displays. In some embodiments, an electronic device displays three-dimensional content using coordinated views on multiple displays. In some embodiments, an electronic device shares content while displaying a video conferencing user interface. In some embodiments, an electronic device facilitates the display or keeping private of content on multiple displays. In some embodiments, an electronic device facilitates the display of information from applications using a shared graphical input coordinate space. In some embodiments, an electronic device presents indications of notifications. In some embodiments, an electronic device presents representations of items of content that are related to content presented on the one or more electronic devices. In some (Continued)

embodiments, an electronic device presents user interfaces including a soft keyboard.

78 Claims, 335 Drawing Sheets

Related U.S. Application Data

(60) Provisional application No. 62/737,030, filed on Sep. 26, 2018, provisional application No. 62/566,368, filed on Sep. 30, 2017.

(51) Int. Cl.
*G06F 3/04845* (2022.01)
*G06F 3/0485* (2022.01)
*G06F 3/04883* (2022.01)
*G09G 5/373* (2006.01)
*G09G 5/38* (2006.01)

(52) U.S. Cl.
CPC ........ *G06F 3/0485* (2013.01); *G06F 3/04883* (2013.01); *G06F 2203/04803* (2013.01); *G06F 2203/04806* (2013.01); *G09G 5/373* (2013.01); *G09G 5/38* (2013.01); *G09G 2340/0492* (2013.01); *G09G 2356/00* (2013.01)

(58) Field of Classification Search
CPC . G06F 2203/04803; G06F 2203/04806; G06F 3/04815; G06F 3/04886; G06F 3/1446; G09G 5/373; G09G 5/38; G09G 2340/0492; G09G 2356/00; G09G 2300/026; G09G 2360/06; G09G 5/14; G09G 2320/0686; G09G 2354/00; G09G 2360/04; G09G 2380/08
See application file for complete search history.

(56) References Cited

U.S. PATENT DOCUMENTS 5,825,352 A 10/1998 Bisset et al.
5,835,079 A 11/1998 Shieh
5,880,411 A 3/1999 Gillespie et al.
6,188,391 B1 2/2001 Seely et al.
6,310,610 B1 10/2001 Beaton et al.
6,323,846 B1 11/2001 Westerman et al.
6,570,557 B1 5/2003 Westerman et al.
6,677,932 B1 1/2004 Westerman
6,690,387 B2 2/2004 Zimmerman et al.
7,015,894 B2 3/2006 Morohoshi
7,184,064 B2 2/2007 Zimmerman et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
8,806,382 B2 8/2014 Matsuda
9,031,543 B2 5/2015 Lee
9,282,167 B2 * 3/2016 Jo ........................ G06F 3/1454
9,348,458 B2 5/2016 Hotelling et al.
9,603,123 B1 3/2017 Jackson et al.
9,703,468 B2 7/2017 Reeves et al.
9,933,937 B2 4/2018 Lemay et al.
11,079,995 B1 8/2021 Hulbert et al.
11,310,181 B2 4/2022 Park et al.
2002/0015024 A1 2/2002 Westerman et al.
2005/0190059 A1 9/2005 Wehrenberg
2006/0017692 A1 1/2006 Wehrenberg et al.
2006/0033724 A1 2/2006 Chaudhri et al.
2006/0197753 A1 9/2006 Hotelling
2006/0256008 A1 11/2006 Rosenberg
2007/0222768 A1 9/2007 Geurts et al.
2008/0298720 A1 12/2008 Klassen et al.
2009/0019392 A1 1/2009 Higuchi et al.
2009/0037605 A1 2/2009 Li
2009/0322689 A1 12/2009 Kwong et al.
2010/0081475 A1 4/2010 Chiang et al.
2010/0184375 A1 7/2010 Ohkita
2010/0287513 A1 11/2010 Singh et al.
2011/0078573 A1 * 3/2011 Ooba ..................... G06F 9/451 715/733
2011/0083111 A1 4/2011 Forutanpour et al.
2011/0107234 A1 5/2011 Lee et al.
2011/0209102 A1 8/2011 Hinckley et al.
2012/0131491 A1 * 5/2012 Lee ........................ G06F 3/013 715/776
2012/0154294 A1 6/2012 Hinckley et al.
2012/0289203 A1 11/2012 Santo et al.
2012/0317489 A1 12/2012 Kuulusa et al.
2013/0024778 A1 1/2013 Reeves et al.
2013/0036364 A1 2/2013 Johnson
2013/0076595 A1 3/2013 Sirpal et al.
2013/0321340 A1 12/2013 Seo et al.
2014/0006994 A1 1/2014 Koch et al.
2014/0101575 A1 4/2014 Kwak et al.
2014/0101578 A1 4/2014 Kwak et al.
2014/0101579 A1 4/2014 Kim et al.
2014/0104643 A1 4/2014 Park
2014/0123038 A1 5/2014 Ahn et al.
2014/0152576 A1 6/2014 Kim et al.
2014/0187162 A1 7/2014 Mei
2014/0188989 A1 7/2014 Stekkelpak et al.
2014/0247207 A1 9/2014 Pahud et al.
2014/0247346 A1 9/2014 Bozarth et al.
2014/0280748 A1 9/2014 Hinckley et al.
2014/0323162 A1 10/2014 Ezra et al.
2014/0365912 A1 12/2014 Shaw et al.
2014/0372390 A1 12/2014 Matsuzawa et al.
2015/0009189 A1 1/2015 Nagara
2015/0026595 A1 * 1/2015 Lu ...................... H04L 65/4015 715/753
2015/0061968 A1 3/2015 Park et al.
2015/0074615 A1 3/2015 Han et al.
2015/0121535 A1 4/2015 Fiss
2015/0143211 A1 5/2015 Kaufthal et al.
2015/0220493 A1 8/2015 Hayashi et al.
2015/0338888 A1 11/2015 Kim et al.
2015/0350134 A1 12/2015 Yang et al.
2016/0035312 A1 2/2016 Lee et al.
2016/0124698 A1 5/2016 Reeves et al.
2016/0198499 A1 7/2016 Lee et al.
2016/0234659 A1 8/2016 Luo
2017/0164140 A1 6/2017 Li et al.
2017/0177194 A1 6/2017 Lyons et al.
2017/0273050 A1 9/2017 Levak et al.
2018/0095611 A1 4/2018 Kuscher et al.
2019/0361950 A1 11/2019 Venkatakrishnan et al.
2020/0019367 A1 1/2020 Sun et al.
2020/0356221 A1 11/2020 Behzadi et al.
2021/0103366 A1 4/2021 Behzadi et al.
2022/0155920 A1 5/2022 Behzadi et al.
2023/0078889 A1 3/2023 Sun et al.

FOREIGN PATENT DOCUMENTS

EP 3041313 A1 7/2016
JP 2000-163031 A 6/2000
JP 2002-342033 A 11/2002
JP 2003152615 A 5/2003
WO 2013/169849 A2 11/2013

(56) References Cited

FOREIGN PATENT DOCUMENTS

| | | | |
|---|---|---|---|
| WO | 2014/105276 | A1 | 7/2014 |
| WO | 2017176036 | A1 | 10/2017 |

OTHER PUBLICATIONS

Non-Final Office Action received for U.S. Appl. No. 16/147,183, dated Mar. 5, 2020, 16 pages.
Non-Final Office Action received for U.S. Appl. No. 16/506,697, dated Sep. 15, 2020, 13 pages.
Notice of Allowance received for U.S. Appl. No. 16/147,183, dated Apr. 2, 2021, 6 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 16/506,697, dated Mar. 25, 2021, 15 pages.
Corrected Notice of Allowance received for U.S. Appl. No. 16/506,697, dated Jul. 18, 2022, 2 Pages.
Non-Final Office Action received for U.S. Appl. No. 16/506,697, dated Sep. 7, 2021, 15 pages.
Notice of Allowance received for U.S. Appl. No. 16/506,697, dated Apr. 8, 2022, 8 Pages.
Corrected Notice of Allowability received for U.S. Appl. No. 17/086,205, dated Nov. 10, 2021, 2 pages.
International Search Report received for PCT Patent Application No. PCT/US2020/031732, dated Sep. 28, 2020, 5 pages.
Non-Final Office Action received for U.S. Appl. No. 16/584,685, dated Jan. 2, 2020, 17 pages.
Non-Final Office Action received for U.S. Appl. No. 17/589,309, dated Jan. 31, 2023, 22 pages.
Notice of Allowance received for U.S. Appl. No. 16/584,685, dated Jul. 27, 2020, 10 pages.
Notice of Allowance received for U.S. Appl. No. 17/086,205, dated Oct. 20, 2021, 10 pages.
Supplemental Notice of Allowability received for U.S. Appl. No. 17/086,205, dated Dec. 30, 2021, 5 pages.
Dearman, David, et al., "Determining the orientation of proximate mobile devices using their back facing camera," Proceedings of the SIGCHI Conference on Human Factors in Computing Systems., May 2012, 4 pages.
Gostner, et al., "Usage of Spatial Information for Selection of Co-located Devices," Proceedings of the 10th International Conference on Human Computer Interaction with Mobile Devices and Services, Sep. 2008, pp. 427-430.
Hazas, et al., "A Relative Positioning System for Co-located Mobile Devices," Proceedings of the 3rd International Conference on Mobile Systems, Applications, and Services, Jun. 2005, pp. 177-190.
Kortuem, et al., "Sensing and Visualizing Spatial Relations of Mobile Devices," Proceedings of the 18th Annual ACM Symposium on User Interface Software and Technology, Oct. 2005, pp. 93-102.

* cited by examiner

J 798-4 In accordance with a determination that a speed of the movement of the contact is a first speed, the second respective application is a first application of the second set of applications 798-6 In accordance with a determination that the speed of the movement of the contact is a second speed, different than the first speed, the second respective application is a second application of the second set of applications, different than the first application of the second set of applications 798-8 The first set of applications on the first display includes a third respective application positioned between the first respective application on the first display and the second respective application on the second display 798-10 The movement of the contact towards the second respective application on the second display is also towards the third respective application on the first display 798-12 The information from the first respective application is inputted to the second respective application without being inputted to the third respective application

L 798-28: The first contact and the second contact detected concurrently on the second display are part of a zooming input 798-30: Performing the action with respect to the respective content on the first display comprises scaling the respective content on the first display in accordance with the zooming input resulting in a scaled portion of the respective content being displayed on the first display 798-32: Deemphasize the plurality representations of content items on the second display while the first contact and the second contact are concurrently detected on the second display 798-34: After scaling the respective content on the first display, display, on the second display, a contextual menu at a location of the zooming input on the second display, the contextual menu including one or more menu items related to the scaled portion of the respective content being displayed on the first display

Figure 11F:
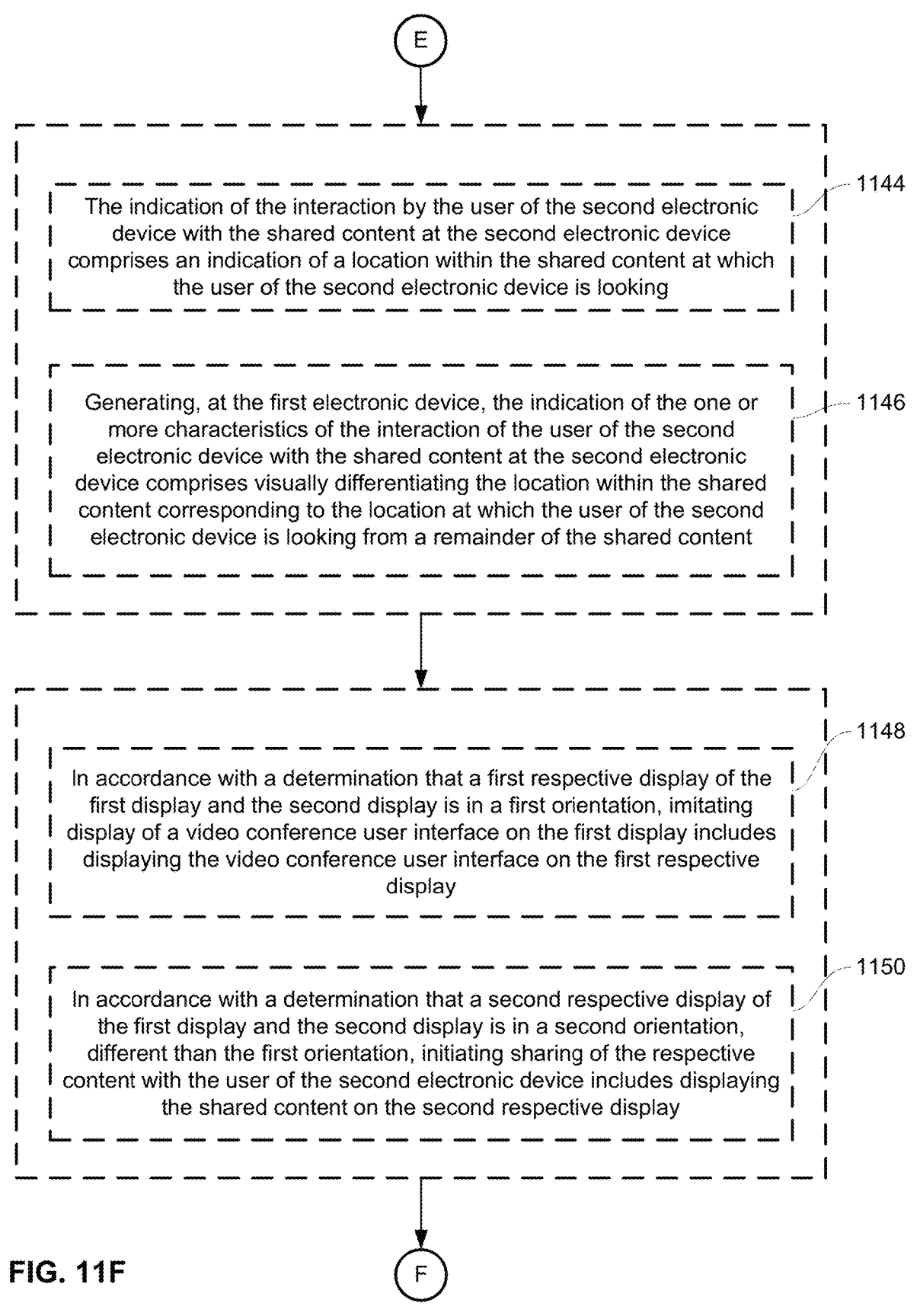

1144 — The indication of the interaction by the user of the second electronic device with the shared content at the second electronic device comprises an indication of a location within the shared content at which the user of the second electronic device is looking 1146 — Generating, at the first electronic device, the indication of the one or more characteristics of the interaction of the user of the second electronic device with the shared content at the second electronic device comprises visually differentiating the location within the shared content corresponding to the location at which the user of the second electronic device is looking from a remainder of the shared content 1148 — In accordance with a determination that a first respective display of the first display and the second display is in a first orientation, imitating display of a video conference user interface on the first display includes displaying the video conference user interface on the first respective display 1150 — In accordance with a determination that a second respective display of the first display and the second display is in a second orientation, different than the first orientation, initiating sharing of the respective content with the user of the second electronic device includes displaying the shared content on the second respective display

Figure 17G:
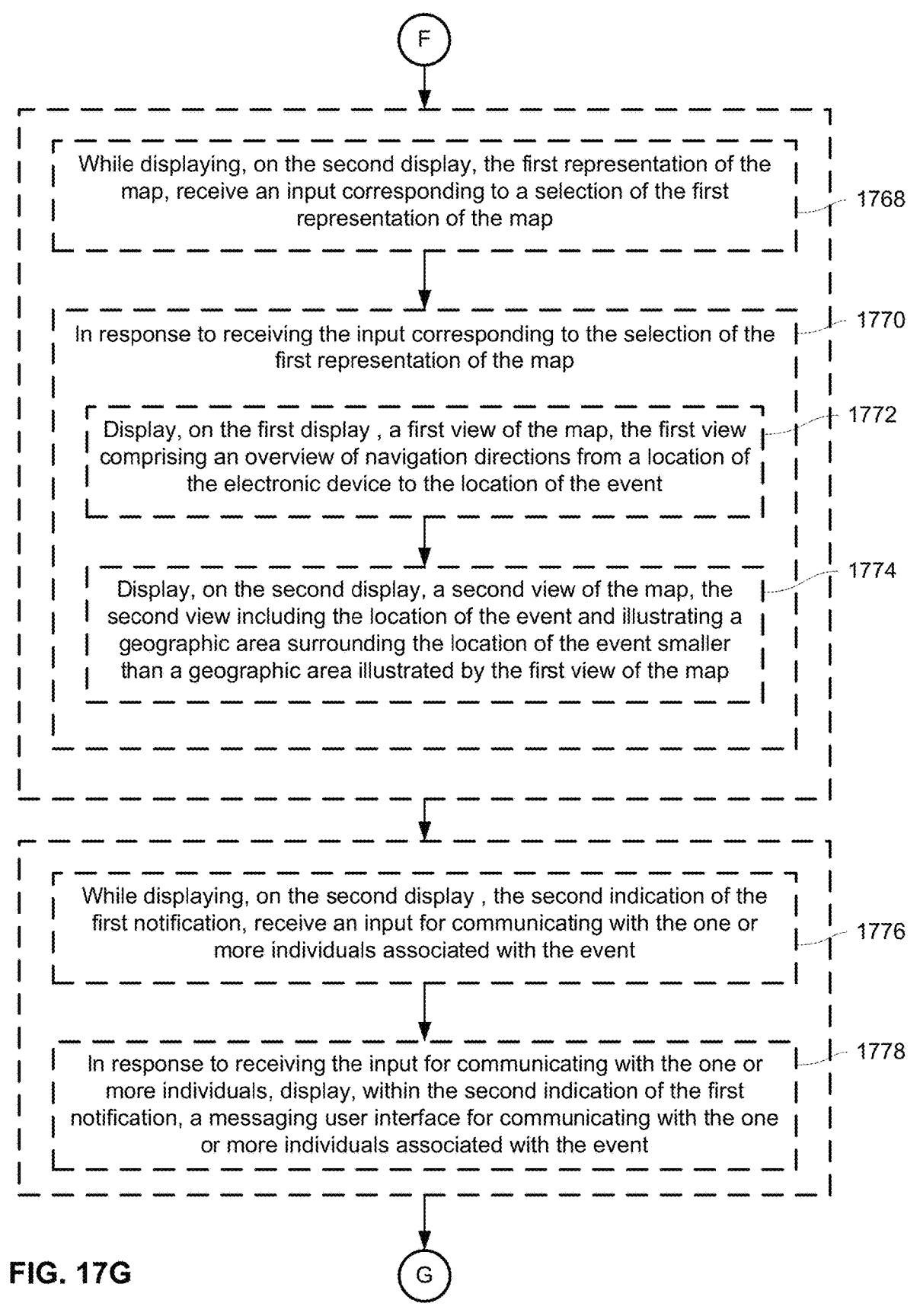

While displaying, on the second display, the first representation of the map, receive an input corresponding to a selection of the first representation of the map 1768

In response to receiving the input corresponding to the selection of the first representation of the map 1770

Display, on the first display , a first view of the map, the first view comprising an overview of navigation directions from a location of the electronic device to the location of the event 1772

Display, on the second display, a second view of the map, the second view including the location of the event and illustrating a geographic area surrounding the location of the event smaller than a geographic area illustrated by the first view of the map 1774

While displaying, on the second display , the second indication of the first notification, receive an input for communicating with the one or more individuals associated with the event 1776

In response to receiving the input for communicating with the one or more individuals, display, within the second indication of the first notification, a messaging user interface for communicating with the one or more individuals associated with the event 1778

Figure 21M:
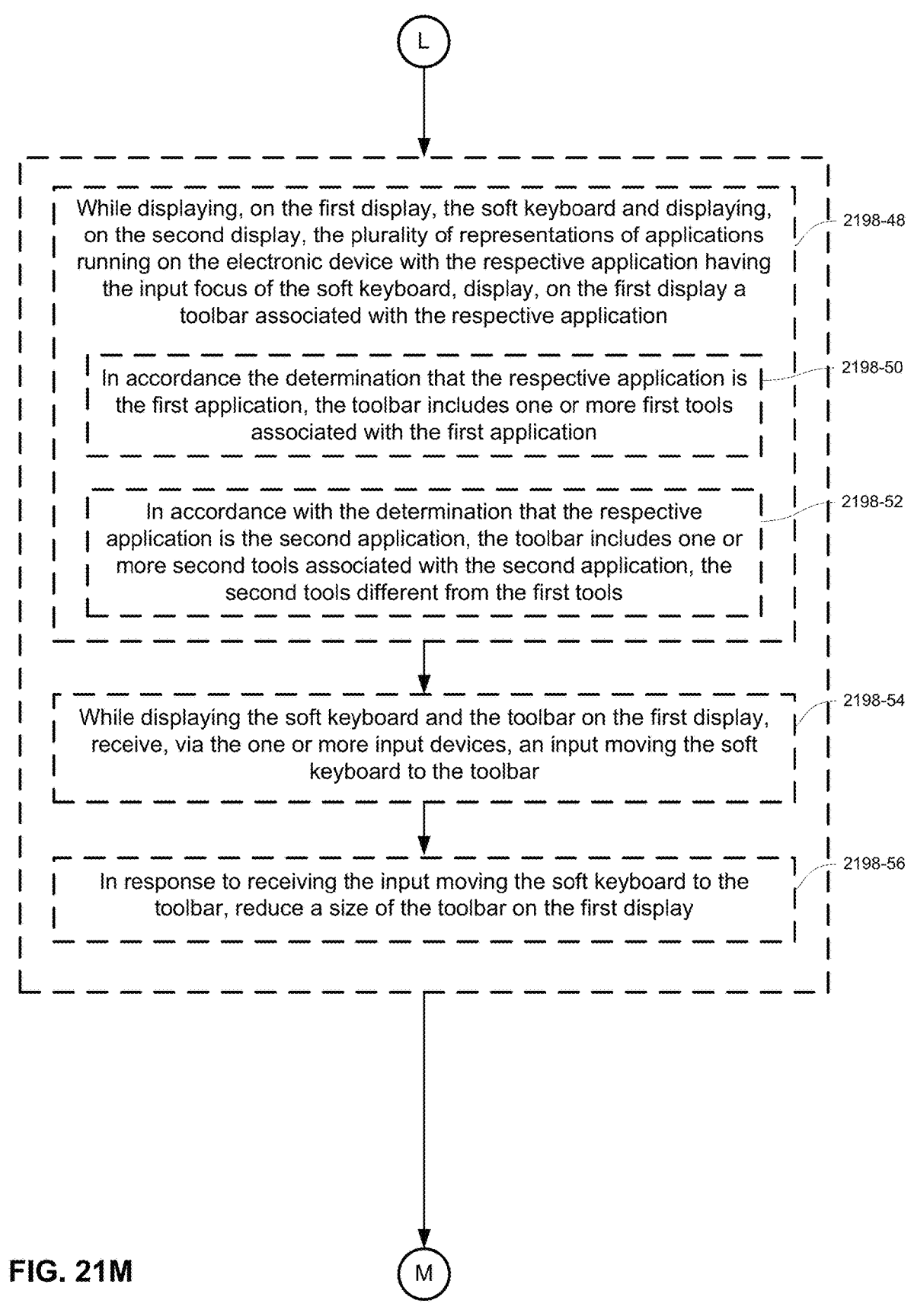

While displaying, on the first display, the soft keyboard and displaying, on the second display, the plurality of representations of applications running on the electronic device with the respective application having the input focus of the soft keyboard, display, on the first display a toolbar associated with the respective application 2198-48

In accordance the determination that the respective application is the first application, the toolbar includes one or more first tools associated with the first application 2198-50

In accordance with the determination that the respective application is the second application, the toolbar includes one or more second tools associated with the second application, the second tools different from the first tools 2198-52

While displaying the soft keyboard and the toolbar on the first display, receive, via the one or more input devices, an input moving the soft keyboard to the toolbar 2198-54

In response to receiving the input moving the soft keyboard to the toolbar, reduce a size of the toolbar on the first display 2198-56

USER INTERFACES FOR DEVICES WITH MULTIPLE DISPLAYS

CROSS REFERENCE TO RELATED APPLICATIONS

This application is a continuation of U.S. patent application Ser. No. 16/147,183, filed Sep. 28, 2018, which claims benefit of U.S. Provisional Patent Application No. 62/566,368, filed Sep. 30, 2017 and of U.S. Provisional Patent Application No. 62/737,030, filed Sep. 26, 2018, the entire disclosures of which are incorporated herein by reference for all purposes.

FIELD OF THE DISCLOSURE

This relates generally to electronic devices that have multiple displays for displaying various content, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, devices display various content and enable user interactions with the content. Enhancing these interactions improves the user's experience with the device and decreases user interaction time, which is particularly important where input devices are battery-operated.

SUMMARY OF THE DISCLOSURE

Some embodiments described in this disclosure are directed to one or more electronic devices that display and allow user interaction with content on multiple displays, and one or more operations related to the above that the electronic devices optionally perform. Some embodiments described in this disclosure are directed to one or more electronic devices that display three-dimensional content using coordinated views on multiple displays, and one or more operations related to the above that the electronic devices optionally perform. Some embodiments described in this disclosure are directed to one or more electronic devices that share content while displaying a video conferencing user interface, and one or more operations related to the above that the electronic devices optionally perform. Some embodiments described in this disclosure are directed to one or more electronic devices that facilitate the display or keeping private of content on multiple displays, and one or more operations related to the above that the electronic devices optionally perform. Some embodiments described in this disclosure are directed to one or more electronic devices that facilitate the display of information from applications using a shared graphical input coordinate space, and one or more operations related to the above that the electronic devices optionally perform. Some embodiments described in this disclosure are directed to one or more electronic devices that present indications of notifications, and one or more operations related to the above that the electronic devices optionally perform. Some embodiments described in this disclosure are directed to one or more electronic devices that present representations of items of content that are related to content presented on the one or more electronic devices, and one or more operations related to the above that the electronic devices optionally perform. Some embodiments described in this disclosure are directed to one or more electronic devices that present user interfaces including a soft keyboard, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 17A-17I are flow diagrams illustrating a method of presenting indications of notifications in accordance with some embodiments of the disclosure.

DETAILED DESCRIPTION

Description of Embodiments

Figure 1A:
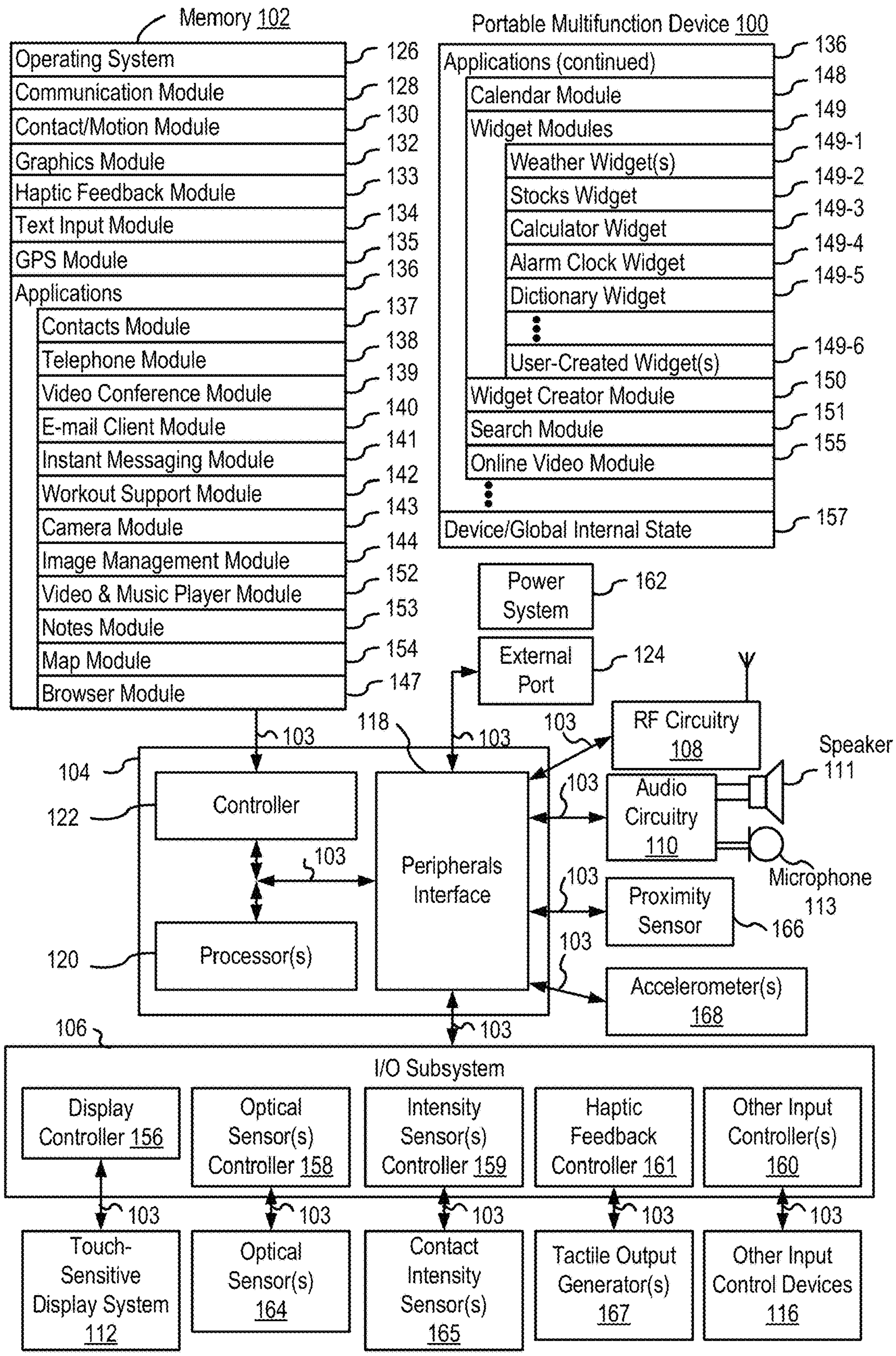
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for consuming or interacting with content across multiple displays or across multiple physical regions of a single display. Such techniques can reduce the cognitive burden on a user who browses and/or downloads such applications, games and/or in-app purchases, thereby enhancing productivity. Further, such techniques can reduce processor and battery power otherwise wasted on redundant user inputs.

Although the following description uses terms “first,” “second,” etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
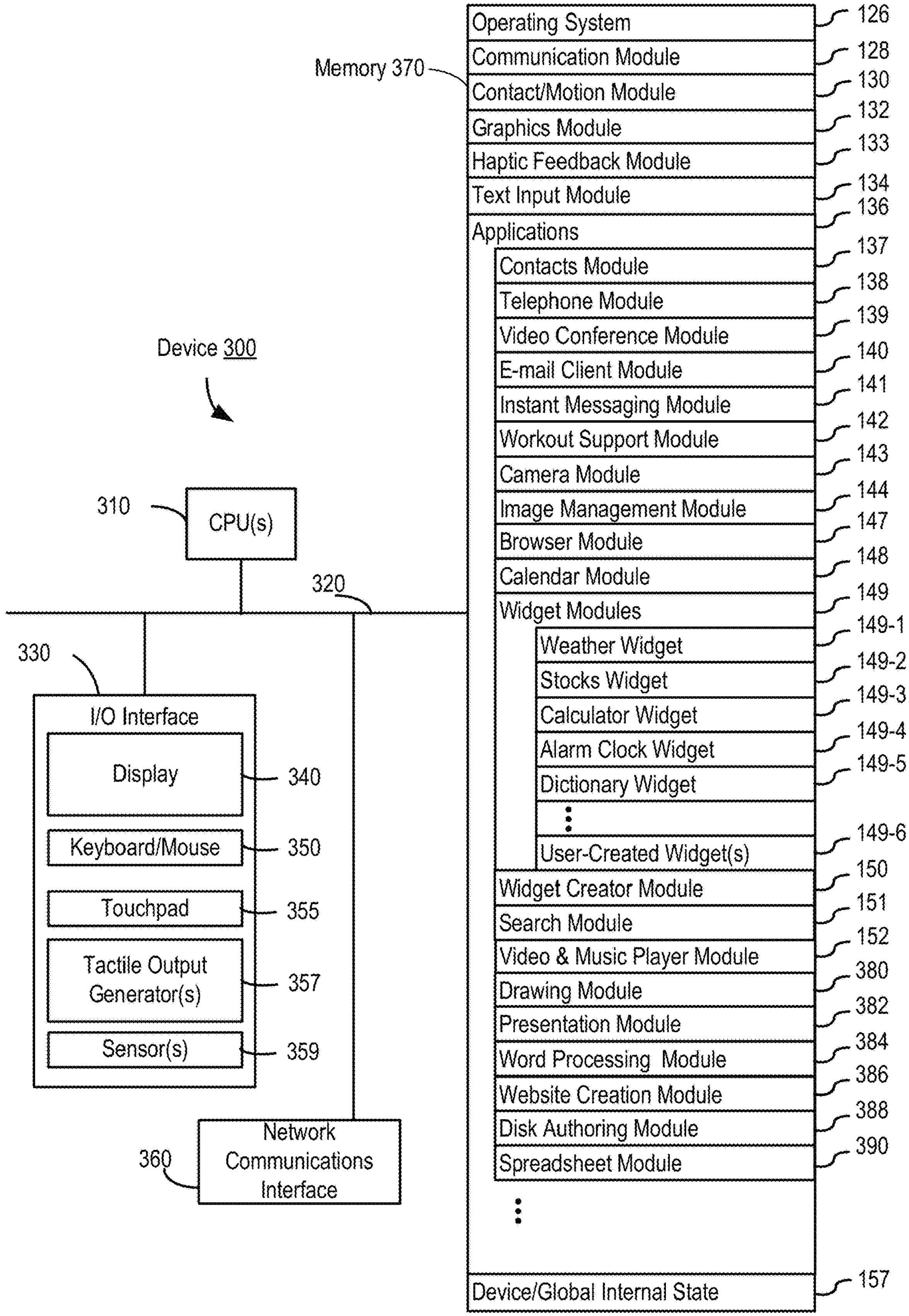
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player.

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
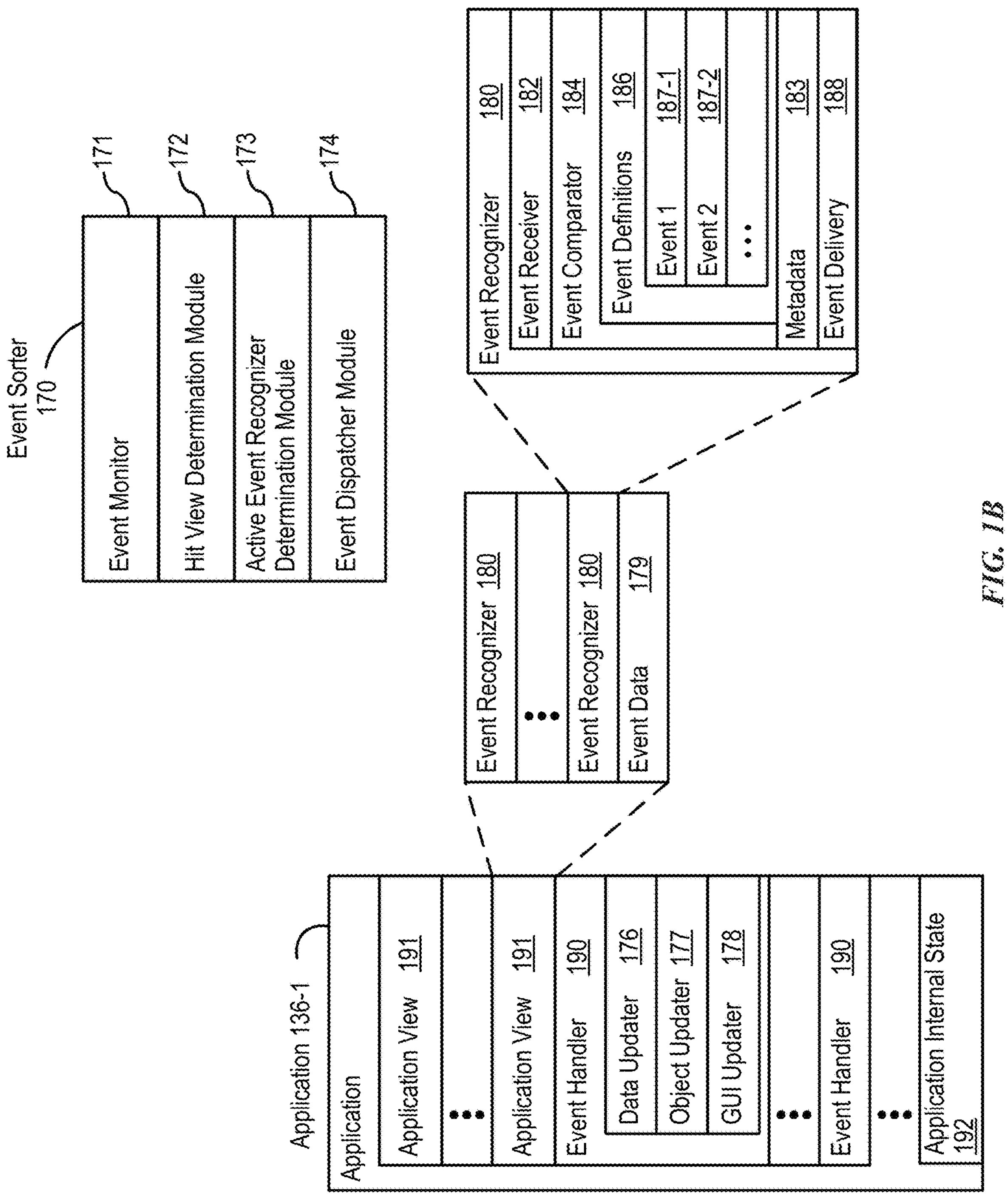
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
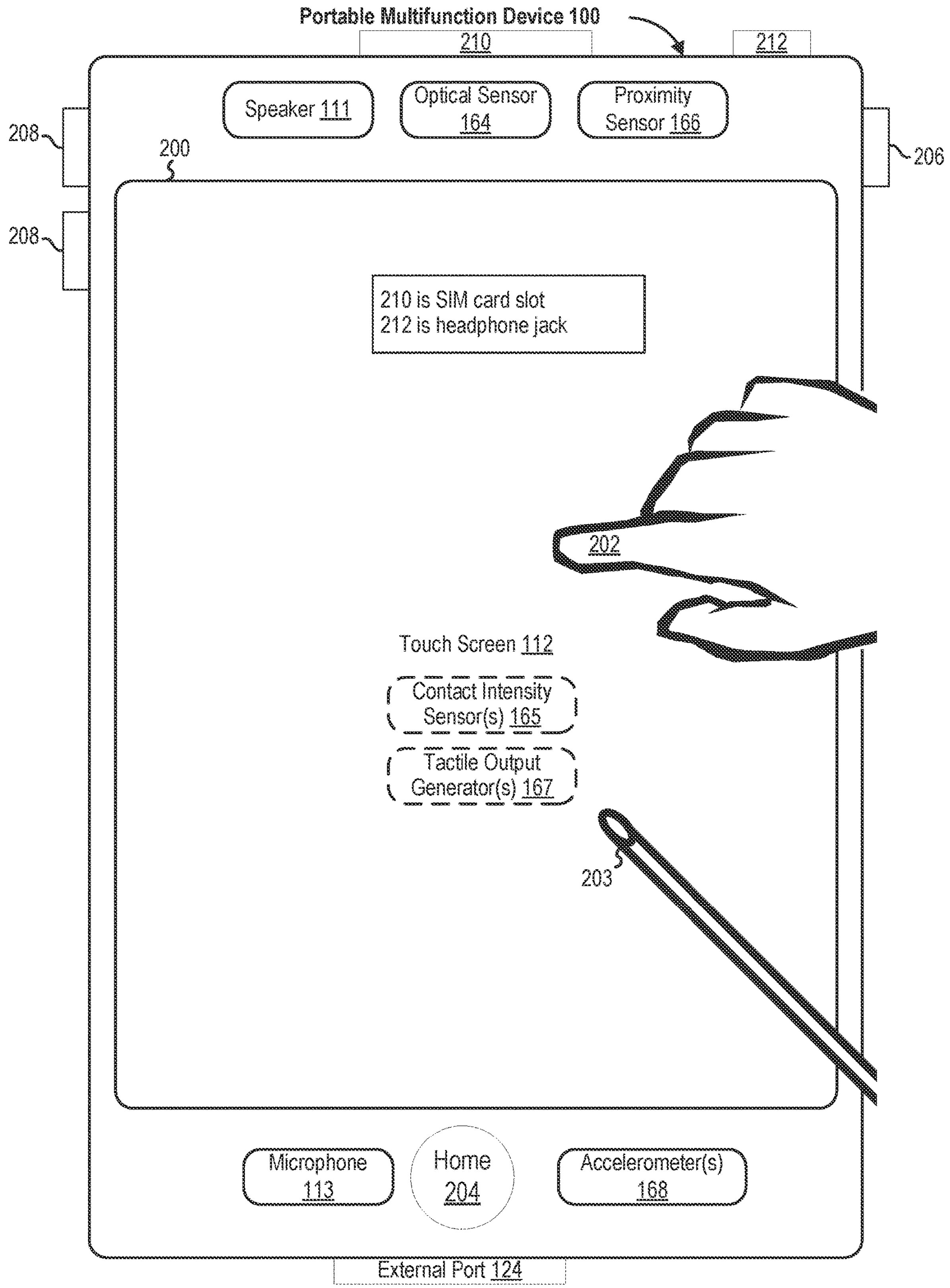
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
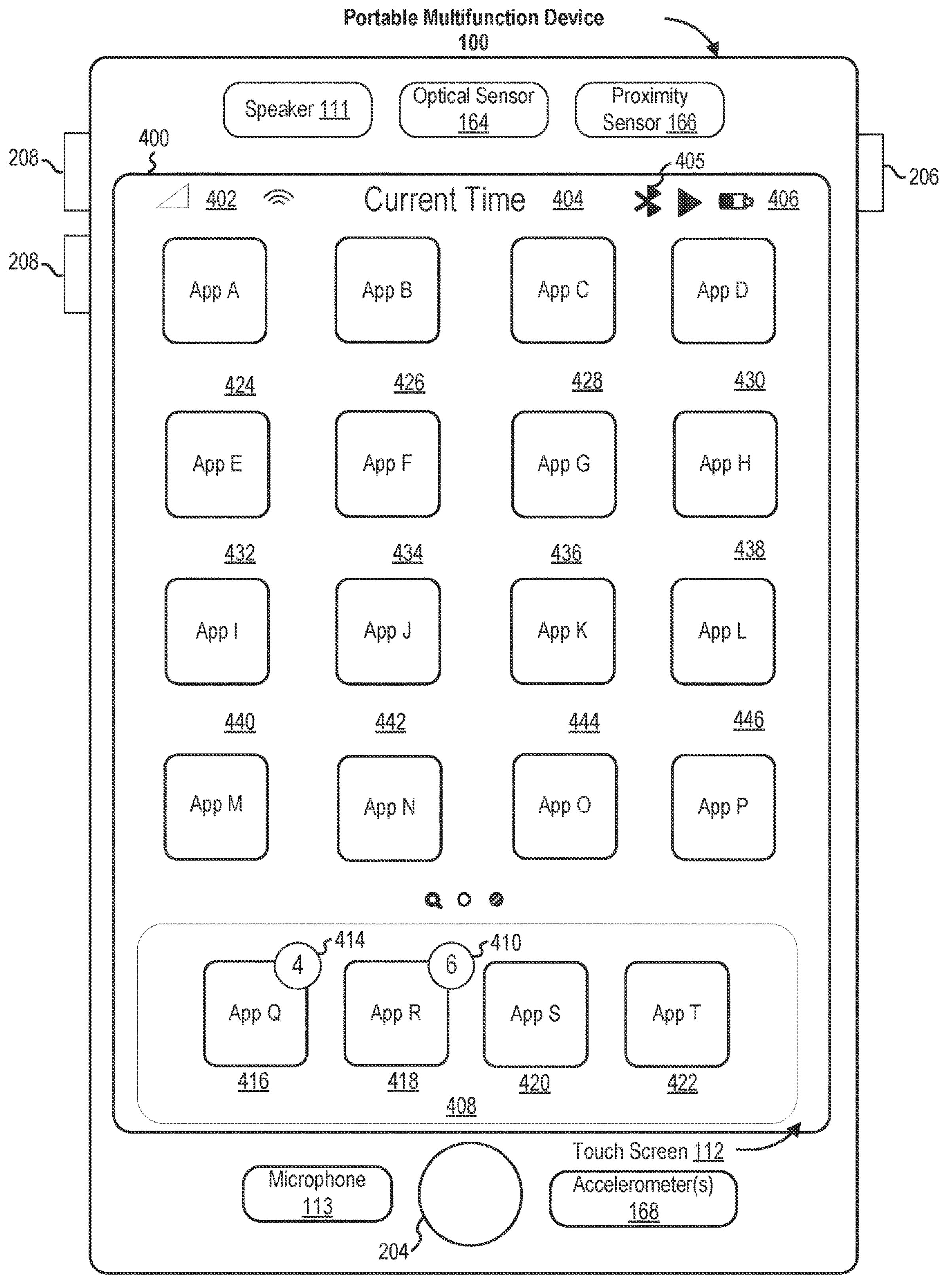
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152; and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
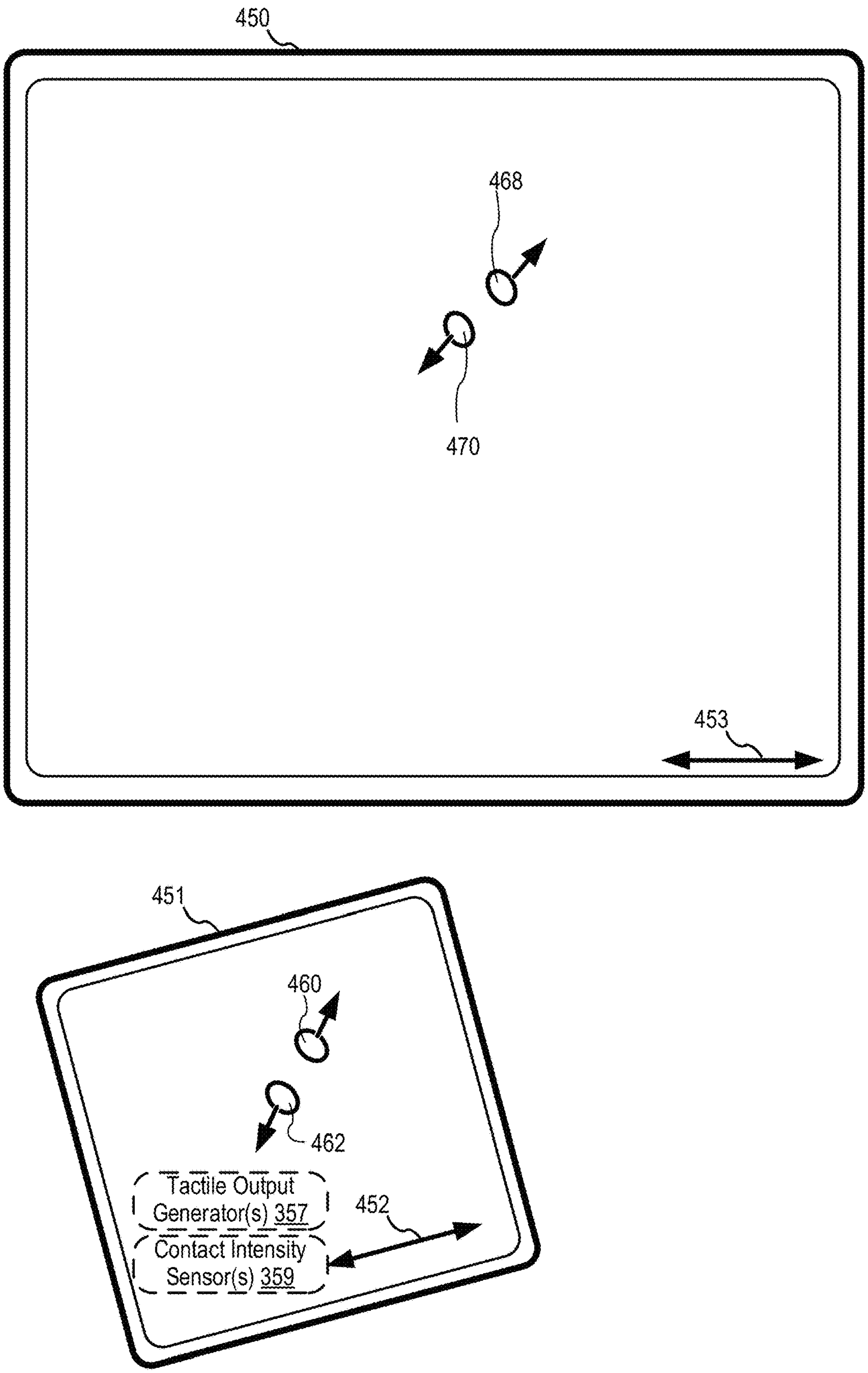
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to location 468 and contact 462 corresponds to location 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
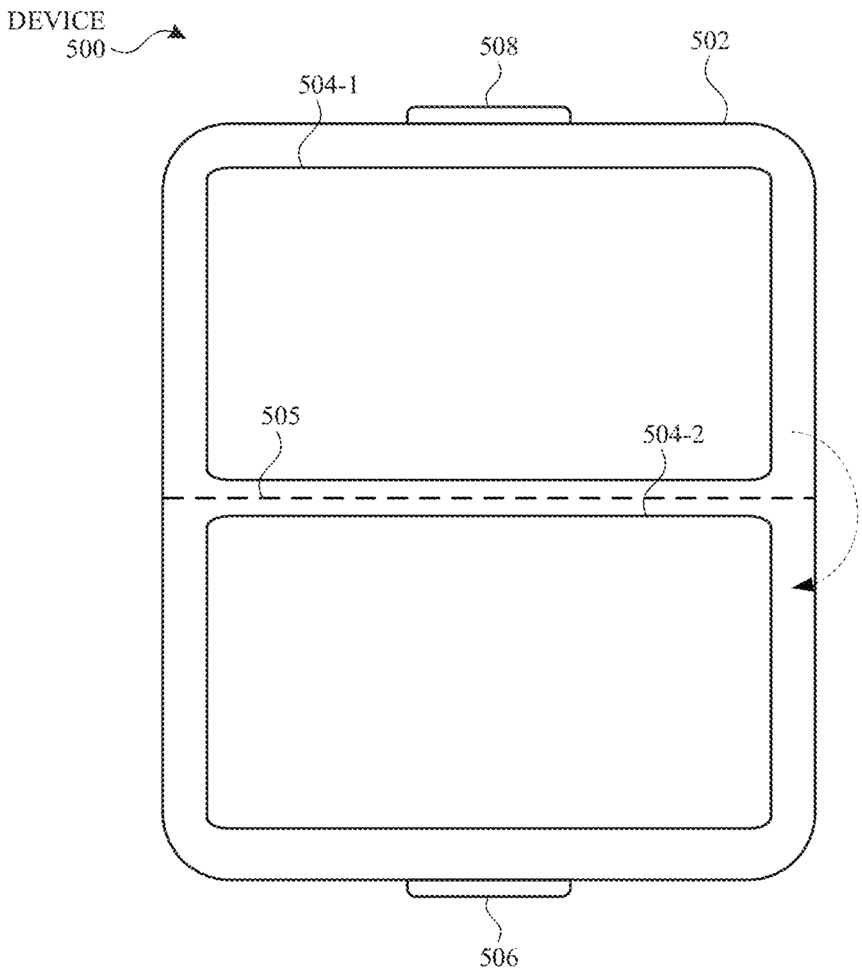
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has two touch-sensitive display screens 504-1 and 504-2, hereafter touch screens 504-1 and 504-2. Alternatively, or in addition to touch screens 504-1 and 504-2, device 500 has displays and touch-sensitive surfaces. As with devices 100 and 300, in some embodiments, touch screens 504 (or the touch-sensitive surfaces) optionally includes one or more intensity sensors for detecting intensity of contacts (e.g., touches) being applied. The one or more intensity sensors of touch screens 504 (or the touch-sensitive surface) can provide output data that represents the intensity of touches. The user interface of device 500 can respond to touches based on their intensity, meaning that touches of different intensities can invoke different user interface operations on device 500. In some embodiments, the two touch screens 504-1 and 504-2 of device 500 are rotatably coupled together, or coupled together via a hinge, such that the angle between the planes of the touch screens is manipulable by a user. For example, the two touch screens are optionally able to be laid flat such that the planes of the touch screens are on the same plane (e.g., a "spread open" configuration), or are optionally able to be angled with respect to each other from between 45 degrees to 135 degrees (e.g., a "clamshell" configuration) such that one of the touch screens is a bottom touch screen (e.g., to be placed on a surface during operation) and the other touch screen is a top touch screen (e.g., positioned off the surface during operation).

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
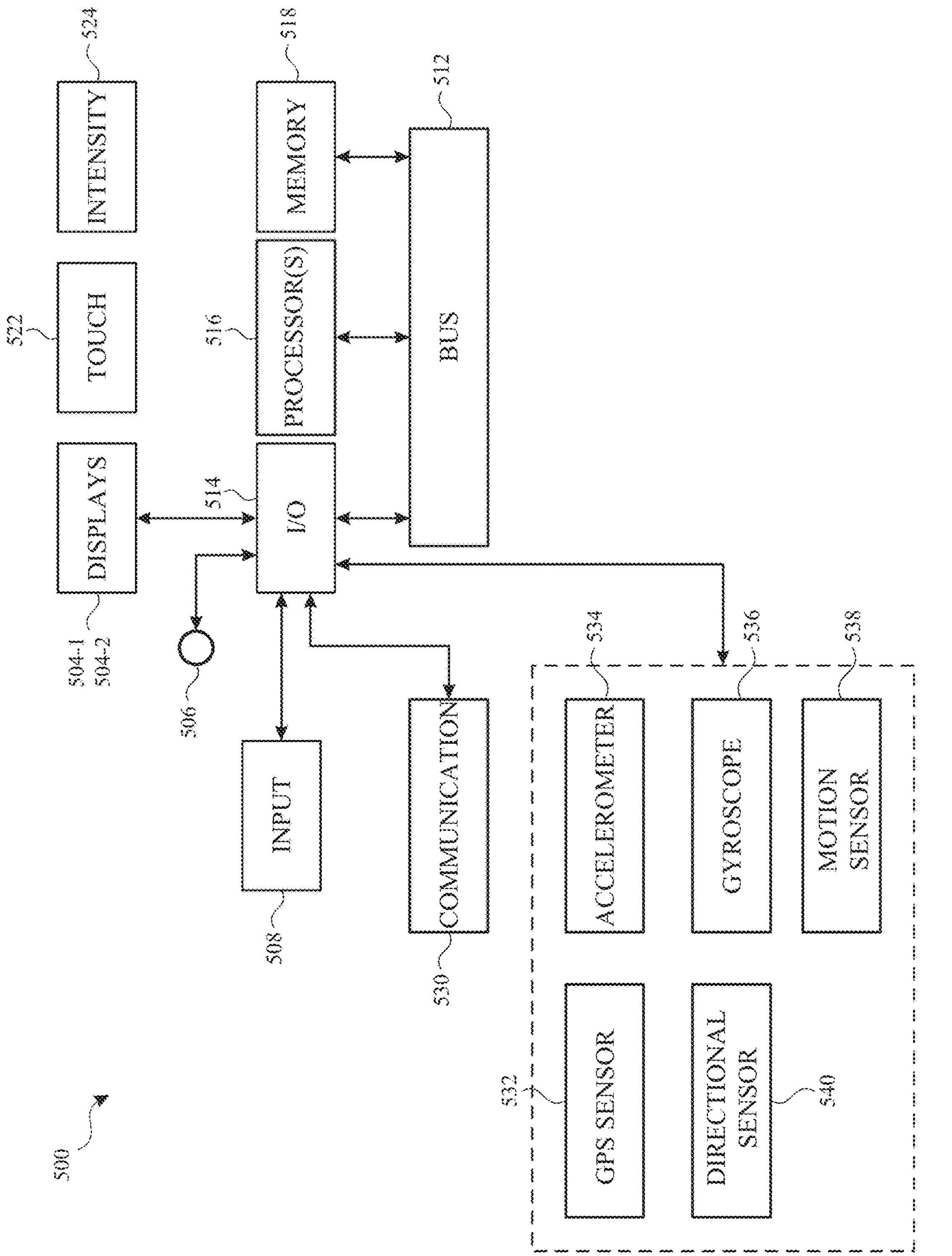
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to displays 504-1 and 504-2, which can have touch-sensitive components 522 and, optionally, intensity sensors 524 (e.g., contact intensity sensor). In some embodiments, displays 504-1 and 504-2 are separate displays with touch-sensitive components; however, in some embodiments, device 500 has a single display with touch-sensitive components, and displays 504-1 and 504-2 represent different portions of that single display (e.g., a top portion and a bottom portion). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1700, 1900 and 2100 (FIGS. 7, 9, 11, 13, 15, 17, 19 and 21). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
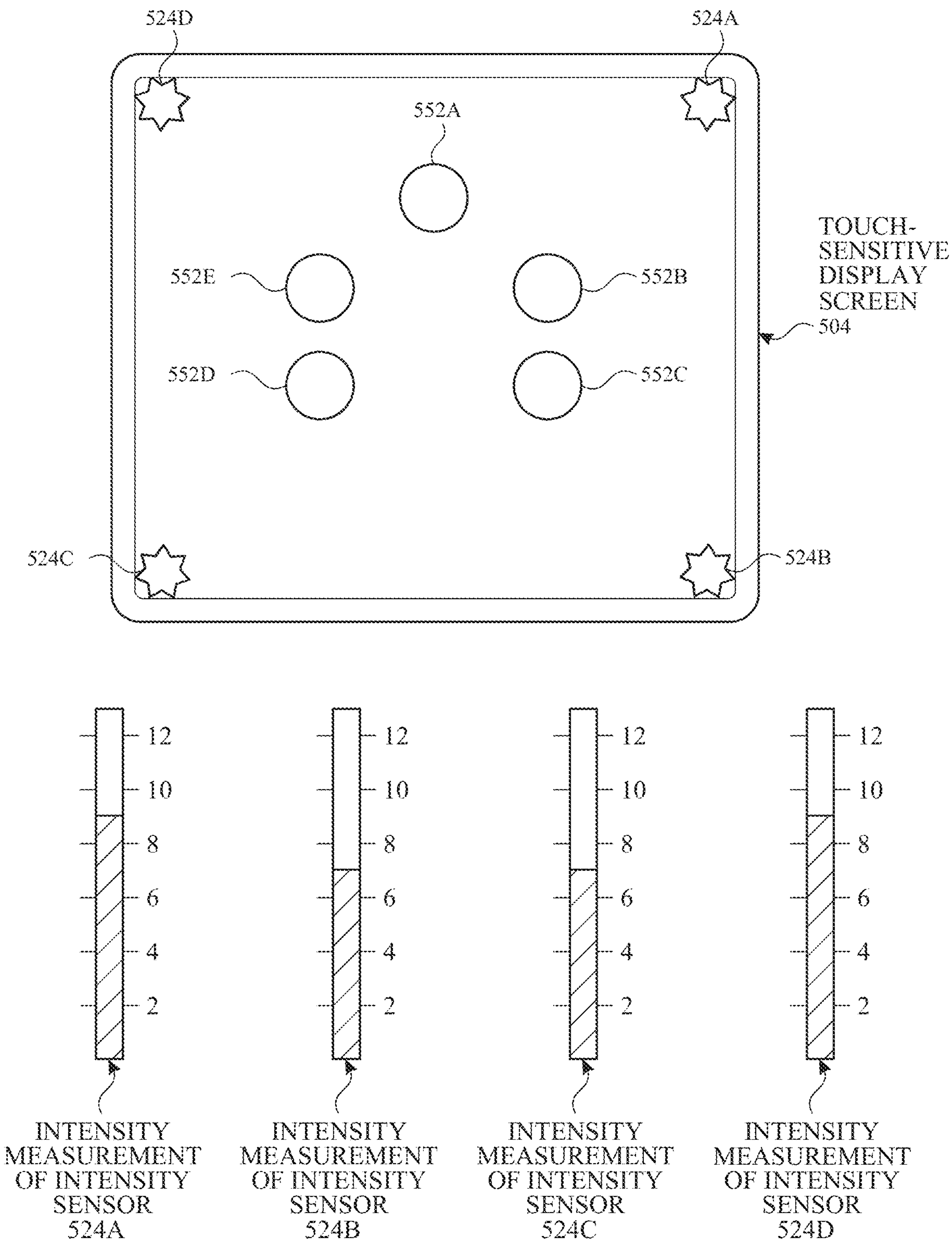
FIGS. 5C-5D illustrate exemplary components of a personal electronic device having a touch-sensitive display and intensity sensors in accordance with some embodiments.
Figure 5D:
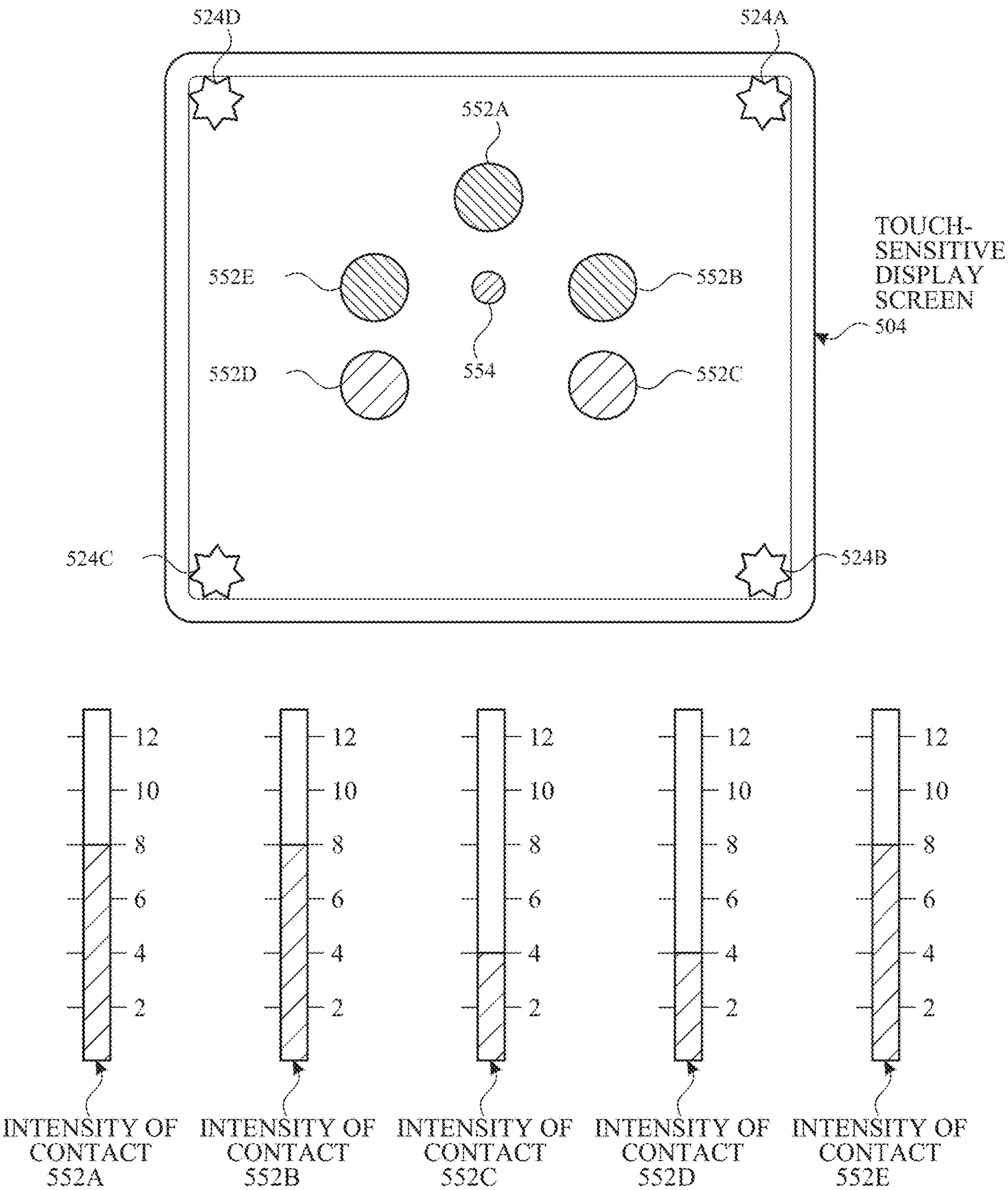

FIG. 5C illustrates detecting a plurality of contacts 552A-552E on touch-sensitive display screen 504 (which optionally corresponds to touch screen 504-1 and/or touch screen 504-2) with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and/Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
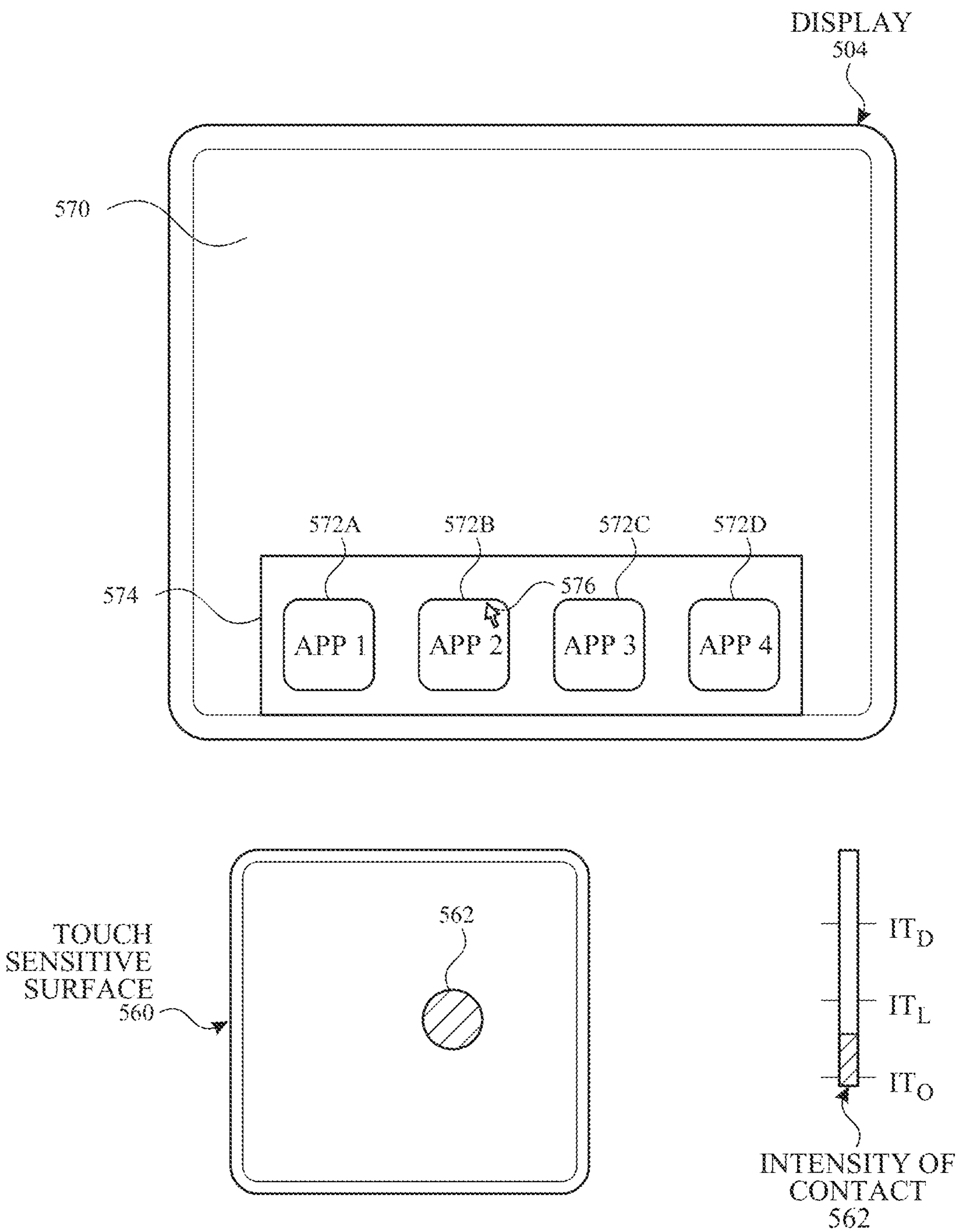
FIGS. 5E-5H illustrate exemplary components and user interfaces of a personal electronic device in accordance with some embodiments.
Figure 5F:
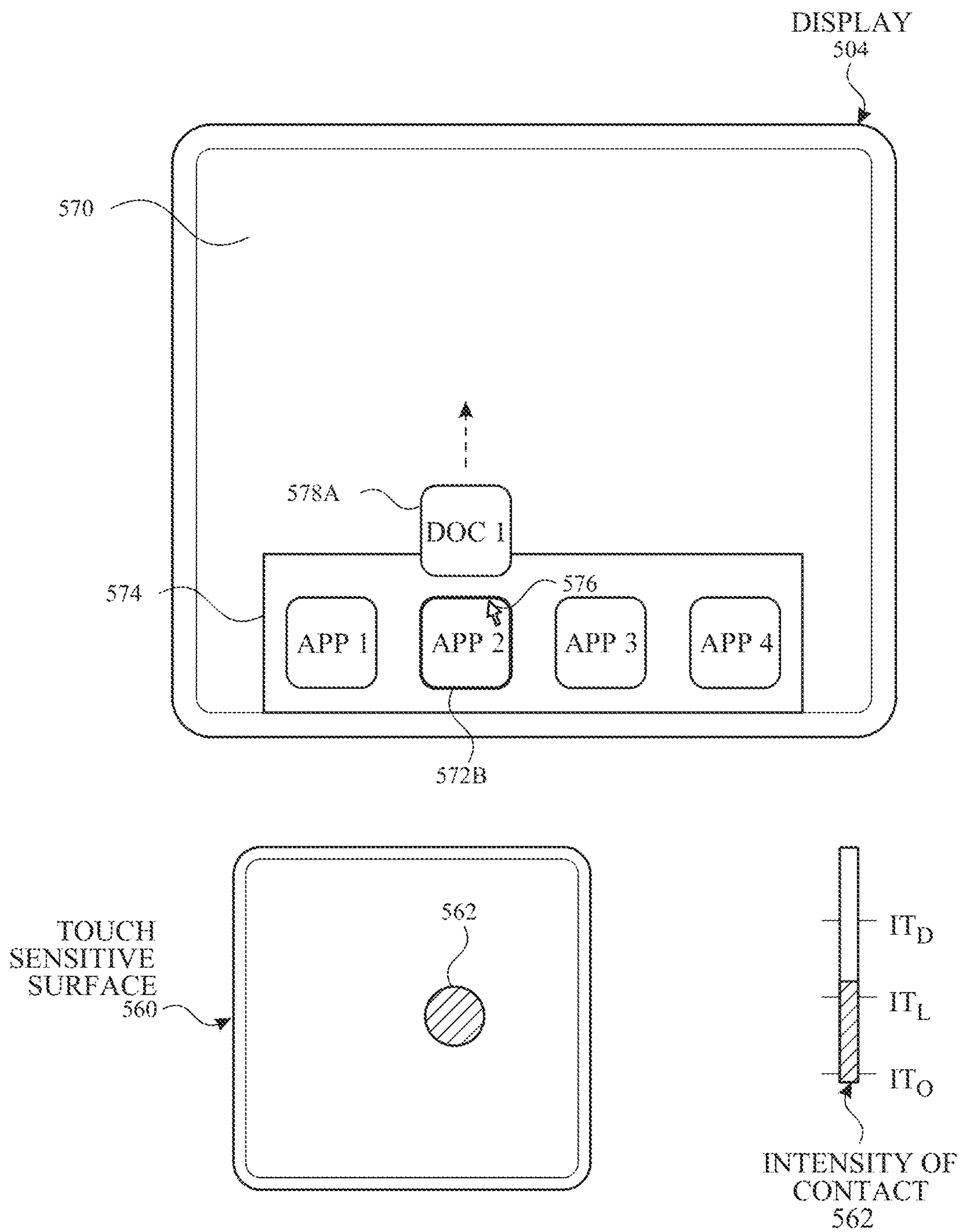
Figure 5G:
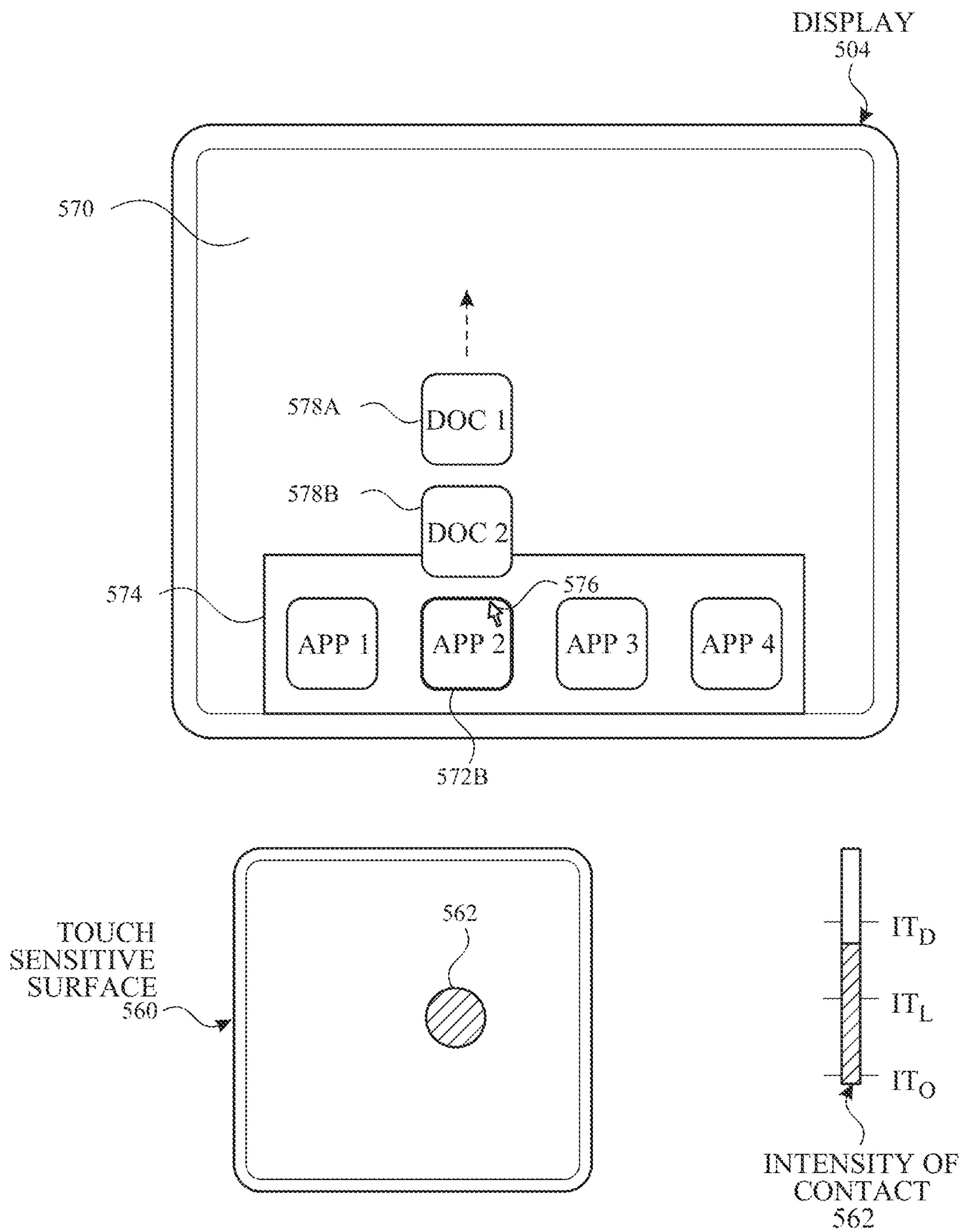
Figure 5H:
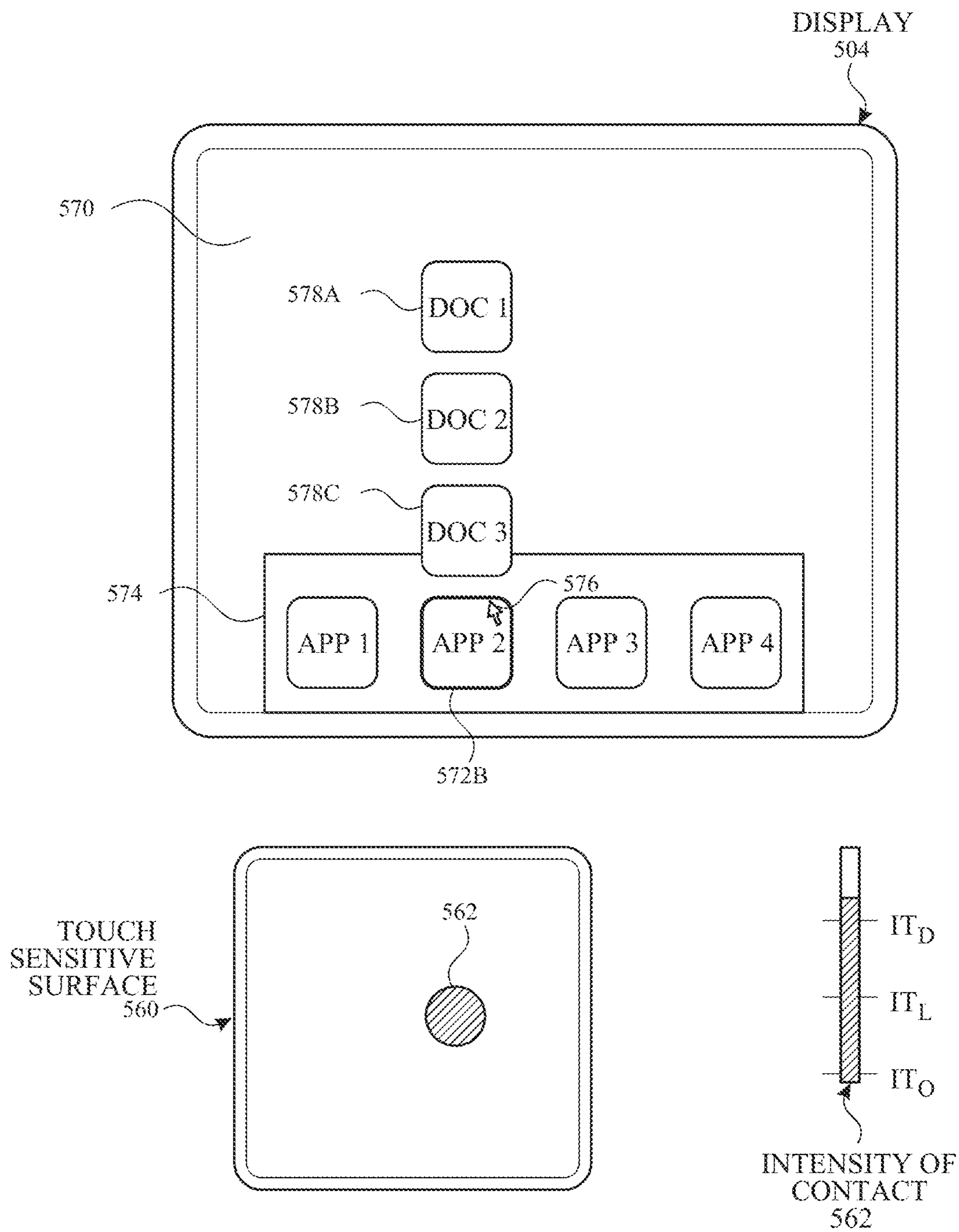

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 (which optionally corresponds to touch screen 504-1 and/or touch screen 504-2) while cursor 576 is displayed over application icon 572B corresponding to App 2, on a displayed user interface 570 that includes application icons 572A-572D displayed in predefined region 574. In some embodiments, the gesture is detected on touch-sensitive display 504 (which optionally corresponds to touch screen 504-1 and/or touch screen 504-2). The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Content Browsing and Editing User Interfaces

Users interact with electronic devices in many different manners, including interacting with content (e.g., files, documents, images, etc.) applications that may be available (e.g., stored or otherwise available) on the electronic devices. For example, a user may browse and edit content in a content editing application, may view articles in an article viewing application, or may share information between applications. In some circumstances, the electronic devices have multiple displays on which to perform the above. The embodiments described below provide ways in which an electronic device displays and provides for interaction with content on multiple displays, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
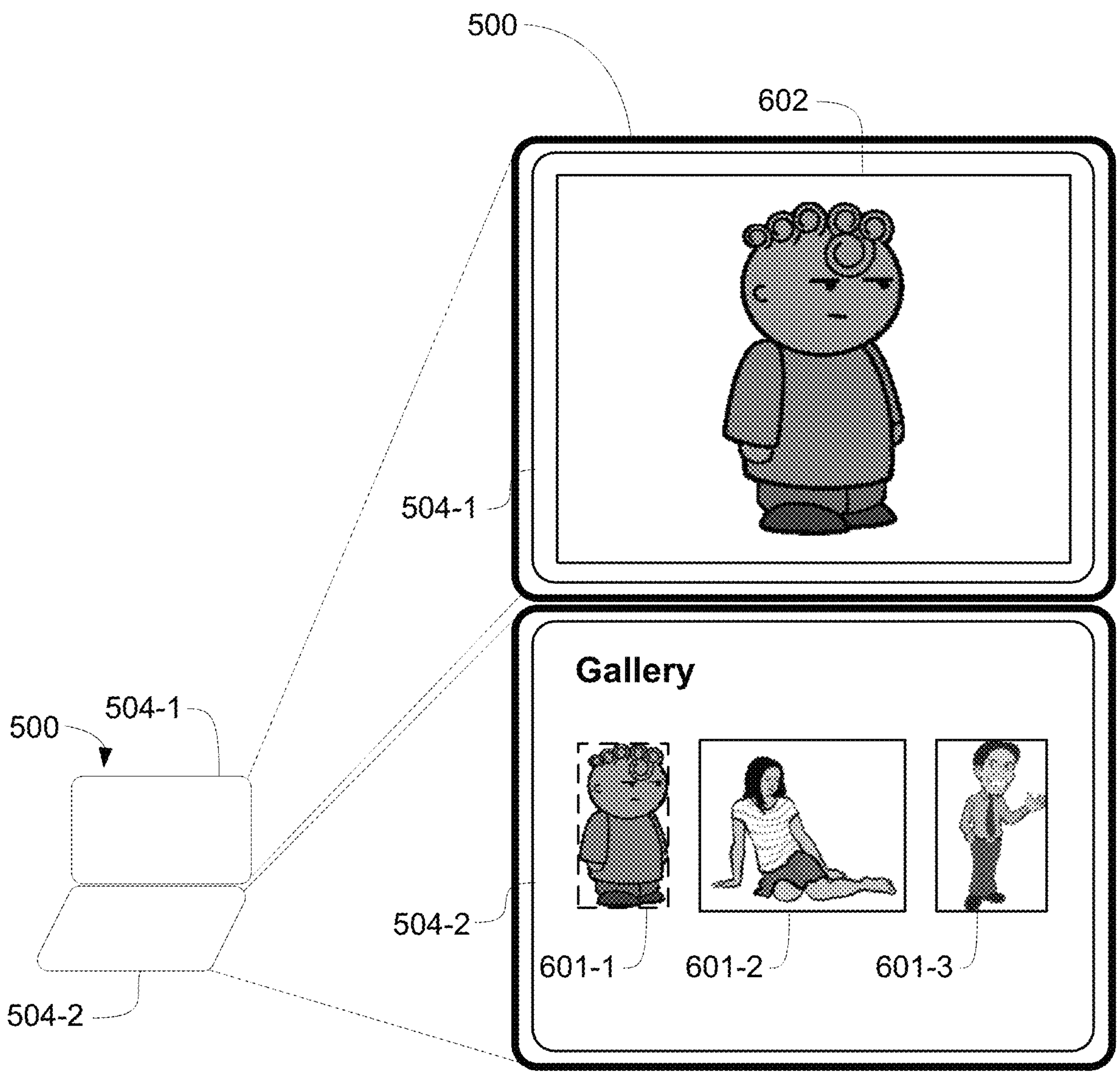
FIGS. 6A-6QQ illustrate exemplary ways in which an electronic device displays and allows user interaction with content on multiple displays in accordance with some embodiments of the disclosure.
Figure 6B:
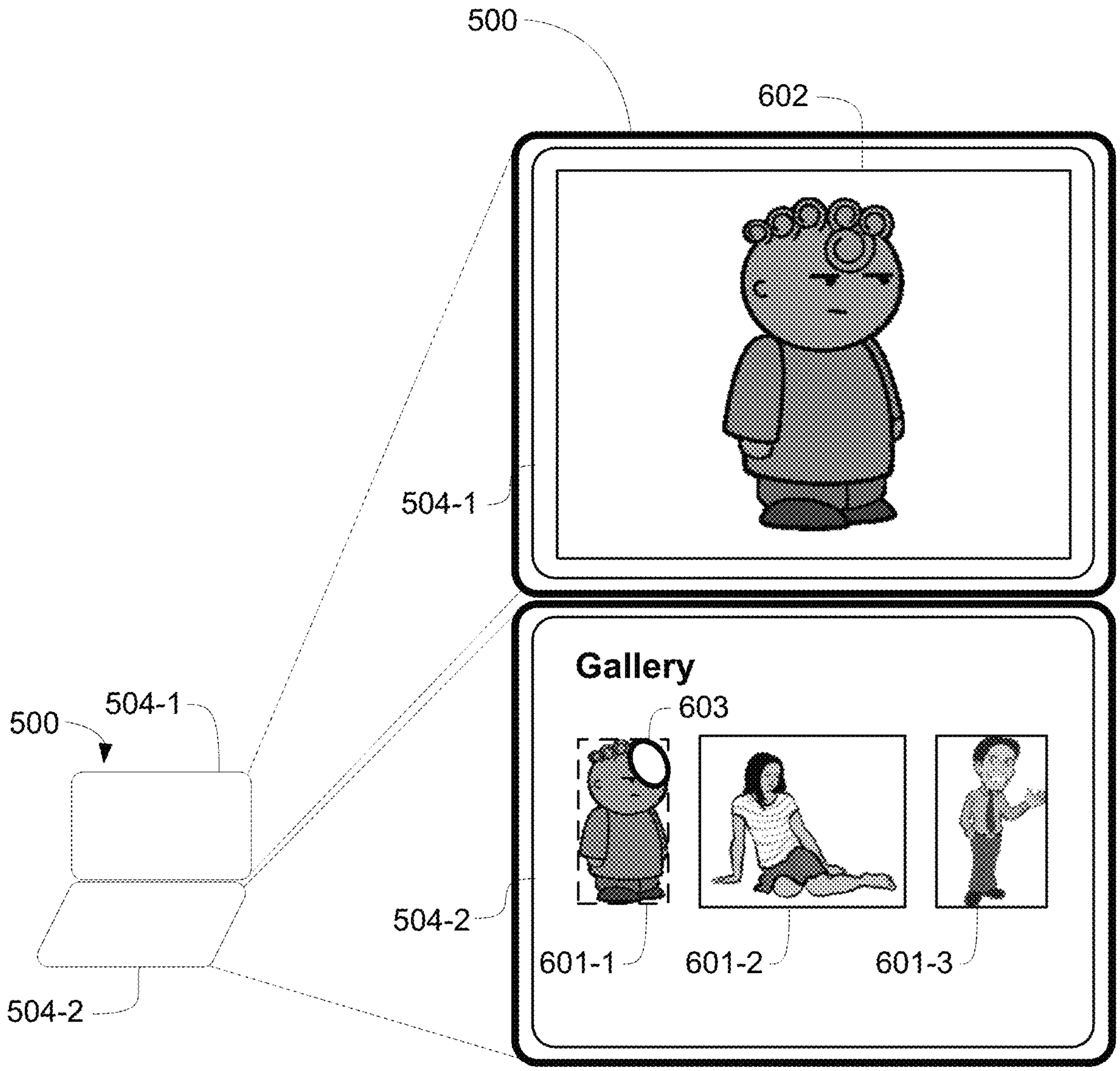
Figure 6C:
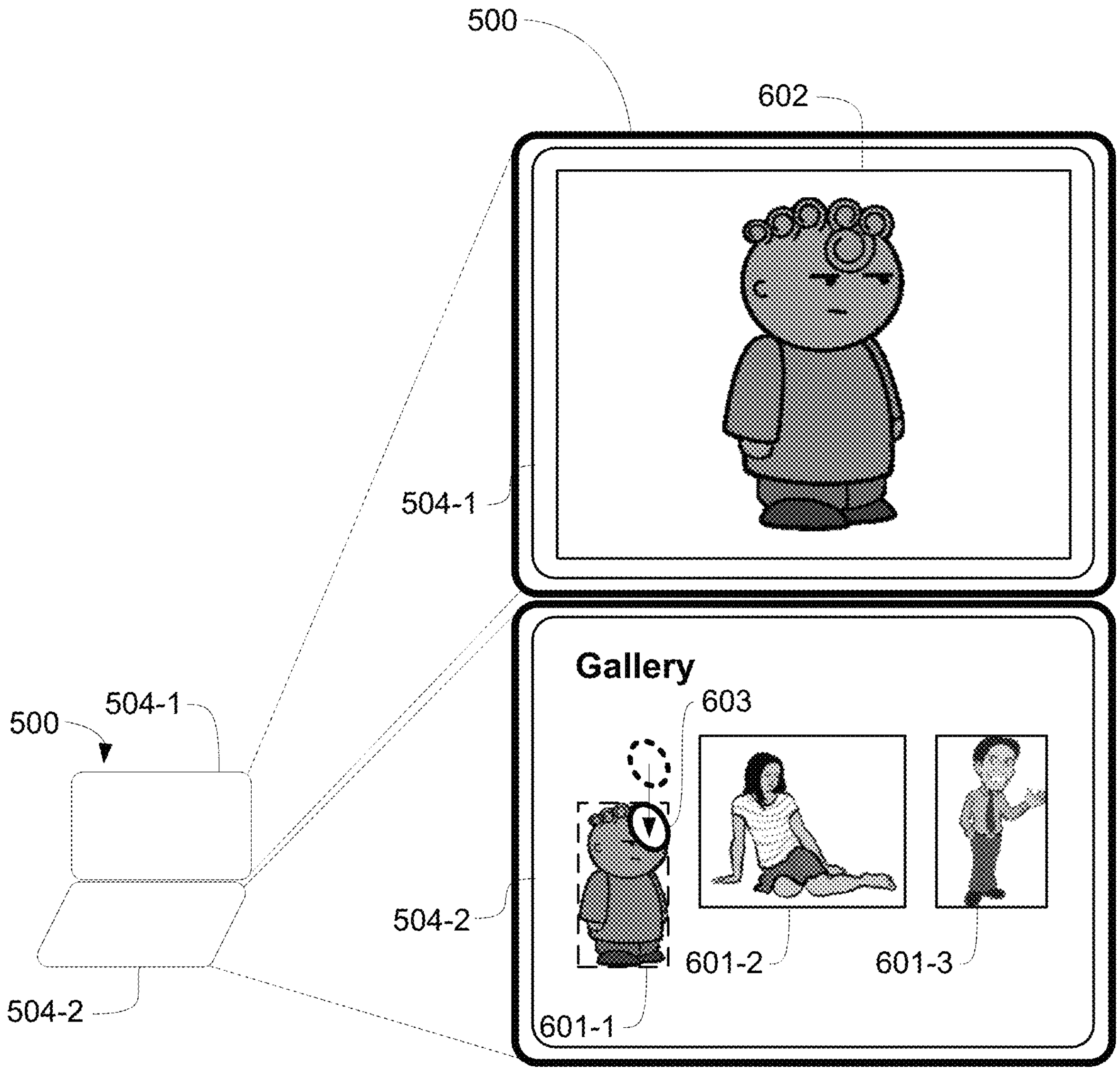
Figure 6D:
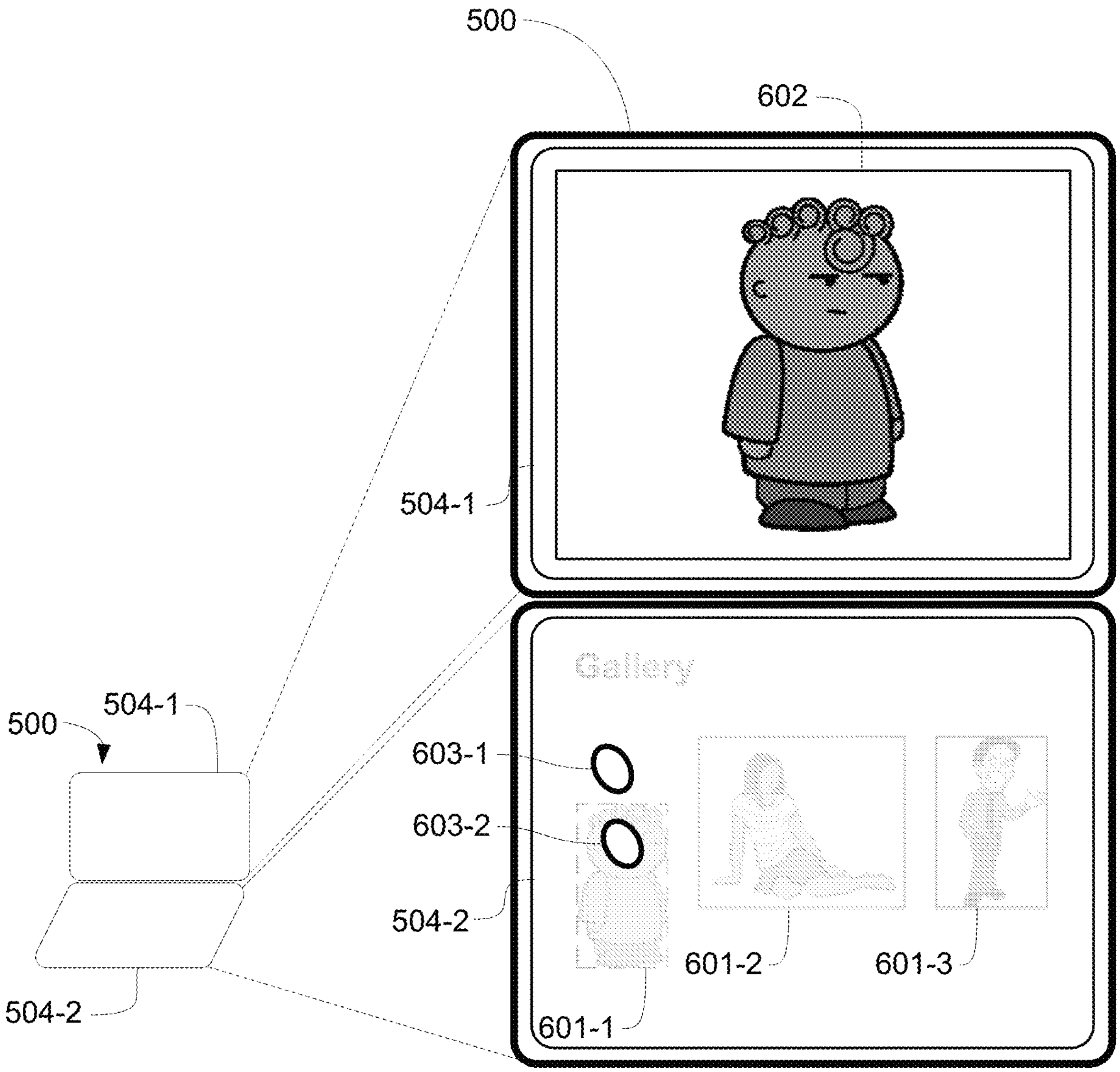
Figure 6E:
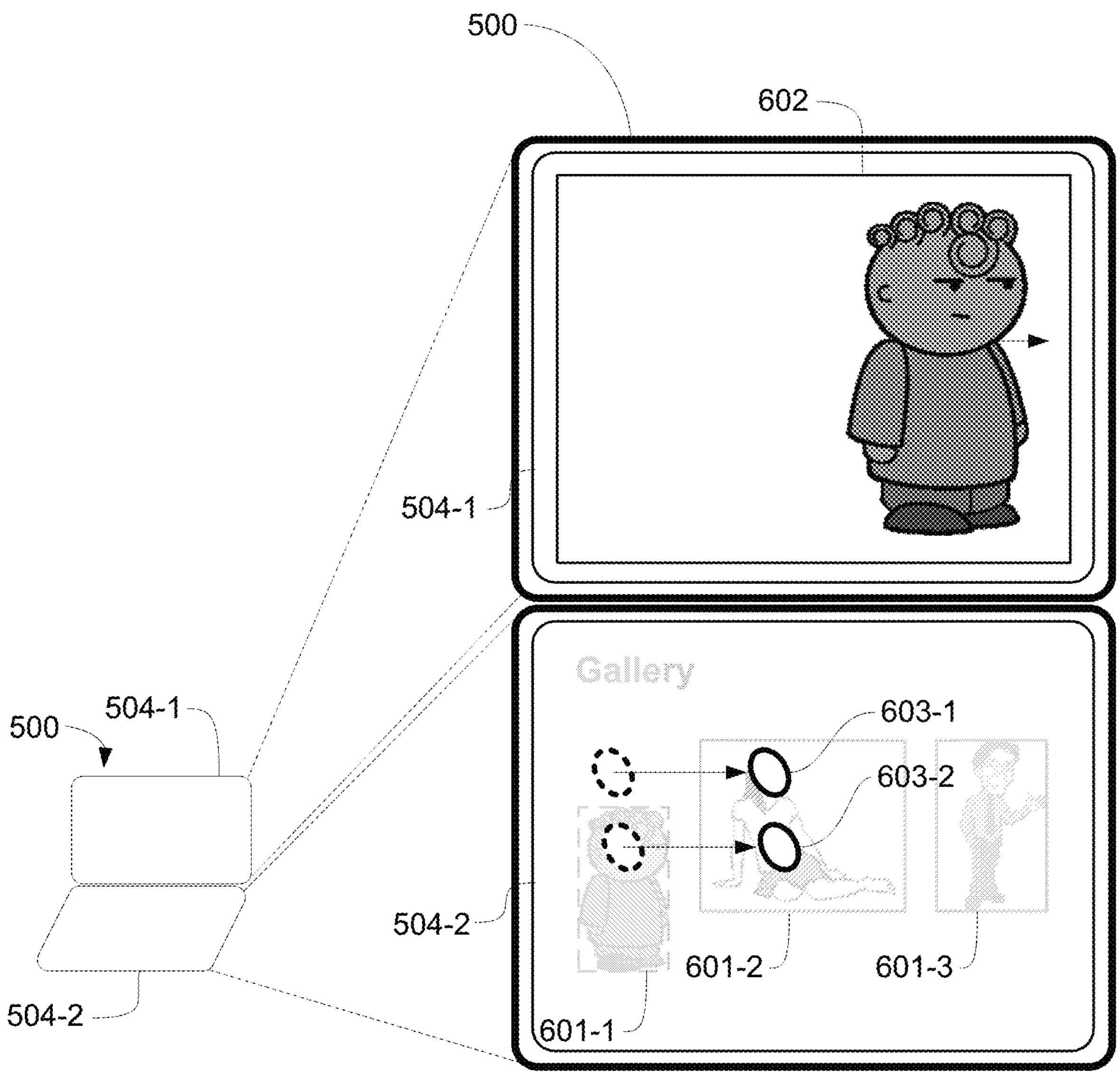
Figure 6F:
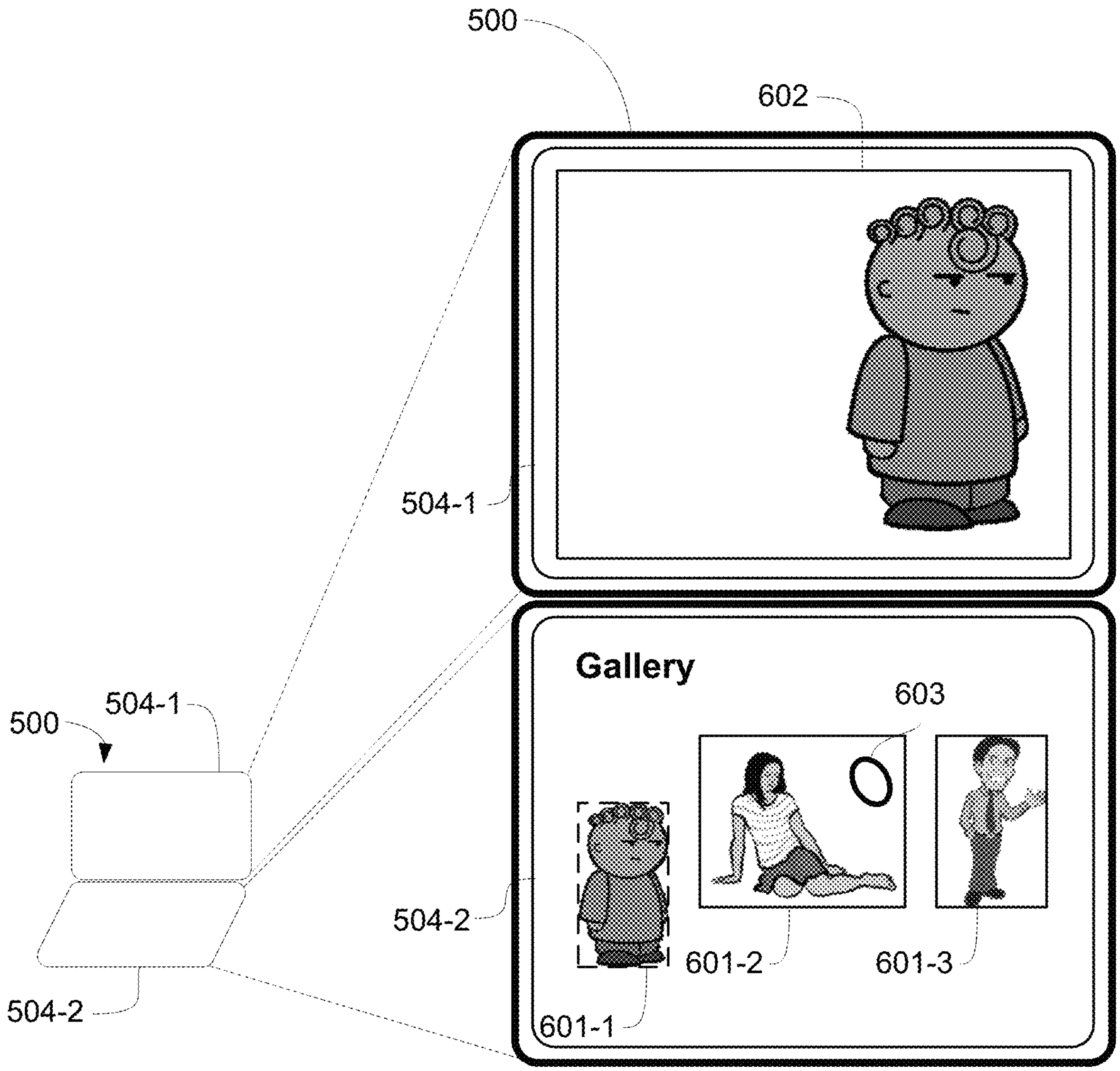
Figure 6G:
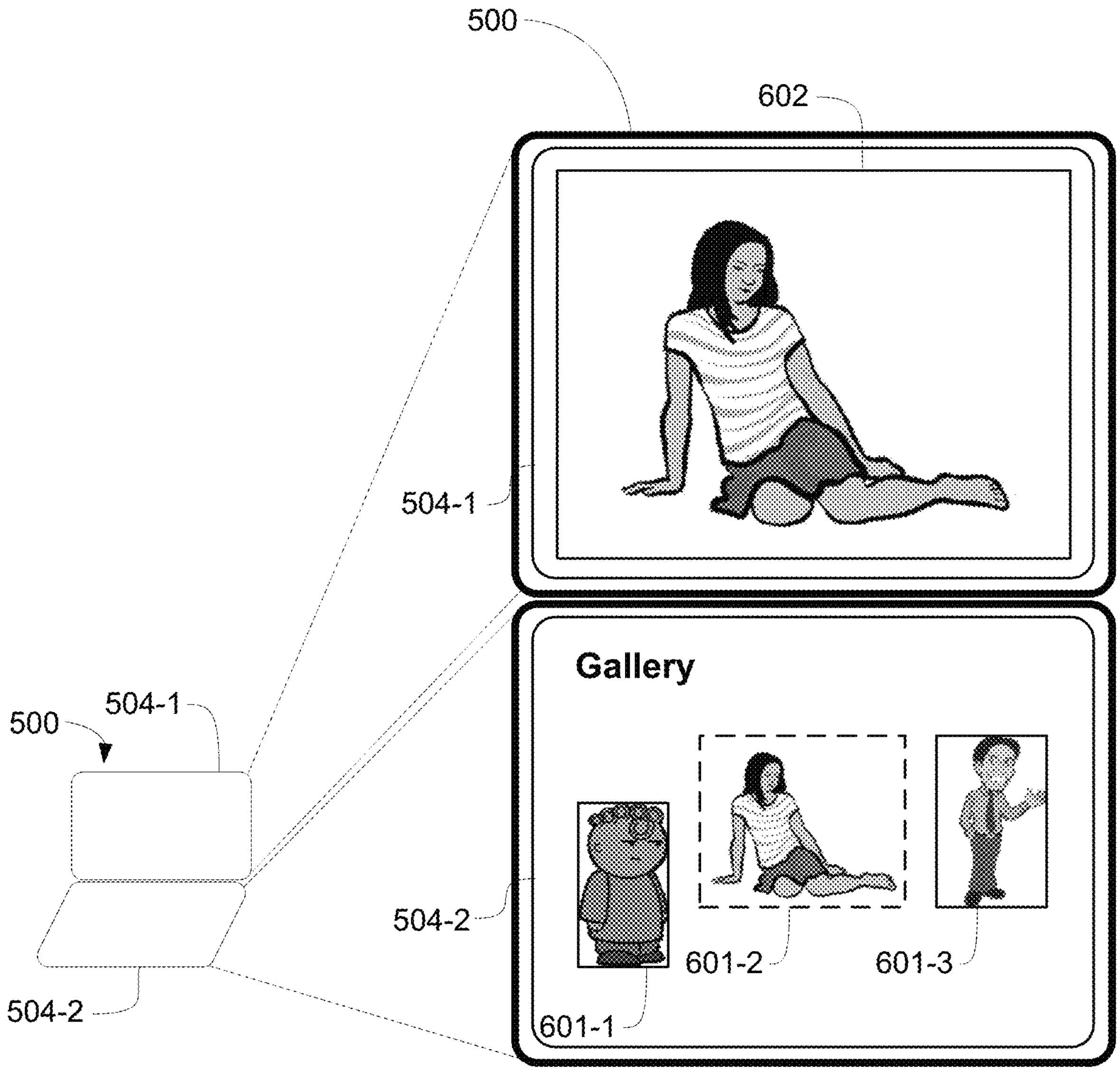
Figure 6H:
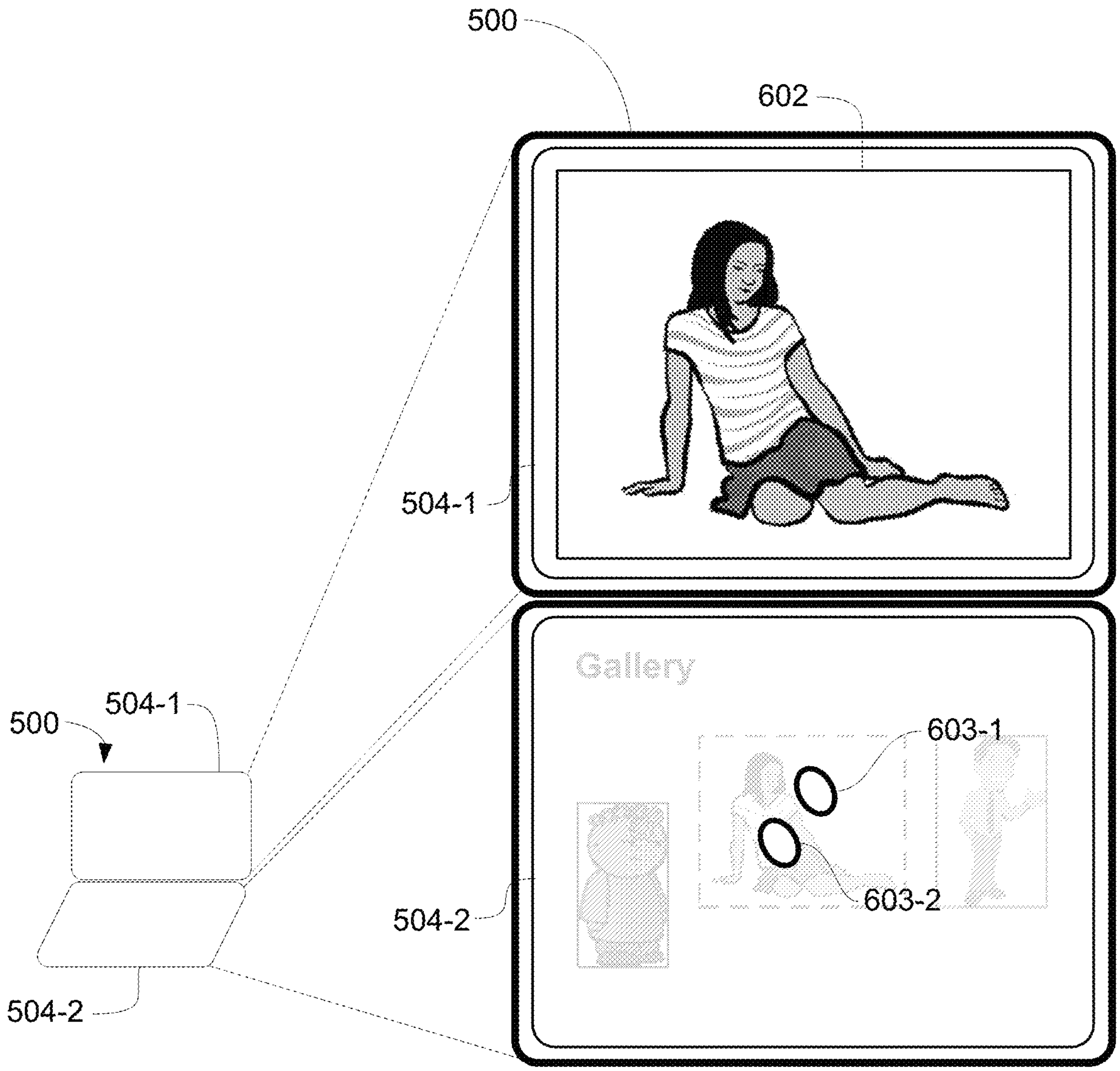
Figure 6I:
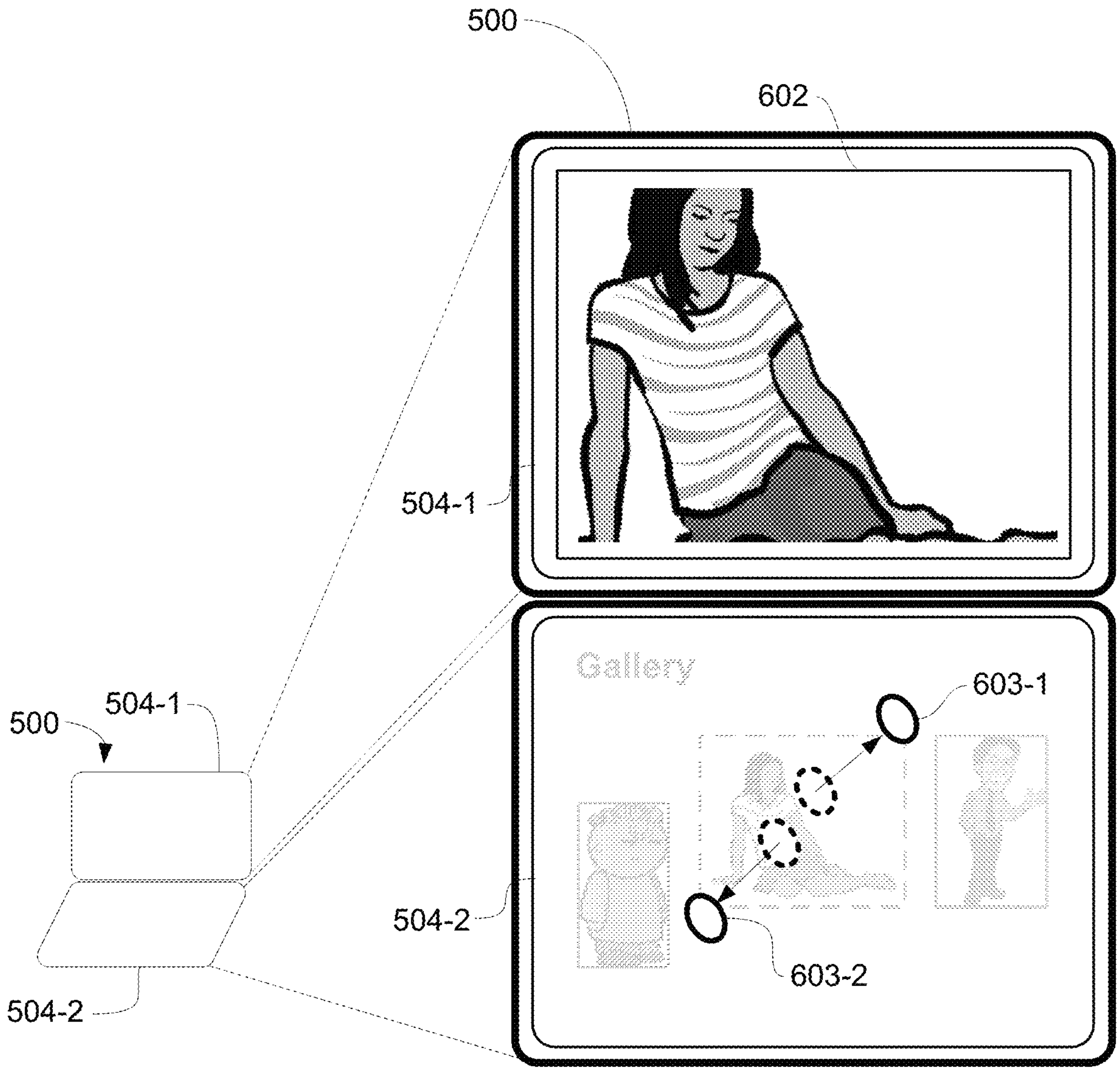
Figure 6J:
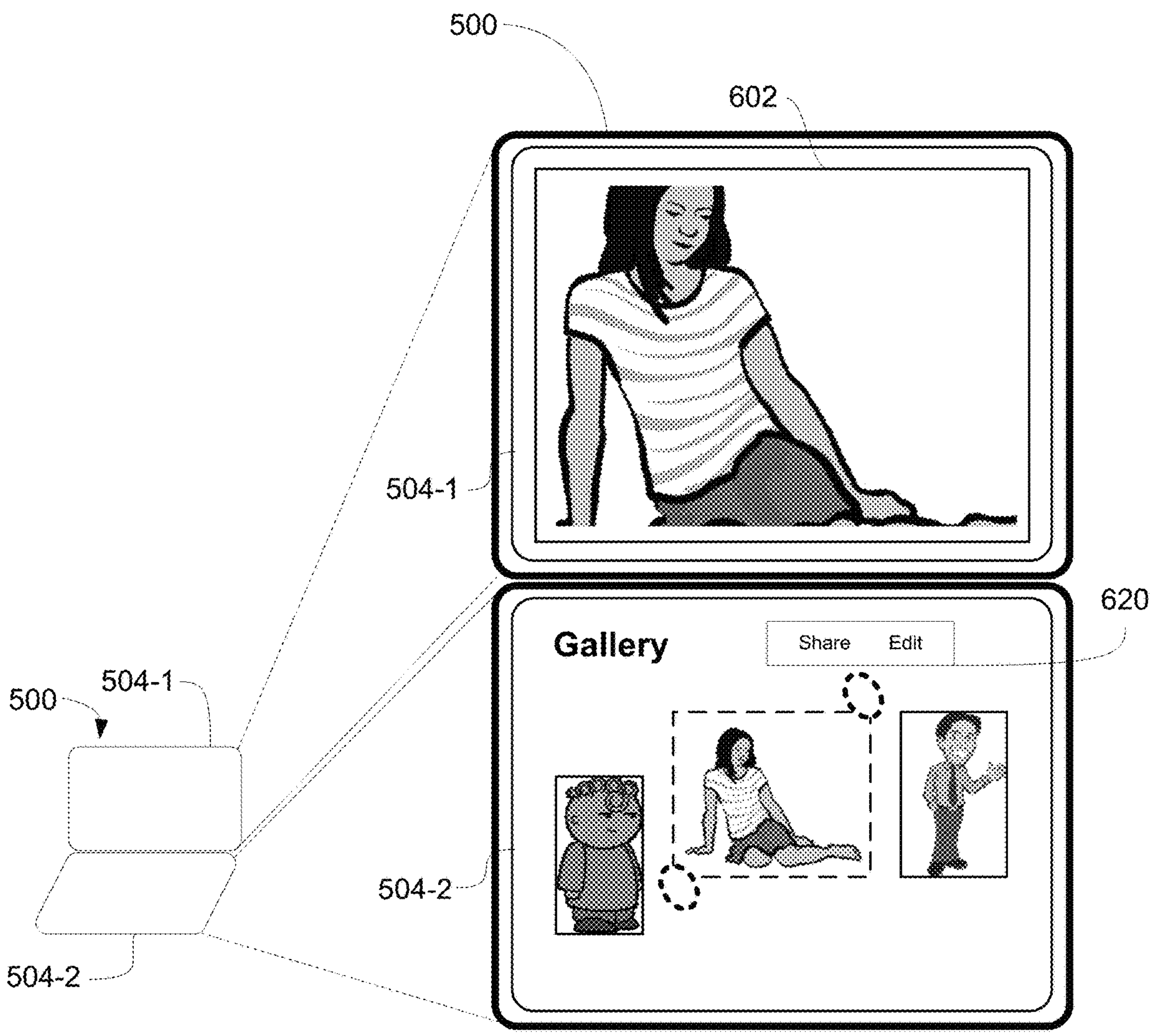
Figure 6K:
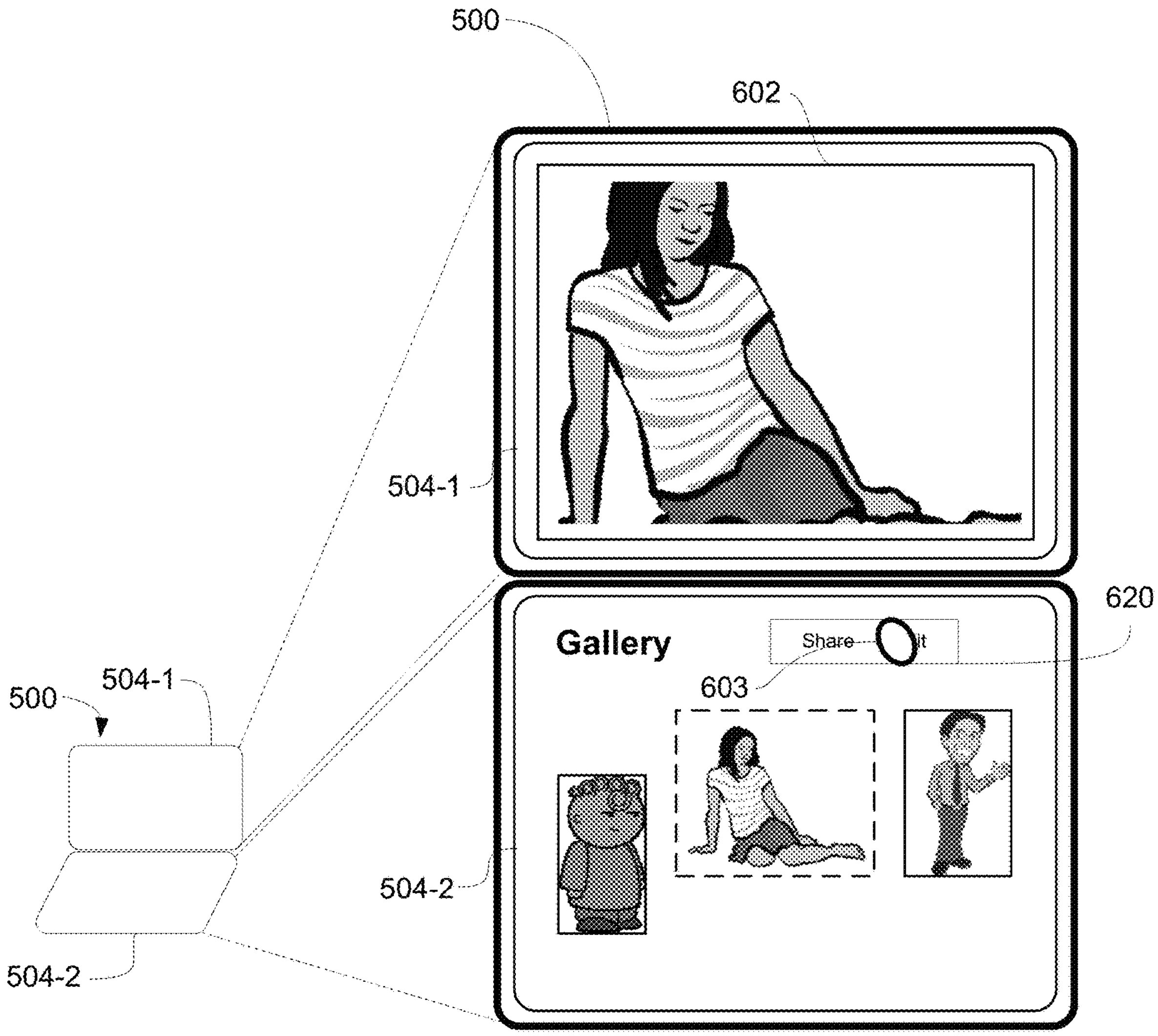
Figure 6L:
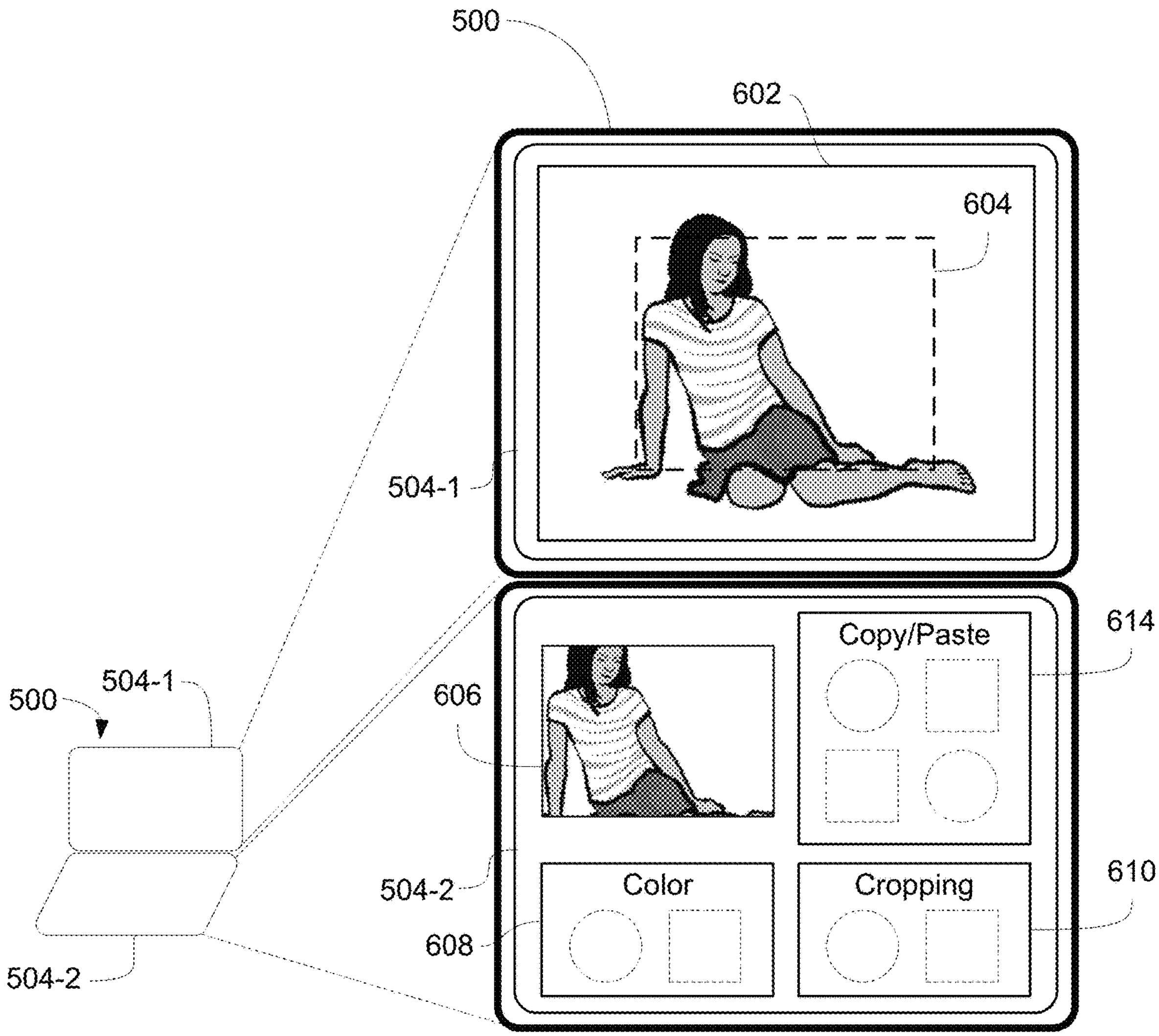
Figure 6M:
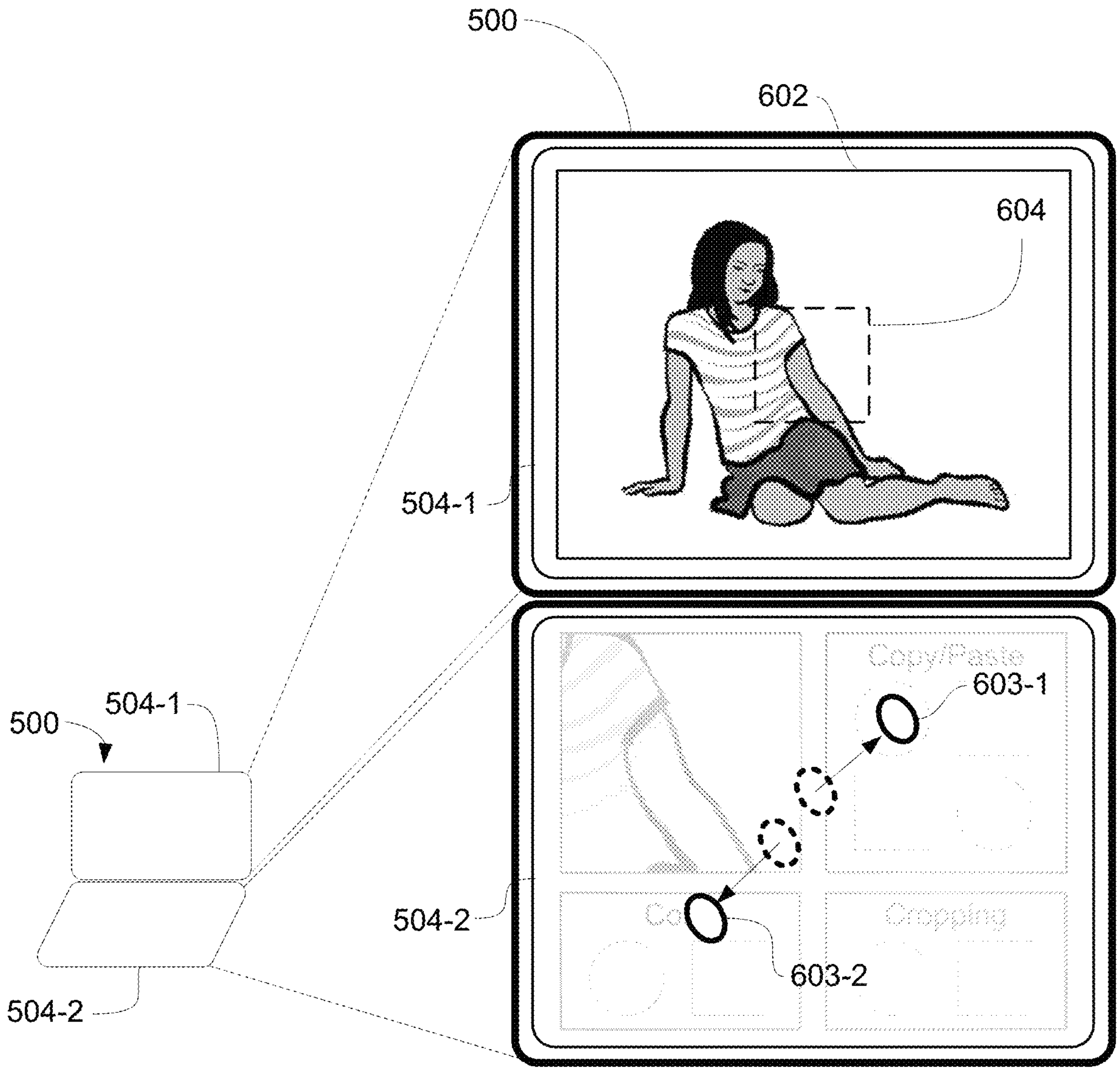
Figure 6N:
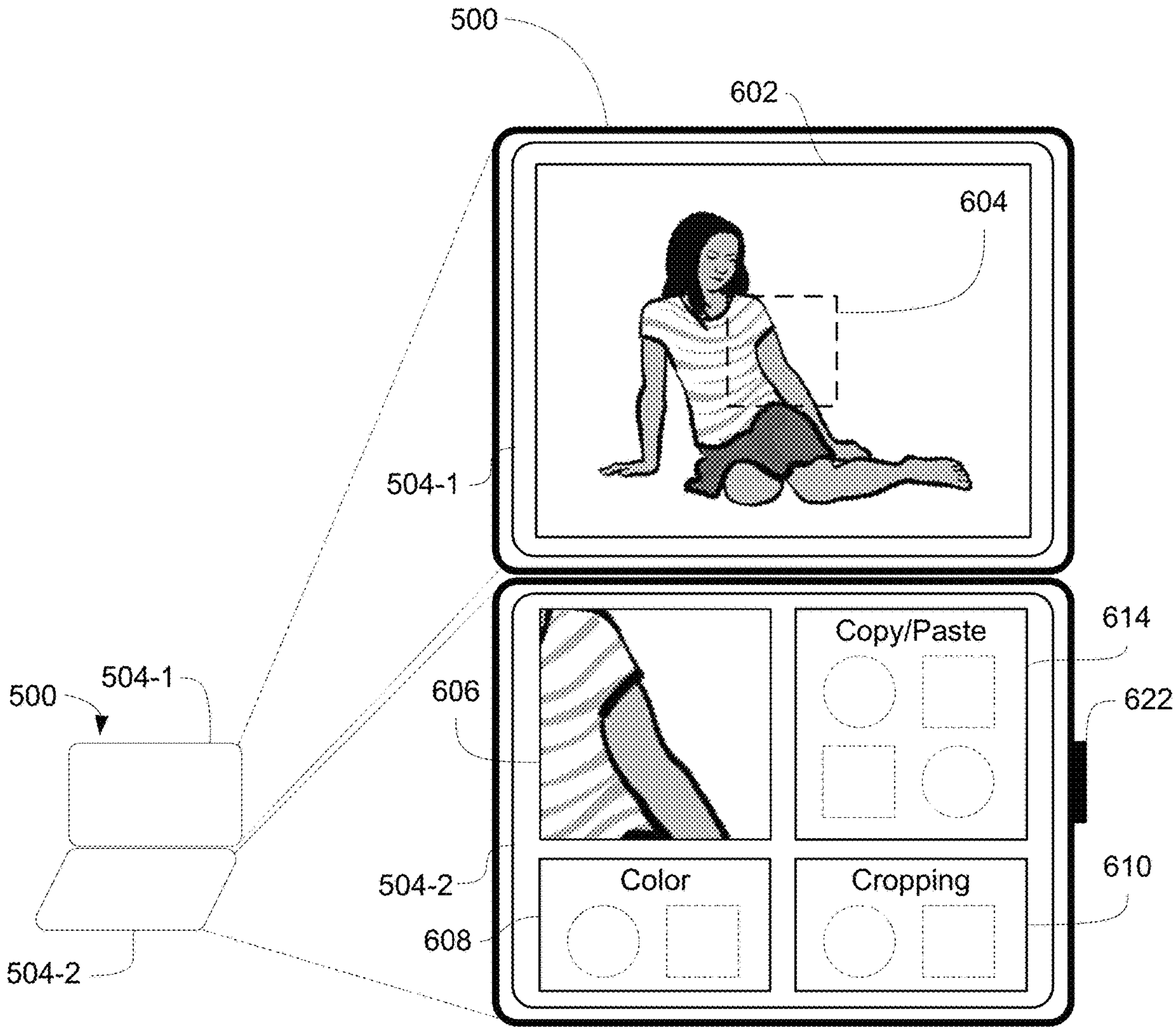
Figure 6O:
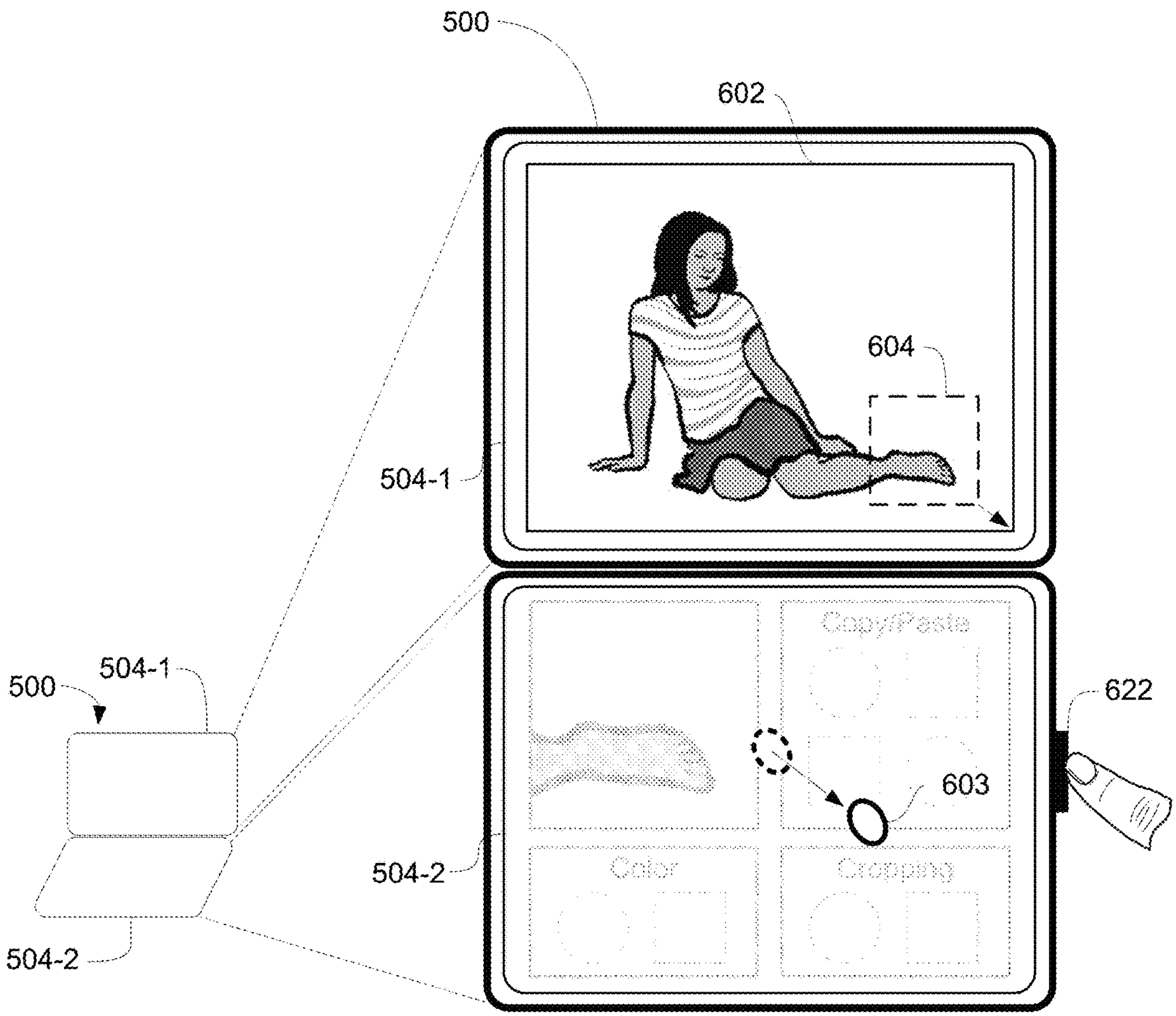
Figures 1, 6P:
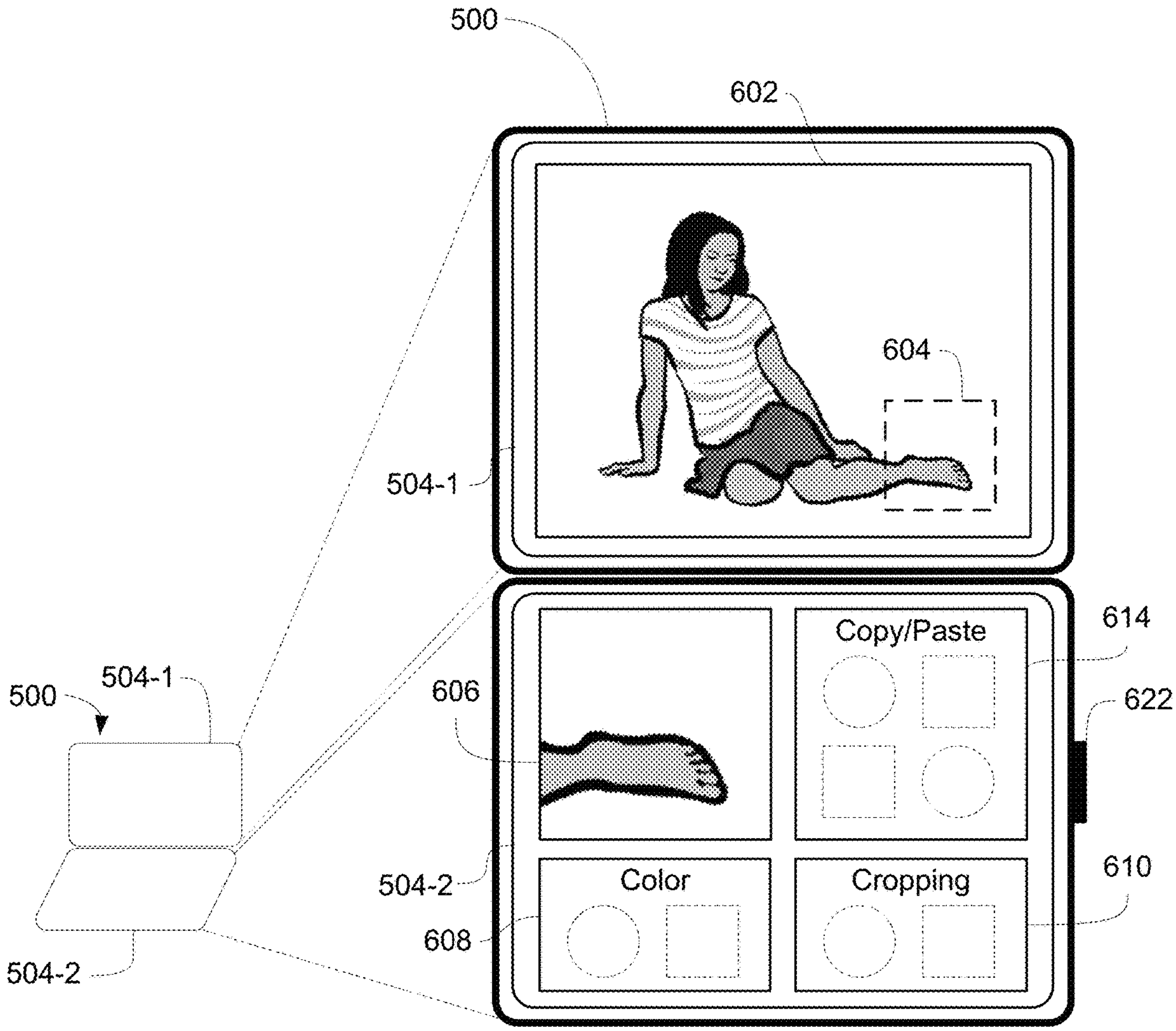
Figures 2, 6P:
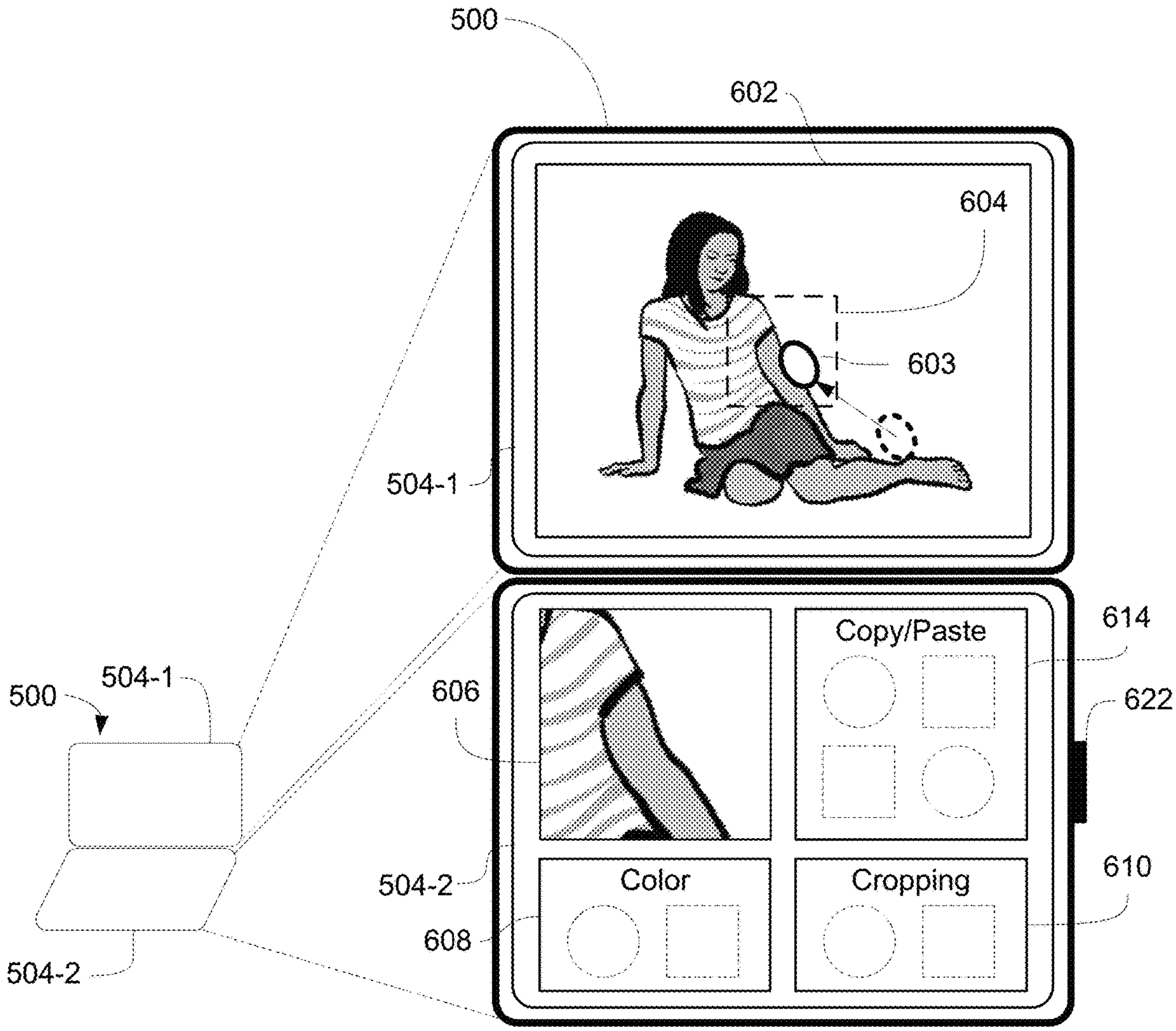
Figure 6Q:
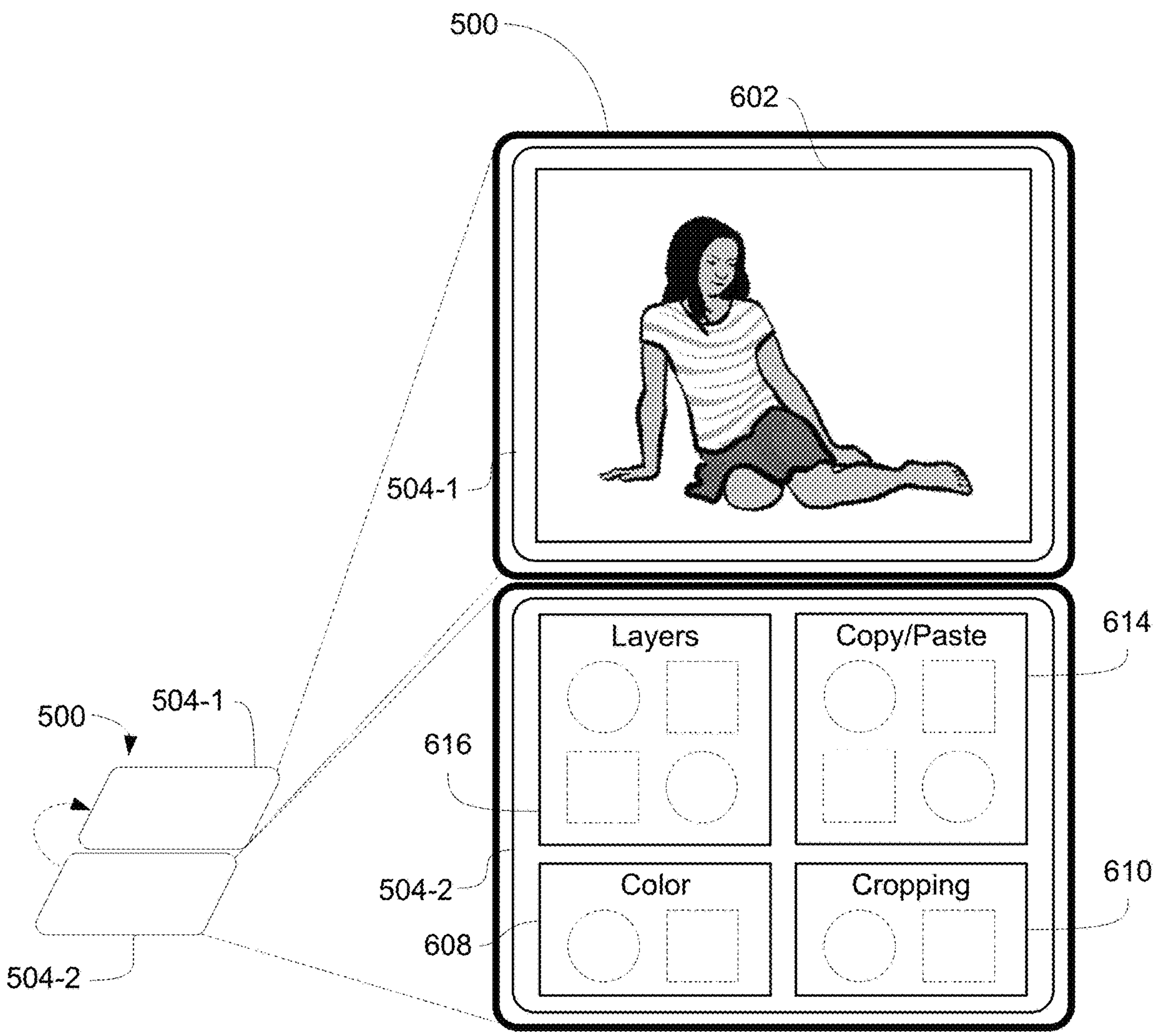

FIGS. 6A-6QQ illustrate exemplary ways in which an electronic device displays and provides for interaction with content on multiple displays in accordance with some embodiments of the disclosure. The embodiments in these figures are used to illustrate the processes described below, including the processes described with reference to FIGS. 7A-7Q.

FIG. 6A illustrates exemplary device 500 with touch screens 504-1 and 504-2, such as described with reference to FIGS. 5A-5H. Touch screens 504-1 and 504-2 optionally display one or more user interfaces that include various content. In the example illustrated in FIG. 6A, touch screens 504-1 and 504-2 display a content browsing user interface. Specifically, touch screen 504-2 displays an index of content (e.g., images, videos, music, etc.) available on the electronic device 500 in the form of a grid of thumbnails 601-1, 601-2 and 601-3 that each correspond to an image. Thumbnail 601-1 has the current focus on touch screen 504-2 (indicated by the dashed-line border in FIG. 6A). As a result, electronic device 500 concurrently displays the image corresponding to thumbnail 601-1 in display area 602 on touch screen 504-1. Further, electronic device 500 is in a clamshell configuration (as shown on the left side of FIG. 6A) in which touch screen 504-1 is angled with respect to touch screen 504-2 at an angle less than 180 degrees (e.g., an angle between 45 and 135 degrees).

In some embodiments, touch screen 504-2 operates as an input element (e.g., a touchpad) for content on touch screen 504-1 and/or content on touch screen 504-2. Further, whether an input detected at touch screen 504-2 manipulates content on touch screen 504-1 or 504-2 optionally depends on the number of contacts that make up the detected input. For example, in FIGS. 6B-6C, a single-contact downward swipe of contact 603 is detected on touch screen 504-2, where the swipe started on thumbnail 601-1 as shown in FIG. 6B. In response to the swipe, the electronic device 500 moves thumbnail 601-1 downward on touch screen 504-2 in accordance with the downward movement of the swipe, as shown in FIG. 6C, without affecting or manipulating content 602 on touch screen 504-1. In contrast, in FIG. 6D, two contacts 603-1 and 603-2 are detected on touch screen 504-2 simultaneously to provide an input to manipulate content on touch screen 504-1 and not content on touch screen 504-2. In response, the electronic device 500 deemphasizes (e.g., dims, stops displaying, or increases the transparency of) the content that was displayed on touch screen 504-2 when the touch contacts 603-1 and 603-2 were detected, as shown in FIG. 6D. In FIG. 6E, the two contacts 603-1 and 603-2 are concurrently swiped from left-to-right (e.g., the electronic device 500 detects a two-finger swipe). In response to the two-finger swipe, the electronic device 500 moves content 602 on touch screen 504-1 from left-to-right in accordance with the input, without manipulating the content on touch screen 504-2 (other than deemphasizing the display of that content, as described above).

In FIG. 6F, a tap is detected on thumbnail 601-2. In response, thumbnail 601-2 gets the current focus on touch screen 504-2, and the electronic device 500 displays the image corresponding to thumbnail 601-2 as content 602 on touch screen 504-1, as shown in FIG. 6G. In FIGS. 6H-6I, a two-contact zooming input is detected on touch screen 504-2 (e.g., contacts 603-1 and 603-2 detected on touch screen 504-2, followed by the contacts moving away from each other as shown in FIG. 6I). In response, the electronic device 500 enlarges content 602 on touch screen 504-1, as shown in FIG. 6I, in accordance with the zooming input. As shown in FIGS. 6H-6I, in response to receiving the two contacts 603-1 and 603-2, the electronic device 500 de-emphasizes the content displayed on touch screen 504-2, as described above. Apart from this de-emphasis, the electronic device 500 optionally does not manipulate the content displayed on touch screen 504-2 in response to the two-contact zooming input.

In some embodiments, after the end of an input manipulating the content 602 on touch screen 504-1, the electronic device 500 displays a contextual menu 620 at or near a location of which then input manipulating the content 602 was detected on touch screen 504-2. For example, in FIG. 6J, the electronic device displays menu 620 at the location of where the top-right contact 603-1 was lifted off of touch screen 504-2 at the end of the above-described zooming input. Menu 620 is optionally a contextual menu that has menu elements related to content 602 that was manipulated by the zooming input. For example, in FIG. 6J, menu 620 includes a "share" menu element for sharing content 602 with another electronic device, and an "edit" menu element for editing content 602.

In FIG. 6K, selection of the "edit" element (e.g., via a tap of contact 603 detected on the "edit" element) is detected on touch screen 504-2. In response to the selection of the "edit" element, the electronic device optionally enters an editing mode in which a content editing user interface is displayed on touch screens 504-1 and 504-2. For example, in response to the selection of the "edit" element in FIG. 6K, the electronic device displays, as shown in FIG. 6L, a content map of content 602 on touch screen 504-1, and displays a detailed view 606 of content 602 as well as various controls for editing content 602 (e.g., color controls 608, copy/paste controls 614, cropping controls 610) on touch screen 504-2. As shown in FIG. 6L, the content map of content 602 on touch screen 504-1 includes the entirety of content 602 (e.g., an unscaled version of content 602, all of which is displayed on touch screen 504-1), and a visual indication 604 indicating a portion of content 602 that is shown on touch screen 504-2 as the detailed view 606 of content 602. The content map on touch screen 504-1 provides context about the entirety of the content 602 being editing, and where, in that content 602, the detailed view 606 is focused.

In FIG. 6M, a two-contact zooming-in input is detected on touch screen 504-2 (e.g., similar to as described with reference to FIGS. 6H-6I). In response, the detailed view 606 of content 602 is enlarged, and correspondingly visual indication 604 in the content map on touch screen 504-1 is reduced in size to reflect the smaller portion of content 602 that the detailed view 606 is now displaying, as shown in FIGS. 6M-6N.

In some embodiments, detection of selection of an affordance (e.g., a physical button included in device 500 or a soft button displayed on touch screens 504-1 and/or 504-2) controls whether touch screen 504-2 operates as a touchpad to manipulate the display on touch screen 504-1 or touch screen 504-2. For example, in FIG. 6N, device 500 includes button 622. In FIG. 6O, device 500 detects selection of button 622 (e.g., depression of button 622). In response, device 500 configures touch screen 504-2 to operate as a touchpad for manipulating the display on touch screen 504-1 (e.g., similar to as described with reference to FIGS. 6D-6E and 6H-6I). While button 622 is depressed, a downward-rightward swipe of contact 603 is detected on touch screen 504-2. In response, device 500 moves indication 604 in the content map on touch screen 504-1 downward and rightward in accordance with the input, as shown in FIG. 6O. Device 500 also correspondingly updates detailed view 606 on touch screen 504-2 to correspond to the new location of indicator 604 in the content map on touch screen 504-1, as shown in FIGS. 6O-6P-1. It is understood that while the input of FIG. 6O is described as moving indicator 604 within content 602 on touch screen 504-1, in some embodiments, the input instead moves content 602 within touch screen 504-1 while indicator 604 remains stationary to analogously change the portion of content 602 that is currently in focus on touch screen 504-2. Similarly, in some embodiments, movement of indicator 604 in the content map on touch screen 504-1 causes the detailed view 606 displayed on touch screen 504-2 to change in accordance with that movement. For example, in FIG. 6P-2, contact 603 is detected on touch screen 504-1 for dragging indicator 604 up and to the left on touch screen 504-1. In response, detailed view 606 is updated to reflect the area of content map that is now in focus pursuant to the updated location of indicator 604 (e.g., the arm of the person in the image).

In some embodiments, detecting a change in the configuration of device 500 between the clamshell configuration in which touch screen 504-1 is angled with respect to touch screen 504-2 at an angle less than 180 degrees (e.g., an angle between 45 and 135 degrees) and a spread out configuration in which touch screen 504-1 is angled with respect to touch screen 504-2 at about 180 degrees (e.g., such that the electronic device 500 is substantially flat) causes device 500 to display the content editing user interface in different modes. In some embodiments, such changes in user interface display are made by device 500 to provide a user interface that is well-suited for the current configuration (e.g., clamshell or spread out) of device 500. For example, in FIG. 6P-1, device 500 is in the clamshell configuration, and touch screen 504-1 is displaying the content map and touch screen 504-2 is displaying detailed view 606 as well as editing controls 608, 610 and 614. In FIG. 6Q, device 500 detects that touch screen 504-1 has been pushed back such that device 500 is now in the spread out configuration. In response, device 500 stops displaying the content map on touch screen 504-1 (instead, simply displaying content 602 without indicator 604), stops displaying detailed view 606 on touch screen 504-2, and displays an additional editing control 616 on touch screen 504-2, as shown in FIG. 6Q. Other such changes in user interface display are similarly contemplated.

Figure 6R:
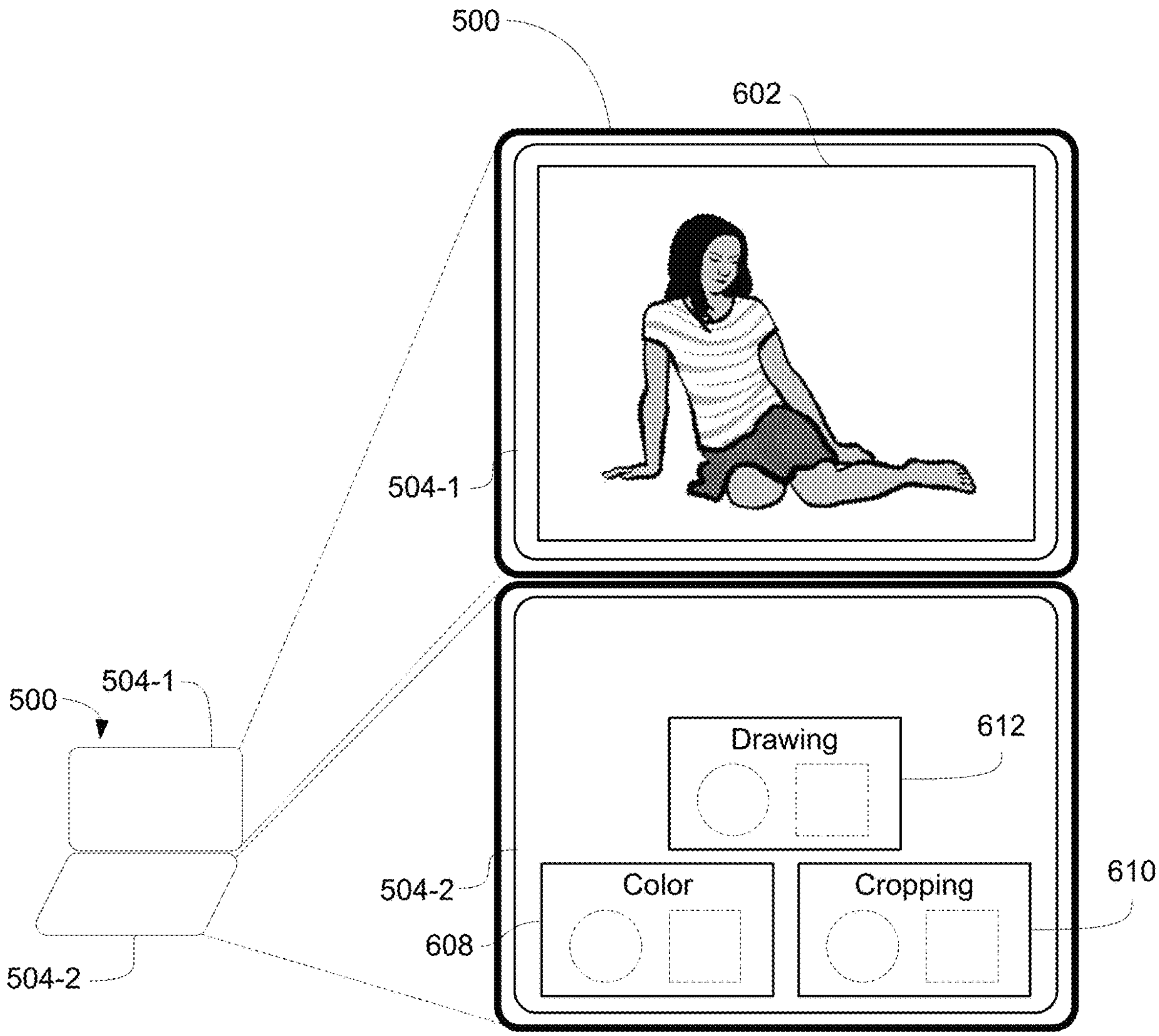
Figure 6S:
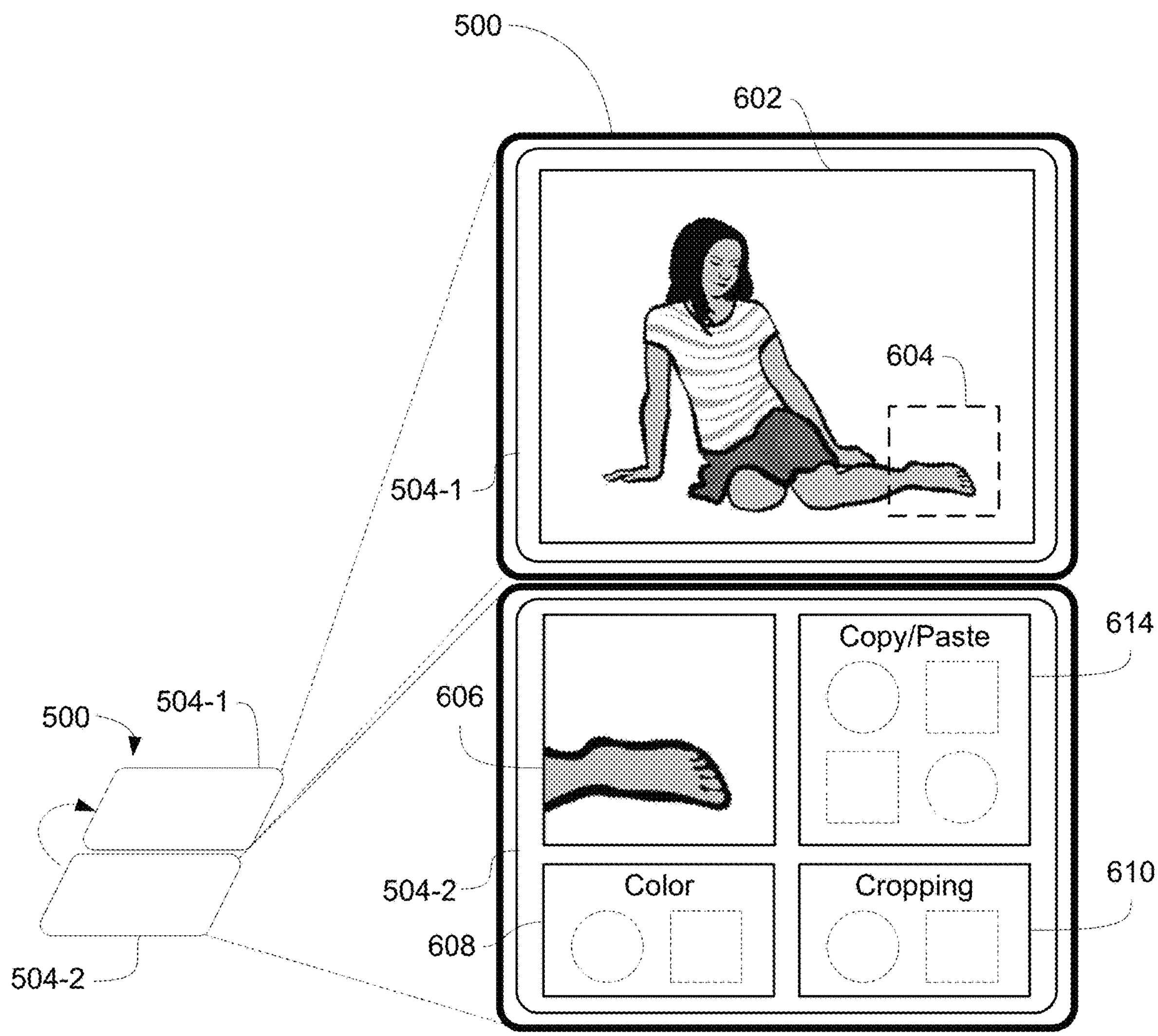

For example, in FIG. 6R, device 500 is in the clamshell configuration, and touch screen 504-1 is displaying the content 602 and touch screen 504-2 is displaying editing controls 608, 610 and 612. As shown in FIG. 6R, in some embodiments, the electronic device 500 does not display a detail view of the content while in the clamshell configuration, as in the examples illustrated in FIGS. 6L-6P-2. In FIG. 6S, device 500 detects that touch screen 504-1 has been pushed back such that device 500 is now in the spread out configuration. In response, device 500 starts to display a content map of content 602 on touch screen 504-1, and starts displaying detailed view 606 and editing controls 608, 610 and 614 (a different set of controls than were displayed in FIG. 6R) on touch screen 504-1, as shown in FIG. 6S.

Figure 6T:
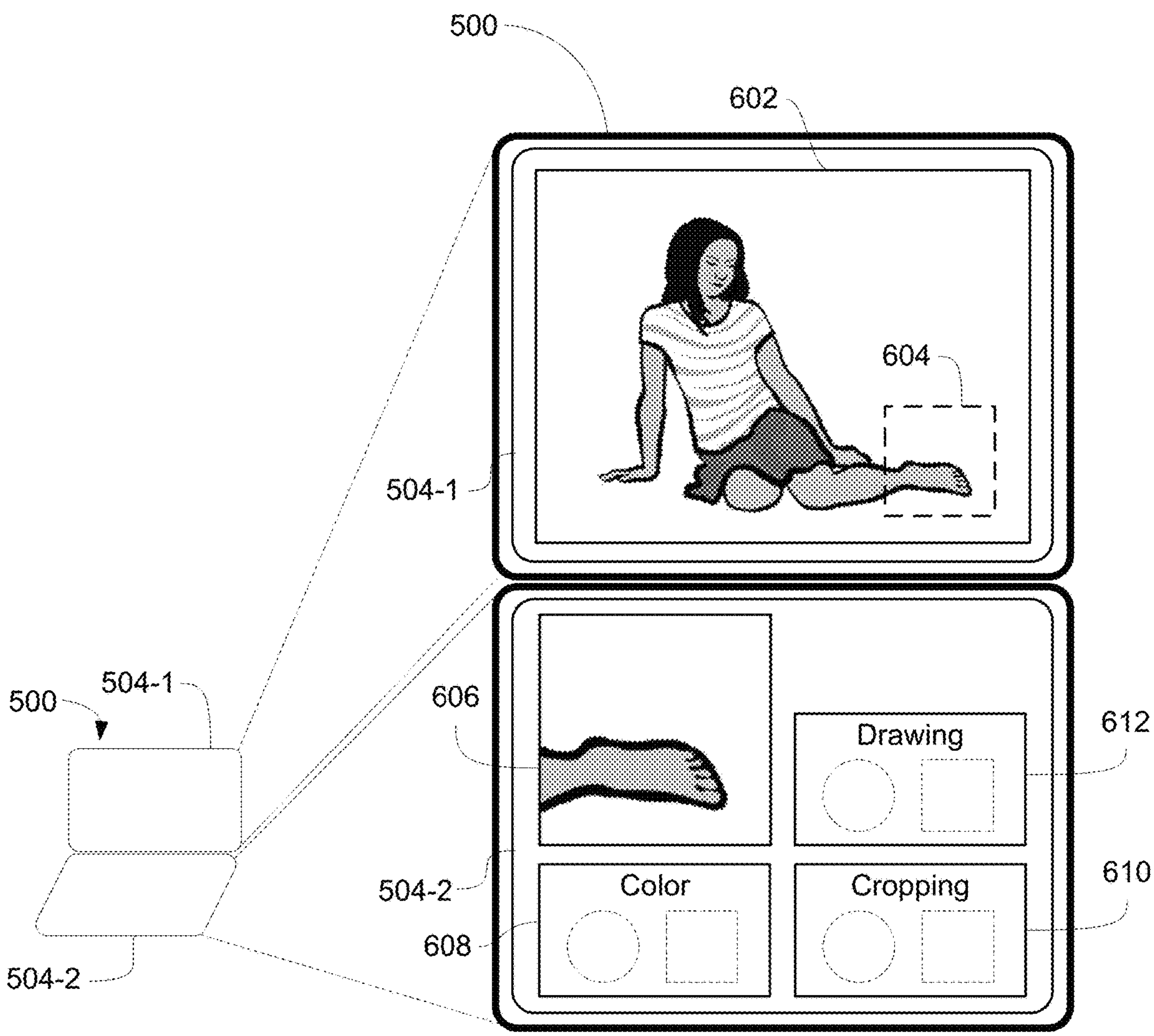
Figure 6U:
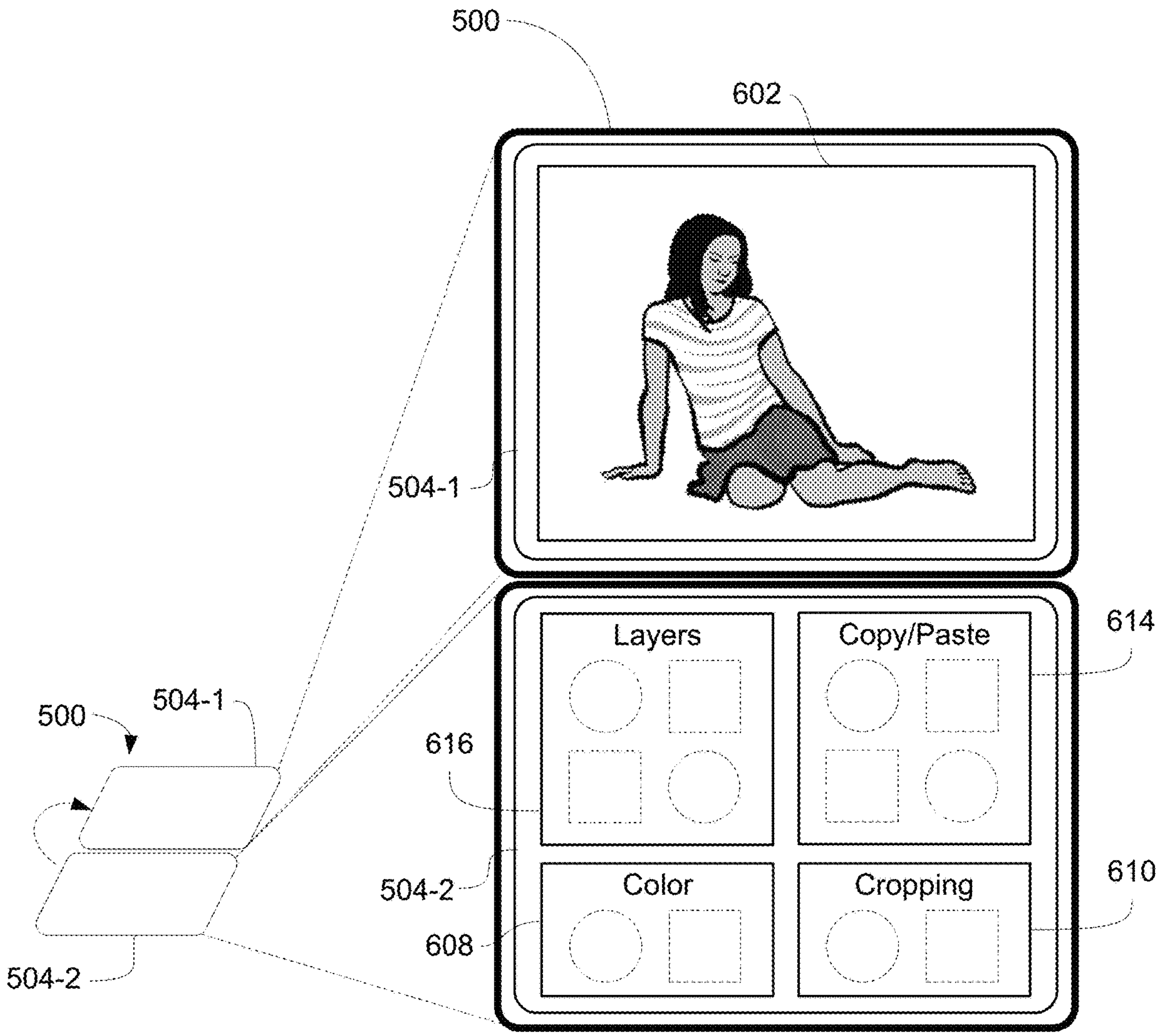

As another example, in FIG. 6T, device 500 is in the clamshell configuration, and touch screen 504-1 is displaying a content map of content 602, and touch screen 504-2 is displaying detailed view 606 as well as editing controls 608, 610 and 612. In FIG. 6U, device 500 detects that touch screen 504-1 has been pushed back such that device 500 is now in the spread out configuration. In response, device 500 stops displaying the content map on touch screen 504-1 (instead, simply displaying content 602 without indicator 604), stops displaying detailed view 606 on touch screen 504-2, and displays editing controls 608, 610, 614 and 616 (a different set of controls than were displayed in FIG. 6T) on touch screen 504-1, as shown in FIG. 6U.

Figure 6V:
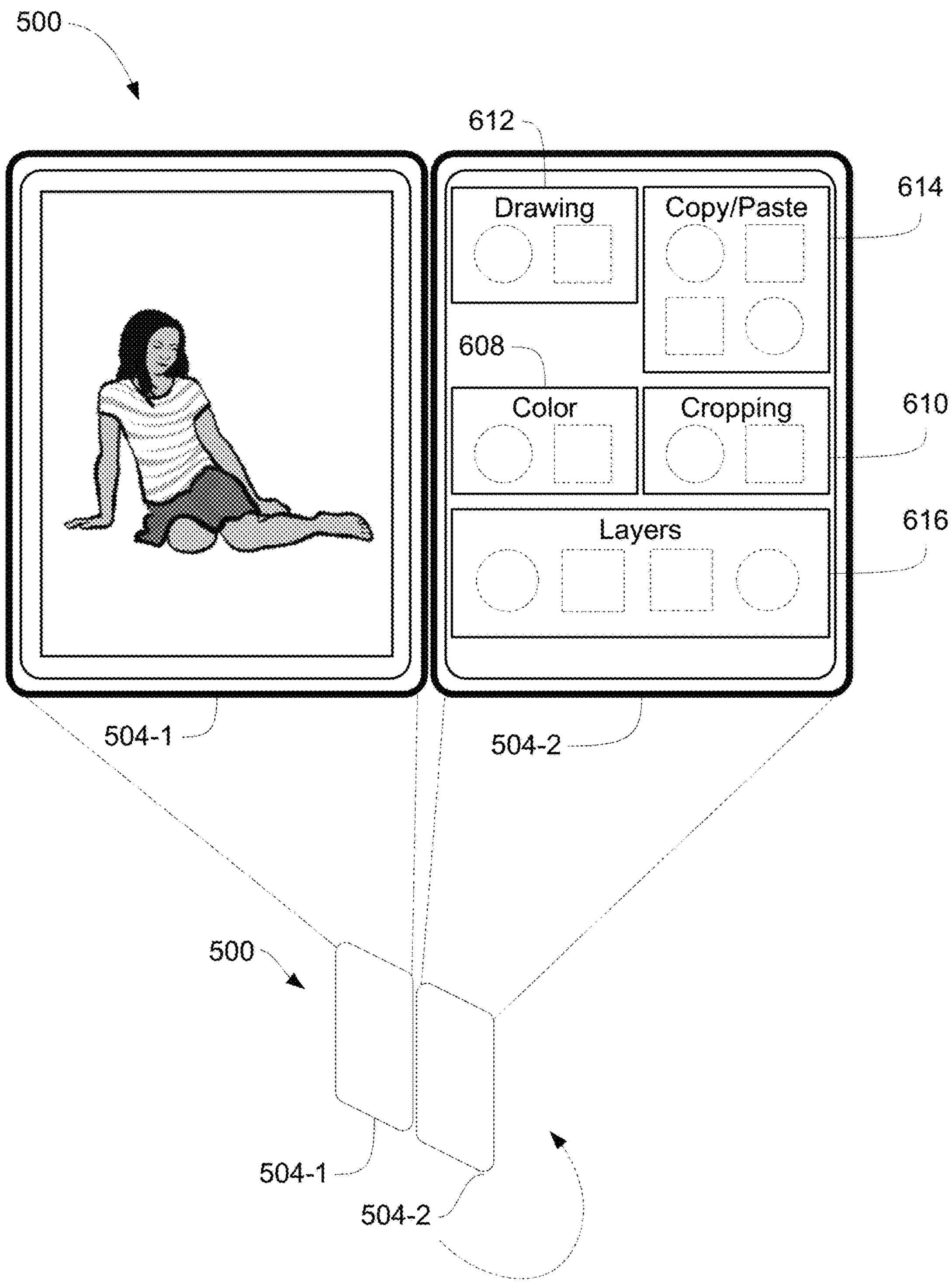

Further, in some embodiments, device 500 further changes the mode in which it displays the content editing user interface based on the orientation of device 500 (e.g., portrait or landscape) when the device 500 is in the spread out configuration. For example, in FIG. 6U, the device 500 is in a portrait orientation with specific display features as described above with reference to FIG. 6U. In FIG. 6V, device 500 detects that it has been rotated from the portrait orientation to a landscape orientation. In response, device changes the orientation of content 602 on touch screen 504-1 and the controls on touch screen 504-2 to match the landscape orientation of device 500, as shown in FIG. 6V (e.g., by rotating the content 602 and the controls in accordance with the rotation of the device). Further, device 500 displays controls 608, 610, 612, 614 and 616 on touch screen 504-2, which is a different set of controls than were displayed on touch screen 504-2 in FIG. 6U.

In some embodiments, device 500 displays an article browsing user interface in which a user is able to read an article including text and media (e.g., images, videos, etc.). For example, in FIG. 6W, device 500 is in a clamshell configuration, and is displaying an article about the history of sports on touch screen 504-1. The article includes text 632, 634 and 636, and media 633, 635 and 637. Media 633, 635 and 636 have particular positions in the article to which they correspond (e.g., positions in the text of the article). For example, media 633 corresponds to text 632, and is displayed in-line with (or adjacent to) text 632; media 635 corresponds to text 634, and is displayed in-line with (or adjacent to) text 634; and media 637 corresponds to text 636, and is displayed in-line with (or adjacent to) text 636. The article optionally includes additional text and/or media that is off-screen in FIG. 6W (e.g., text/media that becomes visible if the article is scrolled).

In some embodiments, device 500 modifies the display of the article in response to detecting a change in configuration to the spread out configuration. For example, in FIG. 6X, device 500 detects that touch screen 504-1 has been pushed back such that device 500 is now in the spread out configuration. In response, the device 500 separates the display of the media in the article from the display of the text in the article, and displays the text in the article on touch screen 504-1, and the media in the article on touch screen 504-2, as shown in FIG. 6X. As previously mentioned, the article has media that was previously not displayed on touch screen 504-1, which is now displayed on touch screen 504-2 (e.g., media 639, 641 and 643). In this way, a user is able to separately navigate the text of the article and the media of the article.

In some embodiments, a user is able to navigate the text of the article on touch screen 504-1 by selecting the media in the article on touch screen 504-2. For example, in FIG. 6X, a tap of contact 603 is detected on media 643 on touch screen 504-2. In response, device 500 scrolls the text of the article on touch screen 504-1 to display text 642 that corresponds to media 643 that was selected in FIG. 6X, as shown in FIG. 6Y. Selection of others of the media displayed on touch screen 504-2 optionally results in corresponding and similar text scrolling behavior as described here.

In some embodiments, device 500 responds differently to incoming notification-generating events depending on whether the device 500 is in the clamshell configuration or the spread out configuration. For example, in FIG. 6Z, device 500 is in the clamshell configuration, and receives an email. In response, device 500 generates and displays an email notification 644 on touch screen 504-2, as shown in FIG. 6Z. It is understood that in some embodiments, the notification generated by the device 500 when the device is in the clamshell configuration is different than that illustrated in FIG. 6Z (e.g., an audible notification, a notification displayed on touch screen 504-1, etc.). However, when device 500 is in the spread out configuration, as shown in FIG. 6AA, device 500 optionally suppresses notifications, such that when the device 500 receives an email, it will not generate a notification of that email (or, more generally, it will not generate the notification that would have been generated if the device 500 had been in the clamshell configuration when the email was received).

In some embodiments, device 500 is able to share information between multiple applications that are concurrently displayed on the device. For example, in FIG. 6BB, device 500 displays applications A 646, B 648 and C 650 on touch screen 504-1, and applications D 652, E 654, F 656 and G 658 on touch screen 504-2. In FIG. 6BB, applications B, C, D, E, F and G are all capable of receiving information from another application displayed on device 500 (e.g., capable of having information copied from another application pasted into them). Further, in FIG. 6BB, application A 646 is displaying information "TEXT123". A tap of contact 603 is detected on a "share" button in application A 646 (displayed on touch screen 504-1) for copying the "TEXT123" information displayed by application A, as shown in FIG. 6BB, which copies the "TEXT123" information and prepares it to be shared with another application displayed by device 500, as shown in FIG. 6CC. In FIG. 6DD, a tap (e.g., at contact 603) on application G 658 (displayed on touch screen 504-2) is detected by the device 500. In response, the "TEXT123" information is inputted/pasted into application G 658, as shown in FIG. 6EE. Thus, device 500 provides an easy way of sharing information between applications displayed, for example, on touch screen 504-1, and applications displayed, for example, on touch screen 504-2.

In some embodiments, device 500 shares information from one application to another in response to a detected swipe. For example, in FIG. 6FF, the "TEXT123" information in application A 646 has been copied and is ready to be shared with another application. A downward-leftward swipe of contact 603, starting from application A 646, is detected, and in response, device 500 inputs the "TEXT123" information to application D 652, as shown in FIG. 6FF, because the swipe on touch screen 504-1 is directed towards application D 652 on touch screen 504-2. Even though the swipe was also directed towards application B 648, device 500 optionally does not input the "TEXT123" information to application B 648, because application B 648 is displayed on touch screen 504-1 (the same touch screen on which application A 646 is displayed). Thus, in some embodiments, detected swipes cause device 500 to share information between applications that are displayed on different ones of touch screens 504-1 and 504-2. Similarly, in FIG. 6HH, a downward-rightward swipe of contact 603, starting from application A 646, is detected, and in response, device 500 inputs the "TEXT123" information to application E 654, as shown in FIG. 6HH, because the swipe on touch screen 504-1 is directed towards application E 654 on touch screen 504-2.

In some embodiments, the speed and/or length of the detected swipe determines which application the information is shared with. For example, in FIG. 6GG, a downward-leftward swipe is detected on touch screen 504-1 that is faster and/or longer than the swipe detected in FIG. 6FF. In response, instead of inputting the "TEXT123" information to application D (as in FIG. 6FF), device 500 has inputted the "TEXT123" information to application F 656 (as in FIG. 6GG), which is displayed on touch screen 504-2 as further from application A 646 than is application D 652.

In some embodiments, touch screen 504-2 is configured to act as a touchpad for only one application at a time, even though device 500 is displaying multiple applications concurrently. For example, in FIG. 6II, device 500 is in the clamshell configuration, and is displaying application A 660 and application B 662 concurrently on touch screen 504-1. In FIG. 6II, touch screen 504-2 is configured to operate as a touchpad to control a cursor 664 on touch screen 504-1 in accordance with inputs detected on touch screen 504-2. In the example of FIG. 6II, application A 660 is the currently-active application (indicated by the dashed line border), and cursor 664 is positioned within application A 660. As such, touch screen 504-2 is optionally configured to control cursor 664 within application A 660. For example, in FIGS. 6II-6JJ, an upward-rightward swipe of contact 603 at speed 51 is detected on touch screen 504-2. In response, device 500 moves cursor 664 within application A 660 on touch screen 504-1 in accordance with the rightward-upward swipe, as shown in FIG. 6JJ.

However, in some embodiments, swipes that have speeds greater than a threshold speed cause the currently-active application to change to an application that is in the direction of the swipe. For example, speed 51 was optionally lower than the speed threshold, and thus the swipe in FIG. 6JJ did not cause the currently-active application to change from application A 660. However, in FIG. 6KK, a rightward-upward swipe of contact 603 is detected on touch screen 504-2 that has a speed S2 that is optionally faster than the speed threshold. In response, instead of moving cursor 664 within application A 660, the device 500 causes application B 662 (the application in the direction of the swipe relative to the position of cursor 664) to become the active application, and moves cursor 664 to within application B 662, as shown in FIG. 6KK. Thus, touch screen 504-2 is now configured to control cursor 664 within application B 662 in response to inputs (e.g., swipes) having speeds less than the speed threshold, as shown in FIG. 6LL, while swipes having speeds greater than the speed threshold are similarly detectable by the device 500 to change the active application back to application A 660 (e.g., a leftward swipe have speed S2).

In some embodiments, touch screen 504-2 can be switched from displaying local editing tools (e.g., tools for editing a localized portion of the content being edited) or global editing tools (e.g., tools for editing, as a whole) the content being edited). For example, in FIG. 6MM, device 500 is in the clamshell configuration, touch screen 504-1 is displaying the content being edited as a whole, and touch screen 504-2 is displaying detailed view 606 (corresponding to indicator 604 in the content on touch screen 504-1) and local editing tools for editing the portion of the content shown in detailed view 606 (e.g., drawing tools 612 and annotation tools 696). Touch screen 504-2 is also displaying a button 698 for switching between displaying local editing tools (as in FIG. 6MM) and global editing tools. In FIG. 6MM, device 500 detects selection of button 698 (e.g., via a tap of contact 603).

In response, device 500 ceases displaying the local editing tools on touch screen 504-2, and instead displays global editing tools on touch screen 504-2, as shown in FIG. 6NN. For example, device 500 displays layers tools 616, color tools 606 and brightness tools 696 for editing various global characteristics of the content being editing. Further, device 500 ceases displaying detailed view 606 and indicator 604 when it switches to displaying the global editing tools, as shown in FIG. 6NN. In this way, device 500 modifies the elements that it displays based on whether it is displaying local or global editing tools while in the clamshell configuration.

However, in some embodiments, when device 500 is put in the flattened configuration, it displays both local and global editing tools concurrently. For example, in FIG. 6OO, device 500 detects that it has been put in the flattened configuration. In response, device 500 displays both local and global editing tools on touch screen 504-2, and displays the content being edited on touch screen 504-1. In this configuration, a user is able to perform both local and global edits concurrently to the content.

In some embodiments, content editing tools extend from one touch screen of device 500 to another—thus, in such embodiments, the locations of those editing tools on one touch screen optionally depend on the locations of those editing tools/content on the other touch screen. For example, in FIG. 6PP, content 602 is displayed on touch screen 504-1. In the example of FIG. 6PP, a tool for rotating content 602 on touch screen 504-1 is also displayed, where the handle 680 of the rotate tool extends from touch screen 504-1 to touch screen 504-2 (e.g., handle 680 is optionally an element of the rotate tool that a user is able to drag right/left to rotate content counterclockwise/clockwise). Because the rotate tool extends from content 602, if content 602 were to be moved on touch screen 504-1, handle 680 on touch screen 504-2 would optionally also move accordingly. For example, in FIG. 6QQ, device 500 detects an upward-rightward dragging of content 602 (e.g., using contact 603) on touch screen 504-1. In response, device moves content 602 upward-rightward on touch screen 504-1, and the rotate tool, including handle 680 on touch screen 504-2, also moves upward-rightward in accordance with the user input, as shown in FIG. 6QQ.

Figure 7A:
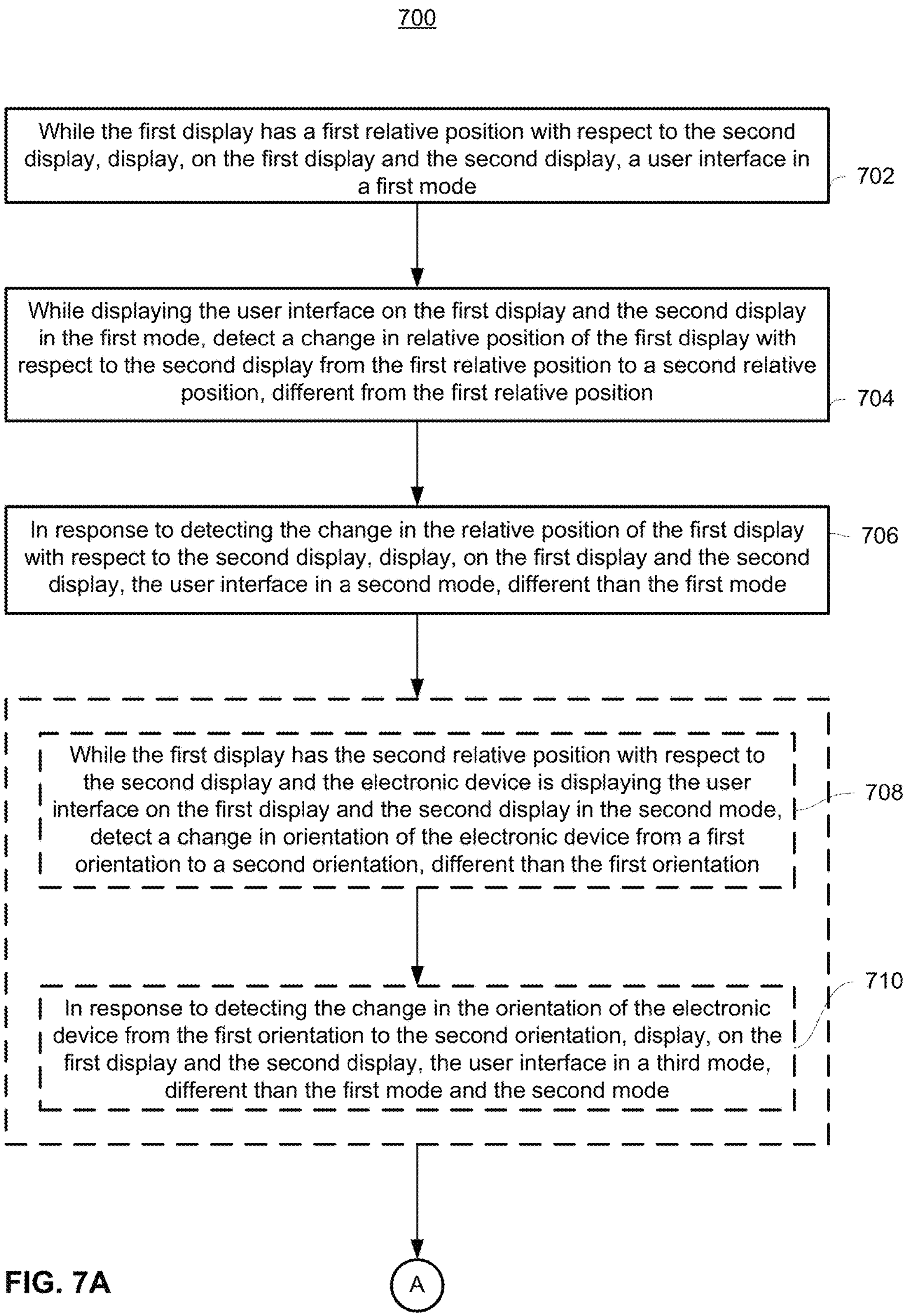
FIGS. 7A-7Q are flow diagrams illustrating a method of displaying and interacting with content on multiple displays on an electronic device in accordance with some embodiments of the disclosure.
Figure 7B:
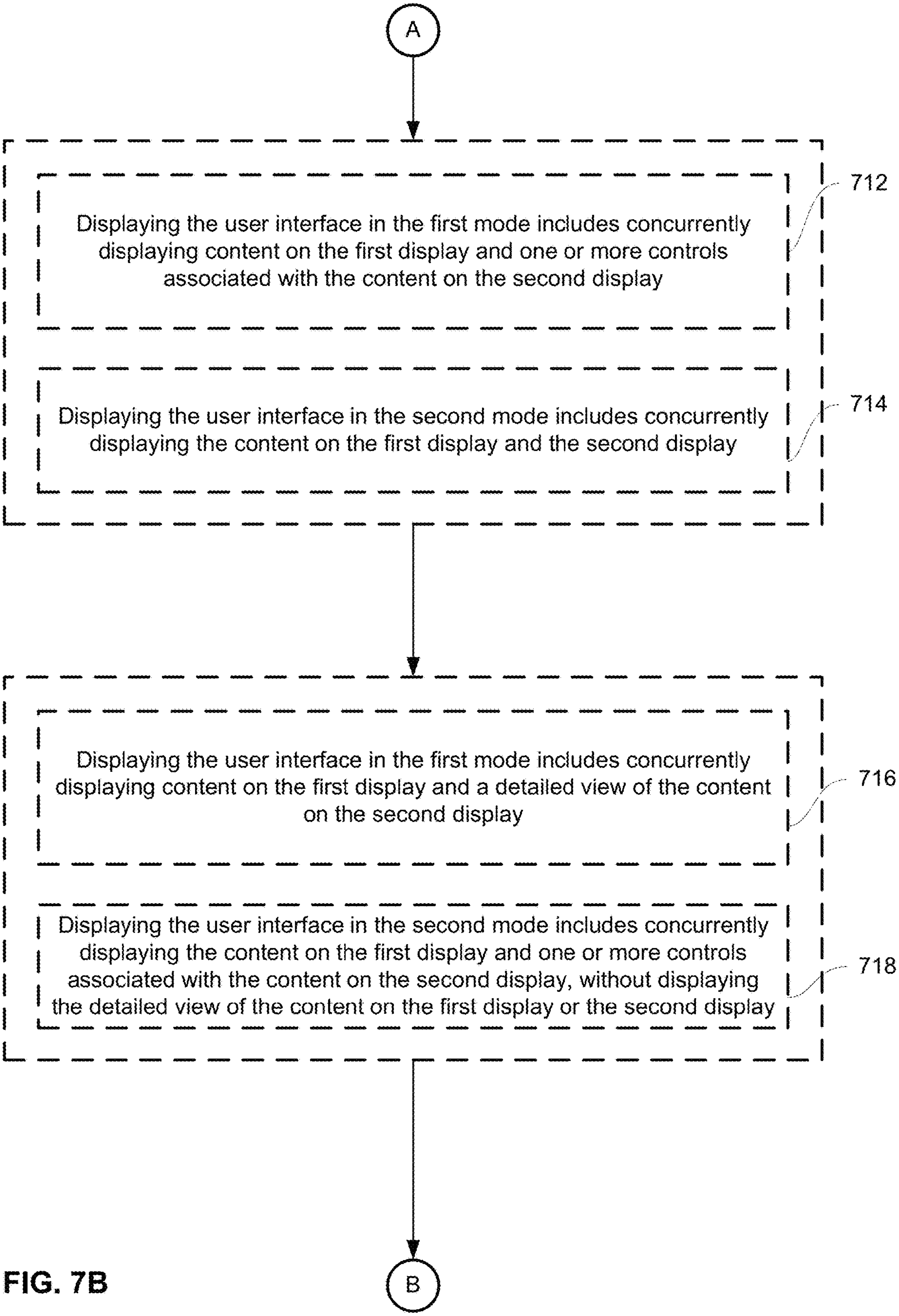
Figure 7C:
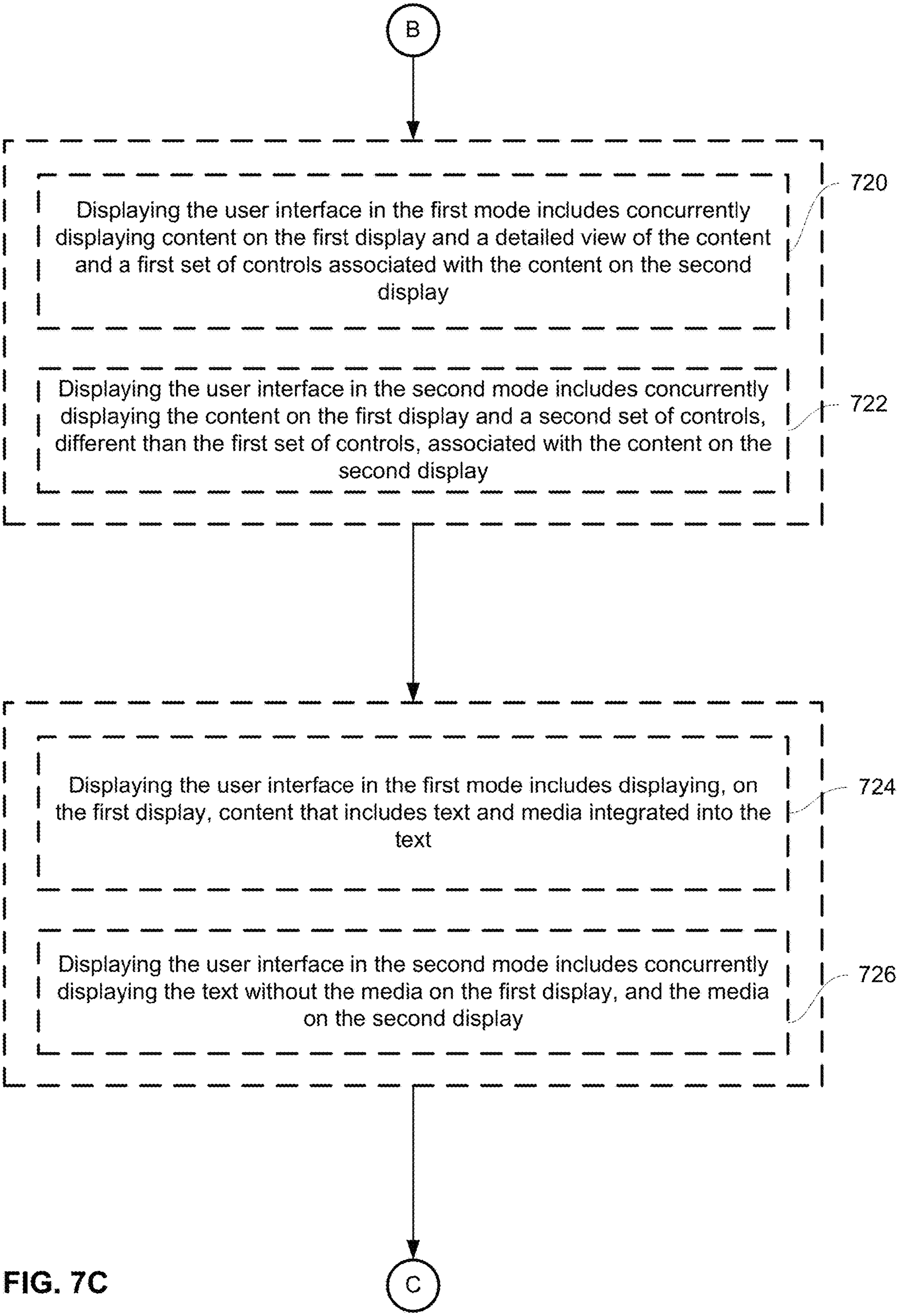
Figure 7D:
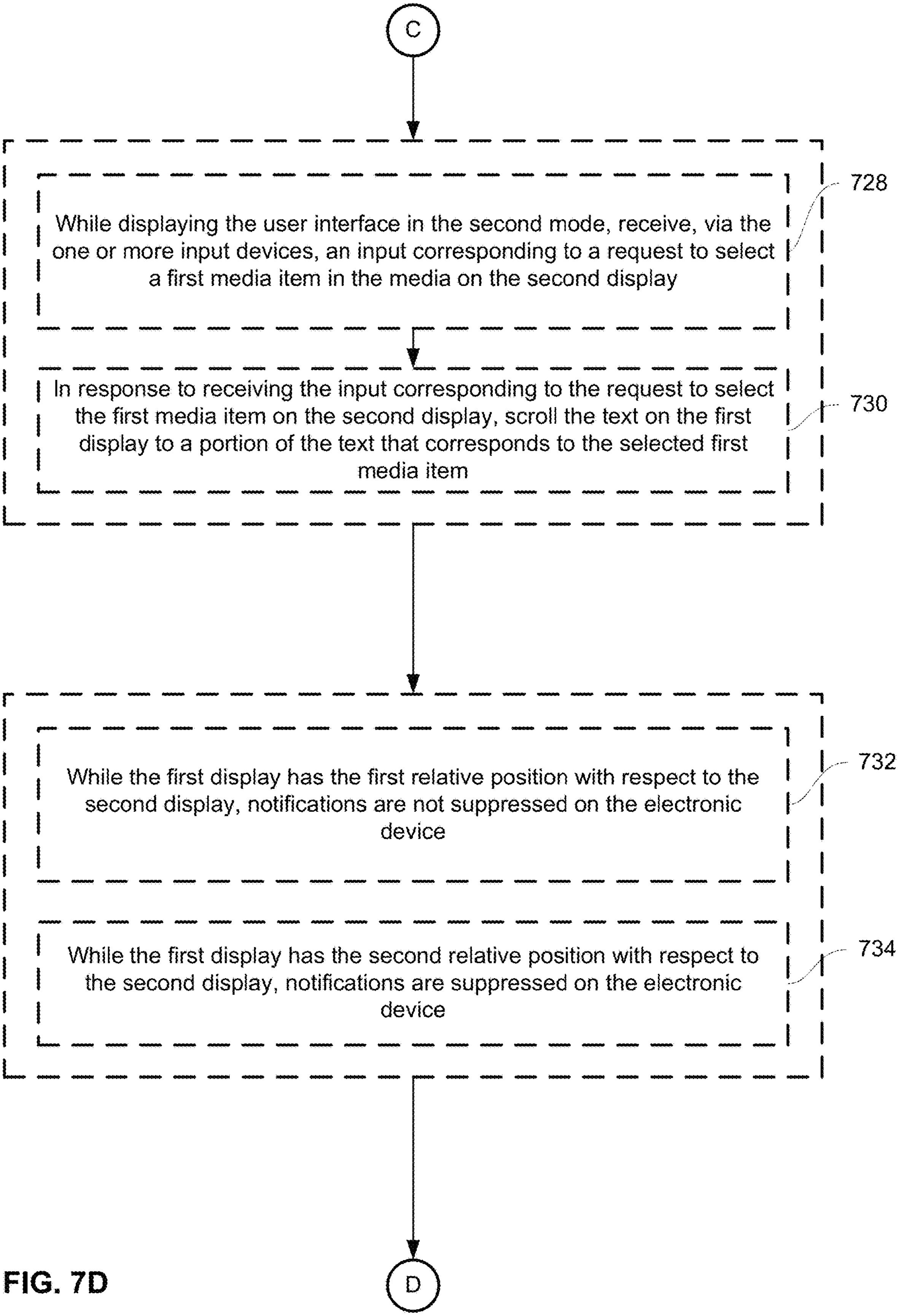
Figure 7E:
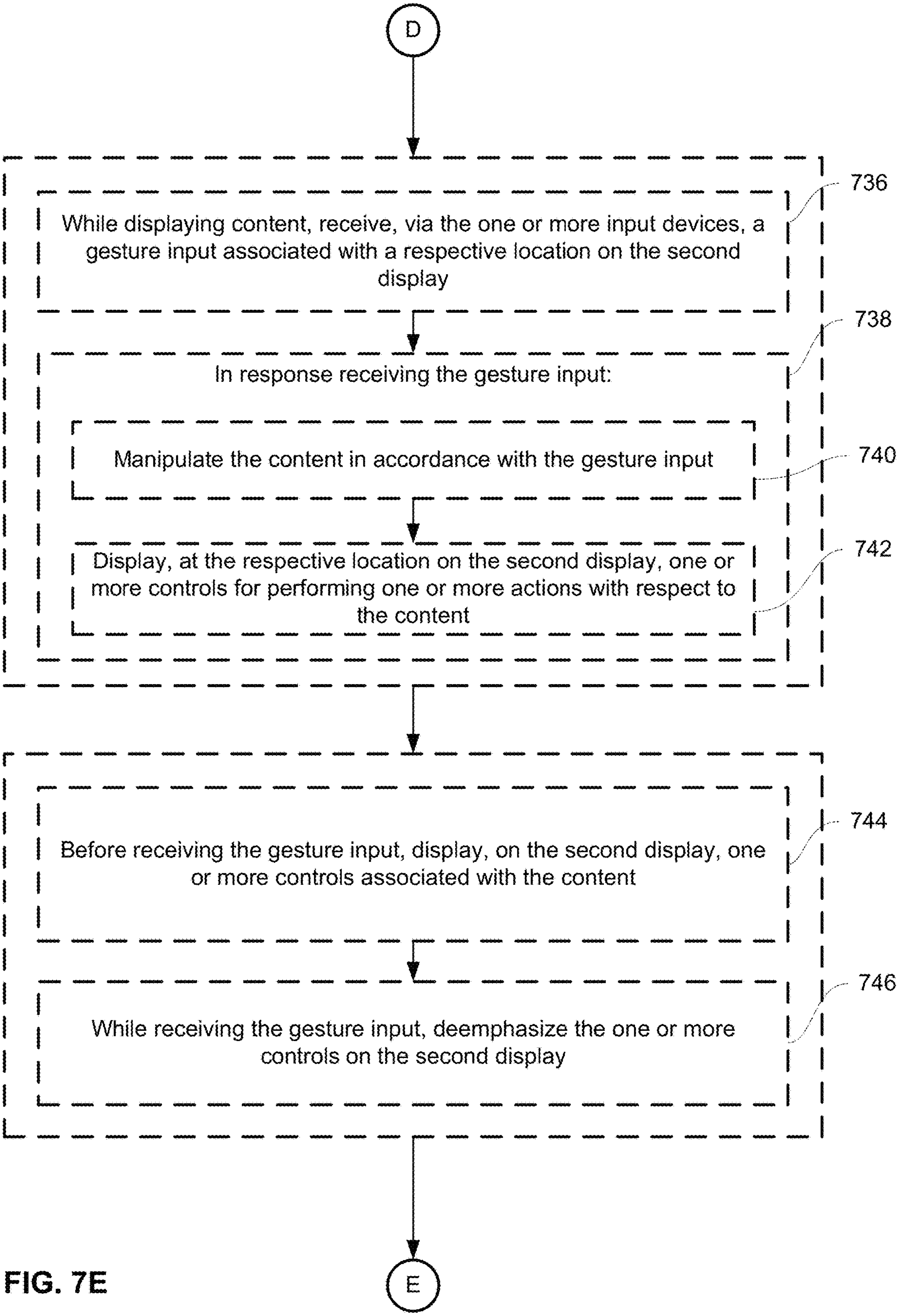
Figure 7F:
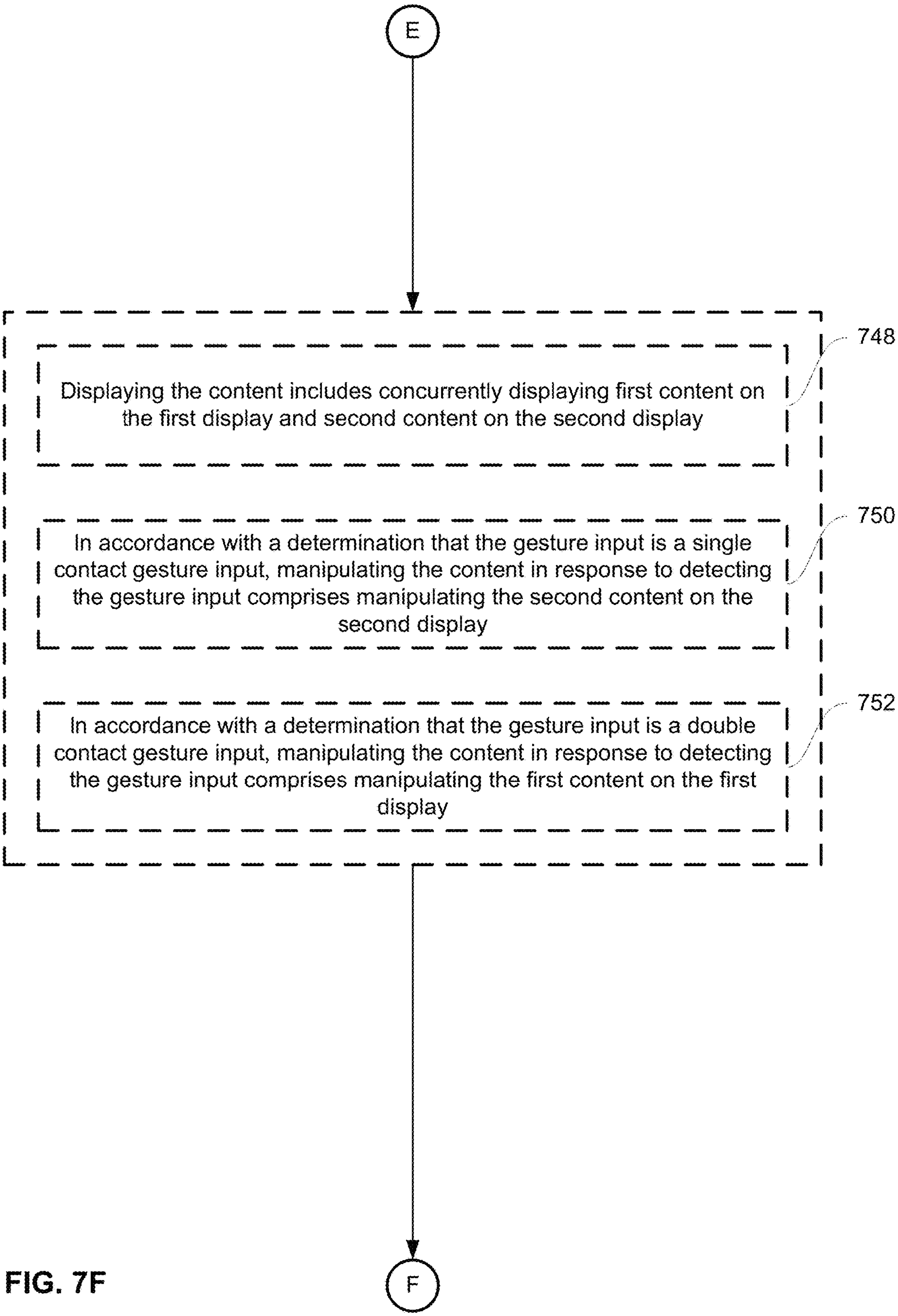
Figure 7G:
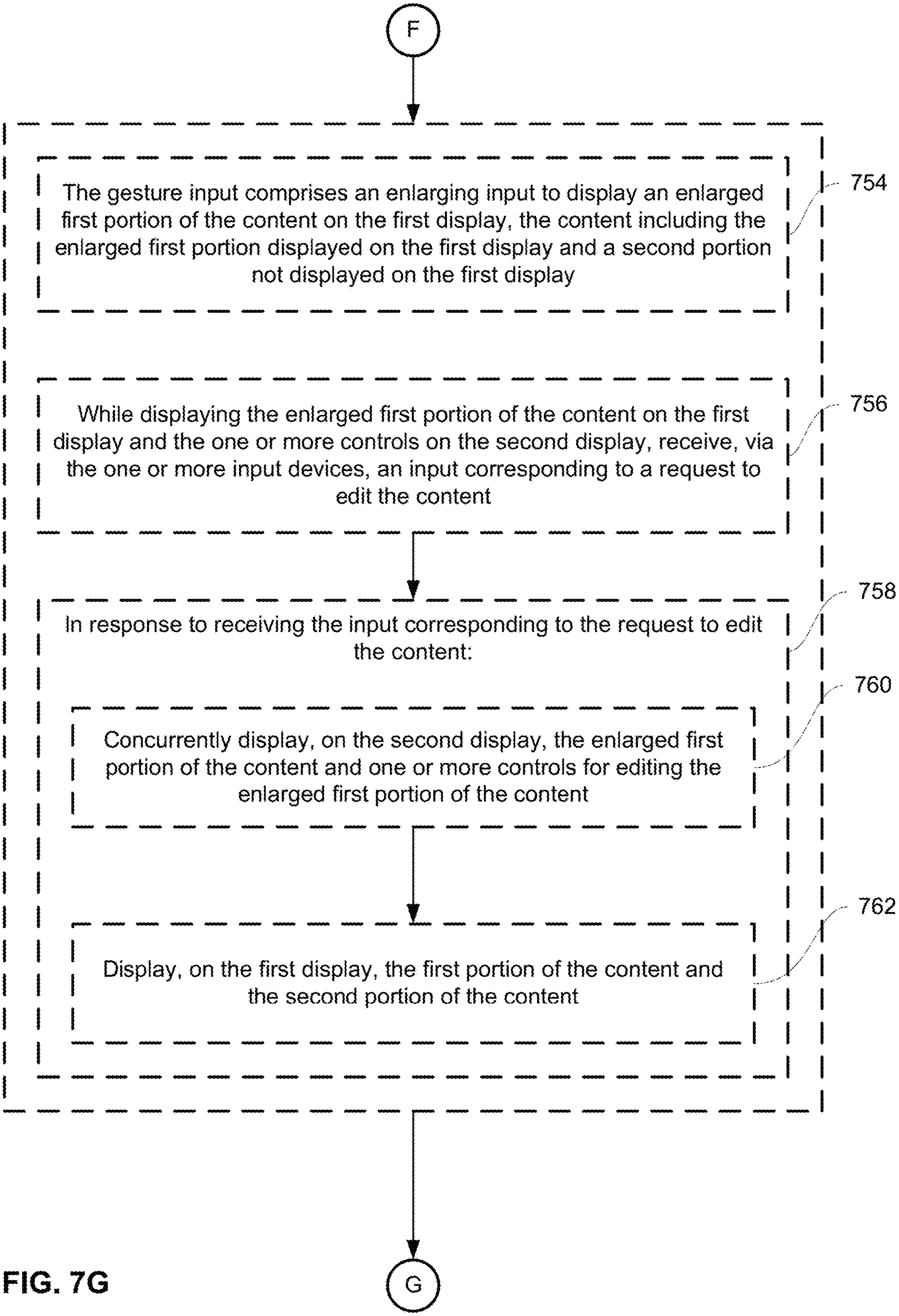
Figure 7H:
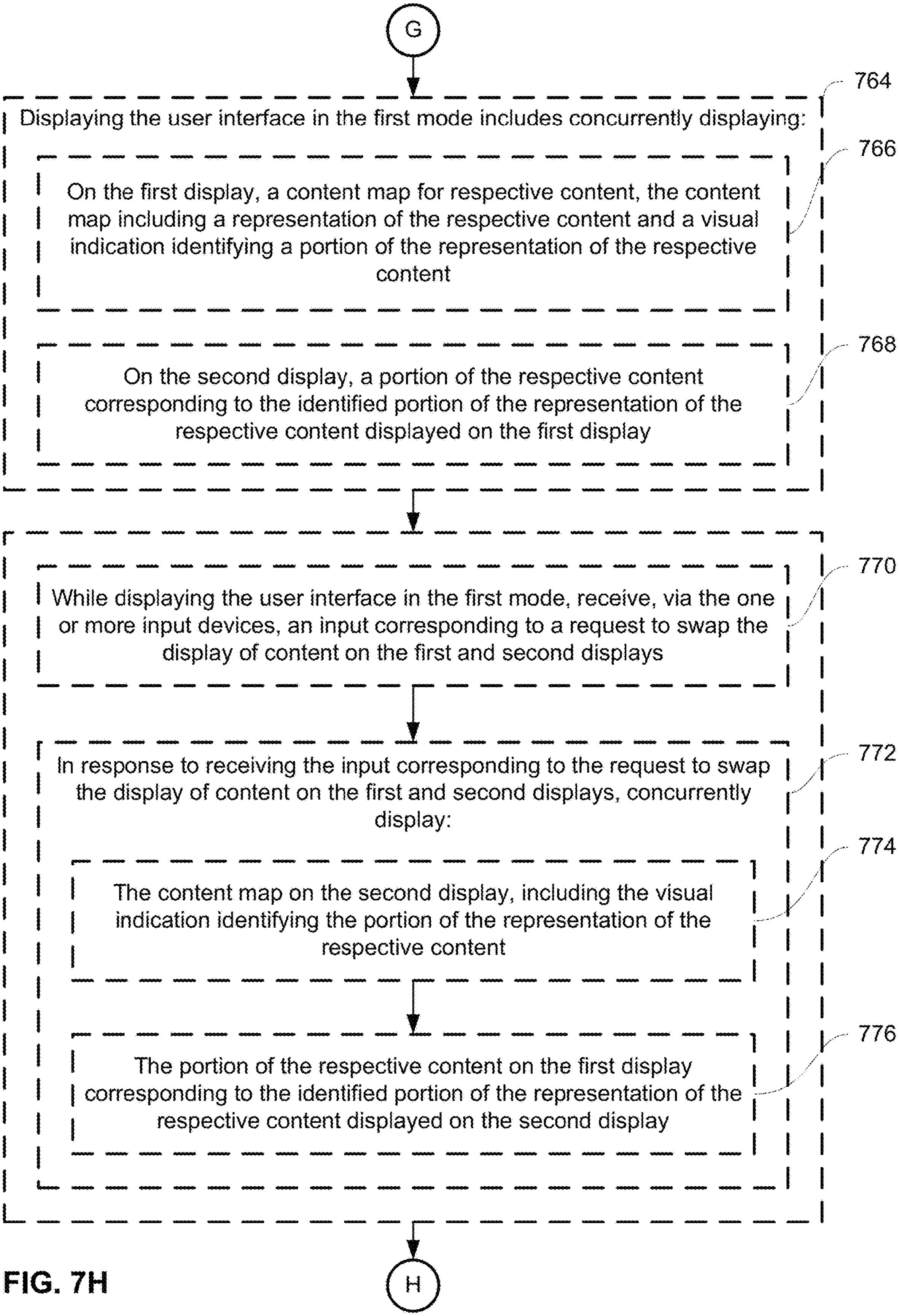
Figure 7I:
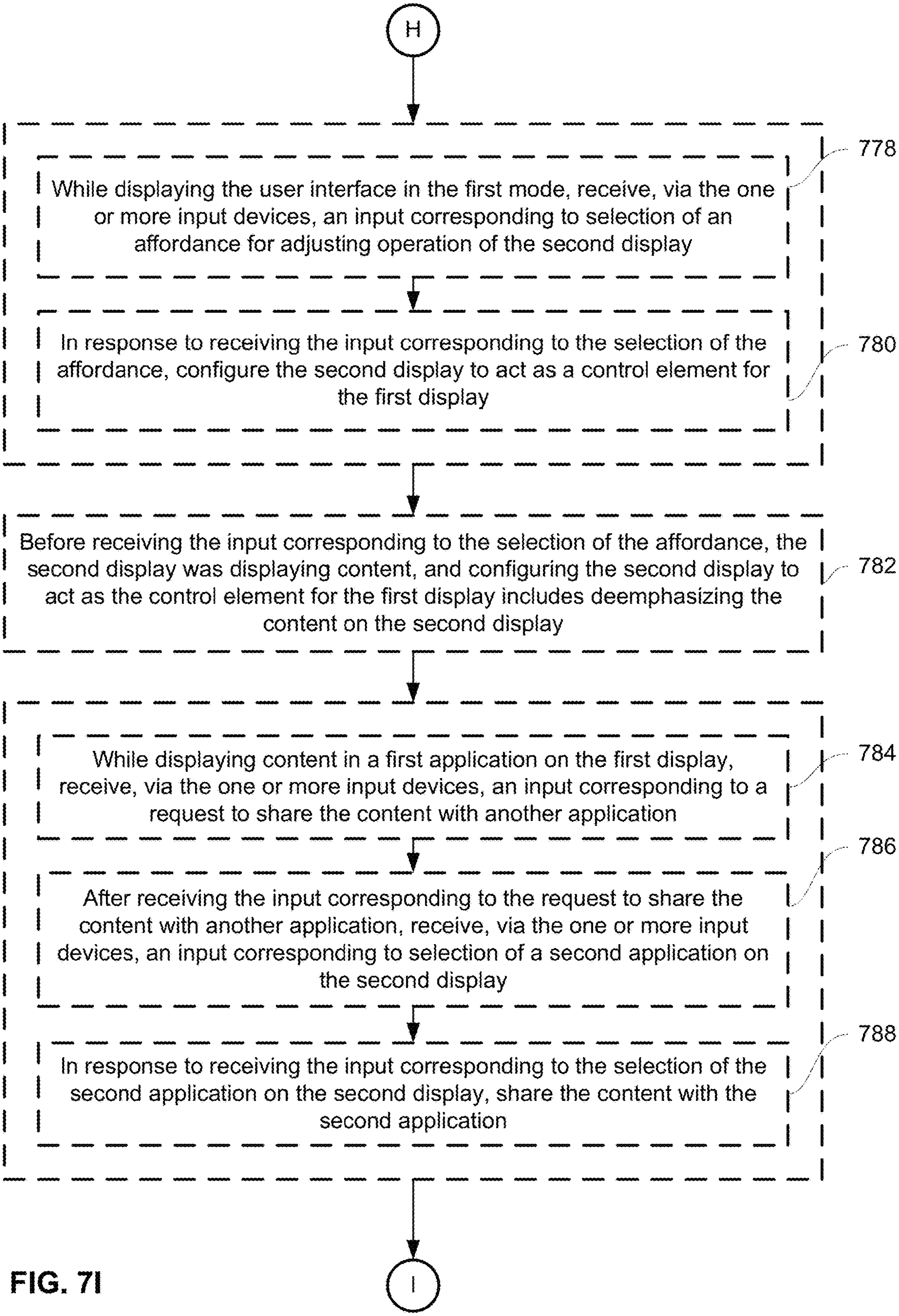
Figure 7J:
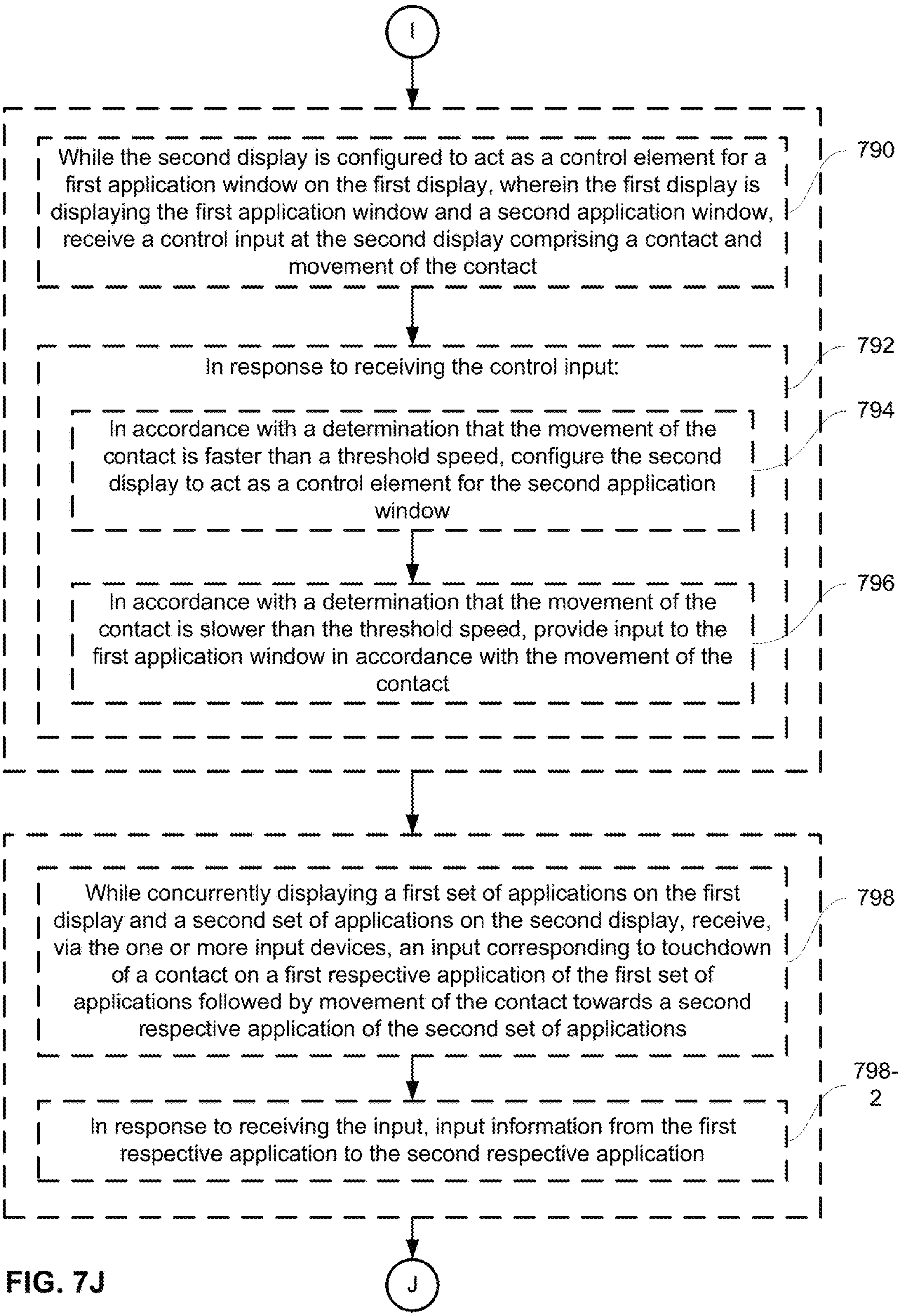
Figure 7K:
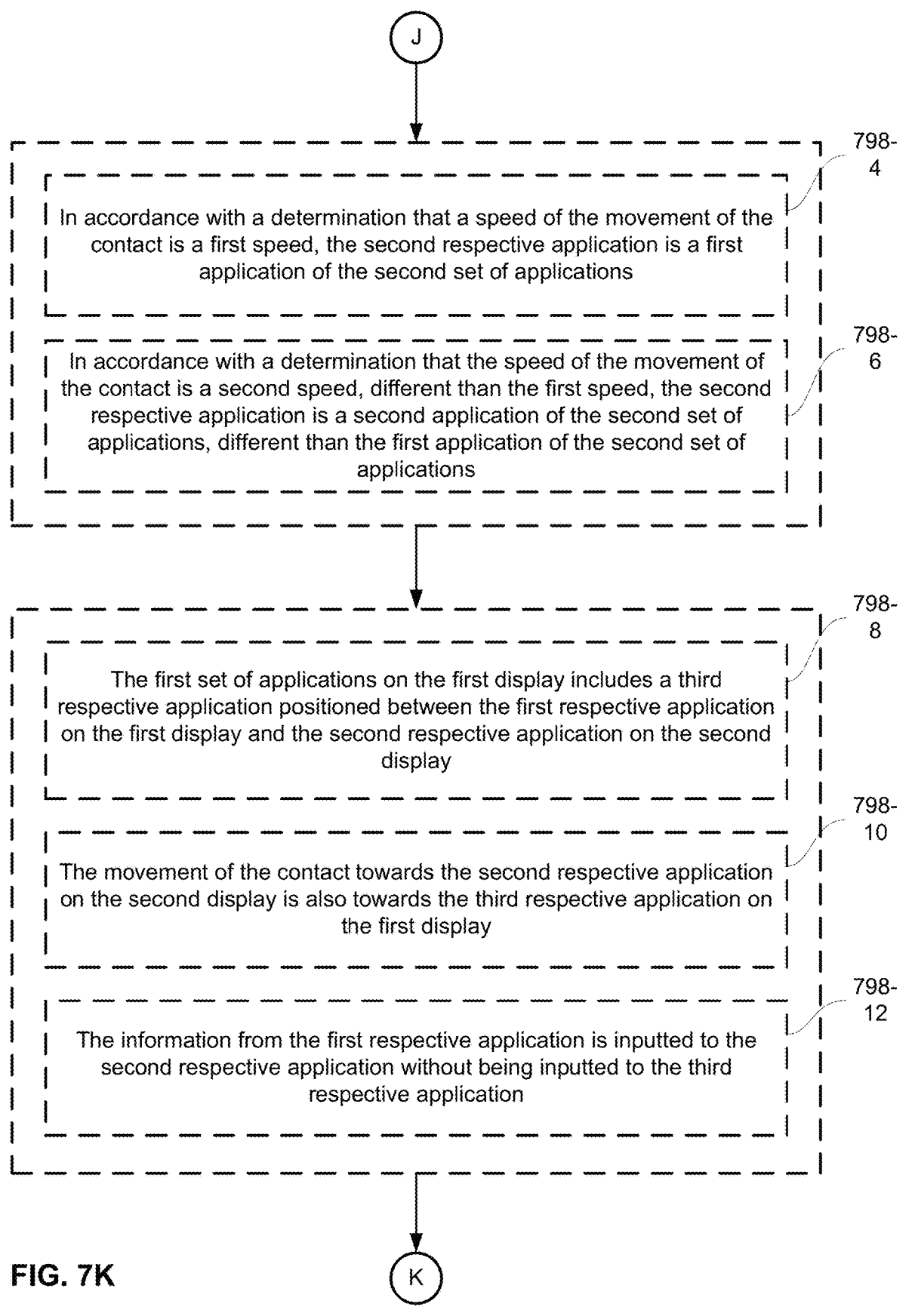
Figure 7L:
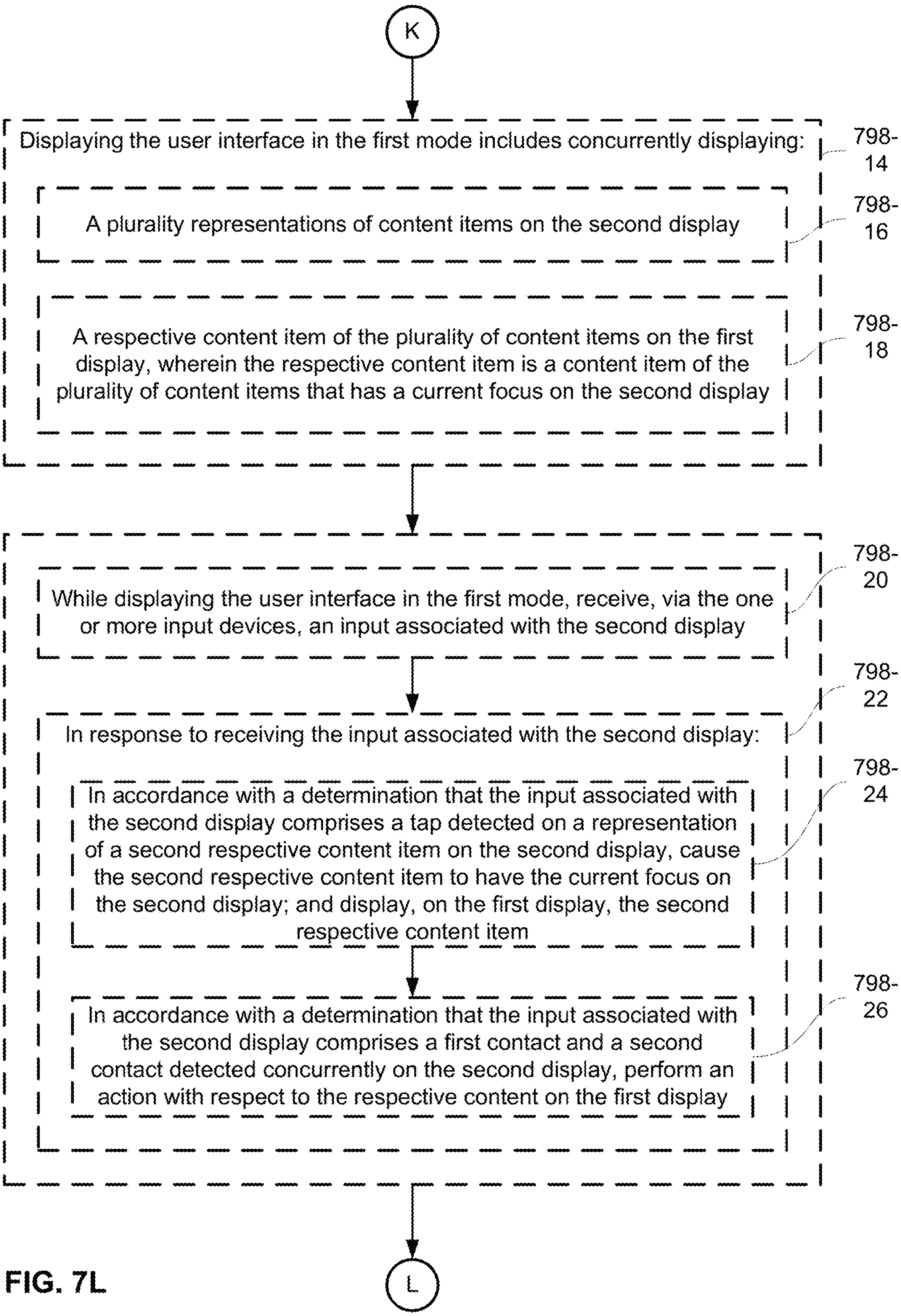
Figure 7M:
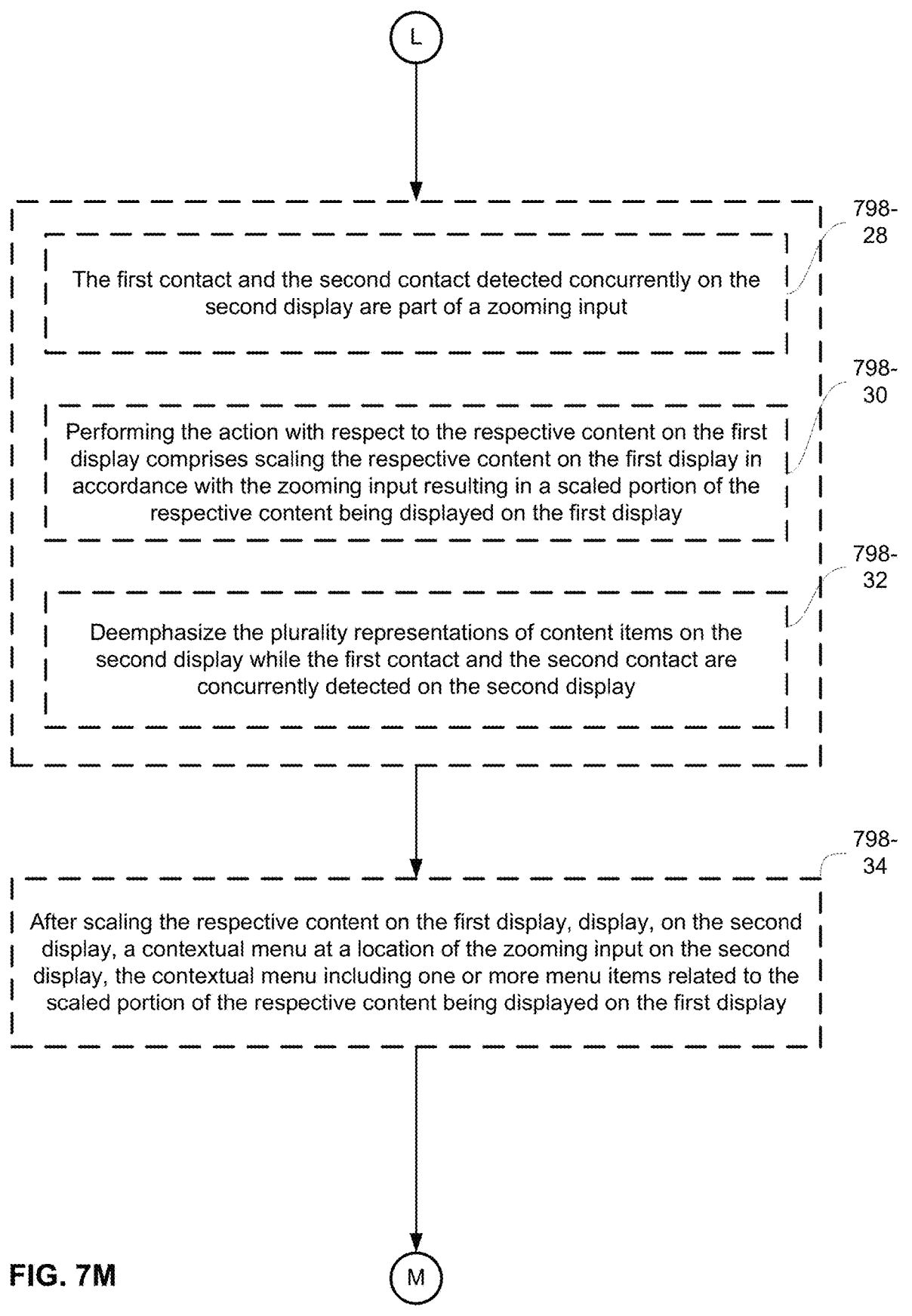
Figure 7N:
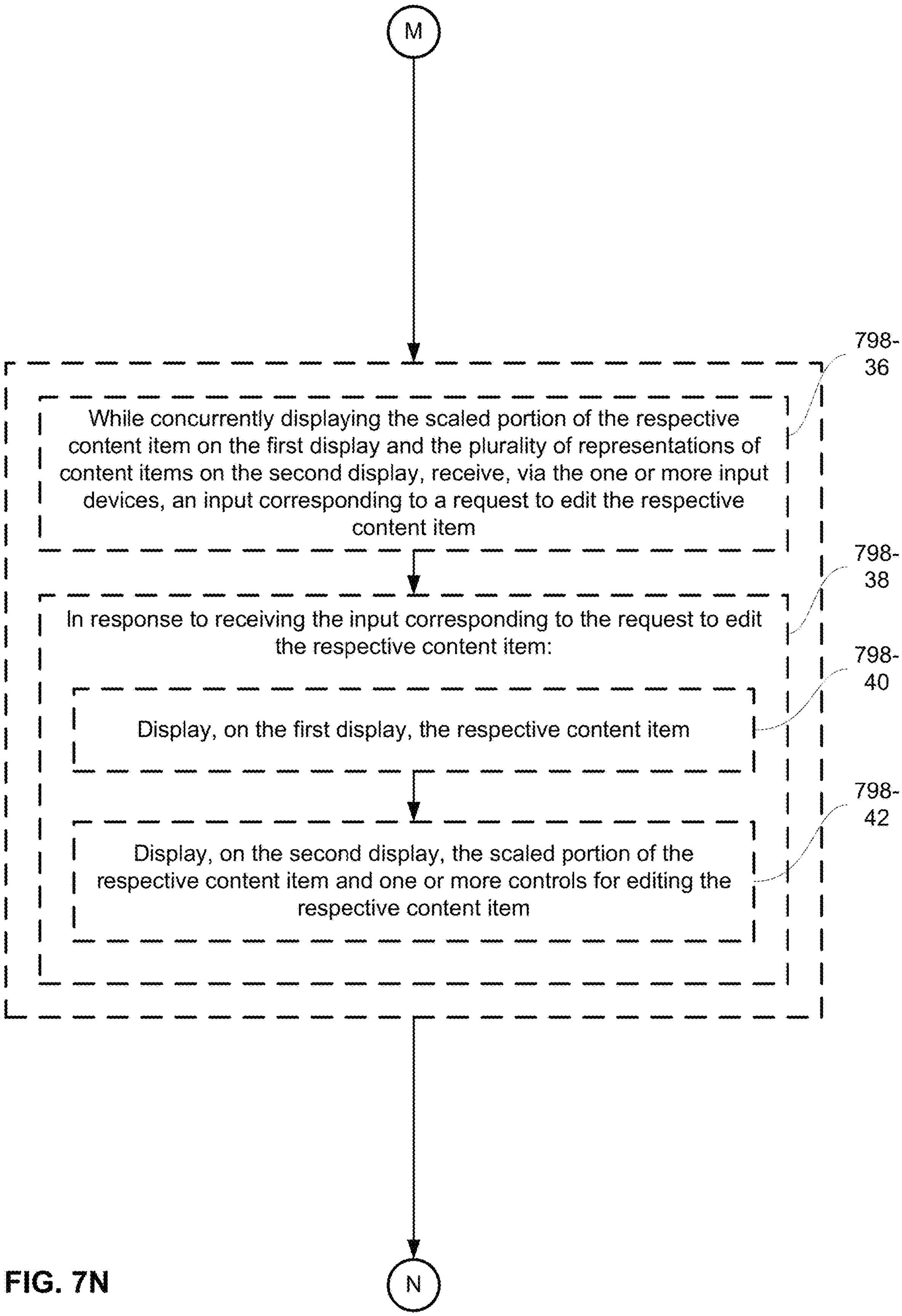
Figure 7O:
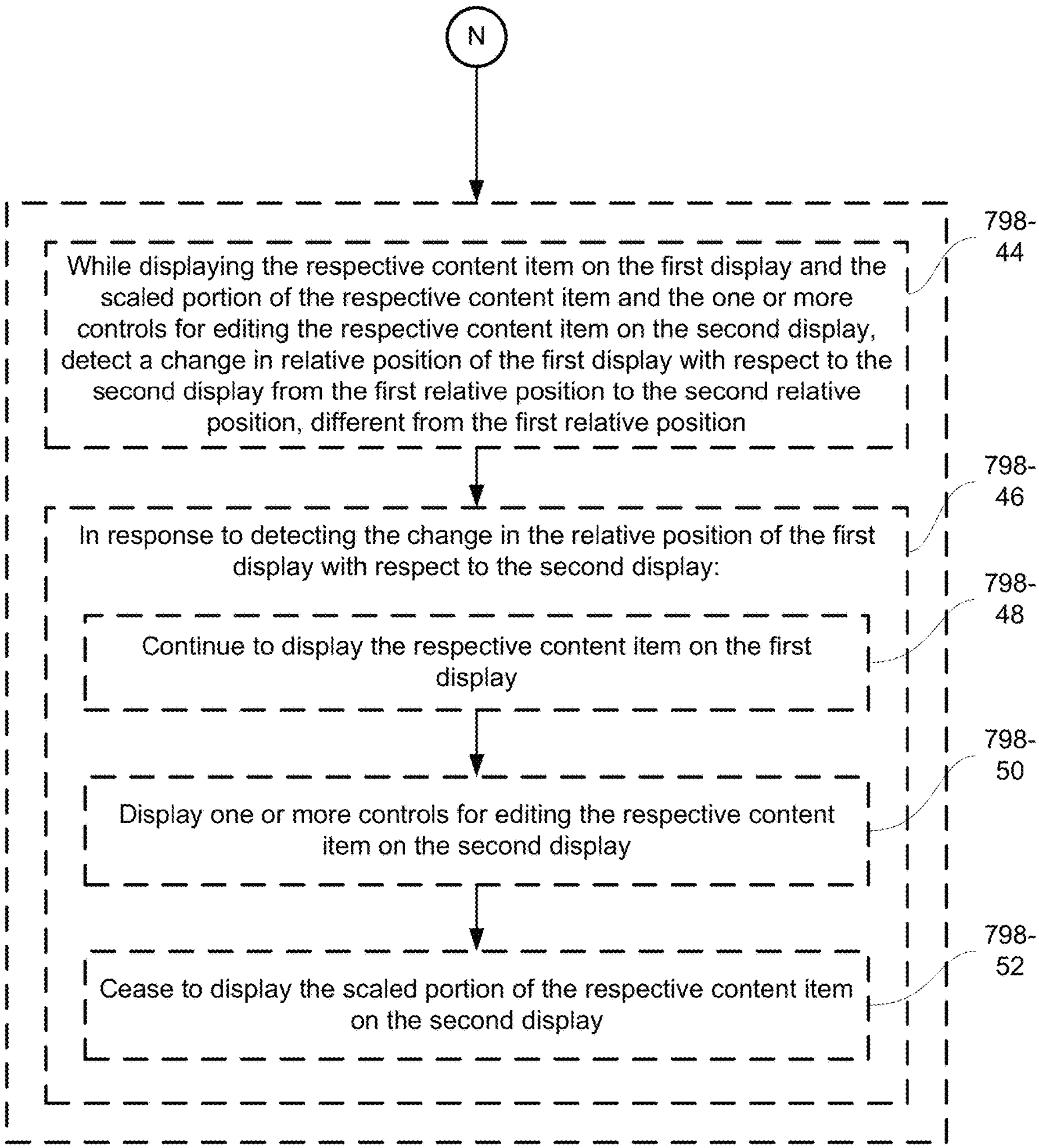
Figure 7P:
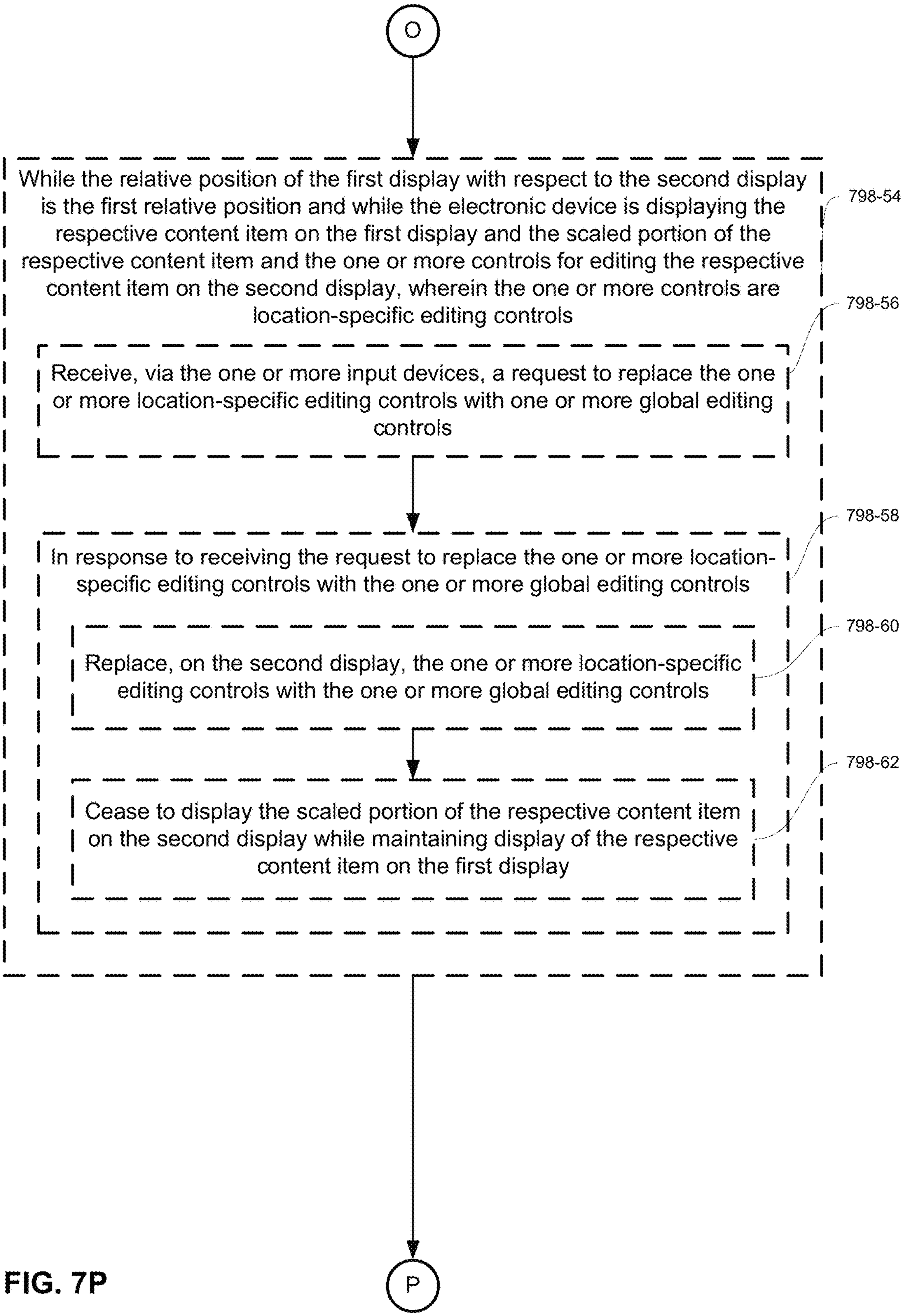
Figure 7Q:
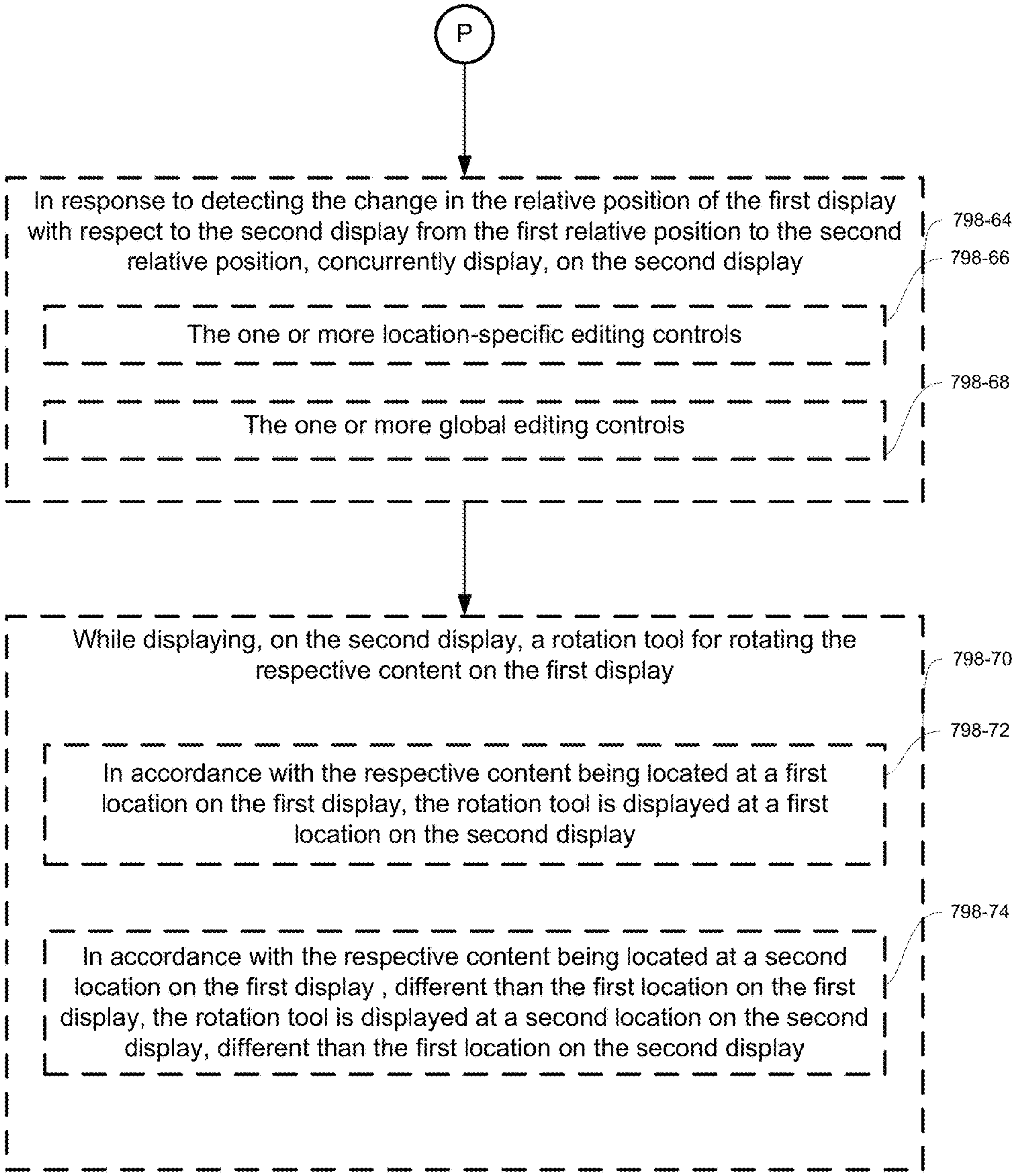

FIGS. 7A-7Q are flow diagrams illustrating a method 700 of displaying and interacting with content on multiple displays on an electronic device in accordance with some embodiments of the disclosure. The method 700 is optionally performed at an electronic device such as device 100, device 300 or device 500 as described above with reference to FIGS. 1A-1B, 2-3, 4A-4B and 5A-5H. Some operations in method 700 are, optionally, combined and/or the order of some operations is, optionally, changed.

As described below, the method 700 provides ways of displaying and interacting with content on multiple displays on an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device has a first display, a second display, and one or more input devices, such as in FIG. 6A (e.g., a phone, tablet computer, laptop, etc. including two touch screens or two displays, such as device 500). In some embodiments, the two displays (e.g., touch screens 504-1 and 504-2) of the device are rotatably coupled together, or coupled together via a hinge, such that the angle between the planes of the touch screens is manipulable by a user. For example, the two touch screens are optionally able to be laid flat such that the planes of the touch screens are on the same plane (e.g., a "spread open" configuration), or are optionally able to be angled with respect to each other from between 45 degrees to 135 degrees (e.g., a "clamshell" configuration) such that one of the touch screens is a bottom touch screen (e.g., to be placed on a surface during operation) and the other touch screen is a top touch screen (e.g., positioned off the surface during operation).

In some embodiments, while the first display has a first relative position (e.g., the angle of the first display with respect to the second display) with respect to the second display (e.g., in a clamshell configuration), the electronic device displays (702), on the first display and the second display, a user interface in a first mode, such as in FIGS. 6L-6P-2 (e.g., a user interface of an application running on the electronic device). For example, the application is optionally a photo editing application. The application is optionally also in a particular state of operation, such as in FIGS. 6L-6P-2 (e.g., in a state in which a particular photo is open or the focus of editing in the user interface, and the application is displaying the photo and one or more tools for editing the photo in the user interface). In the first mode of the user interface, the arrangement/existence/etc. of the elements displayed in the user interface is optionally an arrangement that is well-suited to clamshell operation, for example displaying the photo to be edited on the top touch screen and the one or more tools for editing the photo on the bottom touch screen, such as in FIG. 6L.

In some embodiments, while displaying the user interface on the first display and the second display in the first mode, the electronic device detects (704) a change in relative position of the first display with respect to the second display from the first relative position to a second relative position, different from the first relative position, such as in FIGS. 6Q, 6S, 6U and 6X (e.g., detecting, using one or more angle sensors for detecting the angle between the touch screens, that the touch screens have been moved from the clamshell configuration to the spread out configuration). In response to detecting the change in the relative position of the first display with respect to the second display, the electronic device optionally displays (706), on the first display and the second display, the user interface in a second mode, different than the first mode, such as in FIGS. 6Q, 6S, 6U and 6X (e.g., changing the arrangement/existence/etc. of the elements displayed in the user interface to be well-suited to spread out operation, for example displaying the photo to be edited and tools for editing the photo on the same touch screen, and additional tools for editing the photo on the other touch screen). The above-described manner of automatically switching modes of a user interface displayed on two displays depending on the relative orientation or position of those two displays allows the electronic device to optimize the displayed user interface for the display positioning that is currently in effect, which simplifies interactions between the user and the device and enhances the operability of the device and makes the user-device interface more efficient (e.g., by displaying user interfaces for the different display positions that display more information with fewer inputs or allow for performance of actions with fewer inputs), which, additionally, reduces power usage and improves battery life of the device by enabling the user to use the device more quickly and efficiently.

In some embodiments, while the first display has the second relative position with respect to the second display (e.g., the spread out configuration) and the electronic device is displaying the user interface on the first display and the second display in the second mode, the electronic device detects (708) a change in orientation of the electronic device from a first orientation (e.g., a portrait orientation, where the elements displayed in the user interface are arranged for viewing left-to-right along the short dimension of the electronic device) to a second orientation, different than the first orientation, such as in FIGS. 6U-6V (e.g., a landscape orientation, where the elements displayed in the user interface are arranged for viewing left-to-right along the long dimension of the electronic device). In response to detecting the change in the orientation of the electronic device from the first orientation to the second orientation, the electronic device optionally displays (710), on the first display and the second display, the user interface in a third mode, different than the first mode and the second mode, such as in FIGS. 6U-6V (e.g., changing the arrangement/existence/etc. of the elements displayed in the user interface to be well-suited to landscape spread-out orientation, as opposed to being well-suited to portrait spread-out orientation, which they were previously). The above-described manner of automatically switching modes of a user interface displayed on two displays depending on the orientation of the electronic device allows the electronic device to optimize the displayed user interface for the device orientation that is currently in effect, which simplifies interactions between the user and the device and enhances the operability of the device and makes the user-device interface more efficient (e.g., by displaying user interfaces for the different device orientations that display more information with fewer inputs or allow for performance of actions with fewer inputs), which, additionally, reduces power usage and improves battery life of the device by enabling the user to use the device more quickly and efficiently.

In some embodiments, displaying the user interface in the first mode (e.g., while the electronic device is in the clamshell configuration) includes concurrently displaying content on the first display and one or more controls (e.g., controls for editing the content) associated with the content on the second display (712), such as in FIG. 6R (e.g., in the clamshell configuration, the electronic device displays the content on the top display and controls for editing the content on the bottom display), and displaying the user interface in the second mode (e.g., while the electronic device is in the spread-out configuration) includes concurrently displaying the content on the first display and the second display (714), such as in FIG. 6S (e.g., in the spread-out configuration, the electronic device displays the content on both displays (e.g., a full view of the content on the first display, and a zoomed-in portion of the content on the second display)). In some embodiments, the electronic device also displays controls for editing the content on the first and/or second displays in the second mode. The above-described manner of displaying content in the top display in the clamshell configuration and on both the top and bottom displays in the spread-out configuration allows the electronic device to optimize the displayed content for the display positioning that is currently in effect, which simplifies interactions between the user and the device and enhances the operability of the device and makes the user-device interface more efficient (e.g., by displaying like-content on like-displays—when both displays are flat in the spread-out configuration, both displays display content), which, additionally, reduces power usage and improves battery life of the device by enabling the user to use the device more quickly and efficiently.

In some embodiments, displaying the user interface in the first mode (e.g., while the electronic device is in the clamshell configuration) includes concurrently displaying content on the first display and a detailed view of the content on the second display (716), such as in FIG. 6P-1 (e.g., a full view of the content on the top display, and a zoomed-in portion of the content on the bottom display, the zoomed-in portion being a portion that is specifically being edited on the electronic device), and displaying the user interface in the second mode (e.g., while the electronic device is in the spread-out configuration) includes concurrently displaying the content on the first display and one or more controls associated with the content on the second display, without displaying the detailed view of the content on the first display or the second display (718), such as in FIG. 6Q (e.g., a full view of the content on the first display, and controls for editing the entirety of the content on the second display). The above-described manner of not displaying the detailed view of the content in the spread-out configuration allows the electronic device to optimize the displayed content for the spread-out configuration, which simplifies interactions between the user and the device and enhances the operability of the device and makes the user-device interface more efficient (e.g., by providing consistent display of content, without some content being of a different type (e.g., detail view) than another), which, additionally, reduces power usage and improves battery life of the device by enabling the user to use the device more quickly and efficiently.

In some embodiments, displaying the user interface in the first mode (e.g., while the electronic device is in the clamshell configuration) includes concurrently displaying content on the first display and a detailed view of the content and a first set of controls associated with the content on the second display (720), such as in FIG. 6T (e.g., a full view of the content on the top display, and a zoomed-in portion of the content and controls for editing the content on the bottom display, the zoomed-in portion being a portion that is specifically being edited on the electronic device), and displaying the user interface in the second mode (e.g., while the electronic device is in the spread-out configuration) includes concurrently displaying the content on the first display and a second set of controls, different than the first set of controls, associated with the content on the second display (722), such as in FIG. 6U (e.g., a full view of the content on the first display, and expanded controls for editing the content on the second display, expanded compared to the first set of controls that were displayed on the second display in the first mode). In some embodiments, in the second mode, the electronic device ceases to display the detailed view of the content on the second display. The above-described manner of displaying a different set of controls in the spread-out configuration allows the electronic device to present the user with, for example, more controls that the user is able to utilize in the spread-out configuration, which simplifies interactions between the user and the device and enhances the operability of the device and makes the user-device interface more efficient (e.g., by only showing more controls once the user has indicated such an interest by manipulating the electronic device into the spread-out configuration), which, additionally, reduces power usage and improves battery life of the device by enabling the user to use the device more quickly and efficiently.

Figure 6W:
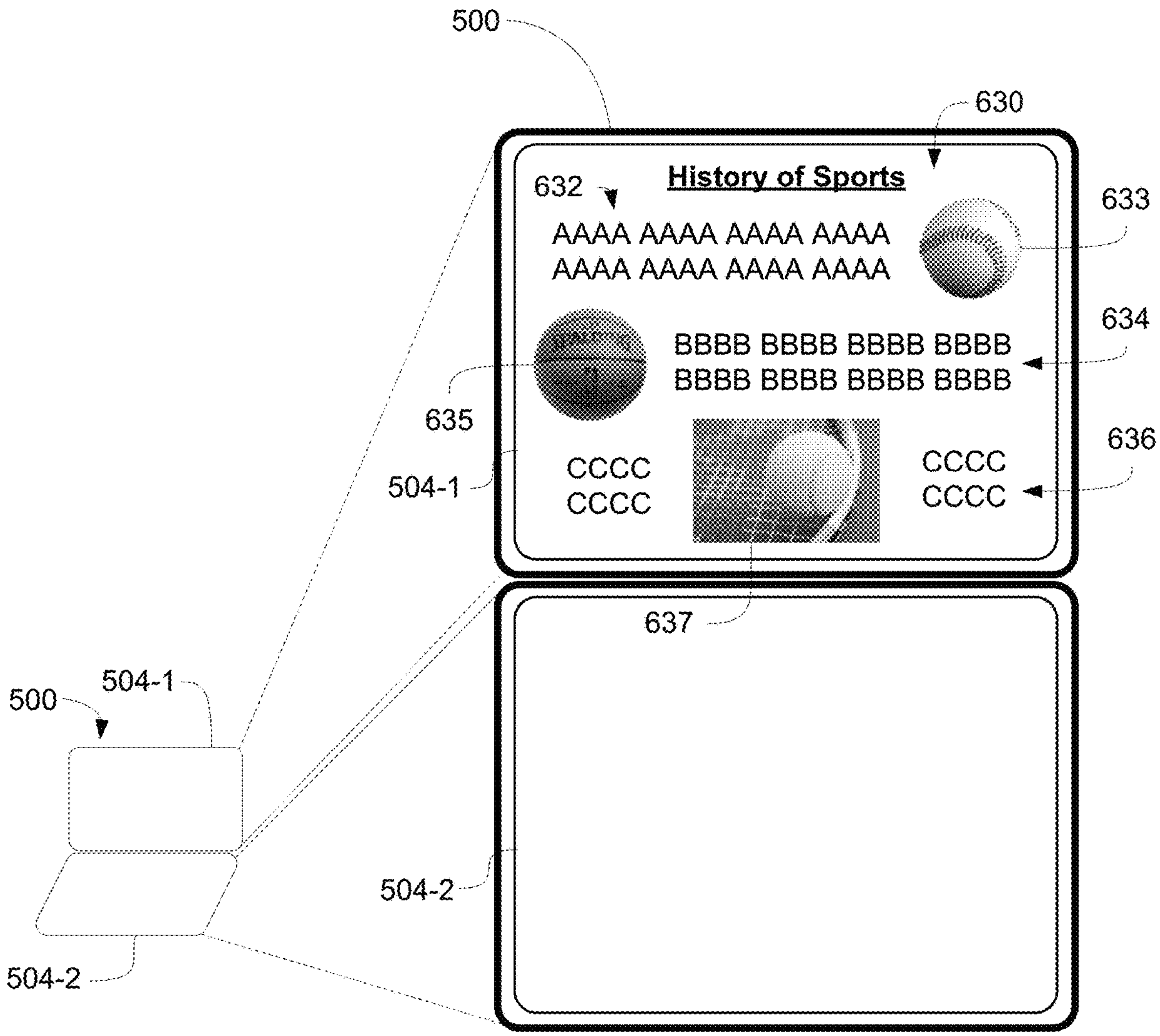
Figure 6X:
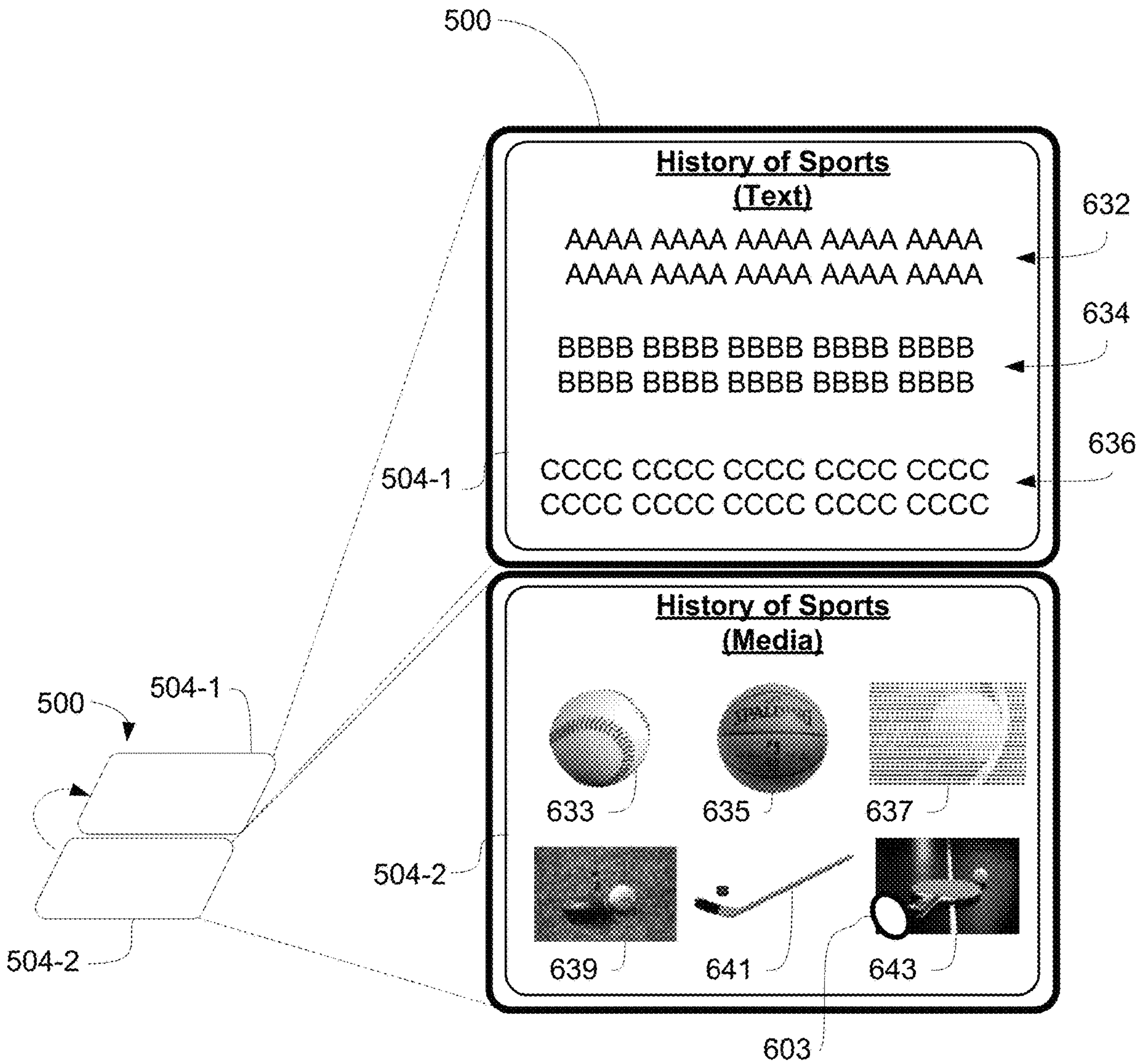
Figure 6Y:
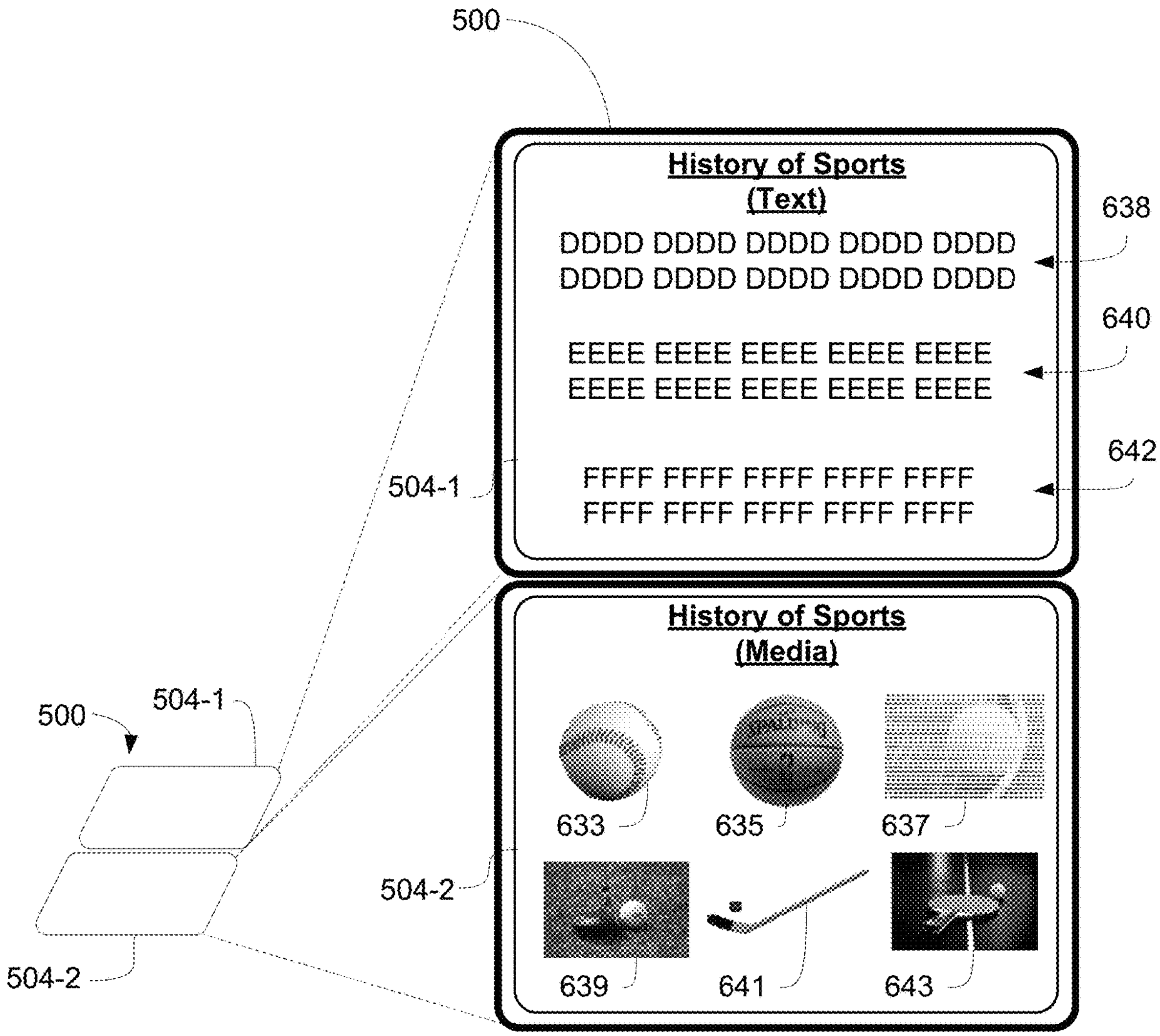
Figure 6Z:
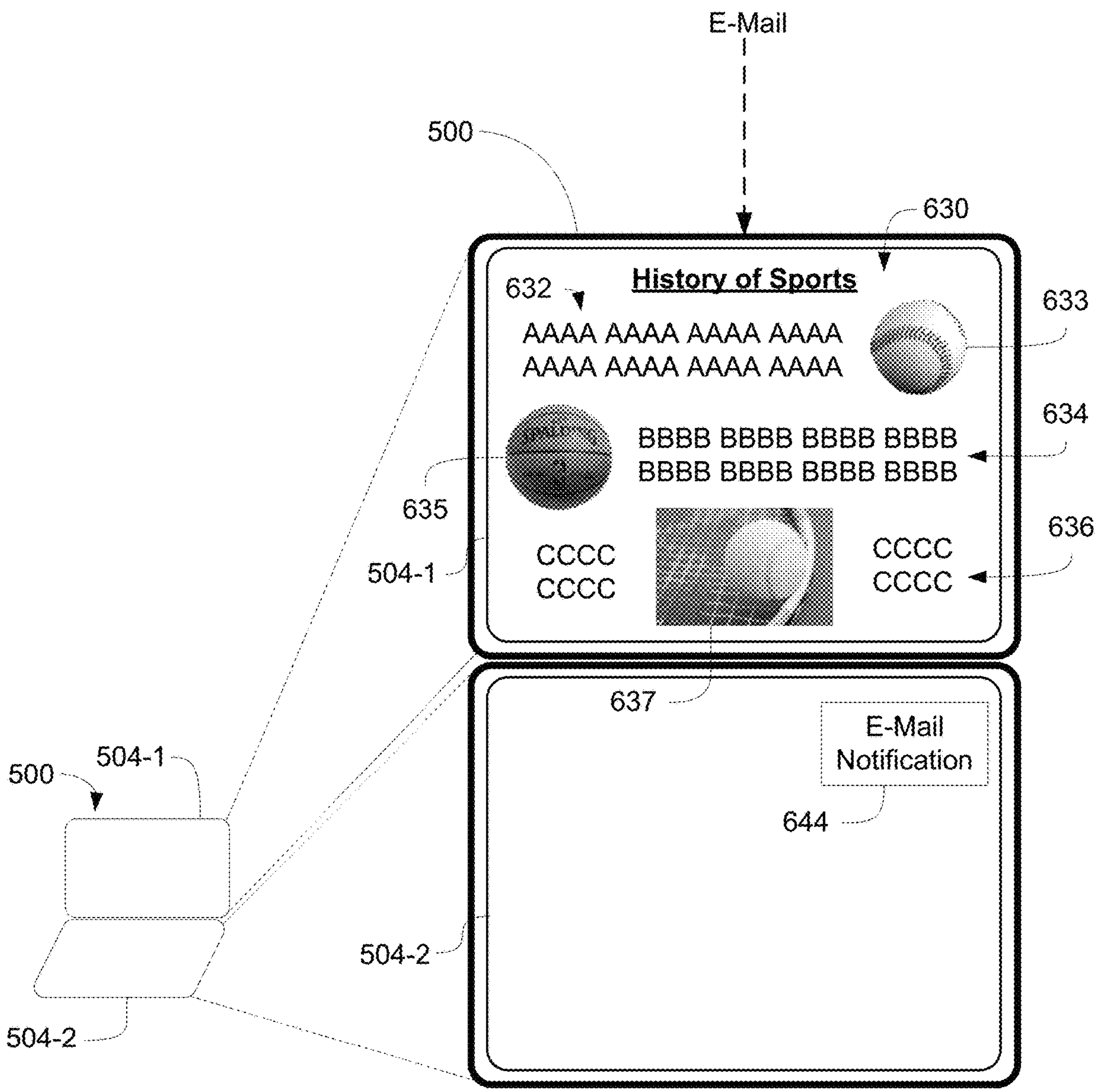
Figure 6A:
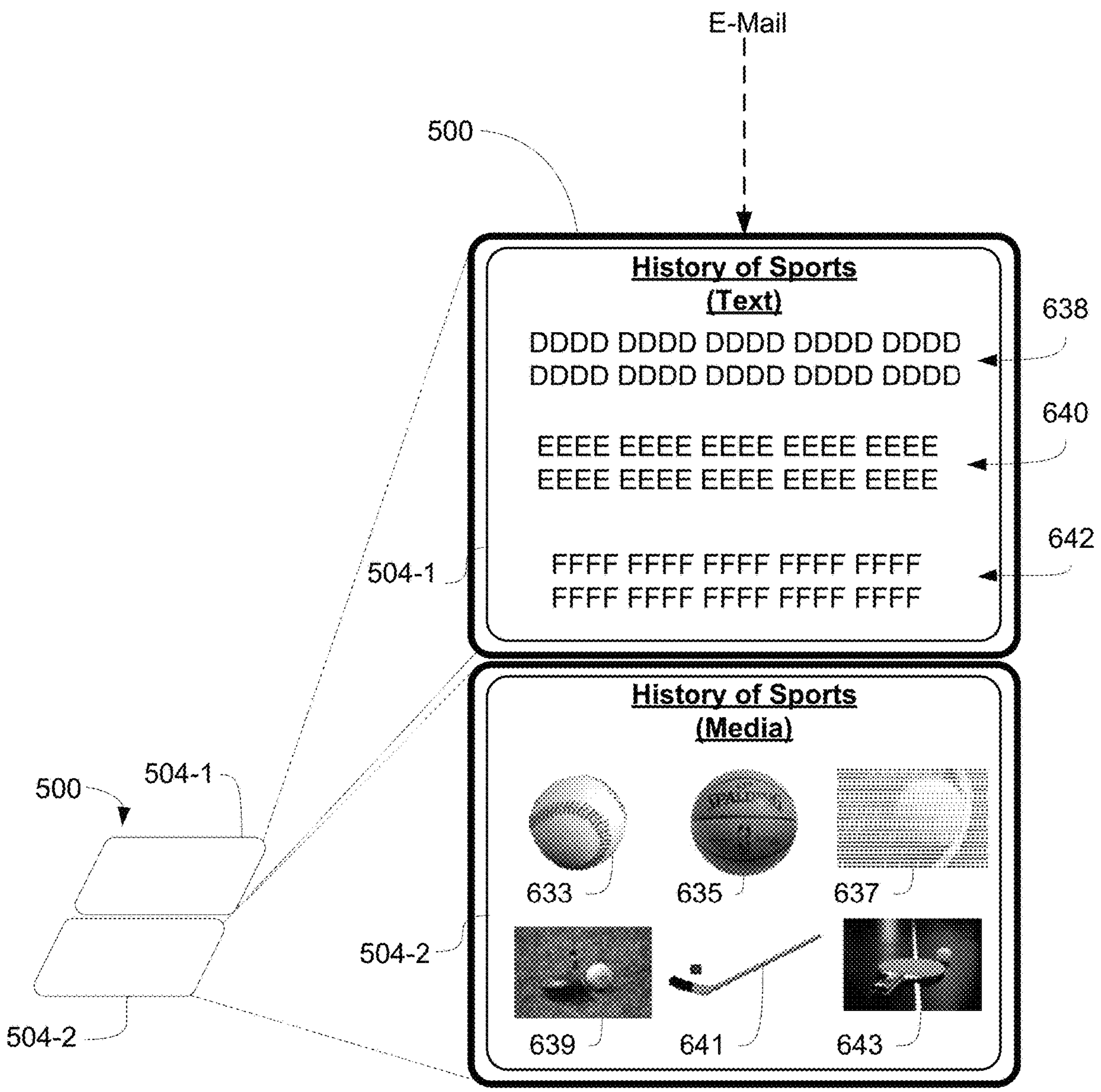
Figure 6B:
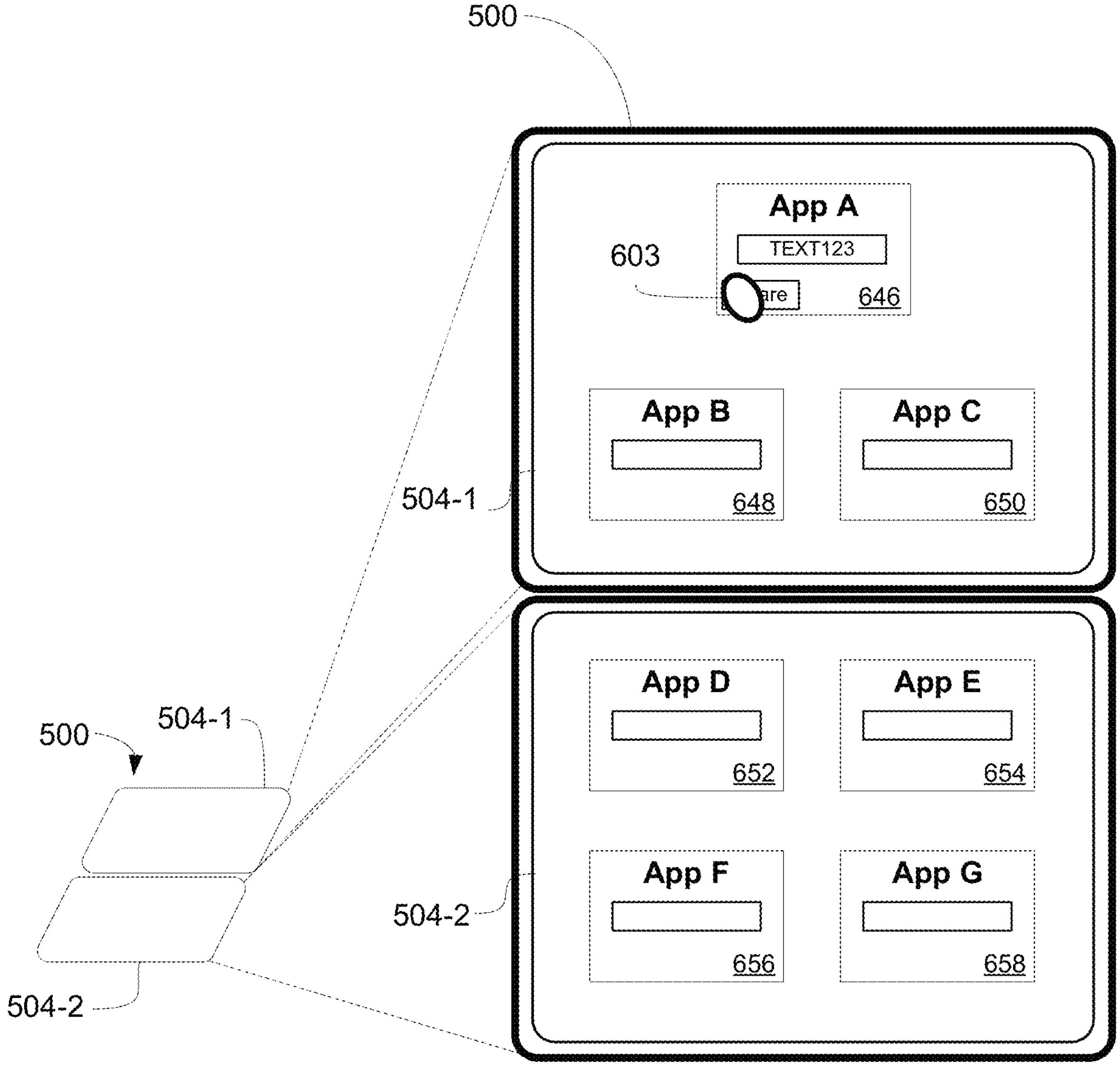
Figure 6C:
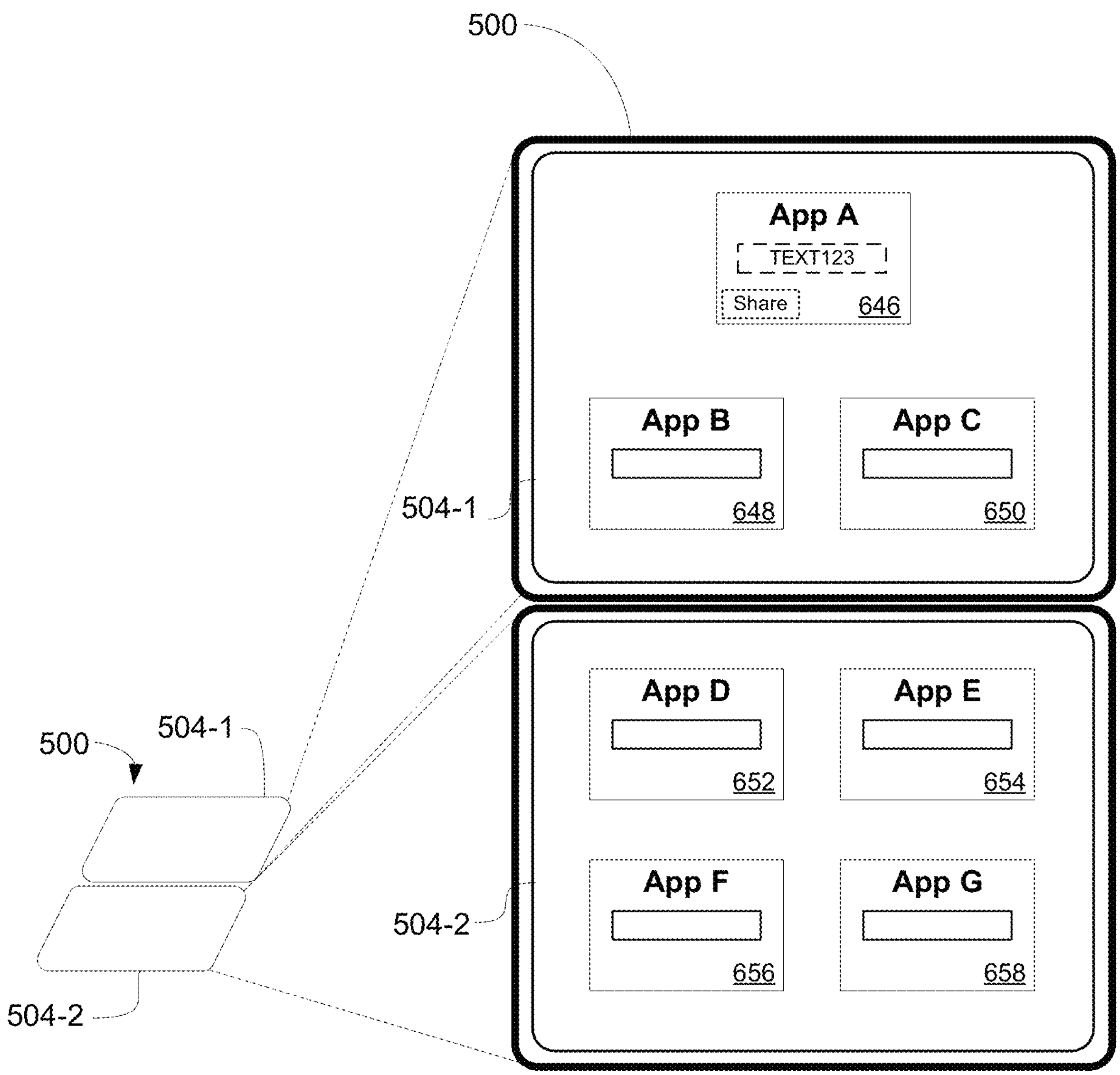
Figure 6D:
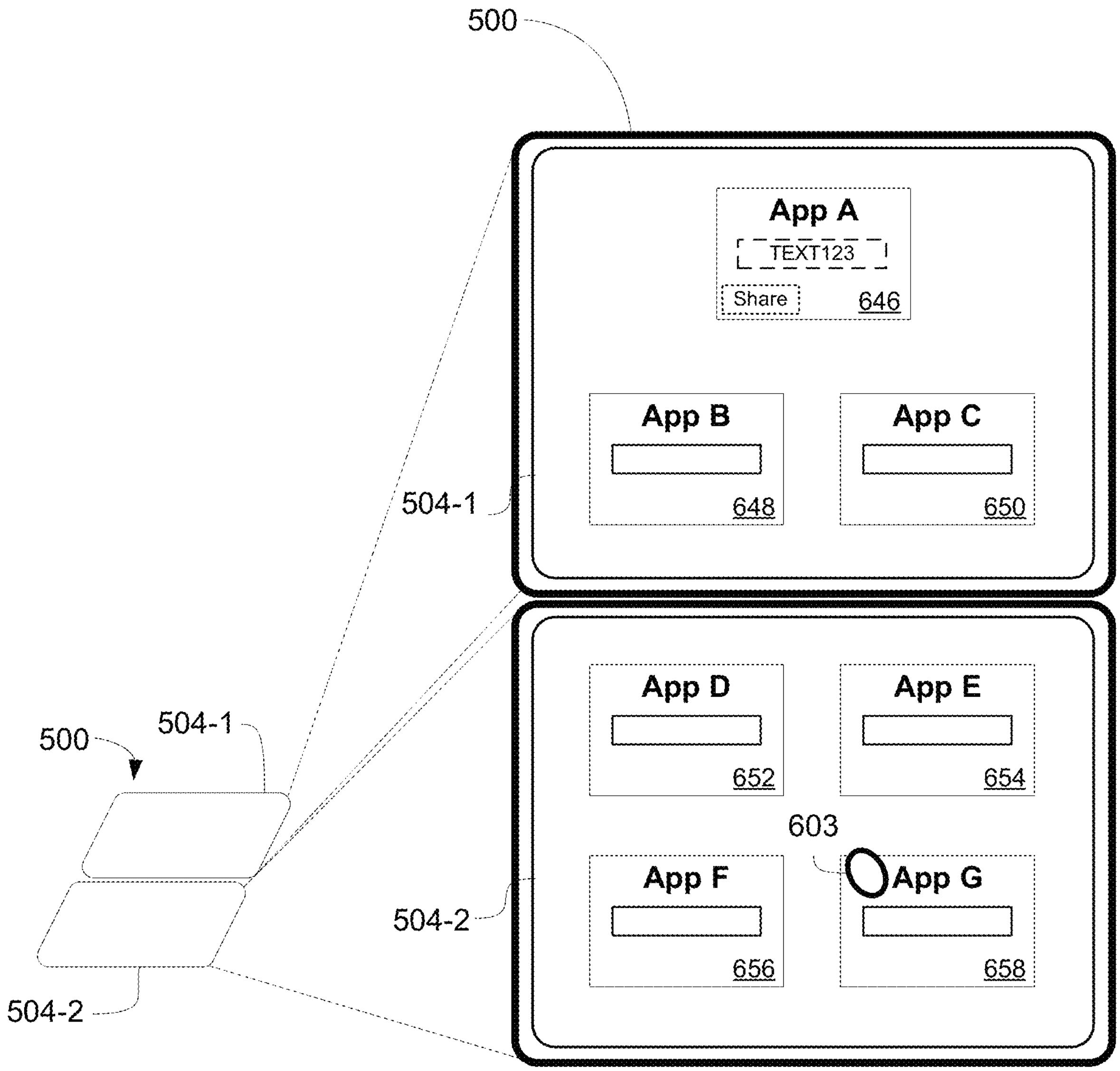
Figure 6E:
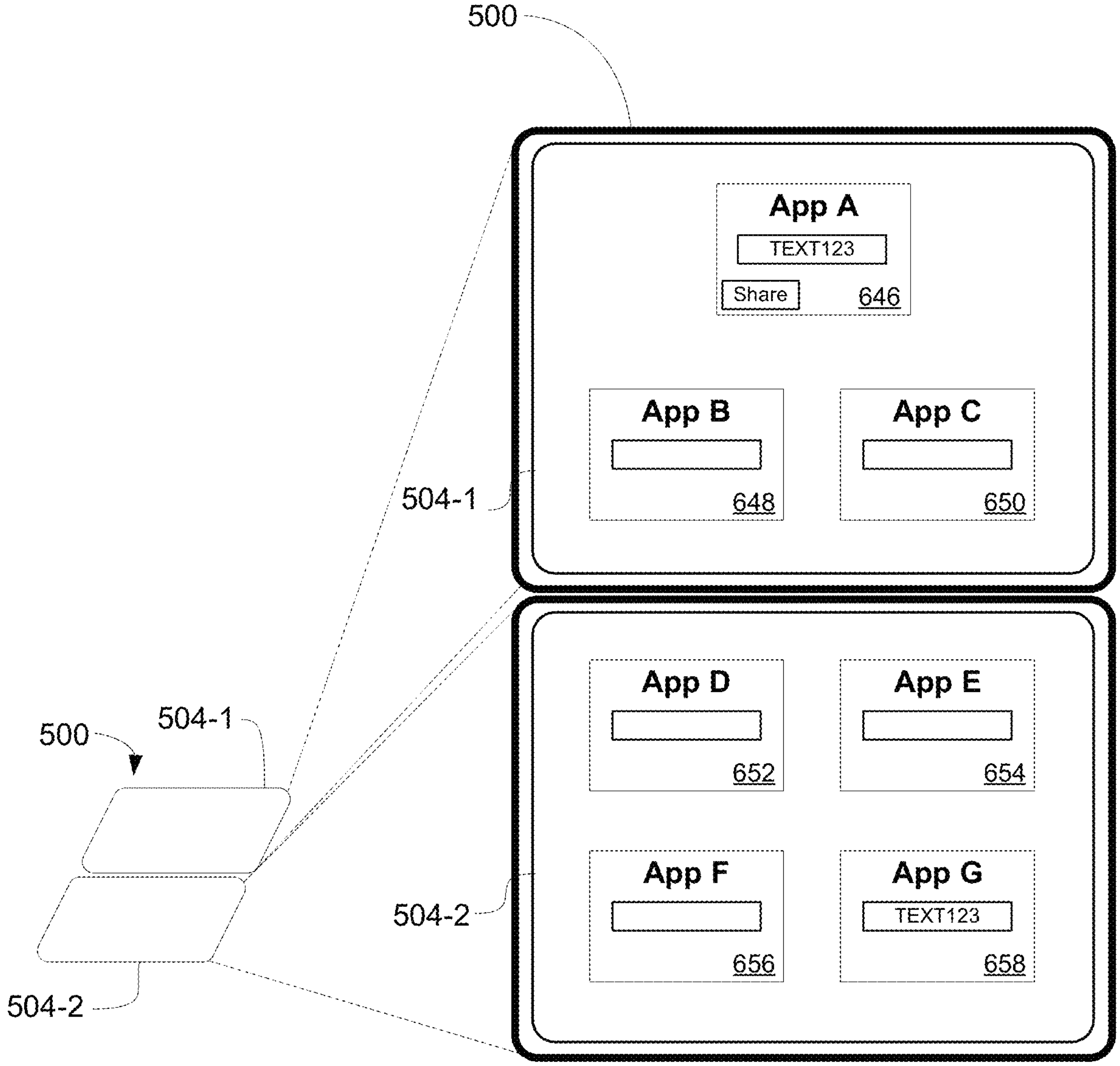
Figure 6F:
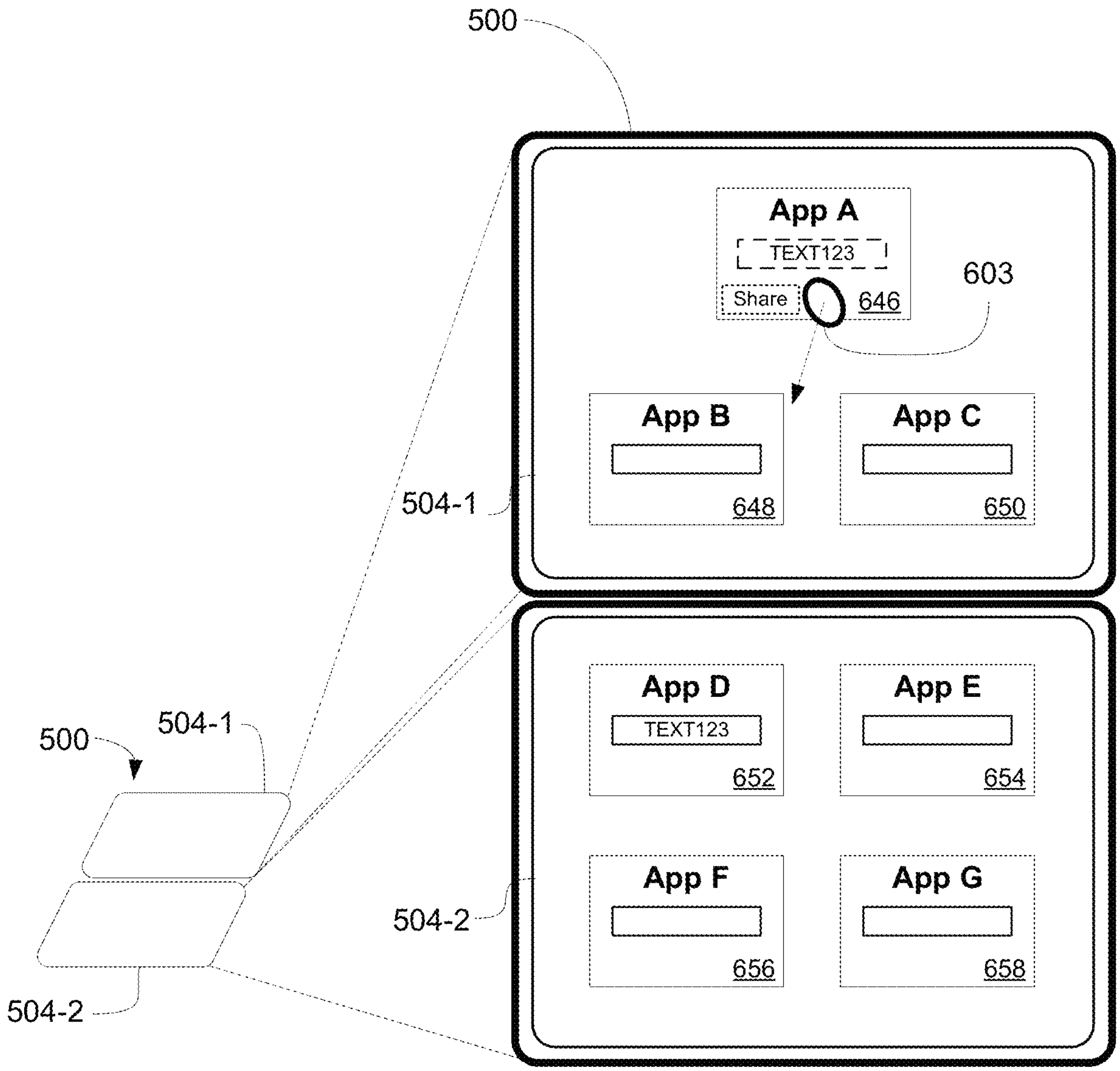
Figure 6G:
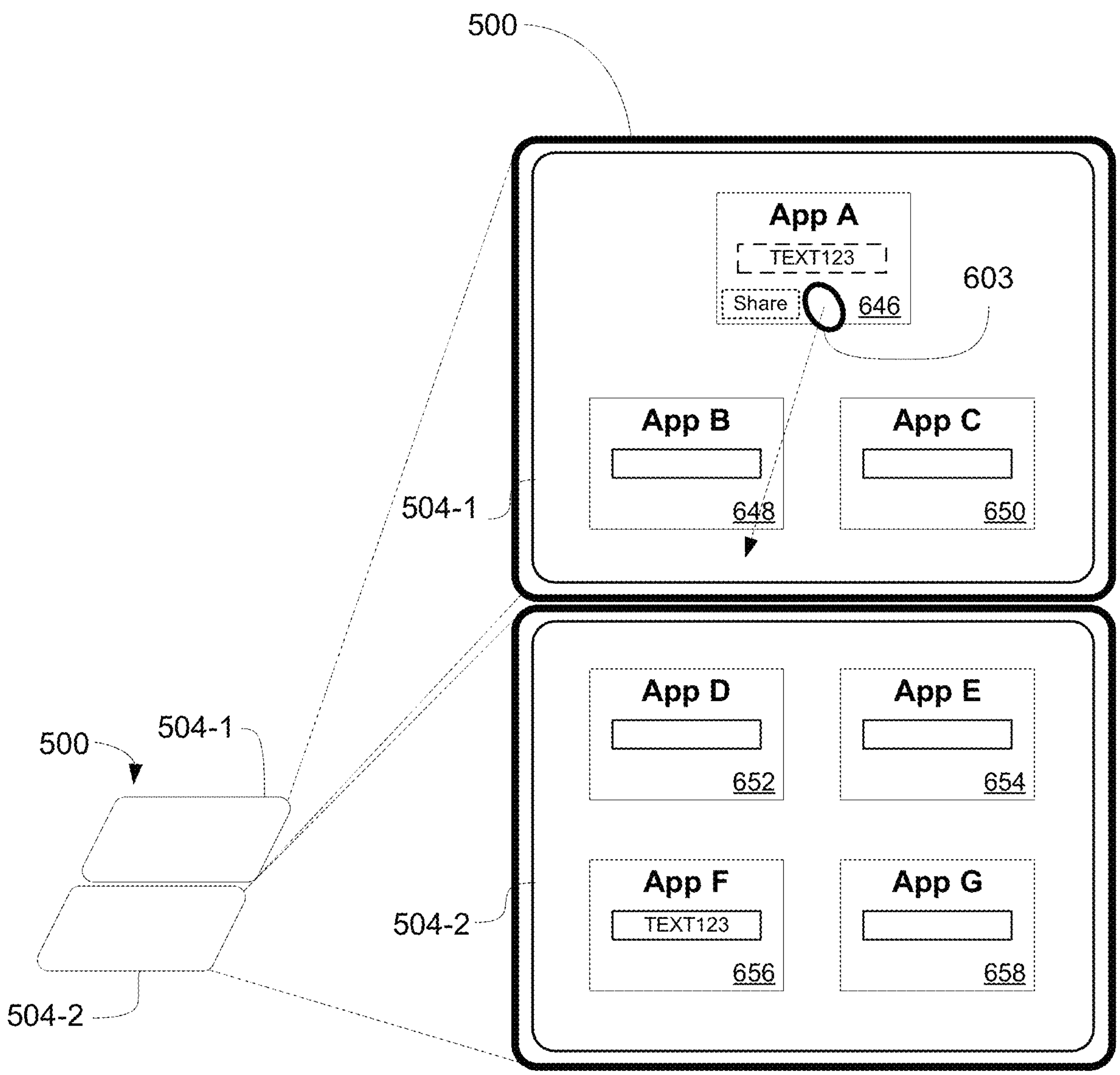
Figure 6H:
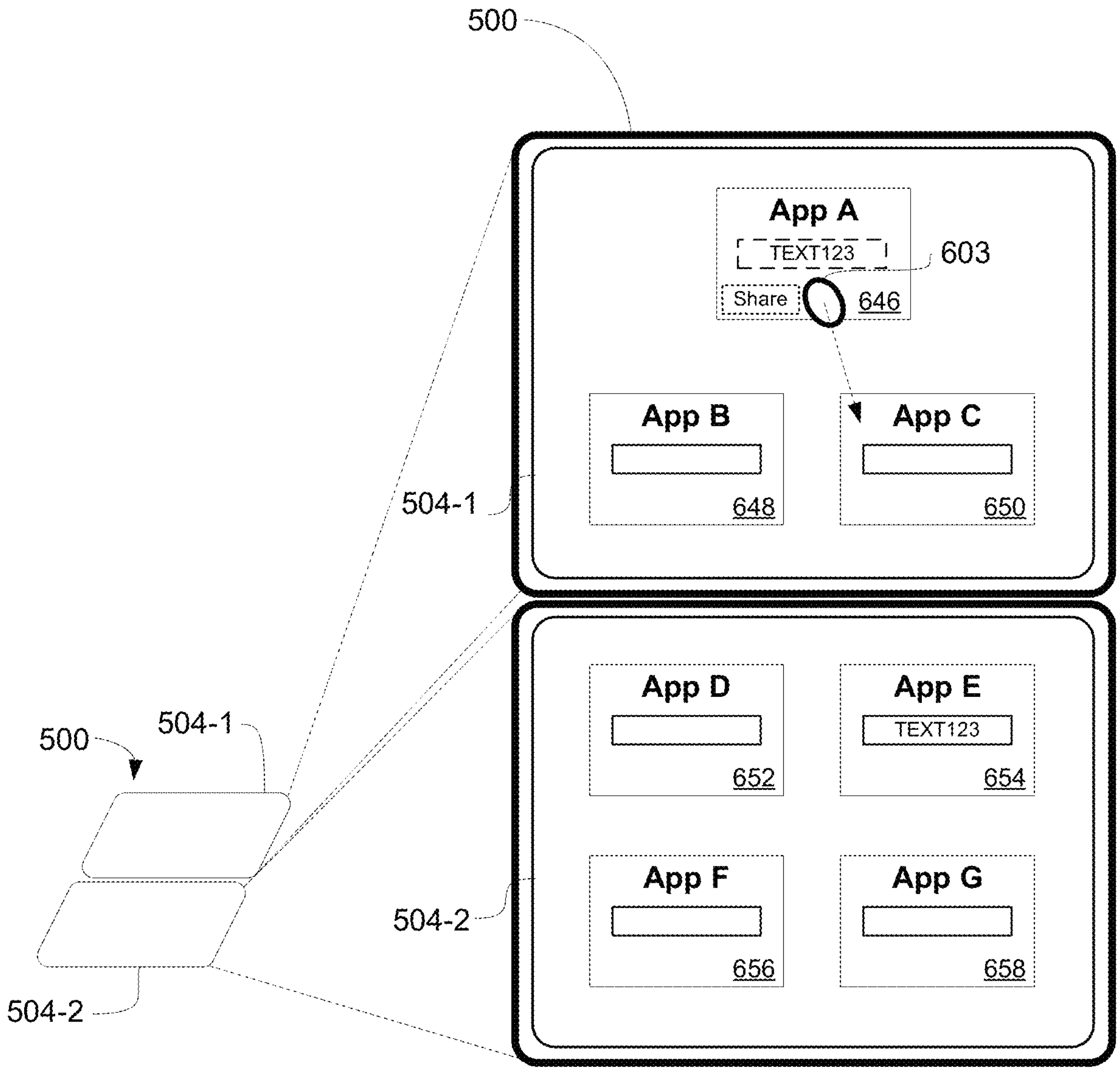
Figure 6I:
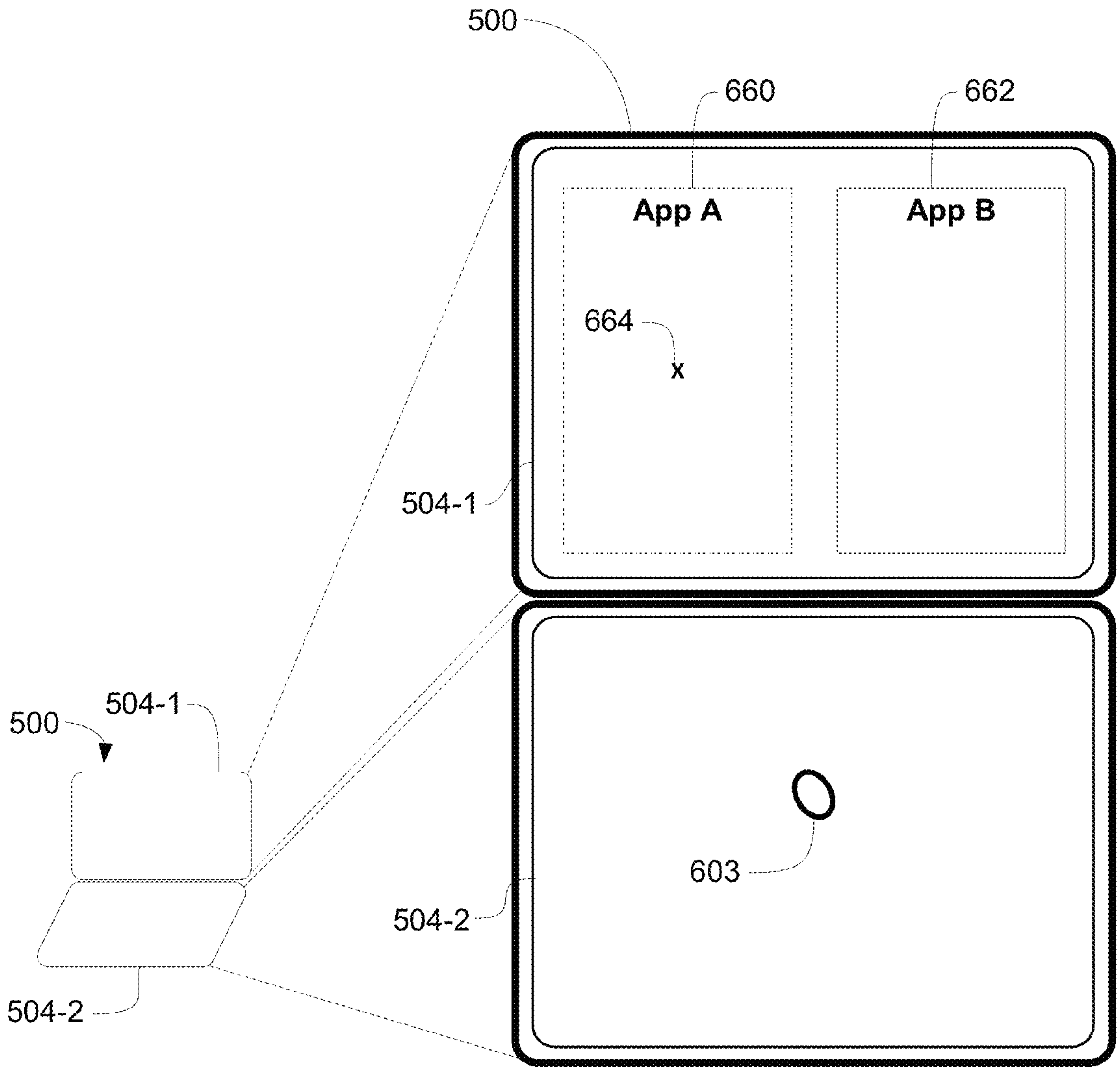
Figure 6J:
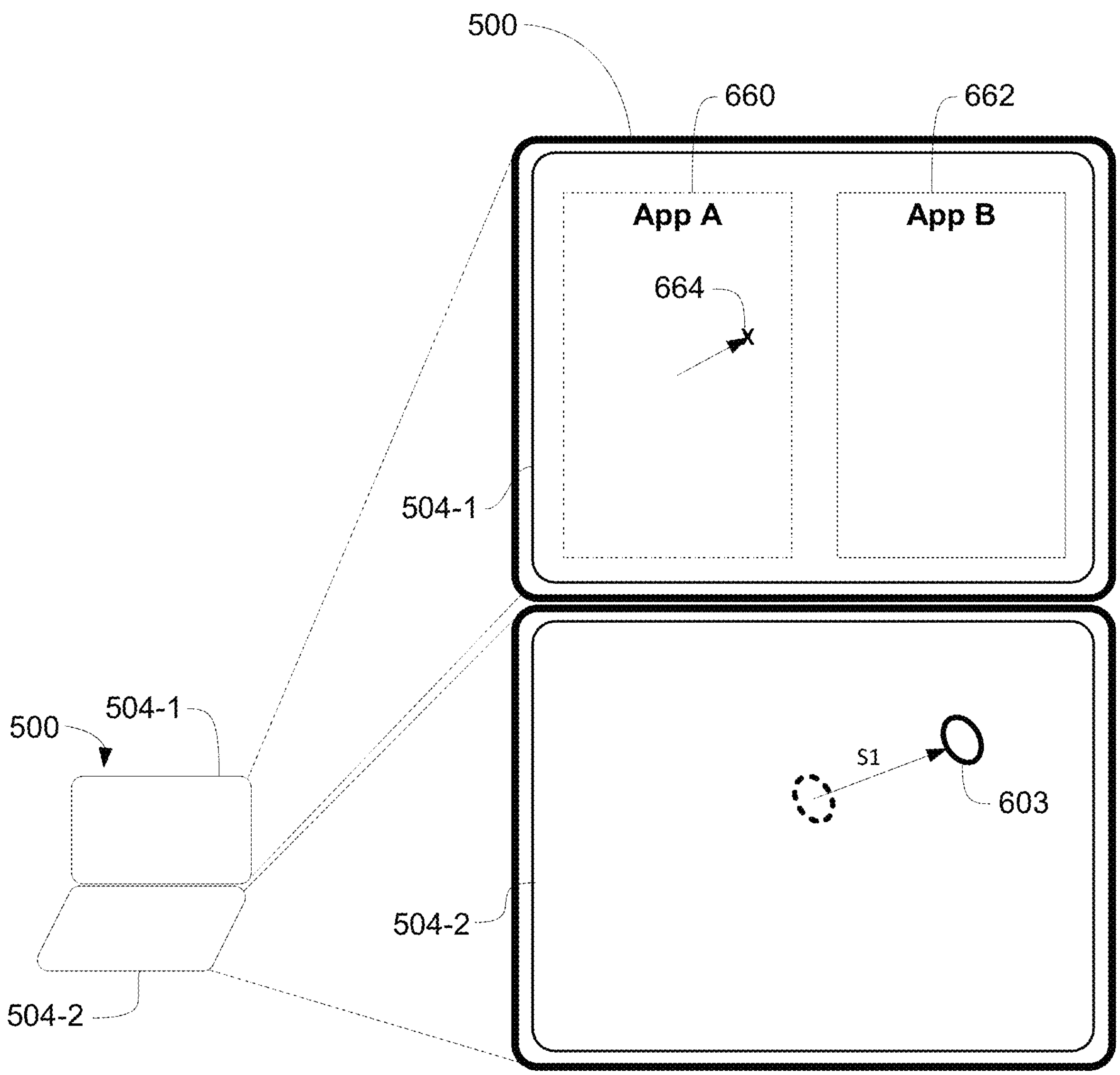
Figure 6K:
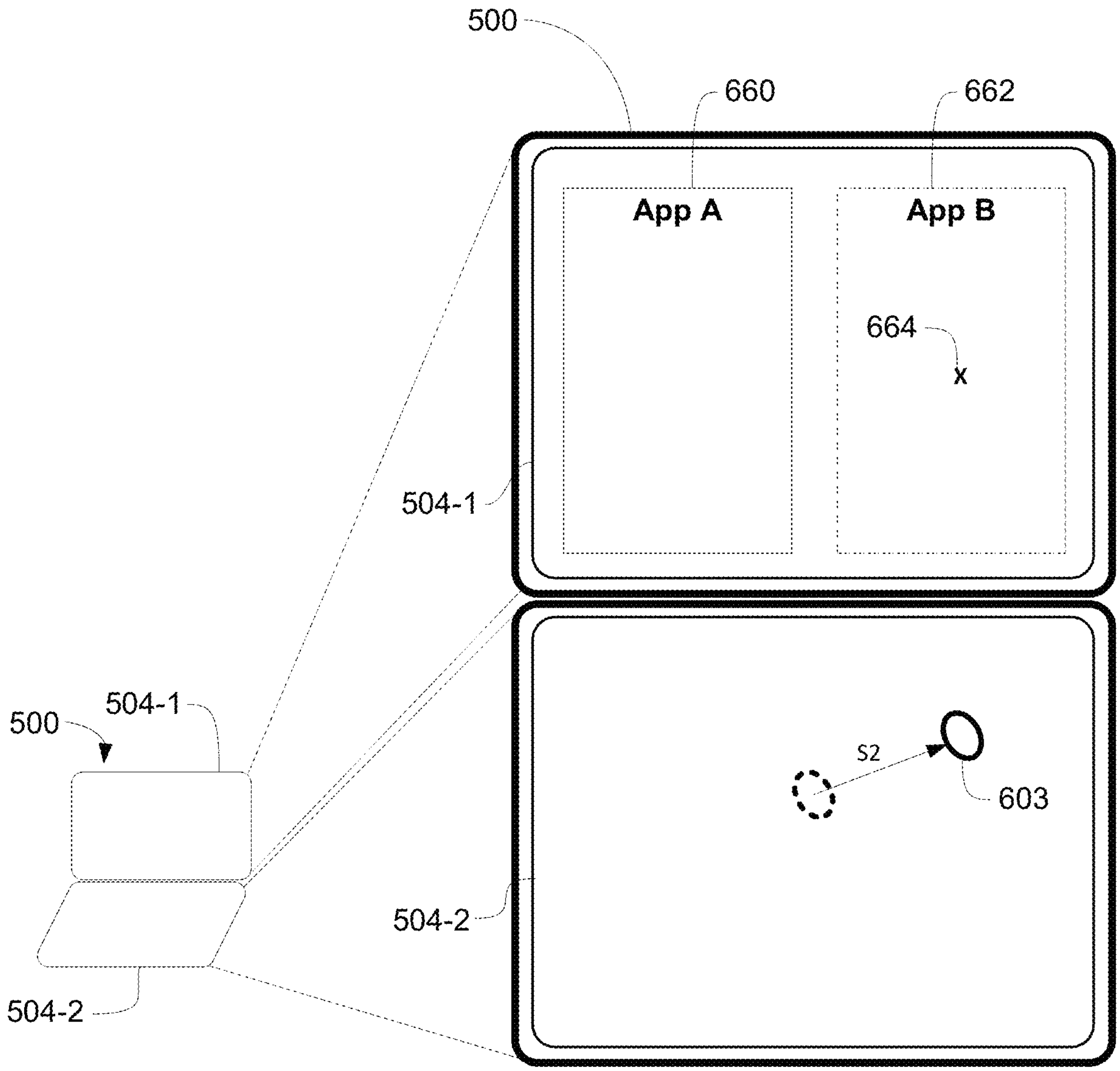
Figure 6L:
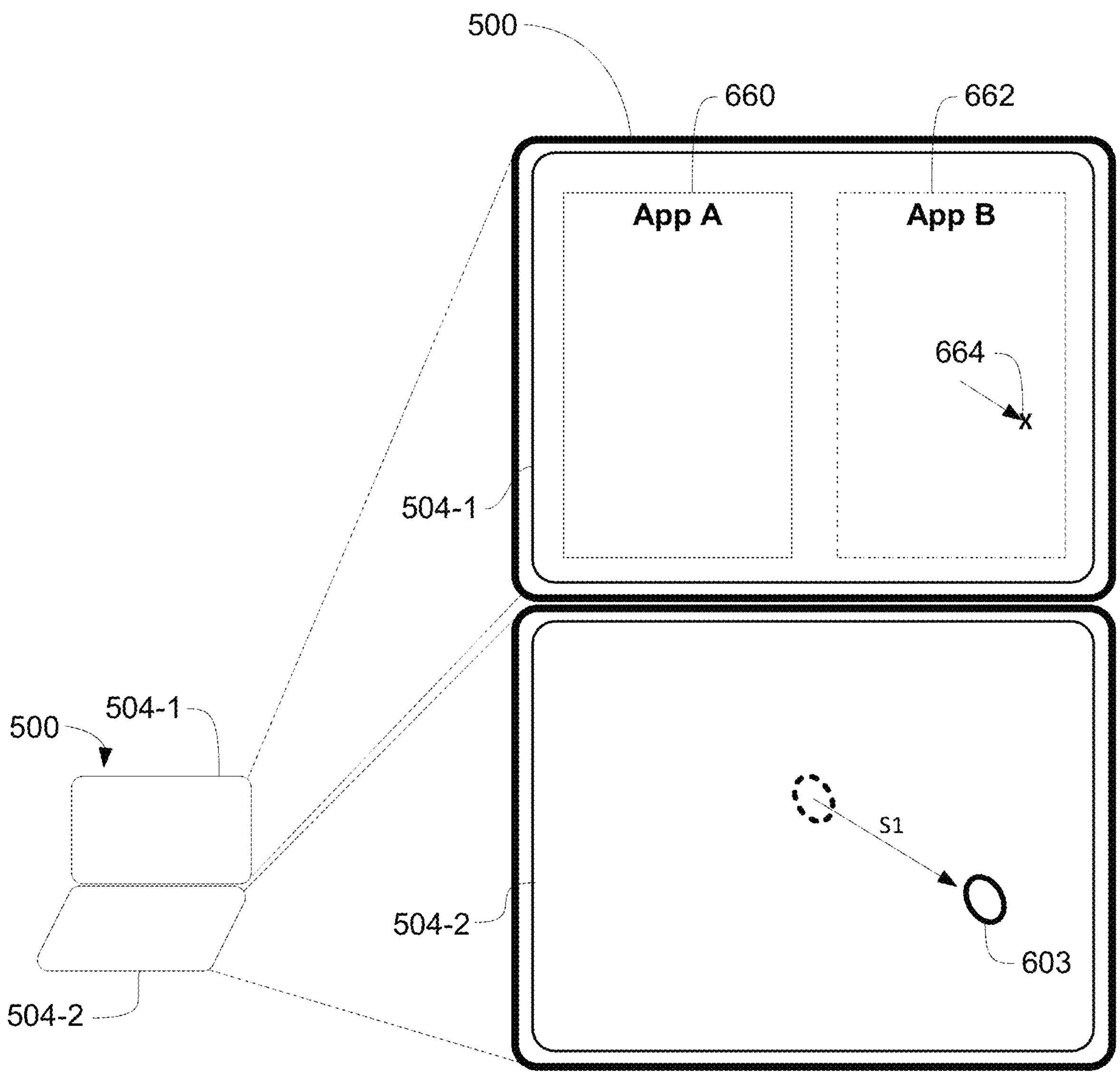
Figure 6M:
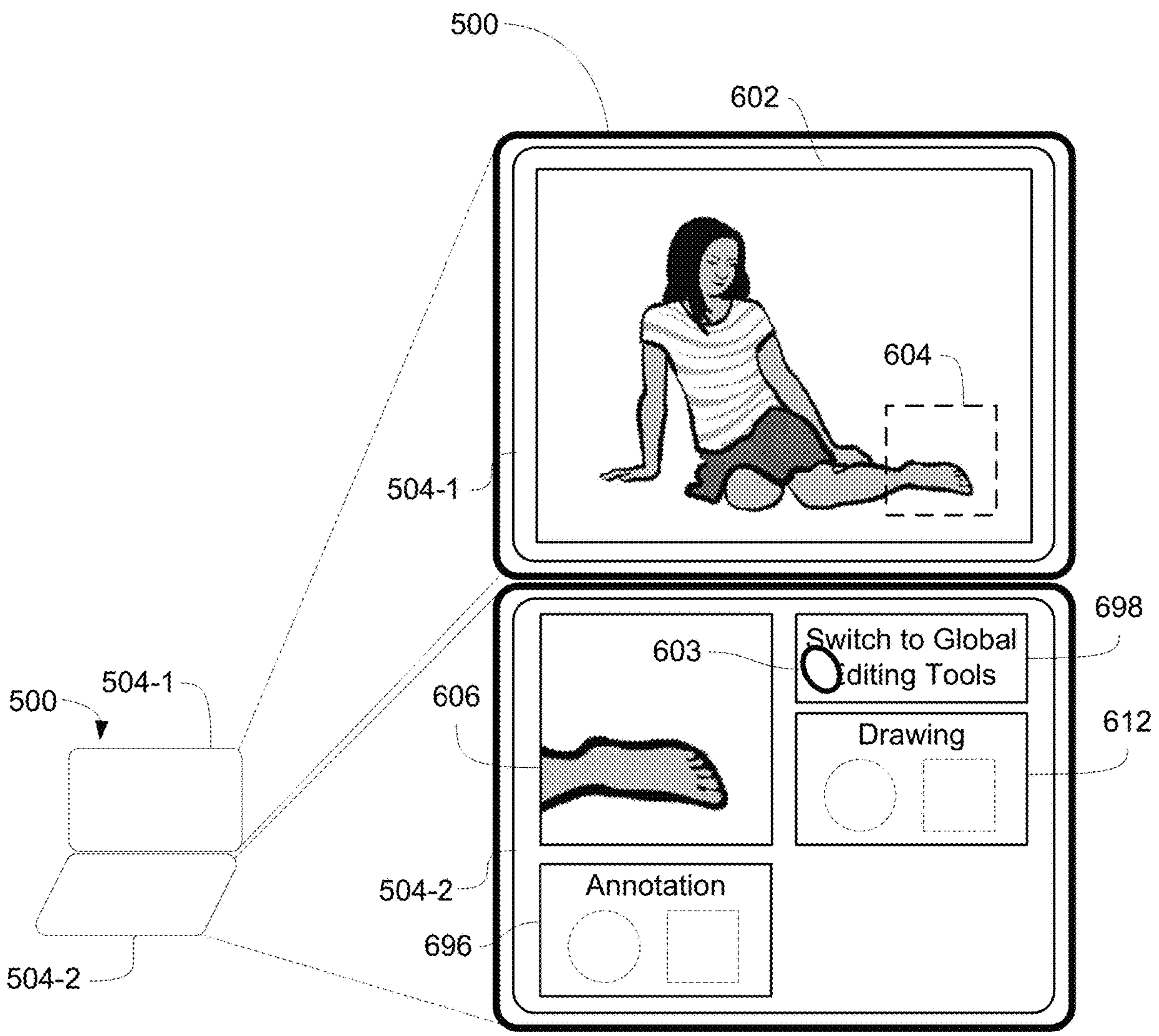
Figure 6N:
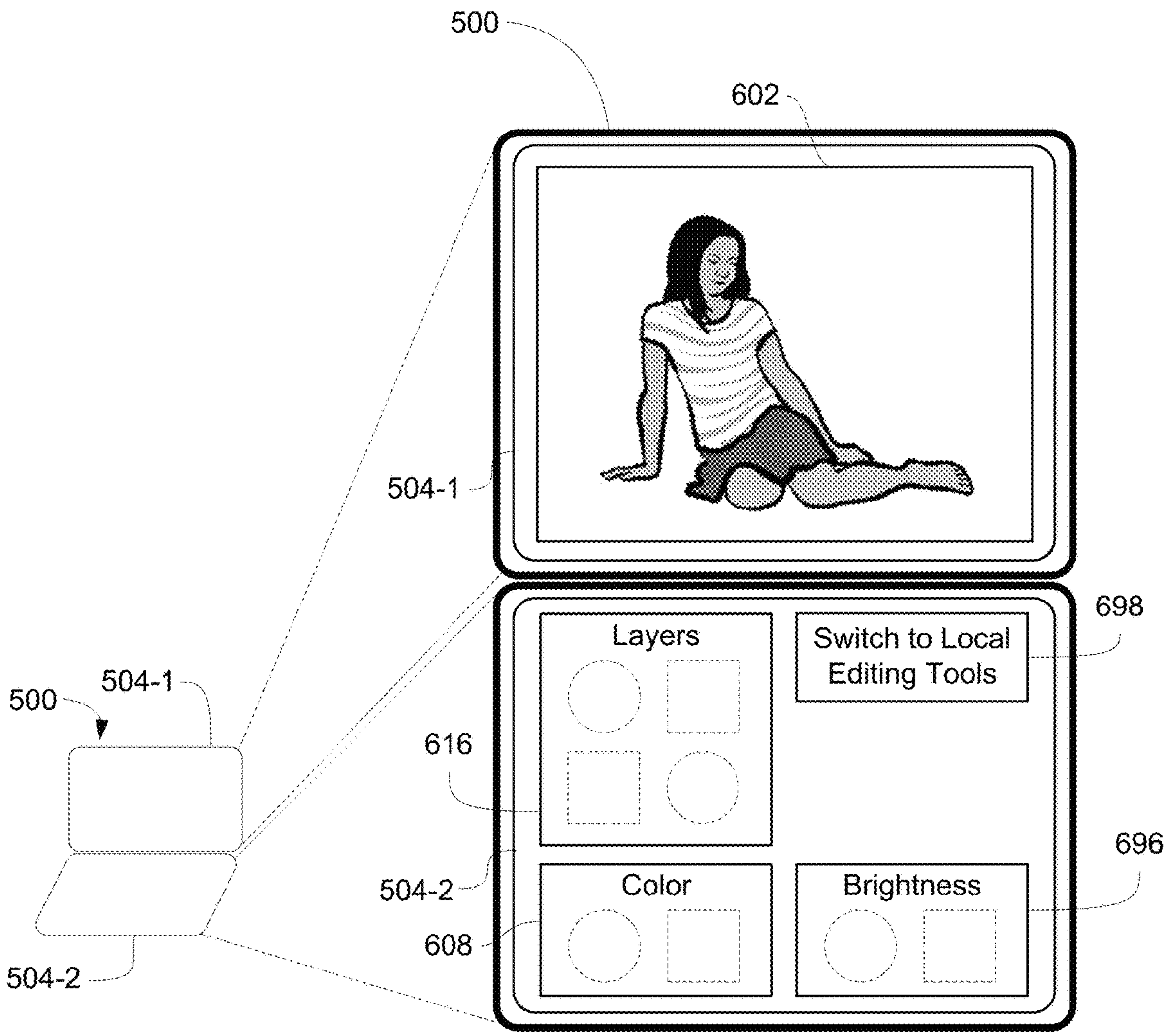
Figure 6O:
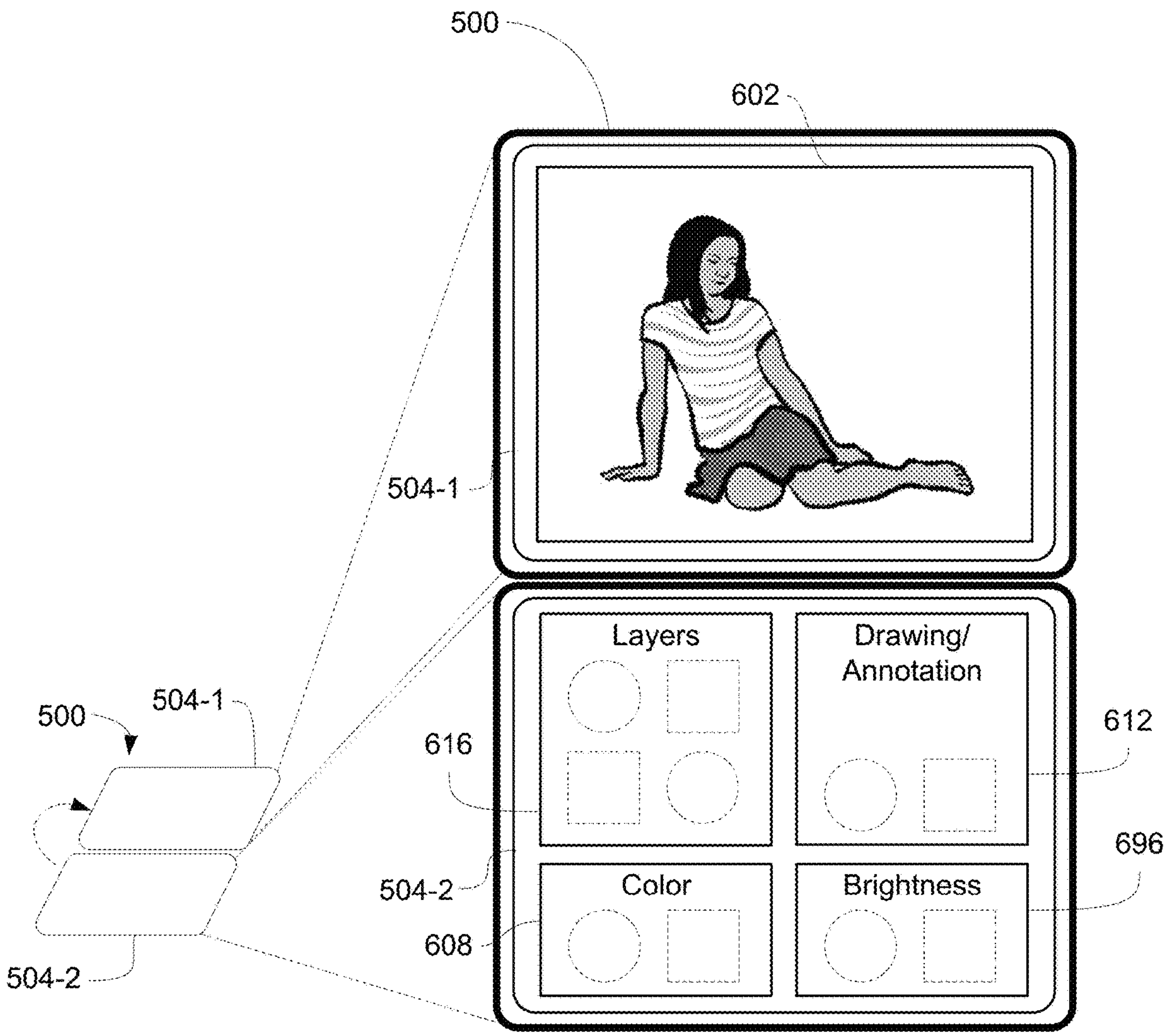
Figure 6P:
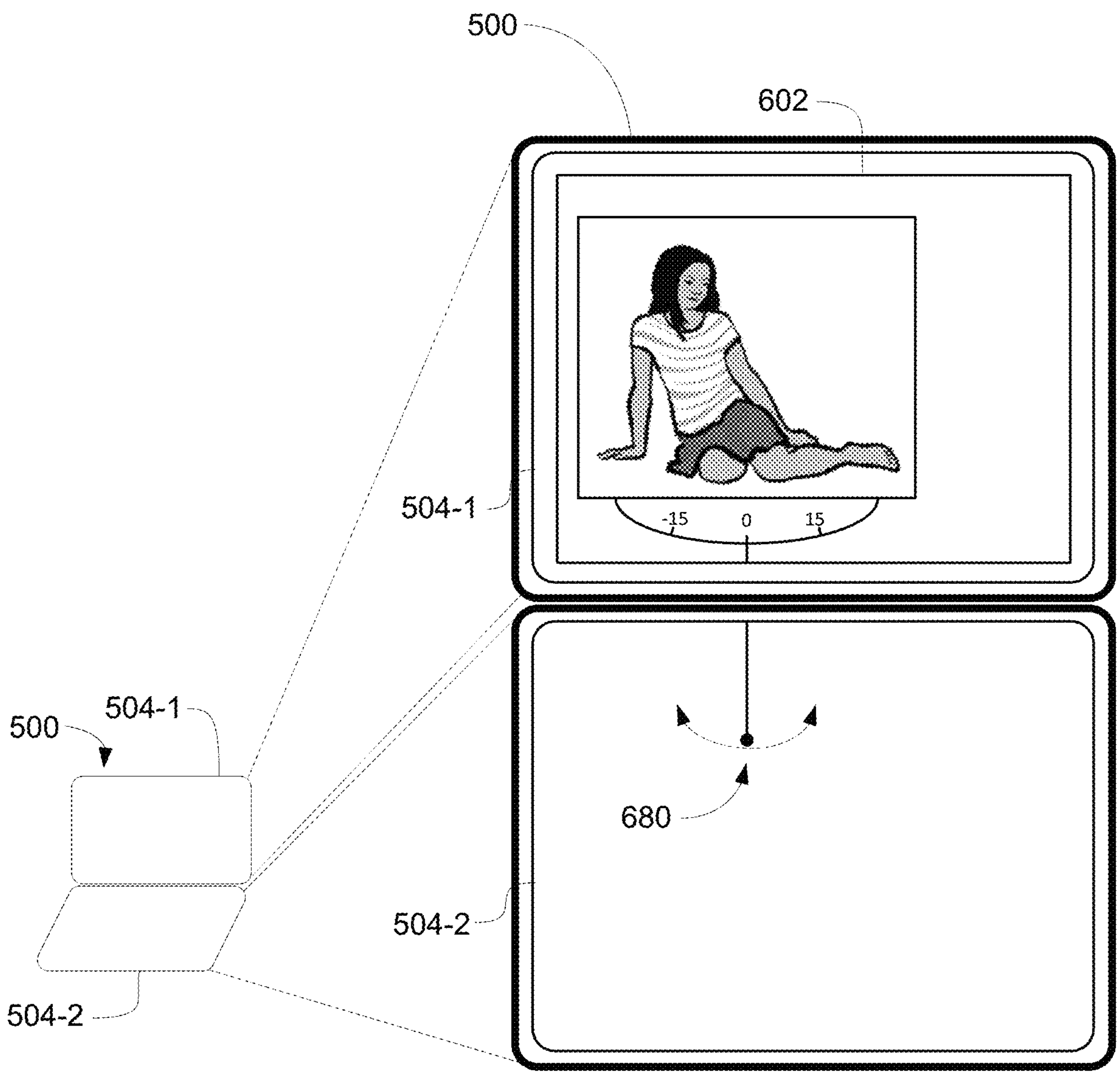
Figure 6Q:
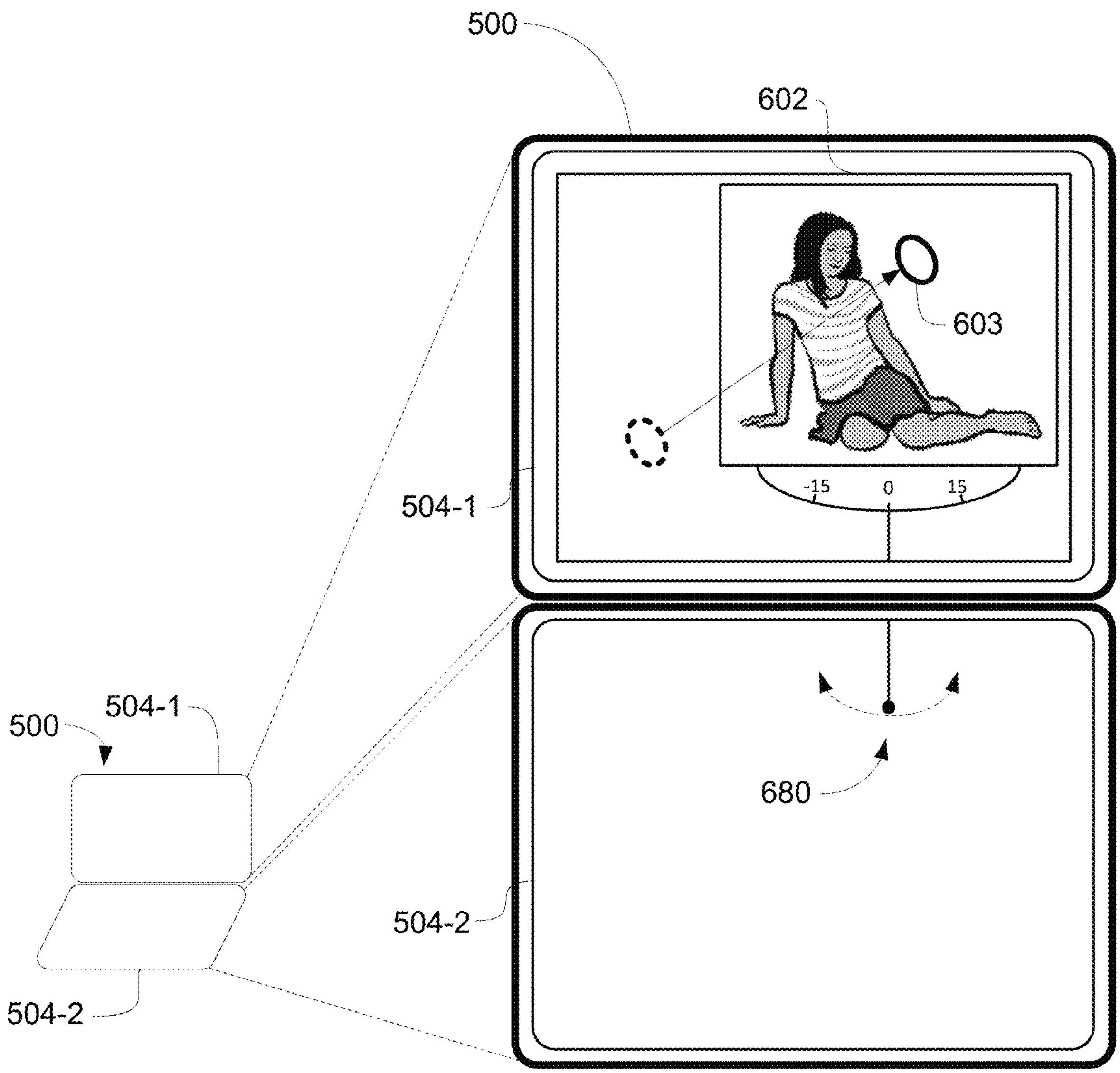

In some embodiments, displaying the user interface in the first mode (e.g., while the electronic device is in the clamshell configuration) includes displaying, on the first display, content that includes text and media (e.g., images, video, music, etc.) integrated into the text (724), such as in FIG. 6W (e.g., in the clamshell configuration, the electronic device displays an article that includes images, the images being placed at respective locations within the article and integrated into the display of the article), and displaying the user interface in the second mode (e.g., while the electronic device is in the spread-out configuration) includes concurrently displaying the text without the media on the first display, and the media on the second display (726), such as in FIG. 6X (e.g., in the spread-out configuration, the electronic device removes the media from the text in the article, displays the article without the media on the first display, and displays the media without the text on the second display, thus displaying, side-by-side, the text of the article and the media that was previously displayed as integrated into the article). The above-described manner of displaying media in-line with text or separated from the text allows the electronic device to optimize the displayed information for the display positioning that is currently in effect, which simplifies interactions between the user and the device and enhances the operability of the device and makes the user-device interface more efficient (e.g., by displaying information for the different display positions that display more information with fewer inputs), which, additionally, reduces power usage and improves battery life of the device by enabling the user to use the device more quickly and efficiently.

In some embodiments, while displaying the user interface in the second mode (e.g., while the electronic device is in the spread-out configuration), the electronic device receives (728), via the one or more input devices, an input corresponding to a request to select a first media item in the media on the second display, such as in FIG. 6X (e.g., detecting a tap on a particular image associated with the article, where the image is displayed on the second display while the article is displayed on the first display). In response to receiving the input corresponding to the request to select the first media item on the second display, the electronic device optionally scrolls (730) the text on the first display to a portion of the text that corresponds to the selected first media item, such as in FIG. 6Y (e.g., scrolling to a position in the article at which the image was or would have been placed if the user interface were in the first mode (e.g., if the electronic device were in the clamshell configuration)). The above-described manner of navigating text on one display via selection of corresponding media on another display allows the electronic device to provide a streamlined text navigation interface, which simplifies interactions between the user and the device and enhances the operability of the device and makes the user-device interface more efficient (e.g., by providing the user with a way to quickly navigate to text of interest), which, additionally, reduces power usage and improves battery life of the device by enabling the user to use the device more quickly and efficiently.

In some embodiments, while the first display has the first relative position with respect to the second display (e.g., the clamshell configuration), notifications are not suppressed (e.g., allowed to be generated) on the electronic device (732), such as in FIG. 6Z (e.g., if the electronic device receives an email or a text message, and if the electronic device is configured to generate notifications, such as a visual or audible notification, in response to receiving the email or text message, the electronic device will generate those notification(s) while in the clamshell configuration), and while the first display has the second relative position with respect to the second display (e.g., the spread-out configuration), notifications are suppressed (e.g., silenced, not generated, etc.) on the electronic device (734), such as in FIG. 6AA (e.g., if the electronic device receives an email or a text message, and if the electronic device is otherwise configured to generate notifications in response to receiving the email or text message, the electronic device will not generate those notification(s) while in the spread-out configuration, and instead will suppress such notifications). The above-described manner of automatically silencing notification in the spread-out configuration allows the electronic device to reduce interruptions to the user's workflow in the spread-out configuration, which enhances the operability of the device and makes the user-device interface more efficient (e.g., by reducing the likelihood of erroneous inputs to the electronic device), which, additionally, reduces power usage and improves battery life of the device by enabling the user to use the device more quickly and efficiently.

In some embodiments, while displaying content (e.g., on the first display), the electronic device receives (736), via the one or more input devices, a gesture input associated with a respective location on the second display, such as in FIGS. 6H-6I (e.g., detecting a gesture, such as a two finger pinch gesture, a two finger left/right swipe, etc., at a particular location on the second display). In response receiving the gesture input (738): the electronic device optionally manipulates (740) the content (e.g., on the first display) in accordance with the gesture input, such as in FIG. 6I (e.g., scaling the content in accordance with a pinch gesture, translating or moving the content on the first display in accordance with the two finger swipe gesture, etc.), and optionally displays (742), at the respective location on the second display, one or more controls for performing one or more actions with respect to the content, such as in FIG. 6J (e.g., upon completion of the gesture on the second display, displaying on the second display and at the location of the gesture on the second display, one or more controls for performing actions with respect to the content on the first display, such as rotation, color editing, cutting, drawing, etc.). The above-described manner of displaying controls at the location of a gesture input allows the electronic device to display relevant controls at a location on the display that is likely to be seen by the user, which simplifies interactions between the user and the device and enhances the operability of the device and makes the user-device interface more efficient (e.g., by increasing the discoverability of displayed information), which, additionally, reduces power usage and improves battery life of the device by enabling the user to use the device more quickly and efficiently.

In some embodiments, before receiving the gesture input, the electronic device displays (744), on the second display, one or more controls associated with the content, such as in FIG. 6L (e.g., one or more controls for editing the content are displayed on the bottom screen before, and right up to, the gesture being detected on the second display). In some embodiments, while receiving the gesture input, the electronic device deemphasizes (746) the one or more controls on the second display, such as in FIG. 6M (e.g., once the beginning of the gesture is detected, and while the gesture is being performed, the controls on the bottom screen are faded-out, ceased to be displayed, displayed at a lower brightness, displayed with more transparency, etc.). The above-described manner of deemphasizing displayed elements on the second display while a gesture is being detected on the second display allows the electronic device to communicate to the user the current operational state of the second display, which simplifies interactions between the user and the device and enhances the operability of the device and makes the user-device interface more efficient (e.g., by reducing erroneous inputs to the electronic device resulting from a user not knowing the operational state of the electronic device), which, additionally, reduces power usage and improves battery life of the device by enabling the user to use the device more quickly and efficiently.

In some embodiments, displaying the content includes concurrently displaying first content on the first display and second content on the second display (748), such as in FIG. 6A (e.g., the top display and the bottom display are both displaying images, in some embodiments, different images). For example, a first image is displayed on the top display, and a second image, different than the first, is displayed on the bottom display. In some embodiments, in accordance with a determination that the gesture input is a single contact gesture input (e.g., a gesture that includes only one contact, and not two, three or four contacts, for example; for example, a single finger swipe), the electronic device manipulates (750) (e.g., moving, translating, scaling) the content in response to detecting the gesture input comprises manipulating the second content on the second display, such as in FIGS. 6B-6C (e.g., without manipulating the first content on the first display). In some embodiments, in accordance with a determination that the gesture input is a double contact gesture input (e.g., a gesture that includes more than one contact, such as two contacts; for example, a double finger swipe, a pinch gesture, etc.), the electronic device manipulates (752) the content in response to detecting the gesture input comprises manipulating the first content on the first display, such as in FIGS. 6D-6E (e.g., without manipulating the second content on the second display). Thus, in some embodiments, single contact gestures detected on the bottom display interact with content on the bottom display, and not with content on the top display, while double contact gestures detected on the top display interact with content on the top display, and not with content on the bottom display. The above-described manner of disambiguating inputs for the top display vs. inputs for the bottom display based on the number of contacts making up those inputs allows the electronic device to provide the user with a quick way of providing inputs to either the top or bottom display, which simplifies interactions between the user and the device and enhances the operability of the device and makes the user-device interface more efficient (e.g., by allowing for interactions with both displays of the device to occur with fewer inputs from the user while allowing the user to perform such interactions from the same touch surface), which, additionally, reduces power usage and improves battery life of the device by enabling the user to use the device more quickly and efficiently.

In some embodiments, the gesture input comprises an enlarging input (e.g., a pinch to zoom gesture to zoom into the content displayed on the first display) to display an enlarged first portion of the content on the first display, the content including the enlarged first portion displayed on the first display and a second portion not displayed on the first display (754), such as in FIG. 6I (e.g., the content is only partially displayed on the first display after the content has been zoomed, the partial portion of the content being displayed on the first display being enlarged). In some embodiments, the one or more controls displayed on the second display include an editing control for editing the content, such as in FIG. 6J (e.g., a control to rotate the content or the enlarged portion of the content, a control to draw on the enlarged portion of the content, a control to change the color of the content). In some embodiments, while displaying the enlarged first portion of the content on the first display and the one or more controls on the second display, the electronic device receives (756), via the one or more input devices, an input corresponding to a request to edit the content, such as in FIG. 6K (e.g., movement of a finger or stylus over the content and/or selection of the editing control such as a tap detected on the second display on the editing control).

In response to receiving the input corresponding to the request to edit the content (e.g., the input corresponding to selection of the editing control) (758), the electronic device optionally concurrently displays (760), on the second display, the enlarged first portion of the content and one or more controls for editing the enlarged first portion of the content, such as in FIG. 6L (e.g., instead of being displayed on the first display, the enlarged portion of the content is switched to being displayed on the second display alongside the controls for editing the enlarged portion of the content). Further, the electronic device optionally displays (762), on the first display, the first portion of the content and the second portion of the content, such as in FIG. 6L (e.g., a zoomed-out version of the content is displayed on the first display, instead of the zoomed-in portion of the content that was previously displayed on the first display). For example, whereas before a portion of the content was displayed on the first display, in response to selection of the editing control, the entirety of the content is displayed on the first display (e.g., the content is zoomed out so the entirety of the content fits on the first display). The above-described manner of automatically displaying a full view of the content on the top display and placing the portion of the content and the controls on the bottom display allows the electronic device to optimize the displayed information for editing (e.g., by giving the user a view of the entire content on the top display while also providing the specific content of interest and the editing controls close together on the bottom display), which simplifies interactions between the user and the device and enhances the operability of the device and makes the user-device interface more efficient, which, additionally, reduces power usage and improves battery life of the device by enabling the user to use the device more quickly and efficiently.

In some embodiments, displaying the user interface in the first mode (e.g., while the electronic device is in the clamshell configuration) includes concurrently displaying (764): on the first display, a content map for respective content (e.g., a representation of the entirety of the respective content, such as a representation of an entire image that is being edited on the electronic device), the content map including a representation of the respective content (e.g., a scaled version of the entirety of the image being edited on the electronic device) and a visual indication identifying a portion of the representation of the respective content (766), such as in FIG. 6L (e.g., a rectangular area encompassing a portion, but not all, of the representation of the respective content), and on the second display, a portion of the respective content corresponding to the identified portion of the representation of the respective content displayed on the first display (768), such as in FIG. 6L (e.g., the second display includes an enlarged portion of the image being editing on the electronic device, the enlarged portion being the portion of the image that is highlighted or otherwise identified in the content map as being the portion of the image that is of interest). The above-described manner of concurrently displaying the content map and the portion of the content of interest allows the electronic device to give the user context for the portion of the content of interest while also focusing display on the portion of the content of interest, which simplifies interactions between the user and the device and enhances the operability of the device and makes the user-device interface more efficient (e.g., by displaying more information with fewer inputs), which, additionally, reduces power usage and improves battery life of the device by enabling the user to use the device more quickly and efficiently.

In some embodiments, while displaying the user interface in the first mode (e.g., while the electronic device is in the clamshell configuration, and while the content map is displayed on the first display and the portion of the content being edited on the electronic device is displayed on the second display), the electronic device receives (770), via the one or more input devices, an input corresponding to a request to swap the display of content on the first and second displays (e.g., selection of a swap affordance displayed on first display or the second display). In response to receiving the input corresponding to the request to swap the display of content on the first and second displays, the electronic device optionally concurrently displays (772): the content map on the second display, including the visual indication identifying the portion of the representation of the respective content (774); and the portion of the respective content on the first display corresponding to the identified portion of the representation of the respective content displayed on the second display (776). The above-described manner of allowing the user to swap the content map and the portion of the content of interest allows the electronic device to customize the display of information based on user input, which simplifies interactions between the user and the device and enhances the operability of the device and makes the user-device interface more efficient (e.g., by displaying information for the user in a manner optimized for the user's needs, which allows the user to interact with the content in a more efficient manner), which, additionally, reduces power usage and improves battery life of the device by enabling the user to use the device more quickly and efficiently.

In some embodiments, while displaying the user interface in the first mode (e.g., while the electronic device is in the clamshell configuration), the electronic device receives (778), via the one or more input devices, an input corresponding to selection of an affordance for adjusting operation of the second display, such as in FIG. 6O (e.g., depression of a physical button of the electronic device, selection of an affordance displayed on the first display or the second display). In response to receiving the input corresponding to the selection of the affordance, the electronic device optionally configures (780) the second display to act as a control element for the first display, such as in FIG. 6O (e.g., while the affordance is depressed or selected, the bottom display is optionally configured to act as a touchpad for interacting with content on the top display such that touch inputs detected on the bottom display will interact with content displayed on the top display). When the affordance is released, the bottom display optionally returns to not being configured to act as a touchpad for interacting with the content on the top display, and instead returns to operating in the manner it was operating prior to selection of the affordance, such as in FIG. 6P-1. The above-described manner of providing a button to configure the second display as a control device for the first display allows the electronic device to quickly and easily change operation of the second display, which simplifies interactions between the user and the device and enhances the operability of the device and makes the user-device interface more efficient (e.g., by allowing a user to easily provide input to the first display), which, additionally, reduces power usage and improves battery life of the device by enabling the user to use the device more quickly and efficiently.

In some embodiments, before receiving the input corresponding to the selection of the affordance, the second display was displaying content, such as in FIG. 6N (e.g., displaying images, windows, a user interface, etc. at a first brightness level), and configuring the second display to act as the control element for the first display includes deemphasizing the content on the second display (782), such as in FIG. 6O (e.g., reducing the brightness of the content, the windows, the user interface displayed on the second display, or increasing the translucency of the above, or otherwise deemphasizing the display of the above). The above-described manner of deemphasizing displayed elements on the second display while the second display is configured to be a control element for the first display allows the electronic device to communicate to the user the current operational state of the second display, which simplifies interactions between the user and the device and enhances the operability of the device and makes the user-device interface more efficient (e.g., by reducing erroneous inputs to the electronic device resulting from a user not knowing the operational state of the electronic device), which, additionally, reduces power usage and improves battery life of the device by enabling the user to use the device more quickly and efficiently.

In some embodiments, while displaying content in a first application on the first display, the electronic device receives (784), via the one or more input devices, an input corresponding to a request to share the content with another application, such as in FIG. 6BB (e.g., a copy command to copy information displayed in an application window for the first application on the first display). After receiving the input corresponding to the request to share the content with another application, the electronic device optionally receives (786), via the one or more input devices, an input corresponding to selection of a second application on the second display, such as in FIG. 6DD (e.g., after copying the information displayed by the first application displayed on the first display, detecting a tap on a second application window displayed on the second display). In some embodiments, in response to receiving the input corresponding to the selection of the second application on the second display, the electronic device shares (788) the content with the second application, such as in FIG. 6EE (e.g., pasting the copied information into the second application window of the second application in response to the tap input detected on the second application window, such as populating a text field with the copied information that is displayed in the second application window). The above-described manner of sharing information from one application to another allows the electronic device to provide a reduced-input manner of sharing information between applications, which simplifies interactions between the user and the device and enhances the operability of the device and makes the user-device interface more efficient (e.g., by reducing the number of inputs needed to share information between applications), which, additionally, reduces power usage and improves battery life of the device by enabling the user to use the device more quickly and efficiently.

In some embodiments, while the second display is configured to act as a control element for a first application window on the first display, such as in FIG. 6II (e.g., the second display is configured to act as a touchpad, and touch inputs detected on the second display control a cursor displayed in the first application window, such as moving the cursor or selecting an item using the cursor), wherein the first display is displaying the first application window and a second application window, the electronic device receives (790) a control input at the second display comprising a contact and movement of the contact (e.g., a swipe input), such as in FIG. 6JJ. In response to receiving the control input (792), in accordance with a determination that the movement of the contact is faster than a threshold speed (e.g., the swipe is faster than 1, 3 or 5 cm/s), the electronic device optionally configures (794) the second display to act as a control element for the second application window, such as in FIG. 6KK (e.g., if the swipe is a fast swipe in a direction that corresponds to a relative position of the second application to the first application window, the second display switches from controlling the first application window to controlling the second application window). In some embodiments, as a result, the cursor is no longer displayed in the first application window, and starts being displayed in the second application window. For example, if the second application window is to the right of the first application window on the first display, and the swipe is a left-to-right fast swipe, the second display starts controlling the second application window. However, if the swipe is a top-to-bottom fast swipe, the second display optionally does not start controlling the second application window, and instead remains controlling the first application window. Further, in some embodiments, in accordance with a determination that the movement of the contact is slower than the threshold speed (e.g., the swipe is slower than 1, 3 or 5 cm/s), the electronic device provides (796) input to the first application window in accordance with the movement of the contact, such as in FIG. 6JJ (e.g., if the swipe is a slow swipe, the swipe is interpreted to move the cursor within the first application window rather than switching the cursor to the second application window). The above-described manner of switching from controlling one application window to controlling another application window allows the electronic device to control both application windows from the same display, which simplifies interactions between the user and the device and enhances the operability of the device and makes the user-device interface more efficient (e.g., by reducing the number of inputs needed to switch from controlling one application window or another), which, additionally, reduces power usage and improves battery life of the device by enabling the user to use the device more quickly and efficiently.

In some embodiments, while concurrently displaying a first set of applications on the first display and a second set of applications on the second display (e.g., one or more application windows on the first display, and one or more application windows on the second display), the electronic device receives (798), via the one or more input devices, an input corresponding to touchdown of a contact on a first respective application of the first set of applications followed by movement of the contact towards a second respective application of the second set of applications, such as in FIG. 6FF (e.g., a flick or swipe gesture that starts within an application window of the first respective application on the first display, and moves towards an application window of the second respective application that is displayed on the second display). In response to receiving the input, the electronic device optionally inputs (798-2) information from the first respective application to the second respective application, such as in FIG. 6FF (e.g., if the first application is displaying a result or some information, flicking from the first application towards a second application causes that result or information to be inputted/pasted into the second application, such as pasted into a text field displayed by the second application, or used as a search term by the second application). In some embodiments, this flick gesture is detected after specific information displayed by the first application has been designated as information of interest, such as being copied. The above-described manner of sharing information from one application to another allows the electronic device to provide a reduced-input manner of sharing information between applications, which simplifies interactions between the user and the device and enhances the operability of the device and makes the user-device interface more efficient (e.g., by reducing the number of inputs needed to share information between applications), which, additionally, reduces power usage and improves battery life of the device by enabling the user to use the device more quickly and efficiently.

In some embodiments, in accordance with a determination that a speed of the movement of the contact is a first speed, the second respective application is a first application of the second set of applications (798-4), such as in FIG. 6FF, and in accordance with a determination that the speed of the movement of the contact is a second speed, different than the first speed, the second respective application is a second application of the second set of applications, different than the first application of the second set of applications (798-6), such as in FIG. 6GG (e.g., if the flick gesture is directed towards two applications in the second set of applications, a slower flick will cause the information to be shared with the application that is displayed closer to the first application (and not the further application), and a faster flick will cause the information to be shared with the application that is displayed further from the first application (and not the closer application)). The above-described manner of determining which application receives shared information based on speed allows the electronic device to provide a reduced-input manner of sharing information between applications, which simplifies interactions between the user and the device and enhances the operability of the device and makes the user-device interface more efficient (e.g., by reducing the number of inputs needed to share information between applications), which, additionally, reduces power usage and improves battery life of the device by enabling the user to use the device more quickly and efficiently.

In some embodiments, the first set of applications on the first display includes a third respective application positioned between the first respective application on the first display and the second respective application on the second display (798-8), such as in FIG. 6FF, the movement of the contact towards the second respective application on the second display is also towards the third respective application on the first display (798-10) (e.g., the flick gesture is towards both an application window displayed on the first display and an application window displayed on the second display), and the information from the first respective application is inputted to the second respective application without being inputted to the third respective application (798-12), such as in FIG. 6FF (e.g., flicking to share data does not share data with applications that are displayed on the same display as the application from which the data is being shared). In some embodiments, however, the application that is displayed on the same display as the application from which the data is being shared additionally or alternatively receives the shared data. The above-described manner of only sharing information from an application on one display to an application on the other display allows the electronic device to provide consistent sharing behavior to the user, which simplifies interactions between the user and the device and enhances the operability of the device and makes the user-device interface more efficient (e.g., by reducing the number of erroneous or unexpected results on the part of the user), which, additionally, reduces power usage and improves battery life of the device by enabling the user to use the device more quickly and efficiently.

In some embodiments, displaying the user interface in the first mode (e.g., while the electronic device is in the clamshell configuration) includes concurrently displaying (798-14): a plurality representations of content items on the second display (798-16) (e.g., a grid of images that are stored or accessible on the electronic device, and from which a user is able to select to edit), and a respective content item of the plurality of content items on the first display, wherein the respective content item is a content item of the plurality of content items that has a current focus on the second display (798-18), such as in FIG. 6A (e.g., the grid of images on the bottom display includes a current focus indicator). When a user selects (e.g., taps on) a given image on the bottom display, that image gets the current focus (while the grid remains displayed), and the image that was selected on the bottom display is displayed on the top display, such as in FIGS. 6F-6G. The top display optionally does not display others of the images in the grid of images, except the image that was selected. In some embodiments, the top display does display others of the images in the grid of images, but displays the selected image in an emphasized manner as compared with the other images, such as larger than the other images, unobscured by other user interface elements (while the other images are obscured by other images or user interface elements), and the like. The above-described manner of displaying images from which to select on one display and a selected image on another display allows the electronic device to maintain the consistent display of information on a given display (e.g., content from which to select on one display, and focused content on the other display), which simplifies interactions between the user and the device and enhances the operability of the device and makes the user-device interface more efficient (e.g., by reducing the number of erroneous or unexpected results on the part of the user), which, additionally, reduces power usage and improves battery life of the device by enabling the user to use the device more quickly and efficiently.

In some embodiments, while displaying the user interface in the first mode (e.g., while the electronic device is in the clamshell configuration), the electronic device receives (798-20), via the one or more input devices, an input associated with the second display (e.g., a gesture input detected on the second display). In response to receiving the input associated with the second display (798-22): in accordance with a determination that the input associated with the second display comprises a tap detected on a representation of a second respective content item on the second display (e.g., a single finger tap detected on the second representation), the electronic device optionally causes the second respective content item to have the current focus on the second display, and displays, on the first display, the second respective content item (798-24), such as in FIGS. 6F-6G. Further, in some embodiments, in accordance with a determination that the input associated with the second display comprises a first contact and a second contact detected concurrently on the second display (e.g., a double finger input, such as a double finger swipe, a pinch to zoom gesture, etc.), the electronic device performs (798-26) an action with respect to the respective content on the first display, such as in FIGS. 6D-6E (e.g., without interacting with the grid of images on the second display, such as without changing the current focus in the grid of images). Thus, in some embodiments, a single finger input detected on the second display causes interaction with the content displayed on the second display, whereas a double finger input detected on the second display causes interaction with content displayed on the first display. In some embodiments, the user is able to provide touch inputs directly to the top/first display to interact with the content on the top/first display, such as swipe inputs detected on the top display to move or scroll content on the top display. The above-described manner of disambiguating inputs for the top display vs. inputs for the bottom display based on the number of contacts making up those inputs allows the electronic device to provide the user with a quick way of providing inputs to either the top or bottom display, which simplifies interactions between the user and the device and enhances the operability of the device and makes the user-device interface more efficient (e.g., by allowing for interactions with both displays of the device to occur with fewer inputs from the user while allowing the user to perform such interactions from the same touch surface), which, additionally, reduces power usage and improves battery life of the device by enabling the user to use the device more quickly and efficiently.

In some embodiments, the first contact and the second contact detected concurrently on the second display are part of a zooming input (798-28), such as in FIGS. 6H-6I (e.g., a pinch to zoom gesture where the two contacts are detected on the second display and subsequently move towards each other (e.g., to zoom out of content displayed on the first display) or subsequently move away from each other (e.g., to zoom into content displayed on the first display). In some embodiments, the centroid of the zooming input defines the scaling center into the respective content on the first display. In some embodiments, performing the action with respect to the respective content on the first display comprises scaling the respective content on the first display in accordance with the zooming input resulting in a scaled (e.g., enlarged or reduced) portion of the respective content being displayed on the first display (798-20), such as in FIG. 6I. In some embodiments, the electronic device deemphasizes (798-32) the plurality representations of content items on the second display while the first contact and the second contact are concurrently detected on the second display, such as in FIGS. 6H-6I (e.g., while the two finger zoom gesture is being performed, the grid of images that was previously displayed on the bottom display are optionally faded out, displayed with more transparency, or otherwise deemphasized). The above-described manner of deemphasizing displayed elements on the second display while the zoom gesture is being detected on the second display allows the electronic device to communicate to the user the current operational state of the second display, which simplifies interactions between the user and the device and enhances the operability of the device and makes the user-device interface more efficient (e.g., by reducing erroneous inputs to the electronic device resulting from a user not knowing the operational state of the electronic device), which, additionally, reduces power usage and improves battery life of the device by enabling the user to use the device more quickly and efficiently.

In some embodiments, after scaling the respective content on the first display, the electronic device displays (798-34) on the second display, a contextual menu at a location of the zooming input on the second display, the contextual menu including one or more menu items related to the scaled portion of the respective content being displayed on the first display, such as in FIG. 6J (e.g., a contextual menu is displayed at the last location of touch detected at the end of the zooming input). In some embodiments, the contextual menu is related to the portion of the image that was scaled, such as a menu to identify one or more people in the scaled portion of the image based on facial recognition. The above-described manner of displaying the contextual menu at the location of the zooming input allows the electronic device to display relevant controls at a location on the display that is likely to be seen by the user, which simplifies interactions between the user and the device and enhances the operability of the device and makes the user-device interface more efficient (e.g., by increasing the discoverability of displayed information), which, additionally, reduces power usage and improves battery life of the device by enabling the user to use the device more quickly and efficiently.

In some embodiments, while concurrently displaying the scaled portion of the respective content item on the first display and the plurality of representations of content items on the second display, the electronic device receives (798-36), via the one or more input devices, an input corresponding to a request to edit the respective content item, such as in FIG. 6K (e.g., selection of an edit button displayed on the first display or the second display, such as selection of an edit button in the contextual menu that is displayed after the above-described zoom operation). In response to receiving the input corresponding to the request to edit the respective content item (798-38): the electronic device optionally displays (798-40), on the first display, the respective content item (e.g., ceasing display of the scaled portion of the respective content on the first display, and instead displaying a full view of the respective content on the first display), and optionally displays (798-42), on the second display, the scaled portion of the respective content item and one or more controls for editing the respective content item, such as in FIG. 6L (e.g., moving the scaled portion of the respective content item from the first display to the second display, and ceasing to display the grid of images on the second display). In some embodiments, touch input is detectable over the scaled portion of the respective content item that is displayed on the second display to markup or otherwise edit the scaled portion of the respective content in accordance with the touch input. For example, the device enables direct drawing on the scaled portion of the respective content item on the second display. The above-described manner of automatically displaying a full view of the content item on the top display and placing the scaled portion of the content and the controls on the bottom display allows the electronic device to optimize the displayed information for editing (e.g., by giving the user a view of the entire content on the top display while also providing the specific content of interest and the editing controls close together on the bottom display), which simplifies interactions between the user and the device and enhances the operability of the device and makes the user-device interface more efficient, which, additionally, reduces power usage and improves battery life of the device by enabling the user to use the device more quickly and efficiently.

In some embodiments, while displaying the respective content item on the first display and the scaled portion of the respective content item and the one or more controls for editing the respective content item on the second display, such as in FIG. 6P-1, the electronic device detects (798-44) a change in relative position of the first display with respect to the second display from the first relative position to the second relative position, different from the first relative position, such as in FIG. 6Q (e.g., detecting, using one or more angle sensors for detecting the angle between the touch screens, that the touch screens have been moved from the clamshell configuration to the spread out configuration). In response to detecting the change in the relative position of the first display with respect to the second display (798-46): the electronic device optionally continues to display (798-48) the respective content item on the first display, displays (798-50) one or more controls for editing the respective content item on the second display, and ceases to display (798-52) the scaled portion of the respective content item on the second display, such as in FIG. 6Q (e.g., when the electronic device is put into the spread-out configuration, the electronic device stops displaying the scaled portion of the respective content item on the second display, because in the spread-out configuration, the first display is optionally positioned flat on a surface, and a user is able to directly interact with (e.g., draw on, perform gestures on, etc.) that content on the first display). As such, there is optionally no longer a need to display any of the content on the second display. Instead, in some embodiments, the electronic device displays additional controls for editing the respective content on the second display, such as in FIG. 6Q (e.g., by utilizing the space on the second display that was previously occupied by the scaled portion of the content). The above-described manner of automatically ceasing to display the scaled portion of the content on the display with the controls allows the electronic device to optimize the displayed information for editing (e.g., by giving the user a single content view of the entire content on which to focus on the top display, and the editing controls on the bottom display), which simplifies interactions between the user and the device and enhances the operability of the device and makes the user-device interface more efficient, which, additionally, reduces power usage and improves battery life of the device by enabling the user to use the device more quickly and efficiently.

In some embodiments, the relative position of the first display with respect to the second display is the first relative position (e.g., while the electronic device is in the clamshell orientation) and the electronic device is displaying the respective content item on the first display (e.g., top display) and the scaled portion of the respective content item and the one or more controls for editing the respective content item on the second display (e.g., bottom display), such as in FIG. 6MM, wherein the one or more controls are location-specific editing controls (798-54) (e.g., controls for editing the content item that operate on a specified location in the content item (e.g., specified by the user), such as controls 696 and 612 in FIG. 6MM). For example, the location-specific editing controls are optionally controls for editing only a portion of the respective content item, such as controls for drawing on a selected portion of the content item, such as drawing on the part of the content item that is shown in the scaled portion of the content item on the bottom display; controls for cutting out a selected portion of the content item, such as cutting out part of the content item that is shown in the scaled portion of the content item on the bottom display; etc., as opposed to controls that operate globally on the content item (e.g., not dependent on designation of a specified location in the content item on which to operate). In some embodiments, the electronic device receives (798-56), via the one or more input devices, a request to replace the one or more location-specific editing controls with one or more global editing controls (e.g., toggling of a toggle affordance displayed on the second display for toggling between location-specific editing controls and global editing controls), such as selection of button 698 in FIG. 6MM. In some embodiments, global editing controls are controls for editing the content item that do not operate on a specified location of the content item, but rather operate on the content item as a whole, such as color balance controls, white balance controls, etc., such as controls 616, 608 and 696 in FIG. 6NN.

In some embodiments, in response to receiving the request to replace the one or more location-specific editing controls with the one or more global editing controls (798-58): the electronic device replaces (798-60), on the second display, the one or more location-specific editing controls with the one or more global editing controls, such as controls 616, 608 and 696 in FIG. 6NN, and ceases (798-62) to display the scaled portion of the respective content item on the second display while maintaining display of the respective content item on the first display, such as shown in FIGS. 6MM-6NN wherein scaled portion 606 ceases to be displayed on touch screen 504-2. In some embodiments, when the location-specific editing controls are displayed on the bottom display, the electronic device optionally also displays the scaled portion of the content item on the bottom display (e.g., because the location-specific editing controls are optionally targeted at editing that scaled portion of the content item). In contrast, when the global editing controls are displayed on the bottom display, the electronic device optionally ceases to display the scaled portion of the content item on the bottom display (e.g., because the global editing controls are not targeted at editing that scaled portion of the content item).

The above-described manner of automatically displaying (or not) the scaled portion of the content item on the bottom display allows the electronic device to optimize the displayed information on the bottom display for editing, which simplifies interactions between the user and the device and enhances the operability of the device and makes the user-device interface more efficient, which, additionally, reduces power usage and improves battery life of the device by enabling the user to use the device more quickly and efficiently.

In some embodiments, in response to detecting the change in the relative position of the first display with respect to the second display from the first relative position to the second relative position (e.g., detecting that the electronic device has changed from the clamshell configuration to the spread out configuration), the electronic device concurrently displays (798-64), on the second display (e.g., the bottom display): the one or more location-specific editing controls (798-66) and the one or more global editing controls (798-68), such as shown in FIG. 6OO where device 500 displays controls 616, 608, 612 and 696 on touch screen 504-2. Thus, in some embodiments, the electronic device displays both the location-specific and the global editing tools on the second display when in the spread out configuration, because both the location-specific and global editing tools are optionally targeted at editing the content item displayed on the first display without the need for the scaled portion of the content item on the second display.

The above-described manner of automatically displaying both sets of controls (e.g., the expanded set of controls) on the second display when the device is spread out allows the electronic device to optimize the displayed controls on the second display for editing the content item in a spread out configuration in which the content item that is the focus of editing is displayed on the first display, which simplifies interactions between the user and the device and enhances the operability of the device and makes the user-device interface more efficient, which, additionally, reduces power usage and improves battery life of the device by enabling the user to use the device more quickly and efficiently.

In some embodiments, while displaying, on the second display, a rotation tool for rotating the respective content on the first display (e.g., a rotation tool handle that, when moved, causes rotation of the content item displayed on the first display; in some embodiments, the rotation tool is displayed on the second display and the content is displayed on the first display while the device is in the clamshell configuration or when the device is in the spread out configuration) (798-70): in accordance with the respective content being located at a first location on the first display (e.g., the right side of the first display), the rotation tool is displayed at a first location on the second display (798-72) (e.g., the right side of the second display). For example, as shown in FIG. 6PP, rotation handle 680 is displayed at a certain location on touch screen 504-2 while content 602 is displayed at a certain location on touch screen 504-1.

In some embodiments, in accordance with the respective content being located at a second location on the first display (e.g., the left side of the first display), different than the first location on the first display, the rotation tool is displayed at a second location on the second display (e.g., the left side of the second display), different than the first location on the second display (798-74). For example, as shown in FIG. 6QQ, when content 602 is displayed at a different location on touch screen 504-1, handle 680 of the rotation tool is displayed at a different location on touch screen 504-2. Thus, in some embodiments, the rotation tool includes a handle or rotation indicator that extends from the content item being rotated on the first display. If the rotation tool/handle extends past the first display onto the second display, that handle is optionally displayed on the second display in a location that depends on where on the first display the content item is displayed. The handle is optionally displayed on the second display at a location that indicates spatial continuity of the handle as it extends from the first display to the second display such that the handle is displayed on the second display at a location that corresponds to where the handle would have been displayed had the first and second displays been combined into a single display.

The above-described manner of appropriately placing the rotation tool on the second display depending on where the content item is displayed on the first display allows the electronic device to effectively extend the operation of elements on the first display onto the second display, which simplifies interactions between the user and the device and enhances the operability of the device and makes the user-device interface more efficient (e.g., allowing the device to utilize space on the second display to display the extension of a tool for performing an action on the first display), which, additionally, reduces power usage and improves battery life of the device by enabling the user to use the device more quickly and efficiently.

It should be understood that the particular order in which the operations in FIGS. 7A-7Q have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1700, 1900 and 2100) are also applicable in an analogous manner to method 700 described above with respect to FIGS. 7A-7Q. For example, the displays, user interfaces, relative positions of the displays, display modes, etc., described above with reference to method 700 optionally have one or more of the characteristics of the displays, user interfaces, relative positions of the displays, display modes, etc. described herein with reference to other methods described herein (e.g., methods 900, 1100, 1300, 1500, 1700, 1900 and 2100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7Q are, optionally, implemented by components depicted in FIGS. 1A-1B. For example, displaying operations 702 and 706, and detecting operation 704 are, optionally, implemented by event sorter 170, event recognizer 180, and event handler 190. Event monitor 171 in event sorter 170 detects a contact on touch screen 504-1 and/or 504-2, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Viewing 3D Content

Users interact with electronic devices in many different manners, including interacting with applications (e.g., drawing applications, game applications, map applications, etc.) that may be available (e.g., stored or otherwise available) on the electronic devices. For example, one or more displays associated with an electronic device optionally act as a viewport into a three-dimensional environment (e.g., of a videogame, a map, or other media). In some embodiments, a first display associated with the electronic device displays a first view of three-dimensional content while a second display associated with the electronic device displays a second, coordinated, view of the three-dimensional content. The embodiments described below provide ways in which an electronic device displays three-dimensional content using coordinated views on multiple displays, thereby enhancing the user's interactions with the electronic device. Enhancing interactions with a device reduces the amount of time needed by a user to perform operations (e.g., by displaying additional information, such as multiple views of the three-dimensional content), and thus reduces the power usage of the device and increases battery life for battery-powered devices. It is understood that people use devices. When a person uses a device, that person is optionally referred to as a user of the device.

FIGS. 8A-8HH illustrate exemplary ways in which an electronic device displays three-dimensional content using coordinated views on multiple displays in accordance with some embodiments of the disclosure. The embodiments in these figures are used to illustrate the processes described below, including the processes described with reference to FIGS. 9A-9L.

Figure 8A:
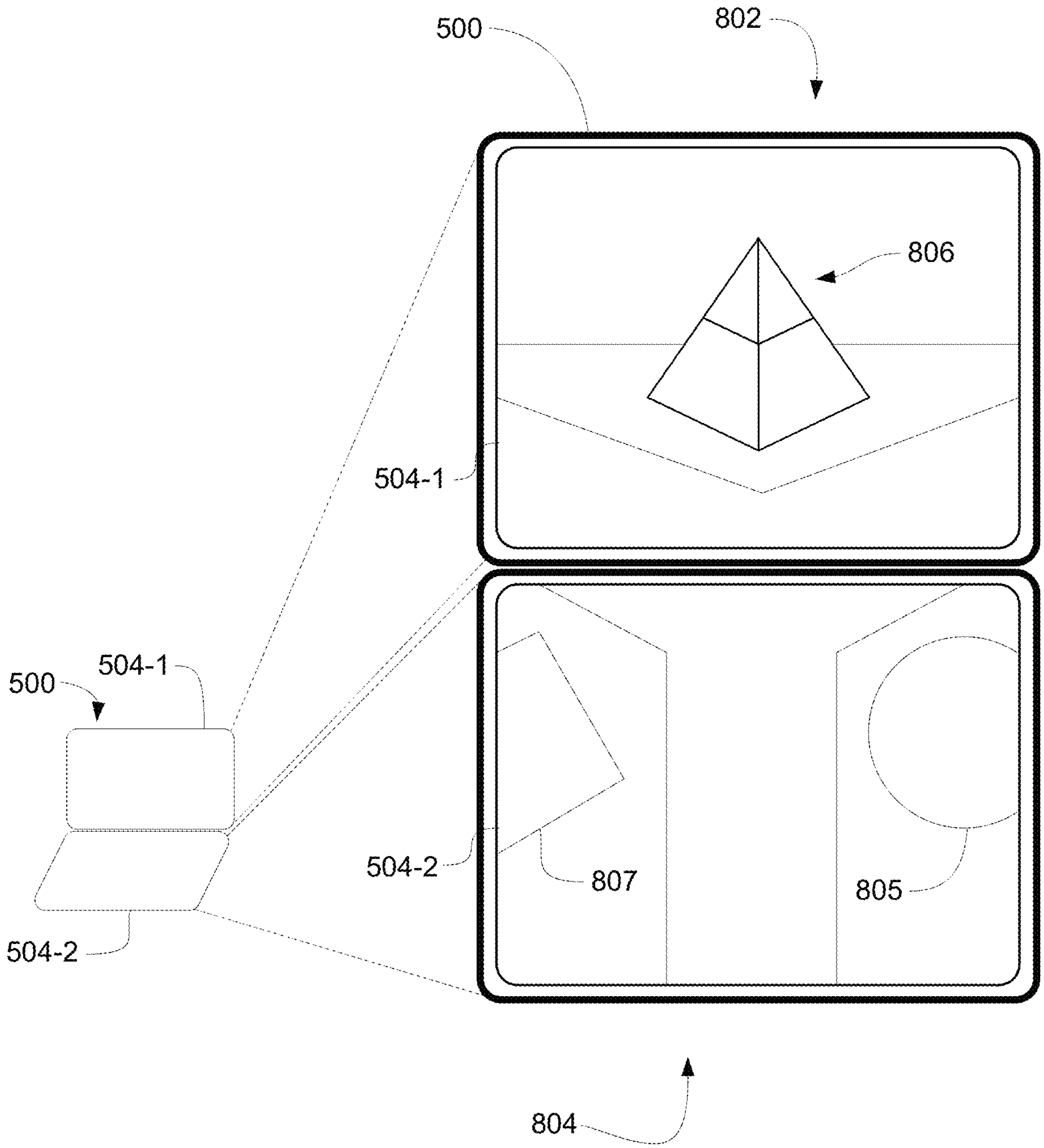
FIGS. 8A-8HH illustrate exemplary ways in which an electronic device displays three-dimensional content using coordinated views on multiple displays in accordance with some embodiments of the disclosure.
Figure 8B:
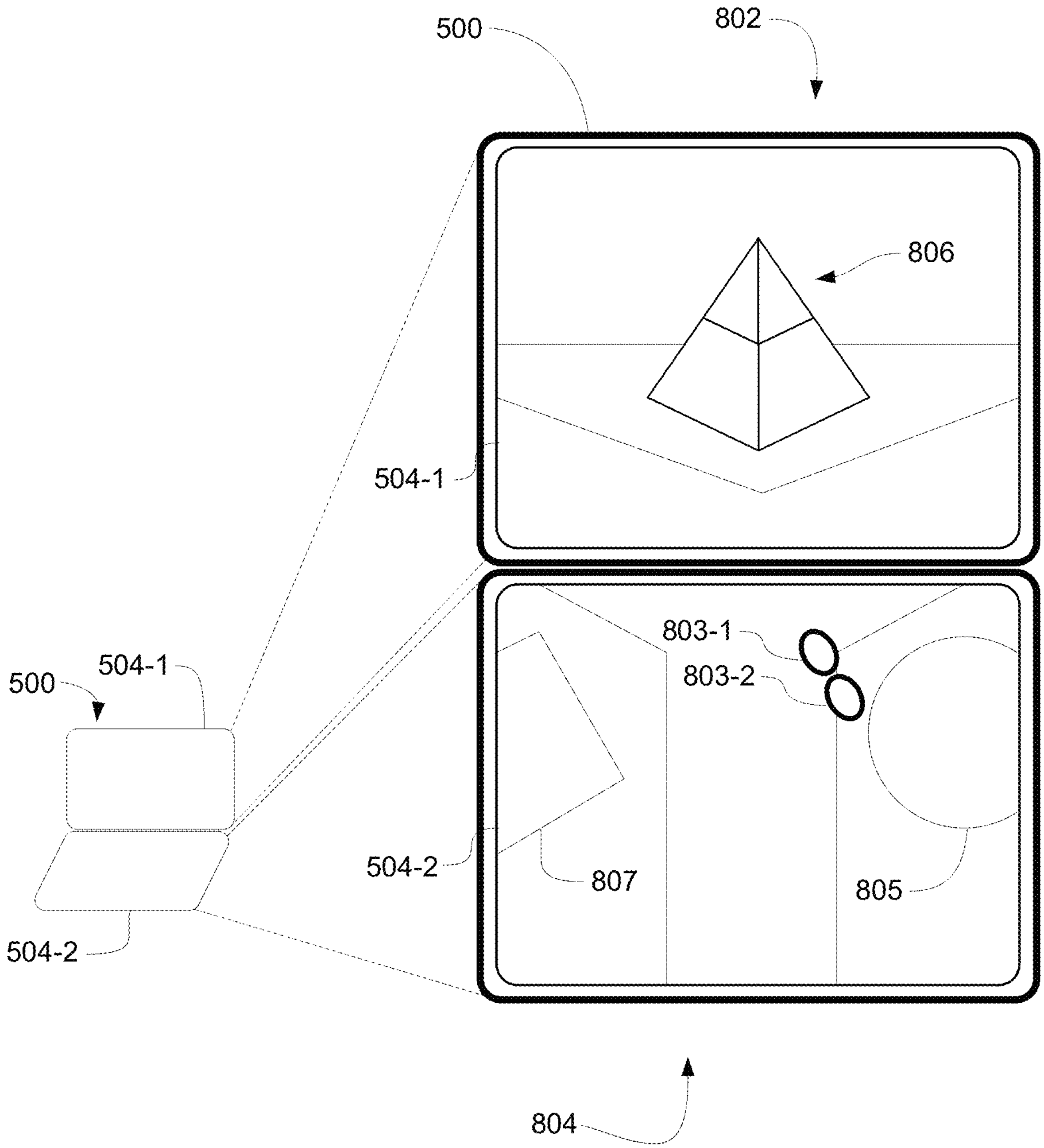
Figure 8C:
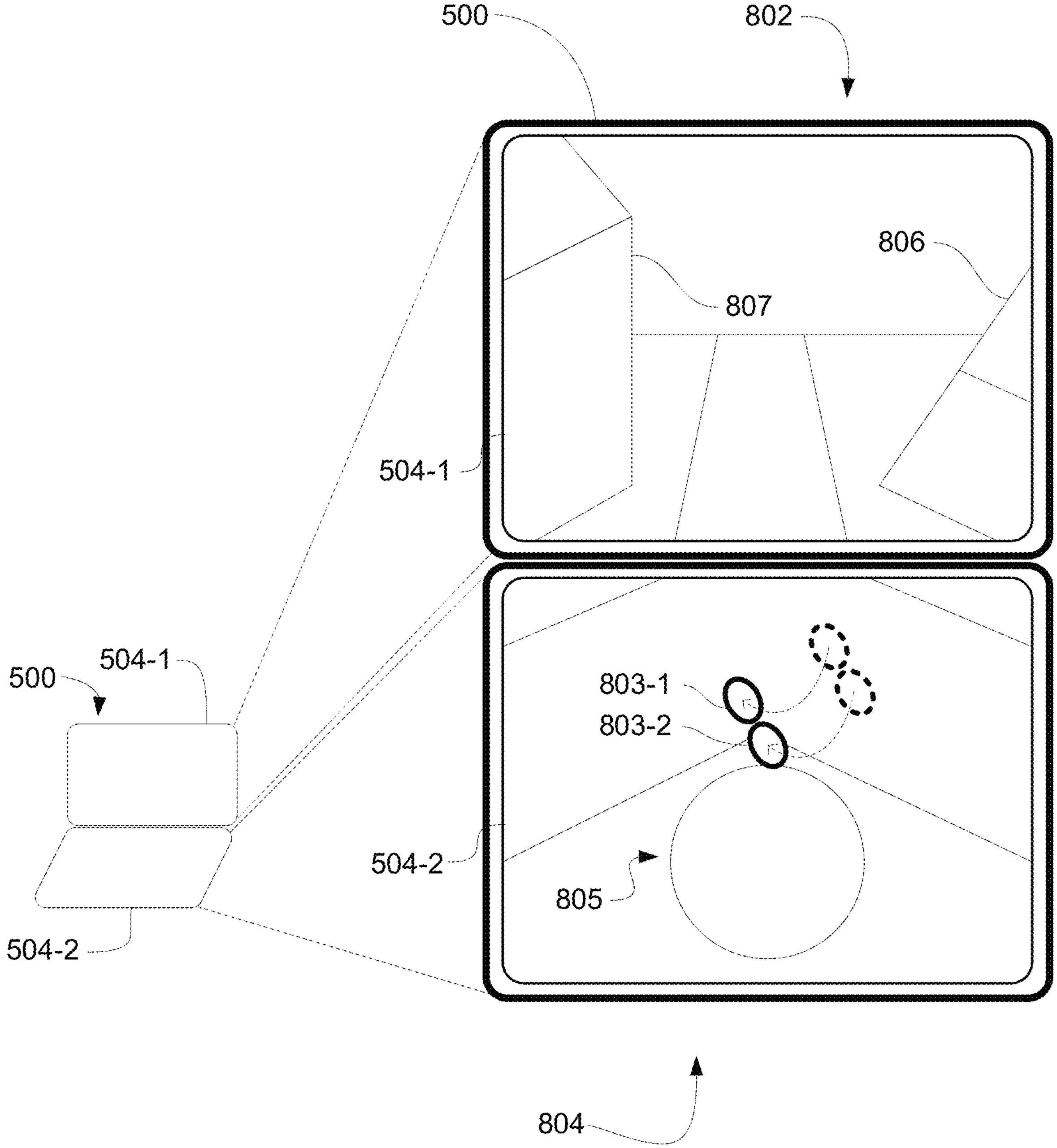
Figure 8D:
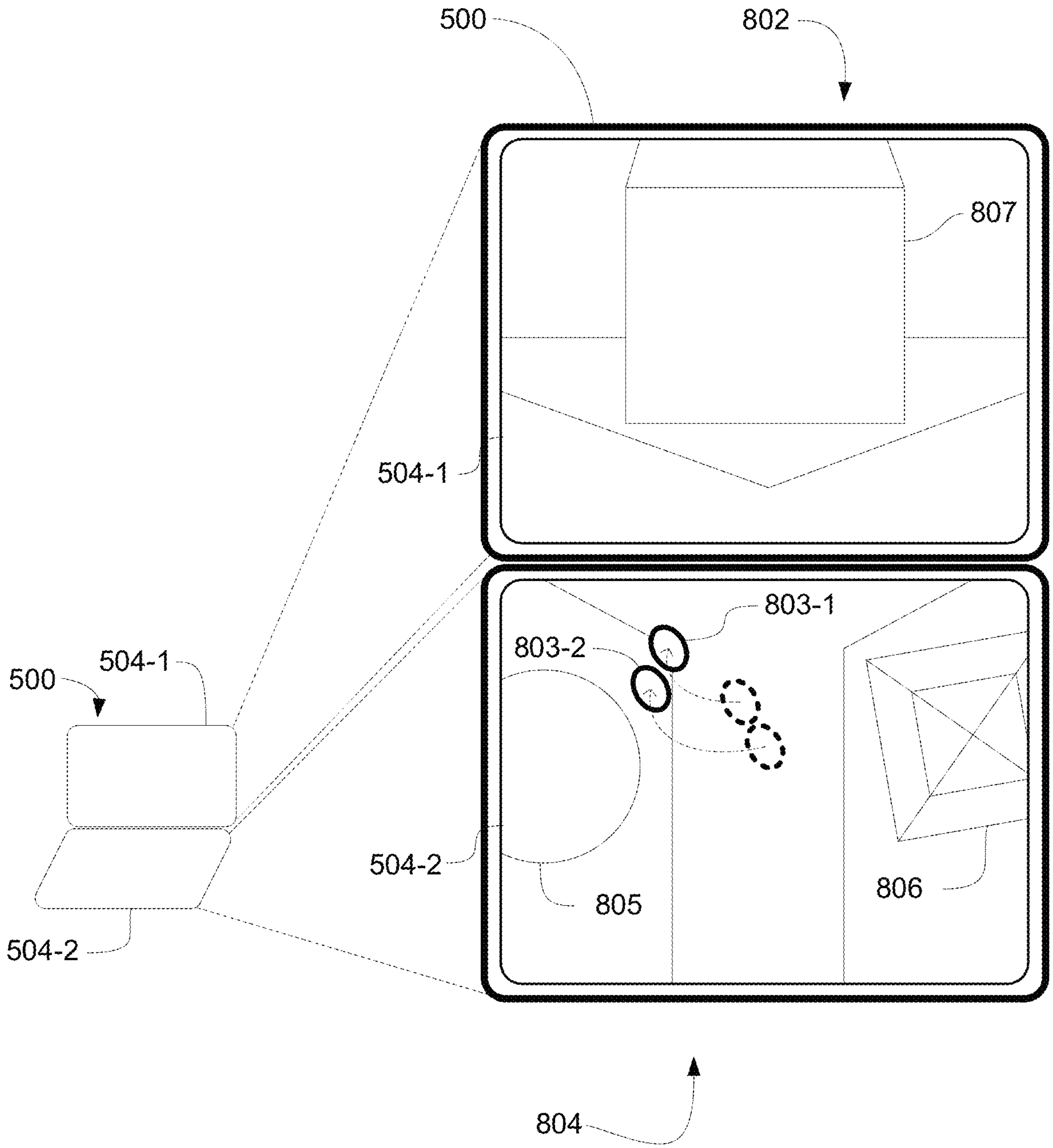
Figure 8E:
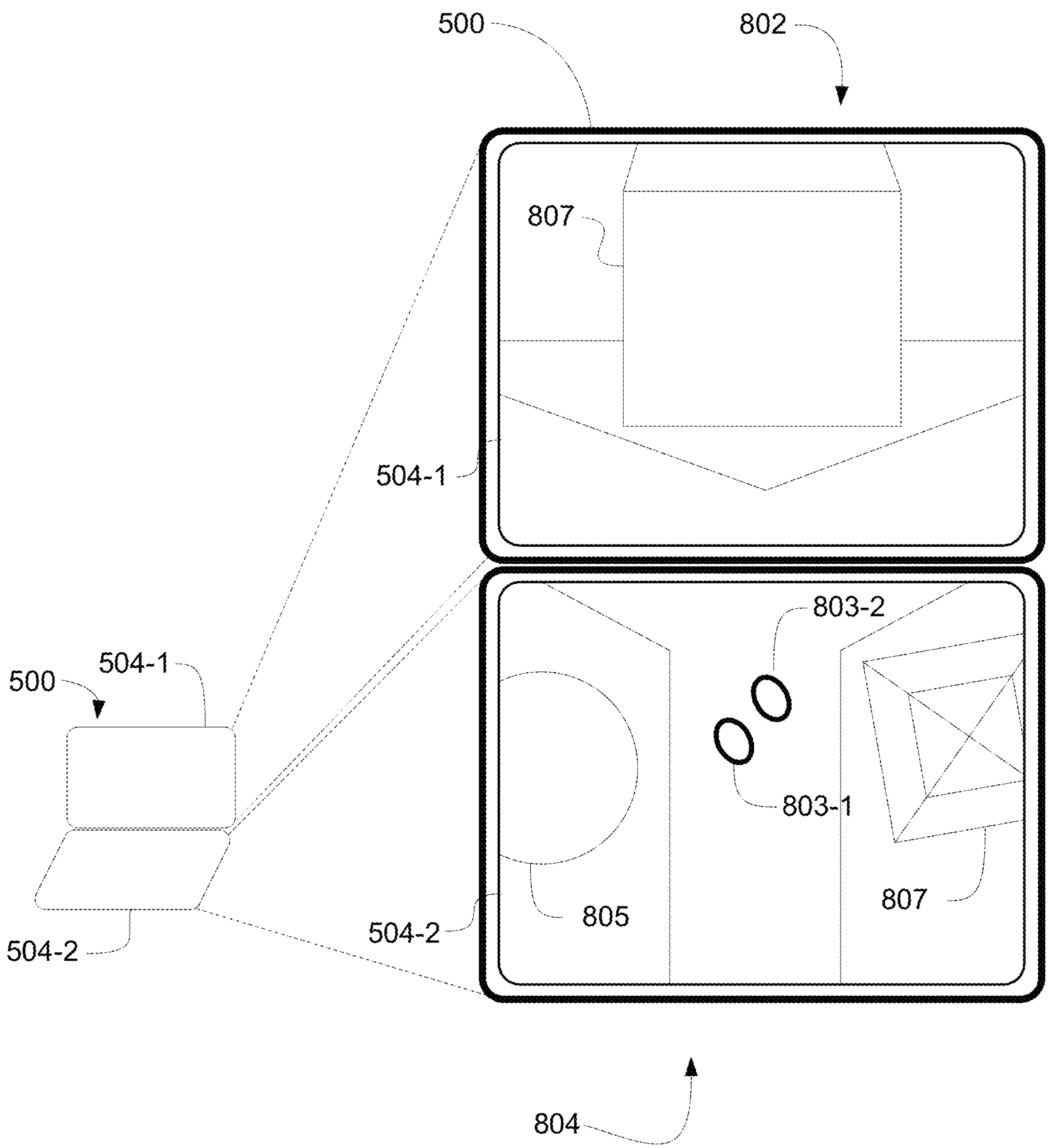
Figure 8F:
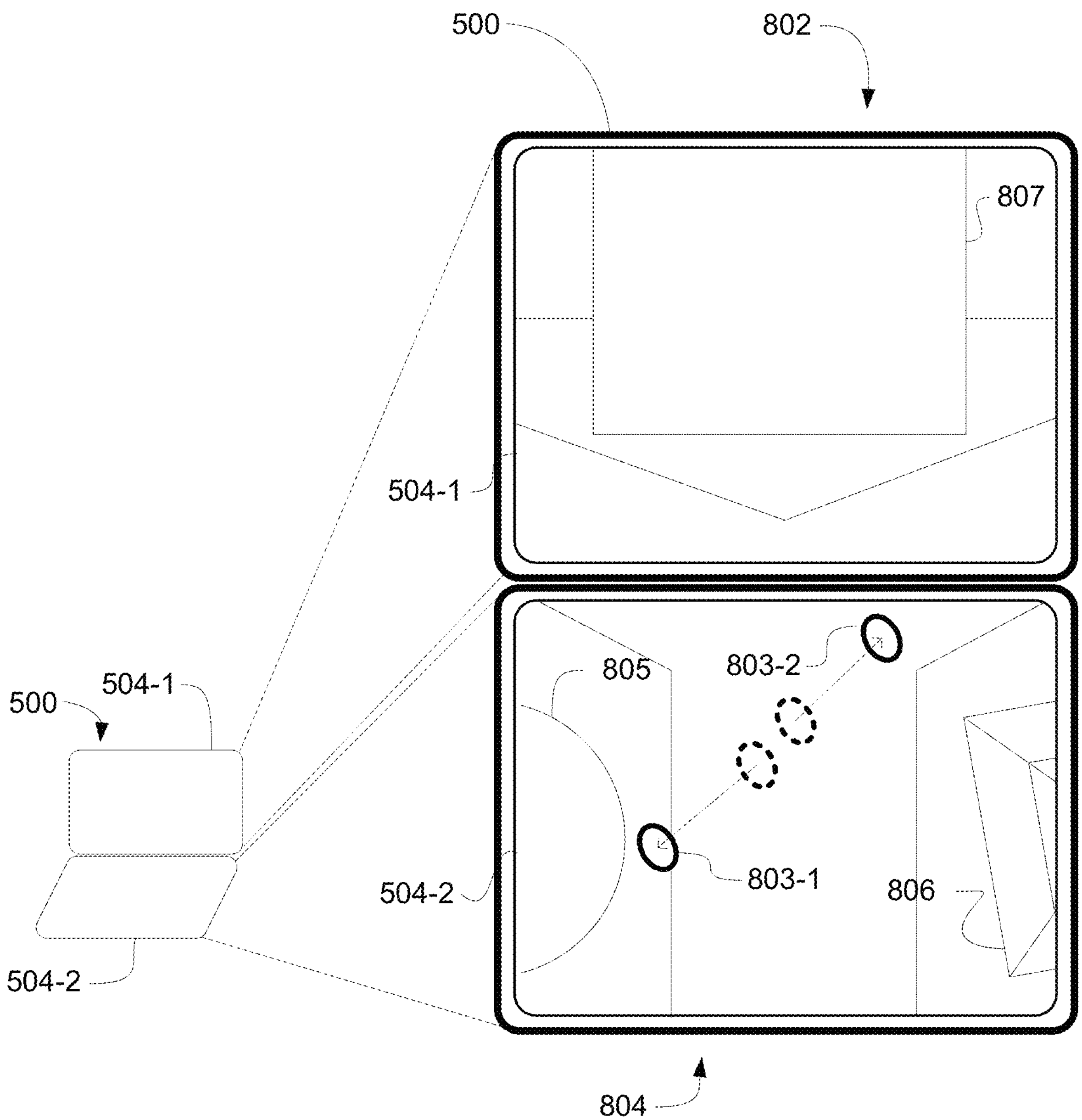
Figure 8G:
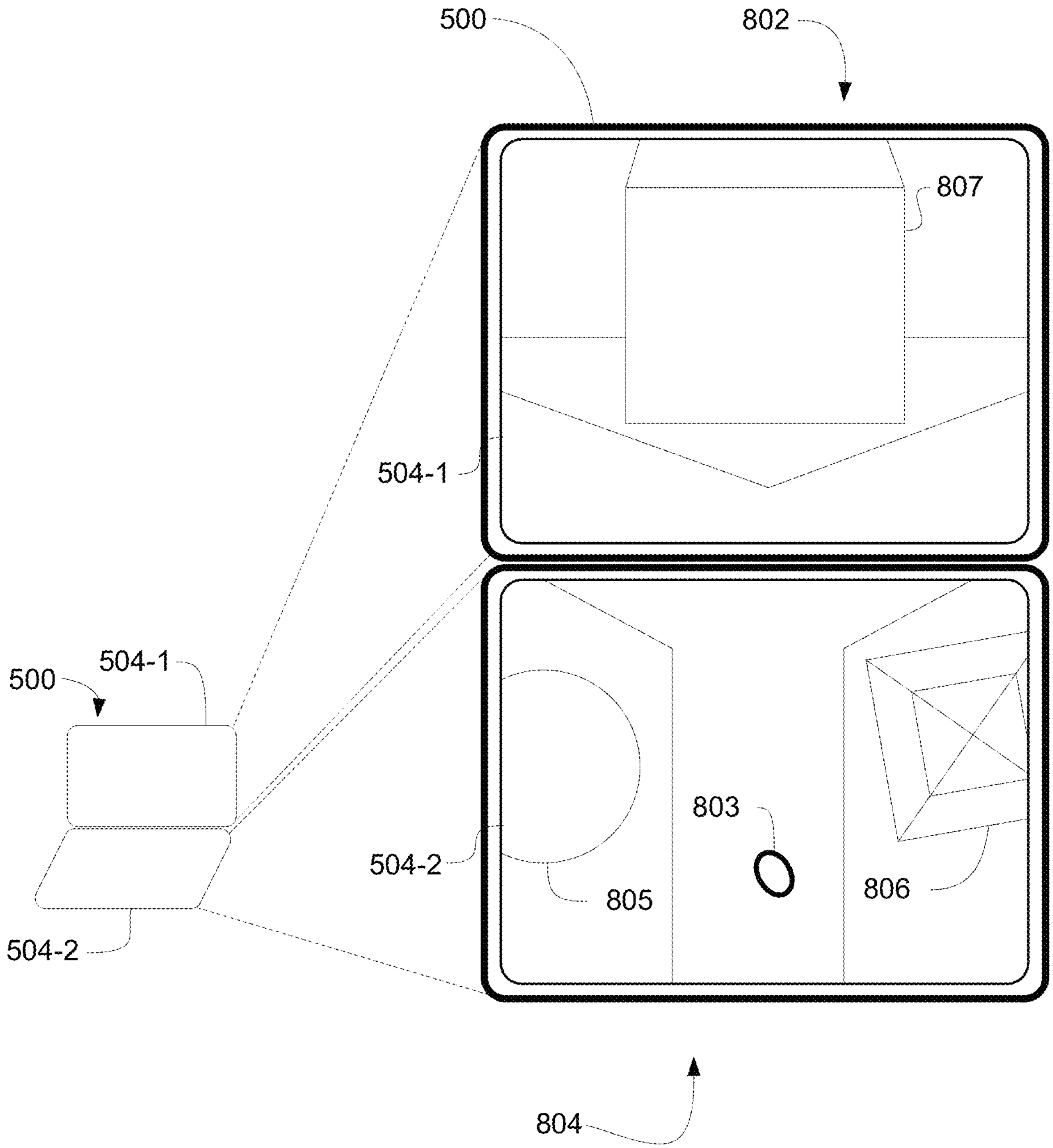
Figure 8H:
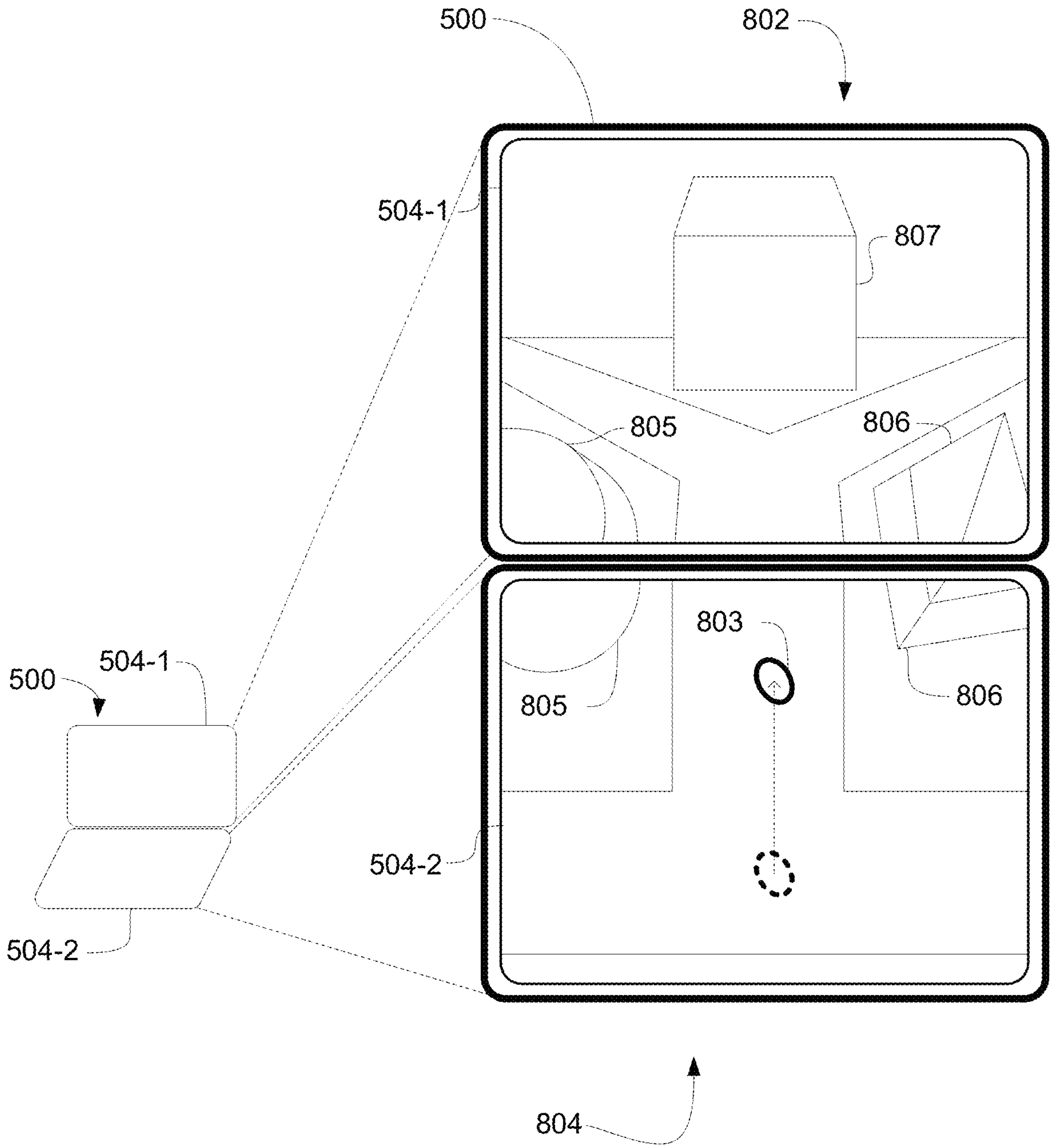
Figure 8I:
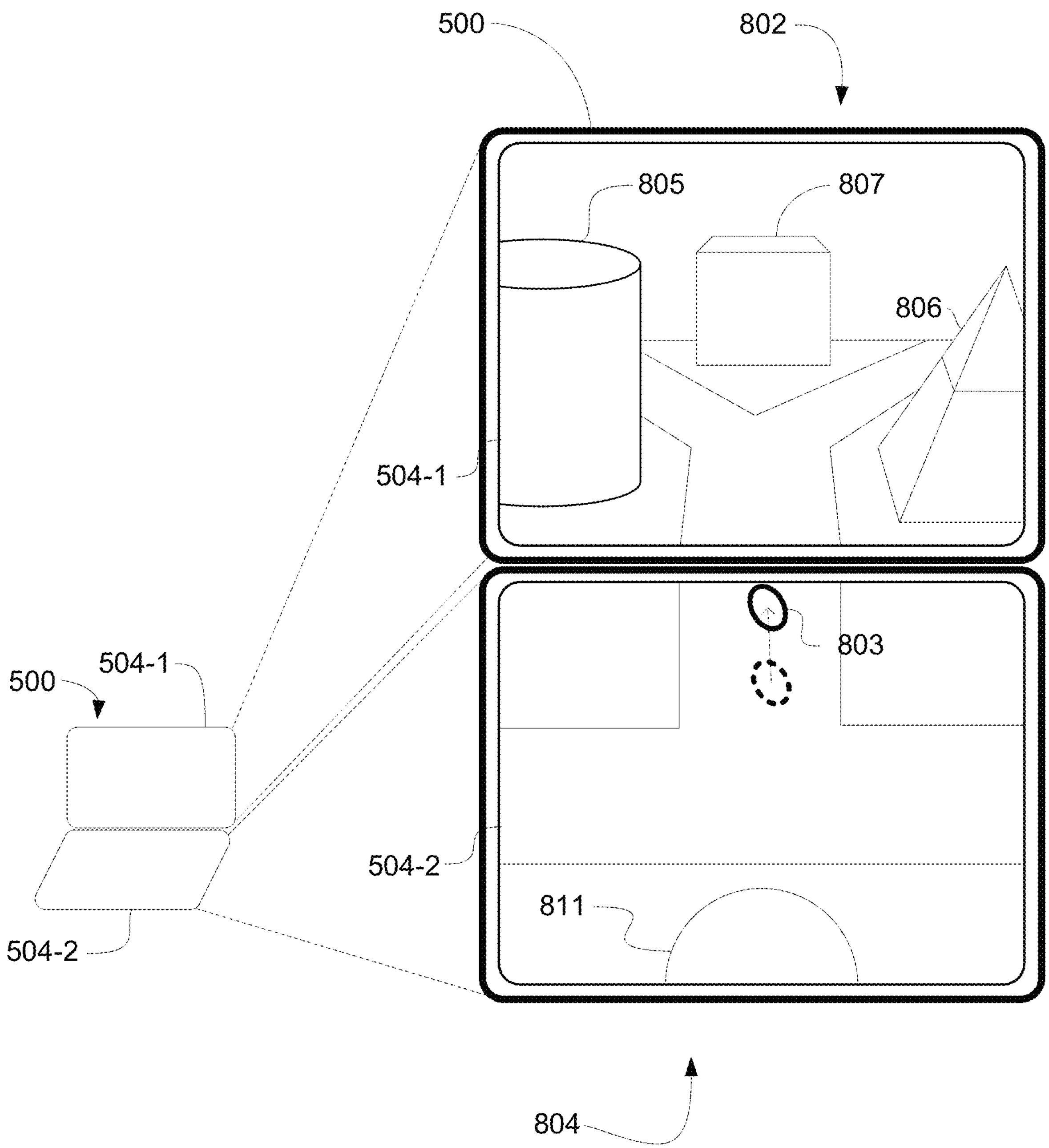
Figure 8J:
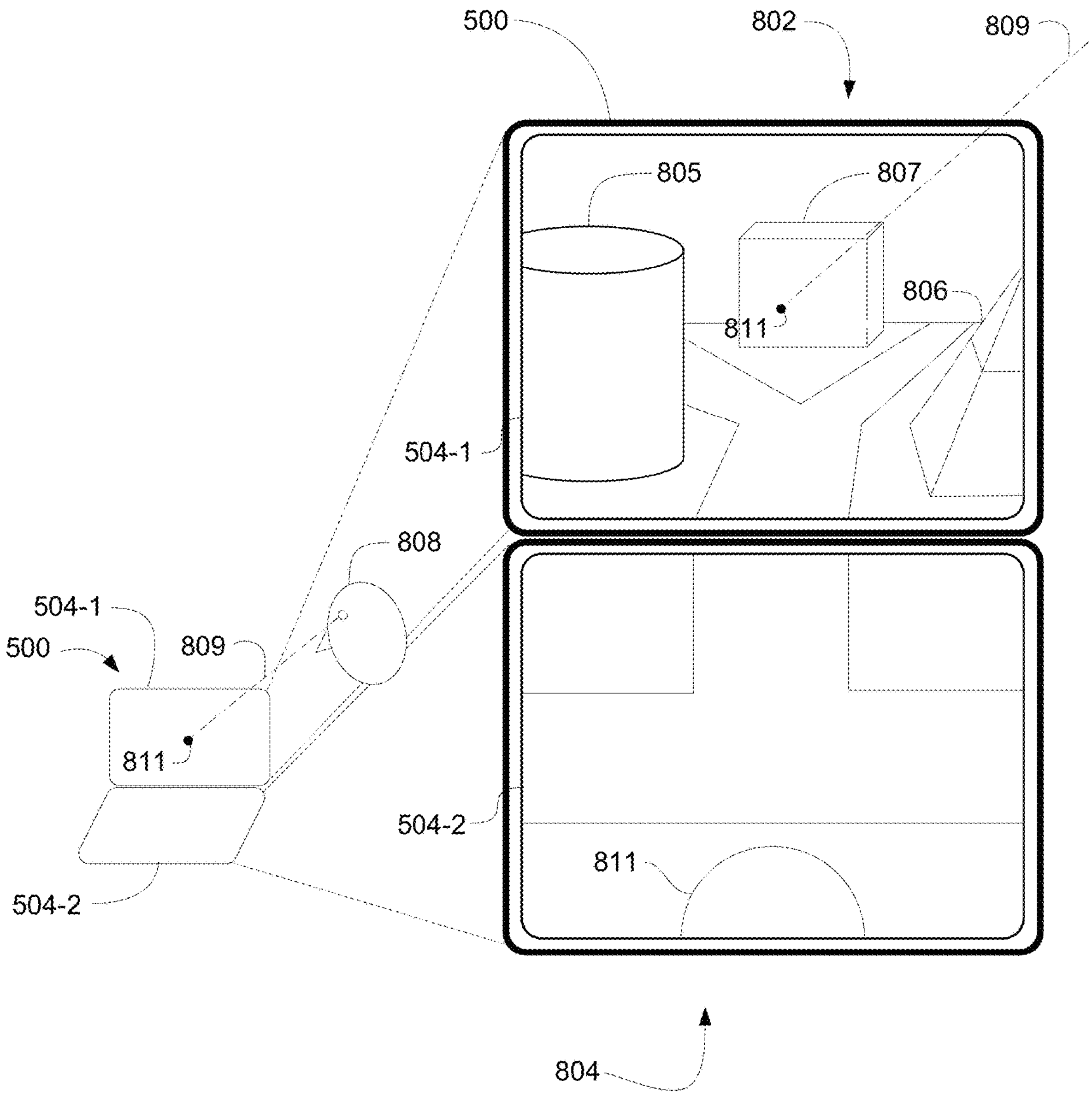
Figure 8K:
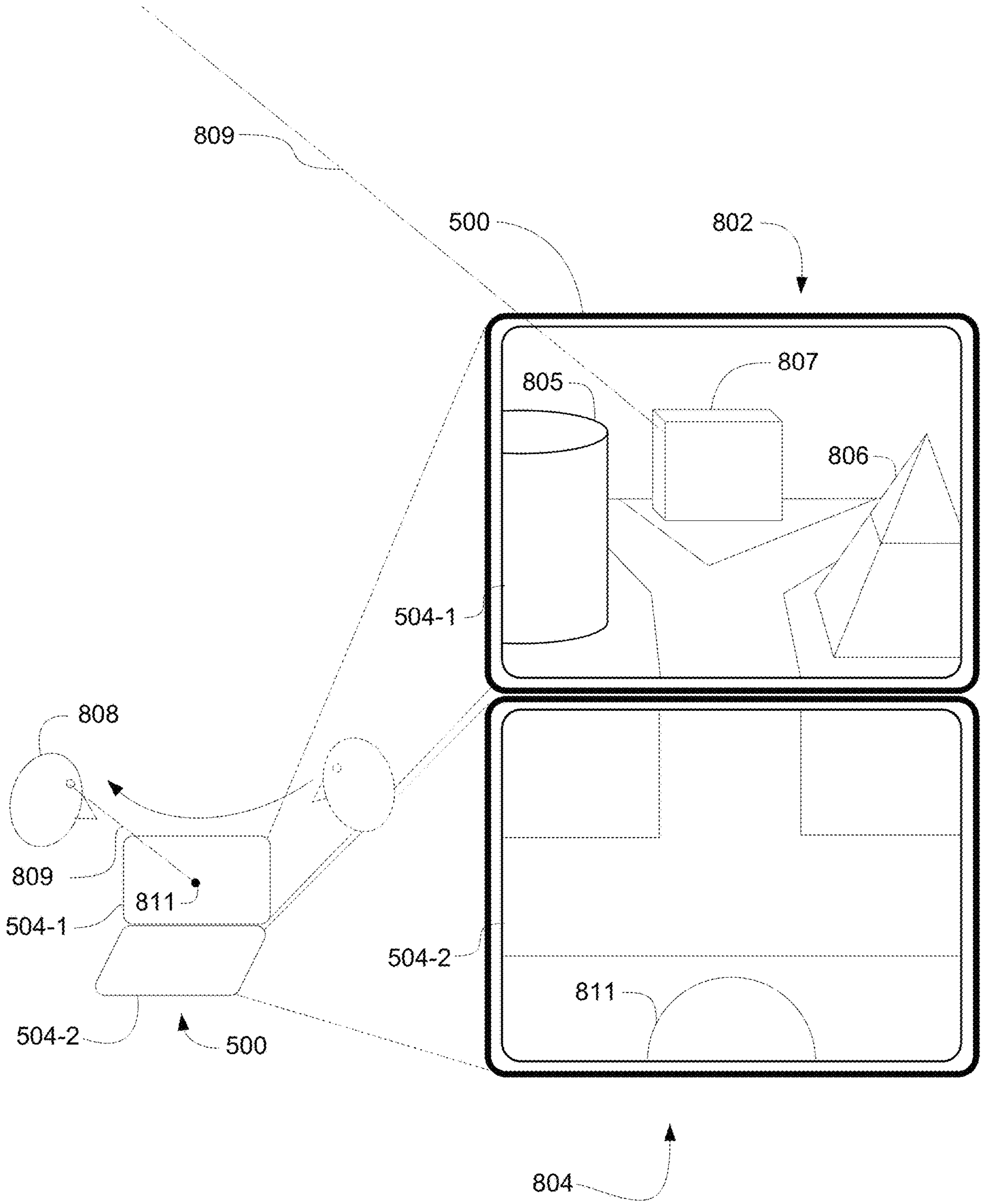
Figure 8L:
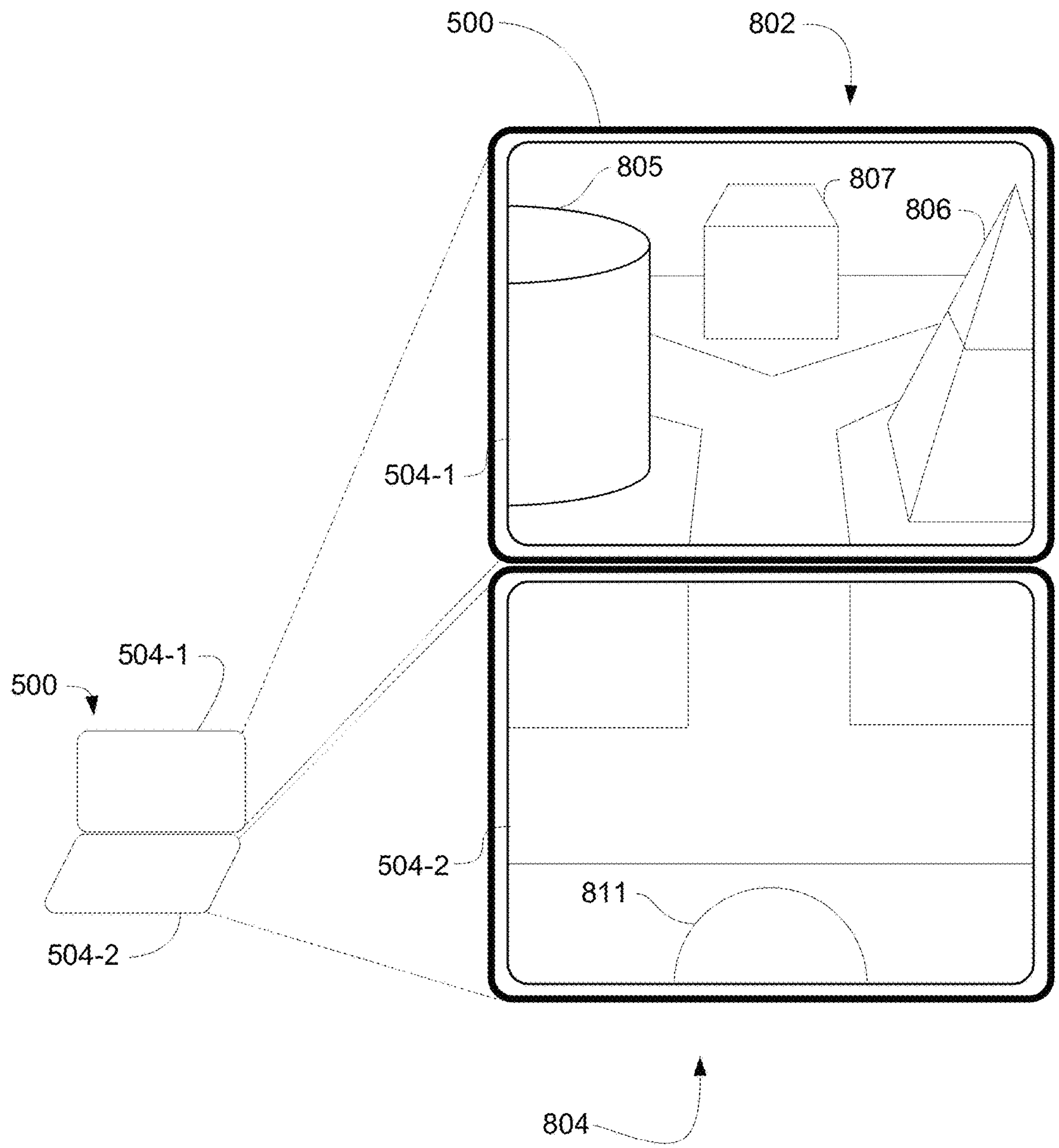
Figure 8M:
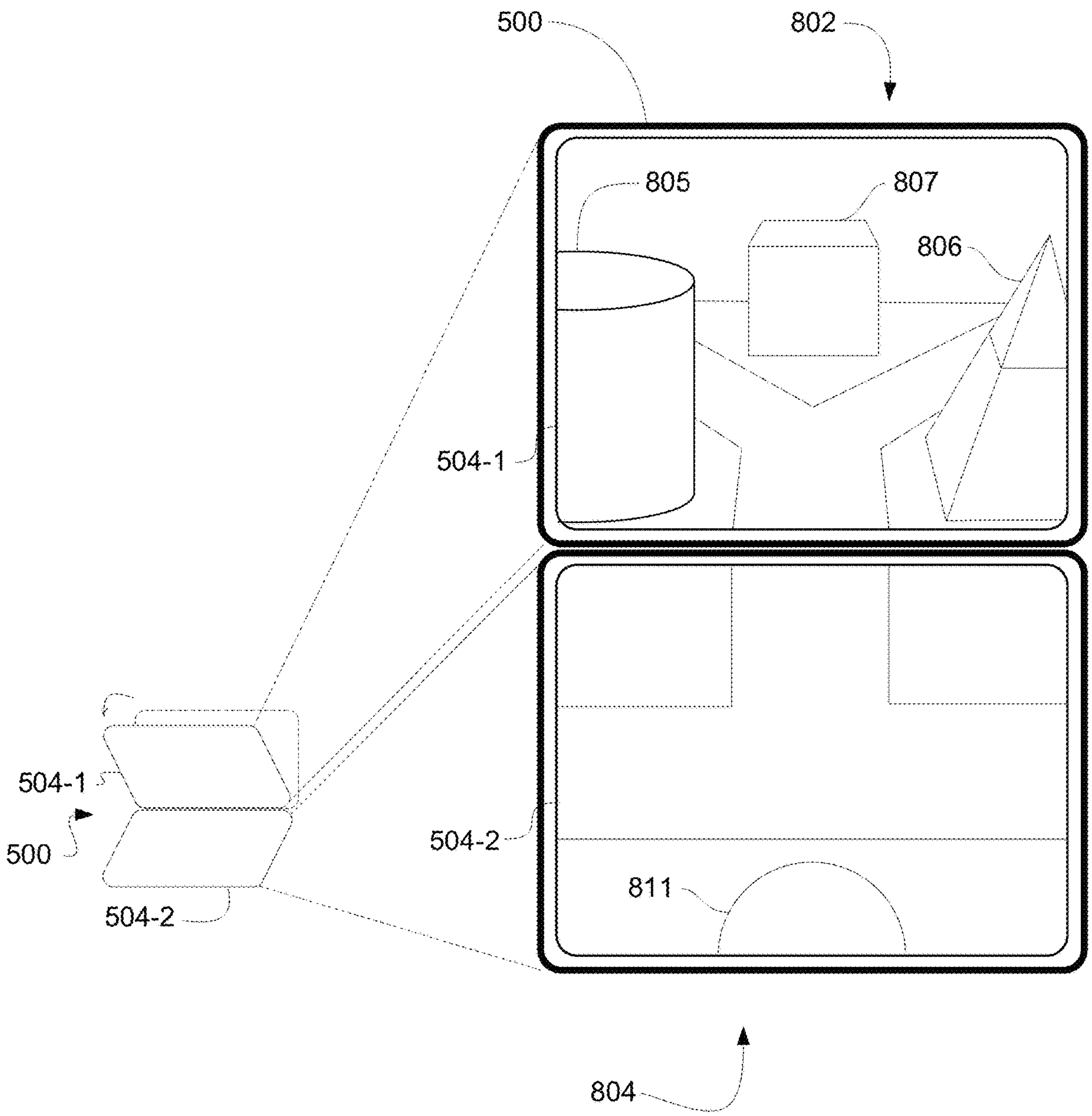
Figure 8N:
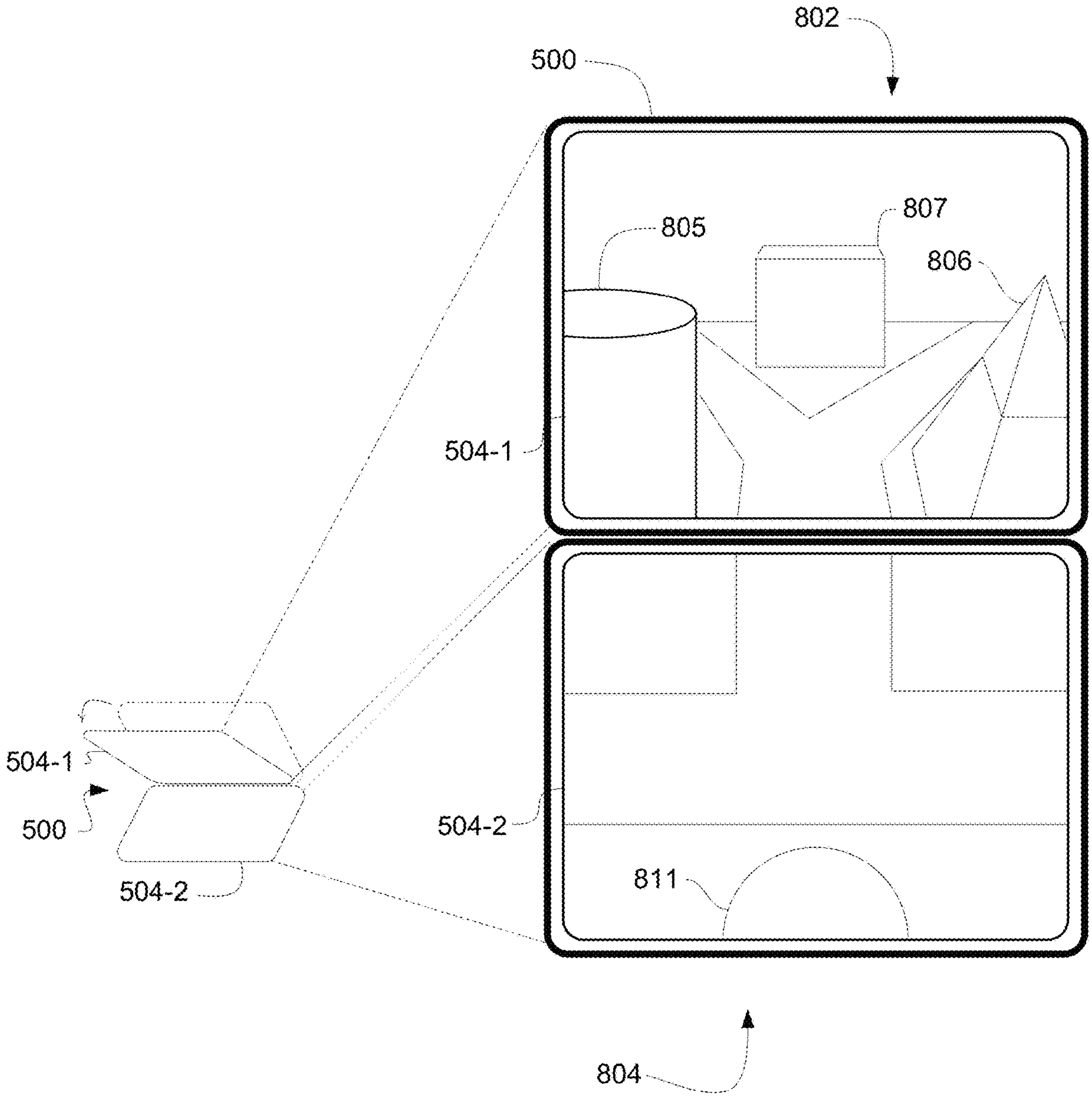

More specifically, FIGS. 8A-8N illustrate various ways electronic device 500 displays three-dimensional content using multiple displays. In some embodiments, the first display 504-1 displays the content from a first perspective (e.g., a side view) and the second display 504-2 displays the content from a second perspective (e.g., a top view). It is understood that in some embodiments, one or both of displays 504-1 and 504-2 are touch screens, such as described with reference to FIGS. 5A-5H.

FIG. 8A illustrates exemplary electronic device 500. Electronic device 500 optionally includes a first display 504-1 and a second display 504-2, such as described with reference to FIGS. 5A-5H. The displays 504-1 and 504-2 optionally display three-dimensional content, such as a map including landmarks 805, 806, and 807. In the example illustrated in FIG. 8A, the first display 504-1 displays a first view 802 of the map (e.g., a side view) and the second display 504-2 displays a second view 804 of the map (e.g., a top view). As shown in FIG. 8A, the first view 802 includes the first landmark 806 and the second view 804 includes the second landmark 805 and the third landmark 807. In some embodiments, displaying the first view 802 of the map on the first display 504-1 and displaying the second view 804 of the map on the second display 504-2 includes opening (e.g., displaying) an application for viewing the map, such as a maps application. Further, the portions of the displayed map on displays 504-1 and 504-2, despite being from different perspectives, optionally spatially connect with each other such that the portion of the map that is cut off on the bottom of display 504-1 is picked up from the top of display 504-2, as shown in FIG. 8A. In other words, device 500 displays the map continuously from display 504-1 to 504-2 (and vice versa), except for changing the perspective from which the map is displayed from display 504-1 to 504-2 (and vice versa). Such continuous display of the displayed content will be illustrated in the text and figures discussed below.

FIGS. 8B-8I illustrate various ways a user is able to interact with a map displayed on electronic device 500 to change the way various parts of the map are displayed. In FIG. 8B, the electronic device 500 detects a first contact 803-1 and a second contact 803-2 on the second display 504-2, which is optionally a contact screen. In FIG. 8C, the electronic device 500-1 detects movement of the first contact 803-1 and the second contact 803-2 in a clockwise circular motion. In response to the detected movement, the electronic device 500 interprets the double-contact clockwise circular motion to be a rotation input and updates (e.g., rotates in a clockwise manner) the first view 802 and the second view 804 in accordance with the rotation input, as shown in FIG. 8C. Specifically, the rotation causes the second landmark 807 to move from the second view 804 on the second display 504-2 (where it was displayed from the second perspective, such as a top view) to the first view 802 on the first display 504-1 (where it is now displayed from the first perspective). Additionally, the first landmark 806 is shifted within the first view 802 of the map and the third landmark 805 is shifted within the second view 804 of the map. In some embodiments, the command to rotate the map causes the electronic device 500 to simulate turning within the displayed virtual content. Portions of the map other than landmarks 805, 806 and 807 are similarly displayed through the rotation while maintaining or changing the perspectives of their views depending on whether they move between displays 504-1 and 504-2.

In FIG. 8D, the electronic device 500 detects further clockwise circular movement of the contacts 803-1 and 803-2 on the second display 504-2. In response to the detected movement, the electronic device 500 rotates the first view 802 of the map and the second view 804 of the map in accordance with the movement of the contacts 803-1 and 803-2. As shown in FIG. 8D, the second landmark 807 shifts and rotates within the first view 802 of the map in accordance with the rotation, the third landmark 805 shifts within the second view 804 of the map, and the first landmark 806 moves from the first view 802 to the second view 804 of the map (and is displayed from a different perspective as a result).

In FIG. 8E the electronic device 500 detects a first contact 803-1 and a second contact 803-2 on the second display 504-2. In FIG. 8F, the electronic device 500-1 detects movements of the first contact 803-1 and the second contact 803-2 in opposite directions. In response to the detected movements of the first contact 803-1 and the second contact 803-2, the device 500 identifies the input as a zoom-in input, and zooms into the first view 802 and the second view 804 of the map displayed on displays 504-1 and 504-2. As shown in FIG. 8F, the portions of the map displayed on displays 504-1 and 504-2 are enlarged in a corresponding manner. For example, the second landmark 807 increases in size within the first view 802 of the map, and the first landmark 806 and the third landmark 805 increase in size within the second view 804 of the map and run partially outside of the second view 804 of the map.

The map is similarly continuously displayed in response to other manipulations of the map. For example, in FIG. 8G, the electronic device 500 detects a contact 803 at the second display 504-2. In FIG. 8H, the electronic device 500 detects an upward movement of the contact 803 towards the first display 504-1. In response to the detected movement of the contact 803, the electronic device translates the map in the first view 802 and the second view 804 in corresponding and coordinated manners. As shown in FIG. 8H, the second landmark 807 moves back in the first view 802 as the map moves towards the first display 504-1 (e.g., as if the user has pushed the map "back" into the horizon). The first landmark 806 and the third landmark 805 become partially in the first view 802 and partially in the second view 804, and are shown both as three-dimensional objects in the first view 802 (e.g., from a side view) and as two-dimensional objects (e.g., a top view of three-dimensional objects) in the second view 804 as they move in accordance with the detected movement of the contact 803. In FIG. 8I, the electronic device 500 detects further movement of the contact 803 in an upward direction towards the first display 504-1. In response to the detected movement, the second landmark 807 moves further backward in the first view 802 of the map. The first landmark 806 and the third landmark 805 move completely into the first view 802 of the map, disappearing from the second view 804 of the map on the second display 504-2, and the second view 804 of the map is updated to display a fourth landmark 811 that is now visible upon translating the map.

FIGS. 8J-8K illustrate various ways the electronic device 500 optionally updates the views of three-dimensional content in accordance with the position of the user's head. In some embodiments, the electronic device 500 includes a camera or other sensor that detects the relative position 809 (e.g., orientation) of a user's head 808 with respect to a reference point 811 on the electronic device. In the example of FIGS. 8J-8K, the reference point 811 is located in the center of the first display 504-1. The three-dimensional content displayed by the electronic device 500 optionally includes a map displayed by a maps application, such as described in FIGS. 8A-8I.

In FIG. 8J, the electronic device 500 detects the relative position 809 between the user's head 808 and a reference point 811 of the electronic device, which is to the right and/or above of the device 500 and/or displays 504-1 and 504-2. In response to detecting the position 809 of the user's head 808, the device 500 optionally repositions the first view 802 of the map to maintain the appearance of continuity with the second view 804 of the map and to shift and/or rotate map in a realistic manner. For example, in FIG. 8J, the user's head 808 is to the right of the electronic device and the first view 802 of the three-dimensional content illustrates the right side of the second landmark 807 (e.g., as if the user is looking into the map-environment through display 504-1 from the right). Additionally, the path between the landmarks 805-807 shifts towards the user's head 808, and the first landmark 806 and the third landmark 805 also translate towards the user's head. Optionally, the second view 804 of the map remains unchanged, though in some embodiments, the second view 804 of the map is also changed in accordance with the orientation 809 of the user's head 808. In FIG. 8K, the electronic device 500 detects that the user's head 808 moves from the right side of the electronic device to the left side of the electronic device. In response to the detected movement, the first view 802 of the map is updated to show the left side of the second landmark 807, as shown in FIG. 8K (e.g., as if the user is looking into the map-environment through display 504-1 from the left). Additionally, the path between the landmarks 805-807 shifts towards the user's head 808, and the first landmark 806 and the third landmark 805 also translate towards the user's head. Optionally, the second view 804 of the map remains unchanged, though in some embodiments, the second view 804 of the map is also changed in accordance with the orientation 809 of the user's head 808.

FIGS. 8L-8N illustrate various ways the electronic device 500 optionally updates three-dimensional content displayed on display 504-1 and 504-2 in accordance with the angle between the first display 504-1 and the second display 504-2. In some embodiments, the electronic device 500 is optionally configured in a clamshell arrangement (e.g., as described with reference to FIG. 6A-6LL, for example), wherein the first display 504-1 is fully or partially upright and the second display 504-2 rests on a flat surface (e.g., a table, a desk, or the user's lap). In some embodiments, the angle between the first display 504-1 and the second display 504-2, which are attached together by a hinge or similar mechanism, is adjustable. The three-dimensional content optionally includes a map displayed by a maps application, such as described with reference to FIGS. 8A-8K.

In FIG. 8L, the electronic device 500 displays the map in a first view 802 on the first display 504-1 and in a second view on the second display 504-2, as previously described. The first view 802 of the map includes the first landmark 806, the second landmark 807, and the third landmark 805 rendered in three-dimensions. The second view 804 includes the fourth landmark 811 from a top view in two dimensions. In some embodiments, the perspective from which the electronic device 500 displays the content of map on display 504-1 is defined by the relative orientation of display 504-1 to 504-2. For example, in FIG. 8M, the first display 504-1 is repositioned so as to change (e.g., reduce) the angle between the first display and the second display 504-2. In response to the change in the angle between the first display 504-1 and the second display 504-2, the electronic device 500 changes the first view 802 of the map displayed on the first display 504-1 as though the displays act as viewports into virtual content (e.g., the map). For example, changing the angle between the first display 504-1 and the second display 504-2 optionally changes the angle at which the map is viewed. As shown in FIG. 8M, updating the first view 802 of the map displayed on the first display in response to the reduced angle between display 504-1 and display 504-2 includes shifting the landmarks 805-807, horizon, and path (and other features in view 802) down towards the second display 504-2 in accordance with the change in angle between the displays to give the appearance of a change in viewing angle of the map (e.g., as if the viewing angle of display 504-1 is moving up as display 504-1 is titled towards display 504-2). In FIG. 8N, the first display 504-1 is titled further towards display 504-2, and the angle at which the map is viewed in the first view 802 changes further in accordance with the change in the angle between the first display 504-1 and the second display 504-2.

Figure 8O:
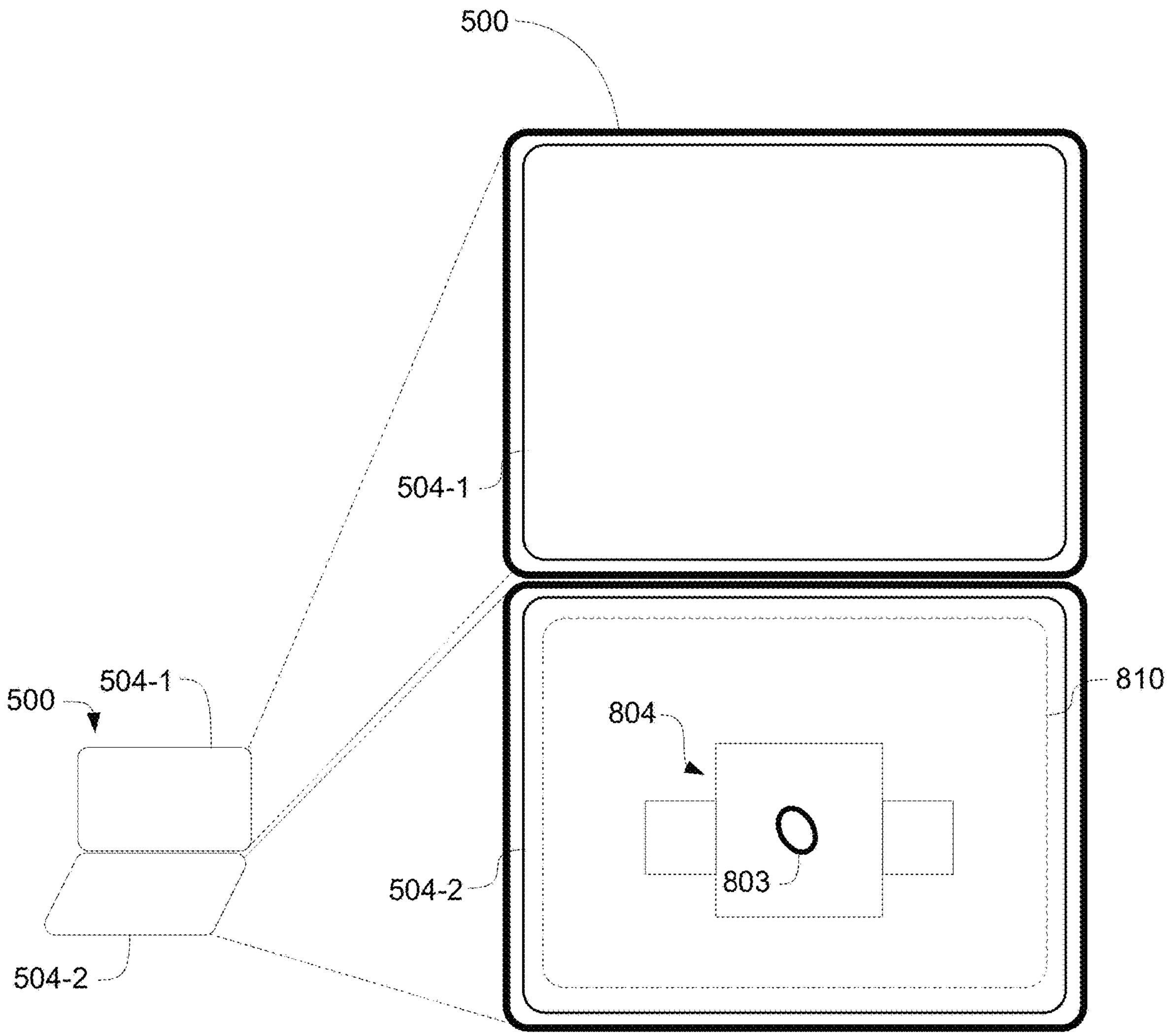
Figure 8P:
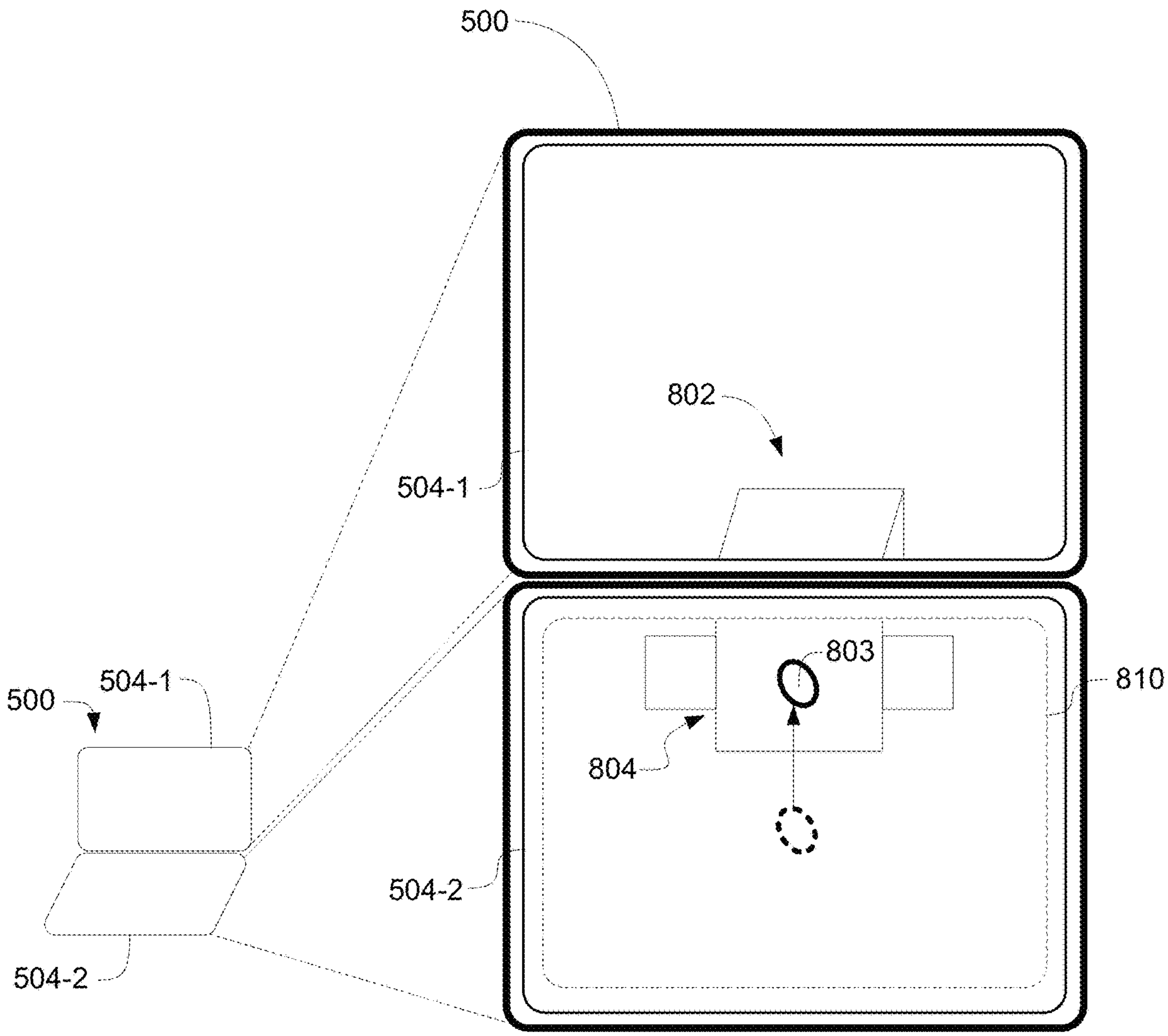
Figure 8Q:
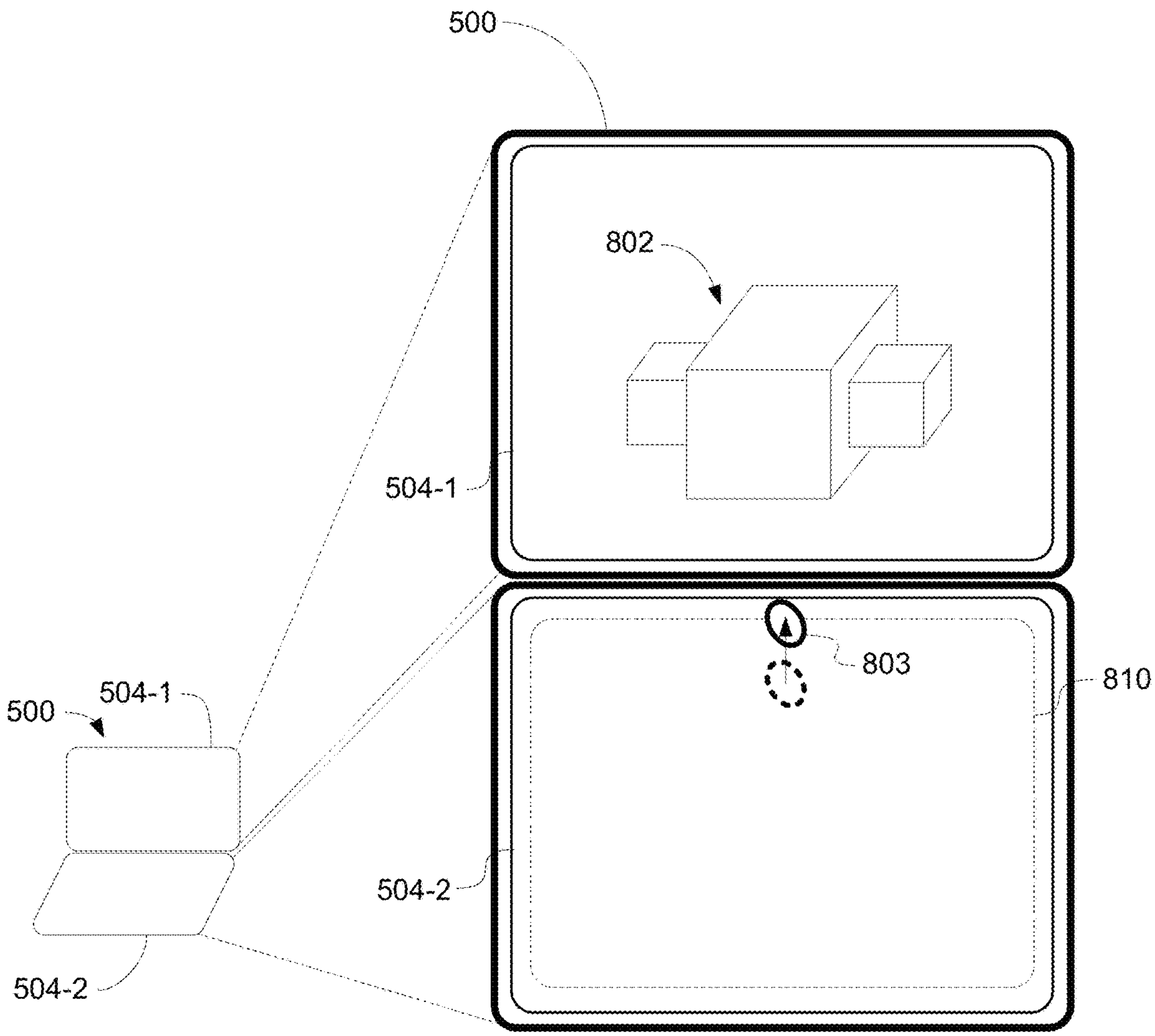

FIGS. 8O-8Q illustrate various ways the electronic device 500 switches from rendering content as a two-dimensional drawing to rendering it as a three-dimensional virtual model. In some embodiments, the user optionally creates the content in a drawing application (e.g., a CAD application) by creating a two-dimensional drawing of the content, and then rendering the content as a three-dimensional model. For example, FIG. 8O illustrates a two-dimensional rendering of content 804 displayed on the second display 504-2 of electronic device 500 (e.g., the user has created the two-dimensional content 804 on display 504-2). In FIG. 8O, the electronic device 500 is in a clamshell configuration (e.g., as described with reference to FIG. 6A-6LL, for example), wherein the first display 504-1 is fully or partially upright and the second display 504-2 rests on a flat surface (e.g., a table, a desk, or the user's lap). The content 804 is optionally created in a drawing application user interface 810 displayed on the second display 504-2. In some embodiments, a user is able to move the content 804 to display 504-1 to render the content in three-dimensions. For example, as shown in FIG. 8O, the electronic device 500 detects a contact 803 on the content 804 within the drawing user interface 810. In FIG. 8P, the electronic device detects a movement of the contact towards display 504-1 to drag the content 804 towards the first display 504-1. In response to the dragging motion, the content 804 is moved towards, and partially onto, the first display 504-1, as shown in FIG. 8P. The portion of the content 804 displayed on the first display 504-1 is rendered as part of a three-dimensional model 802, and the portion of the content 804 displayed on the second display 504-2 remains displayed as two-dimensional content. In FIG. 8Q, the electronic device 500 detects the dragging motion continuing to the edge of the drawing user interface 810 displayed on the second display 504-2, towards display 504-1. In response to the dragging motion reaching the edge of the drawing user interface, the content 804 is "pushed" from the second display 504-2 to the first display 504-1 and rendered entirely as a three-dimensional model 802. In some embodiments, the content is rendered in three dimensions in response to a push that does not reach the edge of the drawing user interface 810 (e.g., a partial push).

Figure 8R:
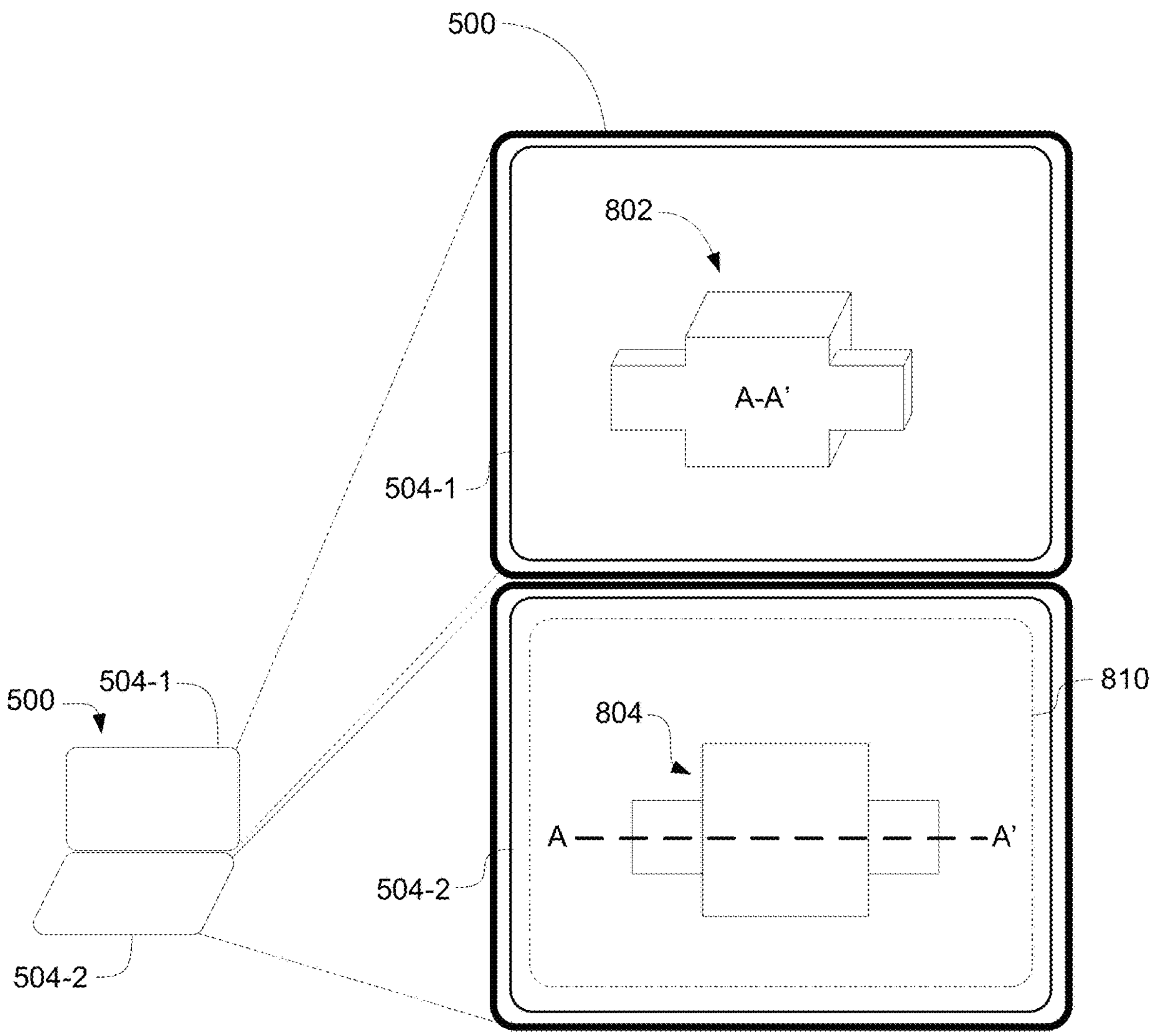
Figure 8S:
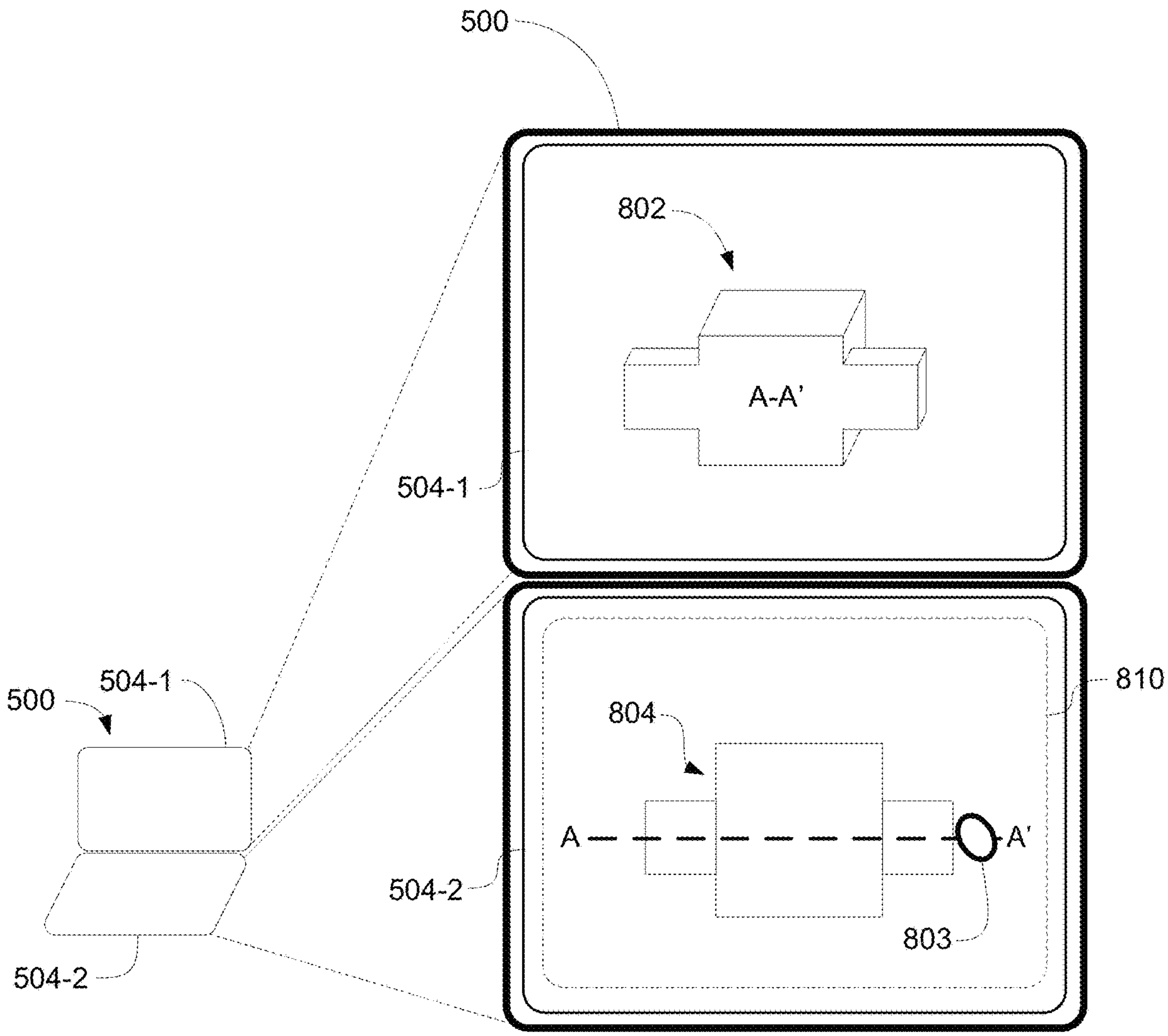
Figure 8T:
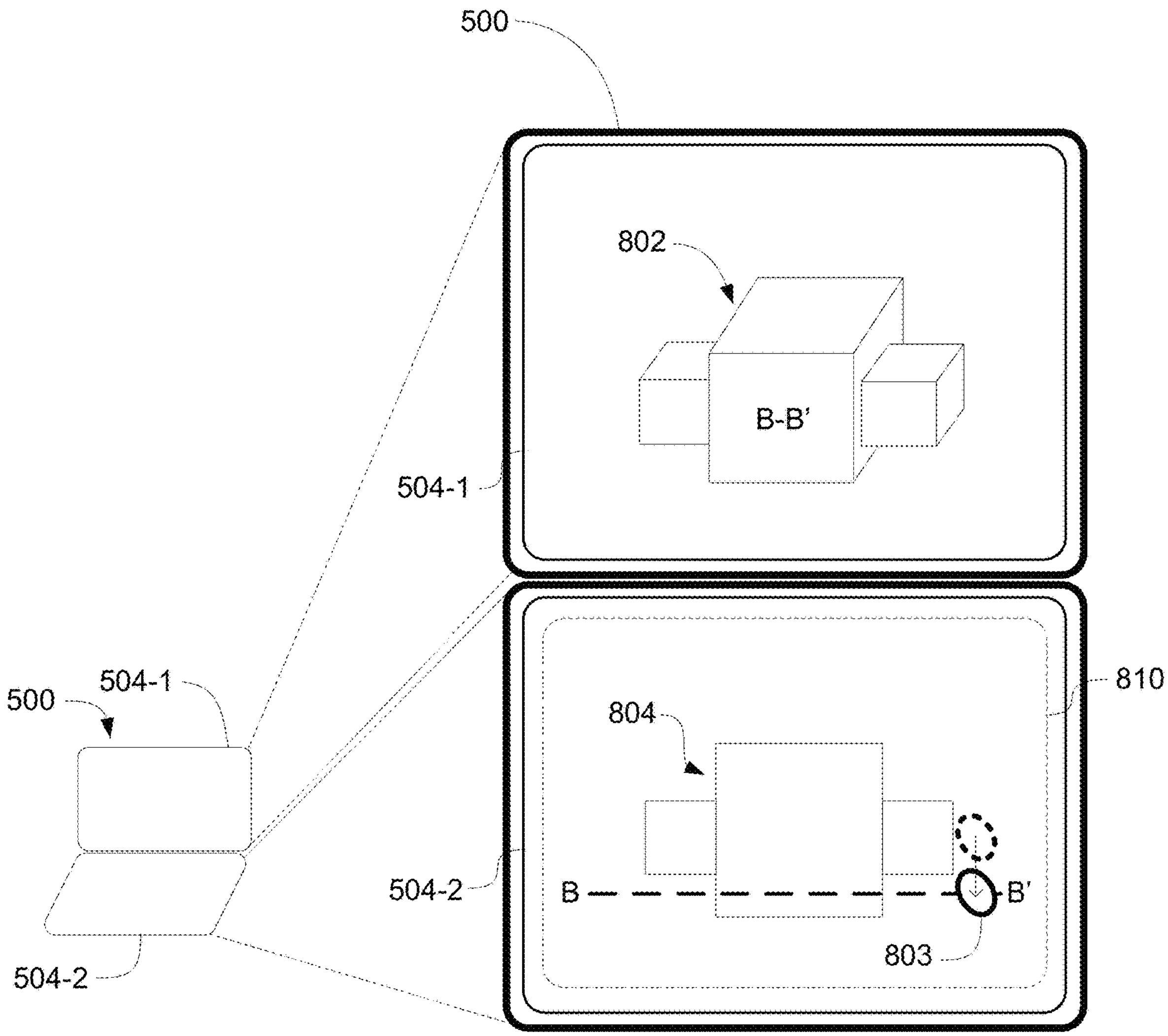

FIGS. 8R-8T illustrate various ways the electronic device 500 presents a cross-sectional view of a three-dimensional model. For example, the user optionally creates a three-dimensional model using a drawing application (e.g., a CAD application) and selects a cross-section at which to view the three-dimensional model. For example, in FIG. 8R, the electronic device 500 displays content 804 in two dimensions with a representation of cross section A-A' within drawing user interface 810 displayed on the second display 504-2. The content 804 is additionally concurrently rendered as a three-dimensional model 802 displayed on the first display 504-1. The three-dimensional model 802 illustrates the three-dimensional view of the cross section A-A' indicated on the second display 504-2, as shown in FIG. 8R. In FIG. 8S, the electronic device detects a contact 803 on the representation of the cross section A-A' displayed on the second display 504-2. In FIG. 8T, the electronic device detects movement of the contact 803. In response to the movement, the cross-section is moved to line B-B', and the three-dimensional view 802 displayed on the first display 504-1 is updated to display the three-dimensional view of cross-section B-B', as shown in FIG. 8T.

Figure 8U:
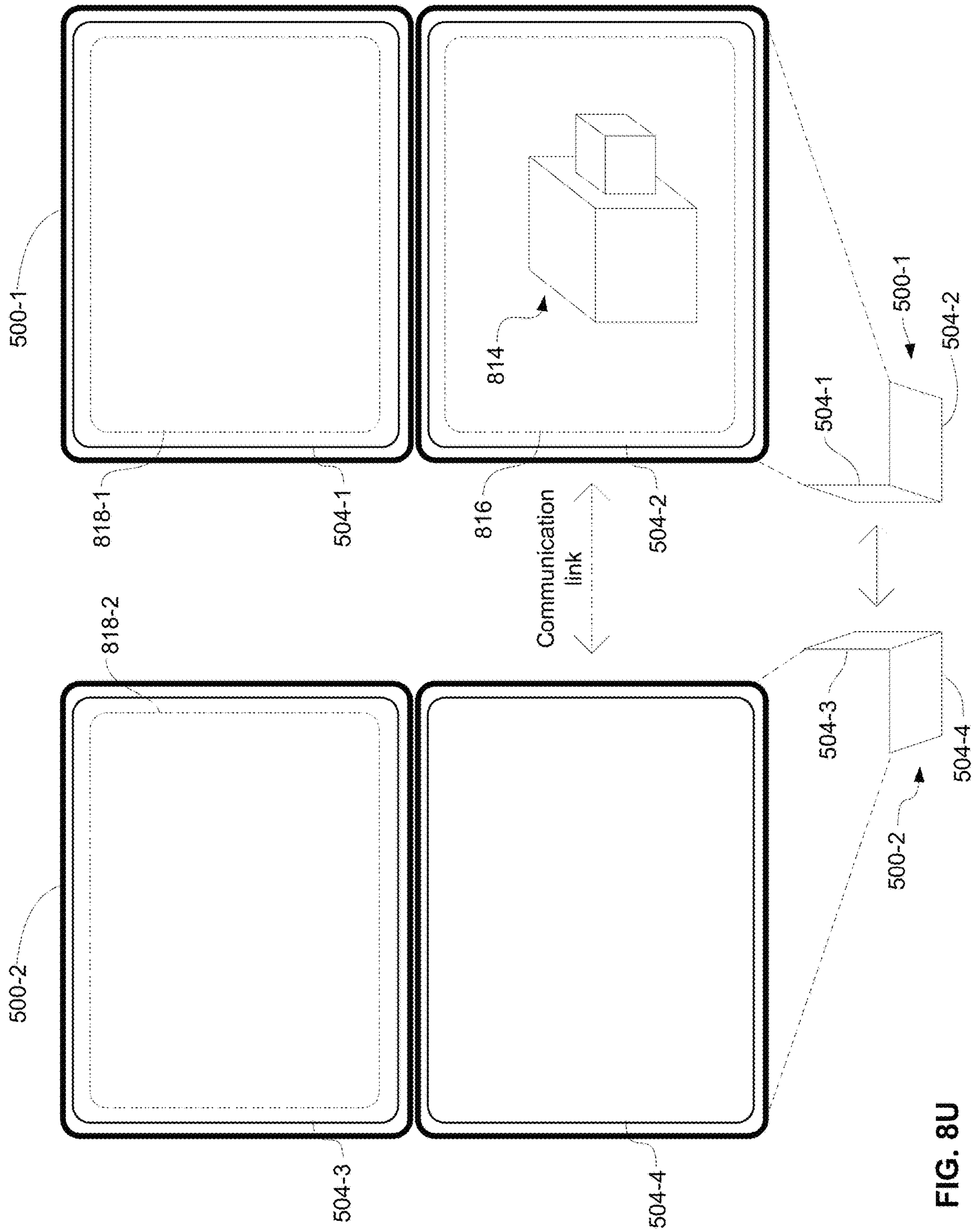

FIGS. 8U-8HH illustrate various ways a first electronic device 500-1 and a second electronic device 500-2 optionally present shared content and handle user input to interact with the shared content. In some embodiments, the first electronic device 500-1 and the second electronic device 500-2 are in communication with one another by way of a communication link (e.g., a wired or wireless connection). While connected, the first electronic device 500-1 and the second electronic device 500-2 optionally "share" content by transmitting to each other one or more files corresponding to the content, or to a visual representation of the content.

Figure 8V:
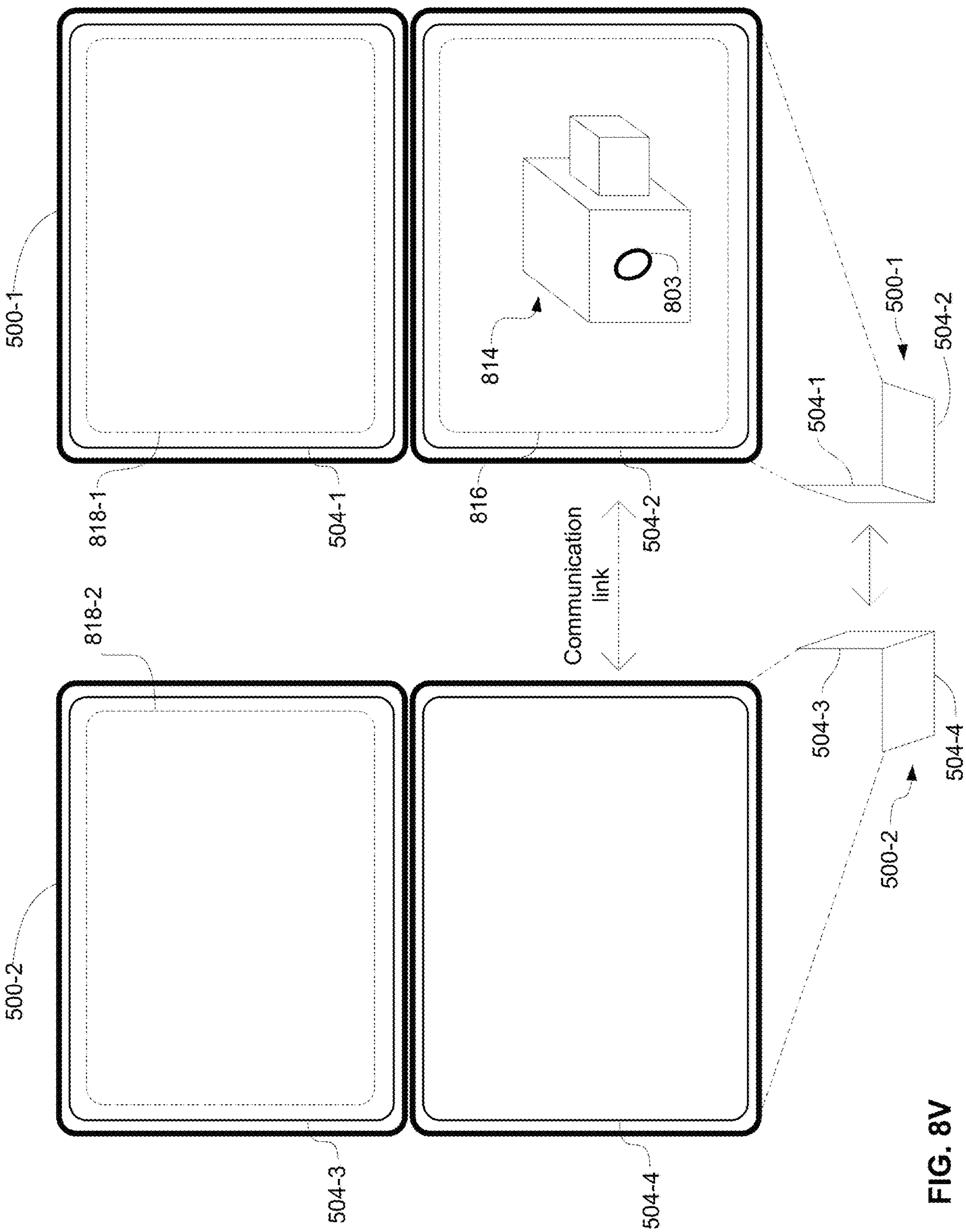
Figure 8W:
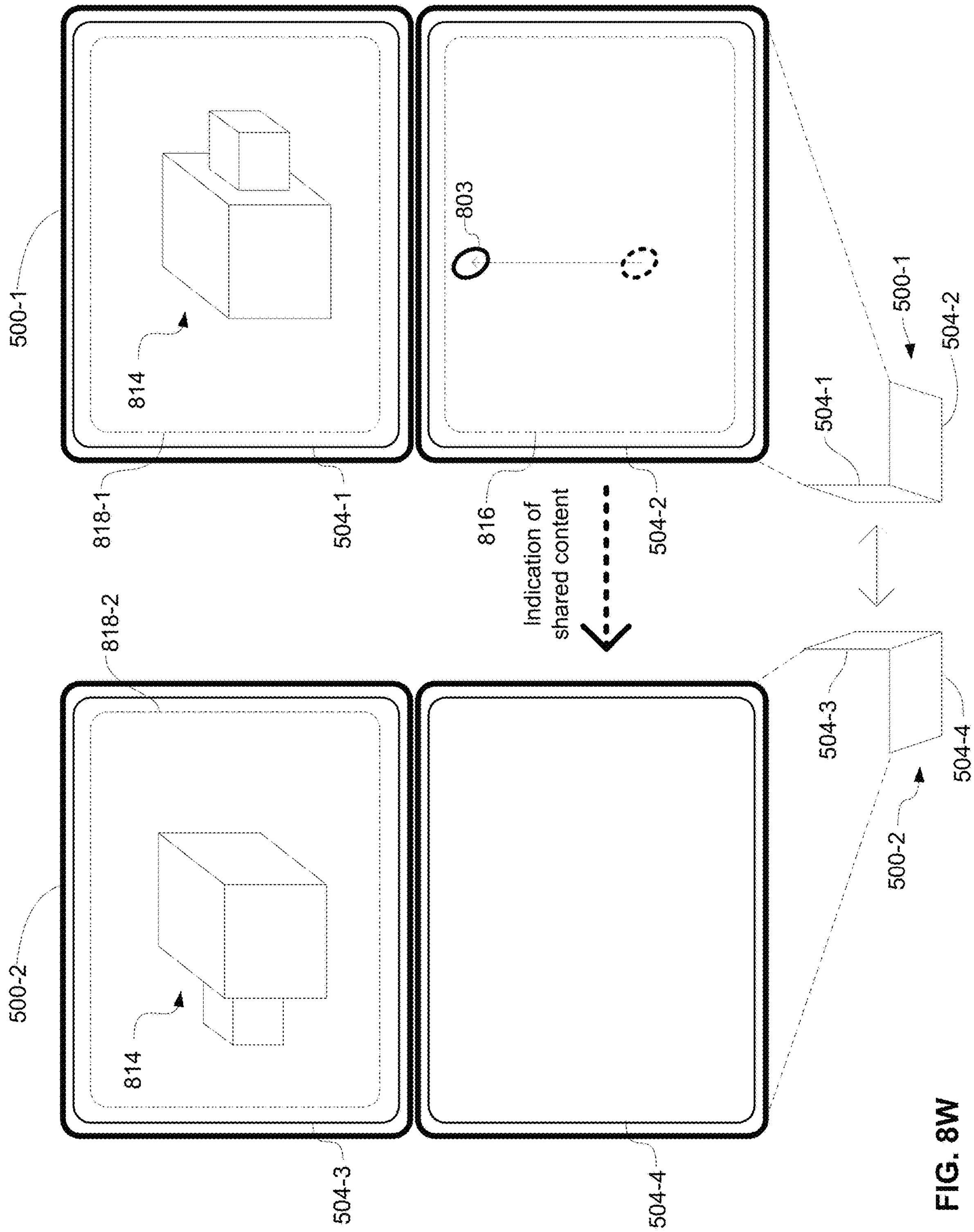

For example, FIGS. 8U-8W illustrate various ways a user of the first electronic device 500-1 is able to share content with a user of the second electronic device 500-2. In some embodiments, sharing content with a second electronic device 500-2 allows the user of the first electronic device 500-1 and the user of the second electronic device to view and access the shared content at the same time. In FIG. 8U, an object 814 is displayed in a private space 816 on the second display 504-2 of the first electronic device 500-1. This content in private space 816 is optionally not accessible or viewable by the second electronic device 500-2. The first electronic device 500-1 is in communication with the second electronic device 500-2 via a communication link. The first display 504-1 of the first electronic device 500-1 displays a first shared space 818-1 for shared content and the first display 504-3 of the second electronic device 500-2 displays a second shared space 818-2 for shared content. Further, as will be illustrated below, the first electronic device 500-1 and the second electronic device 500-2 display shared content on their respective displays as if the shared content is placed between the two devices, and the back sides of displays 504-1 and 504-3 are facing each other, as shown in FIG. 8U.

In FIG. 8V, a contact 803 is detected on object 814 displayed in the private space 816 on the second display 504-2 of the first electronic device 500-1. In FIG. 8W, a movement of contact 803 towards the first display 504-1 of the first electronic device 500-1 is detected at the first electronic device (e.g., a swipe towards display 504-1). In response to the movement of the contact 803, object 814 is moved from private space 816 to the first shared space 818-1 of the first electronic device 500-1, and the first electronic device transmits an indication of the shared content to the second electronic device 500-2. The indication optionally includes information about object 814 such as a file including the object or a file including a visual representation of the object. In response to receiving the indication of the shared content, the second electronic device 500-2 displays the object 814 in the second shared space 818-2 on the first display 504-3 of the second electronic device, as shown in FIG. 8W. As shown in FIG. 8W, in some embodiments, the object 814 is displayed at different viewing angles at each of the electronic devices 500-1 and 500-2 to give the appearance that the users of the electronic devices are standing on different sides of virtual model of the object (e.g., the views of object 814 are optionally from opposite viewing angles such that a portion of object 814 that is displayed as being on the right side of display 504-1 of the first electronic device 500-1 is displayed as being on the left side of display 504-3 of the second electronic device 500-2).

Figure 8X:
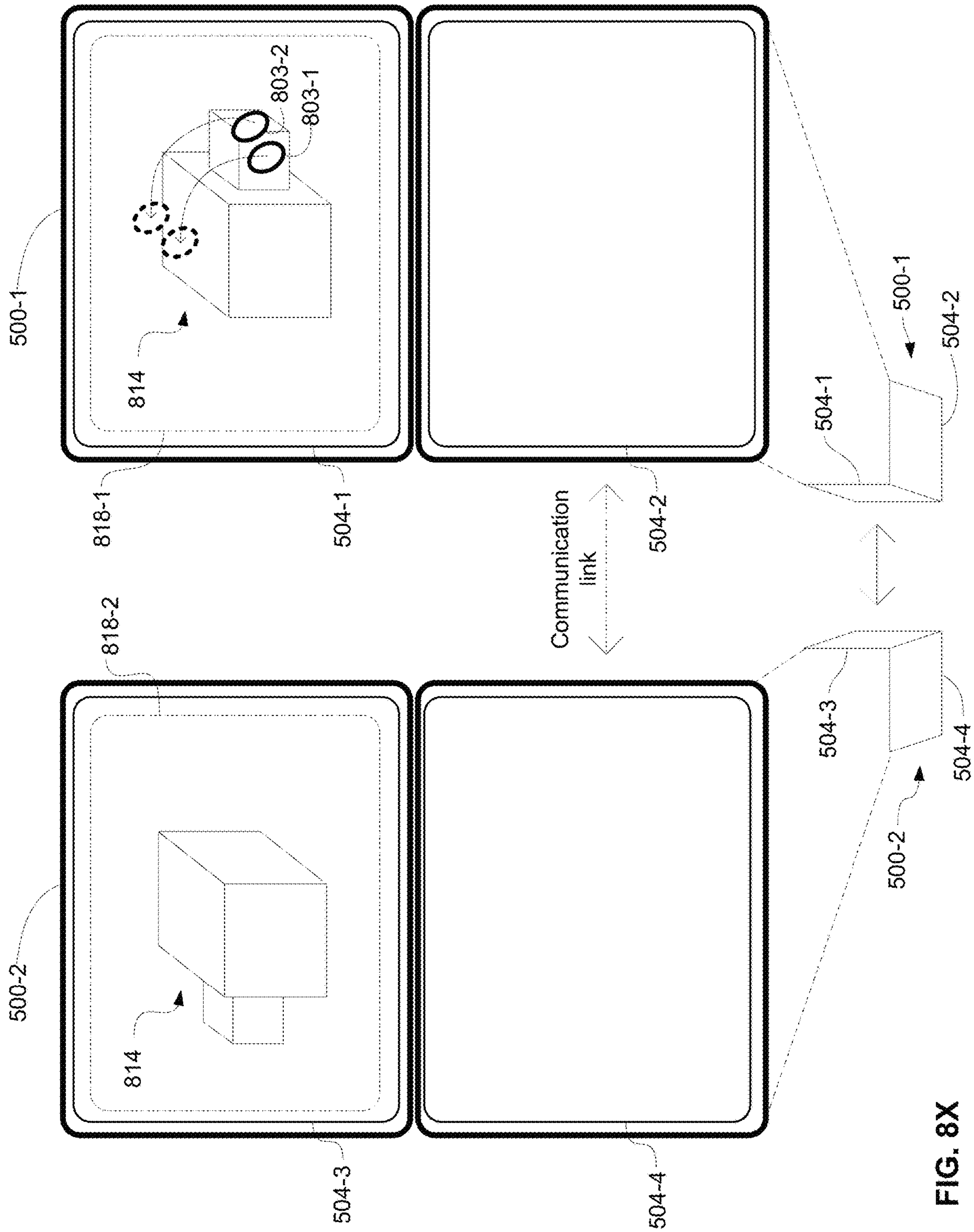
Figure 8Y:
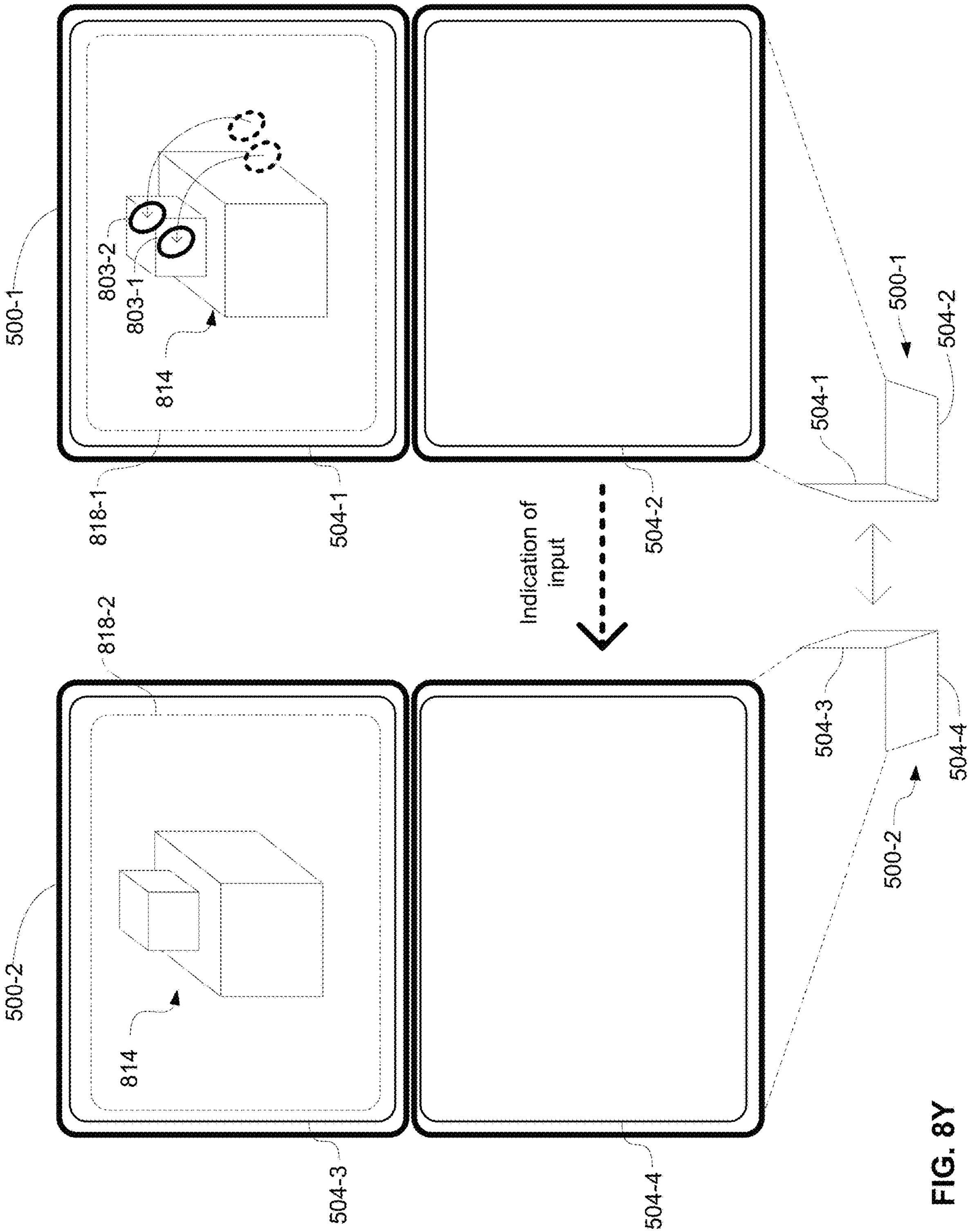

FIGS. 8X-8AA illustrate various ways in which the first electronic device 500-1 and the second electronic device 500-2 enable users to interact with shared content. For example, both users of each device are able to interact with the shared content, and the results of the user interactions are displayed on both devices. In FIG. 8X, the first electronic device 500-1 displays shared content 814 in the first shared space 818-1 displayed on its first display 504-1, and the second electronic device 500-2 displays the shared content 814 in the second shared space 818-2 displayed on its first display 504-3. The first electronic device 500-1 and the second electronic device 500-2 are in communication via a communication link. In FIG. 8X, the first electronic device 500-1 detects a first contact 803-1 and a second contact 803-2 received at the shared content 814 on the first display 504-1 of the first electronic device. In FIG. 8Y, the first electronic device 500-1 detects a circular counterclockwise movement of the contacts 803-1 and 803-2. In response to the detected movement of contacts 803-1 and 803-2, the shared content 814 is rotated in a counterclockwise fashion in accordance with the movement of the contacts, and the first electronic device 500-1 transmits an indication of the input (e.g., the movement of the contact) to the second electronic device 500-2, as shown in FIG. 8Y. In some embodiments, the indication of the input includes information about the shape of the movement, or information about how the shared content 814 is rotated. In response to receiving the indication of the input, the second electronic device 500-2 displays the shared content 814 rotated in accordance with the movement of the contact 803 on the first electronic device 500-2, however displays content 814 from a different perspective than is displayed by the first electronic device 500-1, as previously described.

Figure 8Z:
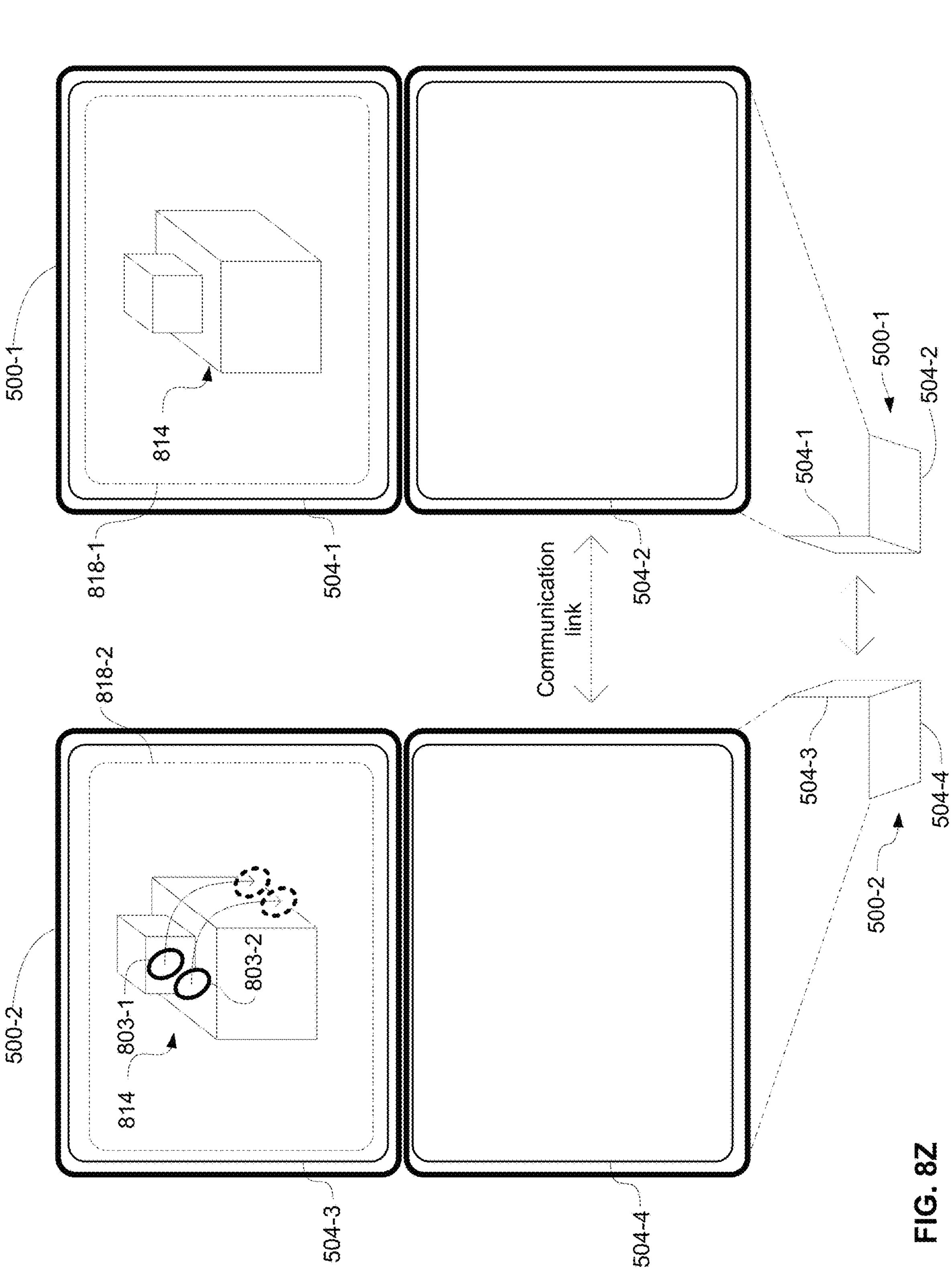
Figure 8A:
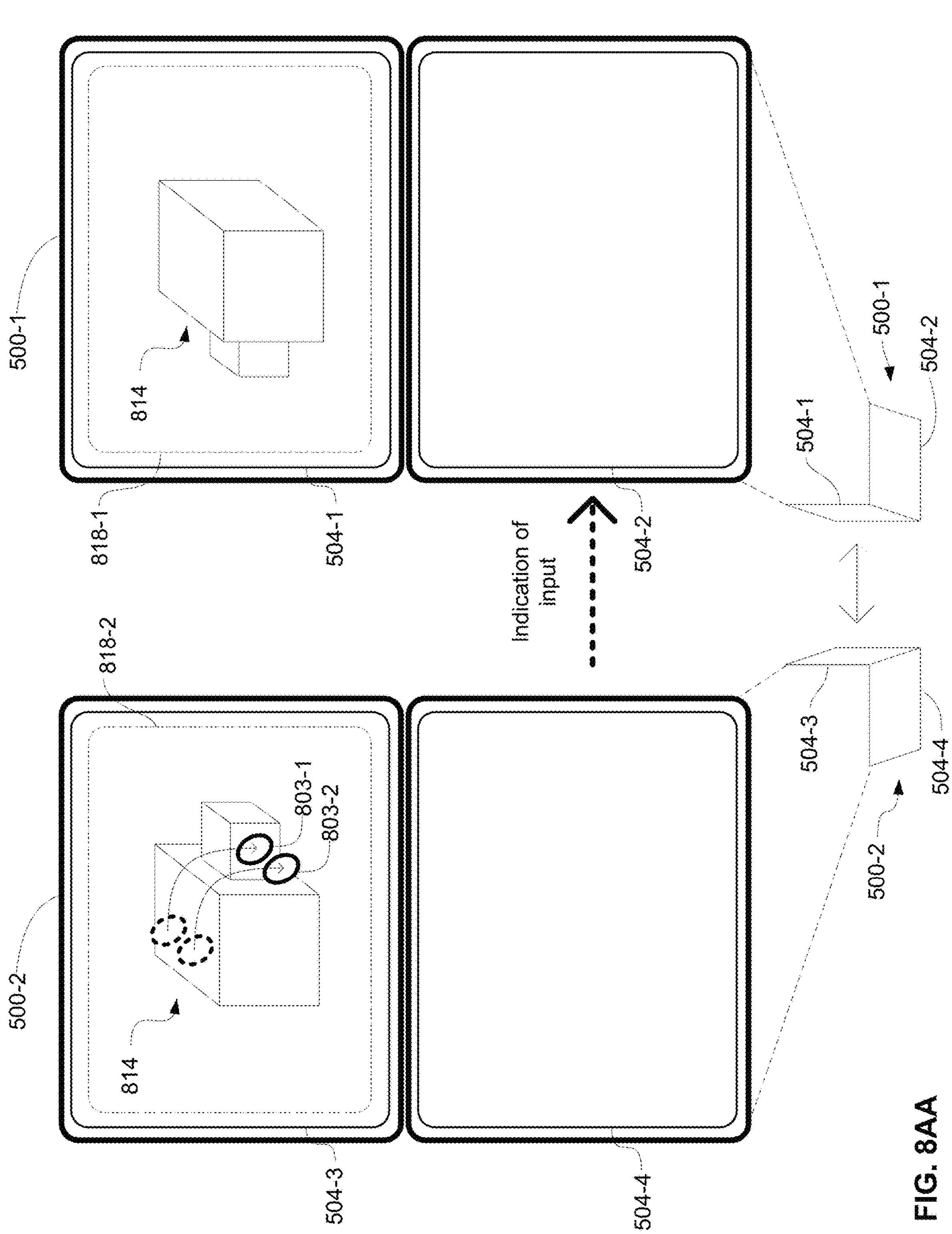
Figure 8B:
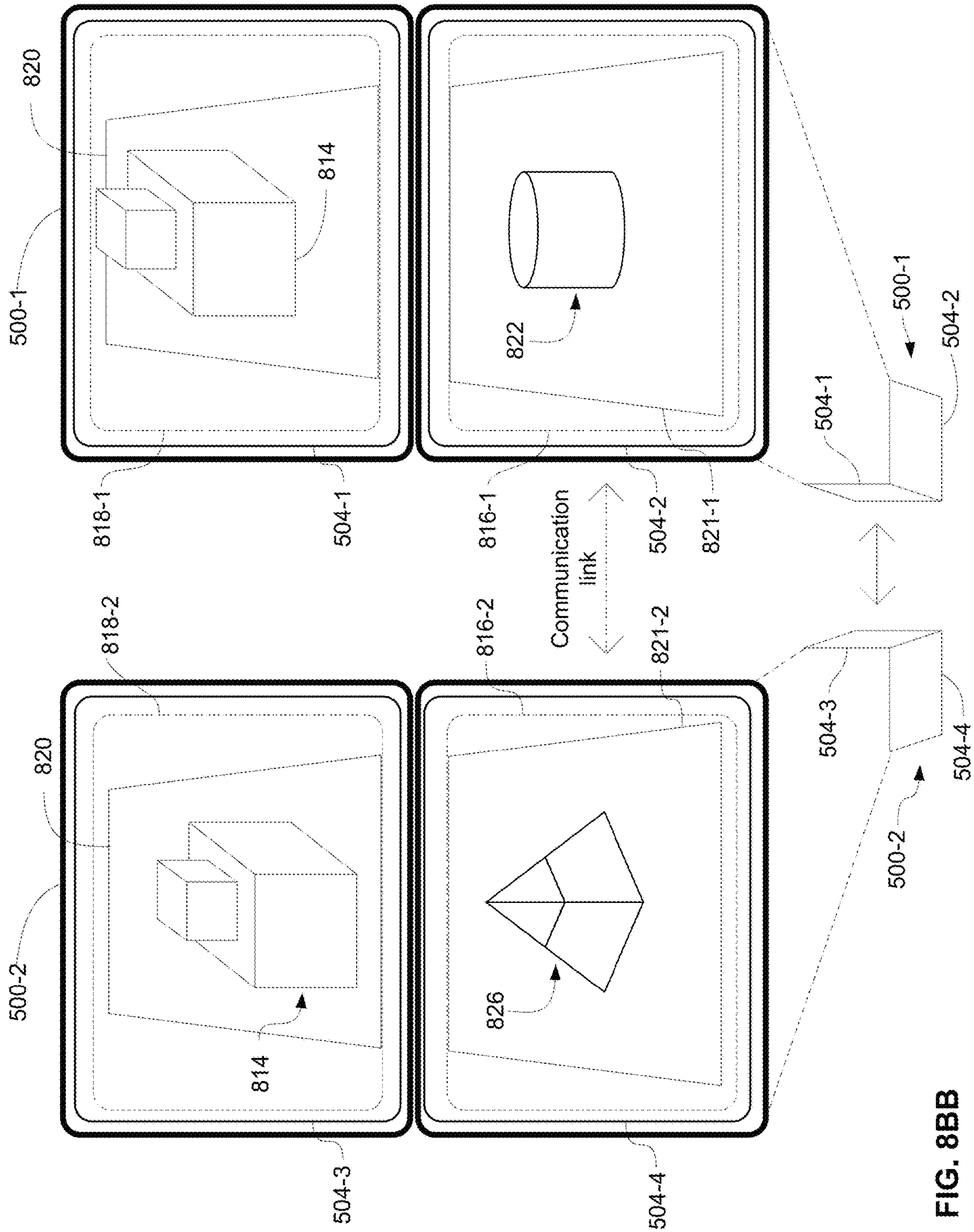
Figure 8C:
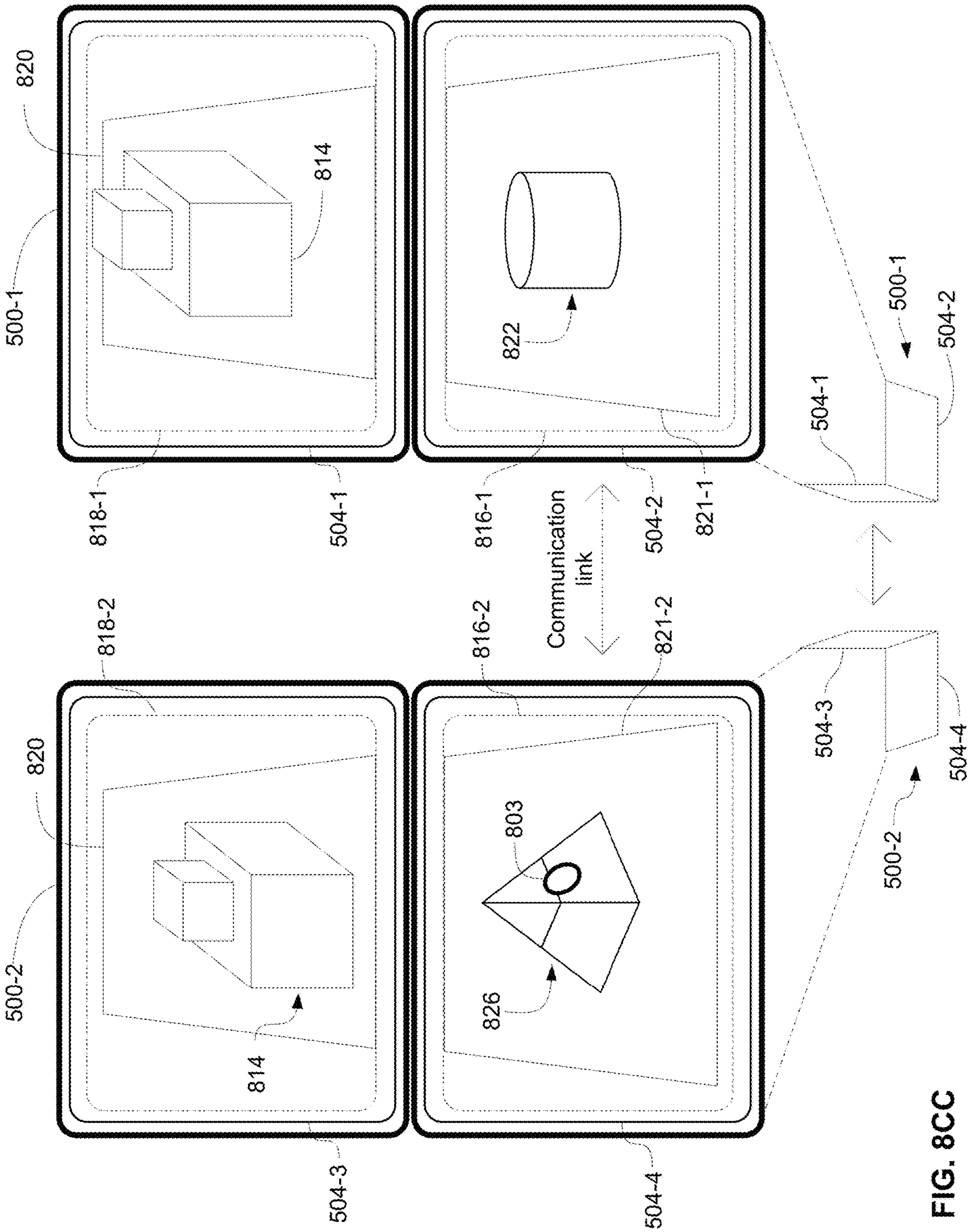
Figure 8D:
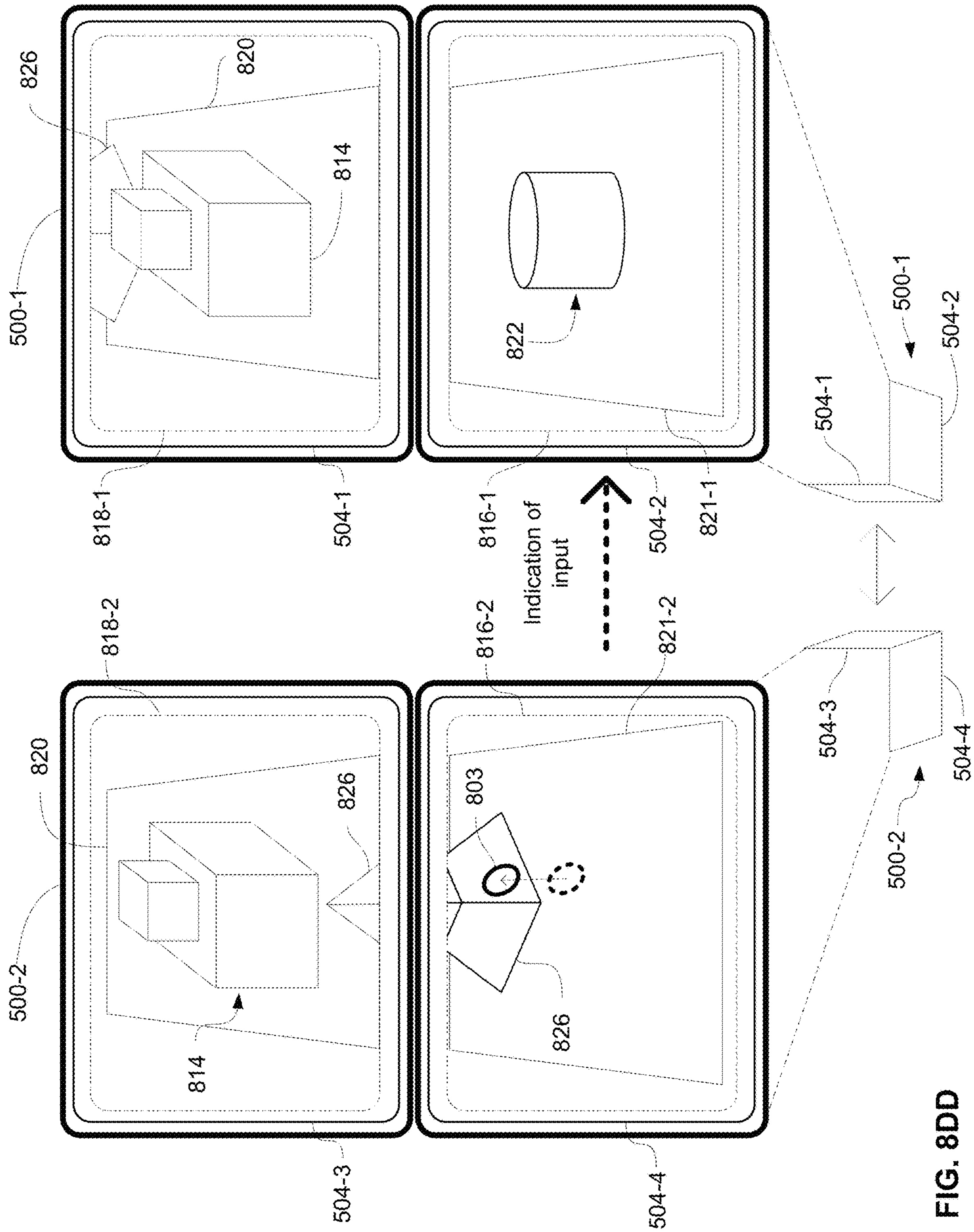
Figure 8E:
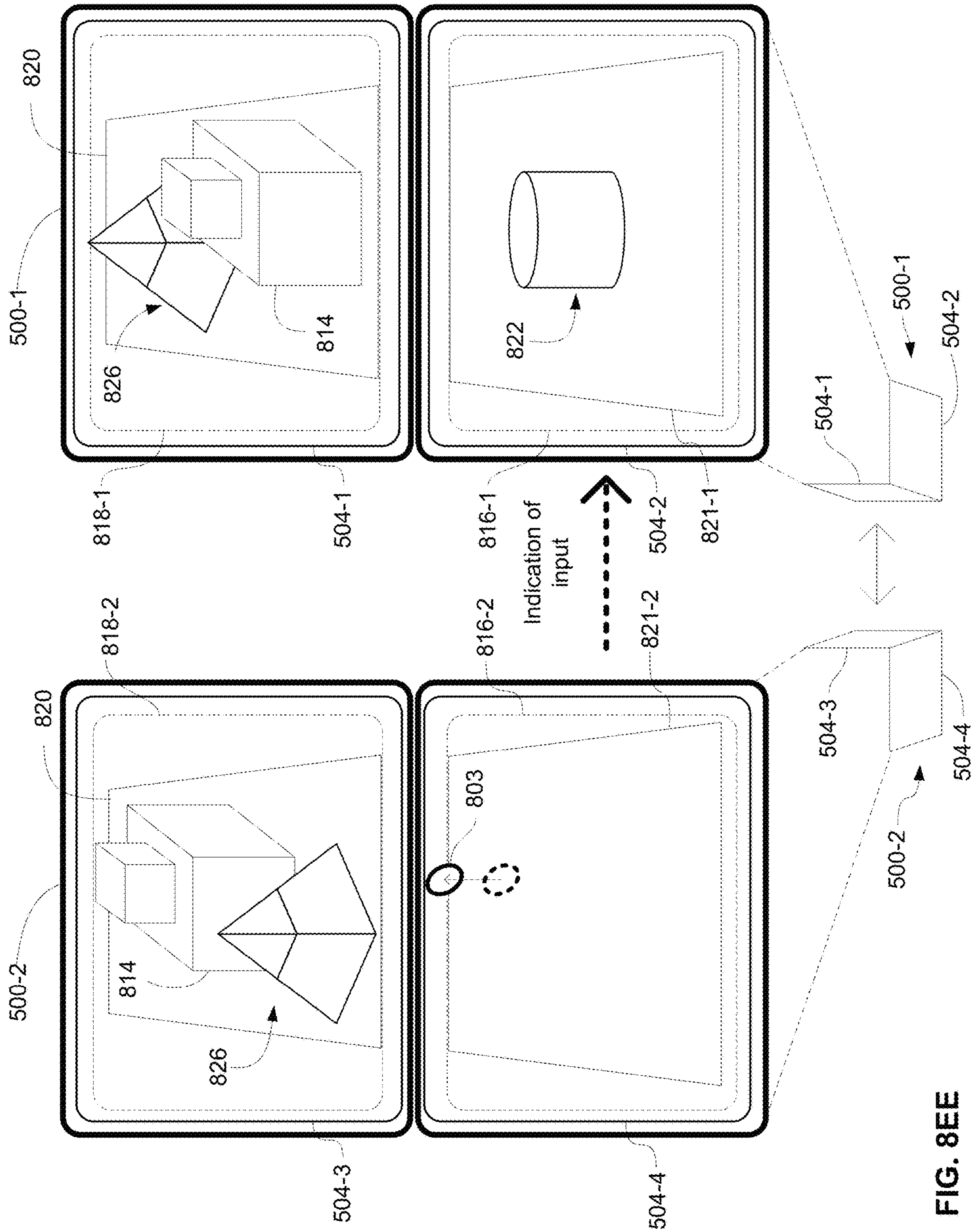
Figure 8F:
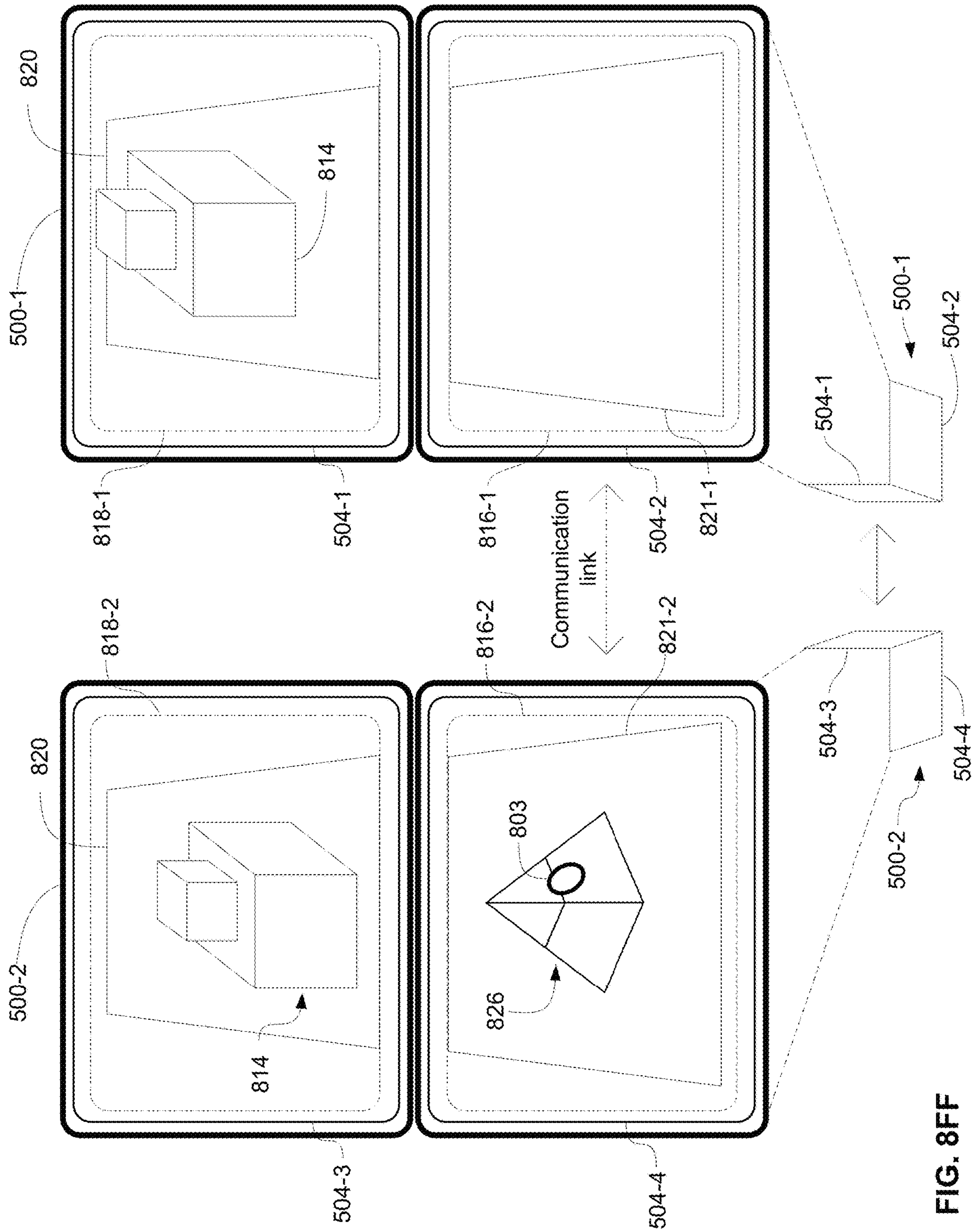
Figure 8G:
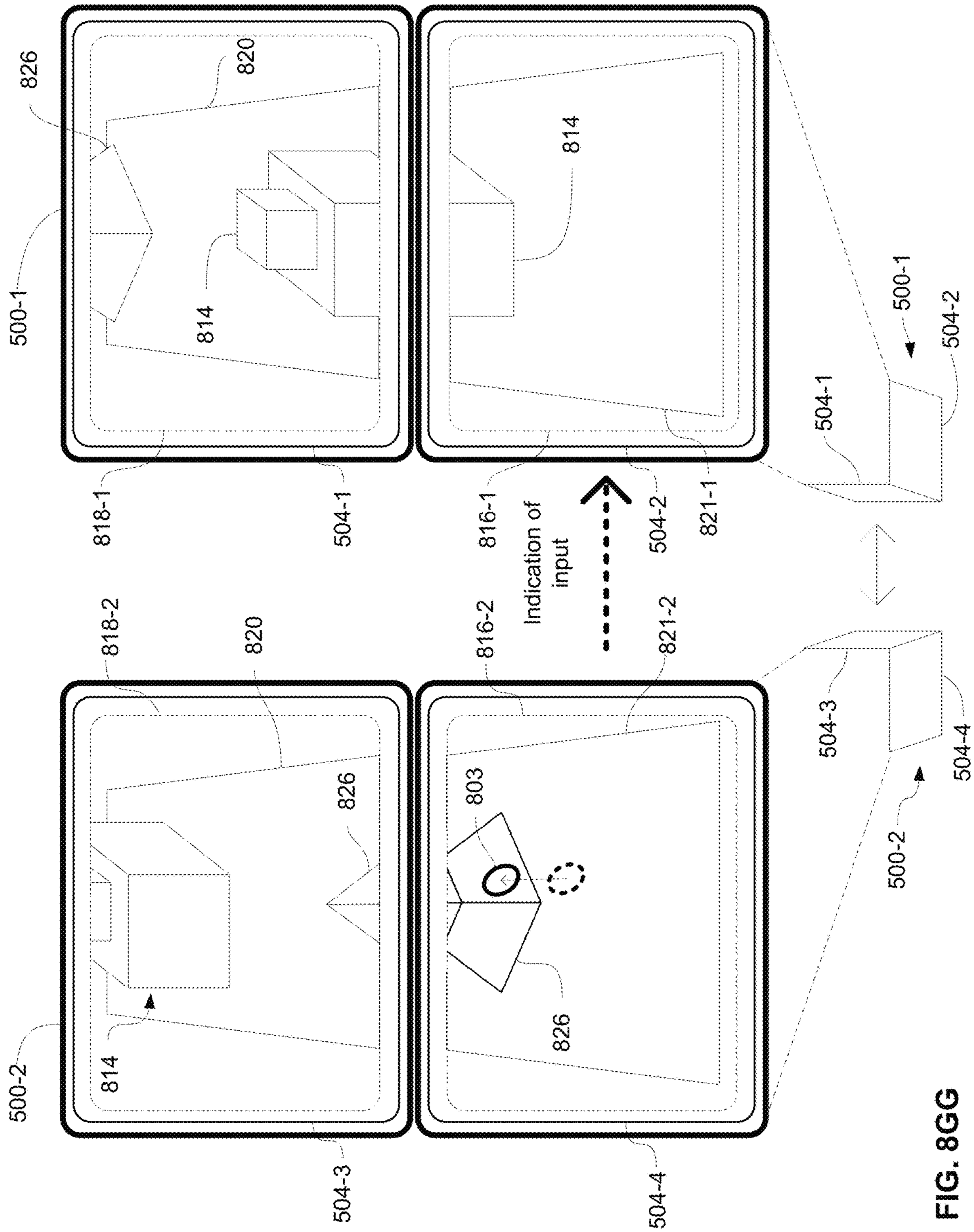
Figure 8H:
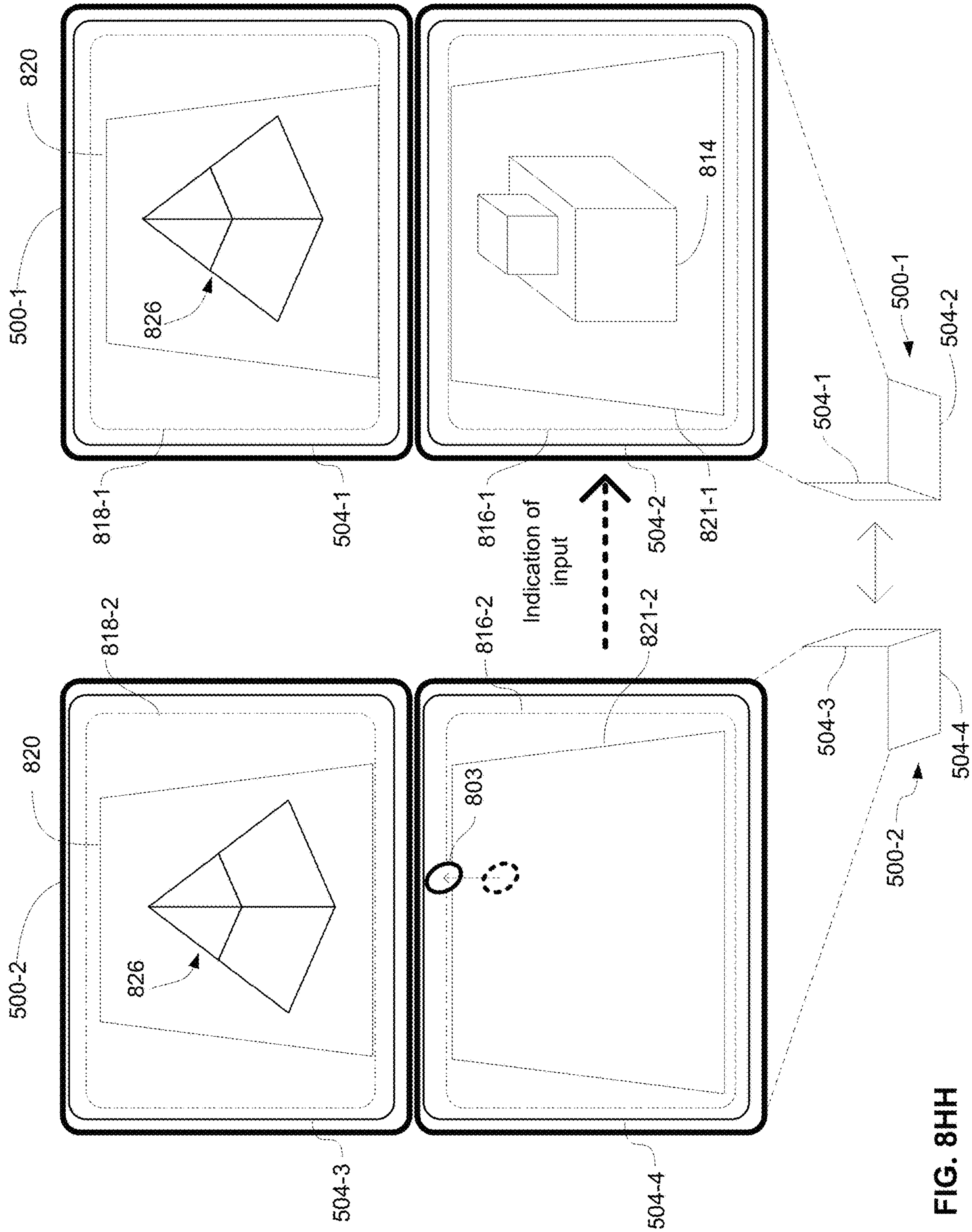
Figure 9A:
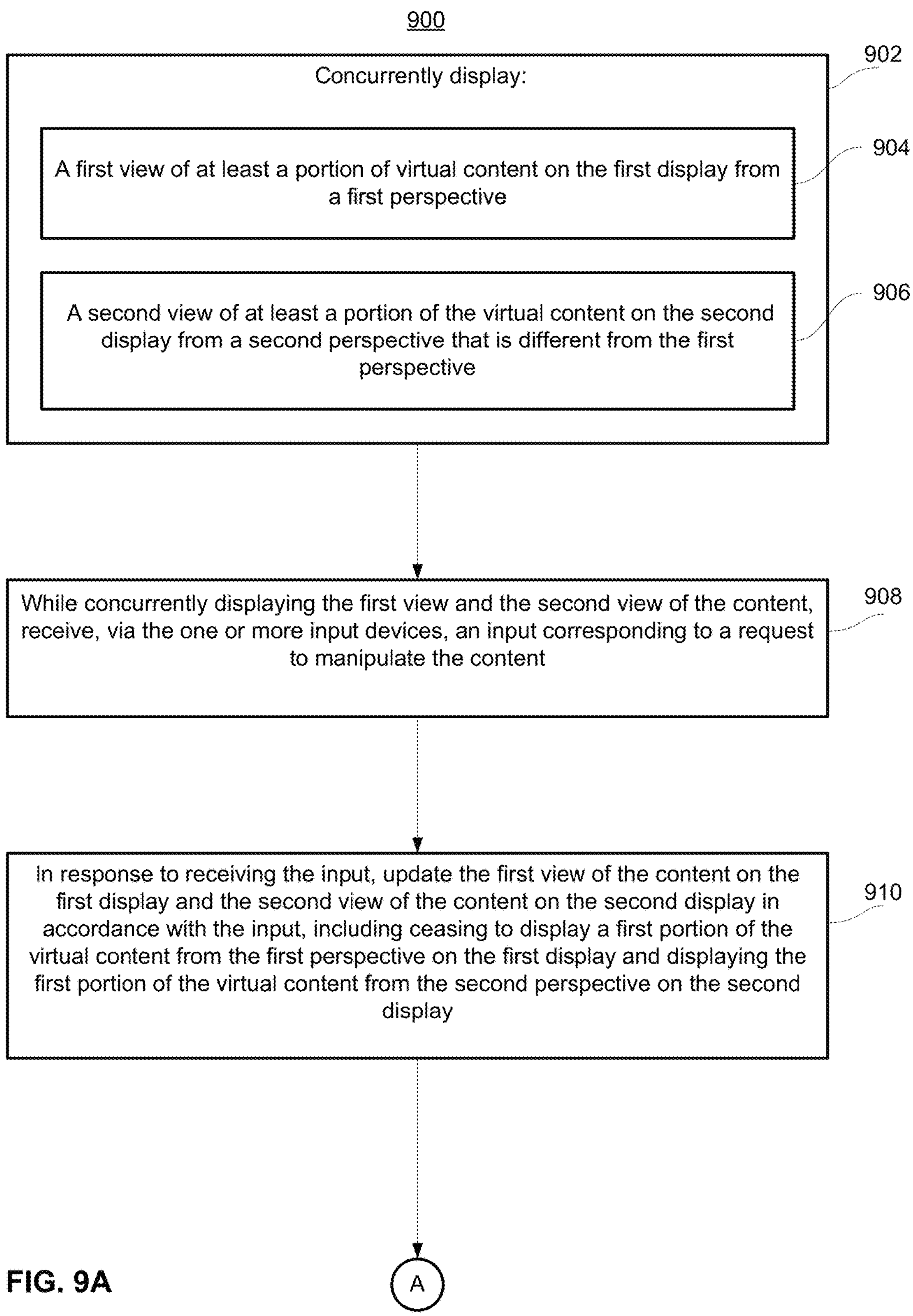
FIGS. 9A-9L are flow diagrams illustrating a method of displaying three-dimensional content using coordinated views on multiple displays of an electronic device in accordance with some embodiments of the disclosure.
Figure 9B:
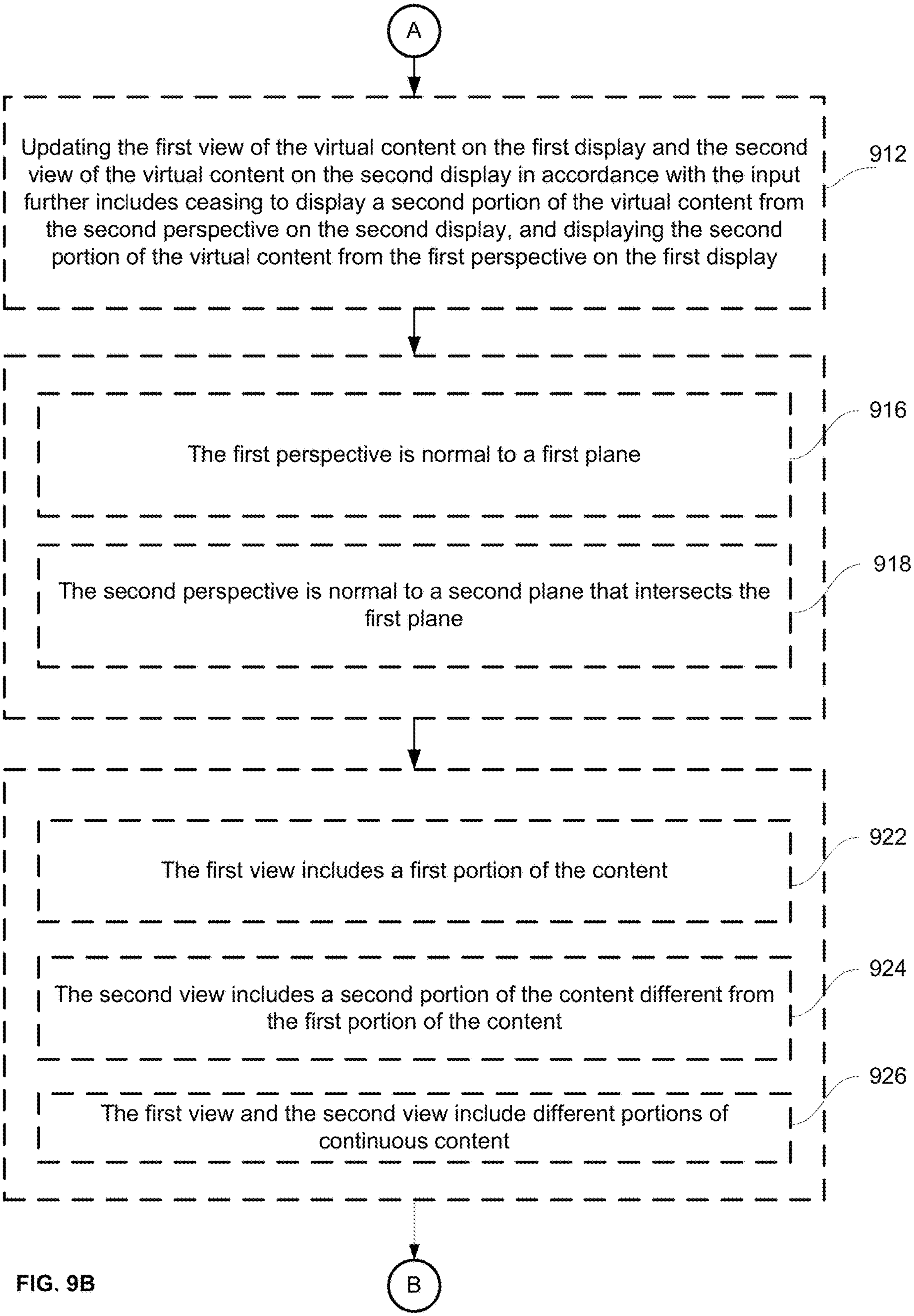
Figure 9C:
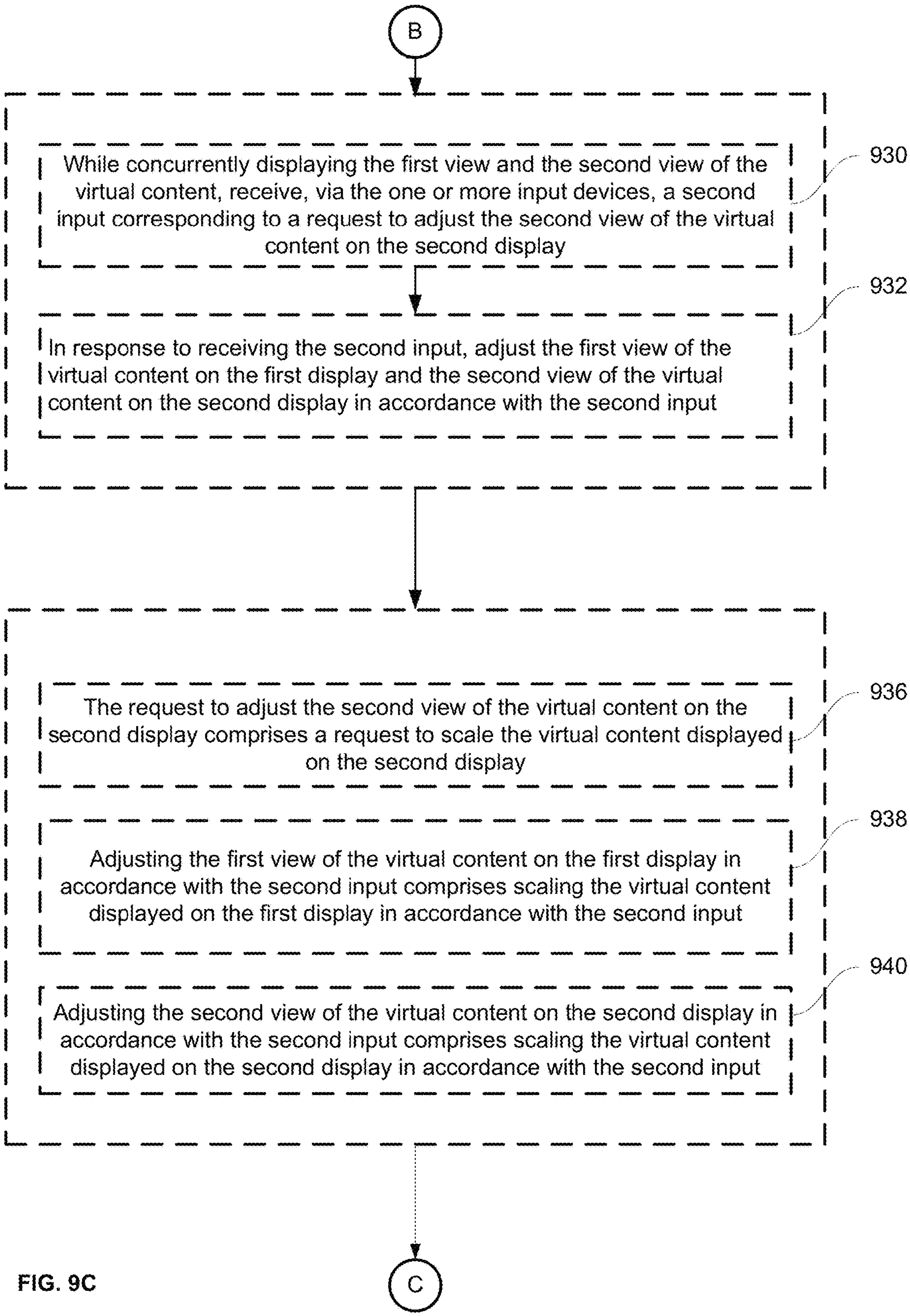
Figure 9D:
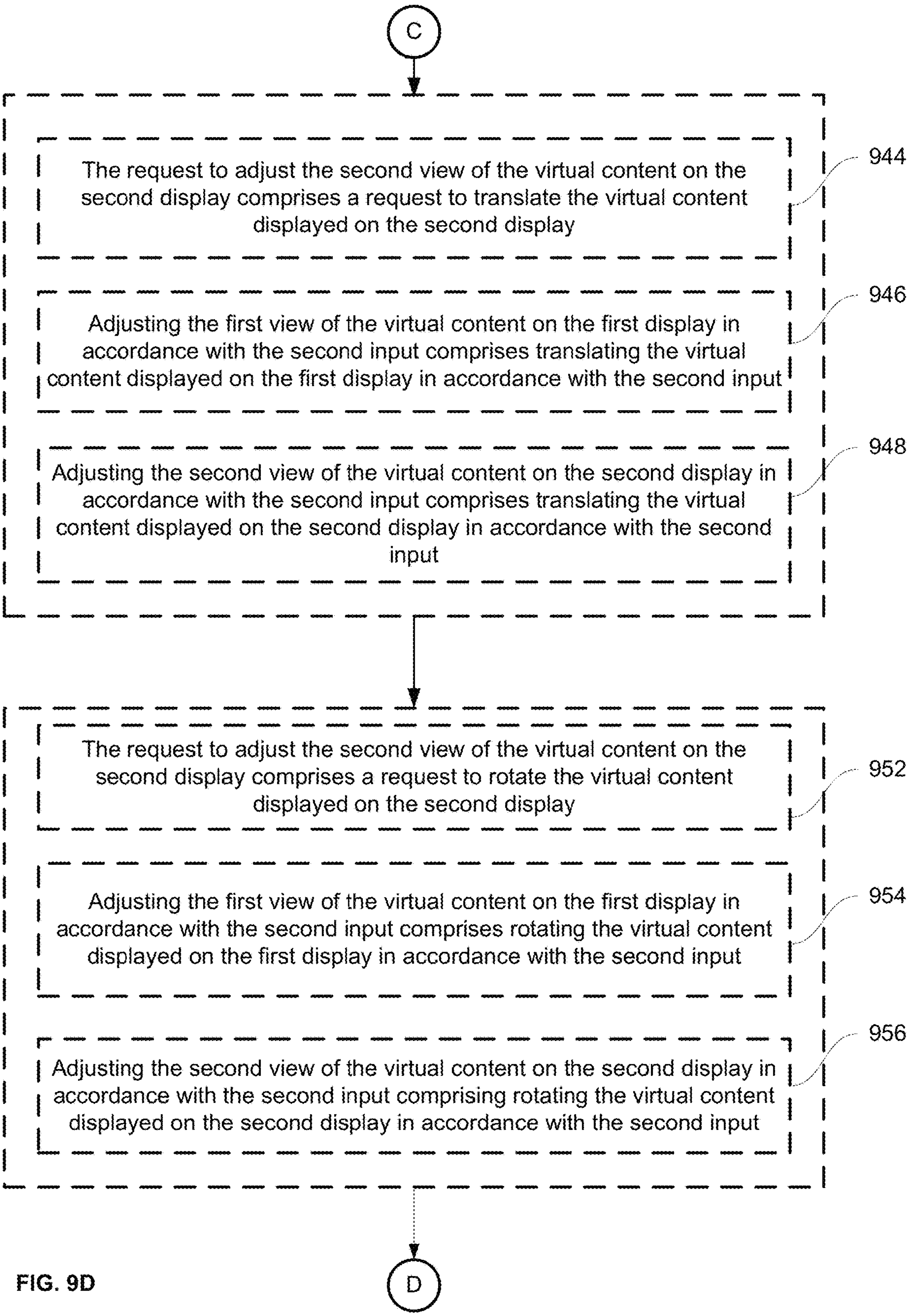
Figure 9E:
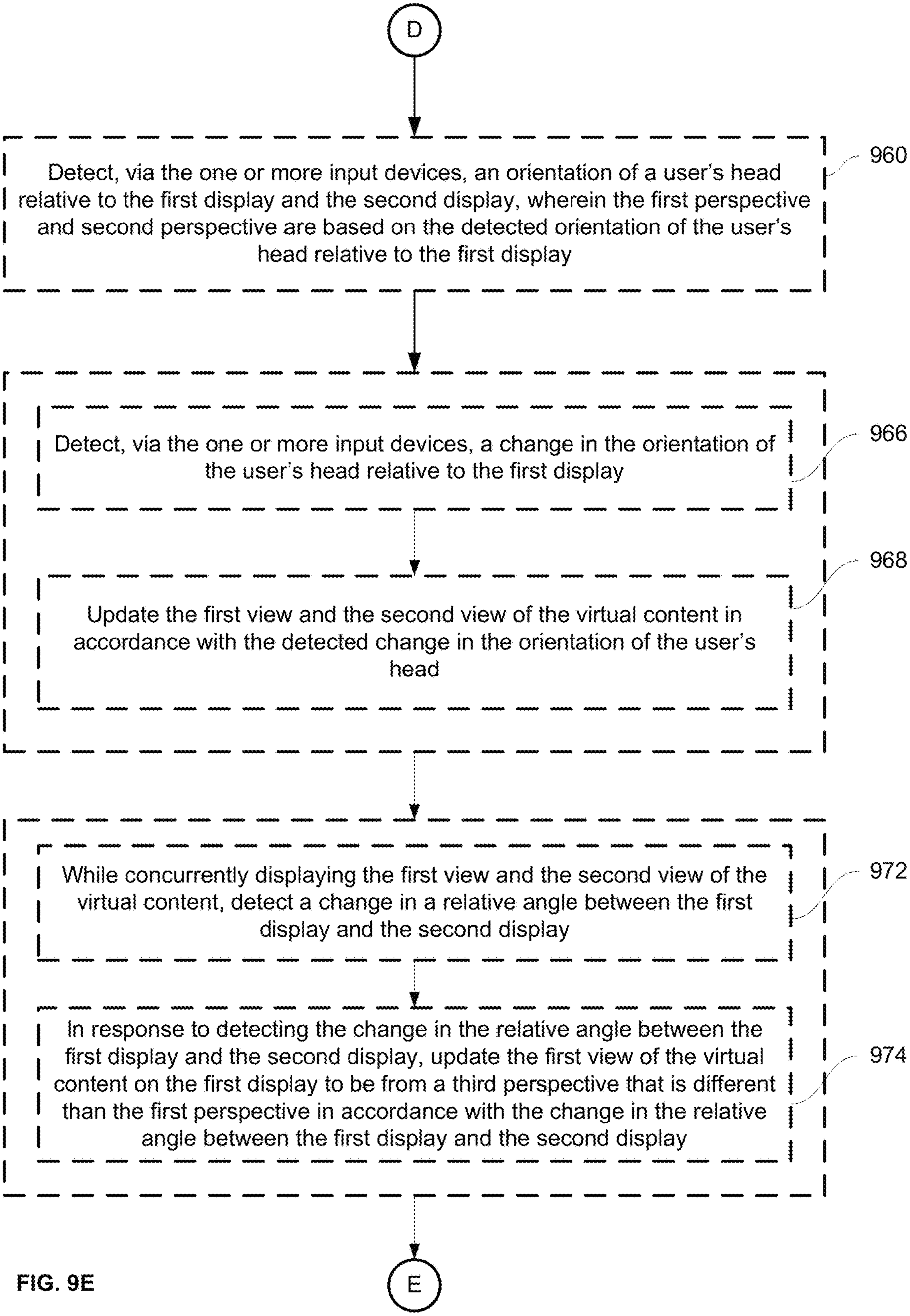
Figure 9F:
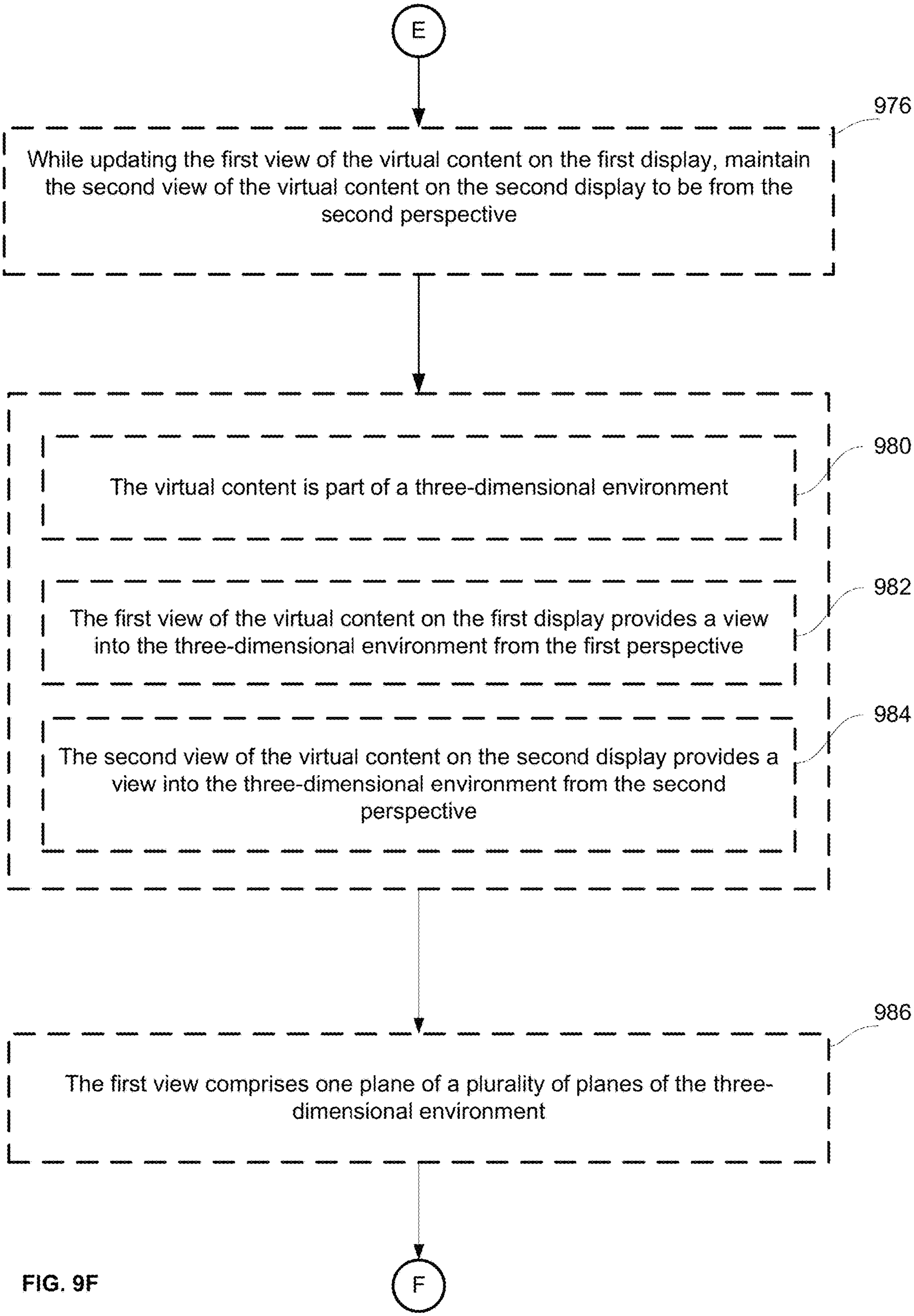
Figure 9G:
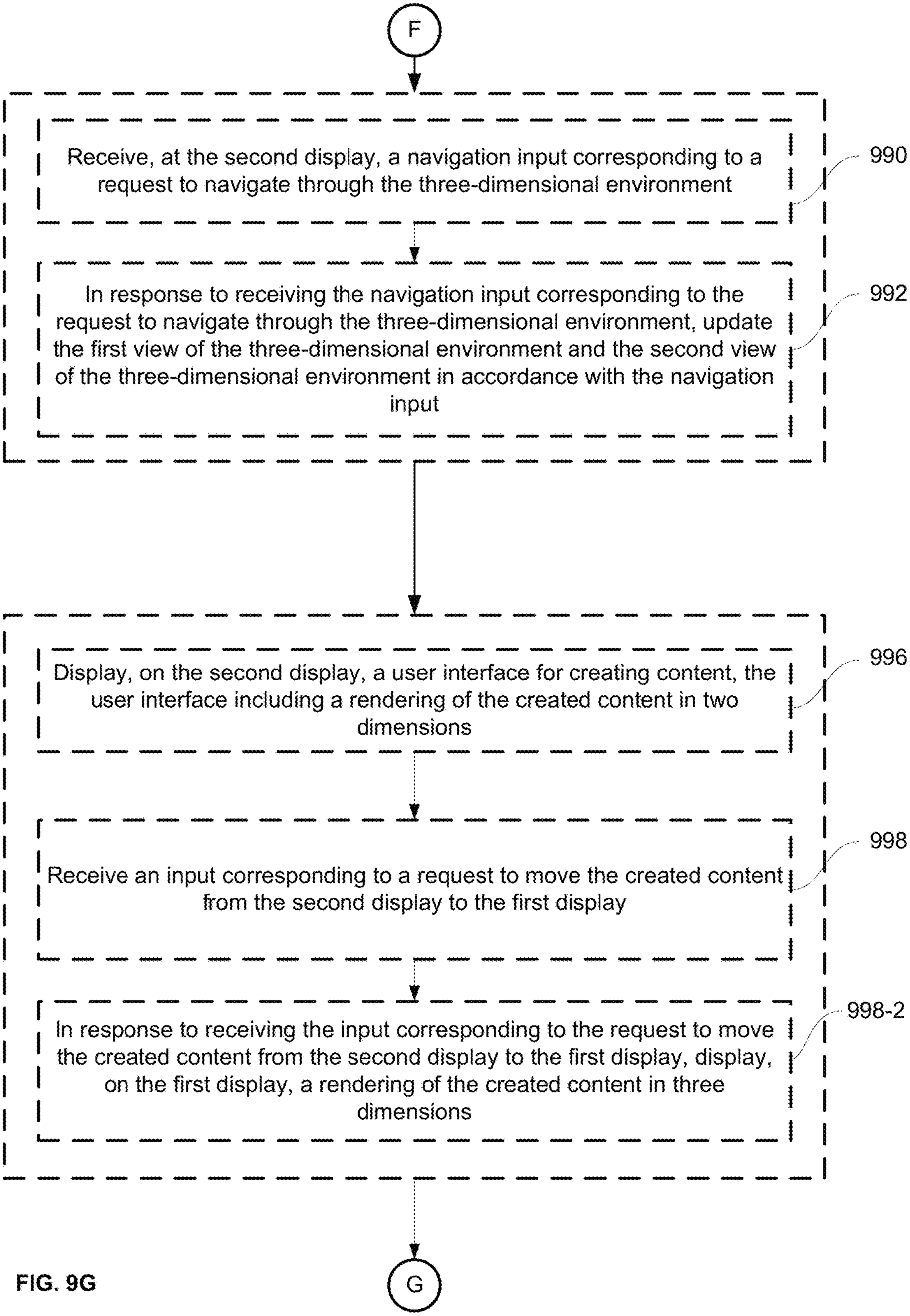
Figure 9H:
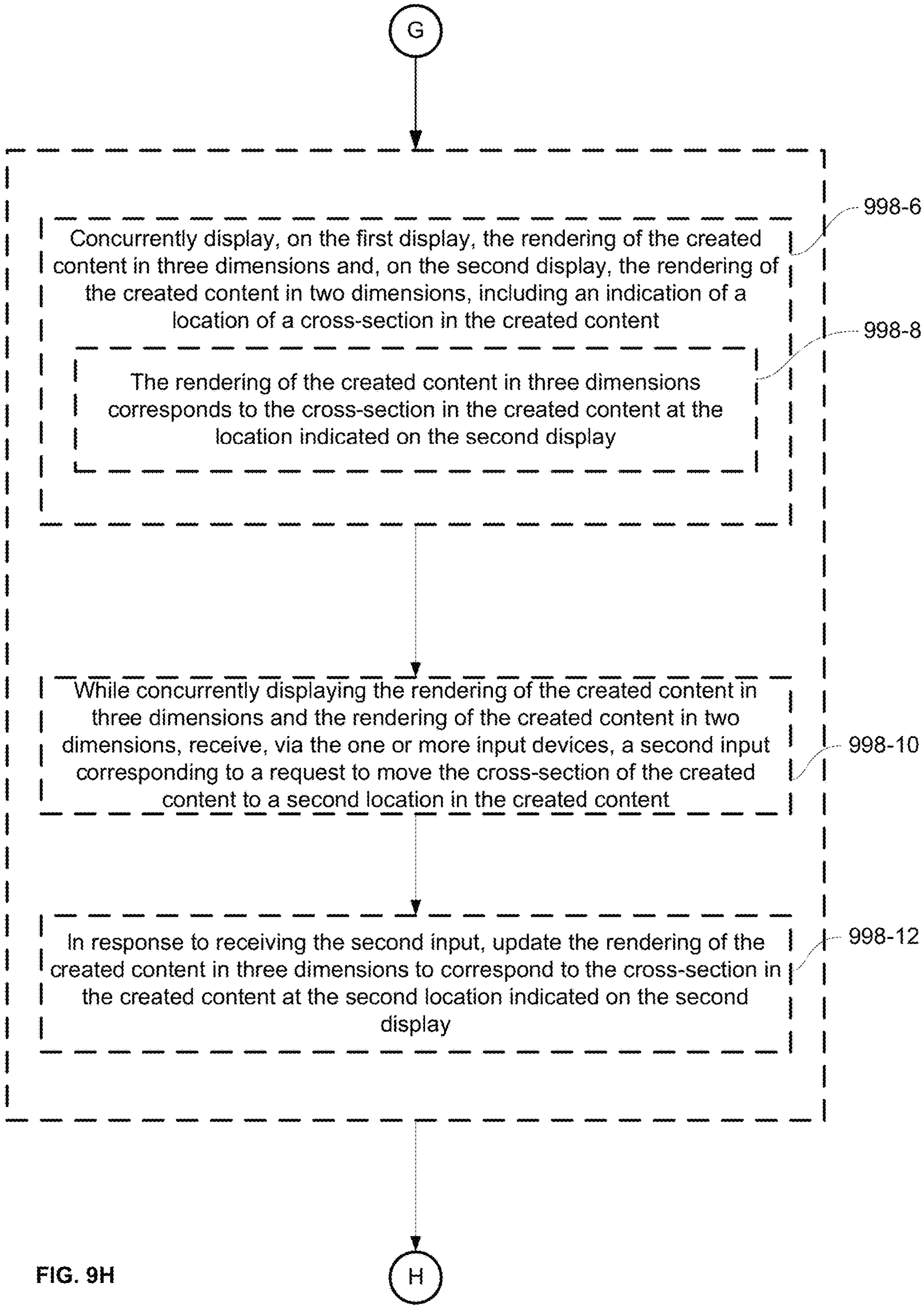
Figure 9I:
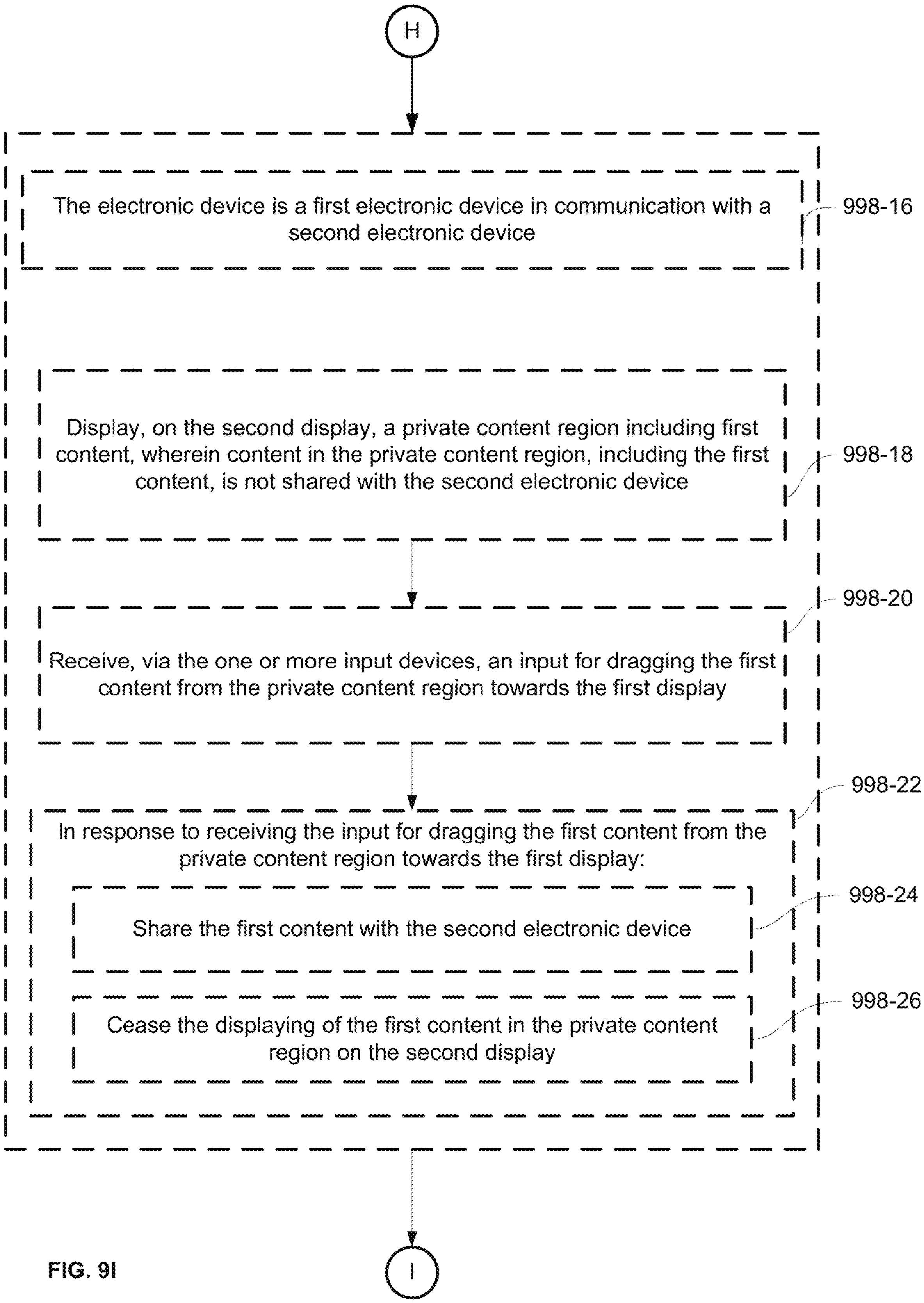
Figure 9J:
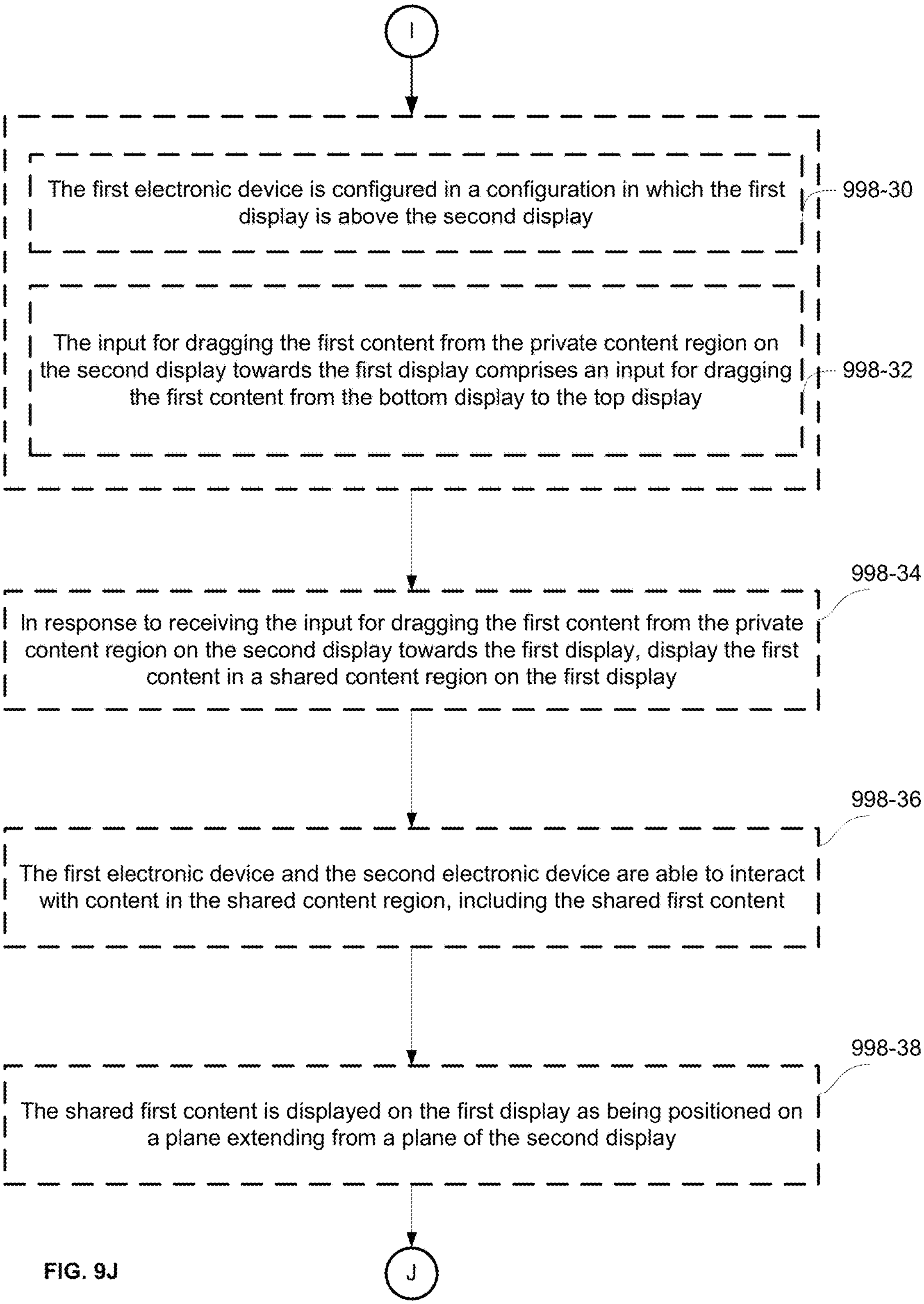
Figure 9K:
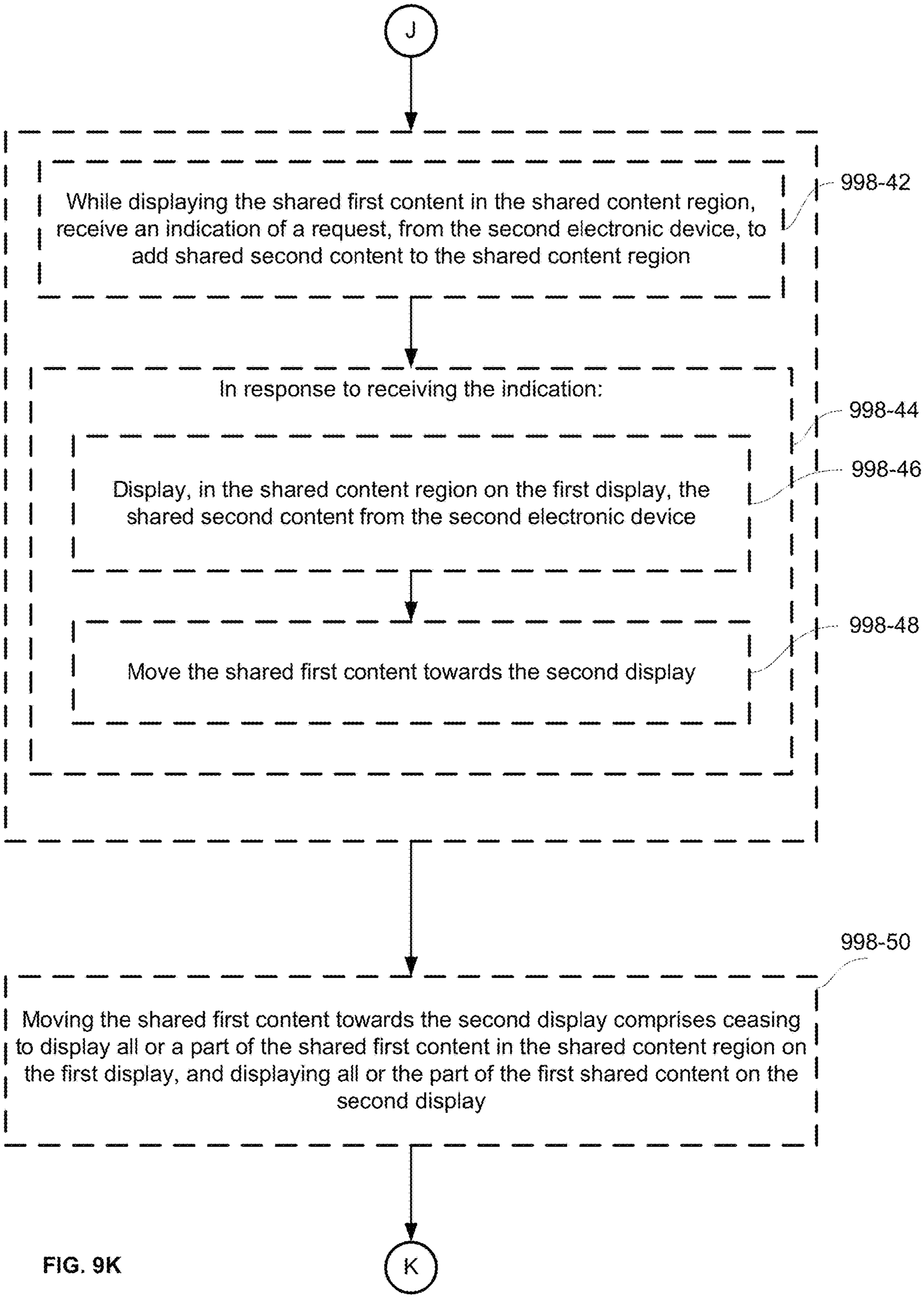
Figure 9L:
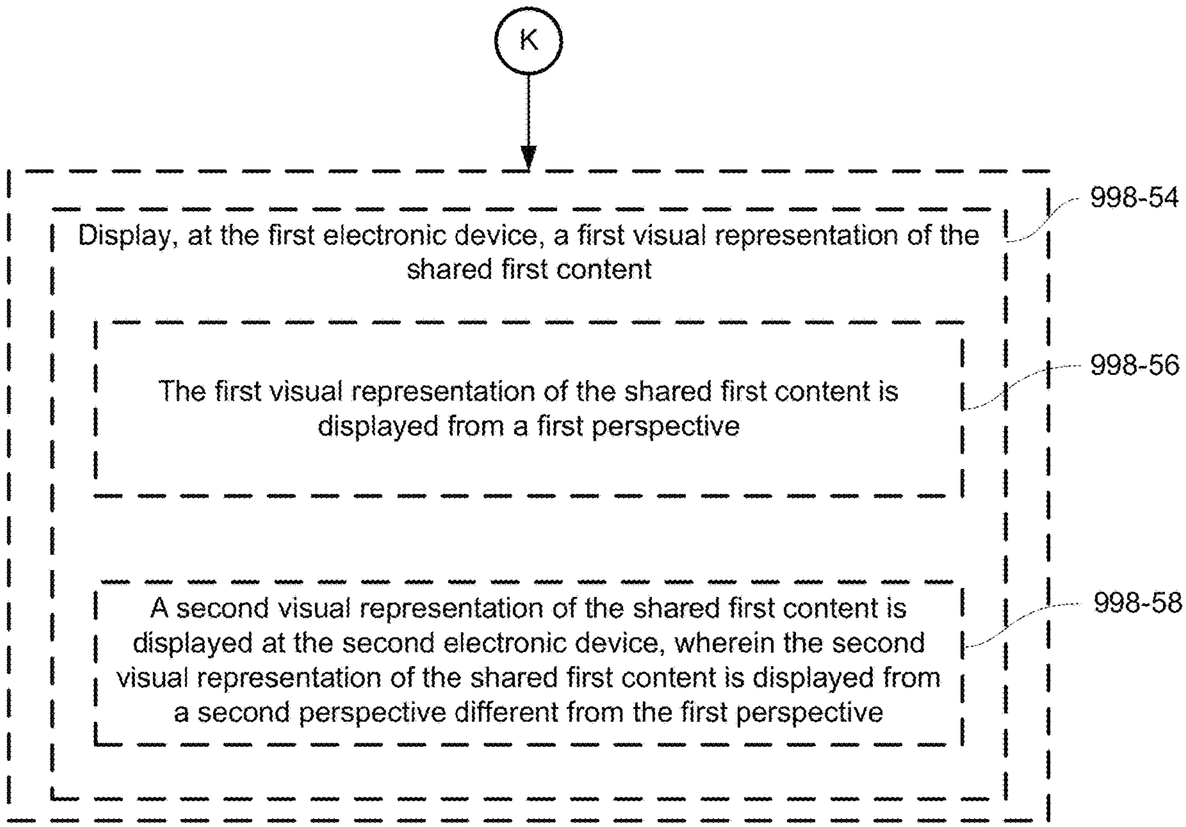

In FIG. 8Z, the second electronic device 500-2 detects a first contact 803-1 and a second contact 803-2 received at the shared content 814 on the first display 504-3 of the second electronic device. In FIG. 8AA, the second electronic device 500-2 detects a circular clockwise movement of the contacts 803-1 and 803-2. In response to the detected movement of the contacts 803-1 and 803-2, the shared content 814 is rotated in accordance with the movement of the contacts, and the second electronic device 500-2 transmits an indication of the input (e.g., the movement of the contacts) to the first electronic device 500-1, as shown in FIG. 8AA. In some embodiments, the indication of the input includes information about the shape of the movement or information about how the shared content 814 is rotated. In response to receiving the indication of the input, the first electronic device 500-1 displays the shared content 814 rotated in accordance with the movement of the contact 803 on the second electronic device 500-2, however displays content 814 from a different perspective than is displayed by the second electronic device 500-2, as previously described. In this way, the user of the first electronic device 500-1 and the user of the second electronic device 500-2 are both able to interact with shared content 814, and view results of those interactions from their respective perspectives of the shared content.

FIGS. 8BB-8HH illustrate various ways in which the first electronic device 500-1 and the second electronic device 500-2 display shared content on a virtual table. In some embodiments, the virtual table includes a shared section for shared content visible and accessible at both devices. The virtual table further includes private sections for private content only visible and accessible at the respective electronic devices. Similar to before, the first and second electronic devices display the shared and private sections of the virtual table, and the shared content on the virtual table, as if the two electronic devices are situated on opposite sides of the virtual table and both oriented towards the shared content in the middle of the virtual table.

In FIG. 8BB, the first electronic device 500-1 and the second electronic device 500-2 display shared content 814 on a shared section 820 of a virtual table in shared spaces 818-1 and 818-2 of the first displays 504-1 and 504-3 of the respective electronic devices. The first electronic device 500-1 displays private content 822 on a private section 821-1 of the virtual table in the private space 816-1 displayed on the second display 504-2 of the first electronic device, which is not accessible by the second electronic device 500-2. The second electronic device 500-2 displays private content 826 on a private section 821-2 of the virtual table in the private space 816-2 displayed on the second display 504-4 of the second electronic device, which is not accessible by the first electronic device 500-1.

In FIG. 8CC, the second electronic device 500-2 detects a contact 803 on the private content 826 displayed on the second display 504-4. In FIG. 8DD, the second electronic device 500-2 detects a movement of contact 803 towards the first display 504-3 of the second electronic device. In response to the detected movement of the contact 803, the content 826 moves towards the first display 504-3 of the second electronic device 500-2 and becomes partially visible within the shared space 818-2 (e.g., as if the user of the second electronic device 500-2 is pushing the content 826 into the shared section 820 of the virtual table), and the second electronic device 500-2 transmits an indication of the input to the first electronic device 500-1. In response to the indication of the input, the first electronic device 500-1 displays the portion of content 826 on the shared section 820 of the virtual table in the shared space 818-1 on the first display 504-1 of the first electronic device 500-1, as shown in FIG. 8DD. As previously mentioned, in some embodiments, the shared section 820 of the virtual table is viewed from one side on the first electronic device 500-1 and from another side on the second electronic device 500-2 as though the two electronic devices are arranged across from each other. As shown in FIG. 8DD, the first electronic device 500-1 displays content 814 in front of the portion of content 826 that is in shared section 820, and the second electronic device 500-2 displays content 814 behind the portion of content 826 that is in shared section 820. In some embodiments, in response to the movement of content 826 onto the shared section 820 of the virtual table, content 814 is moved to make room for content 826 (e.g., moved away from the private section 821-2 of the virtual table corresponding to the second electronic device 500-2, and moved towards the private section 821-1 of the virtual table corresponding to the first electronic device 500-1).

In FIG. 8EE, the second electronic device 500-2 detects further movement of contact 803 to the edge of the shared space 816-2. In response to the detected movement of contact 803, the second electronic device 500-2 displays the content 826 entirely on the shared section 820 of the virtual table in the shared space 818-2 of the first display 504-3 of the second electronic device 500-2, and transmits an indication of the input to the first electronic device 500-1, as shown in FIG. 8EE. Thus, the user of the second electronic device 500-2 has moved content 826 entirely out of private space 816-2, and entirely into shared section 820 of the virtual table. In response to the indication of the input, the first electronic device 500-1 displays the entire content 826 on the shared section 820 of the virtual table. In this way, the user of the second electronic device 500-2 completely "pushes" the content 826 onto the shared section 820 of the virtual table.

FIGS. 8FF-8GG illustrate a different response to pushing content into the shared section 820 of the virtual table. In FIG. 8FF, the first electronic device 500-1 and the second electronic device 500-2 display shared content 814 on a shared section 820 of a virtual table in shared spaces 818-1 and 818-2 of the first displays 504-1 and 504-3 of the respective electronic devices. Also shown in FIG. 8FF, the second electronic device 500-2 detects a contact 803 on the private content 826 displayed on the second display 504-4.

In FIG. 8GG, the second electronic device 500-2 detects a movement of contact 803 towards the first display 504-3 of the second electronic device (e.g., towards shared section 820 of the virtual table). In response to the detected movement of the contact 803, the content 826 moves towards the first display 504-3 of the second electronic device 500-2 and becomes partially visible within the shared space 818-2 (e.g., as if the user of the second electronic device is pushing the content 826 into the shared section 820 of the virtual table), and the second electronic device 500-2 transmits an indication of the input to the first electronic device 500-1, as shown in FIG. 8GG. In response to the indication of the input, the first electronic device 500-1 displays the portion of content 826 on the shared section 820 of the virtual table in the shared space 818-1 on the first display 504-1 of the first electronic device 500-1, as shown in FIG. 8GG. As previously mentioned, in some embodiments, the shared section 820 of the virtual table is viewed from one side on the first electronic device 500-1 and from another side on the second electronic device 500-2 as though the two electronic devices are arranged across from each other. As shown in FIG. 8GG, the first electronic device 500-1 displays content 814 in front of the portion of content 826 that is in the shared section 820, and the second electronic device 500-2 displays content 814 behind the portion of content 826 that is in the shared section 820. In response to the movement of content 826 onto the shared section 820 of the virtual table, content 814 moves to make room for the content 826 (e.g., moved away from the private section 821-2 of the virtual table corresponding to the second electronic device 500-2, and moved towards the private section 821-1 of the virtual table corresponding to the first electronic device 500-1).

In the example of FIGS. 8FF-8GG, the shared section 820 is only able to contain a single piece of shared content at a time. Thus, as will be shown, pushing shared content into the shared section 820 optionally causes shared content that is already in the shared section 820 to be pushed back to the device from which that shared content originated. For example, in FIG. 8HH, the second electronic device 500-2 detects further movement of contact 803 to the edge of the shared space 816-2. In response to the detected movement of contact 803, the second electronic device 500-2 displays the content 826 entirely on the shared section 820 of the virtual table in the shared space 818-2 of the first display 504-3 of the second electronic device 500-2, and transmits an indication of the input to the first electronic device 500-1, as shown in FIG. 8HH. In response to the indication of the input, the first electronic device 500-1 displays the entire content 826 on the shared section 820 of the virtual table. When content 826 is "pushed" onto the shared section 820 of the virtual table, content 814 is optionally pushed off of the shared section 820 of the virtual table and into the private section 821-1 of the virtual table displayed on the second display 504-2 of the first electronic device 500.

FIGS. 9A-9L are flow diagrams illustrating a method of displaying three-dimensional content using coordinated views on multiple displays of an electronic device. The method 900 is optionally performed an electronic device, such as device 100, device 300, device 500, device 500-1, or device 500-2 described above with reference to FIGS. 1A-1B, 2-3, 4A-4B and 5A-5H. Some operations in method 900 are, optionally combined and/or the order of some operations is, optionally, changed.

As described below, the method 900 provides ways of displaying three-dimensional content using coordinated views on multiple displays of an electronic device. The method reduces the cognitive burden on a user when interacting with a user interface of the device of the disclosure, thereby creating a more efficient human-machine interface. For battery-operated devices, increasing the efficiency of the user's interaction with the user interface conserves power and increases the time between battery charges.

In some embodiments, an electronic device (e.g., device 500-1, 500-2) includes a first display, a second display, and one or more input devices (e.g., a phone, tablet computer, laptop, etc. including two touch screens or two displays), such as in FIGS. 5A-5B. In some embodiments, the two touch screens of the device are rotatably coupled together, or coupled together via a hinge, such that the angle between the planes of the touch screens is manipulable by a user. The electronic device optionally concurrently displays (902) a first view (904) of at least a portion of virtual content (e.g., a 3D object) on the first display (e.g., a view of the 3D object from a first angle, such as a side view) from a first perspective (e.g., a first viewing angle relative to a virtual position and/or orientation of the content) and a second view (906) of at least a portion of the virtual content on the second display from a second perspective that is different from the first perspective (e.g., a view of the 3D object from a second angle, such as a top view), such as in FIG. 8A. More generally, the first view of the content on the first display and the second view of the content on the second display optionally have a particular relationship with respect to each other, and in some embodiments, this particular relationship is defined by the relative position of the first display to the second display of the electronic device. For example, the content is optionally a 3D environment into which the first display and the second display are viewports. In such an example, the first display provides a view into the content at the angle of the plane of the first display, and the second display provides a view into the content at an angle of the plane of the second display.

In some embodiments, while concurrently displaying the first view and the second view of the content, the electronic device receives (908), via the one or more input devices, an input corresponding to a request to manipulate the content (e.g., an input to rotate the 3D object), such as in FIGS. 8B-8D. In response to receiving the input, the electronic device optionally updates (910) the first view of the content on the first display and the second view of the content on the second display in accordance with the input, including ceasing to display a first portion of the virtual content from the first perspective on the first display and displaying the first portion of the virtual content from the second perspective on the second display (e.g., changing the first and second views of the content based on the input manipulating the content while maintaining the above-described particular relationship between the first and second views of the content), as in FIGS. 8B-8D. The above-described manner of concurrently displaying different views of content on two displays allows the electronic device to present more information to the user with less inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, updating the first view of the virtual content on the first display and the second view of the virtual content on the second display in accordance with the input (e.g., an input corresponding to a request to rotate the content) further includes ceasing to display a second portion of the virtual content from the second perspective on the second display, and displaying the second portion of the virtual content from the first perspective on the first display (912) (e.g., changing the first and second views of the content based on the input manipulating the content while maintaining the particular relationship between the first and second views of the content), as in FIGS. 8B-8D. In some embodiments, an input to rotate the content will cause both the first view and the second view to rotate. In some embodiments, manipulating the virtual content causes a second portion of the virtual content that was previously visible on the second display to become hidden on the second display, and that second portion of the virtual content that was previously hidden on the first display to become visible on the first display such that the first portion remains visible throughout various manipulations on at least one of the displays, albeit from different perspectives. The above-described manner of concurrently rotating different views of content on two displays allows the electronic device to present more information to the user with fewer inputs (e.g., by rotating both views in response to one input), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the first perspective is normal to a first plane (916) (e.g., a top or overhead view of the content), and the second perspective is normal to a second plane that intersects the first plane (918) (e.g., a side view of the content), such as in FIGS. 8A-8N. The above-described manner of concurrently displaying different views (e.g., a top view and a side view) of content on two displays allows the electronic device to present more information to the user with less inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The first view optionally includes a first portion of the content (922) and the second view optionally includes a second portion of the content different from the first portion of the content (924), as in FIGS. 8A-8N. In some embodiments, the first view and the second view include different portions of continuous content (926) (e.g., movement of the content in the first view causes movement of the content in the second view and movement of the content in the second view causes movement of the content in the first view), as in FIGS. 8A-8N. In some embodiments, the first display and the second display are joined by a hinge defining an angle between the two displays. For example, the second display rests on a flat surface and the first display is positioned in a fully or partially upright position. In some embodiments, the flat display displays content in a plane defined by the flat display and the upright display displays content in three dimensions to appear to extend the plane defined by the flat display (e.g., the first view of the content on the first display and the second view of the content on the second display are rendered to appear to be oriented along the same plane). The above-described manner of showing a continuous view of content on two displays from different perspectives allows the displays of the electronic device to present more information to the user with less inputs by being viewports into a single 3D environment, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, while concurrently displaying the first view and the second view of the virtual content, the electronic device receives (930), via the one or more input devices, a second input corresponding to a request to adjust the second view of the virtual content on the second display (e.g., an input to move or rotate the viewport defined by the second display, or an input to move or rotate the virtual content displayed on the second display), as shown in FIGS. 8A-8I. In response to receiving the second input, the electronic device optionally adjusts (932) the first view of the virtual content on the first display and the second view of the virtual content on the second display in accordance with the second input (e.g., an input to move or rotate the view of the second display also moves or rotates the view of the first display to maintain the spatial relationship between the two views of the content), as shown in FIGS. 8A-8I. In some embodiments, an input to move or rotate the virtual content on the second display also moves or rotates the virtual content on the first display due to the above-described spatial relationship between the two views of the virtual content. The above-described manner of concurrently and correspondingly adjusting different views of content on two displays allows the electronic device to present more information to the user with fewer inputs (e.g., by adjusting both views in response to one input), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The request to adjust the second view of the virtual content on the second display optionally comprises a request to scale (e.g., enlarge or reduce a portion of the content displayed on the second display, or reduce the size of the portion of the content displays on the second display) the virtual content displayed on the second display (936) (e.g., the request is a pinch or depinch gesture that includes movement of a plurality of contacts toward or away from each other on one of the touch-sensitive displays), as shown in FIGS. 8E-8F. In some embodiments, adjusting the first view of the virtual content on the first display in accordance with the second input comprises scaling the virtual content displayed on the first display in accordance with the second input (938), (e.g., enlarging or reducing a portion of the content displayed on the first display that corresponds to a portion of the content displayed on the second display at which the request to zoom in was received), as shown in FIGS. 8E-8F. Adjusting the second view of the virtual content on the second display in accordance with the second input optionally comprises scaling the virtual content displayed on the second display in accordance with the second input (940), as shown in FIGS. 8E-8F. Likewise, in response to an input to zoom out on the content of the second display, the electronic device can zoom out on the content of both displays. The above-described manner of zooming in or out on the two views of the content in a coordinated manner allows the electronic device to present information to the user in a consistent and coordinated manner with less inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the request to adjust the second view of the virtual content on the second display comprises a request (e.g., a touch input followed by movement of the touch input on the touch-sensitive display) to translate the virtual content displayed on the second display (944) (e.g., drag or pan the content to change a portion of the content visible on the second display and/or to change the position of the virtual content on the second display), as shown in FIGS. 8G-8H. Adjusting the first view of the virtual content on the first display in accordance with the second input optionally comprises translating the virtual content displayed on the first display in accordance with the second input (e.g., the first view of the content is updated to drag or pan the content in a direction corresponding to the direction the content is dragged or panned in the second view), as shown in FIGS. 8G-8H. In some embodiments, adjusting the second view of the virtual content on the second display in accordance with the second input comprises translating the virtual content displayed on the second display in accordance with the second input (948), as shown in FIGS. 8G-8H. The above-described manner of dragging the two views of the content in a coordinated manner allows the electronic device to present information to the user in a consistent and coordinated manner with less inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The request to adjust the second view of the virtual content on the second display optionally comprises a request to rotate (e.g., change an orientation of) the virtual content displayed on the second display (952), as shown in FIGS. 8B-8D. In some embodiments, adjusting the first view of the virtual content on the first display in accordance with the second input comprises rotating the virtual content displayed on the first display in accordance with the second input (954) (e.g., rotating the content on the first display and the content on the second display in the same direction relative to their respective perspectives), as shown in FIGS. 8B-8D. Adjusting the second view of the virtual content on the second display in accordance with the second input optionally comprises rotating the virtual content displayed on the second display in accordance with the second input (956), as shown in FIGS. 8B-8D. The above-described manner of rotating the two views of the content in a coordinated manner allows the electronic device to present information to the user in a consistent and coordinated manner with less inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the electronic device detects (960), via the one or more input devices (e.g., a camera and or other input device configured to capture an image of the user), an orientation (e.g., including distance and relative position) of a user's head relative to the first display and the second display, wherein the first perspective and second perspective are based on the detected orientation of the user's head relative to the first display (and/or the second display), as shown in FIGS. 8J-8K. For example, the first perspective and second perspective are aligned relative to the user's head. In some embodiments, when the user moves their head, the first and second perspectives are updated to move in a natural-looking way (e.g., in accordance with the user's new head location). For example, if the user's head is to the right of the first and second displays (e.g., is looking at the virtual content from the right side), the perspectives of the first display and the second display are optionally set by the electronic device to reflect a view of the virtual content from the right, such as in FIG. 8J. If the user's head moves to the left of the first and second displays (e.g., the user is looking at the virtual content from the left side), the perspectives of the first display and the second display are changed by the electronic device to be different perspectives than before to reflect a view of the virtual content from the left, such as in FIG. 8K. The above-described manner of aligning the views of the content based on the orientation of the user's head allows the electronic device to present information to the user in a streamlined manner requiring fewer inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The electronic device optionally detects (966), via the one or more input devices, a change in the orientation of the user's head relative to the first display (and/or the second display) (e.g., a change in distance and/or in relative orientation of the user's head with respect to the electronic device), as shown in FIG. 8K. In some embodiments, the first electronic device updates (968) the first view and the second view of the virtual content in accordance with the detected change in the orientation of the user's head, as shown in FIG. 8K. The above-described manner of updating the views of the virtual content in response to a change in the orientation of the user's head allows the electronic device to present updated information to the user in a streamlined manner requiring fewer inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, while concurrently displaying the first view and the second view of the virtual content, the electronic device detects (972) a change in a relative angle (e.g., by re-positioning one or both of the displays relative to the other display) between the first display and the second display (e.g., the first display and second display are joined by a hinge mechanism that defines an angle between the two displays), as shown in FIGS. 8L-8N. In response to detecting the change in the relative angle (e.g., by re-positioning one or both of the displays relative to the other display) between the first display and the second display, the electronic device optionally updates (974) the first view of the virtual content on the first display to be from a third perspective that is different than the first perspective in accordance with the change in the relative angle between the first display and the second display (e.g., when the second display is resting on a flat surface, repositioning the first display changes the relative angle of the two displays and a viewing angle of the virtual content from which the first display is displaying the virtual content), as shown in FIGS. 8L-8N. In some embodiments, the second view changes in response to the change in the angle between the first display and the second display. In some embodiments, the second view does not change. The above-described manner of updating the first perspective of the first view of the content based on the orientation of the two displays allows the electronic device to present information to the user that reflects the user's physical positioning of the electronic device, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

While updating the first view of the virtual content on the first display, the electronic device optionally maintains (976) the second view of the virtual content on the second display to be from the second perspective (e.g., the second perspective of the second view of the content displayed on the second display does not change in response to a change in the relative angle between the first display and the second display), as shown in FIGS. 8L-8N. The above-described manner of only changing the perspective of the first view allows the electronic device to present information to the user with a fixed reference, which simplifies interactions between the user and the device and enhances the operability of the device and makes the user-device interface more efficient (e.g., by helping the user to avoid erroneous interactions with the device), which, additionally, reduces power usage and improves battery life of the device by enabling the user to use the device more quickly and efficiently.

In some embodiments, the virtual content is part of a three-dimensional environment (980), as shown in FIGS. 8A-8N. The first view of the virtual content on the first display optionally provides a view into the three-dimensional environment from the first perspective (982), as shown in FIGS. 8A-8N. In some embodiments, the second view of the virtual content on the second display provides a view into the three-dimensional environment from the second perspective (984), as shown in FIGS. 8A-8N. In some embodiments, the difference between the first perspective and the second perspective is the difference between the angles of the first display and the second display. The above-described manner of concurrently providing different viewports into a three-dimensional environment allows the electronic device to present more information to the user in a streamlined and coordinated manner requiring fewer inputs, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The first view optionally comprises one plane of a plurality of planes of the three-dimensional environment (986) (e.g., the first view provides a view from one slice into the three-dimensional environment, which can be viewed from many different slices), as shown in FIGS. 8A-8N. The above-described manner of providing views through slices of a three-dimensional environment defined by the first display allows the electronic device to present information to the user in a way that reflects the positioning of the electronic device with respect to the virtual three-dimensional environment, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the electronic device receives (990), at the second display, a navigation input corresponding to a request to navigate through the three-dimensional environment (e.g., a touch input comprising a swipe, pinch, or multi-contact input), as shown in FIGS. 8A-8N. In response to receiving the navigation input corresponding to the request to navigate through the three-dimensional environment, the electronic device optionally updates (992) the first view of the three-dimensional environment and the second view of the three-dimensional environment in accordance with the navigation input, as shown in FIGS. 8A-8N. For example, the first view and the second view move in a coordinated manner in response to the input, as the first and second displays are viewports into the three-dimensional environment. Thus, the navigation input can be thought of as a request to move the electronic device through the three-dimensional environment. The above-described manner of updating the views of the content based on navigation inputs allows the electronic device to present information to the user in a coordinated and streamlined manner requiring fewer inputs (e.g., by updating the first view and the second view in response to a single input), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The electronic device optionally displays (996), on the second display, a user interface for creating content (e.g., a user interface of a CAD or other drawing application), the user interface including a rendering of the created content in two dimensions, as shown in FIGS. 8O-8T. For example, the user has provided inputs to the second display of the electronic device, such as drawings inputs detected on the second display, to create the content in two-dimensions on the second display. In some embodiments, the electronic device receives (998) an input corresponding to a request to move the created content from the second display to the first display (e.g., the user "pushes", such as via a swipe or drag input detected on the second display, the content from the second display towards the first display), as shown in FIGS. 8O-8Q. In response to receiving the input corresponding to the request to move the created content from the second display to the first display, the electronic device displays (998-2), on the first display, a rendering of the created content in three dimensions (e.g., rendering a three-dimensional model on the first display corresponding to the two-dimensional drawing on the second display), as shown in FIGS. 8O-8Q. In some embodiments, the created content that is pushed up to the first display is no longer displayed on the second display. The above-described manner of dragging content between the first and second displays to render the content in three or two dimensions, respectively, allows the electronic device to provide a simple mechanism for a user to render their content in two or three dimensions, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the electronic device concurrently displays (998-6), on the first display, the rendering of the created content in three dimensions; and on the second display, the rendering of the created content in two dimensions, including an indication of a location of a cross-section in the created content (e.g., a cross-section line in the two-dimensional drawing of the content), as shown in FIGS. 8R-8T. The rendering of the created content in three dimensions optionally corresponds to the cross-section in the created content at the location indicated on the second display, as shown in FIGS. 8R-8T. For example, the cross-section line shown in the two-dimensional drawing of the content illustrates the plane at which the content is cut into in the three-dimensional model on the first display. In some embodiments, while concurrently displaying the rendering of the created content in three dimensions and the rendering of the created content in two dimensions, the electronic device receives (998-10), via the one or more input devices, a second input corresponding to a request to move the cross-section of the created content to a second location in the created content (998-10) (e.g., the user drags the cross-section to a different location or rotates the cross-section to a different orientation), as shown in FIGS. 8S-8T. In response to receiving the second input, the electronic device optionally updates (998-12) the rendering of the created content in three dimensions to correspond to the cross-section in the created content at the second location indicated on the second display (e.g., displaying the three-dimensional model from a different cross-section corresponding to the new location of the cross-section in the two-dimensional drawing), as shown in FIGS. 8R-8T. The above-described manner of updating the first perspective of the first view of the content based on a cross-section illustrated in the second view allows the electronic device to present information to the user in a streamlined manner requiring fewer inputs (e.g., concurrently displaying a three-dimensional view and a two-dimensional drawing showing the location of the cross-section from which the three-dimensional view is positioned), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the electronic device is a first electronic device in communication (e.g., via a wired or wireless connection) with a second electronic device (998-16) (e.g., a phone, tablet computer, laptop etc. including two touch screens or two displays), as shown in FIGS. 8U-8HH. In some embodiments, a user of the first electronic device and a user of the second electronic device are participating in a video conference with each other. The electronic device optionally displays (998-18), on the second display, a private content region including first content (e.g., an image, a video, etc.), wherein content in the private content region, including the first content, is not shared with the second electronic device (e.g., the private content is displayed in a private space of the user interface of the first electronic device), as shown in FIGS. 8BB-8FF. In some embodiments, the electronic device receives (998-20), via the one or more input devices, an input for dragging the first content from the private content region towards the first display (e.g., a touch input including touchdown on the private content displayed on the second display and movement towards the first display), as shown in FIGS. 8BB-8FF. In some embodiments, the touch input is a flick gesture towards the first display. In response to receiving the input for dragging the first content from the private content region towards the first display (998-22), the electronic device shares (998-24) the first content with the second electronic device (e.g., transmitting, to the second device, data or information comprising the first content or a visual representation of the first content) and ceases (998-26) the displaying of the first content in the private content region on the second display (e.g., with or without displaying the first content on the first display), as shown in FIGS. 8BB-8FF. The above-described manner of sharing content with a second electronic device allows the first electronic device to provide an easy mechanism for keeping content private or sharing content (e.g., sharing content in response to a gesture or input), which simplifies interactions between the user and the device and enhances the operability of the device and makes the user-device interface more efficient, which, additionally, reduces power usage and improves battery life of the device by enabling the user to use the device more quickly and efficiently.

In some embodiments, the first electronic device is configured in a configuration in which the first display is above the second display (998-30) (e.g., the first display and the second display are joined by a hinge defining an angle between the two displays), as shown in FIGS. 8BB-8FF. In some embodiments, the second display rests on a flat surface and supports, at the hinge, the first display, which can be in a fully or partially vertical position (e.g., perpendicular to the flat surface or at another angle). The input for dragging the first content from the private content region on the second display towards the first display optionally comprises an input for dragging the first content from the bottom display to the top display (998-32) (e.g., the motion of the input comprises an upward motion towards the top display), as shown in FIGS. 8BB-8FF. In some embodiments, the input is received entirely at the second display, or optionally continues to the first display. The above-described manner of sharing content with a second electronic device allows the first electronic device to present information to the user in a streamlined manner requiring fewer inputs (e.g., sharing content in response to a gesture or input), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In response to receiving the input for dragging the first content from the private content region on the second display towards the first display (e.g., the input causes the first content to change from being private content to being shared content and causes the second display to cease to display the first content), the electronic device displays (998-34) the first content in a shared content region on the first display, as shown in FIG. 8W. For example, the first display includes a public space, content in which is shared with other electronic devices, including the second electronic device. In some embodiments, the input "moves" the content from the second display to the first display. In some embodiments, the first content is displayed in the shared space to indicate to the user that the first content is accessible by a user of the second electronic device. The above-described manner of moving content to a shared space when the content becomes shared content allows the first electronic device to present information to the user in a streamlined manner requiring fewer inputs (e.g., indicating that content is shared by displaying it in the shared space), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the first electronic device and the second electronic device are able to interact with (e.g., point to, move, manipulate, etc.) content in the shared content region, including the shared first content (998-36), as shown in FIGS. 8X-8AA. For example, the user of the first device or the user of the second device optionally enters an input to perform an operation involving some or all of the shared content. In some embodiments, the input comprises the user pointing, with an elongated object (e.g., a finger or a stylus) at some of the shared content to visually highlight (e.g., display in a lighter or brighter color) the pointed-to portion of the content in the shared spaces of the first device and the second device. The above-described manner of allowing users of both electronic devices to interact with the shared content in the shared space allows the electronic device to facilitate coordinated user interaction, which simplifies interactions between the user and the device and enhances the operability of the device and makes the user-device interface more efficient (e.g., by displaying coordinated information based on actions of multiple users), which, additionally, reduces power usage and improves battery life of the device by enabling the user to use the device more quickly and efficiently.

The shared first content is optionally displayed on the first display as being positioned on a plane extending from a plane of the second display (998-38), as shown in FIGS. 8BB-8HH. For example, the second display defines the plane of a table on which the two electronic devices are positioned, towards each other, and the shared content is sitting on top of the table. The portion of the table that corresponds to the shared content region is optionally the portion of the table that is displayed on the first display. In some embodiments, the first electronic device and the second electronic device both have access to the shared content or to a visual representation of the shared content. Private content not shared with the user of the second electronic device is optionally displayed on the portion of the table that is displayed on the second display. In some embodiments, the first display and the second display are joined by a hinge or similar mechanism with the first displaying a fully or partially upright position and the second display resting on a flat surface. In some embodiments, the second display (e.g., the bottom display or the flat display) displays a virtual table top and the first display (e.g., the top display or the fully or partially upright display) displays, in three-dimensions, a continuation of the virtual tabletop. The above-described manner of displaying shared content on a portion of a virtual table between the two electronic devices allows the electronic devices to present information to the user in a realistic manner (e.g., as on a representation of a virtual table), which simplifies interactions between the user and the device and enhances the operability of the device and makes the user-device interface more efficient (e.g., by helping the user to interact with the shared content and/or the second electronic device using fewer inputs provided to the device), which, additionally, reduces power usage and improves battery life of the device by enabling the user to use the device more quickly and efficiently.

In some embodiments, while displaying the shared first content in the shared content region, the electronic device receives (998-42) (e.g., via the wired or wireless connection between the first electronic device and the second electronic device) an indication of a request, from the second electronic device, to add shared second content (e.g., a notification that the second electronic device is about to share content with the first electronic device, a file including a visual representation of the shared content, and/or a file including the shared content itself) to the shared content region, as shown in FIGS. 8BB-8HH. In response to receiving the indication, the electronic device optionally displays (998-46), in the shared content region on the first display, the shared second content from the second electronic device (e.g., a visual representation of the shared content that the second electronic device has "pushed" into the shared content region) and moves the shared first content towards the second display, as shown in FIGS. 8BB-8HH. For example, the second shared content "pushes" already-displayed shared content back towards the user of the first device (e.g., back towards the private content region of the first electronic device on the second display) to make room for the second shared content to be displayed in the shared space. In some embodiments, the shared first content is pushed all the way back to the private content region on the second display, and thus is no longer displayed on the first display (e.g., in the shared content region) in response to the second electronic device adding shared content to the shared content region. In such embodiments, only a single shared content is able to be displayed in the shared content region at a given time. The above-described manner of updating the arrangement of shared content in the shared space allows the electronic devices to present information to the user in a streamlined manner requiring fewer inputs (e.g., by updating the shared space to fit the newly shared content), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

Moving the shared first content towards the second display optionally comprises ceasing to display all or a part of the shared first content in the shared content region on the first display, and displaying all or the part of the first shared content on the second display (998-50), as shown in FIGS. 8FF-8HH. For example, some or all of the previously-displayed shared content is "pushed" from the first display (e.g., the top display or the fully or partially upright display) to the second display (e.g., the bottom or flat display). In some embodiments, the second display includes a shared space including shared content and a private space including private content. In some embodiments, this content that is pushed onto the bottom screen is pushed into the shared space on the bottom screen. In some embodiments, this content that is pushed onto the bottom screen is pushed into the private space on the bottom screen. The above-described manner of allowing shared content to be pushed all the way to another device's shared or private space allows the electronic devices to provide an easy mechanism for a user to put content on another user's device, which simplifies interactions between the user and the device and enhances the operability of the device and makes the user-device interface more efficient (e.g., by helping the user to interact with another user using fewer inputs provided to the device), which, additionally, reduces power usage and improves battery life of the device by enabling the user to use the device more quickly and efficiently.

In some embodiments, the electronic device displays (998-54) a first visual representation of the shared first content, as shown in FIGS. 8W-8AA. The first visual representation of the shared first content is optionally displayed from a first perspective (998-56), as shown in FIGS. 8W-8AA. For example, the first electronic device displays a first view of the shared content as though the user of the first electronic device is viewing a virtual model from a first viewing angle. A second visual representation of the shared first content is optionally displayed at the second electronic device from a second perspective different from the first perspective (998-58), as shown in FIGS. 8W-BAA. For example, the second electronic device displays a second view of the shared content as though the user of the second electronic device is viewing the virtual model from a second viewing angle, such as from the opposite direction than the first electronic device as if the two users of the two electronic devices are facing each other with the shared content positioned between them. In some embodiments, this way of displaying the shared content from different viewing angles gives the appearance that both users are viewing a virtual representation of a physical model while standing in different locations relative to the model. The above-described manner of displaying shared content from different perspectives on each device allows the electronic devices to present information to the user in a realistic manner (e.g., as a representation of a virtual model), which simplifies interactions between the user and the device and enhances the operability of the device and makes the user-device interface more efficient (e.g., by helping the user to interact with the shared content and/or the second electronic device using fewer inputs provided to the device), which, additionally, reduces power usage and improves battery life of the device by enabling the user to use the device more quickly and efficiently.

It should be understood that the particular order in which the operations in FIGS. 9A-9L have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, 1700, 1900 and 2100) are also applicable in an analogous manner to method 900 described above with respect to FIGS. 9A-9L. For example, the content, displays, perspectives, manipulation inputs, sharing, etc., described above with reference to method 900 optionally have one or more of the characteristics of the content, displays, perspectives, manipulation inputs, sharing, etc. described herein with reference to other methods described herein (e.g., methods 700, 1100, 1300, 1500, 1700, 1900 and 2100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9L are, optionally, implemented by components depicted in FIGS. 1A-1B. For example, displaying operations 902, 904, 906 and 910, and receiving operation 908 are, optionally, implemented by event sorter 170, event recognizer 180, and event handler 190. Event monitor 171 in event sorter 170 detects a contact on touch screen 504-1, 504-2, 504-3, 504-4, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Sharing Content

Users interact with electronic devices in many different manners, including interacting with content (e.g., files, documents, images, etc.) that may be available (e.g., stored or otherwise available) on the electronic devices. In some embodiments, a user of an electronic device shares content with a user of another electronic device so that both users are able to concurrently view and/or interact with (e.g., edit, perform an action using) shared content at the respective electronic devices. For example, the electronic devices allow the users to interact with shared content while communicating using a video conferencing application. The embodiments described below provide ways in which two electronic devices share content while displaying a video conferencing user interface, thereby enhancing the user's interactions with the electronic device. Enhancing interactions with a device reduces the amount of time needed by a user to perform operations (e.g., by facilitating interactions with the shared content), and thus reduces the power usage of the device and increases battery life for battery-powered devices. It is understood that people use devices. When a person uses a device, that person is optionally referred to as a user of the device.

FIGS. 10A-10GG illustrate exemplary ways in which two electronic devices share content while displaying a video conferencing user interface in accordance with some embodiments of the disclosure. The embodiments in these figures are used to illustrate the processes described below, including the processes described with reference to FIGS. 11A-11N.

More specifically, FIGS. 10A-10E illustrate various ways a first electronic device 500-1 shares content with a second electronic device 500-2. In some embodiments, sharing content includes transferring a file including the content or transferring a file including a visual representation of the content from one electronic device to another and concurrently displaying the shared content on both electronic devices. It is understood that in some embodiments, one or both electronic devices 500-1 and 500-2 include touch screens, such as described with reference to FIGS. 5A-5H.

Figure 10A:
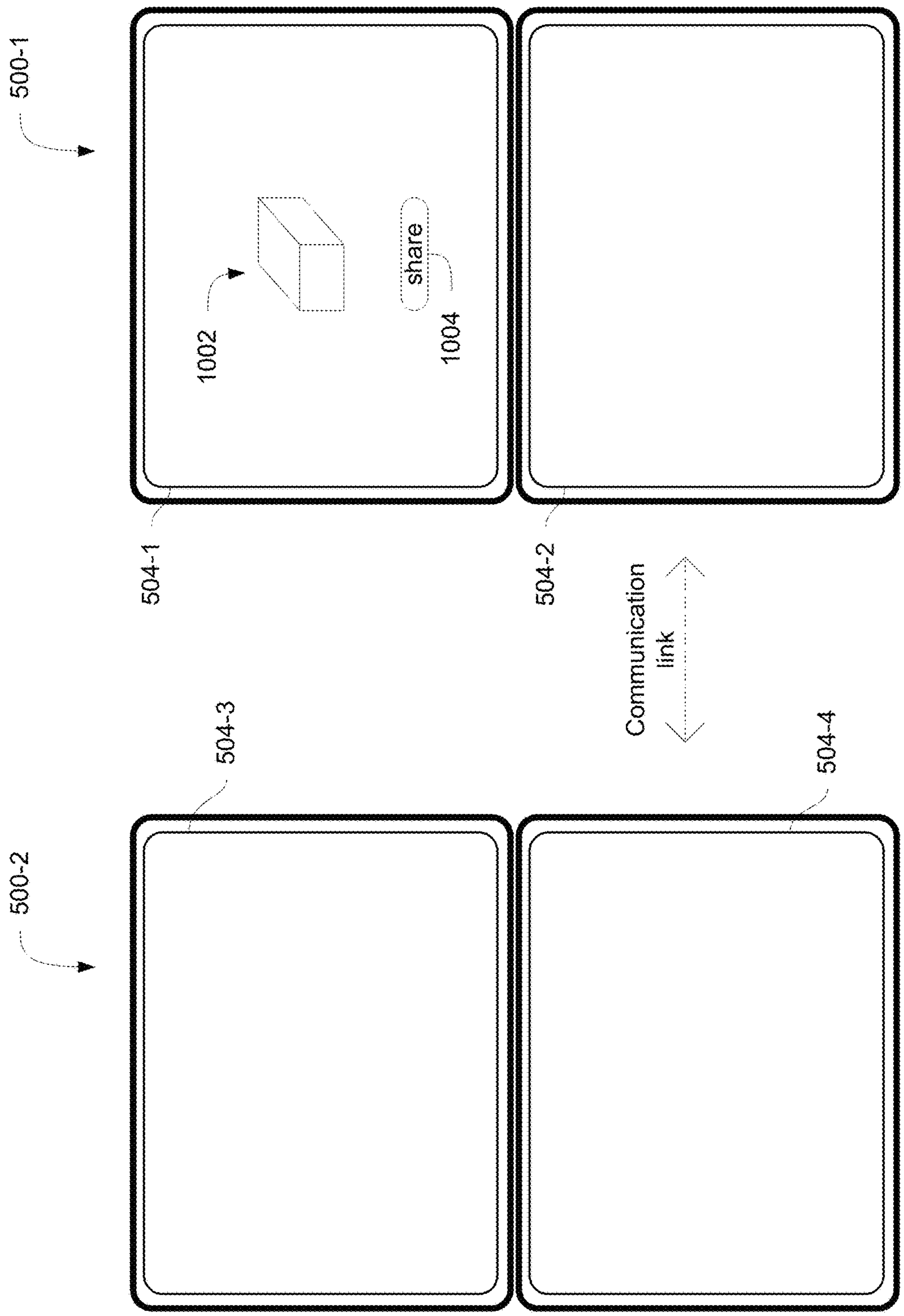
FIGS. 10A-10GG illustrate exemplary ways in which two electronic devices share content while displaying a video conferencing user interface in accordance with some embodiments of the disclosure.

In FIG. 10A, a first electronic device 500-1 is in communication with (e.g., by way of a wired or wireless connection) a second electronic device 500-2. The first electronic device 500-1 includes a first display 504-1 and a second display 504-2, such as described with reference to FIGS. 5A-5H. The second electronic device 500-2 includes a first display 504-3 and a second display 504-4, such as described with reference to FIGS. 5A-5H. The first electronic device 500-1 displays, on the first display 504-1, content 1002 and an input element 1004 for sharing the content. For example, the content 1002 is a file, a document, or other media. In FIG. 8B, the first electronic device 500-1 detects a contact 1003 on the input element 1004 for sharing content 1002. In FIG. 8C, the first electronic device 500-1 displays a plurality of options for sharing the content with a number of contacts stored on the electronic device in response to the detected input. Specifically, the electronic device 500-1 displays a number of input elements 1005-1 to 1005-3 for sharing the content with specific contacts. In some embodiments, these contacts are frequent contacts or contacts included on a favorites list. The electronic device further displays an input element 1001 for sharing the content with a contact not listed on the display 504-1. In some embodiments, the input element 1004 for sharing the content remains on the display 504-1 (e.g., to indicate to the user that the displayed inputs 1001, 1005-1, 1005-2, and 1005-3 are for sharing content) but is deactivated or otherwise deemphasized (e.g., faded, dimmed, etc.).

Figure 10B:
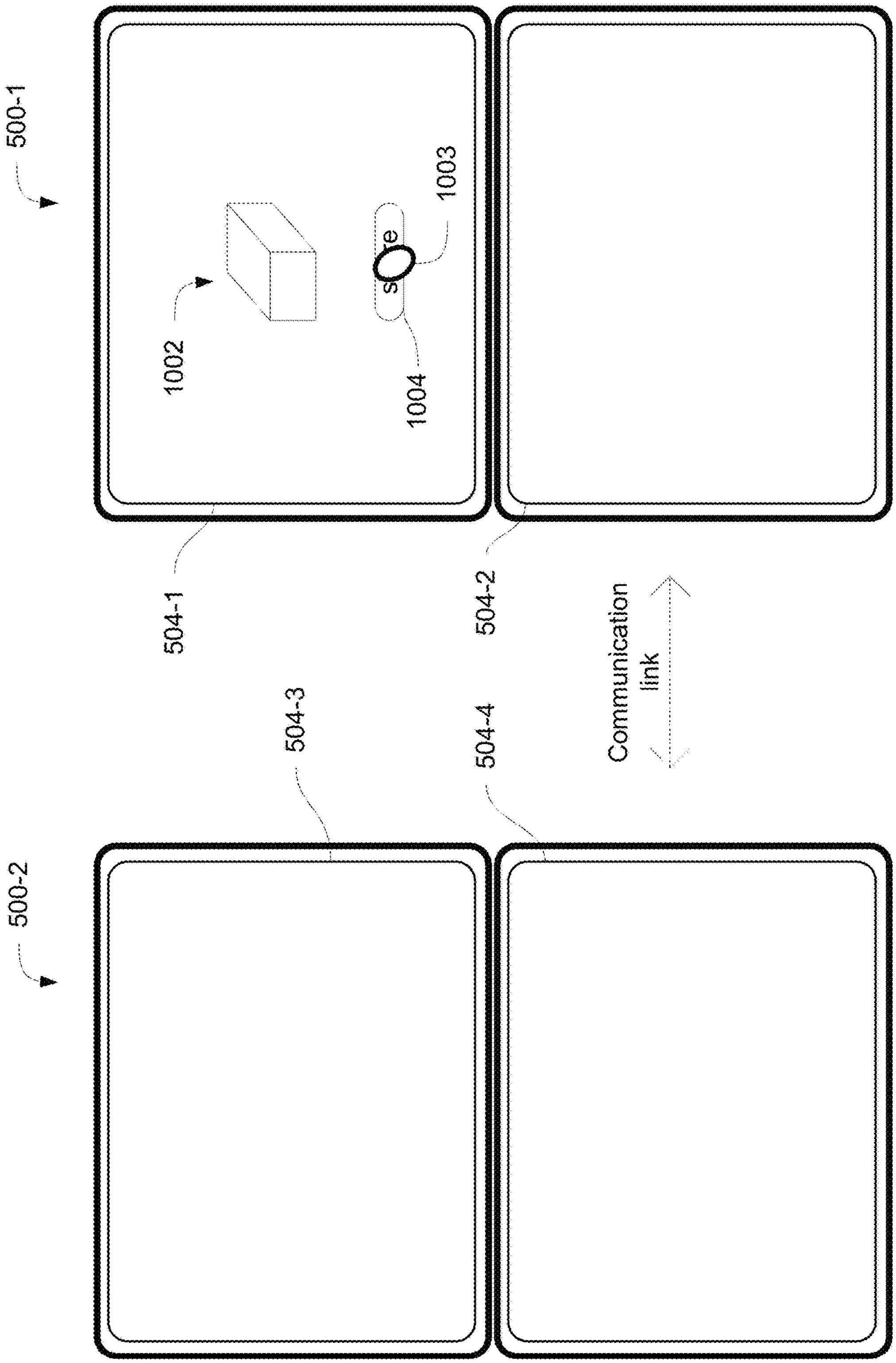
Figure 10C:
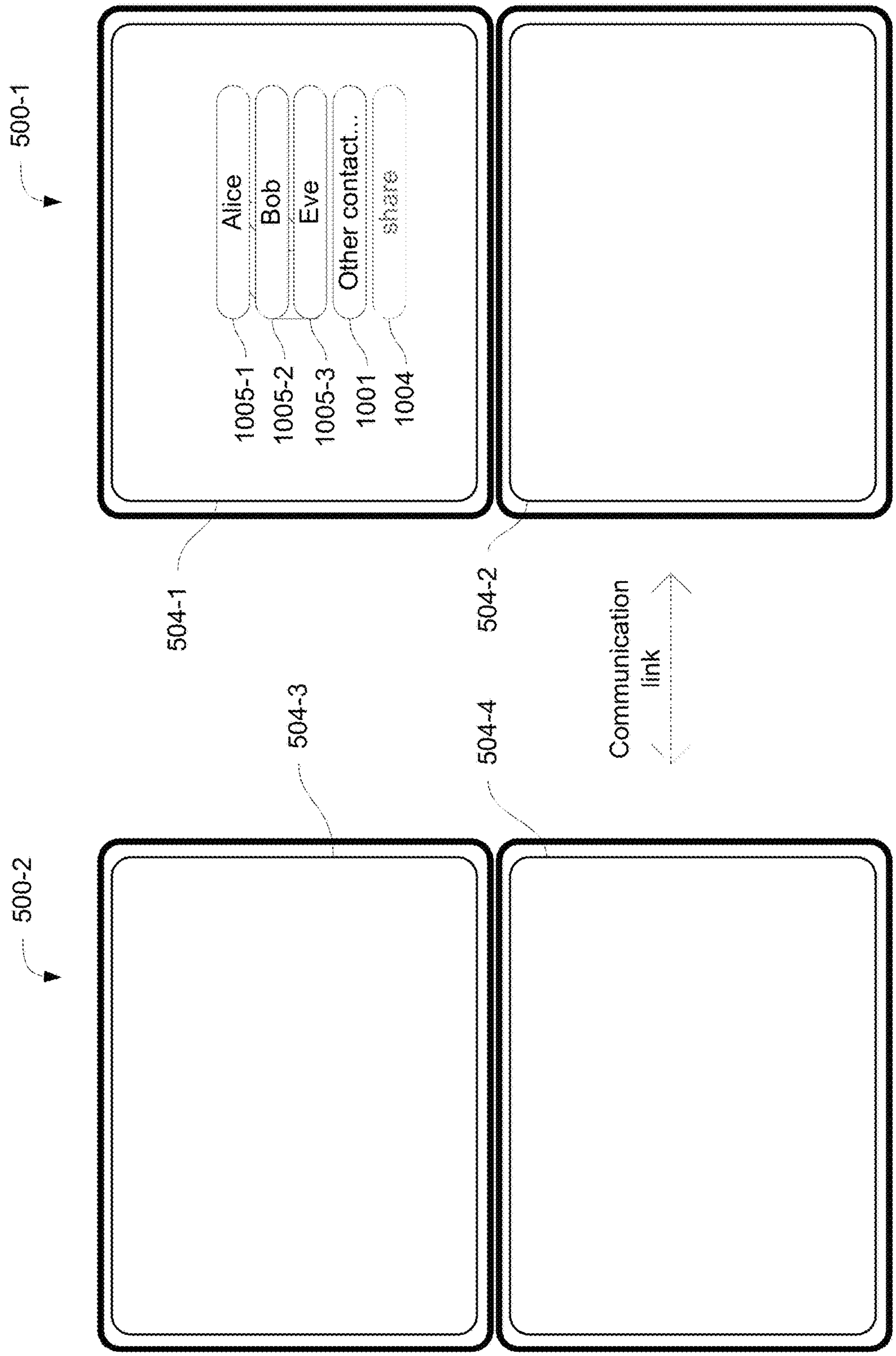
Figure 10D:
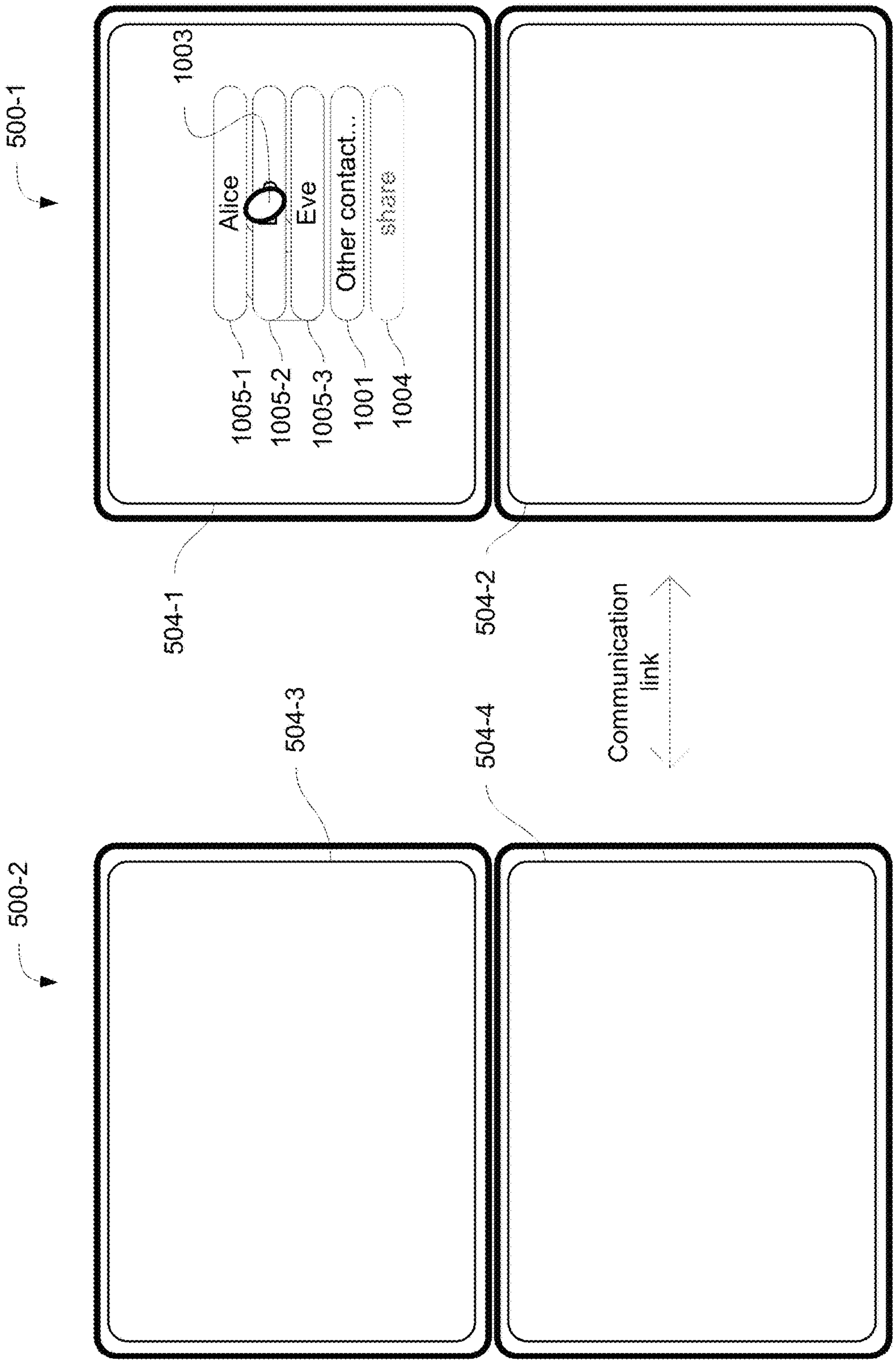
Figure 10E:
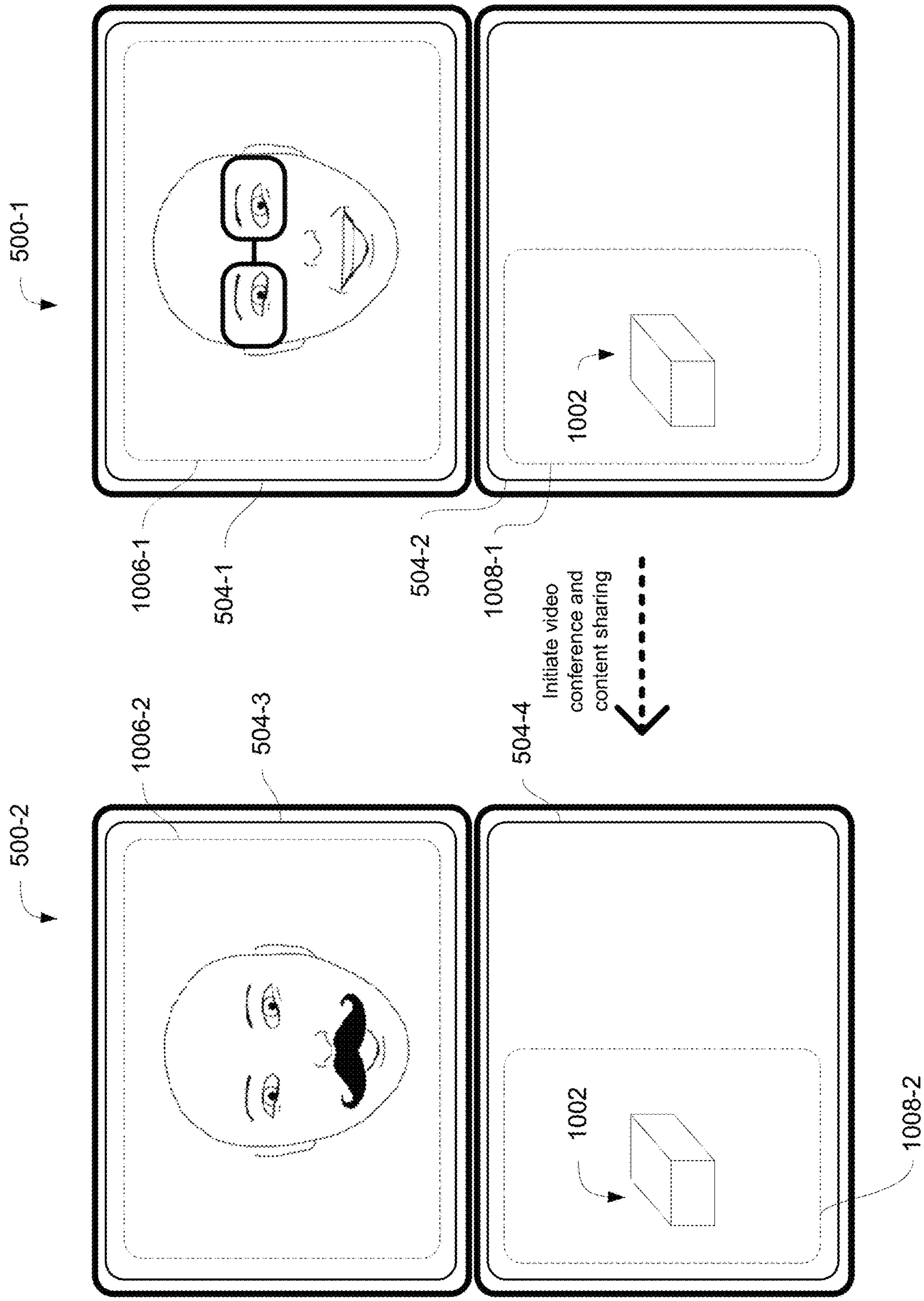

In FIG. 10D, the first electronic device 500-1 detects a contact 1003 on an input element 1005-2 to share the content with a contact named Bob. In FIG. 10E, in response to the input to share the content 1002 with the contact named Bob, the first electronic device 500-1 initiates a video conference with Bob and shares content 1002 with the second electronic device 500-2. Specifically, the first electronic device 500-1 transmits to the second electronic device 500-2 an indication to initiate the video conference and content sharing. In response to the indication, the second electronic device 500-2 displays a video conferencing user interface 1006-2 on the first display 504-3, and the shared content 1002 in a shared space 1008-2 on the second display 504-4, as shown in FIG. 10E. In some embodiments, the first electronic device 500-1 displays a video conferencing user interface 1006-1 (e.g., the user interface of a video conferencing application) on the first display 504-1, and displays the content 1002 in a shared space 1008-1 on the second display 504-2 when the video conference and content sharing is initiated, as shown in FIG. 10E.

Figure 10F:
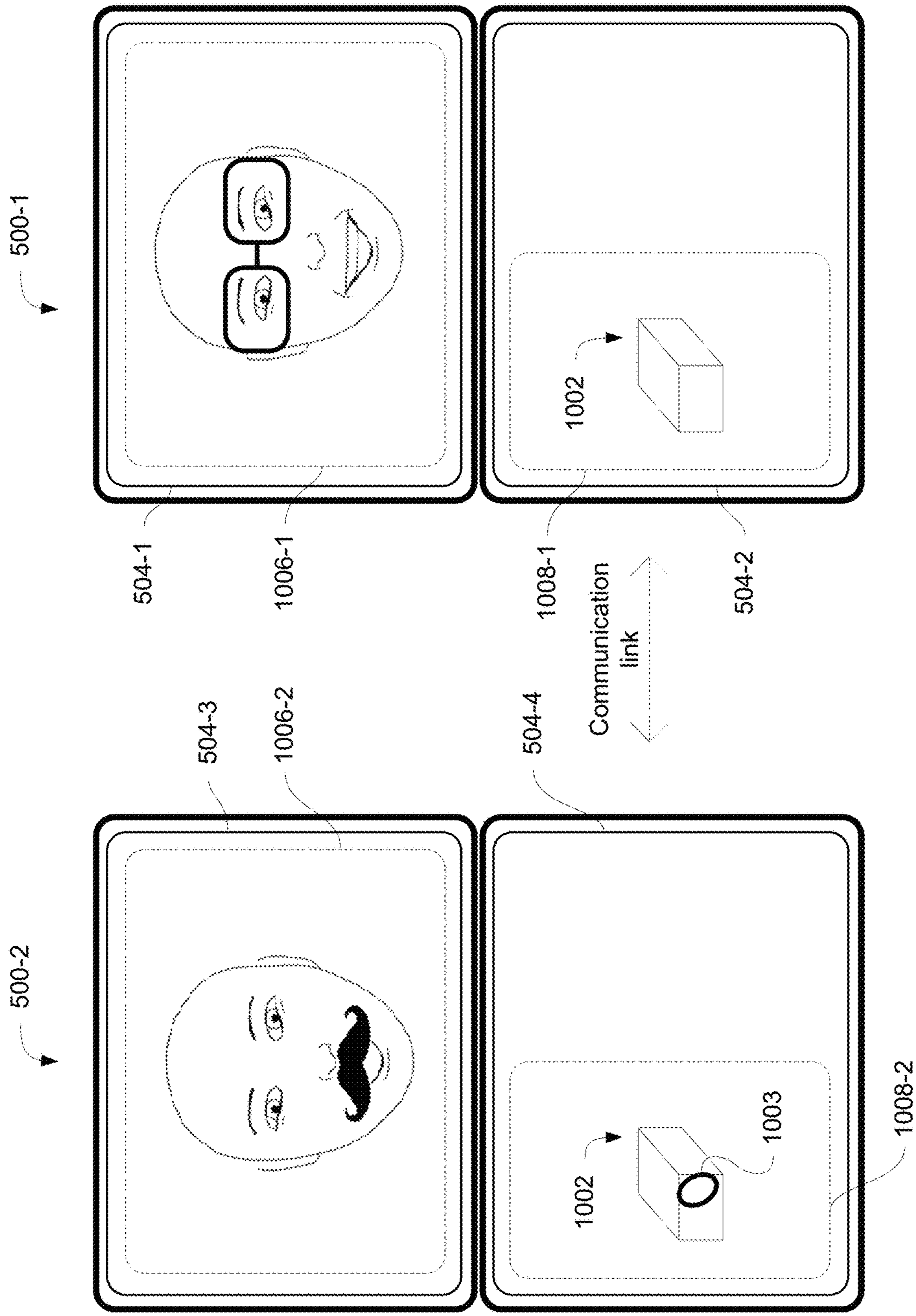
Figure 10G:
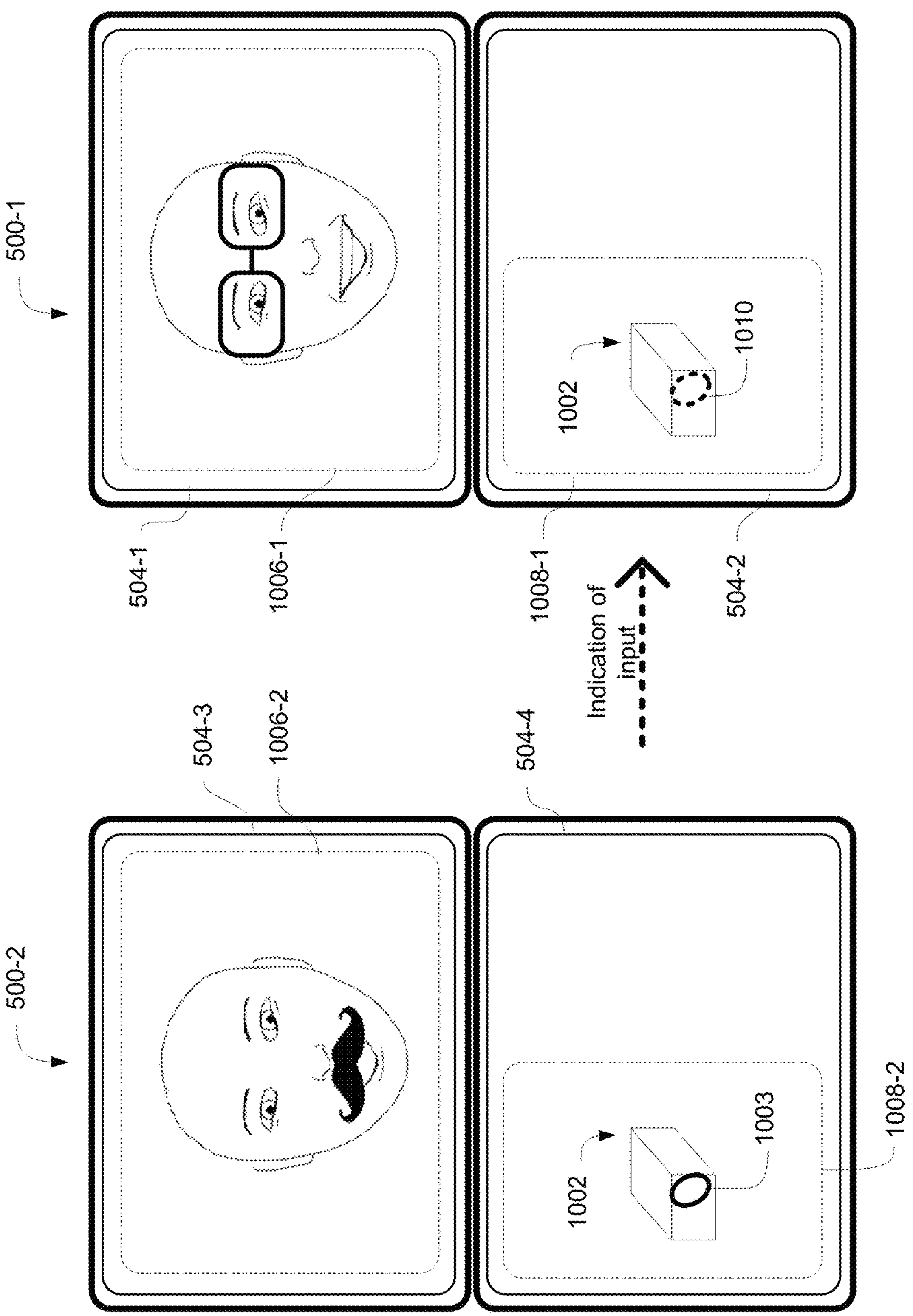
Figure 10H:
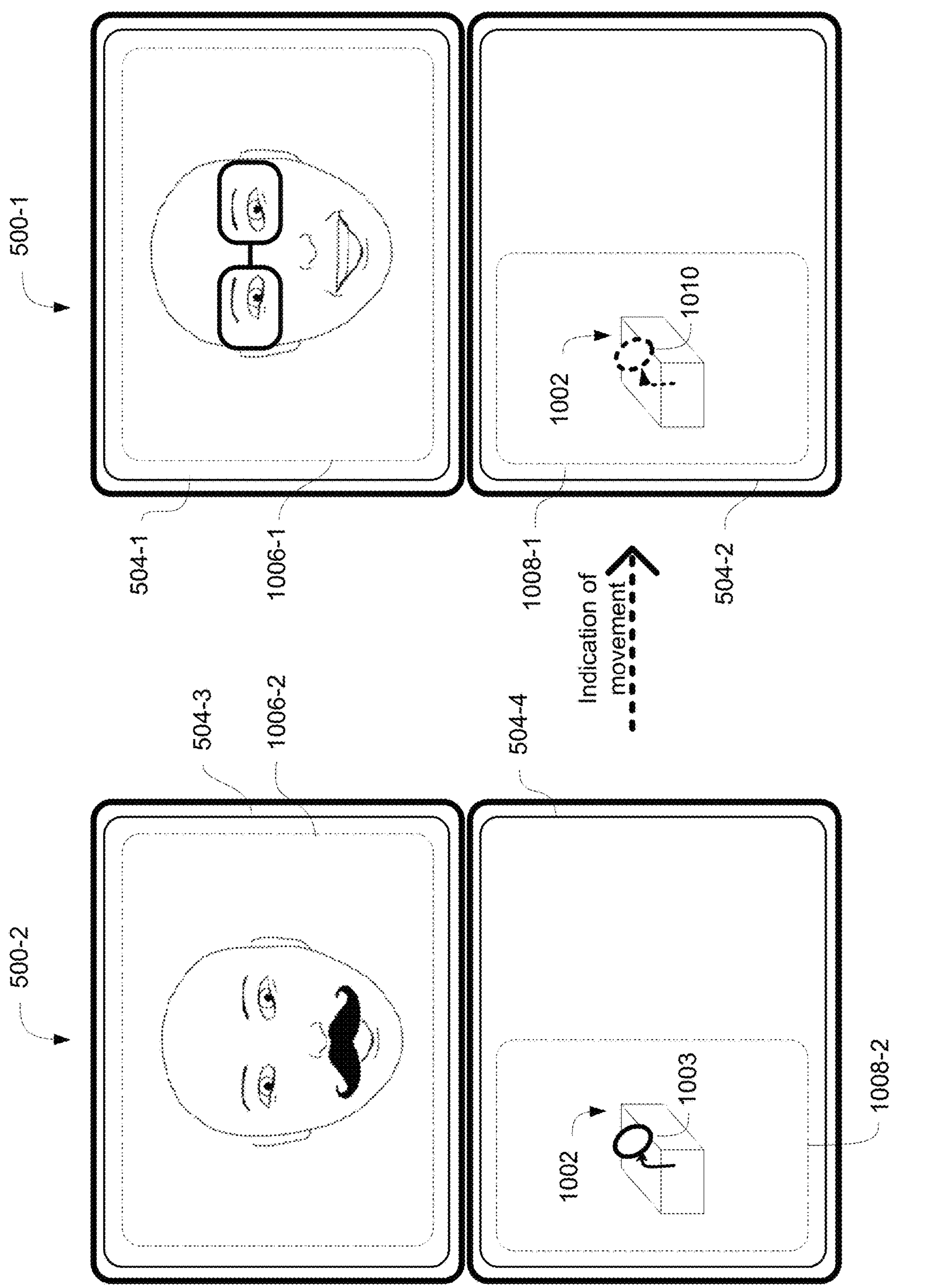

FIGS. 10F-10H illustrate various ways the second electronic device 500-2 accepts user input to interact with the shared content and transmits indications of the user inputs to the first electronic device 500-1. Although the embodiments described with reference to FIGS. 10F-10H illustrate the user of the second electronic device 500-2 interacting with the shared content, it should be understood that the user of the first electronic device 500-1 is also able to interact with the shared content in an analogous manner. When the user of the first electronic device 500-1 interacts with the shared content, the second electronic device 500-2 optionally displays indications of such interaction with the shared content, as will be discussed below.

For example, in FIG. 10F, the second electronic device 500-2 detects a contact 1003 on the content 1002 displayed in the shared space 1008-2 on the second display 504-4. For example, the contact optionally is an input entered by the user of the second electronic device 500-2 to interact with the content 1002 (e.g., to touch or point to a specific portion of content 1002). In FIG. 10G, in response to the detected contact 1003, the second electronic device 500-2 transmits an indication of the input to the first electronic device 500-1. In response to the indication of the input, the first electronic device 500-1 displays an indication 1010 of the input detected by the second electronic device 500-2 (e.g., a visual indication of the interaction with the shared content 1002 detected at the second electronic device 500-2). For example, in response to the contact detected at the second electronic device 500-2, the first electronic device 500-1 displays a touch cloud 1010 indicating the location of the detected contact on the shared content 1002, as shown in FIG. 10G. In some embodiments, the touch cloud includes displaying a cloud-like image or animation at the location(s) the user of the second electronic devices 500-2 touches the content 1002. In this way, the first electronic device 500-1 indicates to the user how the user of the second electronic device 500-2 interacts with the shared content 1002.

In FIG. 10H, the second electronic device 500-2 detects a movement of the contact 1003 on the shared content 1002. In response to the movement of the contact 1003, the second electronic device 500-2 optionally displays an animation of the touch cloud following the movement of contact 1003 and sends an indication of the movement to the first electronic device 500-1. In response to the indication of the movement, the first electronic device 500-1 displays a touch cloud 1010 showing the movement of the contact 1003 on the second electronic device 500-2 (e.g., showing the same movement of contact 1003 over shared content 1002 that is detected on the second electronic device 500-2). In some embodiments, the second electronic device 500-2 does not display the touch cloud, and the touch cloud is only displayed on the first electronic device 500-1 for the benefit of the user of the first electronic device.

Figure 10I:
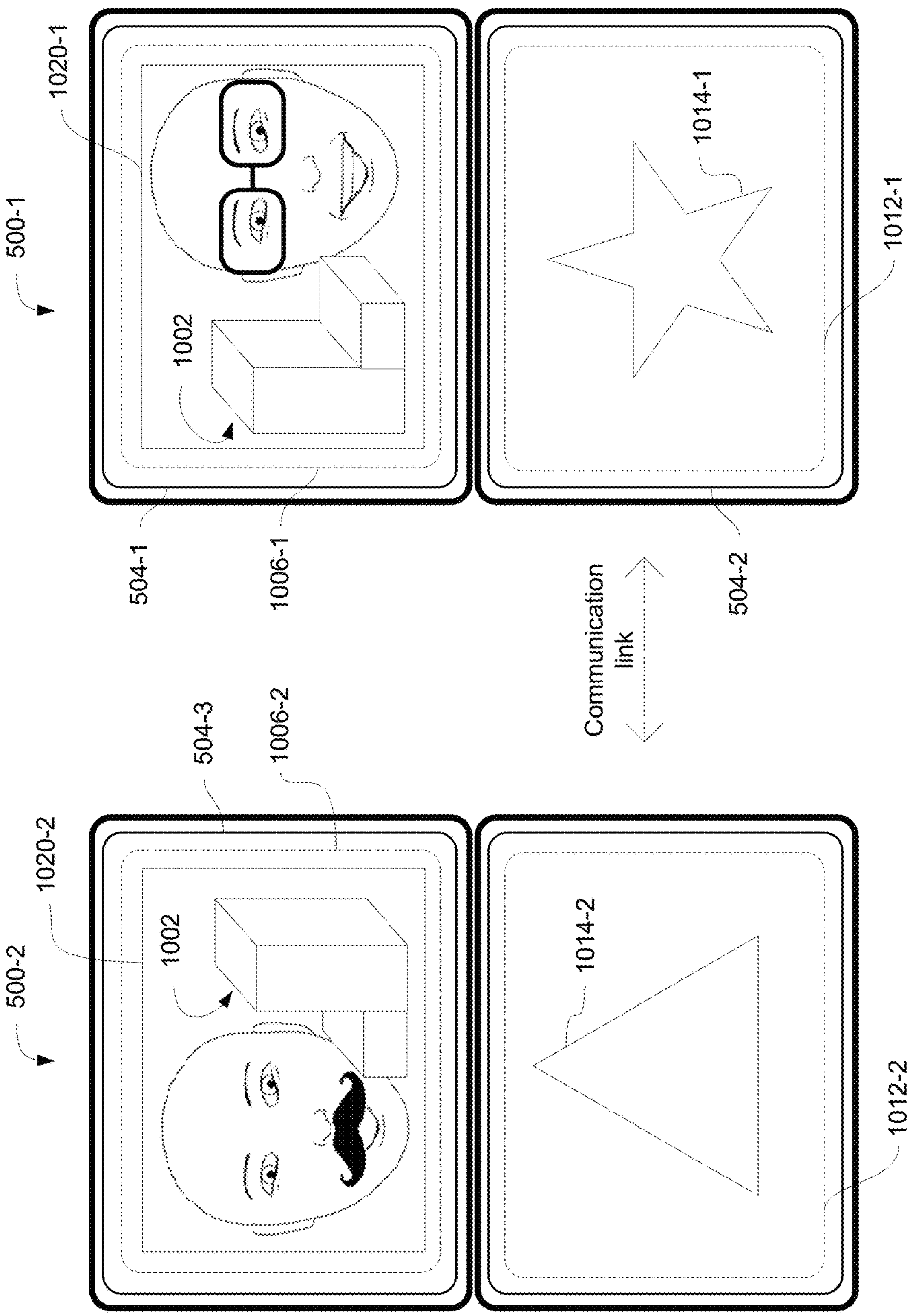

FIG. 10I illustrates various ways the first electronic device 500-1 and the second electronic device 500-2 integrate the shared content into the video conferencing user interfaces displayed by the first electronic device and the second electronic device. In FIG. 10I, shared content 1002 is displayed over (e.g., as overlaid over) the video conferencing user interfaces 1006-1 and 1006-2 of the electronic devices 500-1 and 500-2. The first electronic device 500-1 displays, on the first display 504-1, the shared content 1002 on a first virtual window 1020-1 over the video conferencing user interface 1006-1. The first electronic device 500-1 further displays, on the second display 504-2, first private content 1014-1 in a first private space 1012-1. The first private content 1014-1 is not shared with the user of the second electronic device 500-2. The second electronic device 500-2 displays, on the first display 504-3, the shared content 1002 on a second virtual window 1020-2 over the video conferencing user interface 1006-2. In some embodiments, the virtual windows 1020-1 and 1020-2 are positioned in front of the video conferencing user interfaces 1006-1 and 1006-2 for the users to place shared content upon. The second electronic device 500-2 further displays, on the second display 504-4, second private content 1014-2 in a second private space 1012-2. The second private content 1014-2 is not shared with the user of the first electronic device 500-1. As shown in FIG. 10I, the shared content 1002 is displayed at the first electronic device 500-1 facing a first direction and is displayed at the second electronic device 500-2 facing the opposite direction, which optionally gives the appearance that the users are positioned on opposite sides of a virtual model of the shared content 1002, or on opposite sides of a virtual window. It is understood that the above-described windows 1020-1 and 1020-1 are optionally described to help illustrate the manner in which the shared content is displayed overlaid over the video conferencing user interfaces displayed by the electronic devices. However, more generally and without reference to such windows, in some embodiments, the electronic devices display the shared content 1002 overlaid over the video conference videos that are displayed as if the users of the two electronic devices are facing each other with the shared content 1002 positioned between the two users.

Figure 10J:
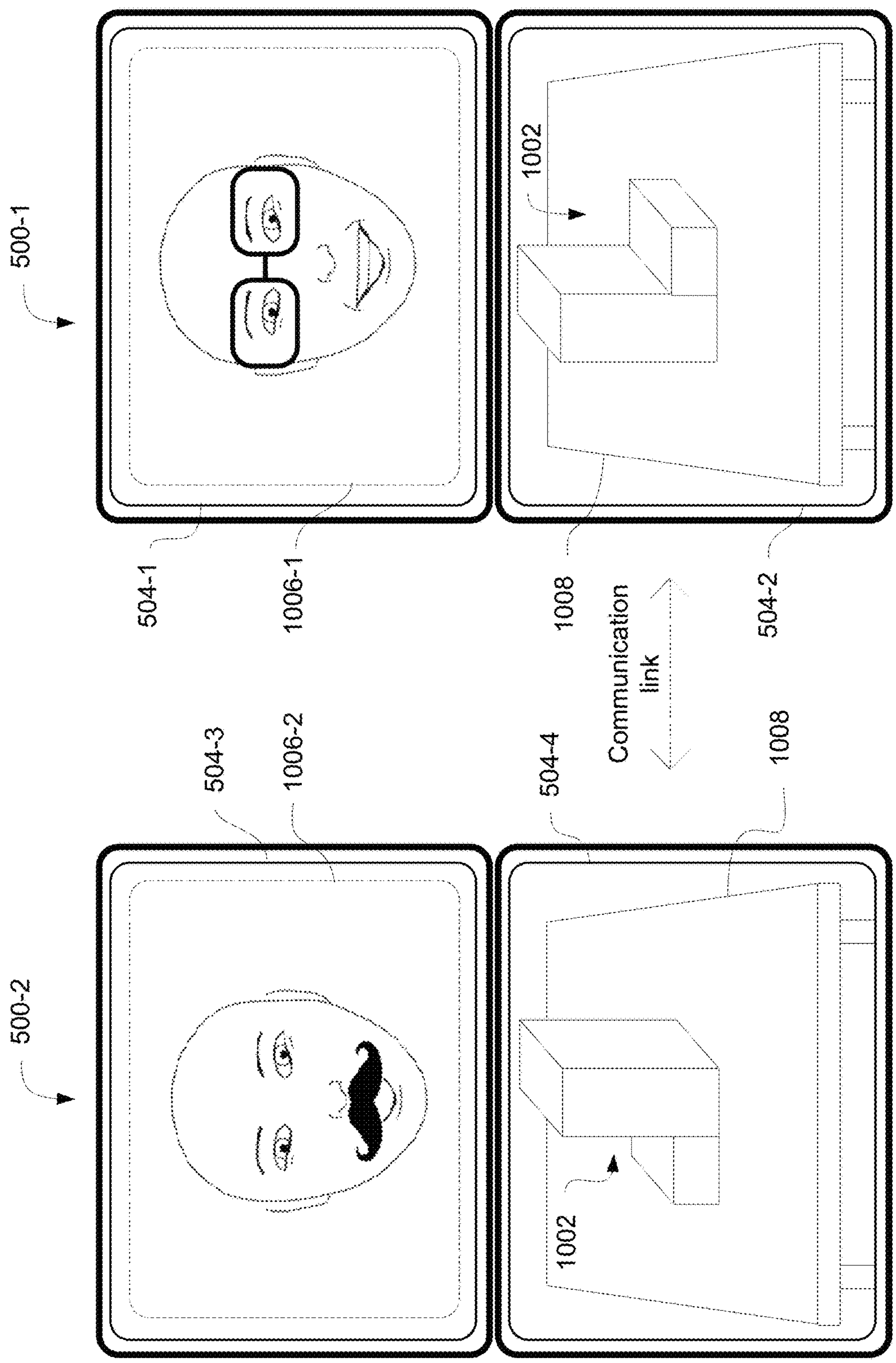

FIG. 10J illustrates various ways the first electronic device 500-1 and the second electronic device 500-2 display shared content 1002 on a virtual table 1008. In FIG. 10J, the first electronic displays a video conferencing user interface 1006-1 on the first display 504-1 and shared content 1002 on a shared table 1008 on the second display 504-2. The second electronic 500-2 displays a video conferencing user interface 1006-2 on the first display 504-3 and shared content 1002 on a shared table 1008 on the second display 504-4. Displaying the video conferencing user interfaces 1006-1 and 1006-2 on the first displays 504-1 and 504-2 and the virtual table 1008 on the second displays 504-2 and 504-4, with the shared content 1002 rendered from opposite perspectives on the respective devices, gives the appearance that the users are positioned across from each other. The shared table 1008 optionally comprises an image of a virtual table upon which shared content 1002 is "placed". In some embodiments, the virtual content includes a three-dimensional rendering of an object, a game rendered in three dimensions, or the like.

Figure 10K:
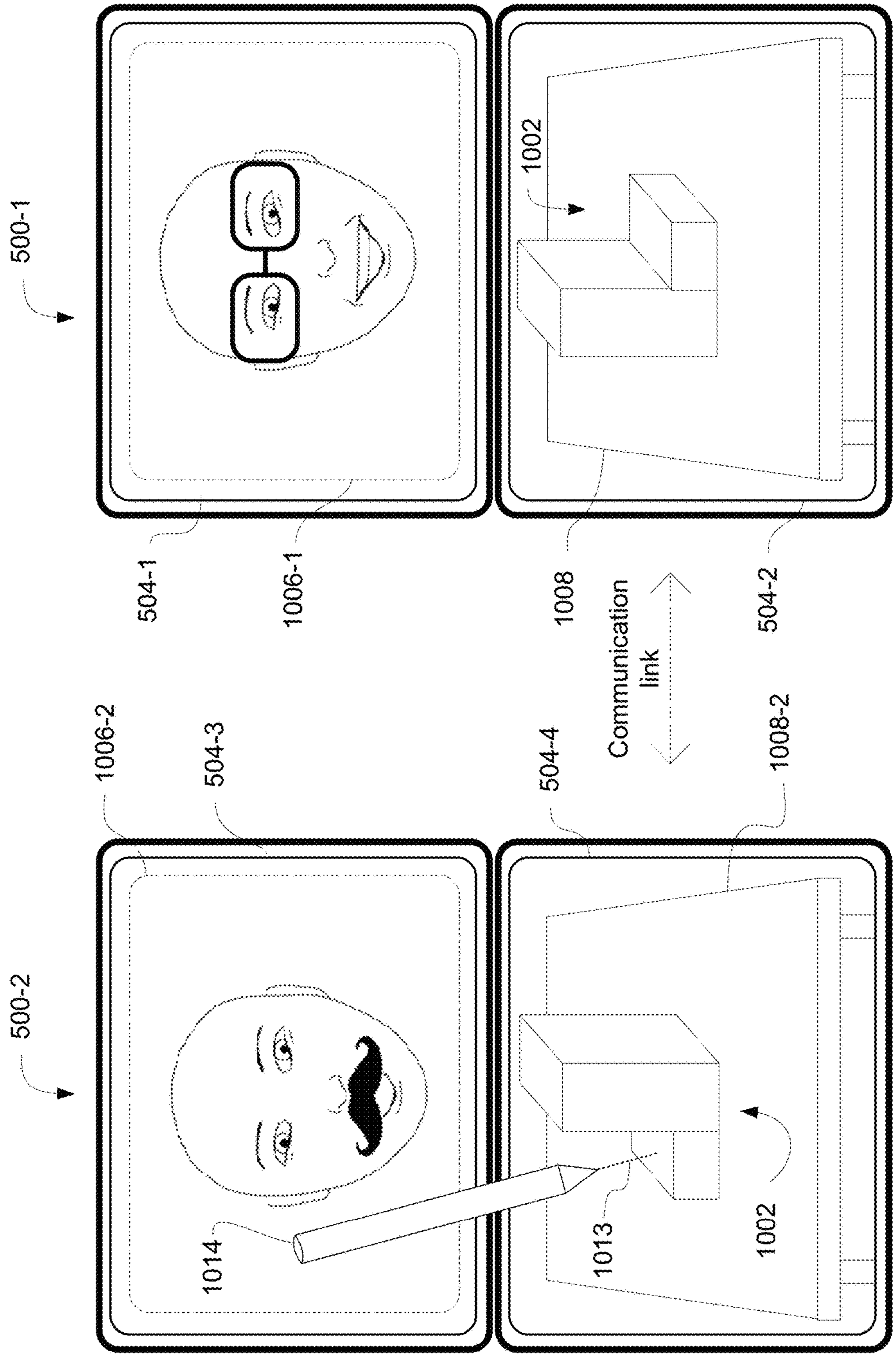
Figure 10L:
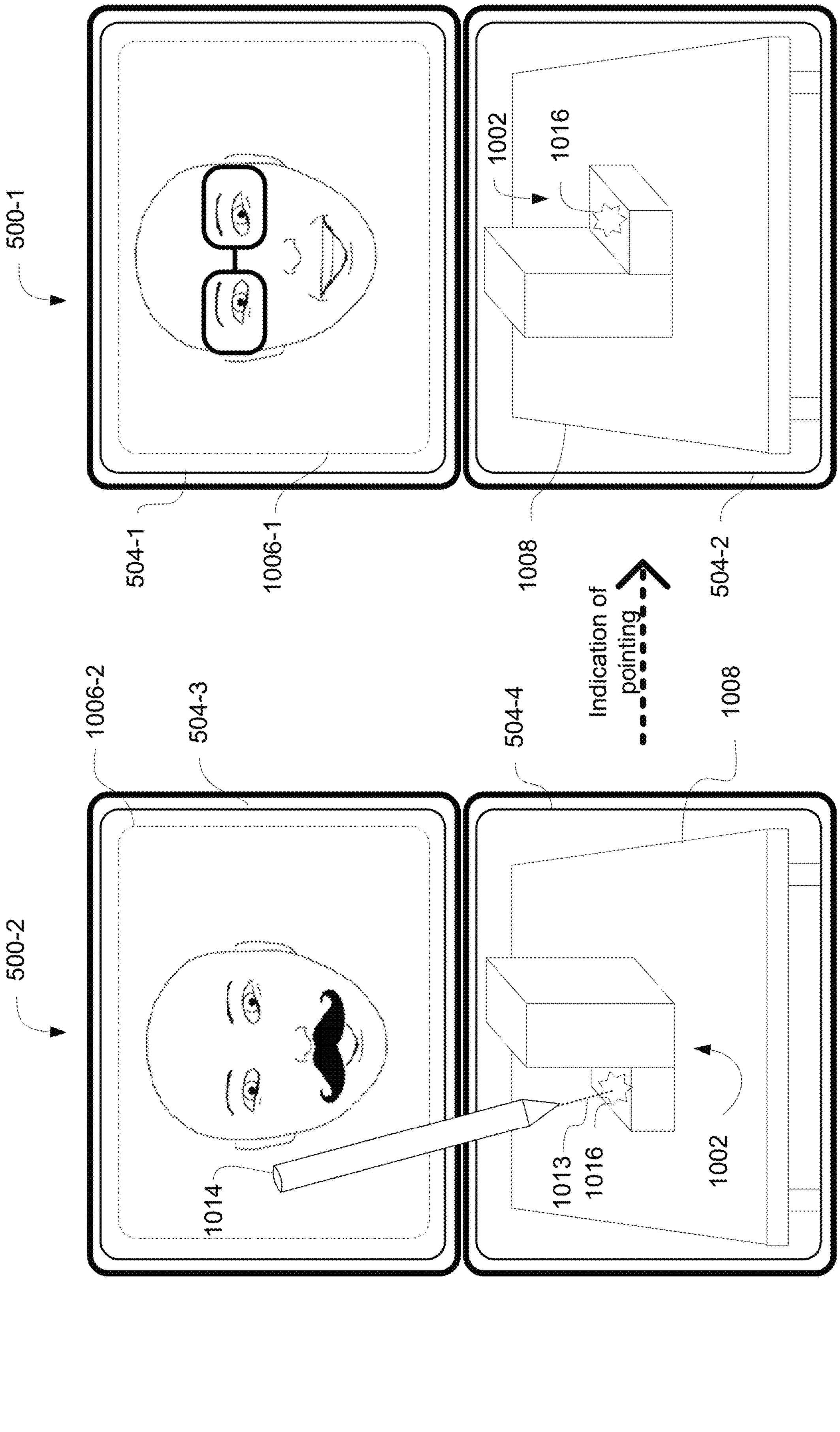

FIGS. 10K-10L illustrate various ways the first electronic device 500-1 and second electronic device 500-2 indicate when a user points at shared content with an elongated object such as a stylus 1014. Although FIGS. 10K-10L illustrate interactions using stylus 1014, in some embodiments, the users point to and otherwise interact with the shared content using a finger or another object.

In FIG. 10K, the user of the second electronic device 500-2 points at the shared content 1002 along line 1013 with stylus 1014. In FIG. 10L, in response to the user of the second device 500-2 pointing the stylus 1014 at the shared content 1002 along line 1013, the second electronic device displays an indication 1016 of the pointed-to location on the shared content 1002, and transmits an indication of the pointed-to location to the first electronic device 500-1. In some embodiments, the indication 1016 includes displaying the pointed-to portion of the shared content 1002 as if a light is being shined on (e.g., displaying in a lighter or brighter color) the pointed-to portion of the shared content 1002. In response to the indication of the pointing, the first electronic device 500-1 similarly displays an indication 1016 of the pointed-to location by optionally displaying the pointed-to portion of the shared content 1002 as if a light is being shined on the pointed-to portion, as shown in FIG. 10L. In this way, the stylus 1014 acts as a pointer or flashlight, allowing the user of the second electronic device 500-2 to indicate a specific location within the shared content 1002 that is shared with the user of the first electronic device 500-1 (e.g., to facilitate discussion, via video conferencing, of the shared content), and vice versa. In some embodiments, the second electronic device 500-2 does not display indication 1016, and indication 1016 is only displayed on the first electronic device 500-1 for the benefit of the user of the first electronic device.

Figure 10M:
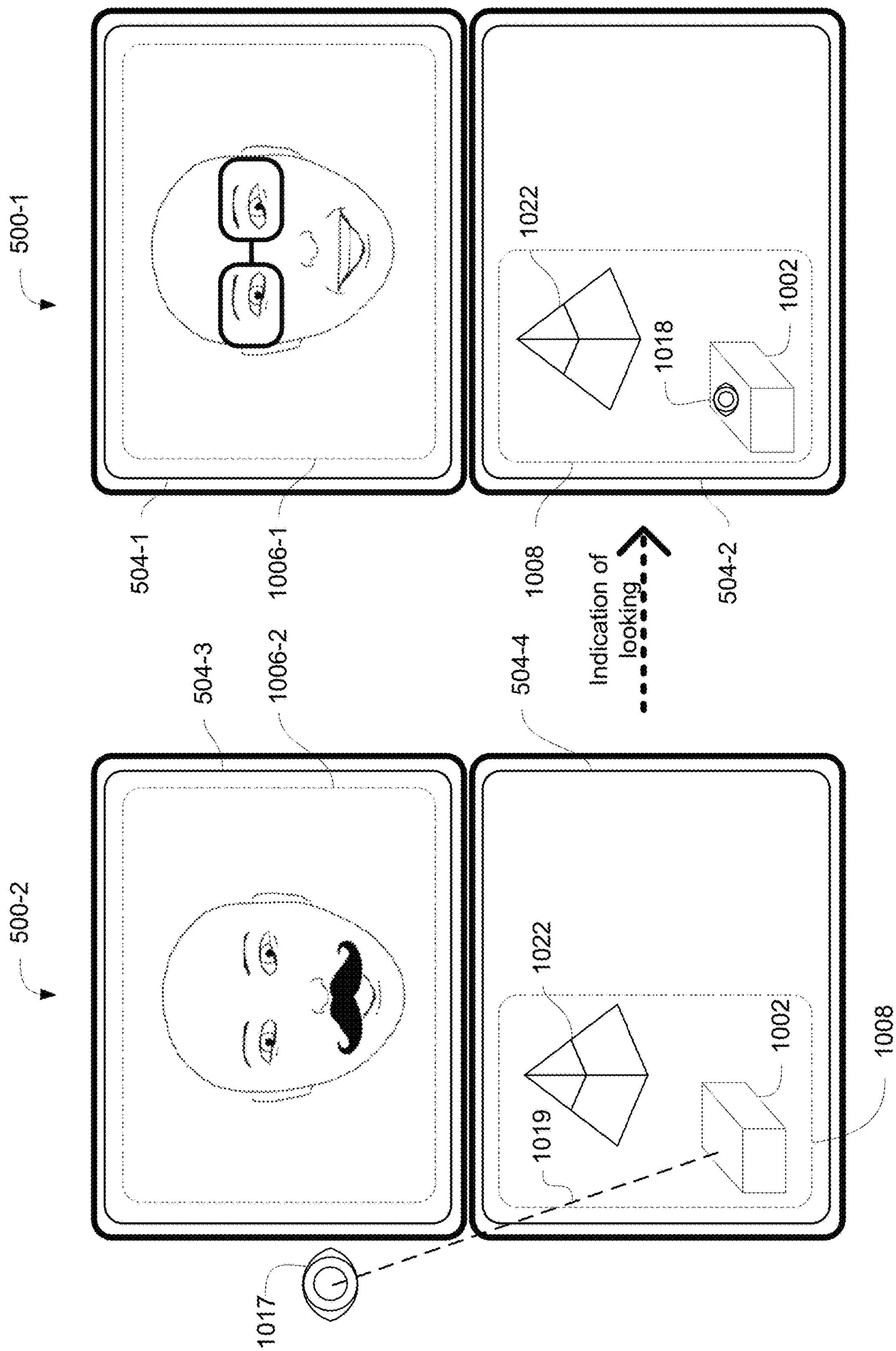
Figure 10N:
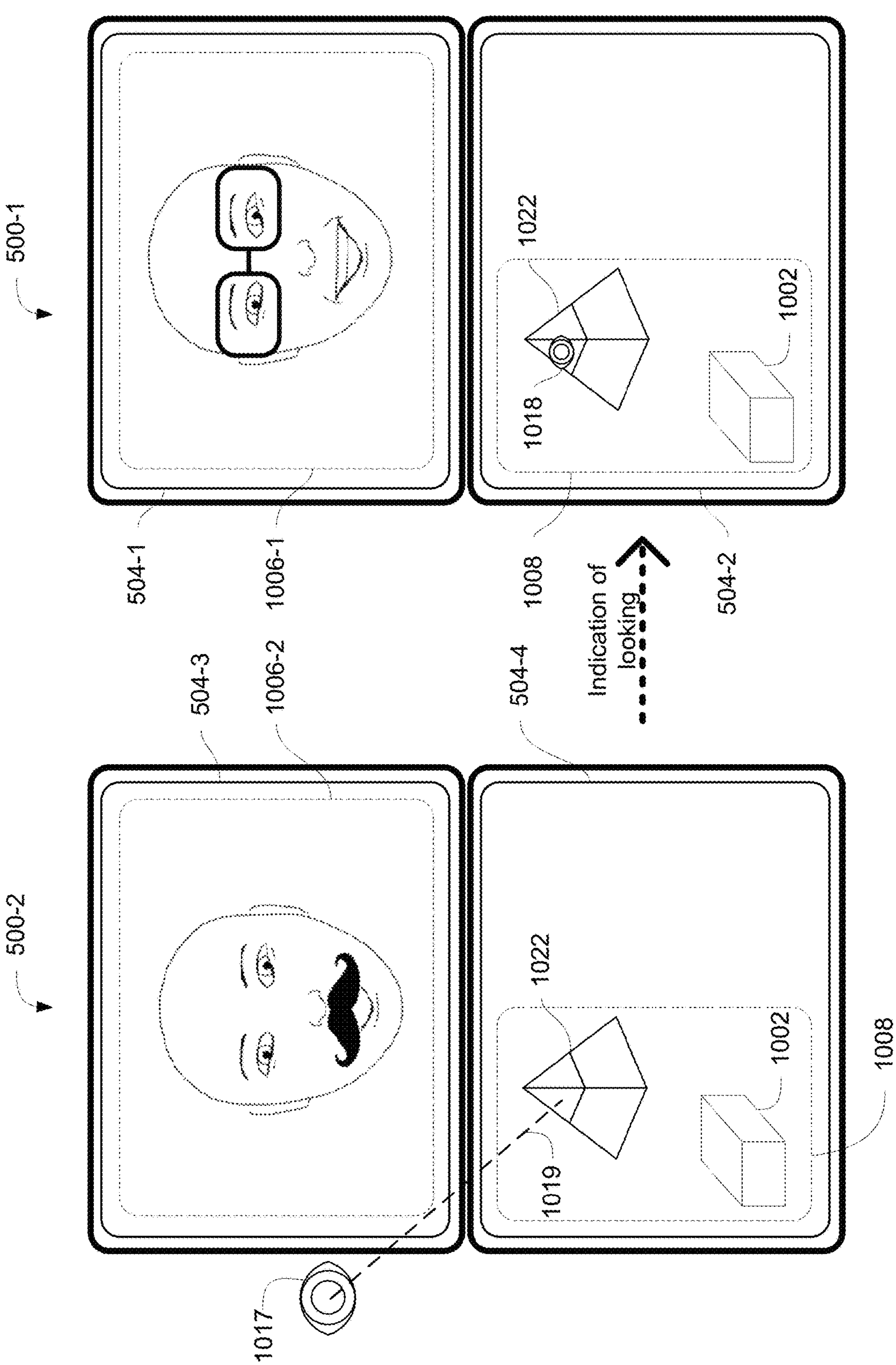
Figure 10O:
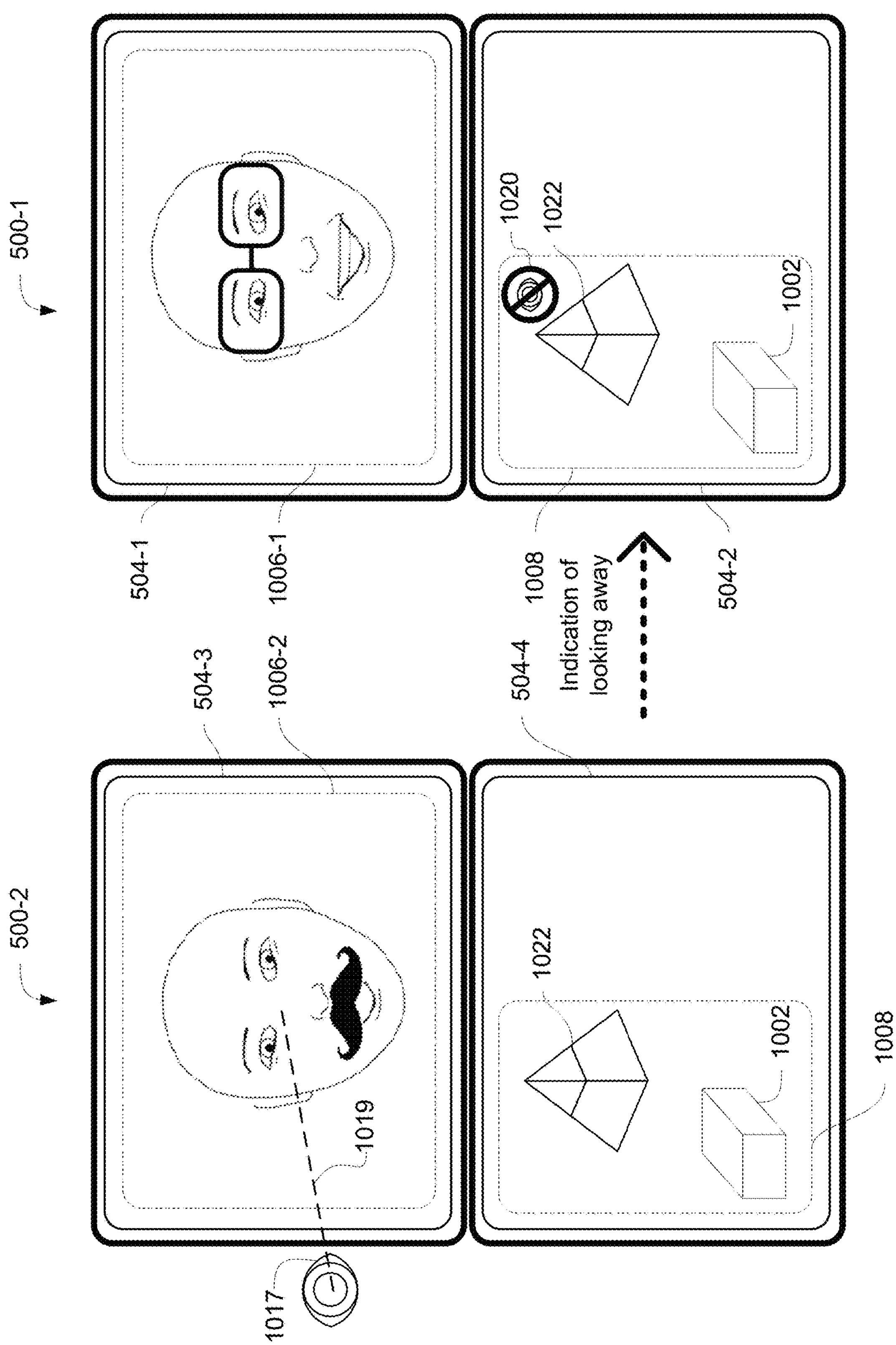

FIGS. 10M-10O illustrate various ways the first electronic device 500-1 indicates where the user of the second electronic device 500-2 is looking while sharing content between the two devices. In some embodiments, the second electronic device 500-2 includes a camera or other input device configured to detect a location on the second electronic device 500-2 where the user is looking. Although the embodiments illustrated in FIGS. 10M-10O show the second device 500-2 detecting where the user is looking and transmitting indications of where the user is looking to the first electronic device 500-1, in some embodiments, the first electronic device 500-4 additionally or alternatively detects where the user is looking and transmits indications to the second electronic device 500-2 in an analogous manner.

In FIG. 10M, the second electronic device 500-2 detects a direction 1019 along which the user is looking (e.g., with their eyes 1017) while the second electronic device 500-2 is displaying, in a shared space 1008 on the second display 504-4, first shared content 1002 and second shared content 1022. The first electronic device 500-1 is also displaying, in a shared space 1008 on the second display 504-2, first shared content 1002 and second shared content 1022, as shown in FIG. 10M. As shown in FIG. 10M, the second electronic device 500-2 detects that the user is looking at the first shared content 1002. The second electronic device 500-2 transmits to the first electronic device 500-1 an indication of where the user of the second electronic device 500-2 is looking (e.g., an indication that the user of the second electronic device 500-2 is looking at the first shared content 1002). In response to receiving the indication of where the user of the second device 500-2 is looking, the first electronic device 500-1 displays an indication of the looking 1018 on the shared content item 1002 at which the user of the second device is looking, as shown in FIG. 10M. In some embodiments, the indication of looking includes displaying an icon 1018 on or proximate to the object at which the user of the second electronic device 500-2 is looking. In some embodiments, the indication of looking includes visually highlighting (e.g., surrounding with a glow or displaying in a lighter or brighter color) the object at which the user of the second electronic device 500-2 is looking. In some embodiments, the indication of the looking is at a specific location of the object to which the user of the second electronic device 500-2 is specifically looking (e.g., the top side of object 1002).

In FIG. 10N, the user of the second device 500-2 stops looking at the first shared content 1002 and starts looking at the second shared content 1022, and the second electronic device 500-2 transmits an indication of the looking to the first electronic device 500-1. In response to the indication that the user of the second electronic device 500-2 is looking at the second shared content 1022, the first electronic device 500-1 displays the indication of looking 1018 on the second shared content. In this way, the electronic devices 500-1 and 500-2 facilitate discussion of the shared content items 1002 and 1022 (e.g., while the users discuss the items via video conference) by indicating which item each user is looking at.

In FIG. 10O, the user of the second electronic device 500-2 looks away from the shared space 1008 and looks at the videoconferencing user interface 1006-2, for example. The second electronic device 500-2 transmits an indication to the first electronic device 500-1 that the user is looking away from the shared space 1008. In response to the indication that the user of the second electronic device 500-2 is looking away from the shared space 1008, the first electronic device 500-1 displays, in the shared space 1008, an indication 1020 that the user of the second electronic device is looking away from the shared space 1008, as shown in FIG. 10O. In some embodiments, the first electronic device displays the indication 1020 somewhere other than in shared space 1008, and/or generates a different such indication (e.g., an audible indication).

Figure 10P:
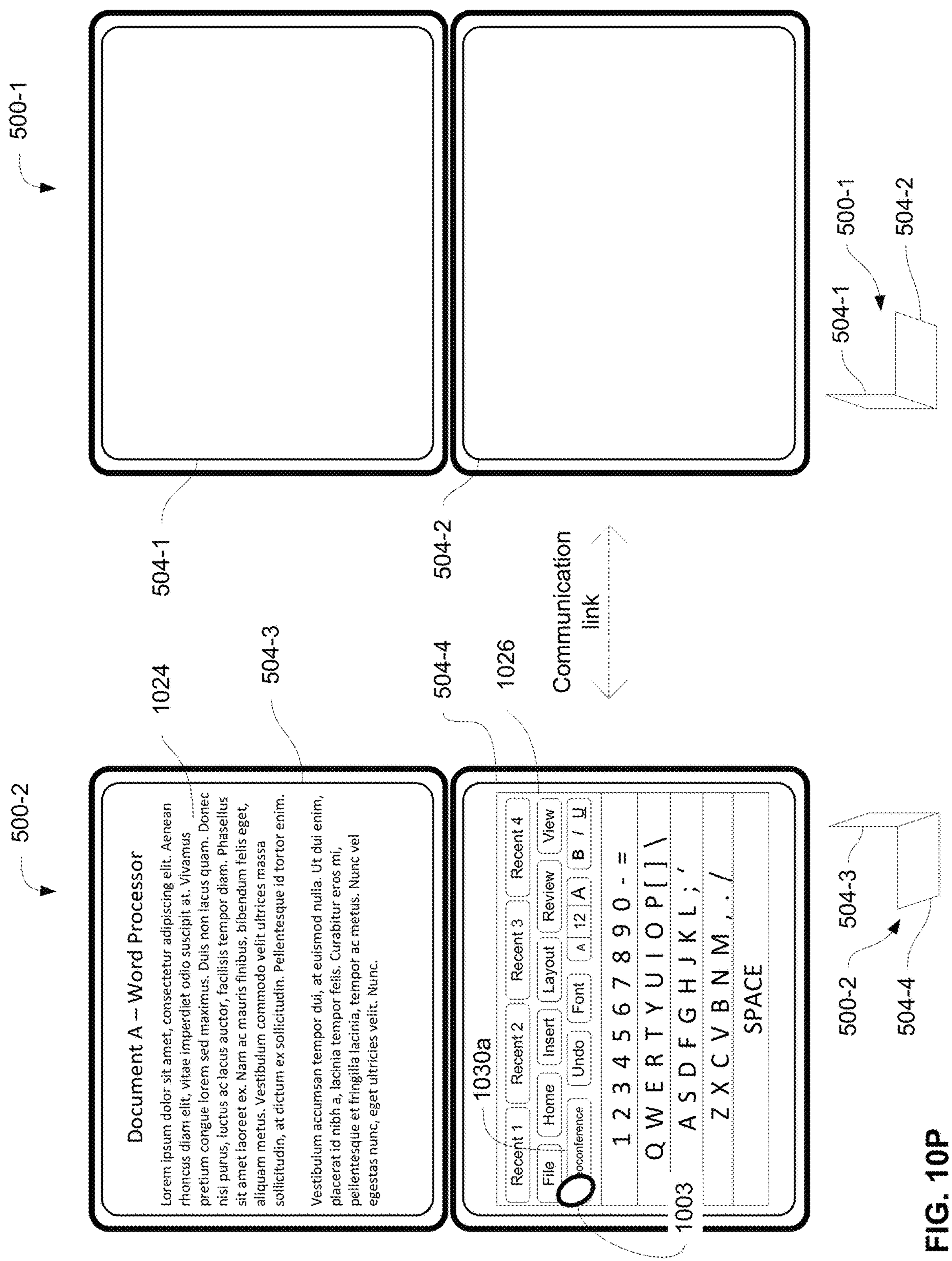

FIG. 10P illustrates a word processing user interface presented on the second electronic device 500-2. The word processing user interface includes a document 1024 displayed on the first display 504-3 of the second electronic device 500-2 and a toolbar 1026 and a soft keyboard 1028 displayed on the second display 504-4 of the second electronic device 500-2. Toolbar 1026 includes a number of selectable options corresponding to various word processing tools and a selectable option 1030*a* that causes the second electronic device 500-2 to initiate a videoconference. As shown in FIG. 10P, the user selects (e.g., with contact 1003) the selectable option 1030*a* for initiating a videoconference.

Figure 10Q:
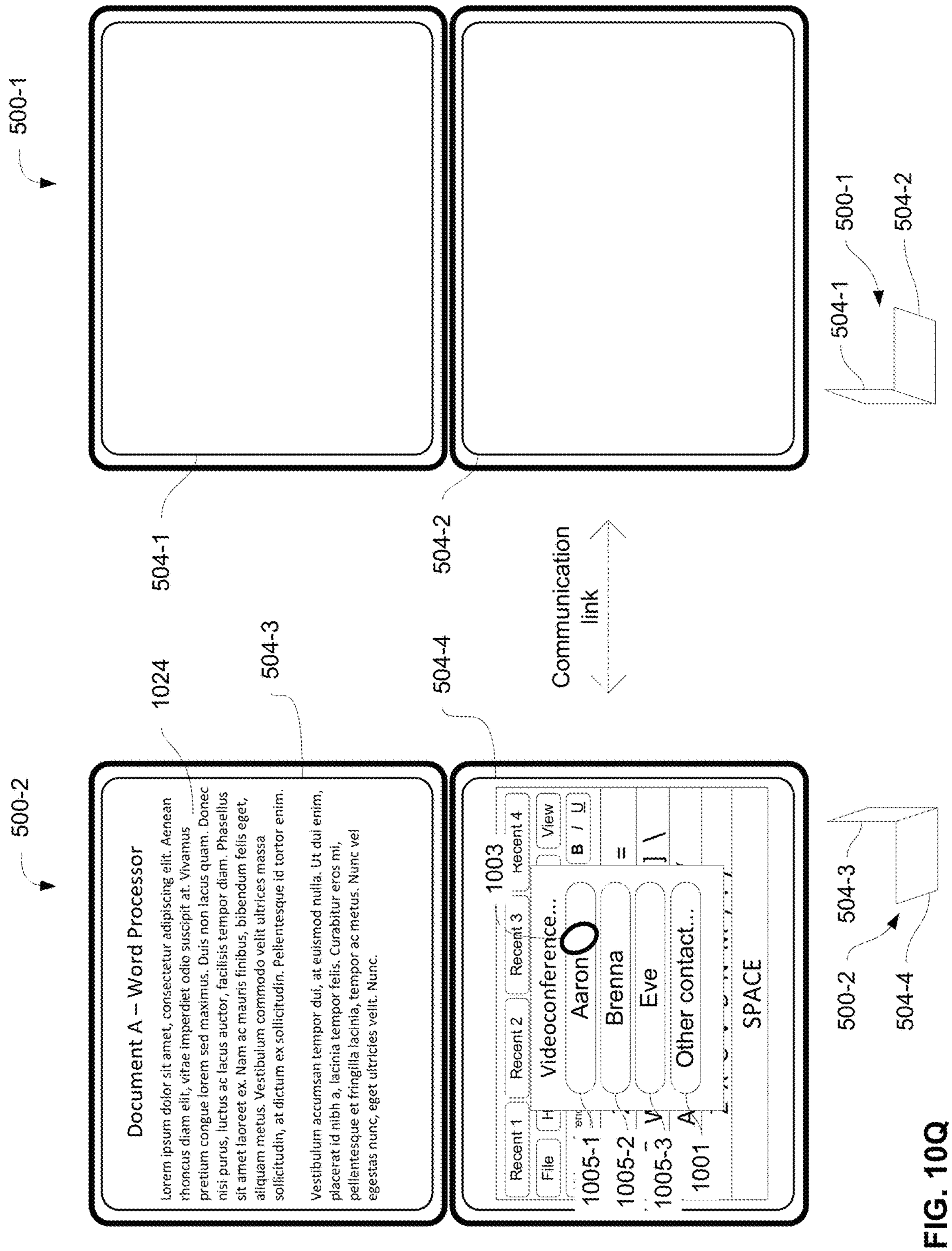

In response to the user's selection, the second electronic device 500-2 presents a plurality of selectable options 1005-1, 1005-2, 1005-3, and 1001 corresponding to different contacts with which to initiate the videoconference, as shown in FIG. 10Q. As shown in FIG. 10Q, the user selects (e.g., with contact 1003) the option 1005-1 corresponding to the contact "Aaron".

Figure 10R:
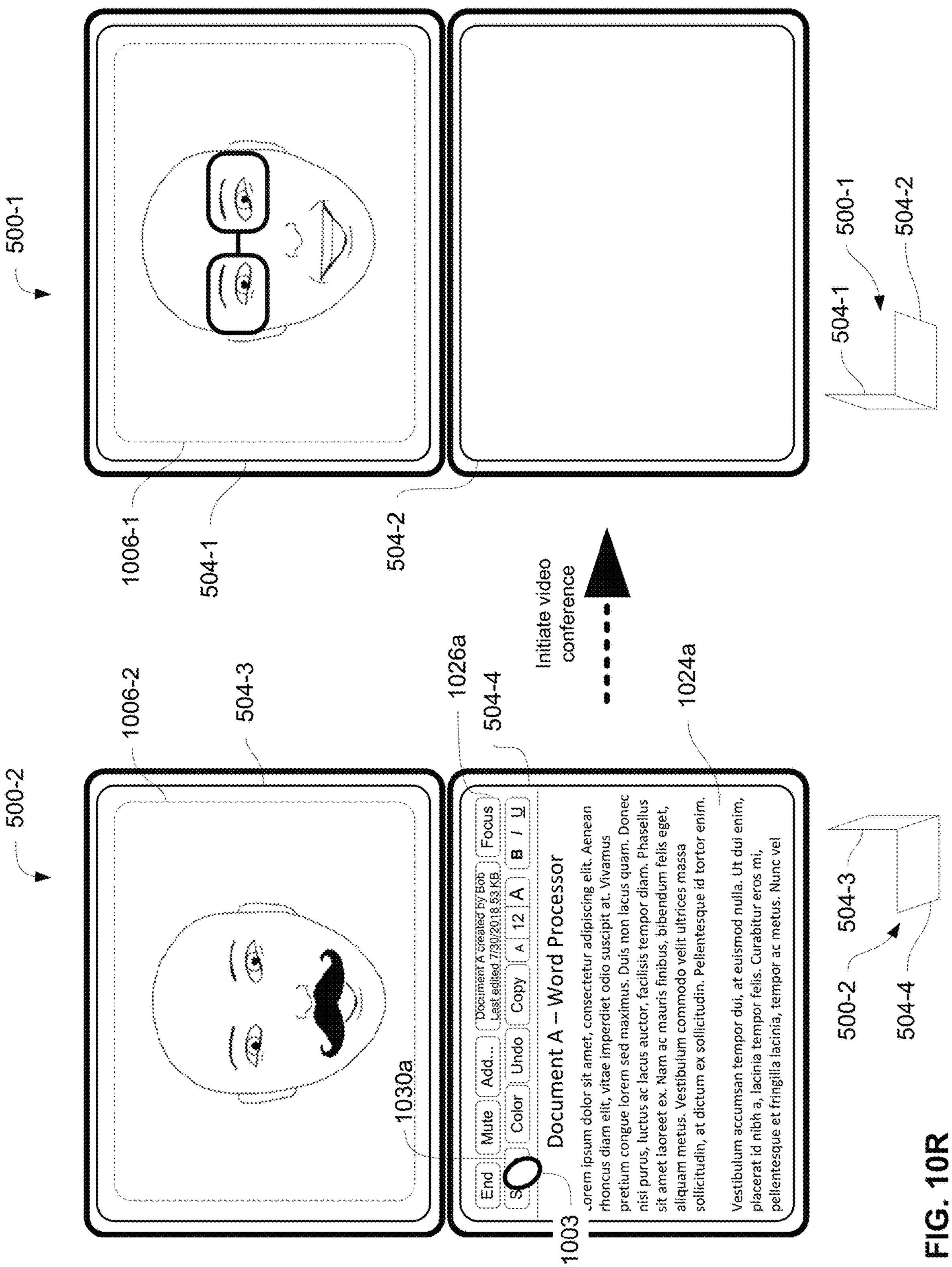

In response to the user's selection illustrated in FIG. 10Q, the second electronic device 500-2 initiates a videoconference with the first electronic device 500-1, as illustrated in FIG. 10R. The first electronic device 500-1 presents a videoconference user interface 1006-1. The second electronic device 500-2 presents a videoconference user interface 1006-2 on the first display 504-3 of the second device 500-2 and presents the word processing user interface on the second display 504-4 of the second device 500-2. As shown in FIG. 10R, the word processing user interface includes a toolbar 1026*a* and a document 1024*a*. The toolbar 1026*a* includes a selectable option 1030*b* to share the document with the first electronic device 500-1. As shown in FIG. 10R, the user selects (e.g., with contact 1003) the option 1030*b* to share the document with the first electronic device 500-1.

Figure 10S:
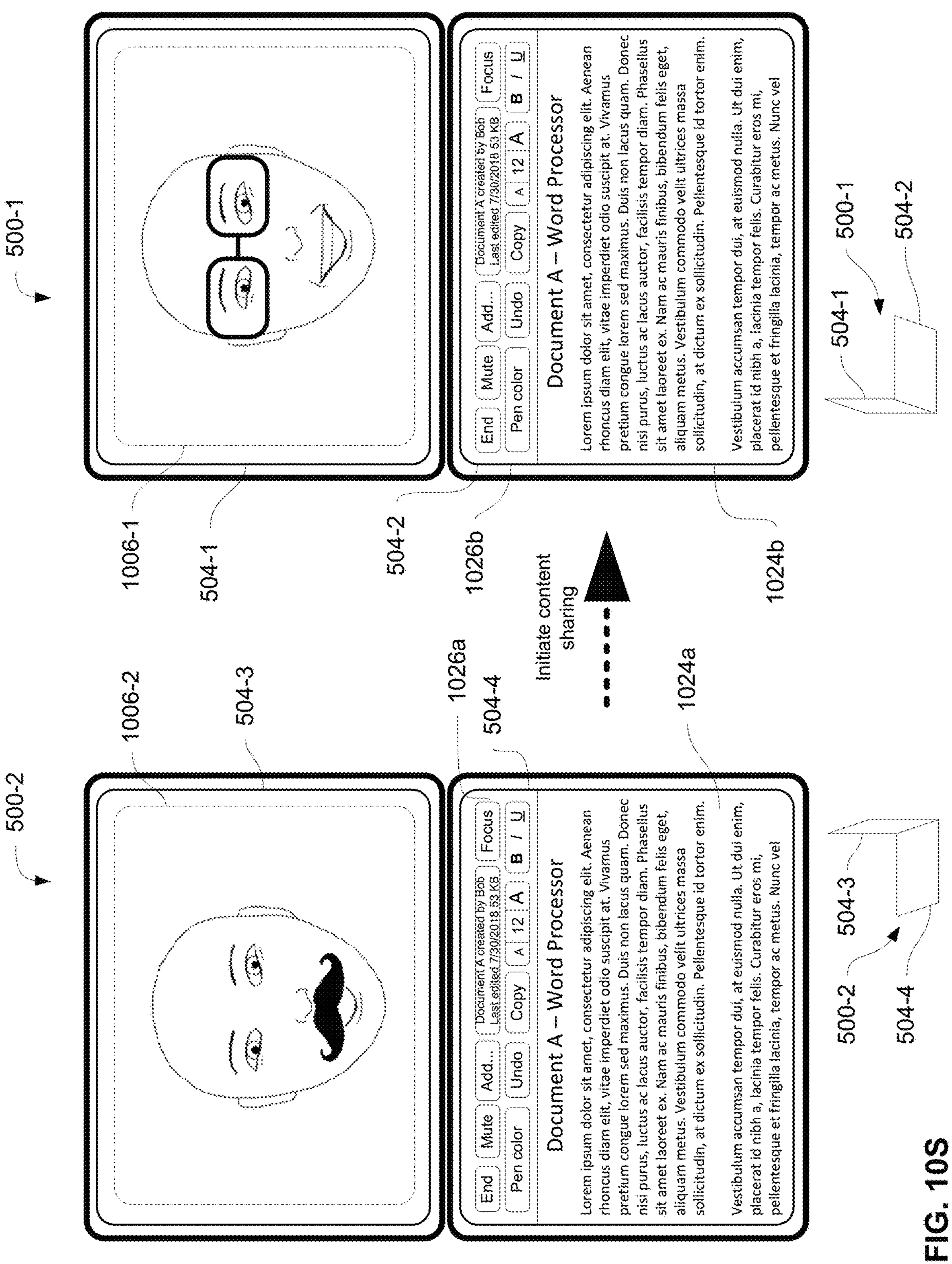

As shown in FIG. 10S, in response to the user's selection in FIG. 10R, the second electronic device 500-2 shares the document with the first electronic device 500-1. In response, the first electronic device 500-1 presents, on the second display 504-2 of the first electronic device 500-1, the word processing user interface. As shown in FIG. 10S, the word processing user interface includes the document 1024*b* and a toolbar 1026*b*.

Figure 10T:
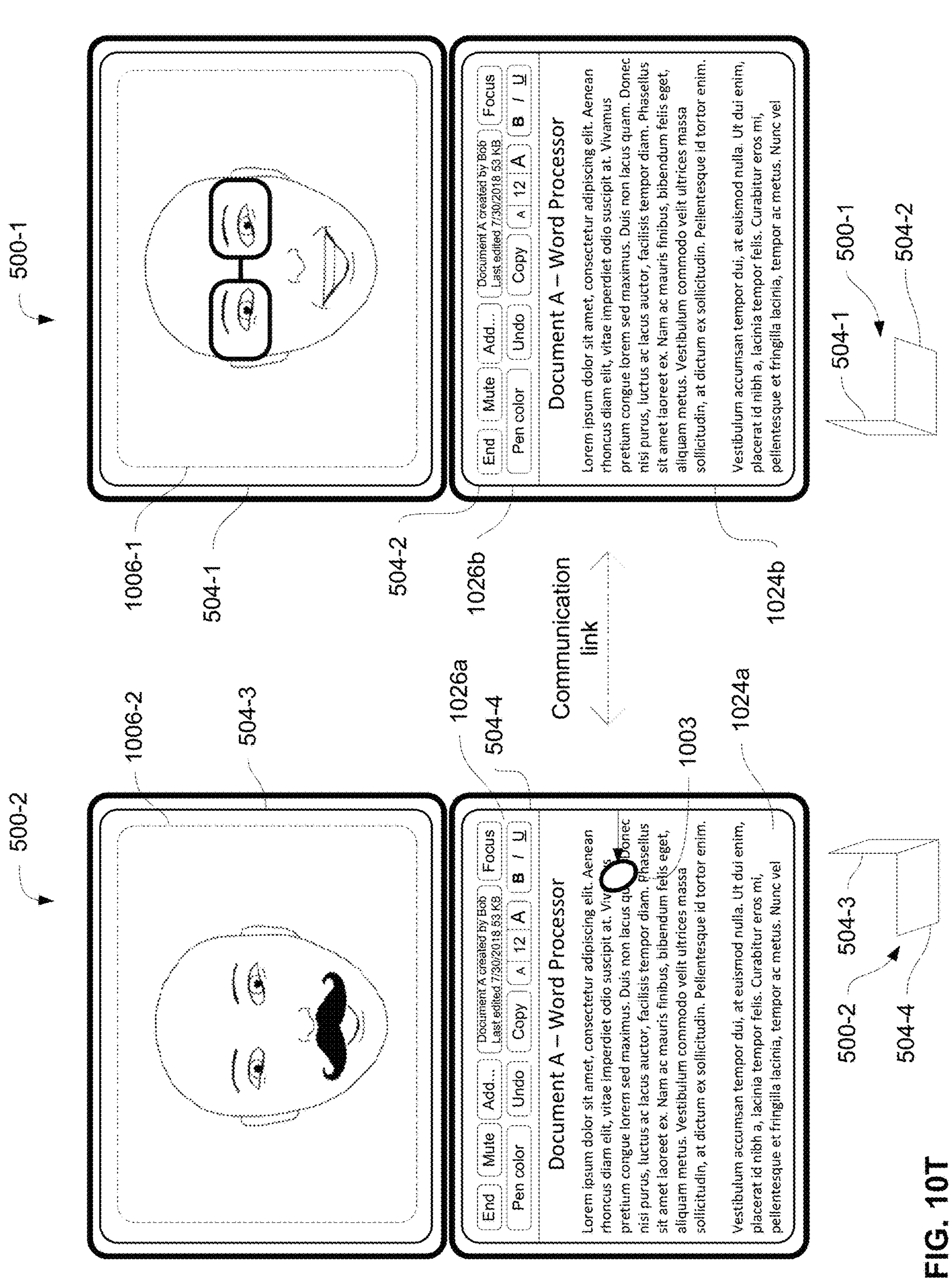

In some embodiments, while sharing content during a videoconference, an electronic device 500-1 or 500-2 is able to display a private space that is not shared with the other electronic device. FIG. 10T illustrates a user input for displaying the private space. The user performs a swipe gesture (e.g., with contact 1003) from the edge of the second display 504-4 of the second electronic device 500-2 toward the center of the second display 504-4. In response to the input, the second electronic device 500-2 displays the private space, as shown in FIG. 10U.

Figure 10U:
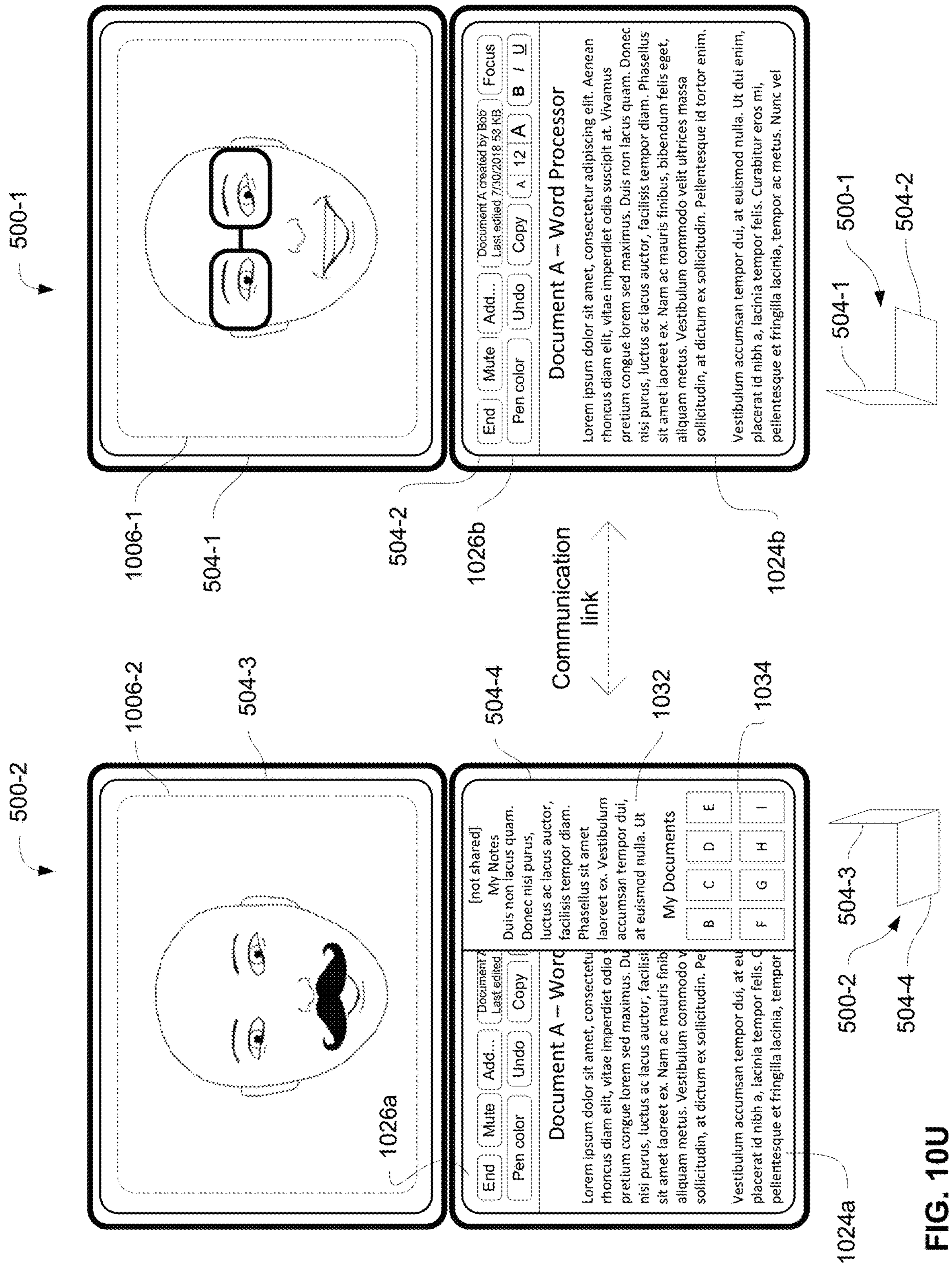

FIG. 10U illustrates a private space overlaid over the shared document 1024*a* and toolbar 1026*b*. The private space includes a notes area 1032 and a plurality of thumbnails 1034 representing documents accessible to the second electronic device 500-2 but not shared with the first electronic device 500-1. When the second electronic device 500-2 presents the private space, the private space is not presented on the first electronic device 500-1. In some embodiments, the document thumbnails in the private space are draggable to the shared space to cause sharing of their corresponding documents.

Figure 10V:
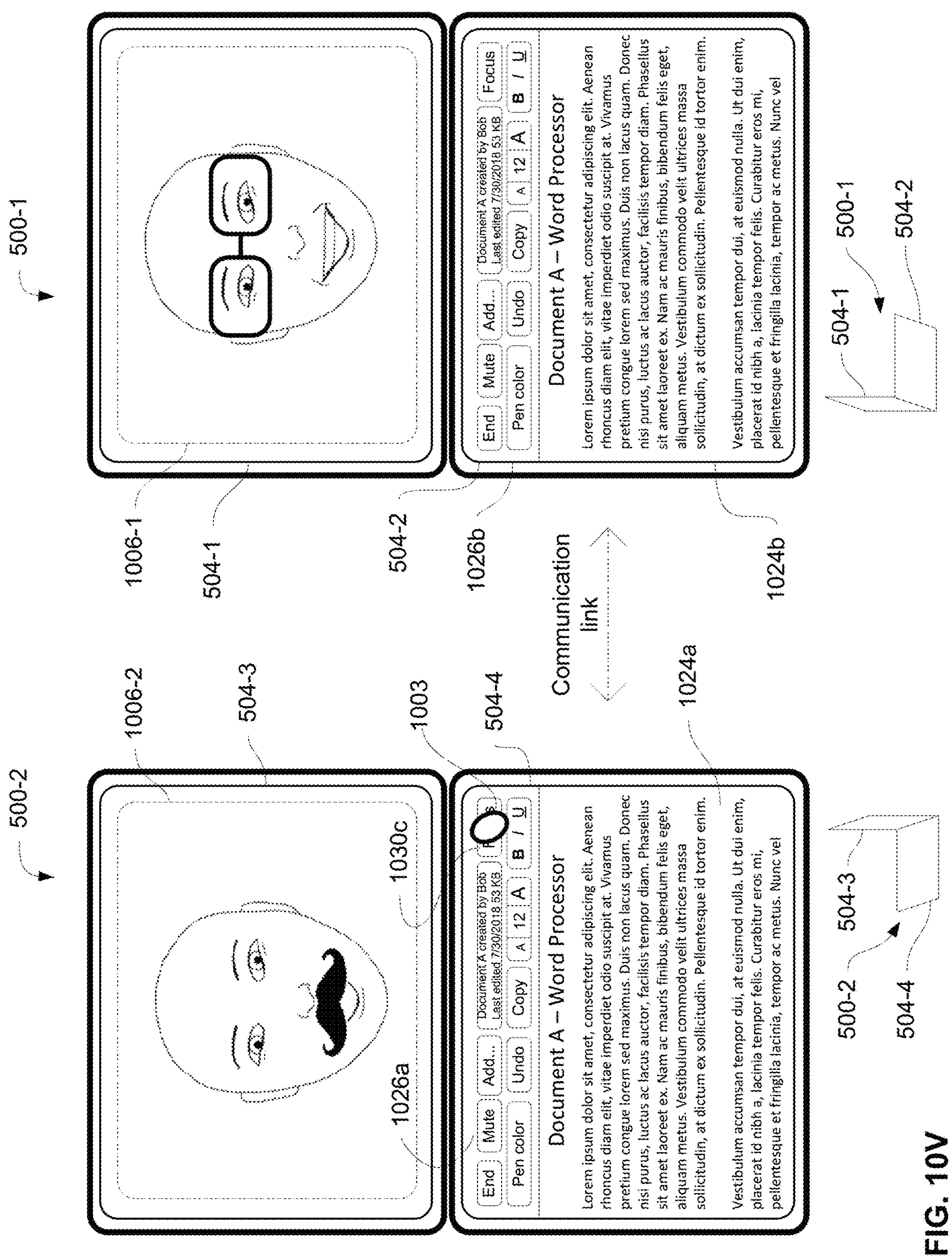
Figure 10W:
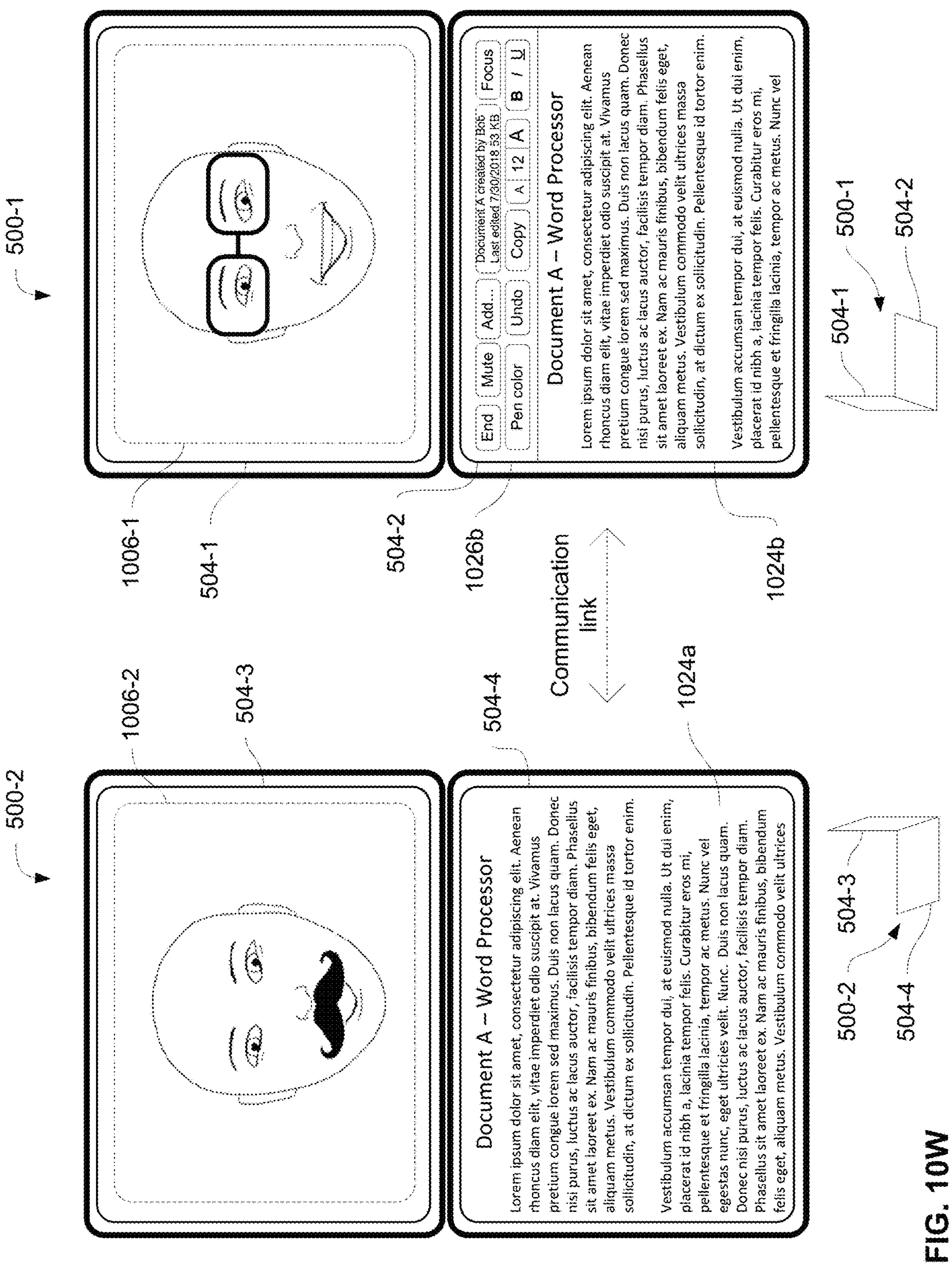
Figure 10X:
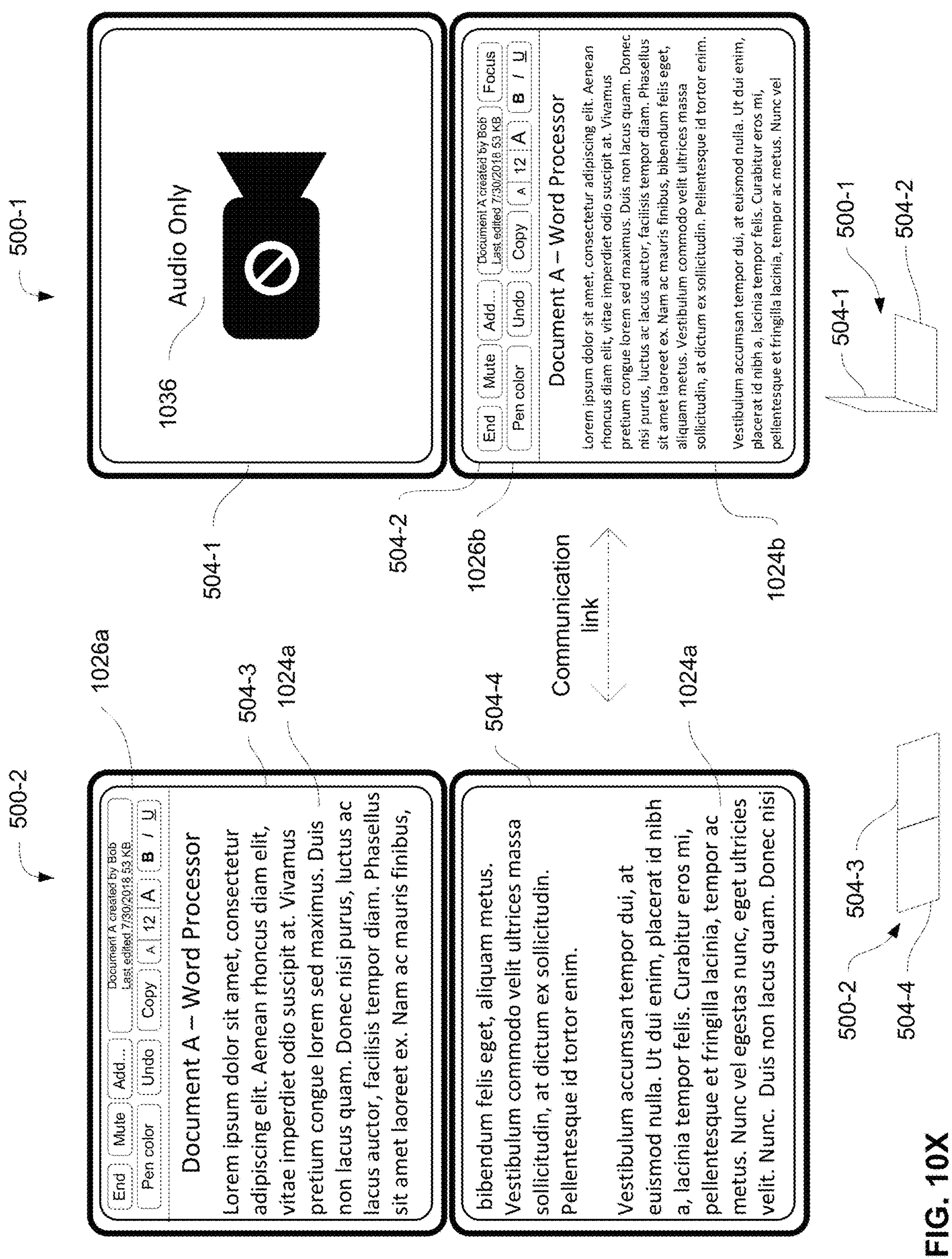

In some situations, the user of an electronic device 500-1 or 500-2 may wish to increase the screen area for presenting the shared document. FIGS. 10V-10X illustrate additional document viewing modes presented on the electronic device 500-1 or 500-2 during a videoconference.

As shown in FIG. 10V, the user selects (e.g., with contact 1003) a selectable option 1030*c* to display the document 1024*a* in a focused mode. In response to the user's selection, the second electronic device 500-2 presents the document 1024*a* in a focused mode, as shown in FIG. 10W.

FIG. 10W illustrates a focused mode for viewing a document 1024*a* during a videoconference. While in the focused mode, the second electronic device 500-2 ceases the display of toolbar 1026*a* to increase the amount of space on the second display 504-4 of the second electronic device 500-2 that presents the document 1024*a*. The user interfaces presented at the first electronic device 500-1 remain unchanged.

FIG. 10X illustrates the presentation of a document 1024*a* in response to flattening the second electronic device 500-2. When the second electronic device 500-2 is flattened, the second electronic device 500-2 ceases display of the videoconference user interface and presents the document 1024*a* on both the first display 504-3 of the second electronic device 500-2 and the second display 504-4 of the second electronic device 500-2. The toolbar 1026*a* moves from the top of the second display 504-4 of the second electronic device 500-2 to the top of the first display 504-3 of the second electronic device 500-2. As shown in FIG. 10X, when the second electronic device 500-2 is flattened, the second electronic device 500-2 stops transmitting video to the first electronic device 500-1. In response, the first electronic device 500-1 presents an indication 1036 that video is disabled and continues to display the document 1024*b* and the toolbar 1026*b* on the second display 504-2 of the first electronic device 500-1. The first electronic device 500-1 and second electronic device 500-2 continue to transmit audio to one another even though video is not transmitted.

While sharing the document during the videoconference, the first electronic device 500-1 and second electronic device 500-2 are able to produce and present annotations on the document.

Figure 10Y:
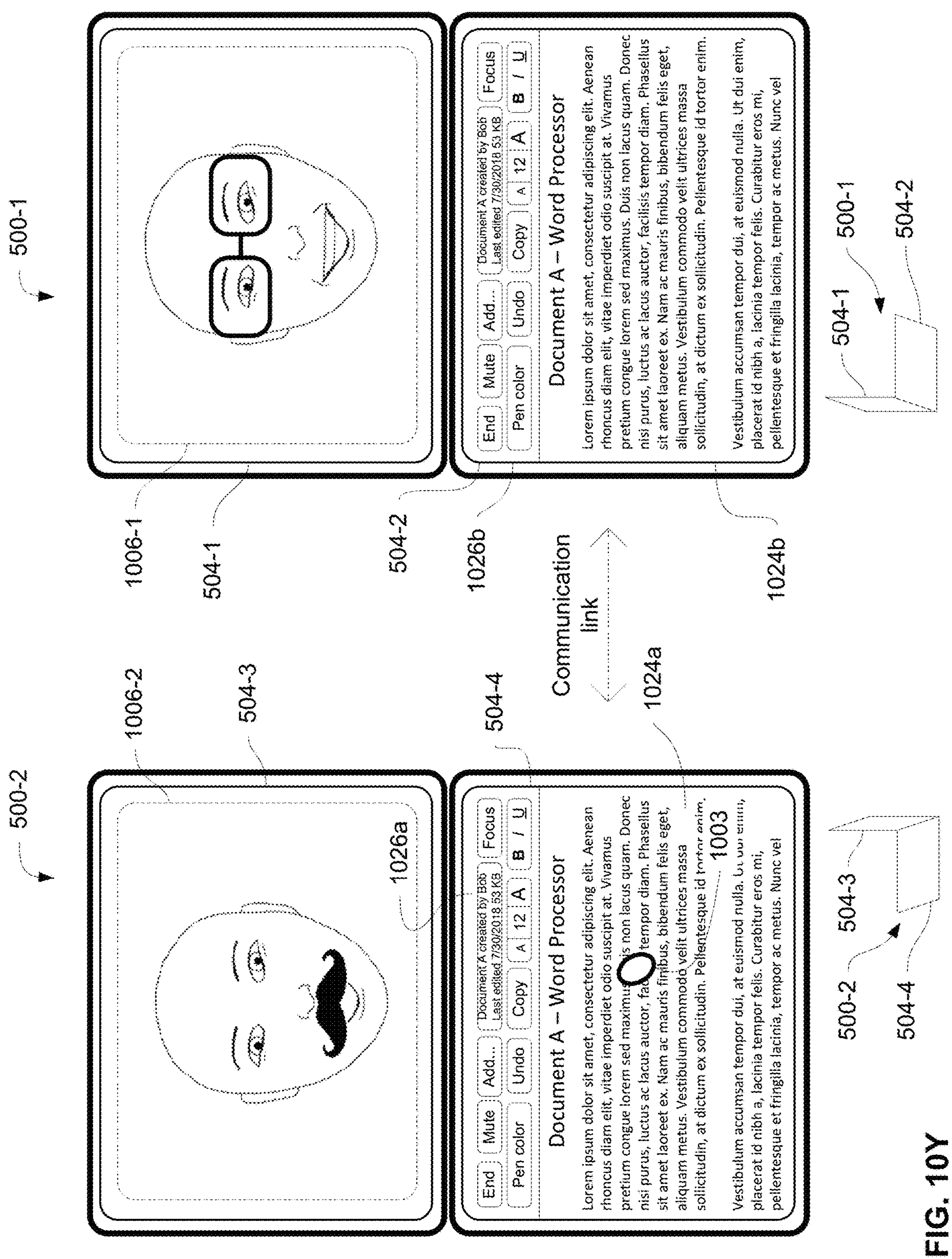

In FIG. 10Y, the user of the second electronic device 500-2 annotates (e.g., with movement of contact 1003) part of the document 1024*a*. In response to movement of the contact, the second electronic device 500-2 presents an annotation having the same shape as the movement of the contact 1003, as shown in FIG. 10Z.

Figure 10Z:
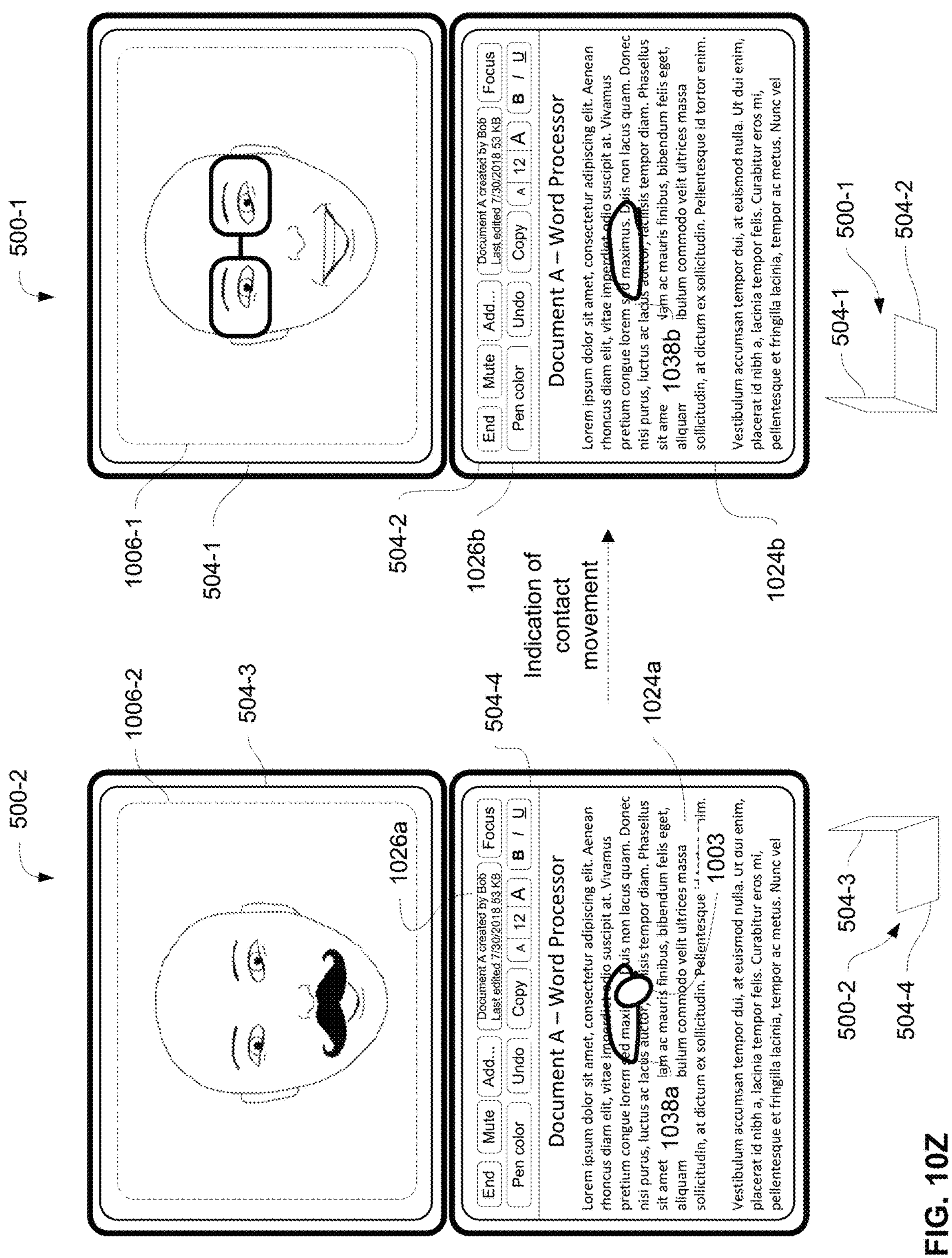
Figure 10A:
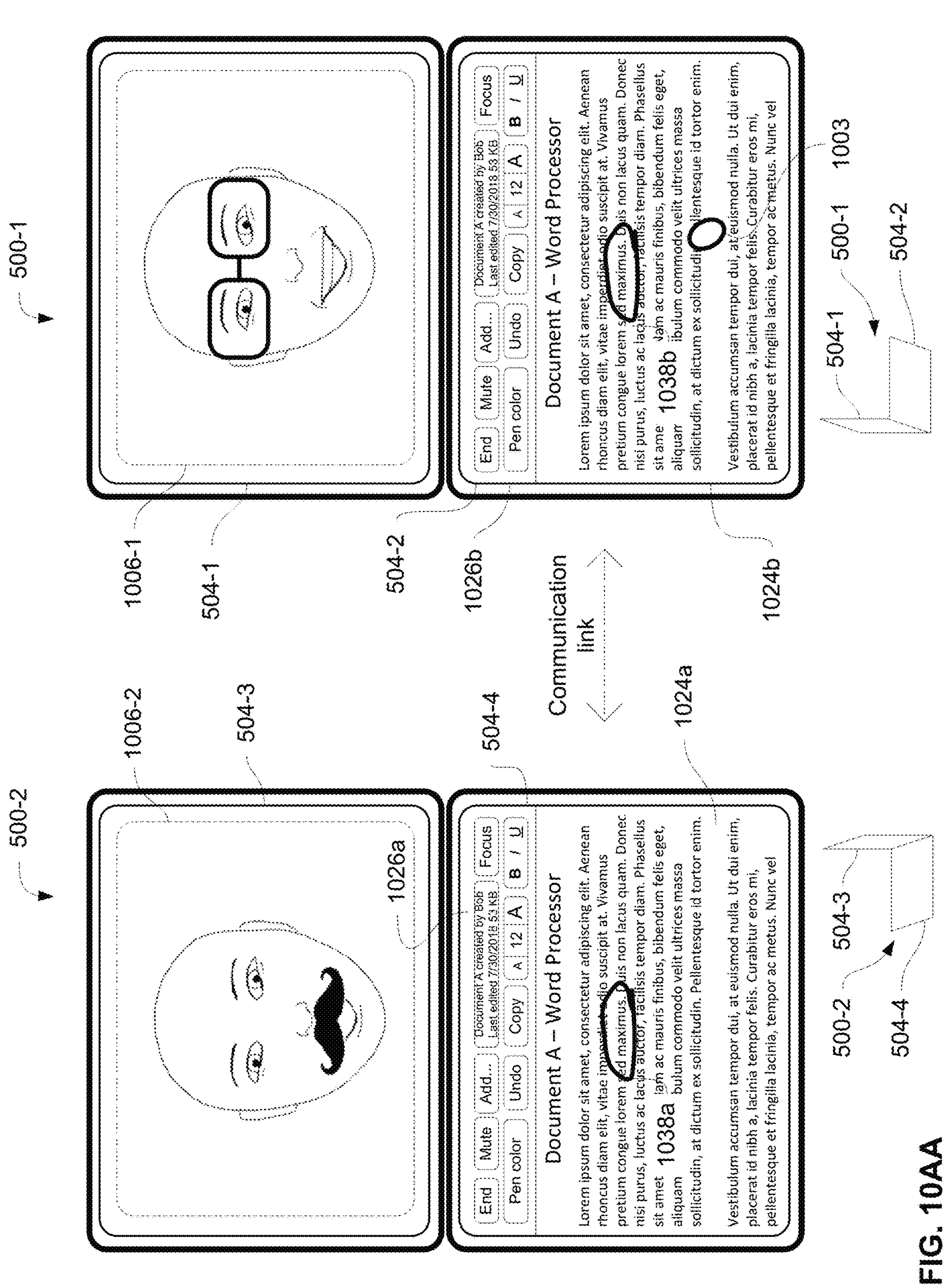
Figure 10B:
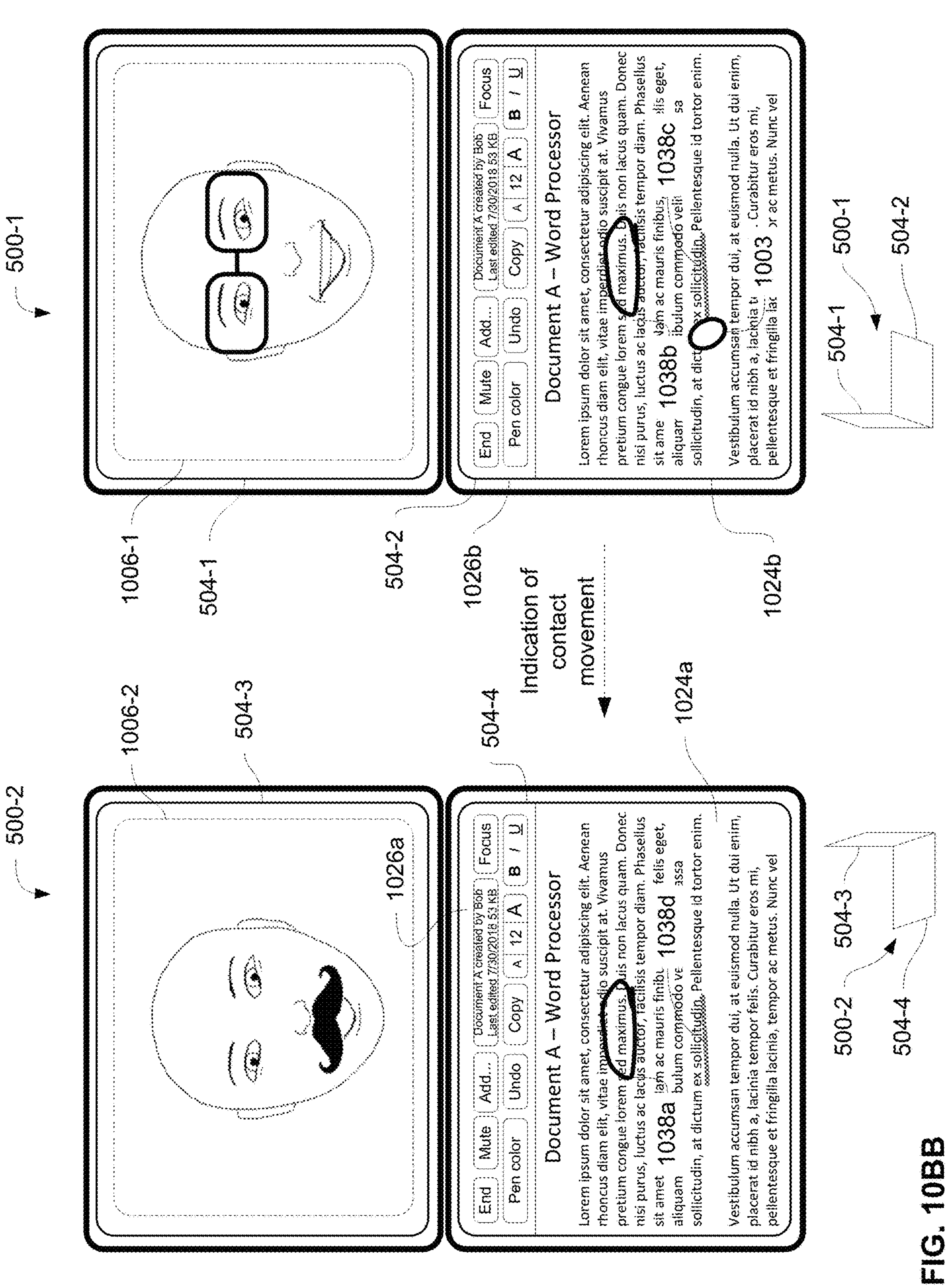
Figure 10C:
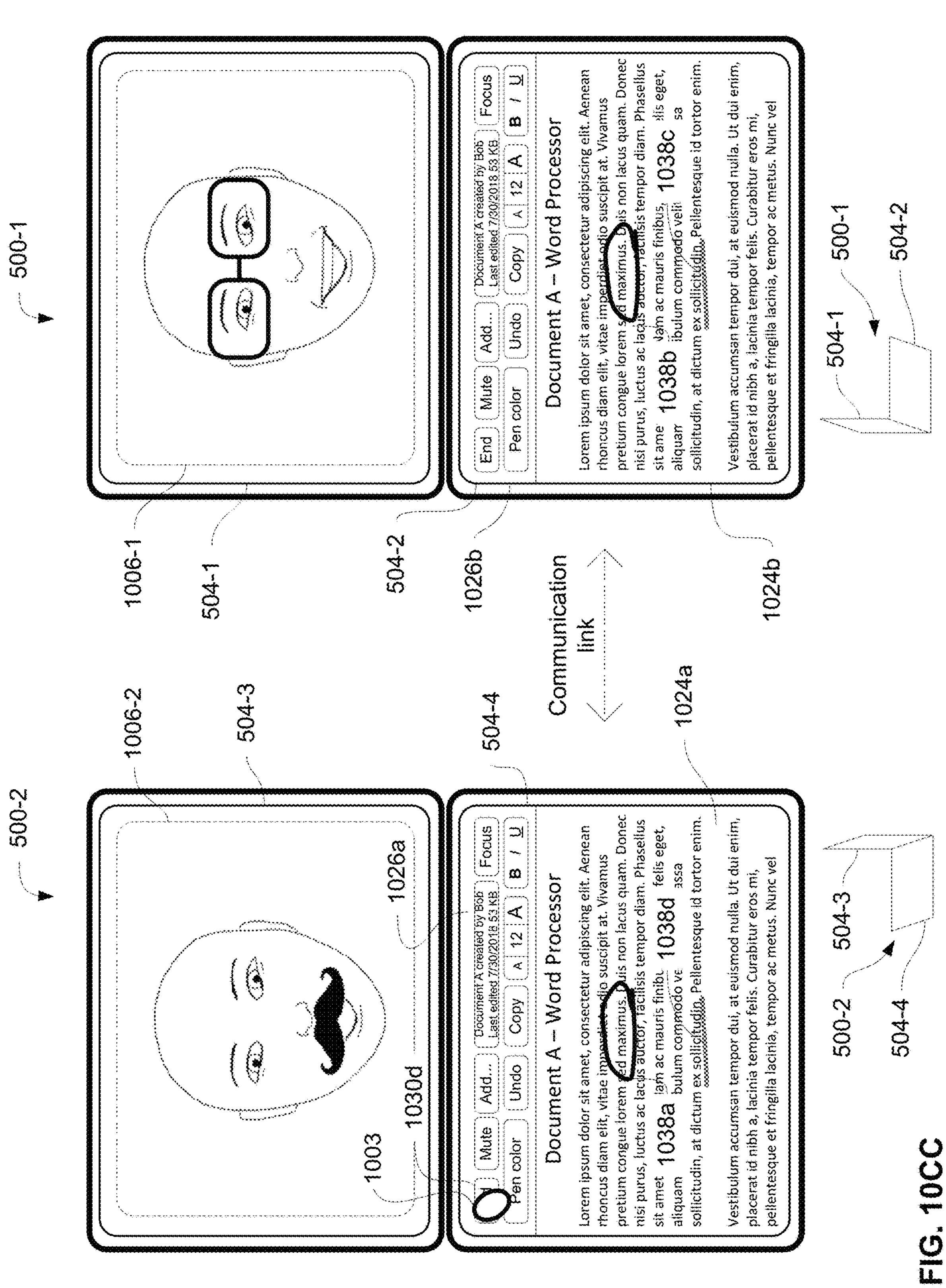
Figure 10D:
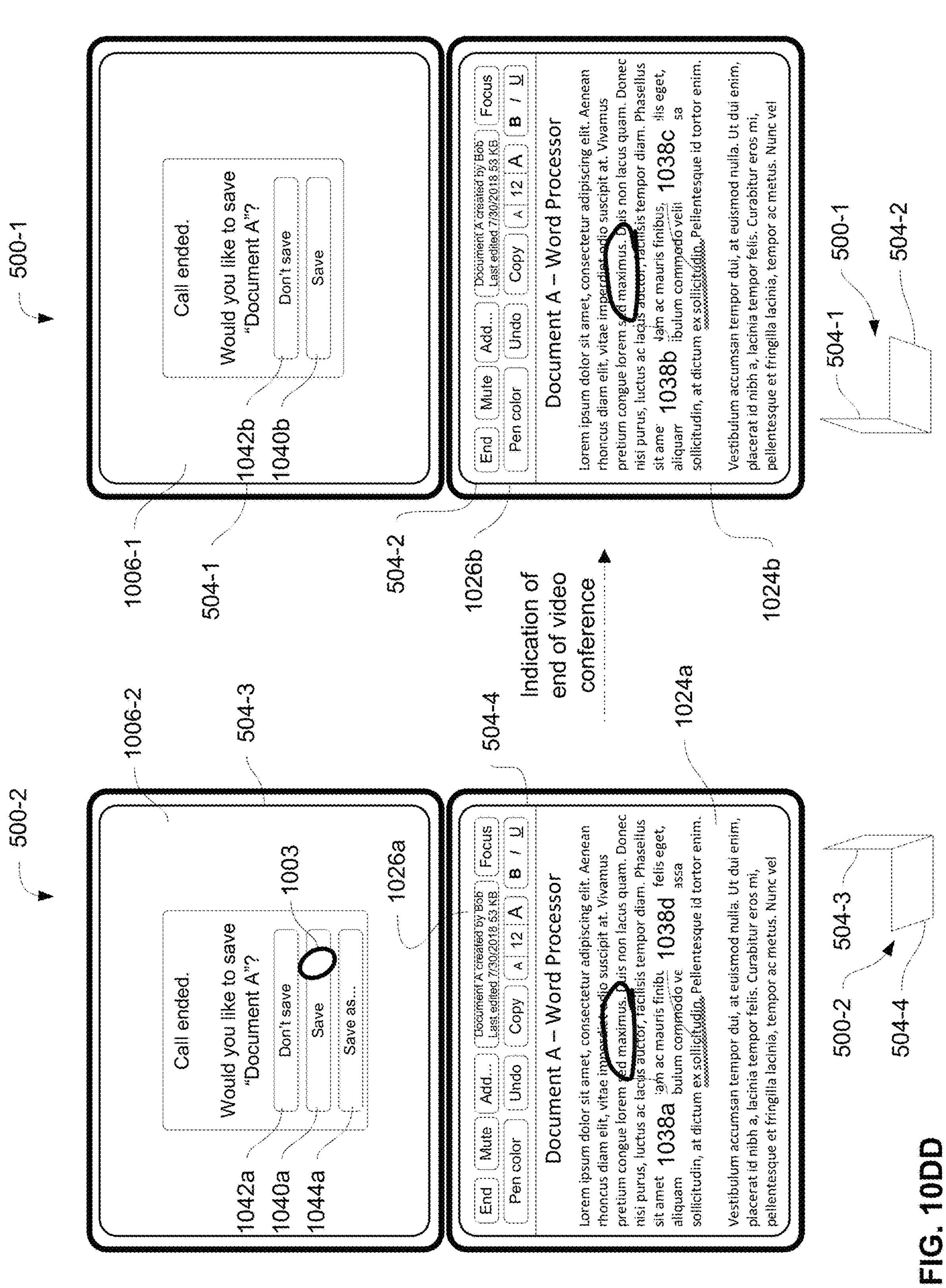
Figure 10E:
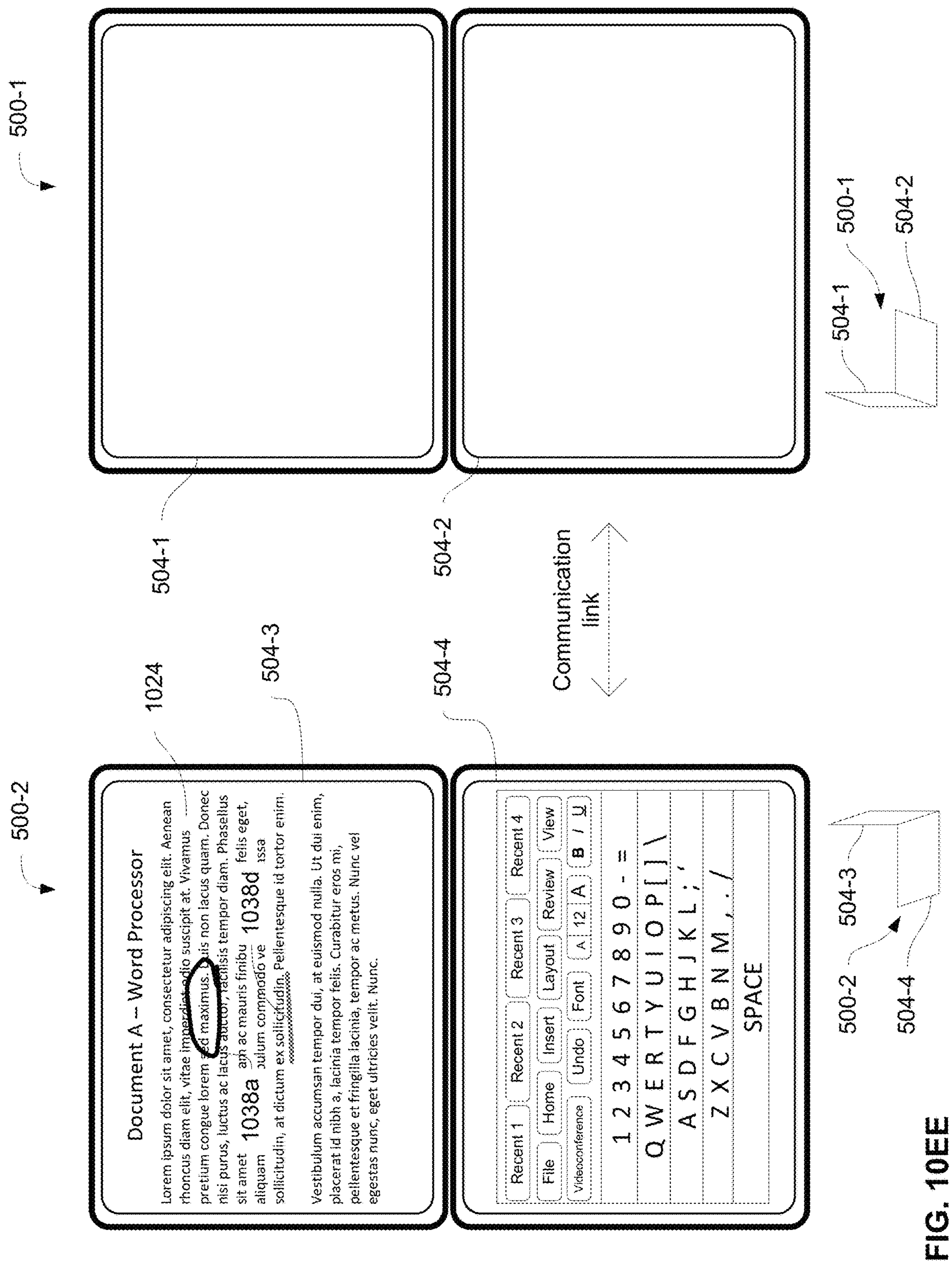
Figure 10F:
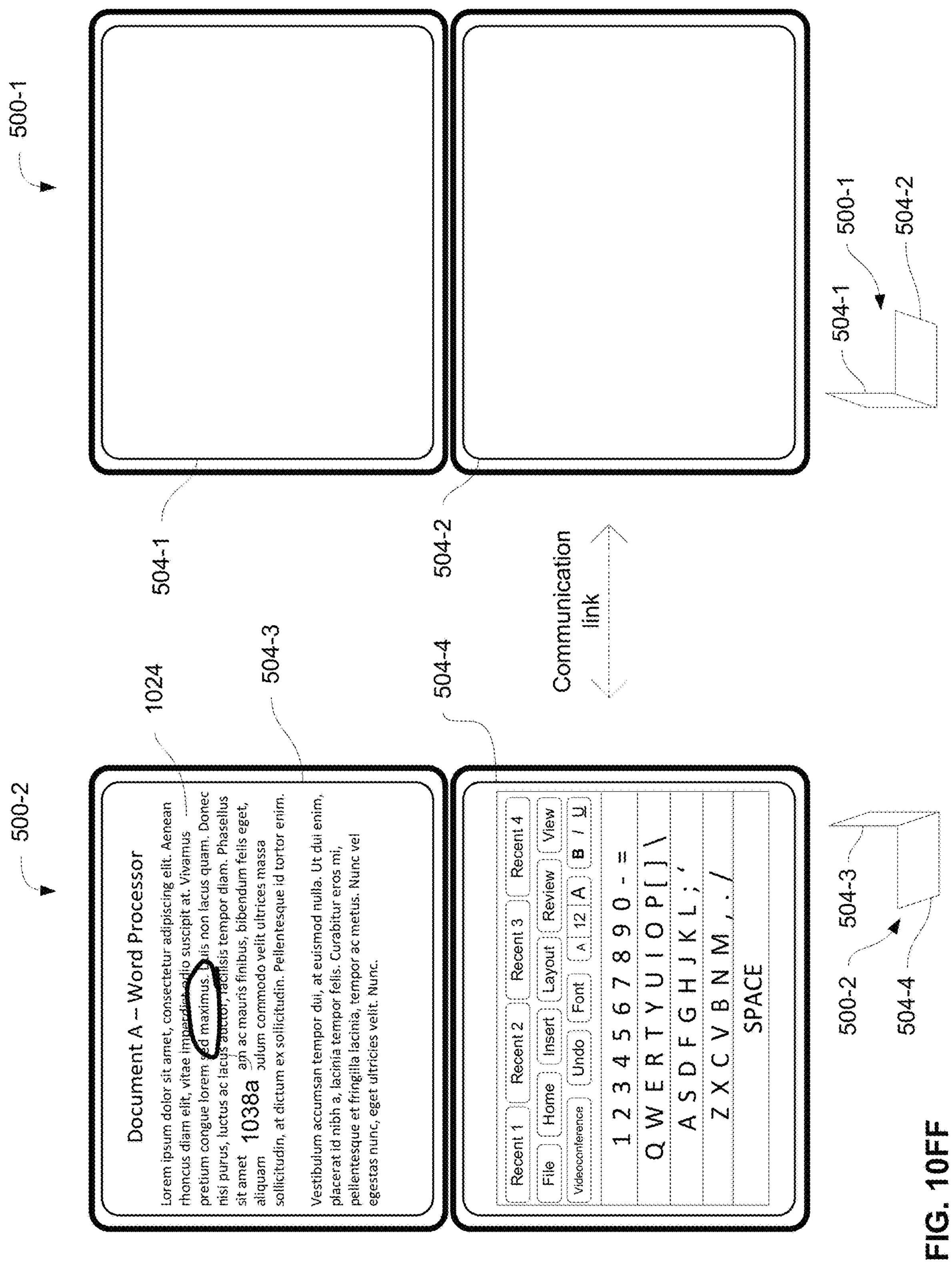
Figure 10G:
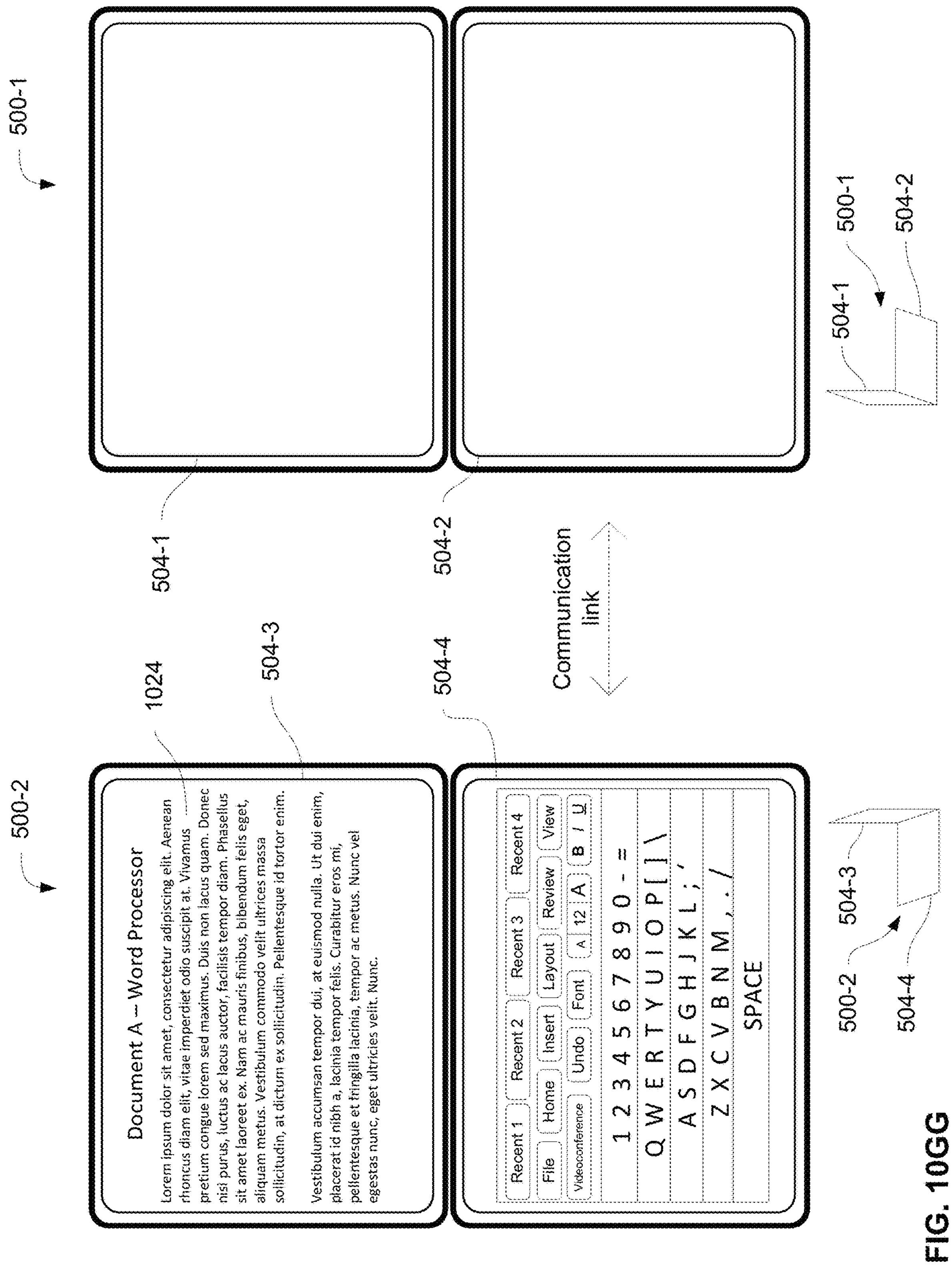

As shown in FIG. 10Z, the second electronic device 500-2 presents the annotation 1038*a* and transmits an indication of the annotation to the first electronic device 500-1. In response to the indication of the annotation, the first electronic device 500-1 presents a representation 1038*b* of the same annotation in document 1024*b*.

In FIG. 10AA, the user of the first electronic device 500-1 annotates (e.g., with movement of contact 1003) part of the document 1024*b*. In response to the movement of the contact, the first electronic device 500-2 presents an annotation having the same shape as the movement of the contact 1003, as shown in FIG. 10BB.

As shown in FIG. 10BB, the first electronic device 500-1 presents the annotation 1038*c* and transmits an indication of the annotation to the second electronic device 500-2. In response to the indication of the annotation, the second electronic device 500-2 presents a representation 1038*d* of the same annotation in document 1024*a*. As shown in FIG. 10BB, the annotations 1038*c* and 1038*d* made by the user of the first electronic device 500-1 are a different color than the annotations 1038*a* and 1038*b* made by the user of the second electronic device 500-1 in order to allow the users to see which annotations were made by which users.

After the user terminates the videoconference, the electronic devices 500-1 and/or 500-2 are able to continue to present the document 1024*a* or 1024*b* for further viewing and editing. In some embodiments, one or more of the annotations 1038*a-d* continue to be presented in the document 1024*a* or 1024*b* and in some embodiments the annotations 1038*a-d* cease to be displayed after the videoconference has ended.

In FIG. 10CC, the user of the second electronic device 500-2 selects (e.g., with contact 1003) an option 1030*d* to end the videoconference. In response to the user's selection, the second electronic device 500-2 transmits an indication of the end of the videoconference to the first electronic device 500-1, as illustrated in FIG. 10DD.

As shown in FIG. 10DD, after the end of the videoconference, the second electronic device 500-2 presents an option 1040*a* to save the document, an option 1044*a* to save a copy of the document as a new document, and an option 1042*a* not to save the document, and the first electronic device 500-1 presents an option 1040*b* to save the document and an option 1042*b* not to save the document. The user of the second electronic device 500-2 selects (e.g., with contact 1003) the option 1040*a* to save the document. In response to the user's selection, the second electronic device 500-2 presents the document 1024 in one of the ways shown in FIG. 10EE, 10FF, or 10GG.

As shown in FIG. 10EE, the document 1024 is displayed including indications 1038*a* and 1038*b* of the annotations made by the user of the first electronic device 500-1 and the user of the second electronic device 500-2. As shown in FIG. 10FF, the document 1024 is displayed with an indication 1038*a* of the annotation made by the user of the second electronic device 500-2 without displaying an indication of the annotation made by the user of the first electronic device 500-1. As shown in FIG. 10GG, the document 1024 is displayed without indications of annotations displayed by either user.

Figure 11A:
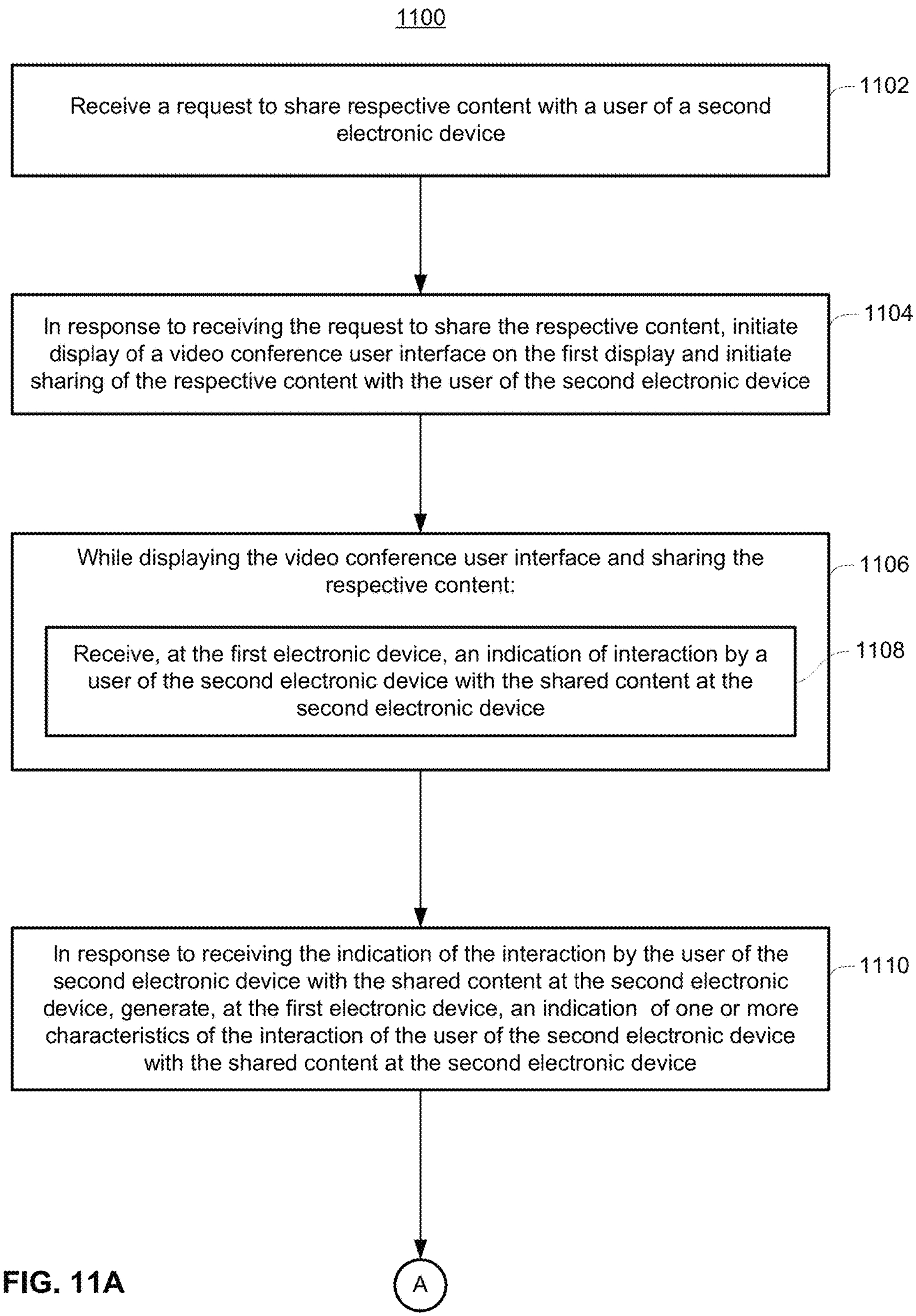
FIGS. 11A-11N are flow diagrams illustrating a method of sharing content between two electronic devices while displaying a video conferencing user interface in accordance with some embodiments of the disclosure.
Figure 11B:
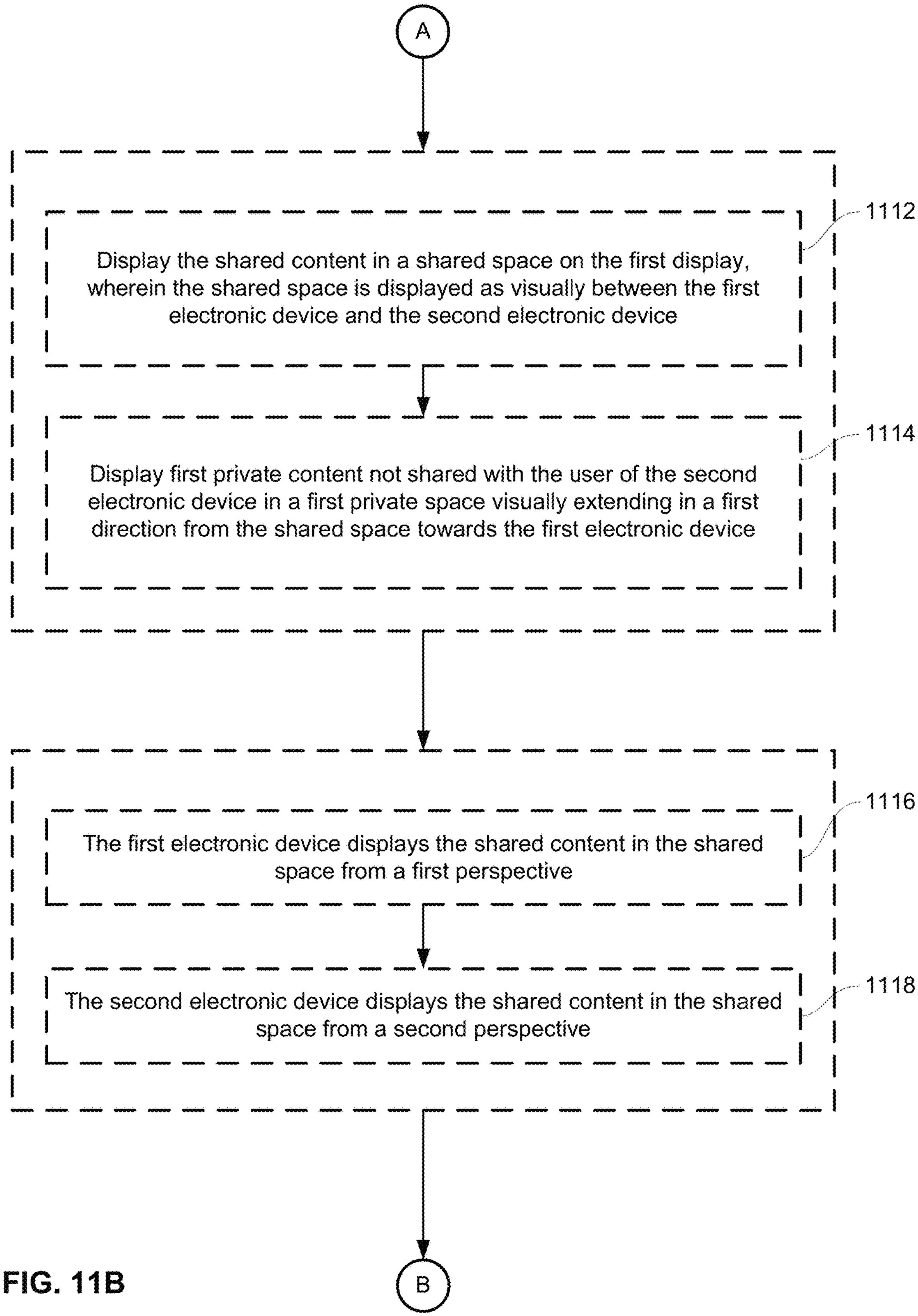
Figure 11C:
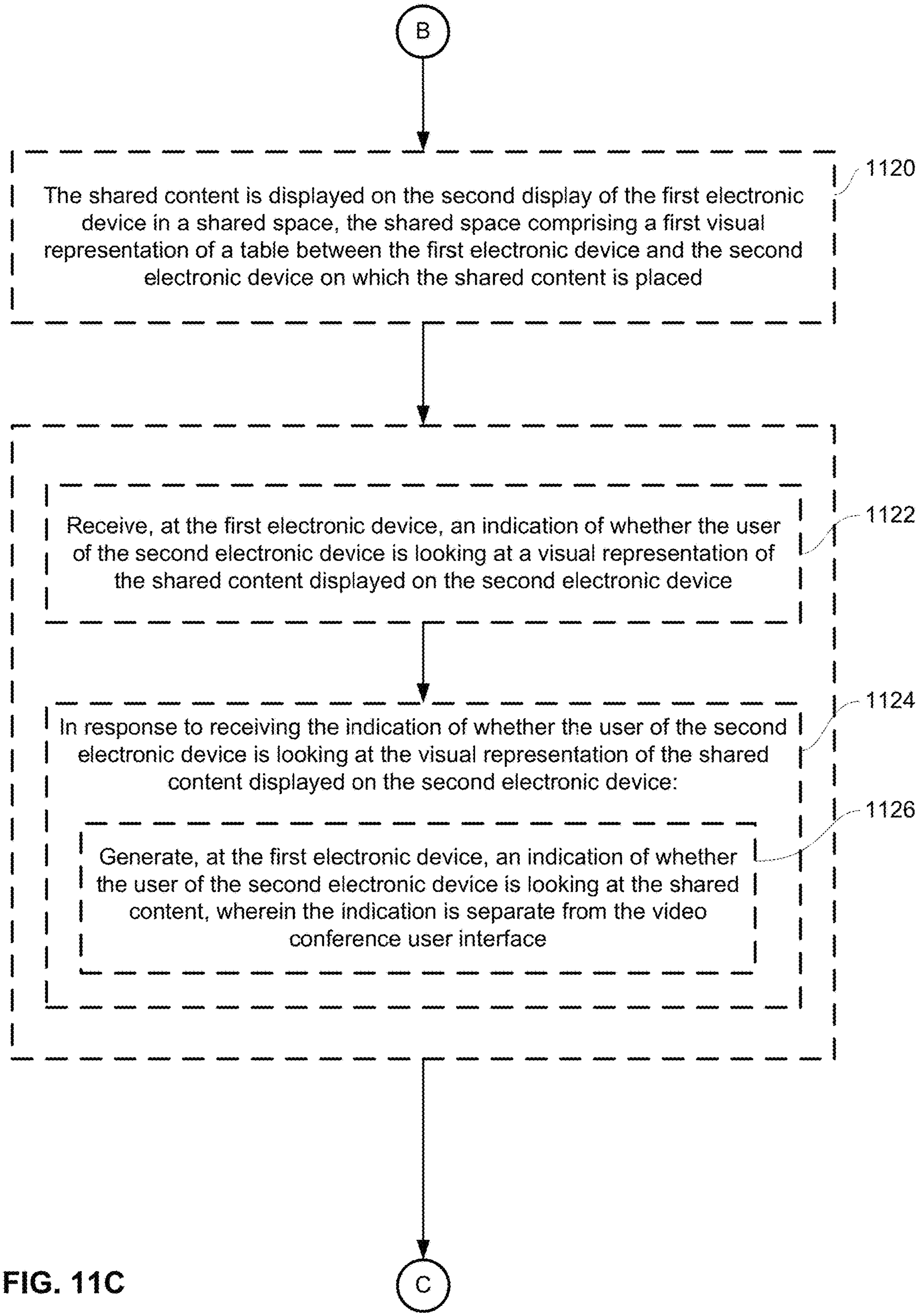
Figure 11D:
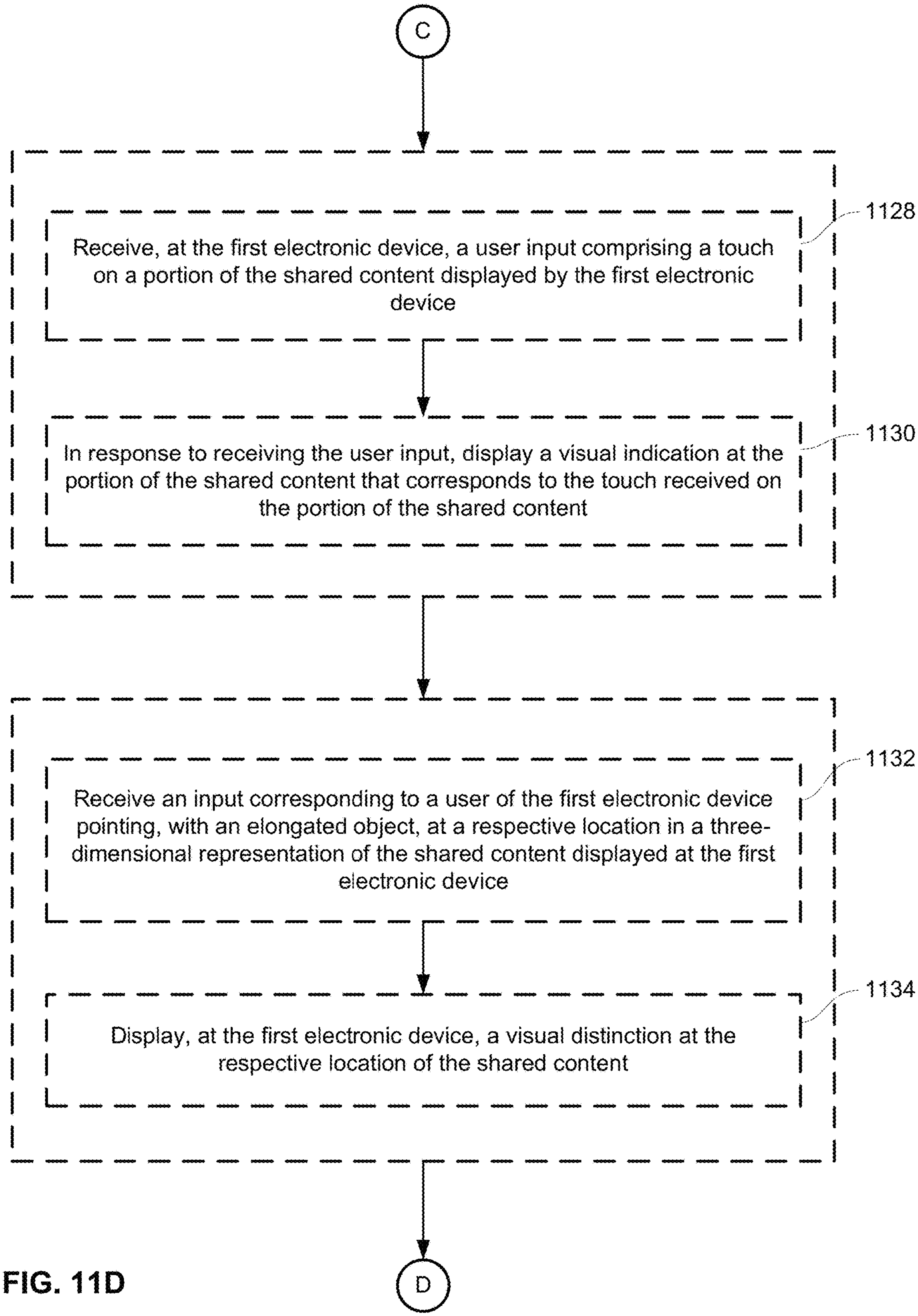
Figure 11E:
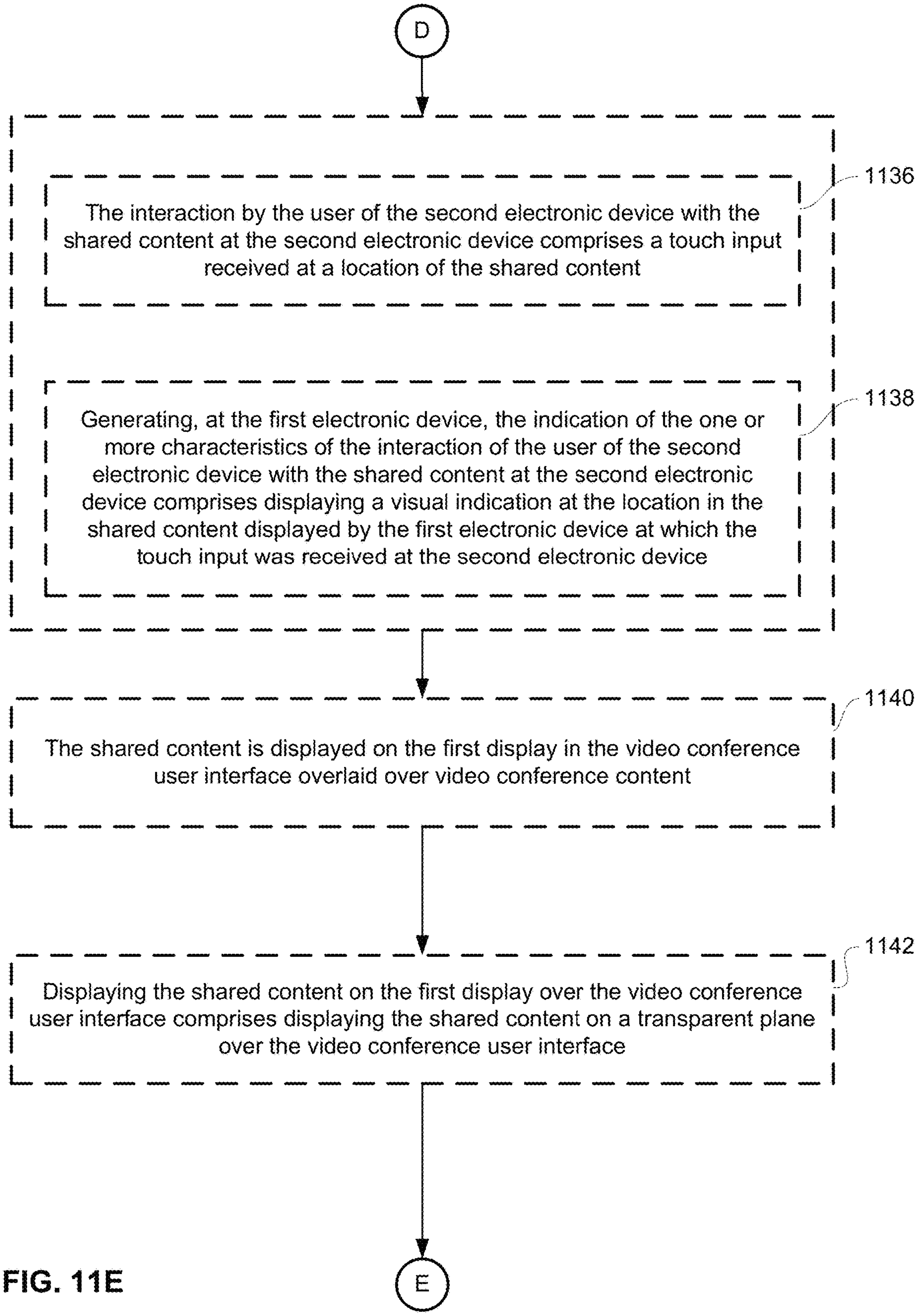
Figure 11G:
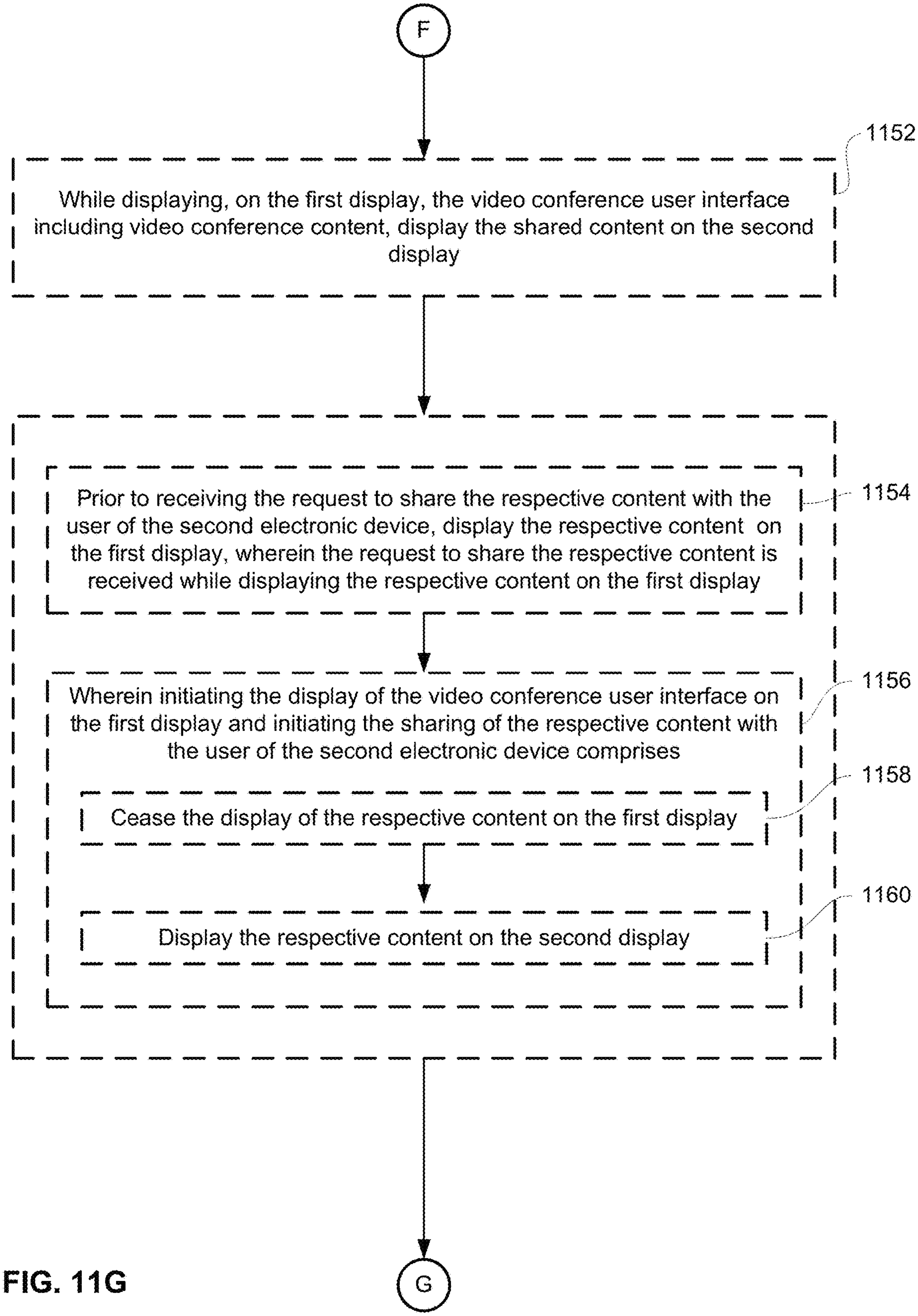
Figure 11H:
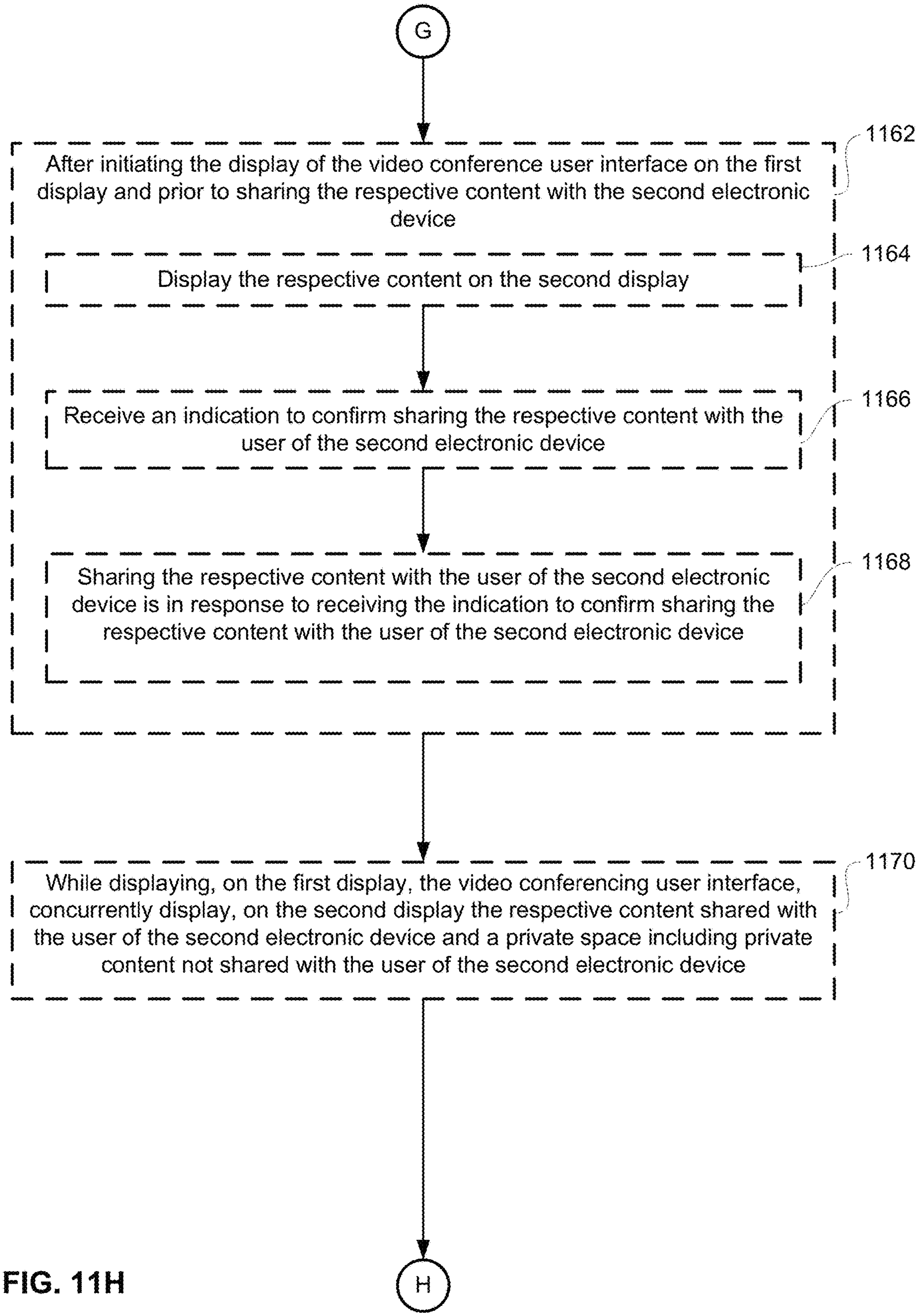
Figure 11I:
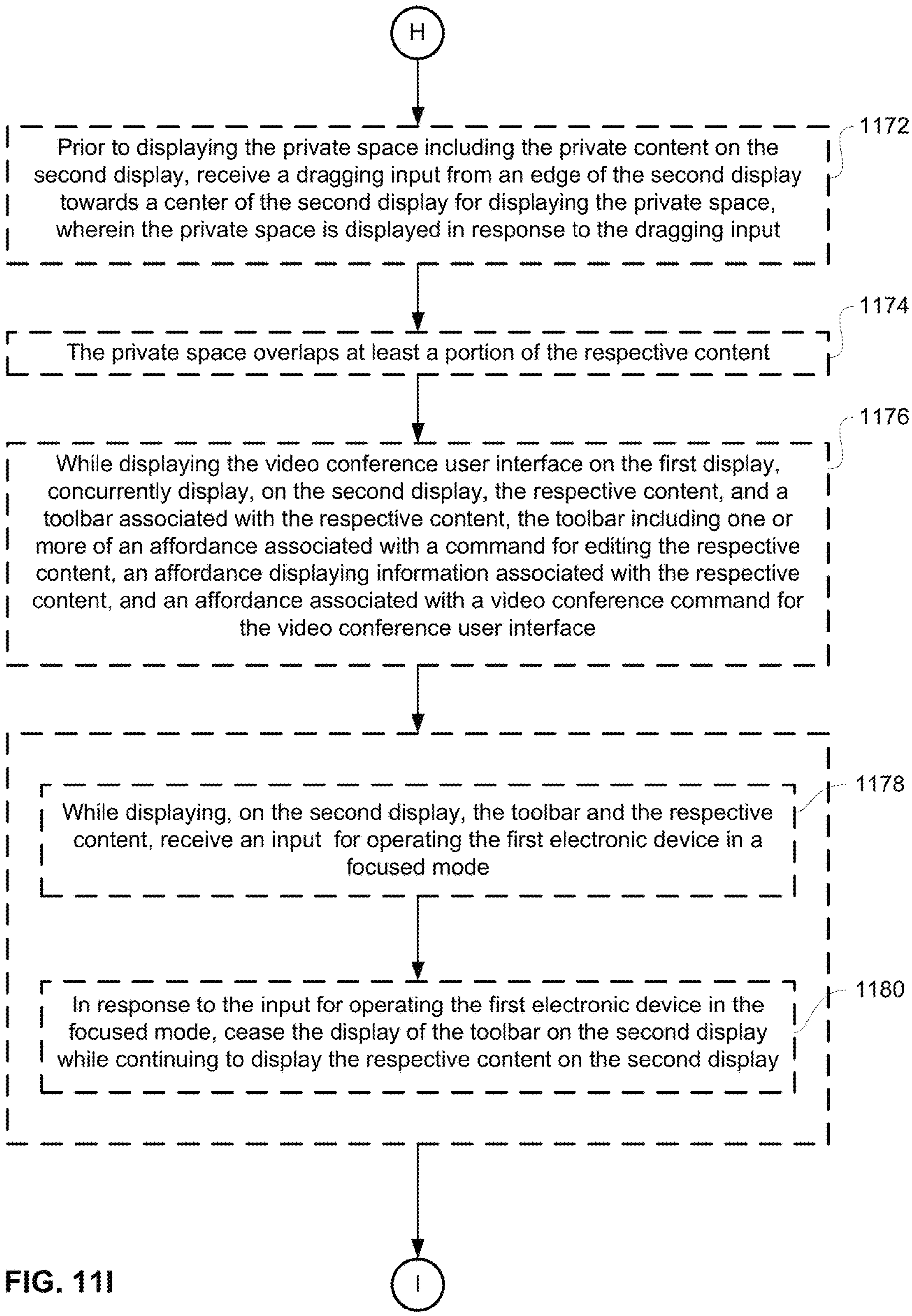
Figure 11J:
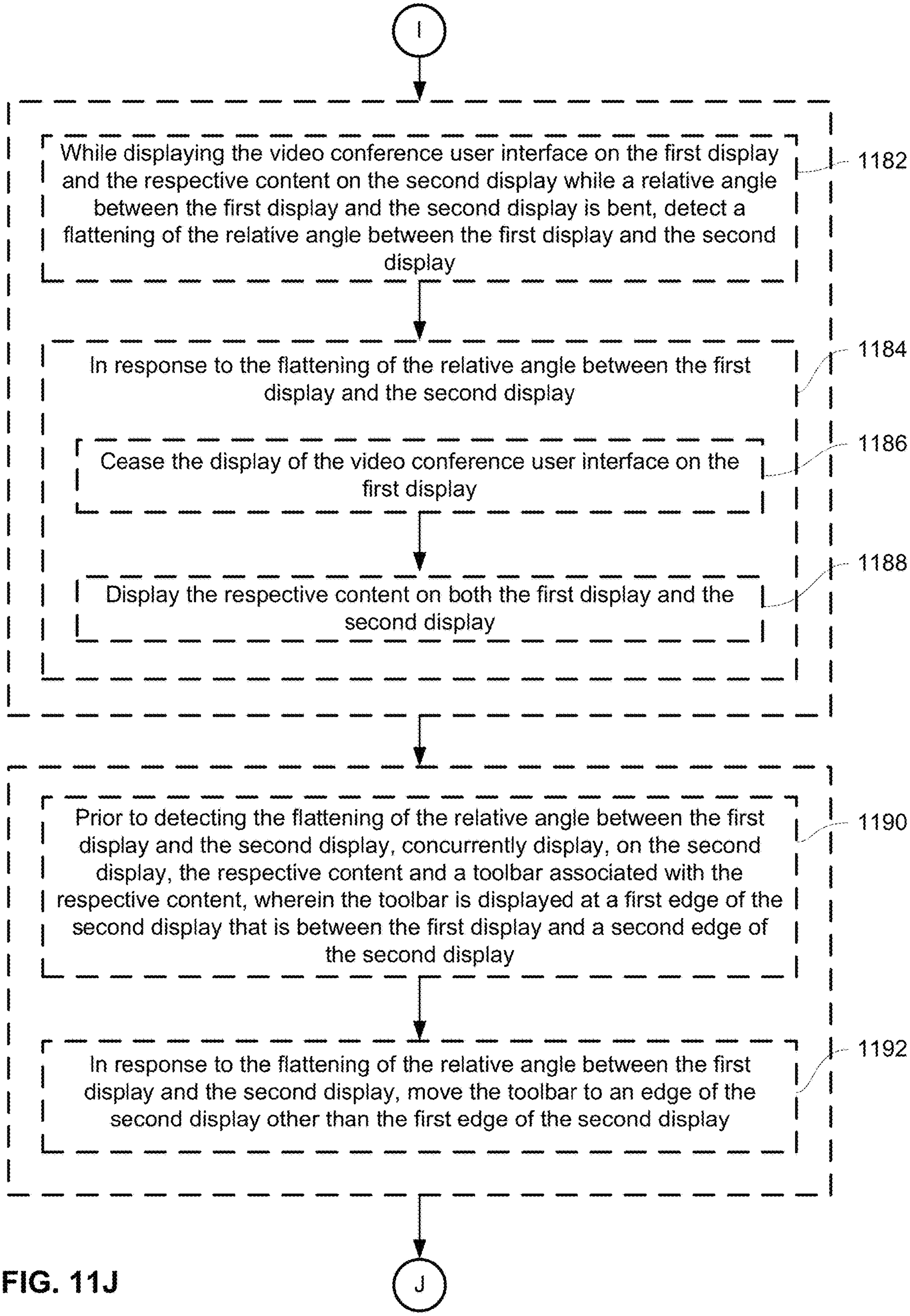
Figure 11K:
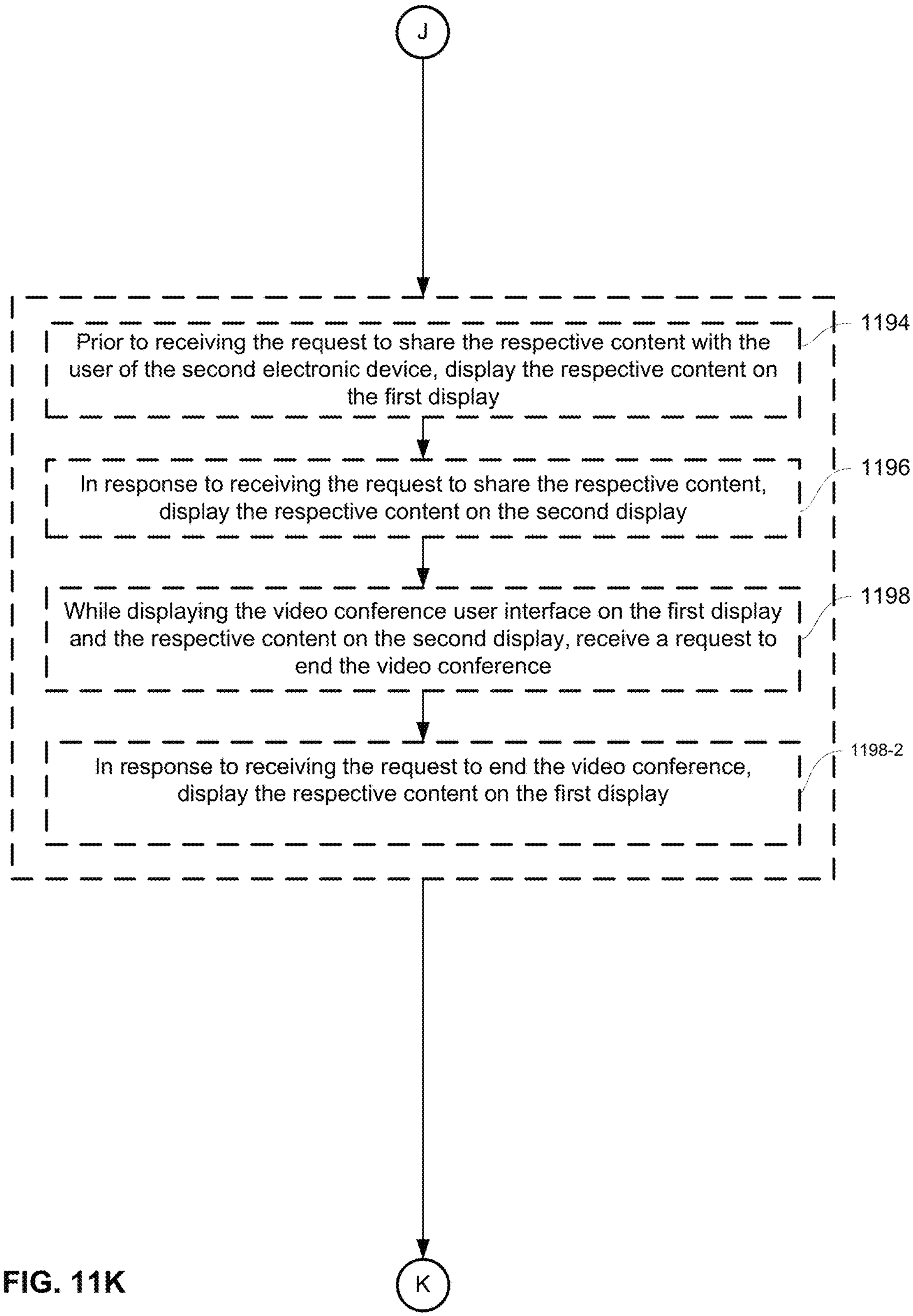
Figure 11L:
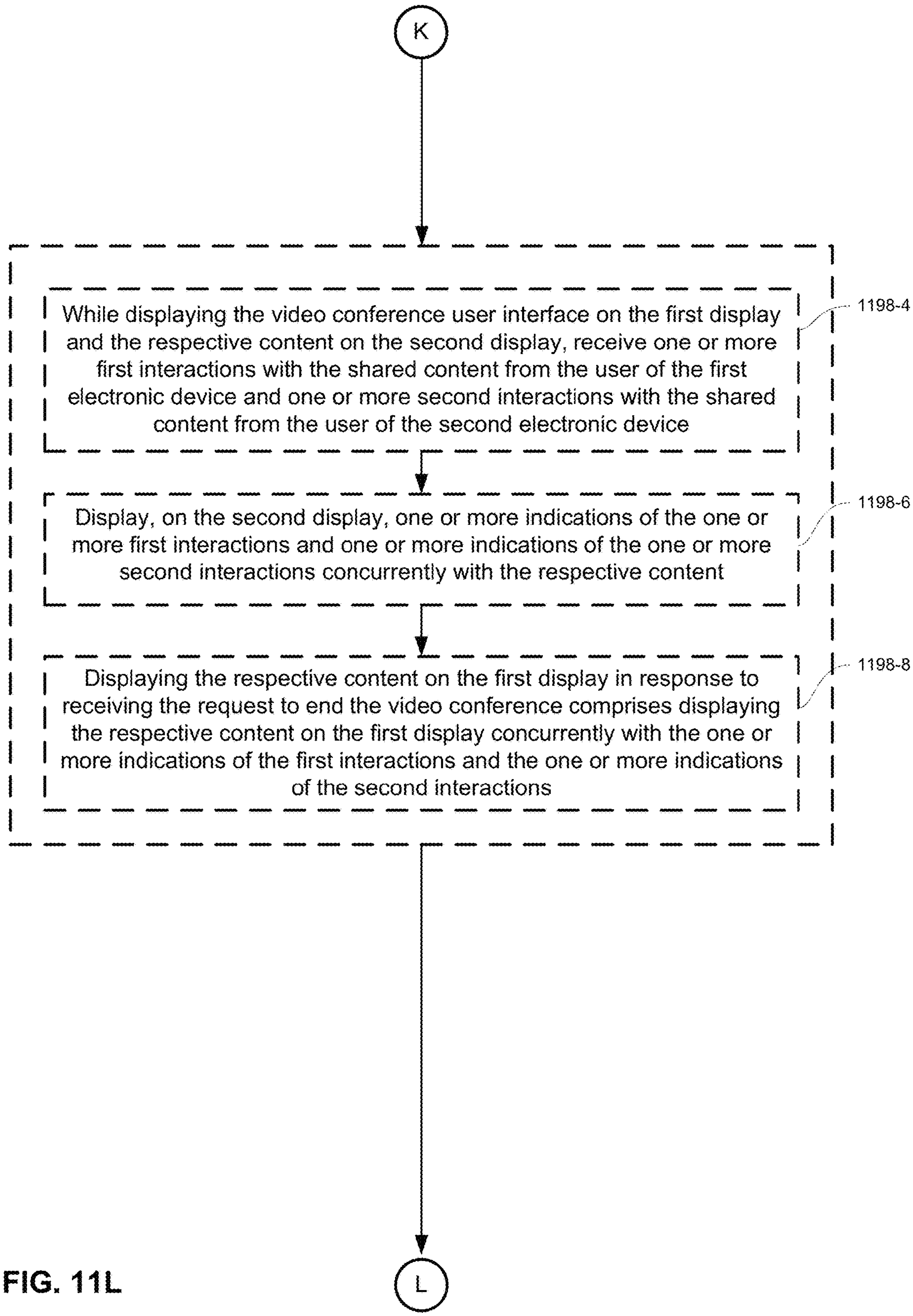
Figure 11M:
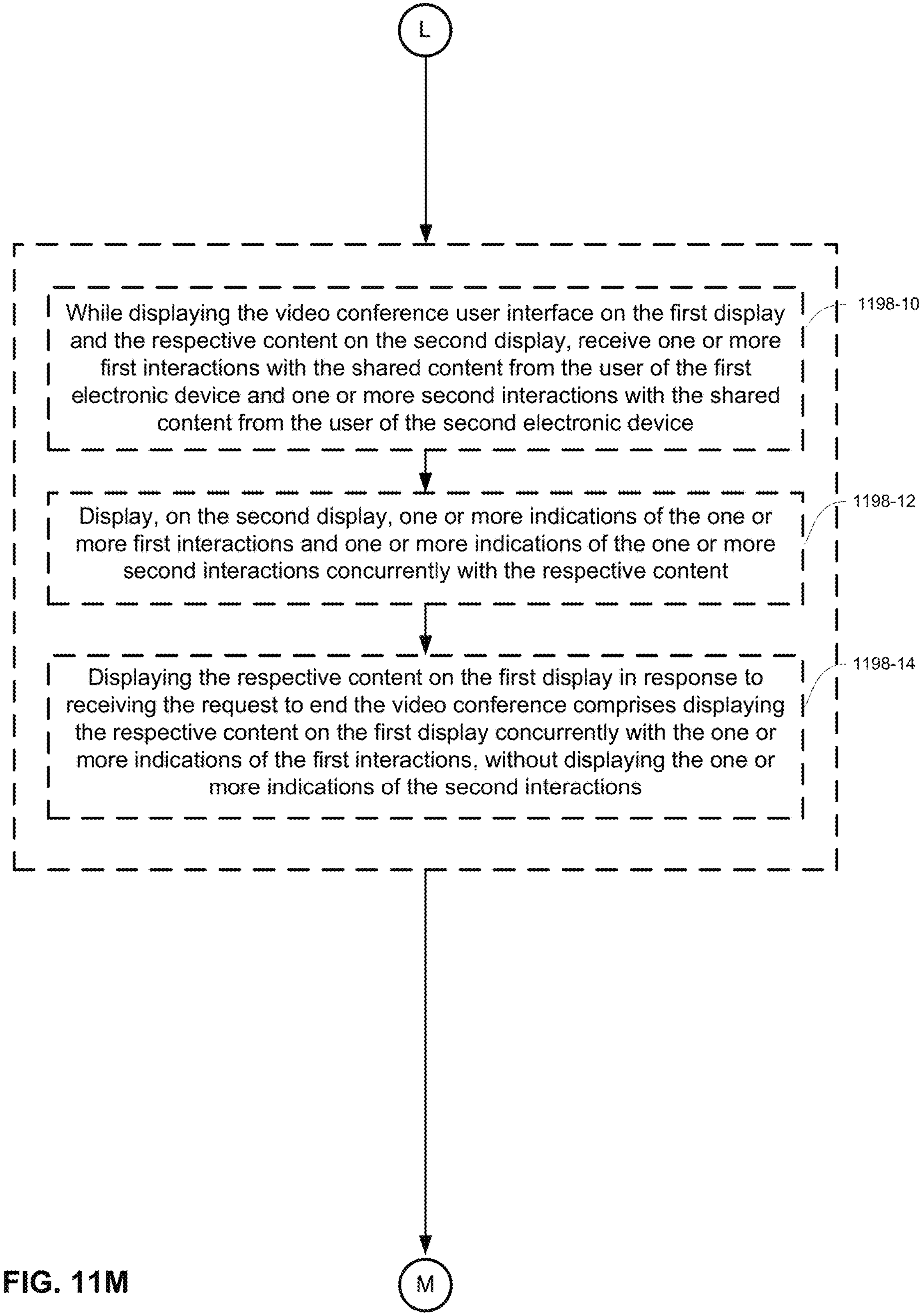
Figure 11N:
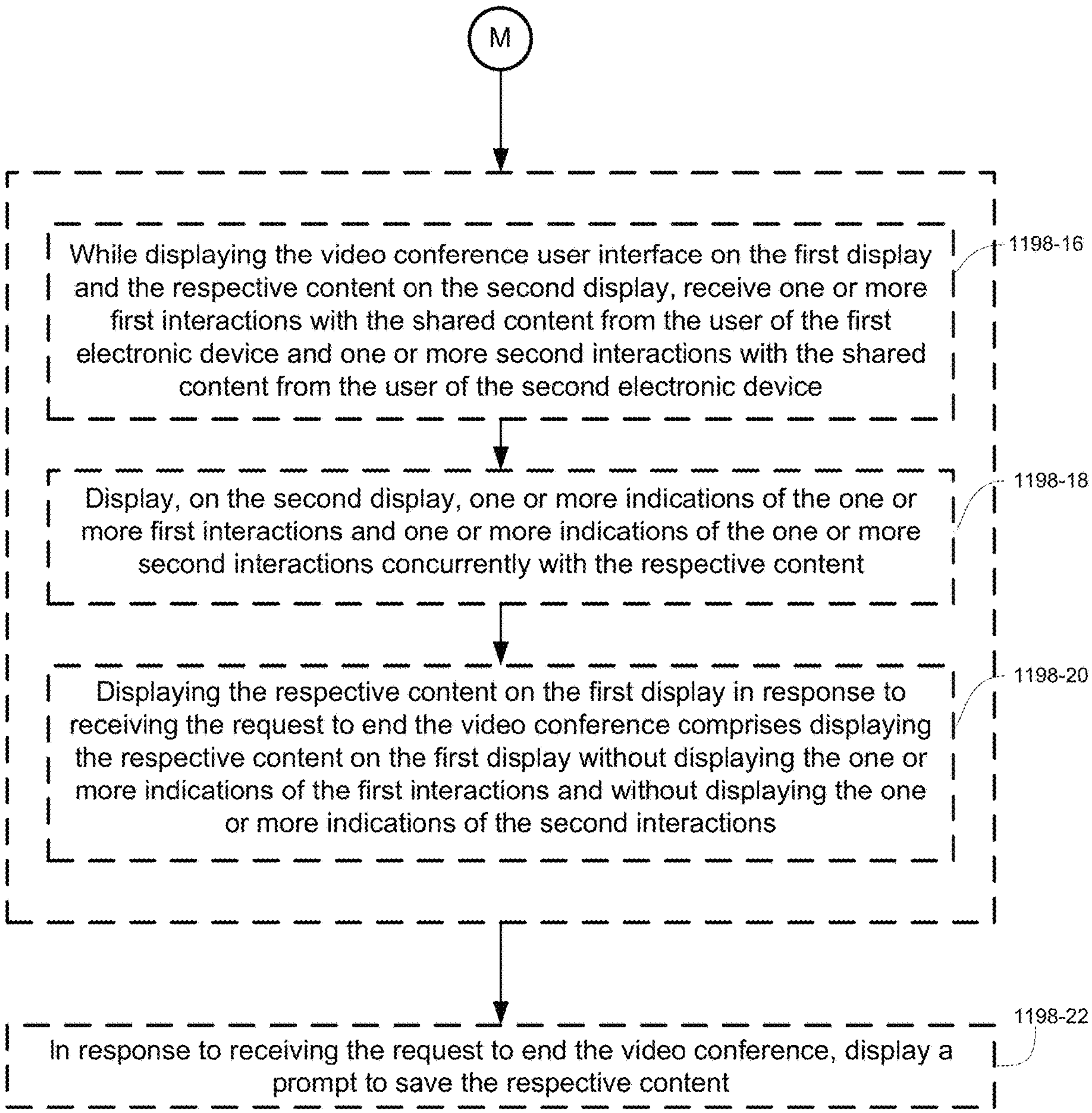

FIGS. 11A-11N are flow diagrams illustrating a method of sharing content between two electronic devices while displaying a video conferencing user interface. The method 1100 is optionally performed at two or more electronic devices, such as device 100, device 300, device 500, device 500-1, or device 500-2 described above with reference to FIGS. 1A-1B, 2-3, 4A-4B and 5A-5H. Some operations in method 1100 are, optionally combined and/or the order of some operations is, optionally, changed.

As described below, the method 1100 provides ways of sharing content between two electronic devices while displaying a video conferencing user interface. The method reduces the cognitive burden on a user when interacting with a user interface of the device of the disclosure, thereby creating a more efficient human-machine interface. For battery-operated devices, increasing the efficiency of the user's interaction with the user interface conserves power and increases the time between battery charges.

In some embodiments, a first electronic device (e.g., device 500-1) in communication with a first display and a second display and one or more input devices (e.g., a phone, tablet computer, laptop, etc. including one or more touch screens or one or more displays, or a set-top box connected to a television) receives (1102) a request to share respective content with a user of a second electronic device (e.g., device 500-2), such as in FIG. 10B. In response to receiving the request to share the respective content, the first electronic device optionally initiates (1104) display of a video conference user interface on the first display and optionally initiates sharing of the respective content with the user of the second electronic device (e.g., in a user interface or part of a user interface concurrently displayed on the first electronic device and on the second electronic device), such as in FIG. 10E. In some embodiments, the shared space includes one or more user interfaces of one or more applications running on the first and/or second devices. For example, one or more photos displayed by a photo viewing application (e.g., running on the first and/or second electronic devices) can be included in the shared space displayed on both the first electronic device and the second electronic device, or a model of a three-dimensional object.

While displaying (1106) the video conference user interface (e.g., displaying a video image of the user of the second electronic device) and sharing the respective content, the first electronic device receives (1108), at the first electronic device, an indication of interaction by a user of the second electronic device with the shared content at the second electronic device (e.g., an indication that the user of the second electronic device has inputted, using an input device of the second electronic device, an input at the shared space, such as the user pointing at a part of an object in the shared space using a finger, stylus or other pointing device), such as in FIGS. 10F-H. In some embodiments, the indication includes information that such interaction has occurred. In some embodiments, the indication includes information about such interaction that has occurred (e.g., information about the nature of the interaction).

In response to receiving the indication of the interaction by the user of the second electronic device with the shared content at the second electronic device, the first electronic device optionally generates (1110) an indication (e.g., a cue comprising one or more of a visual cue displayed on one or more of the one or more displays of the first device, an audible cue played by a speaker associated with the first electronic device, etc.) of one or more characteristics (e.g., a type or location within the shared space of an input entered by the user of the second electronic device) of the interaction of the user of the second electronic device with the shared content at the second electronic device (e.g., a visual or audio representation of an input entered by the user of the second electronic device at the second electronic device), such as in FIGS. 10G-10H. For example, if the user of the second electronic device is pointing to or touching a portion of an object displayed in the shared space, the first electronic device optionally displays a visual indication of such pointing/touching on that portion of the object on the display of the first electronic device. The above-described manner of automatically indicating on the first electronic device interactions with shared content by the user of the second electronic device allows the first electronic device to present information (e.g., about how the user of the second electronic device is interacting with shared content) to the user of the first electronic device in an efficient manner (e.g., in real-time), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the first electronic device displays (1112) the shared content in a shared space on the first display, wherein the shared space is displayed as visually between the first electronic device and the second electronic device, such as in FIG. 10I. In some embodiments, the shared content is rendered such that it appears as a virtual space situated between the first electronic device and the second electronic device. For example, the shared space includes the video conference user interface such that the shared content is overlaid on the video conference user interface. The first electronic device optionally displays (1114) first private content not shared with the user of the second electronic device in a first private space visually extending in a first direction from the shared space towards the first electronic device (e.g., between the shared space and the user of the first electronic device), such as in FIG. 10I. In some embodiments, the second electronic device concurrently displays the shared content in a shared space that is visually between the first electronic device and the second electronic device (e.g., the user of the second device sees the same virtual space seen by the user of the first electronic device from a different perspective, such as from the opposite side of the shared space). The second electronic device also displays private content not shared with the user of the first electronic device in a private space that extends visually in a direction between the shared space and the user of the second electronic device. The above-described manner of displaying the shared content in a virtual space between the first and second electronic devices allows the electronic devices to present shared content in an efficient and elegant manner (e.g., as a virtual "space" between the two users), which simplifies interactions between the user and the device and enhances the operability of the device and makes the user-device interface more efficient (e.g., by helping the user to more naturally interact with another user), which, additionally, reduces power usage and improves battery life of the device by enabling the user to use the device more quickly and efficiently.

The first electronic device optionally displays the shared content in the shared space (e.g., a virtual space visually between the first device and the second device) from a first perspective (1116) (e.g., from the side of the virtual space visually closest to the first electronic device), such as in FIG. 10I. In some embodiments, the second electronic device displays the shared content in the shared space from a second perspective (1118), such as in FIG. 10I. The above-described manner of displaying the shared content from different perspectives on the first and second electronic devices allows the electronic devices to present shared content in an efficient and elegant manner (e.g., as a virtual "space" between the two users), which simplifies interactions between the user and the device and enhances the operability of the device and makes the user-device interface more efficient (e.g., by helping the user to more naturally interact with another user), which, additionally, reduces power usage and improves battery life of the device by enabling the user to use the device more quickly and efficiently.

In some embodiments, the shared content is displayed on the second display of the first electronic device (e.g., the bottom display when the first electronic device is folded such that the first display is upright (e.g., on top) and the second display is flat (e.g., on bottom), or in a clamshell configuration) in a shared space, the shared space comprising a first visual representation of a table between the first electronic device and the second electronic device on which the shared content is placed (e.g., a virtual table visually positioned "between" the first and second electronic devices, such as in FIGS. 10J-L. In some embodiments, the virtual table is displayed on the bottom display and the video conference user interface is displayed on the top display to give the appearance of a table between the user of the first device and the user of the second device. In some embodiments, the second electronic device displays a second visual representation of the table from the perspective of the second electronic device. The above-described manner of displaying the shared content on a virtual table between the first and second electronic devices allows the electronic devices to present shared content in a natural manner (e.g., as a virtual table), which simplifies interactions between the user and the device and enhances the operability of the device and makes the user-device interface more efficient (e.g., by facilitating sharing of content and viewing of shared content between users of different electronic devices), which, additionally, reduces power usage and improves battery life of the device by enabling the user to use the device more quickly and efficiently.

The first electronic device optionally receives (1122) an indication of whether the user of the second electronic device is looking at a visual representation of the shared content displayed on the second electronic device (e.g., whether the user of the second electronic device is looking at the shared content, or a shared space in which the shared content is included. In some embodiments, the second electronic device includes a gaze detection input device for performing this determination), such as in FIGS. 10M-10O. In response to receiving (1124) the indication of whether the user of the second electronic device is looking at the visual representation of the shared content displayed on the second electronic device (e.g., looking at the shared content in the shared space displayed on the second electronic device), the first electronic device optionally generates (1126) an indication (e.g., a visual indication, an audible indication, etc.) of whether the user of the second electronic device is looking at the shared content (e.g., a visual indication that the user of the second electronic device is looking at the shared content, or a visual indication that the user of the second electronic device is not looking at the shared content), wherein the indication is separate from the video conference user interface (e.g., at a location in the shared content at which the user of the second electronic device is looking or at a predetermined location in a user interface including the shared content, but not included in the video conference user interface), such as in FIGS. 10M-10O. The above-described manner of indicating when the user of the second electronic device is or is not looking at the shared content allows the first electronic device to present more information to the user (e.g., information about whether the user of the second device is looking at the shared content), which simplifies interactions between the user and the device and enhances the operability of the device and makes the user-device interface more efficient, which, additionally, reduces power usage and improves battery life of the device by enabling the user to use the device more quickly and efficiently.

In some embodiments, the first electronic device receives (1128) a user input comprising a touch on a portion of the shared content displayed by the first electronic device (e.g., a touch input to interact with shared content displayed in a shared space on the touch screen), such as in FIGS. 10G-10H. In response to receiving the user input, the first electronic device displays (1130) a visual indication (e.g., a touch cloud) at the portion of the shared content that corresponds to the touch received on the portion of the shared content (e.g., to provide confirmation to the user that the touch input was received and/or shared with the user of the second electronic device (e.g., in the shared content displayed in a shared space at the second electronic device), or to provide visual feedback of the location of the received touch. In some embodiments, the second electronic device displays the touch cloud at the corresponding location on the shared content), such as in FIGS. 10G-10H. The above-described manner of displaying a touch cloud at a location of a received touch input allows the first electronic device to present confirmation that the input is received and/or of the input's location, which simplifies interactions between the user and the device and enhances the operability of the device and makes the user-device interface more efficient (e.g., by reducing the number of erroneous inputs provided to the device resulting from lack of knowledge that touch inputs were detected by the device), which, additionally, reduces power usage and improves battery life of the device by enabling the user to use the device more quickly and efficiently.

The first electronic device optionally receives (1132) an input corresponding to a user of the first electronic device pointing (e.g., orienting an elongated object such that its elongated axis extends in a direction towards the location at which it is pointing), with an elongated object (e.g., a finger, stylus, pen, etc.), at a respective location in a three-dimensional representation of the shared content displayed at the first electronic device (e.g., in a shared space of a user interface of the first electronic device), such as in FIGS. 10K-10L. In some embodiments, the first electronic device displays (1134) a visual distinction (e.g., a light shining) at the respective location of the shared content, such as in FIGS. 10K-10L. In some embodiments, the second electronic device receives an indication of the pointing at the first electronic device and displays the visual distinction (e.g., the light shining) at the respective location in the shared content displayed at the second electronic device. The above-described manner of displaying the location the user of the second device points to at the first electronic device allows the first electronic device to present information (e.g., about how the user of the second electronic device is interacting with shared content) to the user of the first electronic device in an efficient manner (e.g., in real-time), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the interaction by the user of the second electronic device with the shared content at the second electronic device comprises a touch input received at a location of the shared content 1136 (e.g., at a touch screen of the second electronic device on which the shared content is displayed, such as a tap on a portion on the shared content displayed on the second electronic device), such as in FIGS. 10F-10H. Generating, at the first electronic device, the indication of the one or more characteristics of the interaction of the user of the second electronic device with the shared content at the second electronic device optionally comprises displaying a visual indication (e.g., a touch cloud) at the location in the shared content displayed by the first electronic device at which the touch input was received at the second electronic device 1138 (e.g., at the same part of the shared content where the touch is received at the second electronic device), as shown in FIGS. 10F-10H. The above-described manner of displaying, at the first electronic device, the location the user of the second electronic device touches or interacts with the shared content allows the first electronic device to present information (e.g., about how the user of the second electronic device is interacting with shared content) to the user of the first electronic device in an efficient manner (e.g., in real-time), which simplifies interactions between the user and the device and enhances the operability of the device and makes the user-device interface more efficient, which, additionally, reduces power usage and improves battery life of the device by enabling the user to use the device more quickly and efficiently.

The shared content is optionally displayed on the first display in the video conference user interface overlaid over video conference content (1140), such as in FIG. 10I. In some embodiments, the shared content is overlaid on the video conference user interface, over a video of the user of the second electronic device with which the first electronic device is communicating. The above-described manner of displaying the shared content overlaid on the video conference user interface allows the first electronic device to present information (e.g., shared content) to the user of the first electronic device in an efficient manner (e.g., spatially close to the video conferencing user interface), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, displaying the shared content on the first display over the video conference user interface comprises displaying the shared content on a transparent plane (e.g., a virtual window displaying the shared content) over the video conference user interface (1142), such as in FIG. 10I. For example, the shared content is displayed on top of the video conference, giving the appearance that the second user is "behind" the virtual window displaying the shared content. The above-described manner of displaying the shared content overlaid on the video conference user interface allows the first electronic device to present information (e.g., shared content) to the user of the first electronic device in an efficient manner (e.g., spatially close to the video conferencing user interface), which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

The indication of the interaction by the user of the second electronic device with the shared content at the second electronic device optionally comprises an indication of a location within the shared content at which the user of the second electronic device is looking (1144), such as in FIGS. 10M-10O (e.g., the second electronic device includes a gaze detection device configured to determine where the user of the second device is looking). In some embodiments, generating, at the first electronic device, the indication of the one or more characteristics of the interaction of the user of the second electronic device with the shared content at the second electronic device comprises visually differentiating (e.g., displaying in a different (e.g., lighter or brighter) color) the location within the shared content corresponding to the location at which the user of the second electronic device is looking from a remainder of the shared content (1146) (e.g., the same part of the shared content at which the second user is looking). For example, the first electronic device highlights or otherwise displays a visual indication at the location in the shared content at which the user of the second electronic device is looking, such as in FIGS. 10M-10O. The above-described manner of indicating where the user of the second electronic device is looking allows the first electronic device to present information (e.g., about how the user of the second device is interacting with the shared content) to the user of the first electronic device in an efficient manner, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, in accordance with a determination that a first respective display of the first display and the second display is in a first orientation (e.g., upright when the electronic device is in a clamshell configuration wherein the second display is resting on a flat surface and the first display is fully or partially upright), initiating display of a video conference user interface on the first display includes displaying the video conference user interface on the first respective display (1148), such as in FIG. 10E (e.g., the fully or partially upright display). In some embodiments, the shared content is displayed on the second display resting on the flat surface. In accordance with a determination that a second respective display of the first display and the second display is in a second orientation, different than the first orientation (e.g., flat or horizontal when the electronic device is in the clamshell configuration), initiating sharing of the respective content with the user of the second electronic device optionally includes displaying the shared content on the second respective display (1150), such as in FIG. 10E. In some embodiments, the displays that display the video conference user interface and the shared space are selected based on the relative orientation of the displays to one another. For example, when the orientation of the displays changes (e.g., the vertical display becomes the horizontal display and vice-versa), the video conference user interface and the shared space and switch which display they are displayed on. The above-described manner of displaying information based on the orientation of the first and second displays allows the first electronic device to present information (e.g., the video conference user interface and the shared content) to the user of the first electronic device in a consistent and predictable manner, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

While displaying, on the first display, the video conference user interface including video conference content (e.g., a video of the user of the second electronic device with which the first electronic device is communicating), the first electronic device optionally displays (1152) the shared content on the second display, such as in FIG. 10E. In some embodiments, the first electronic device is configured in a folded or clamshell position wherein the first display is fully or partially upright and the second display is resting on a flat surface. For example, the video conferencing user interface is displayed on the first (fully or partially upright) display and the shared content is displayed on the second (flat) display. In some embodiments, the horizontal display further includes a private space displaying private content not shared with the user of the second electronic device, such as in FIG. 10I. The above-described manner of concurrently displaying video conference content and shared content on different displays allows the first electronic device to present information (e.g., the video conference user interface and the shared content) to the user of the first electronic device in an efficient manner, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10P, prior to receiving the request to share the respective content with the user of the second electronic device, the first electronic device 500-2 displays (1154) the respective content 1024 (e.g., a text document, a picture, a video, an email, etc.) on the first display 504-3 (e.g., a top display), wherein the request, such as selection of option 1030*a* with contact 1003 in FIG. 10P, to share the respective content is received while displaying the respective content on the first display. In some embodiments, detecting the request to share comprises detecting the selection of an affordance for sharing the content, the affordance included in a user interface of an application for editing the content. For example, a word processing application optionally includes an affordance for sharing a document, a document viewing application optionally includes an affordance for sharing a document, a photo editing application optionally includes an affordance for sharing a photo, etc. In some embodiments, detecting the request to share comprises detecting the selection of an affordance to initiate a video conference, the affordance included in the user interface of a video conferencing application.

In some embodiments, such as in FIG. 10R, wherein initiating the display of the video conference user interface 1006-2 on the first display 504-3 and initiating the sharing of the respective content 1024*a* with the user of the second electronic device 500-1 comprises (1156): the first electronic device 500-2 ceasing (1158) the display of the respective content 1024 on the first display 504-4 (e.g., the top display) and displaying (1160) the respective content 1024*a* on the second display 504-4 (e.g., the bottom display). In some embodiments, receiving the request to share the respective content causes the respective content to move from the top display to the bottom display (e.g., the respective content ceases to be displayed on the top display and is displayed on the bottom display) and causes a video conferencing user interface to be displayed on the top display instead of the respective content. In some embodiments, an information button associated with the respective content is displayed on the second display concurrently with the respective content, the information button selectable to display one or more representations of individuals associated with the respective content. In some embodiments, the individuals include an author of the respective content, an editor of the respective content, and/or an individual who shared or sent the respective content to the user of the first electronic device, and the representations of the individuals are selectable to initiate communication (e.g., text messages, e-mail, phone call, etc.) with those individuals.

The above-described manner of moving the respective content from the first display to the second display in response to sharing the respective content and displaying the video conferencing user interface on the first display allows the first electronic device to emulate the experience of meeting in person to review an item on a shared table, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10R, after initiating the display of the video conference user interface 1006-2 on the first display 504-3 (e.g., the top display) and prior to sharing the respective content 1024*a* with the second electronic device 504-1 (1162): the first electronic device 504-2 displays (1164) the respective content 1024*a* on the second display 504-4 (e.g., the bottom display) and receives (1166) an indication, such as selection of option 1030*a* with contact 1003 illustrated in FIG. 10R, to confirm sharing the respective content 1024*a* with the user of the second electronic device 500-1 (e.g., selection of a user interface element (e.g., a soft button) displayed proximate to the respective content on the second display for sharing the respective content with the user of the second electronic device). In some embodiments, sharing the respective content with the user of the second electronic device is in response to receiving the indication to confirm sharing the respective content with the user of the second electronic device (1168). In some embodiments, the video conferencing user interface is displayed on the first display and the respective content is displayed on the second display before sharing the respective content. In some embodiments, sharing of the respective content does not occur until a share button is selected in the second display.

The above-described method of sharing the respective content with the user of the second electronic device in response to confirmation that the respective content should be shared allows the first electronic device to confirm an action to be performed before performing that action, thereby reducing the need of the user to undo an erroneously performed action, which simplifies interactions between the user and the device and enhances the operability of the device and makes the user-device interface more efficient (e.g., by helping the user to interact with the device using fewer inputs), which, additionally, reduces power usage and improves battery life of the device by enabling the user to use the device more quickly and efficiently.

In some embodiments, such as in FIG. 10U, while displaying, on the first display 504-3 (e.g., the top display), the video conferencing user interface, the first electronic device 500-2 concurrently displays (1170), on the second display 504-4 (e.g., the bottom display) the respective content 1024*a* shared with the user of the second electronic device and a private space 1032-1034 including private content 1032-1034 not shared with the user of the second electronic device 500-2. In some embodiments, the private space includes one or more documents and/or application user interfaces not shared with the user of the second electronic device. In some embodiments, the private space includes a text entry user interface (e.g., a virtual notepad). The private space optionally includes one or more note documents. In some embodiments, the private space includes one or more private documents not shared with the user of the second electronic device. In response to an input dragging a private document from the private space to the shared space, the document is displayed in the shared space and shared with the user of the second electronic device in some embodiments. In some embodiments, the dragged document replaces a previously shared document in the shared space, or in other embodiments the dragged document is added to the previously shared document in the shared space. In some embodiments, the previously shared and the dragged document are shared concurrently with the user of the second electronic device.

The above-described method of displaying a private space next to the shared content allows the electronic device to present content that is not shared next to content that is shared, making it easier for the user to interact with the shared content and the private content at the same time, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10T, prior to displaying the private space including the private content 1032-1034 on the second display 504-4, the electronic device 500-2 receives (1172) a dragging input from an edge of the second display towards a center of the second display such as movement of contact 1003 (e.g., starting from a user interface element associated with the private space) for displaying the private space, wherein the private space is displayed in response to the dragging input. In some embodiments, the user drags a tab displayed on the edge of the second display to slide open a private window on the second display that optionally includes a virtual notepad. In some embodiments, transitioning from not displaying to private space to displaying the private space comprises displaying an animation of the private space being dragged from an edge of the second display onto the second display.

The above-described method of providing a dragging input for displaying the private space allows the first electronic device to provide a mechanism for quickly using part of the second display to display content not shared with the user of the second electronic device, which makes the user-device interface more efficient (e.g., by helping the user to interact with the device using fewer inputs provided to the device), which, additionally, reduces power usage and improves battery life of the device by enabling the user to use the device more quickly and efficiently.

In some embodiments, such as in FIG. 10U the private space 1032-1034 overlaps at least a portion of the respective content 1024*a* (1174). In some embodiments, when the user opens the private space, it is displayed at least partially overlaid on the shared space in which the shared content is displayed. In some embodiments, the private space is somewhat translucent so as to not completely obscure the shared space and/or the shared content. The private space optionally includes one or more unshared documents. In response to detecting a contact that drags one of the unshared documents to the shared space, the electronic device shares the dragged document and displays it in the shared space. The dragged document optionally replaces the previously-shared document or is added to the previously-shared document or is concurrently displayed with the previously-shared document. In some embodiment, the private space includes a notes user interface that presents private notes. The electronic device optionally accepts user input to type character into the notes user interface.

The above-described method of displaying the private space over the shared space allows the first electronic device to use the second display to display the private space without resizing or moving the shared content and/or allows the shared content to be displayed in a larger area on the second display at all times, thereby reducing the operations performed to complete the action requested by the user, which makes operation of the device more efficient, thereby reducing power usage and improving battery life of the device by enabling the user to use the device more quickly and efficiently.

In some embodiments, such as in FIG. 10S, while displaying the video conference user interface 1006-2 on the first display 504-3, the first electronic device 500-2 concurrently displays (1176), on the second display 504-4, the respective content 1024*a*, and a toolbar 1026*a* associated with the respective content (e.g., in some embodiments, the toolbar is displayed adjacent to (e.g., along a top edge of) the respective content), the toolbar including one or more of an affordance associated with a command for editing the respective content (e.g., pen color for markups, copy, paste, etc.), an affordance displaying information associated with the respective content (e.g., metadata such as a date the respective content was created, an individual who created the respective content, file size, etc.), and an affordance associated with a video conference command for the video conference user interface (e.g., mute the video conference, initiate a video conference with/call a new person, end the video conference/call, etc.).

The above-described method of displaying a toolbar that includes content editing commands, content information, and video conference commands together allows the first electronic device to display related information together in a way that is easy for the user to understand, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10V, while displaying, on the second display 504-4, the toolbar 1026*a* and the respective content 1024*a*, the first electronic device 500-2 receives (1178) an input, such as contact 1003 (e.g., by way of a touch sensitive display, such as selection of a button displayed on the second display) for operating the first electronic device in a focused mode. In some embodiments, the focused mode mutes notifications and hides one or more items displayed on the first electronic device. In some embodiments, in response to the input, such as selection of button 1030*c* with contact 1003, for operating the first electronic device in the focused mode, the first electronic device ceases (1180) the display of the toolbar 1026*a* on the second display 504-4 while continuing to display the respective content 1024*a* on the second display, such as in FIG. 10W. In some embodiments, the electronic device ceases the display of some or all other content displayed on the second display that is not the respective content (e.g., a private space, the toolbar, the video conferencing user interface, etc.), and only displays the respective content on the second display.

The above-described method of ceasing the display of the toolbar while continuing to display the respective content allows the respective content to be displayed on a larger share of the second display, thereby presenting more information to the user which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10X, while displaying the video conference user 1006-2 interface on the first display 504-3 and the respective content 1024*a* on the second display 504-4 while a relative angle between the first display 504-3 and the second display 50404 is bent (e.g., the bottom display rests on a supporting surface and the top display is supported by the hinge joining the two displays), the first electronic device 500-2 detects (1182) a flattening of the relative angle (e.g., defined by a hinge joining the first display and the second display) between the first display 504-3 and the second display 504-4.

In some embodiments, such as in FIG. 10X, in response to the flattening of the relative angle between the first display 504-3 and the second display 504-4 (1184): the first electronic device 500-2 ceases (1186) the display of the video conference user interface 1006-2 on the first display 504-3. In some embodiments, the connection between the first electronic device and the second electronic device persists and transmits audio between the two electronic devices, but video transmission between the devices and/or display at the first electronic device and/or second electronic device no longer occurs (e.g., the video conference becomes an audio call).

In some embodiments, such as in FIG. 10X, the first electronic device 500-2 displays (1188) the respective content 1024*a* on both the first display 504-3 and the second display 504-4 (e.g., expanding the respective content to occupy space on both the first display and the second display). In some embodiments, the respective content fills both the first display and the second display and the display of other user interface elements is ceased. In some embodiments, a toolbar associated with the respective content and/or the video conference continues to be displayed either on the first display or the second display when the device is flattened. In some embodiments, the respective content continues to be displayed on the second display, but the first display becomes available to contain/display other shared content that is shared between the first electronic device and the second electronic device (e.g., flattening the first electronic device causes both displays to become shared spaces, whereas before the flattening, only the second display was a shared space).

The above-described method of updating the user interface in response to changing the orientation of the electronic device allows the electronic device to use both displays to present the respective content or a shared space in response to a simple input, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10V, prior to detecting the flattening of the relative angle between the first display 504-3 and the second display 504-4, the first electronic device 500-2 concurrently displays (1190), on the second display 504-4, the respective content 1024*a* and a toolbar 1026*a* associated with the respective content (e.g., in some embodiments, the toolbar is displayed adjacent to (e.g., along a top edge of) the respective content, along a top edge of the bottom display). The toolbar optionally includes one or more icons, each associated with a command for editing the respective content (e.g., pen color for markups, copy, paste, etc.), information associated with the respective content (e.g., metadata such as a date the respective content was created, an individual who created the respective content, file size, etc.), and one or more icons associated with a video conference command for the video conference user interface (e.g., mute, call new person, end call, etc.), wherein the toolbar is displayed at a first edge (e.g., a top edge) of the second display that is between the first display and a second edge of the second display (e.g., a bottom edge, parallel to the first edge (e.g., top edge) of the second display). For example, the toolbar is optionally displayed at the top edge of the bottom display, closest and/or adjacent to the bottom edge of the top display.

In some embodiments, such as in FIG. 10X, in response to the flattening of the relative angle between the first display 504-3 and the second display 504-4, the first electronic device 5002 moves (1192) the toolbar 1026*a* to an edge of the second display other than the first edge of the second display. Although FIG. 10X illustrates the toolbar 1026*a* being displayed at the top edge of the first display 504-3, it should be understood that in some embodiments, the toolbar 1026*a* is displayed at a different edge of the first display 504-3, such as a side edge, or at a side edge or the bottom edge of the second display 504-4. In some embodiments, the toolbar moves to an edge of one of the two displays such that it is not located along the hinge joining the first display and the second display. The new location of the toolbar is one of the top edge of the top display, the bottom edge of the bottom display, or a side edge of either display.

The above-described method of moving the toolbar to the edge of one of the displays allows the first electronic device to present the respective content on both displays in a way that is uninterrupted by other displayed content, such as the toolbar, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, prior to receiving the request to share the respective content with the user of the second electronic device, the first electronic device displays (1194) the respective content on the first display (e.g., a top display). In some embodiments, in response to receiving the request to share the respective content, the first electronic device displays (1196) the respective content on the second display (e.g., the bottom display instead of the top display). In some embodiments, the first electronic device moves the respective content from the top display to the bottom display in response to the request to share the respective content with the user of the second electronic device.

In some embodiments, such as in FIG. 10CC, while displaying the video conference user interface 1006-2 on the first display 504-3 and the respective content **1024*a* on the second display 504-4, the first electronic device 500-2 receives (1198) a request to end the video conference, such as selection of the "end" option 1030*d* with contact 1003 in FIG. 10CC (e.g., receiving a touch input selecting a user interface element for disconnecting the first device and the second device to end the video conference). In some embodiments, in response to receiving the request to end the video conference, the first electronic device displays (1198-2**) the respective content on the first display (e.g., the top display instead of the bottom display). Thus, in some embodiments, when the user provides an input to the first electronic device to end the video conference, the first electronic device automatically, without further user input, moves the respective content from the bottom display back to the top display where it was originally displayed (e.g., before the video conference). The top display is optionally configured in an upright position that is easier to view than the bottom display, which is optionally configured in a flat position on a surface supporting the first electronic device, thereby making it easier for the user of the first electronic device to view the respective content after the video conference is complete.

The above-described method of automatically moving the respective content from the second display to the first display after ending the video conference allows the first electronic device to display the respective content in a manner that is easier for the user to view, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10Z, while displaying the video conference user interface 1006-1 on the first display 504-3 and the respective content **1024*a* on the second display 504-4, the first electronic device 500-2 receives (1198-4) one or more first interactions, such as movement of contact 1003 illustrated in FIG. 10Z, with the shared content 1024*a* from the user of the first electronic device 500-2 and one or more second interactions such as movement of contact 1003 illustrated in FIG. 10BB, with the shared content 1024*b* from the user of the second electronic device 500-1**.

In some embodiments, such as in FIG. 10BB, the first electronic device 500-2 displays (1198-6), on the second display 504-4, one or more indications **1038*a* and 1038*b* of the one or more first interactions and one or more indications of the one or more second interactions concurrently with the respective content 1024*a***. In some embodiments, the user of the first electronic device creates annotations (e.g., text edits to a shared text document, markups on the shared document, etc.) on the respective content while the respective content is shared with the user of the second device, and the user of the second electronic device creates annotations on the respective content as well. These annotations created by the user of the first electronic device and the user of the second electronic device are optionally displayed on representations of the shared content displayed on the first and second electronic devices.

In some embodiments, such as in FIG. 10EE, displaying the respective content **1024*a* on the first display 504-3 in response to receiving the request to end the video conference, such as selection of the "end" option 1030*d* with contact 1003 illustrated in FIG. 10CC, comprises displaying the respective content 1024 on the first display 504-3 concurrently with the one or more indications 1038*a* and 1038*d* of the first interactions and the one or more indications of the second interactions (1198-8), such as in FIG. 10**EE. In some embodiments, annotations made to the shared content by both the user of the first electronic device and the user of the second electronic device continue to be displayed on the shared content after the video conference call has ended.

The above-described method of continuing to display the annotations after the video conference is over allows the user of the first electronic device to continue to view the annotations made during the video conference, which makes the user-device interface more efficient (e.g., by maintaining the annotations made during the video conference and thus not requiring the user of the electronic device to make those annotations again), which, additionally, reduces power usage and improves battery life of the device by enabling the user to use the device more quickly and efficiently.

In some embodiments, such as in FIG. 10Z, while displaying the video conference user interface 1006-2 on the first display 504-3 and the respective content **1024*a* on the second display 504-4, the first electronic 500-2 device receives (1198-10) one or more first interactions such as movement of contact 1003 with the shared content 1024*a* from the user of the first electronic device 500 and one or more second interactions such as movement of contact 1003 illustrated in FIG. 10B with the shared content 1024*b* from the user of the second electronic device 500-2. In some embodiments, the first electronic device 500-2 displays (1198-12), on the second display 504-4, one or more indications 1038*a* of the one or more first interactions and one or more indications 1038*d*** of the one or more second interactions concurrently with the respective content. In some embodiments, the user of the first electronic device creates annotations (e.g., text edits to a shared text document, markups on the shared document, etc.) on the respective content while the respective content is shared with the user of the second device, and the user of the second electronic device creates annotations on the respective content as well. These annotations created by the user of the first electronic device and the user of the second electronic device are optionally displayed on representations of the shared content displayed on the first and second electronic devices.

In some embodiments, such as in FIG. 10FF displaying the respective content 1024 on the first display 504-3 in response to receiving the request to end the video conference such as selection of option **1030*d* with contact 1003 in FIG. 10CC, comprises displaying the respective content 1023 on the first display 504-3 concurrently with the one or more indications 1038*a* of the first interactions, without displaying the one or more indications of the second interactions (1198-14), such as in FIG. 10**FF. In some embodiments, after the video conference is ended, the first electronic device continues to display annotations made by the user of the first electronic device without displaying annotations made by the user of the second electronic device.

The above-described method of continuing to display annotations made by the user of the first electronic device allows the user of the first electronic device to continue to view the annotations they made without the annotations made by the user of the second electronic device being displayed and cluttering the view of the respective document, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 10Z while displaying the video conference user interface 1006-2 on the first display 504-3 and the respective content 1023*a* on the second display 504-4, the first electronic device 500-2 receives (1198-16) one or more first interactions such as movement of contact 1003 illustrated in FIG. 10Z with the shared content from the user of the first electronic device 500-2 and one or more second interactions such as movement of contact 1003 illustrated in FIG. 10BB with the shared content 1024*b* from the user of the second electronic device 500-1. In some embodiments, the first electronic device 500-2 displays (1198-18), on the second display 504-4, one or more indications 1038*a* of the one or more first interactions and one or more indications 1038*d* of the one or more second interactions concurrently with the respective content. In some embodiments, the user of the first electronic device creates annotations (e.g., text edits to a shared text document, markups on the shared document, etc.) on the respective content while the respective content is shared with the user of the second device, and the user of the second electronic device creates annotations on the respective content as well. These annotations created by the user of the first electronic device and the user of the second electronic device are optionally displayed on representations of the shared content displayed on the first and second electronic devices.

In some embodiments, such as in FIG. 10GG, displaying the respective content 1024 on the first display 504-3 in response to receiving the request to end the video conference such as selection of option 1030*d* with contact 1003 illustrated in FIG. 10CC comprises displaying the respective content 1024 on the first display 504-3 without displaying the one or more indications of the first interactions and without displaying the one or more indications of the second interactions (1198-20), such as in FIG. 10GG. In some embodiments, annotations made by both users cease to be displayed after the video conference ends.

The above-described method of ceasing to display the annotations after the video conference has ended allows the user of the first electronic device to view the respective content without displaying the annotations made during the video conference, thereby reducing visual clutter at the first electronic device, which makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 10CC and 10DD, in response to receiving the request to end the video conference such as selection of option 1030*d* with contact 1003 as illustrated in FIG. 10CC (e.g., before the video conference ends and after the request to end the video conference has been received, or after the video conference ends), the first electronic device 500-2 displays (1198-22) a prompt to save 1040*a* the respective content 1024 (e.g., a user interface element selectable to save the respective content). Saving the respective content optionally saves one or more annotations made by the user of the first electronic device and/or the user of the second electronic device on the respective content during the video conference.

The above-described method of displaying a prompt to save the respective content in response to the request to end the video conference gives the user an option to save (or not) the annotations made during the video conference, which makes the user-device interface more efficient (e.g., by not unnecessarily saving annotations that the user of the first electronic device may not want to be saved), which, additionally, reduces power usage and improves battery life of the device by enabling the user to use the device more quickly and efficiently.

It should be understood that the particular order in which the operations in FIGS. 11A-11N have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, 1700, 1900, and 2100) are also applicable in an analogous manner to method 1100 described above with respect to FIGS. 11A-11N. For example, the content, electronic devices, user interfaces, sharing, user interactions, etc., described above with reference to method 1100 optionally have one or more of the characteristics of the content, electronic devices, user interfaces, sharing, user interactions, etc. described herein with reference to other methods described herein (e.g., methods 700, 900, 1300, 1500, 1700, 1900, and 2100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 11A-11N are, optionally, implemented by components depicted in FIGS. 1A-1B. For example, receiving operations 1102, 1108, 1122, 1128, 1132, 1166, 1172, 1178, 1198, 1198-4, 1198-10, and 1198-16, initiating operations 1104 and 1150, displaying operations 1112, 1114, 1134, 1142, 1152, 1154, 1160, 1164, 1170, 1176, 1188, 1190, 1194, 1196, 1198-2, 1198-6, 1198-12, 1198-14, 1198-18, 1198-20, and 1198-22, and generating operations 1110, 1126, 1138, and 1146 are, optionally, implemented by event sorter 170, event recognizer 180, and event handler 190. Event monitor 171 in event sorter 170 detects a contact on touch screen 504-1, 504-2, 504-3, 504-4, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Public and Private Content-Display User Interfaces

Users interact with electronic devices in many different manners, including interacting with content (e.g., files, documents, images, etc.) that may be available (e.g., stored or otherwise available) on the electronic devices. For example, a user may have content on their device to display or share with others, and content on their devices to edit or keep private from others. The embodiments described below provide ways in which an electronic device facilitates the display or keeping private of content on multiple displays in accordance with some embodiments of the disclosure, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12A:
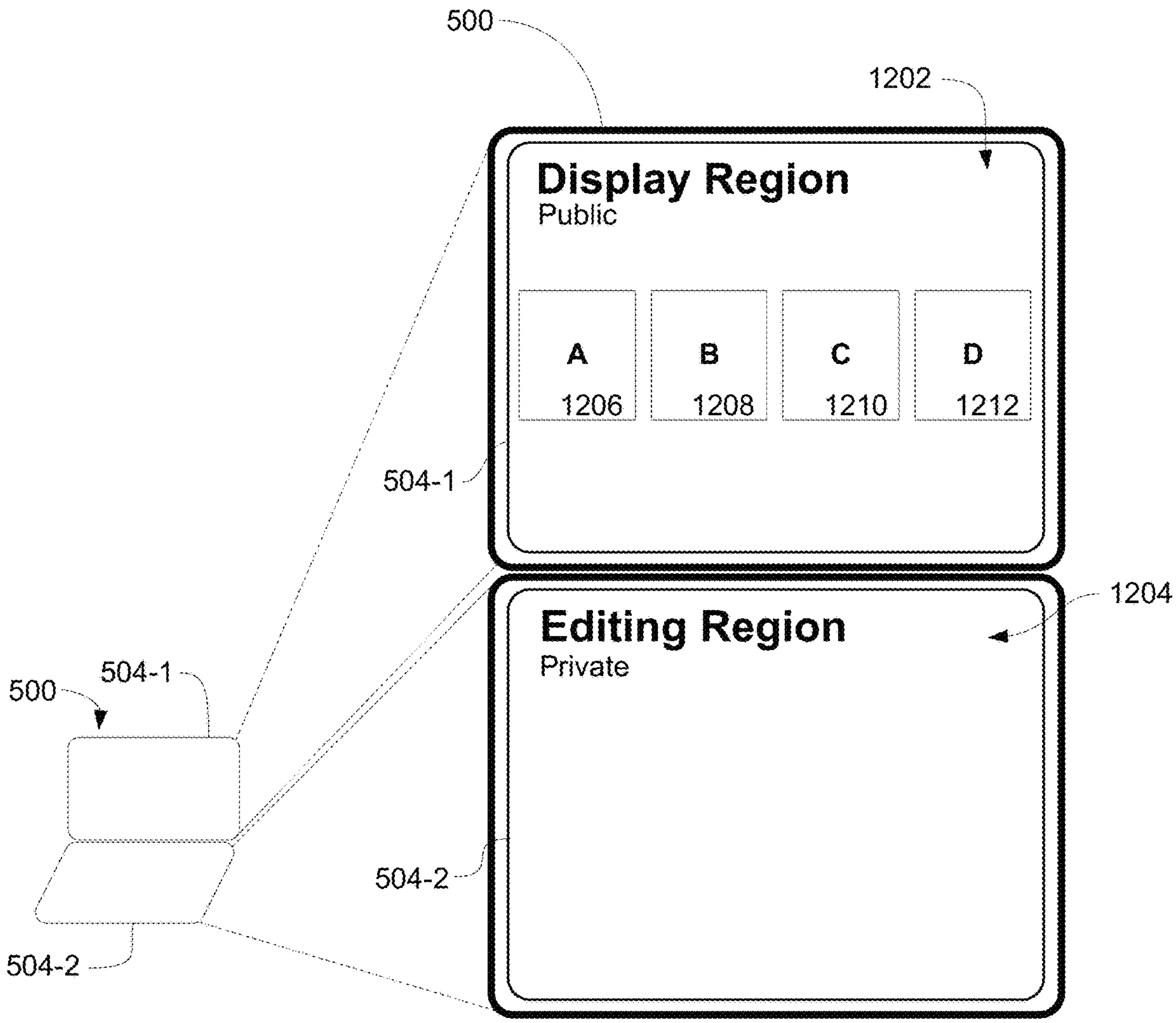
FIGS. 12A-12R illustrate exemplary ways in which an electronic device facilitates the display or keeping private of content on multiple displays in accordance with some embodiments of the disclosure.
Figure 12B:
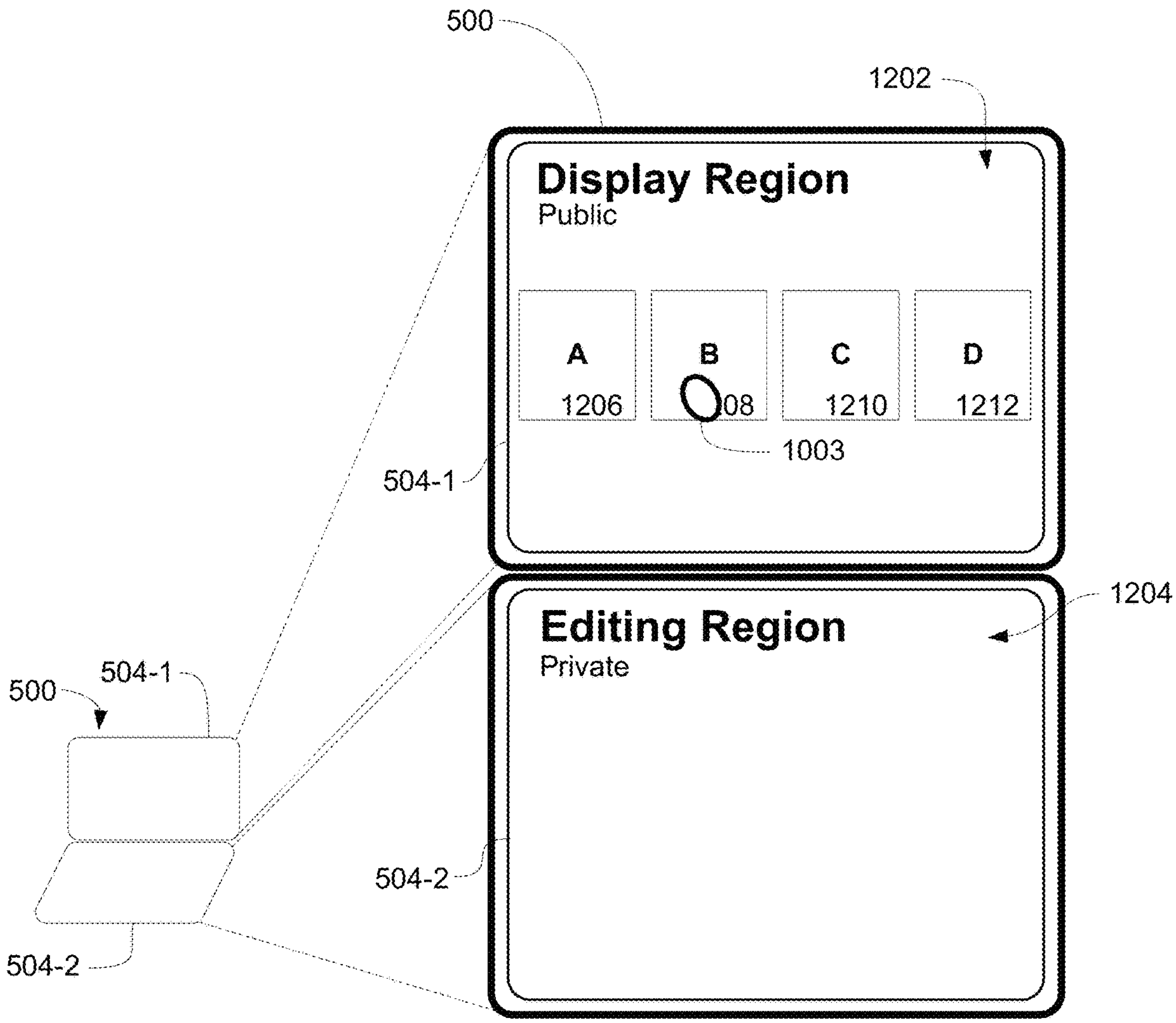
Figure 12C:
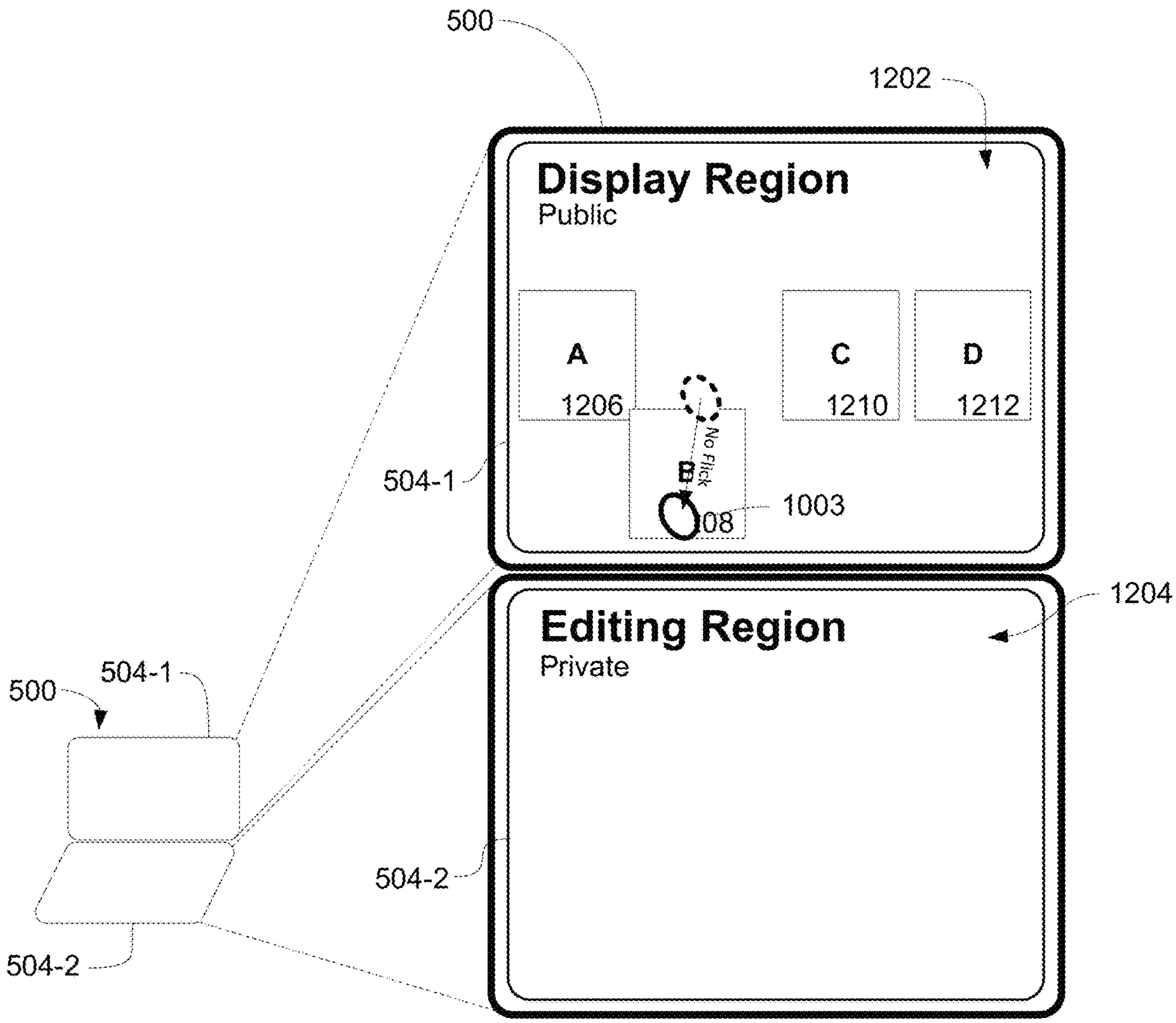
Figure 12D:
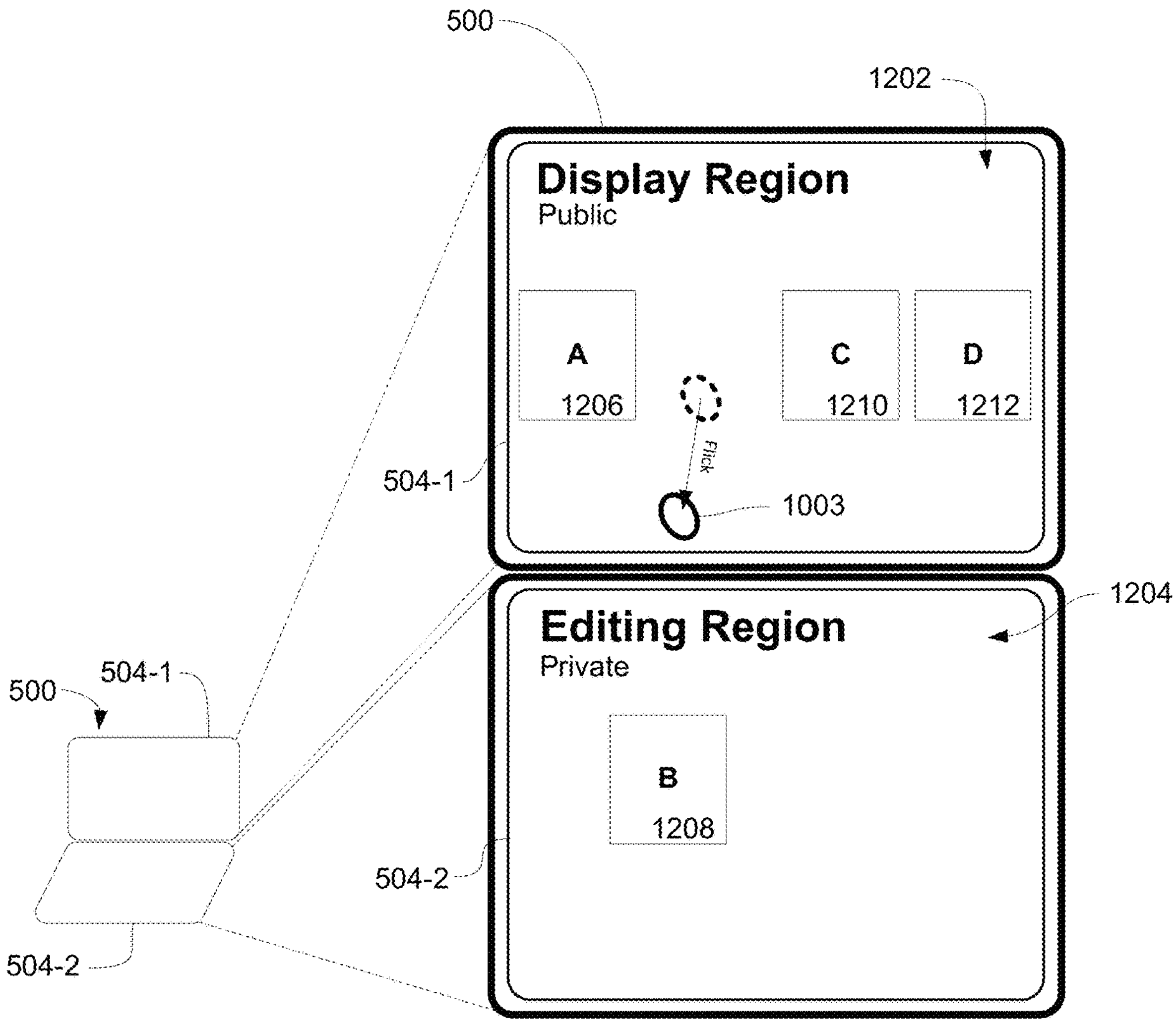
Figure 12E:
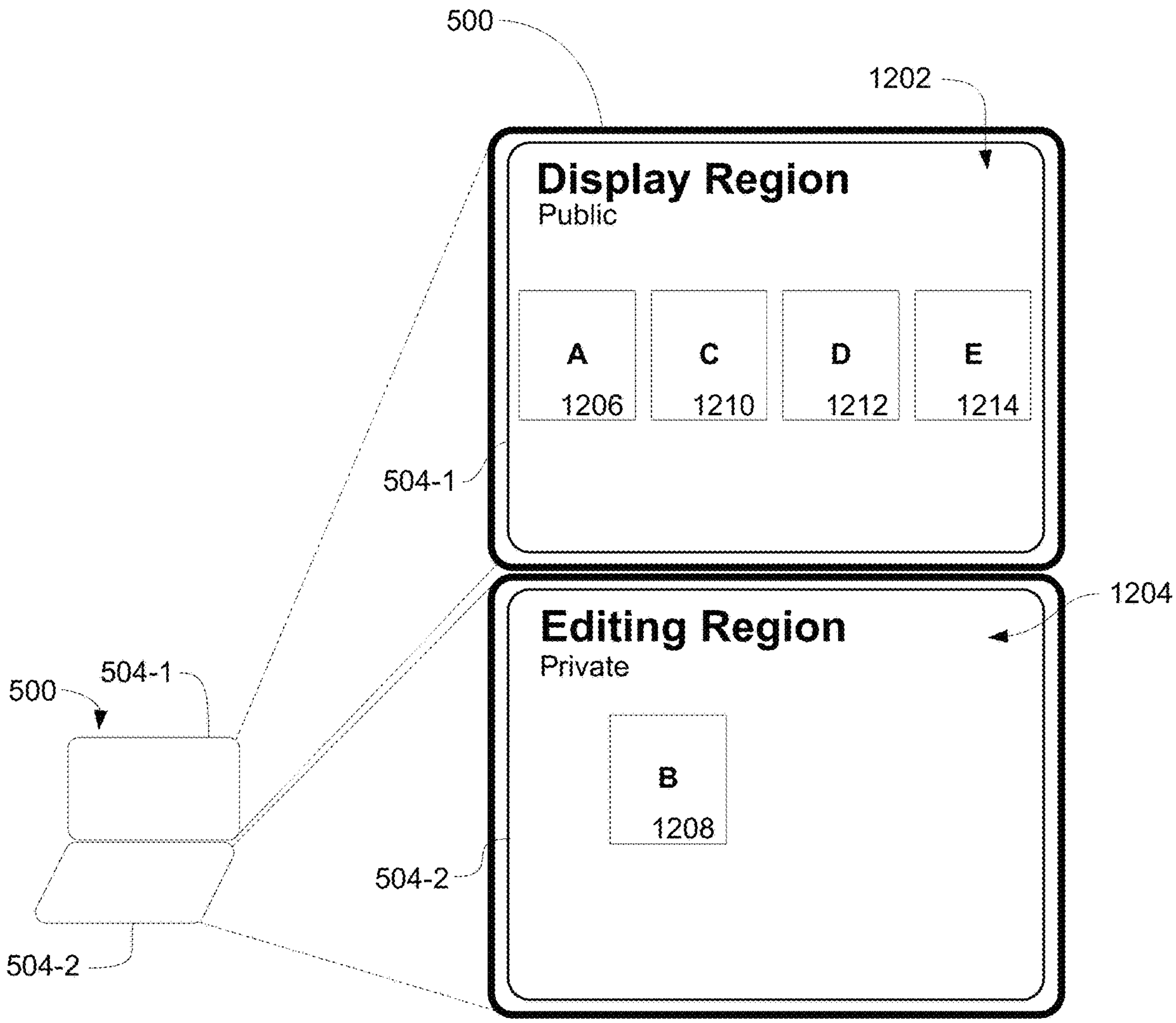
Figure 12F:
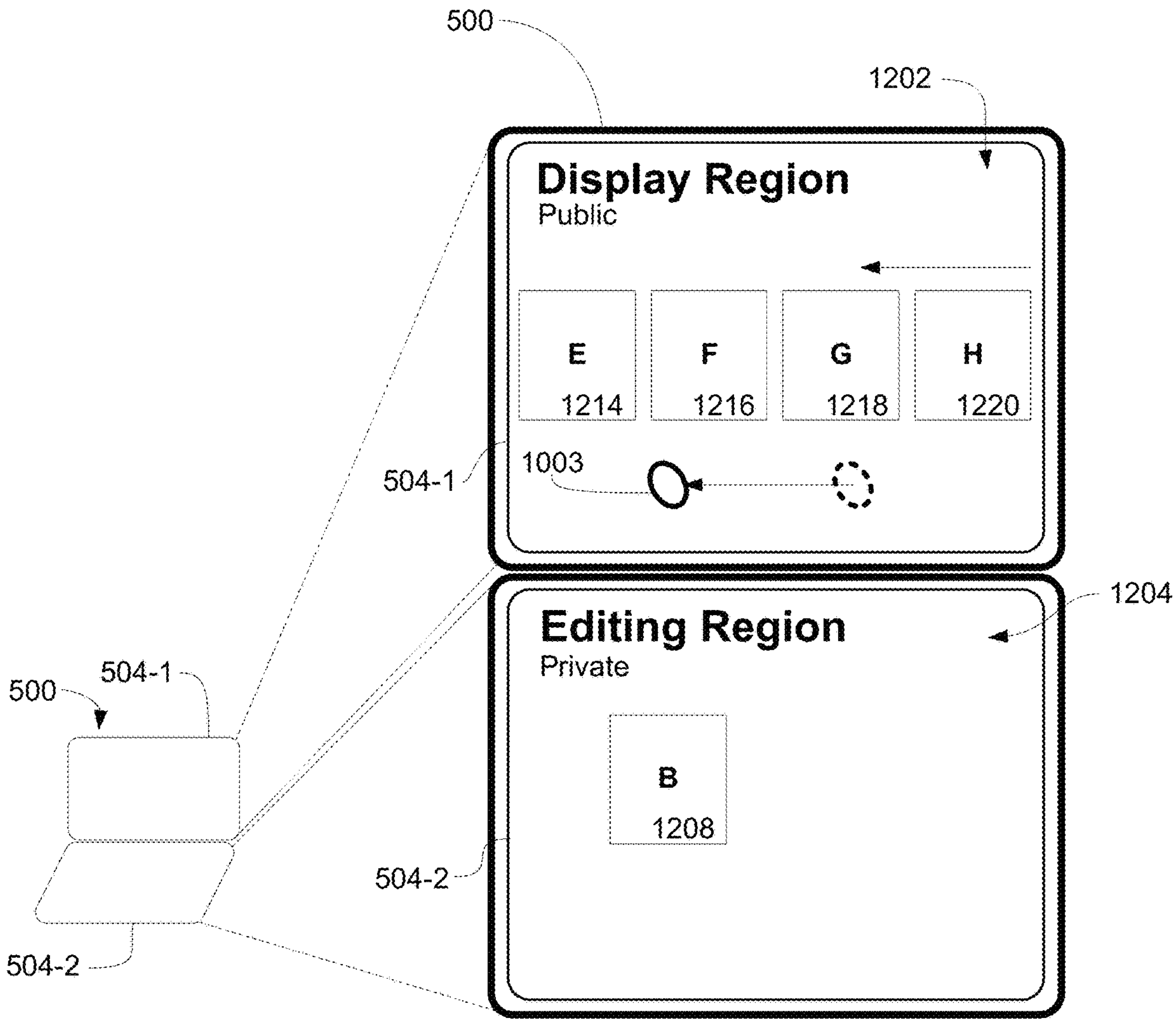
Figure 12G:
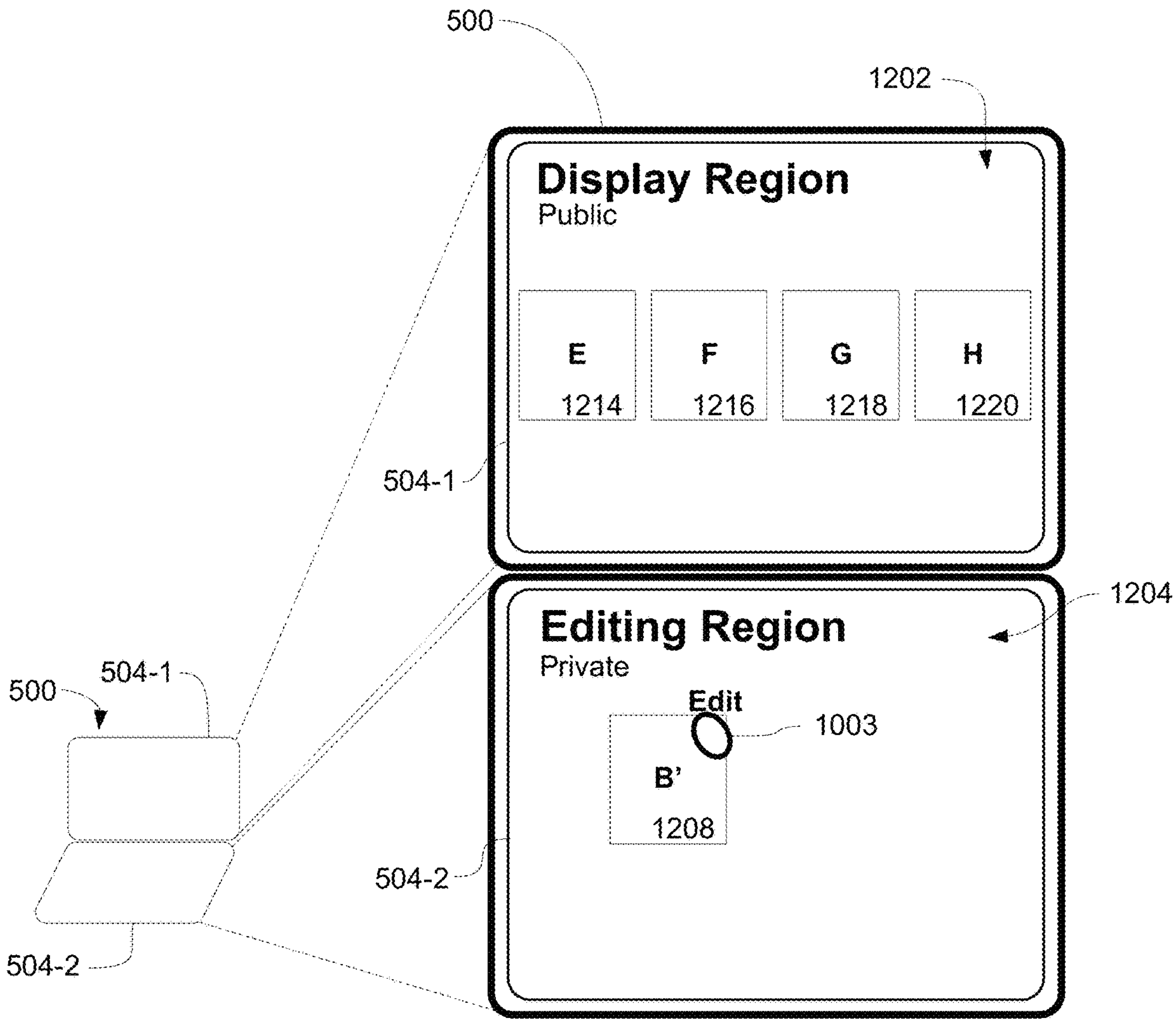
Figure 12H:
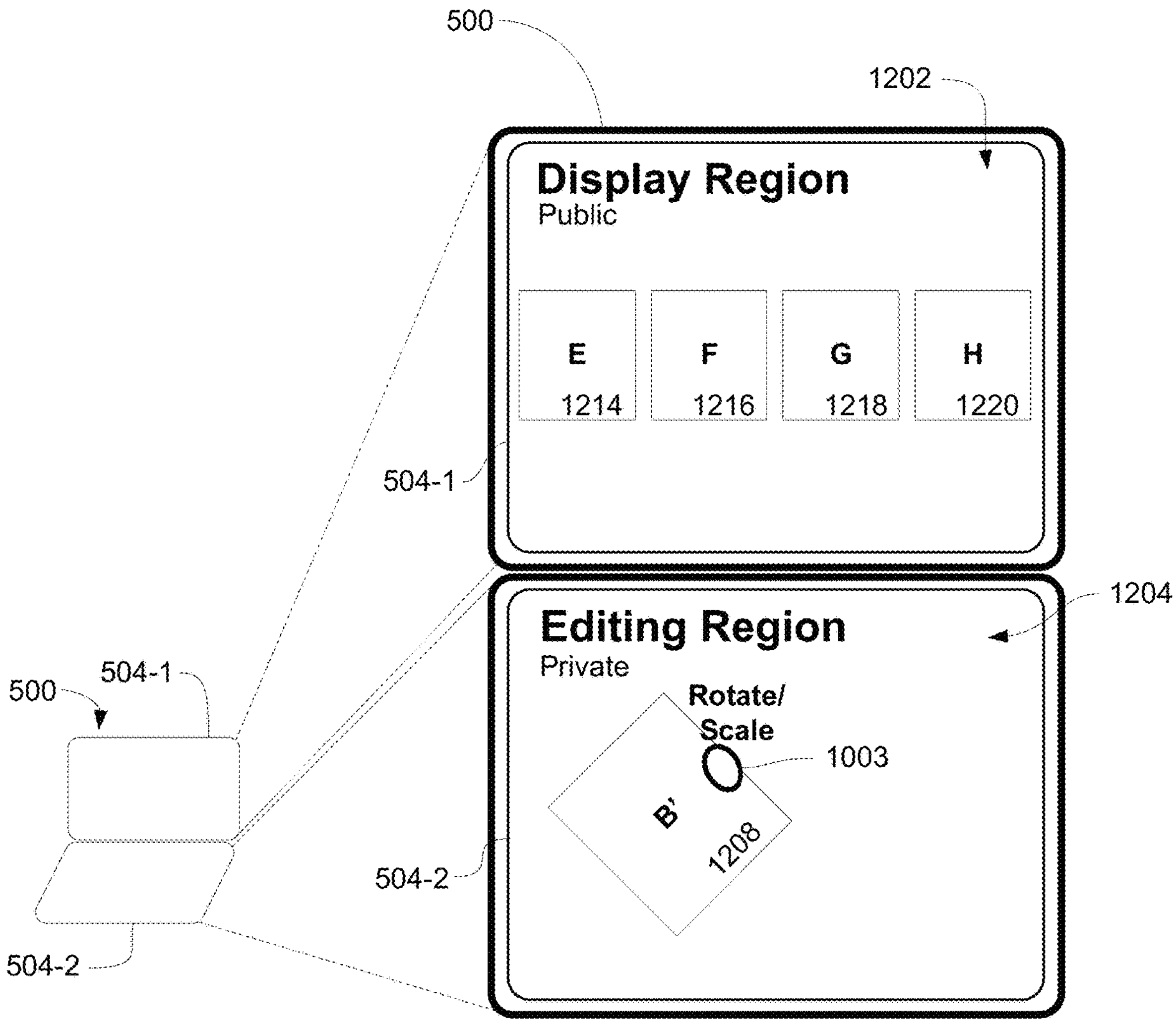
Figure 12I:
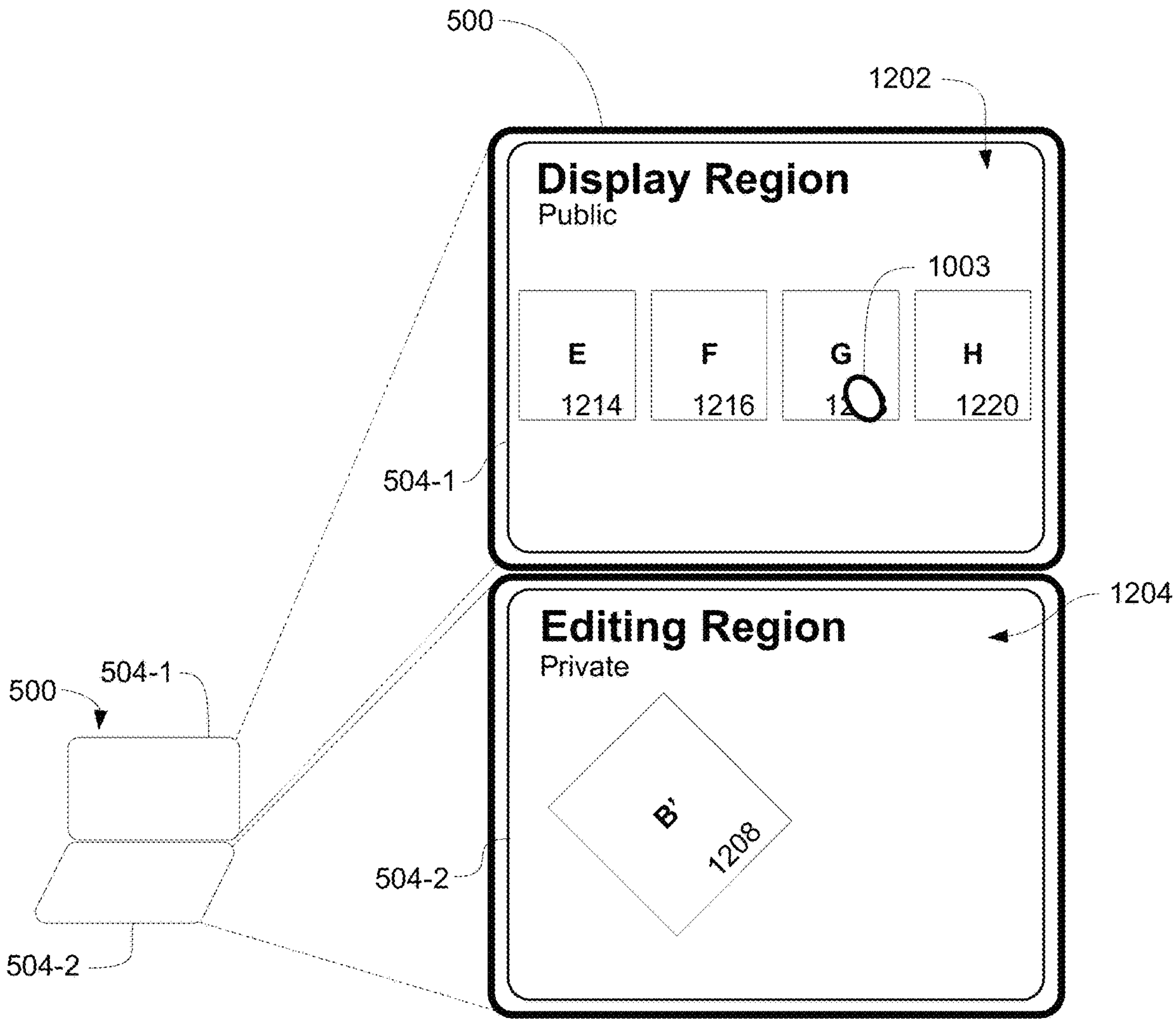
Figure 12J:
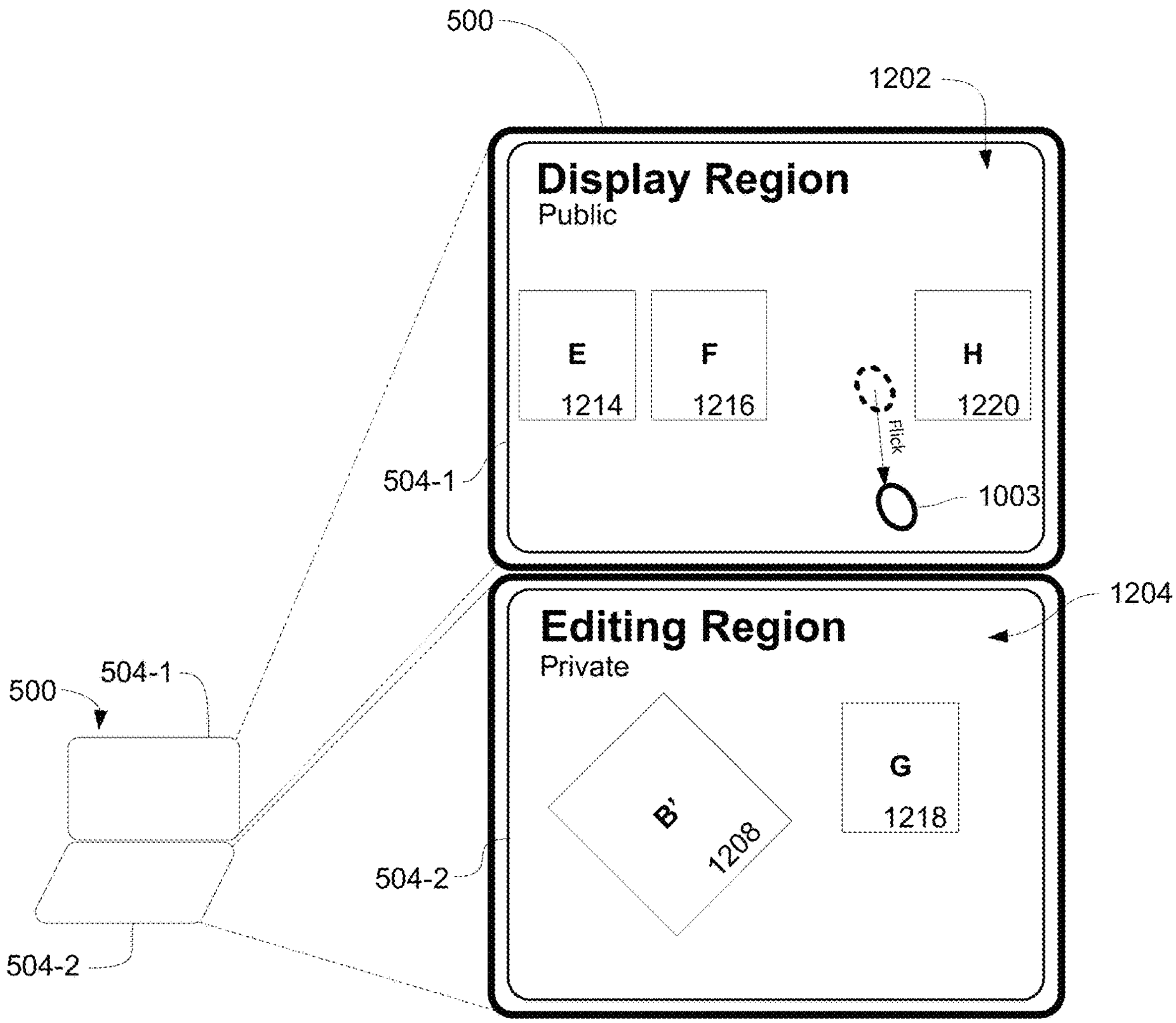
Figure 12K:
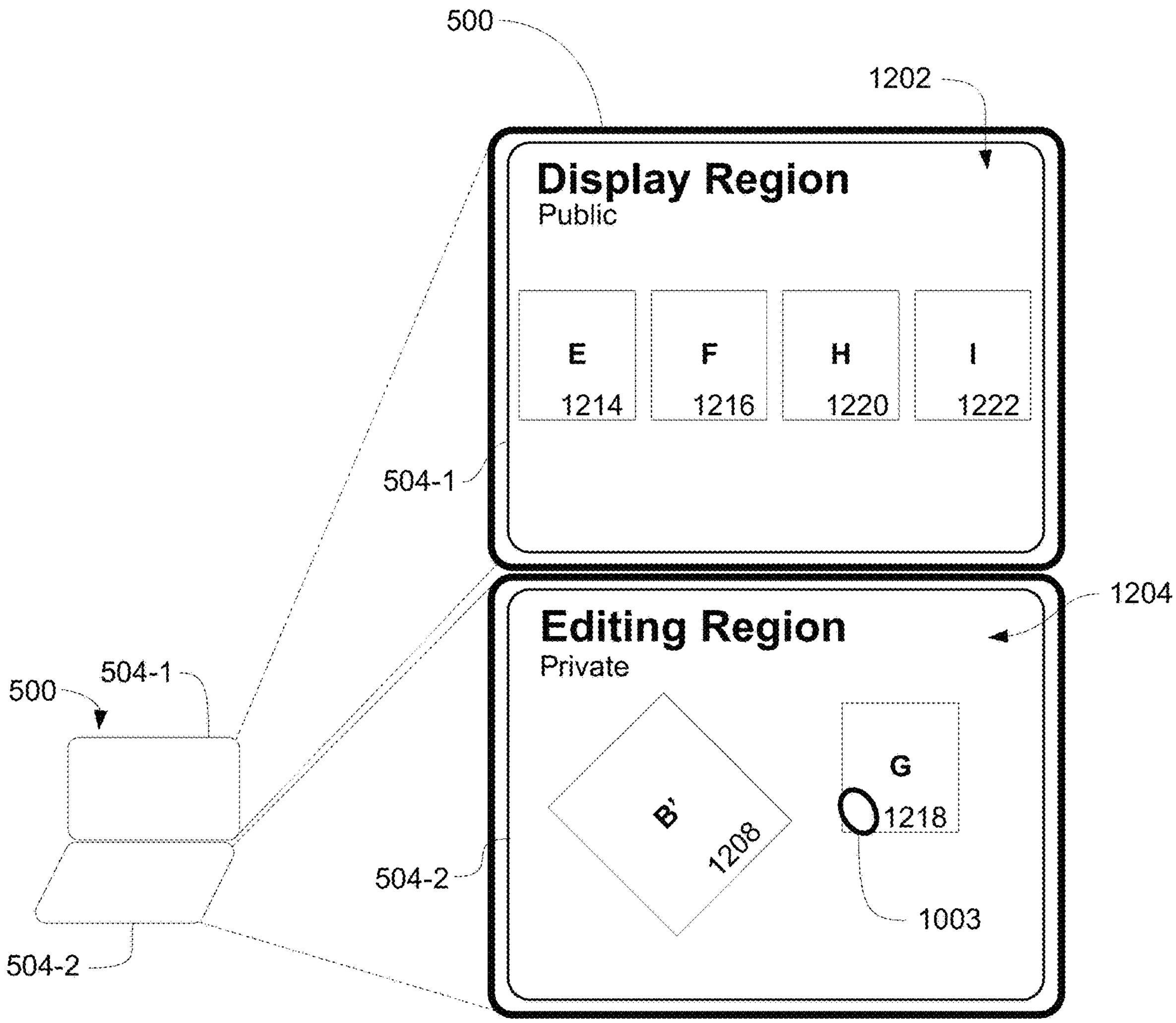
Figure 12L:
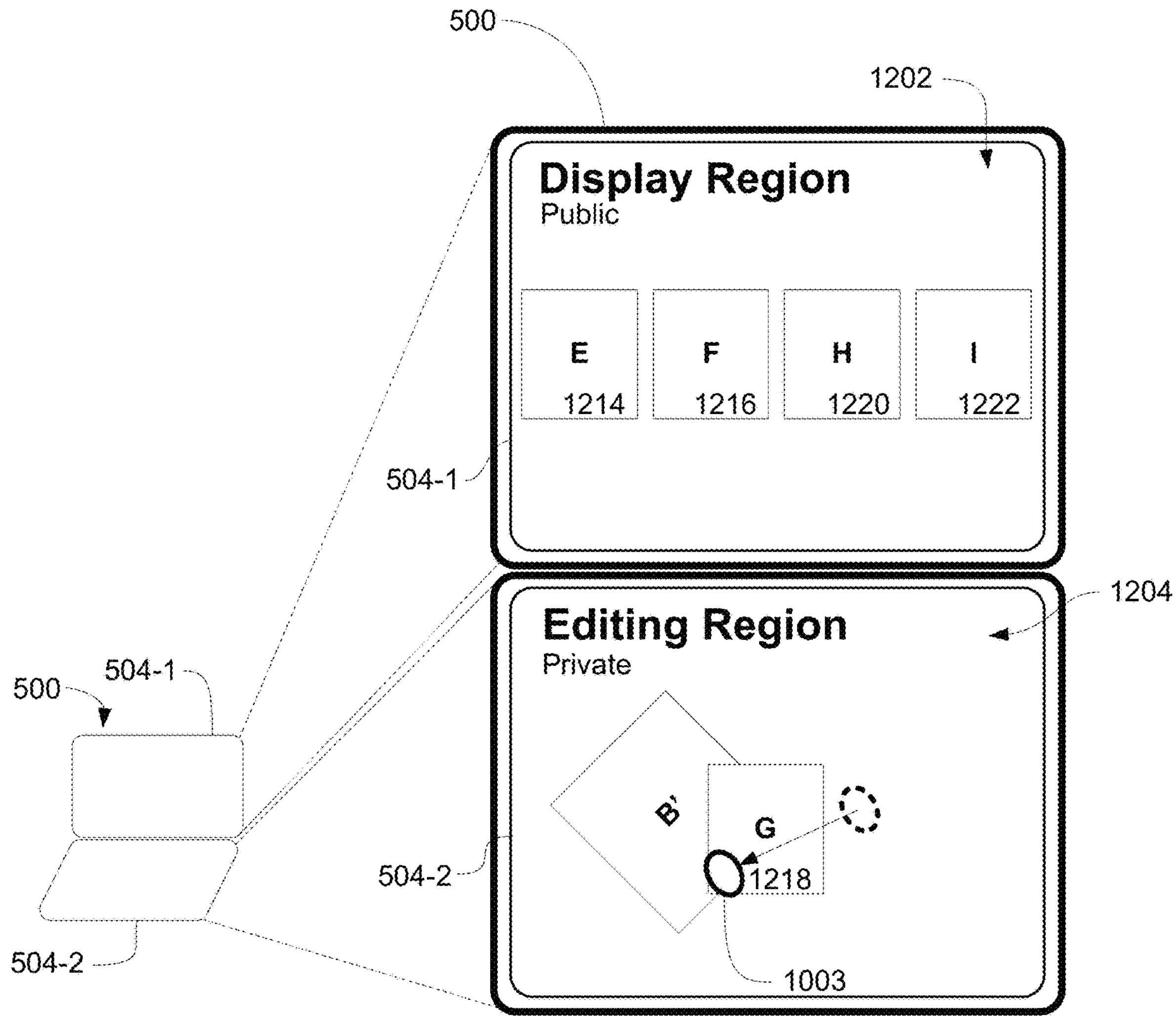
Figure 12M:
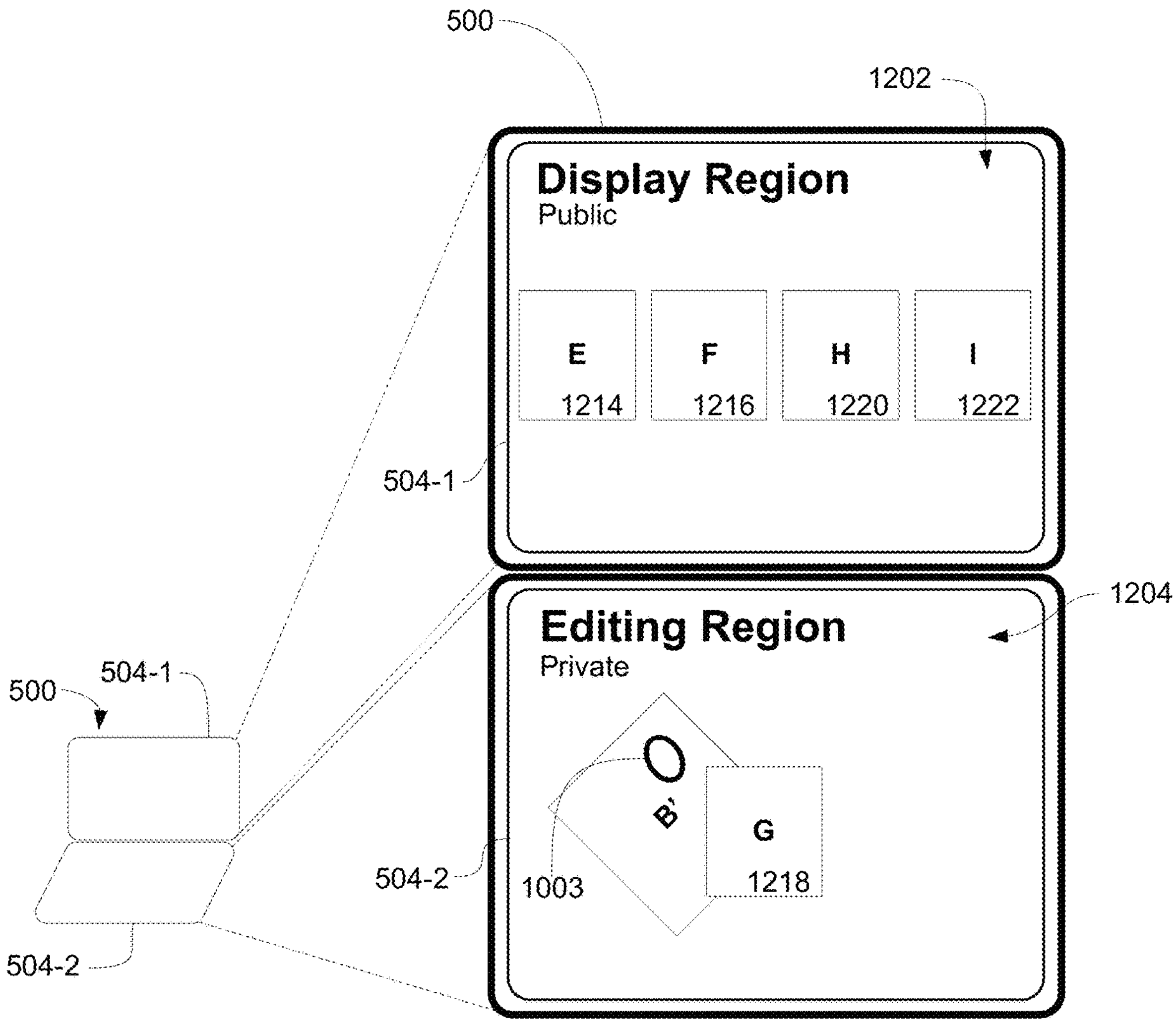
Figure 12N:
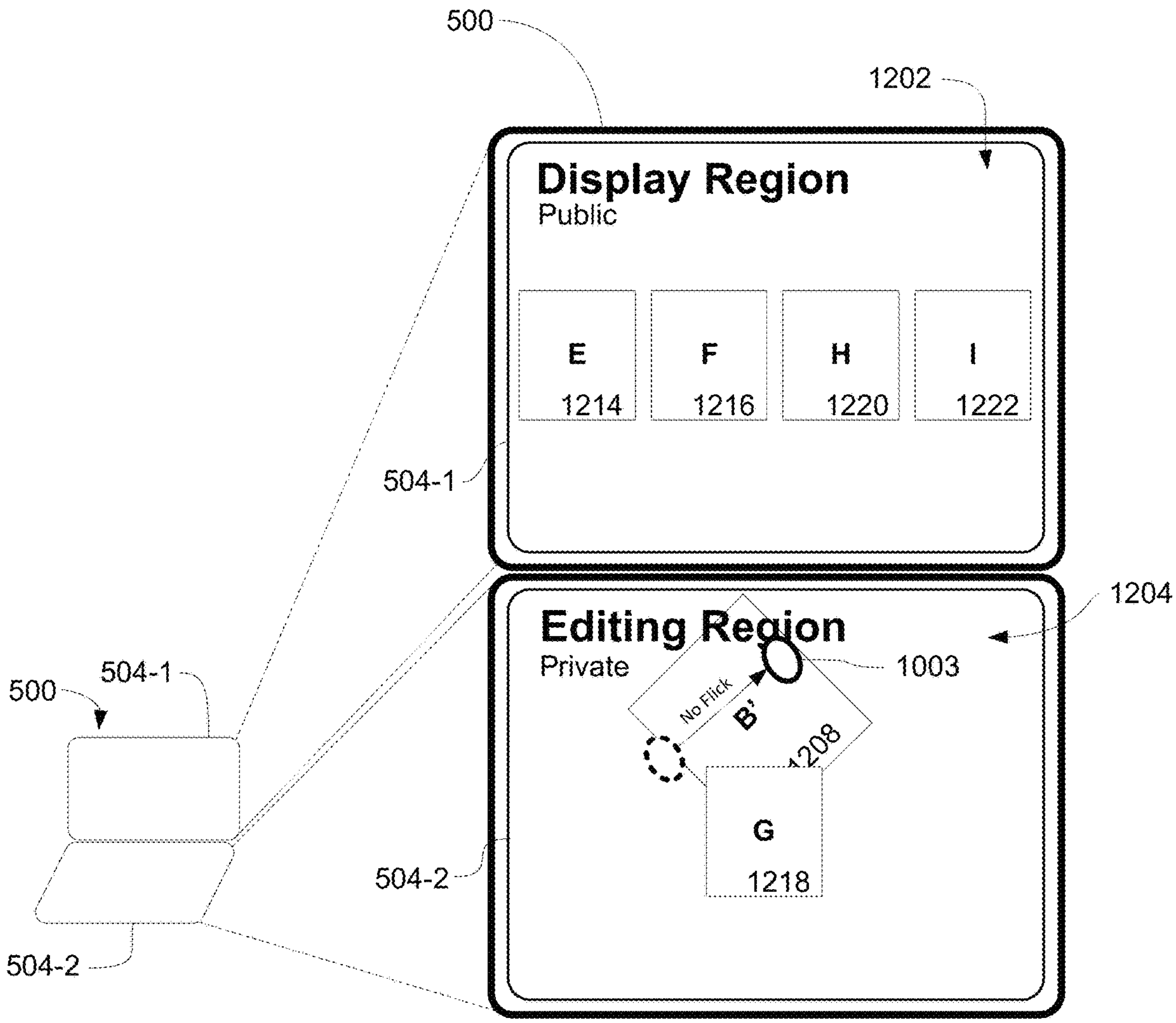
Figure 12O:
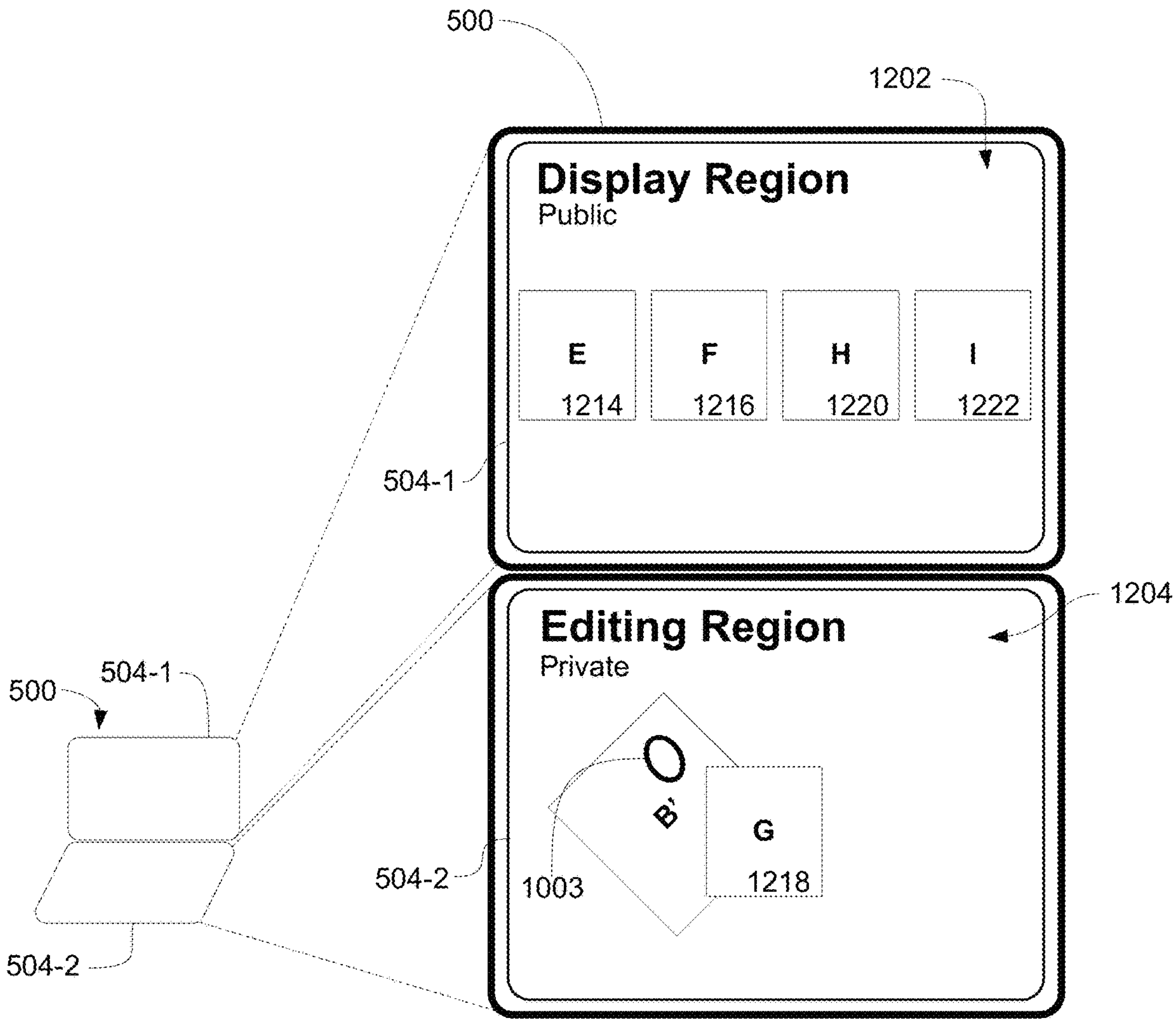
Figure 12P:
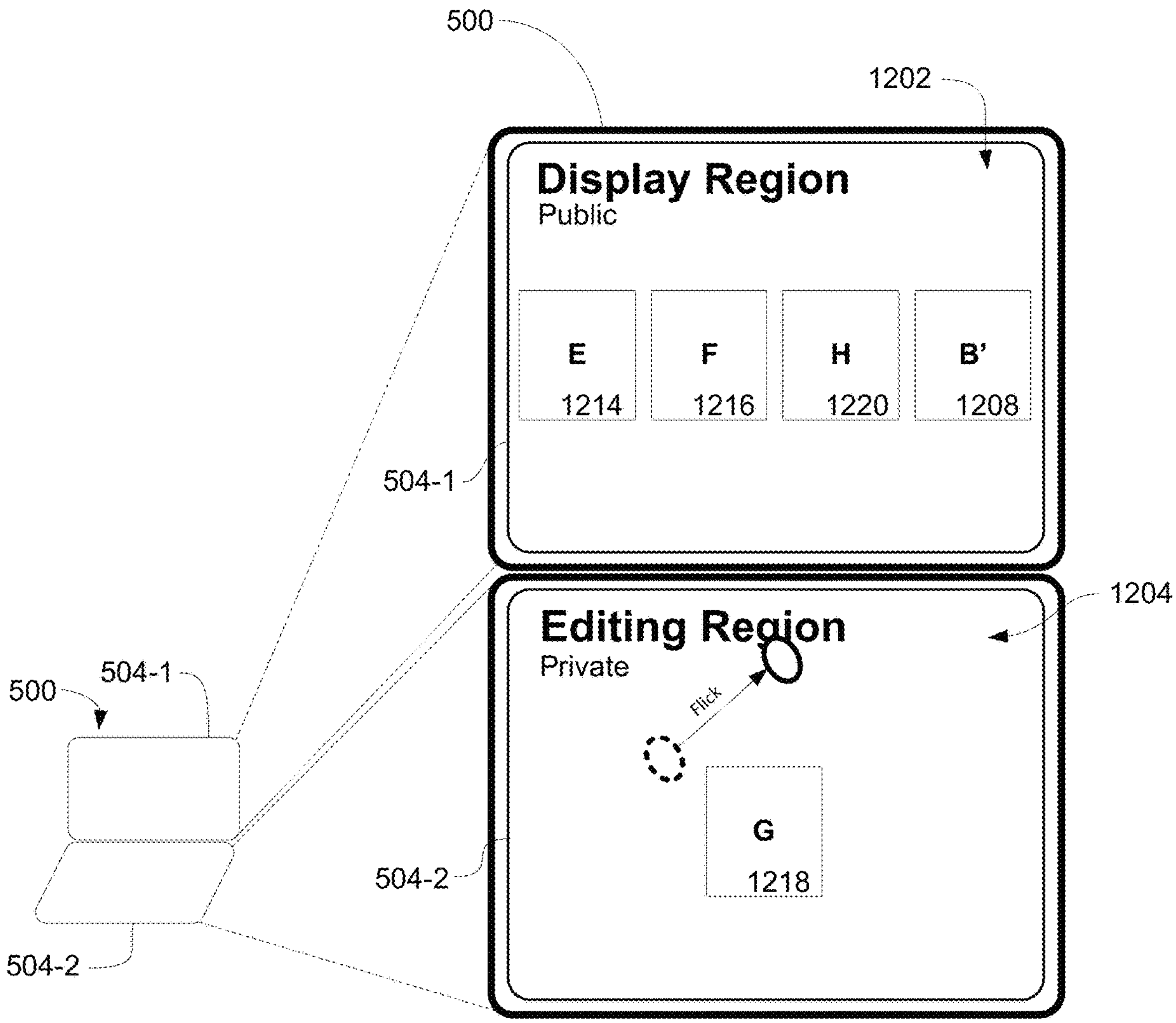
Figure 12Q:
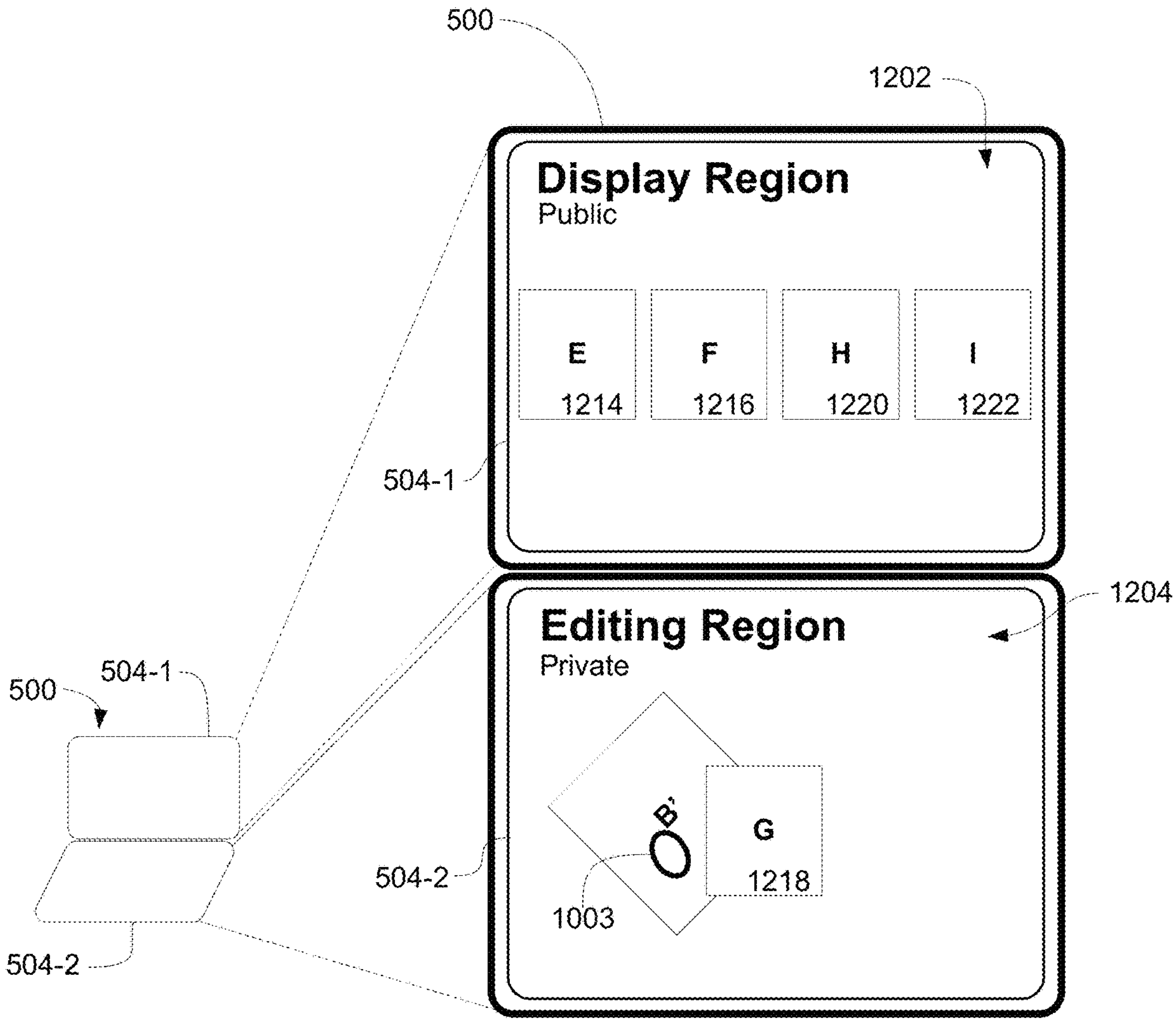
Figure 12R:
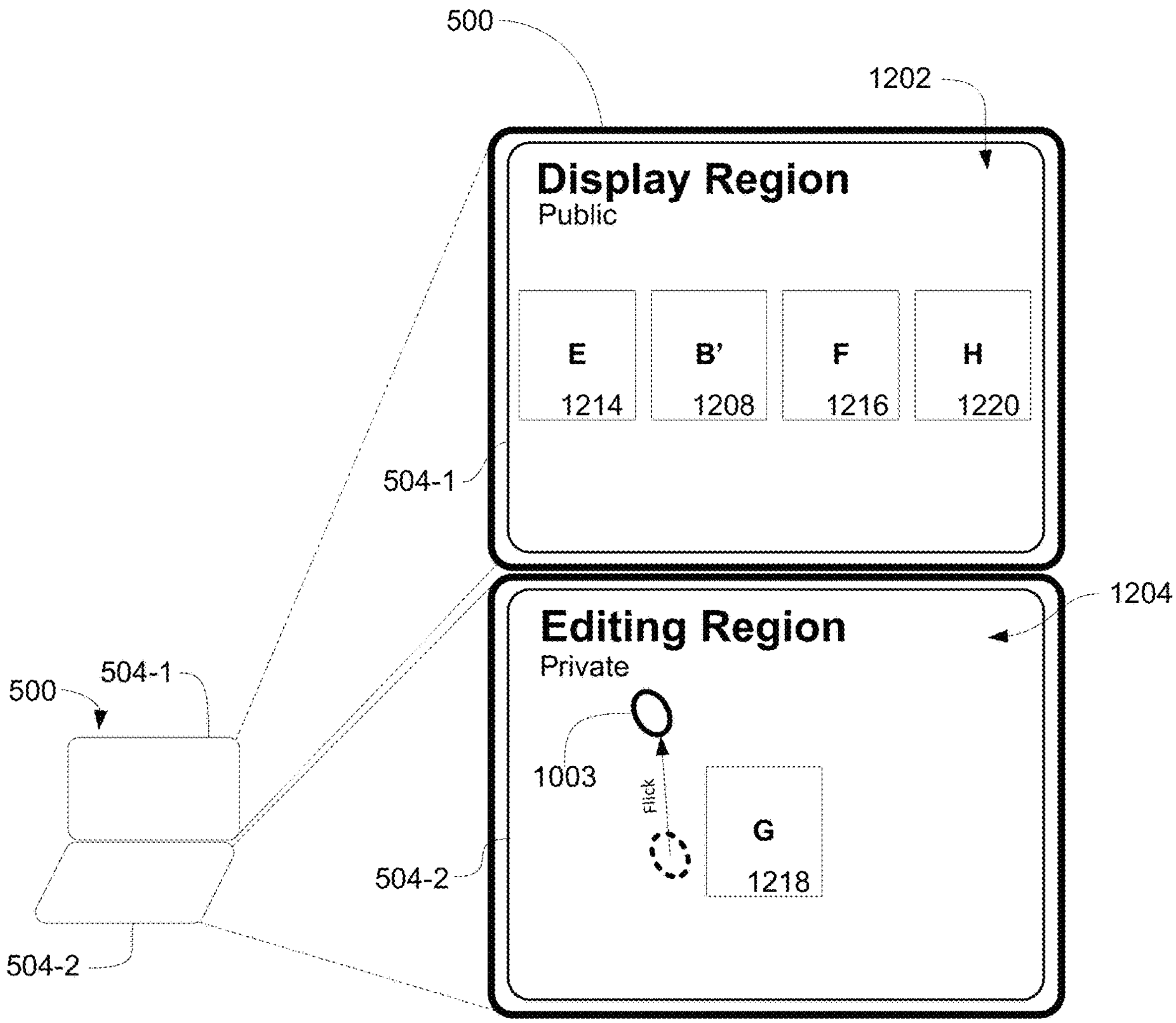
Figure 13A:
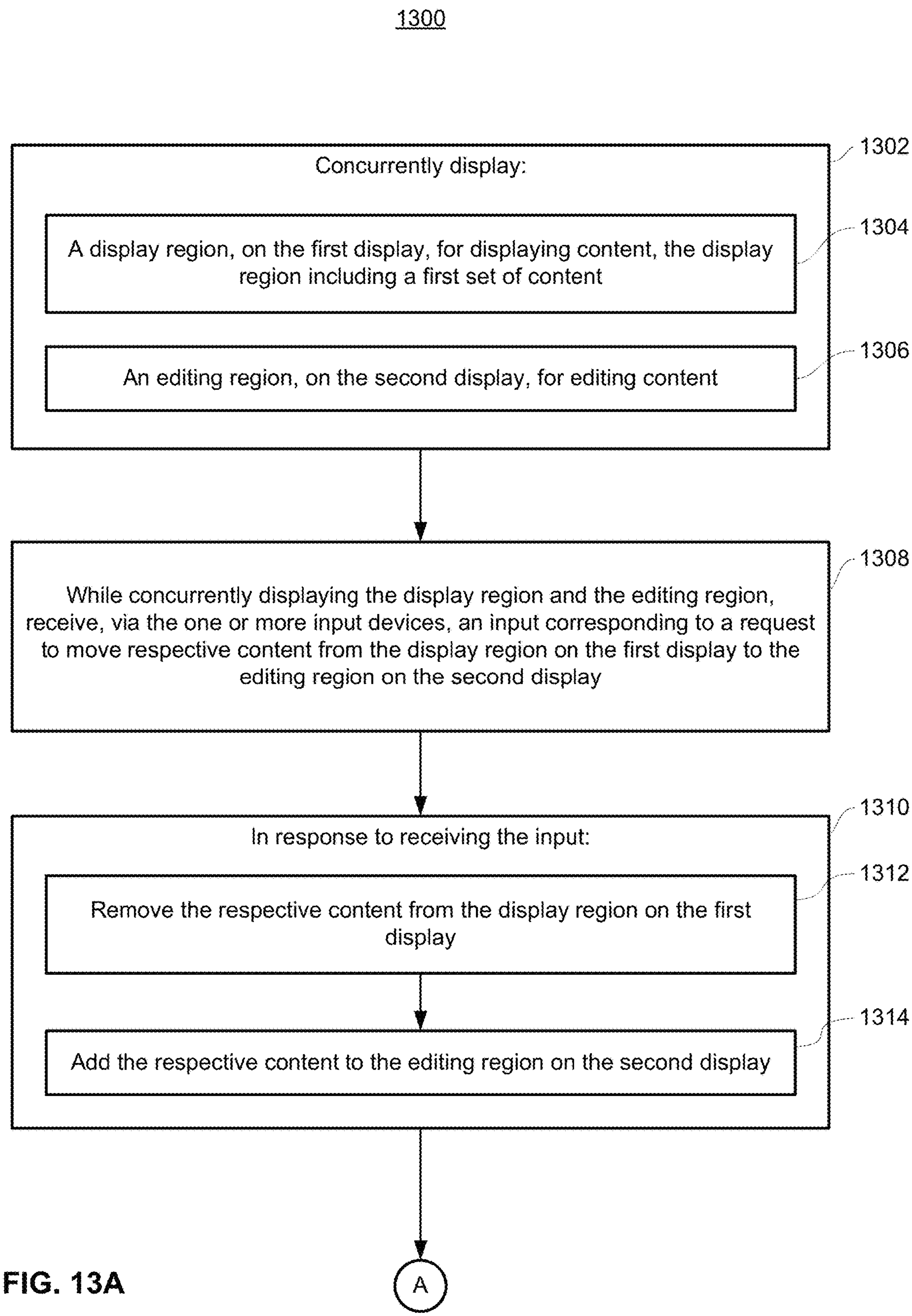
FIGS. 13A-13E are flow diagrams illustrating a method of facilitating the display or keeping private of content on multiple displays in accordance with some embodiments of the disclosure.
Figure 13B:
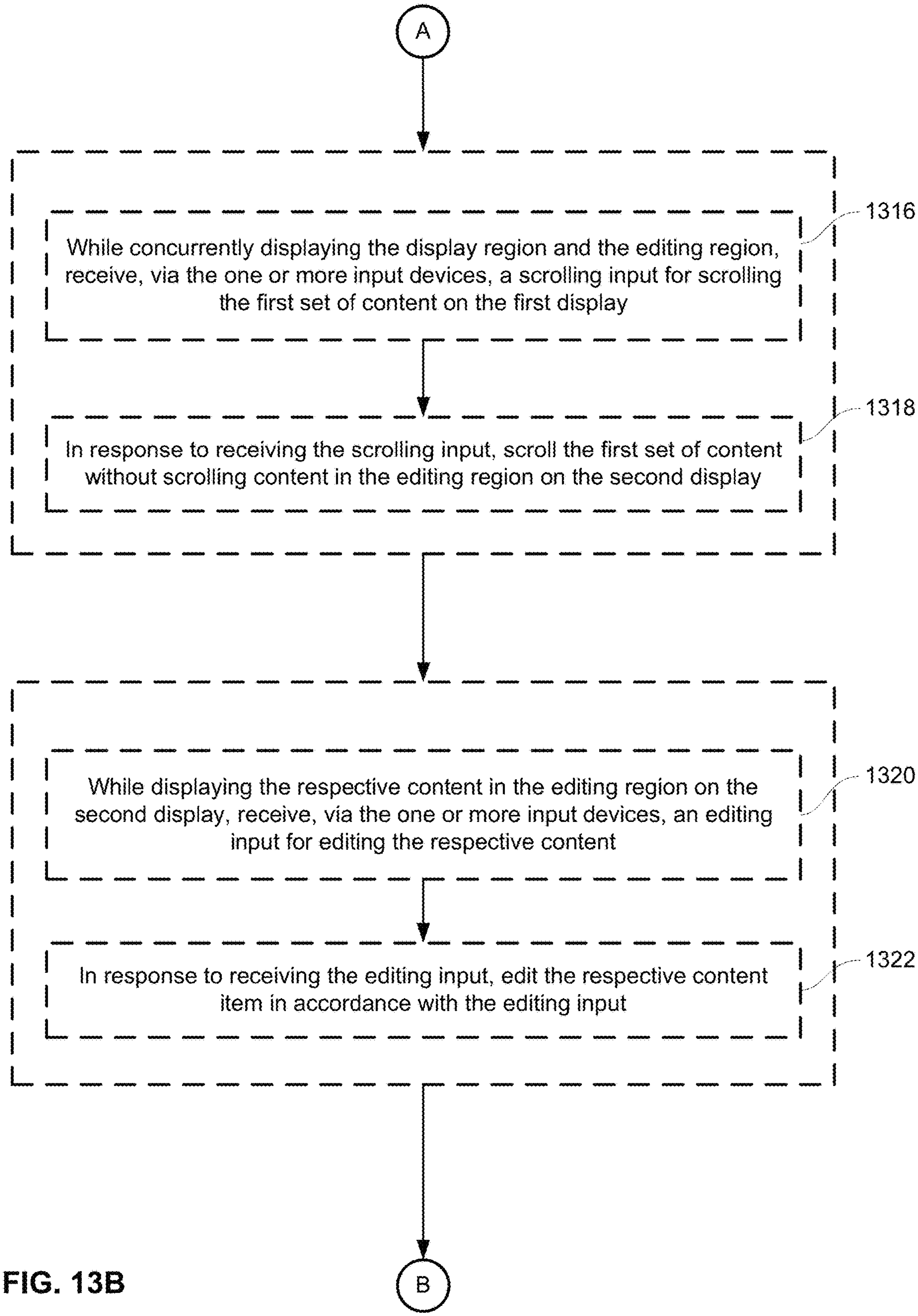
Figure 13C:
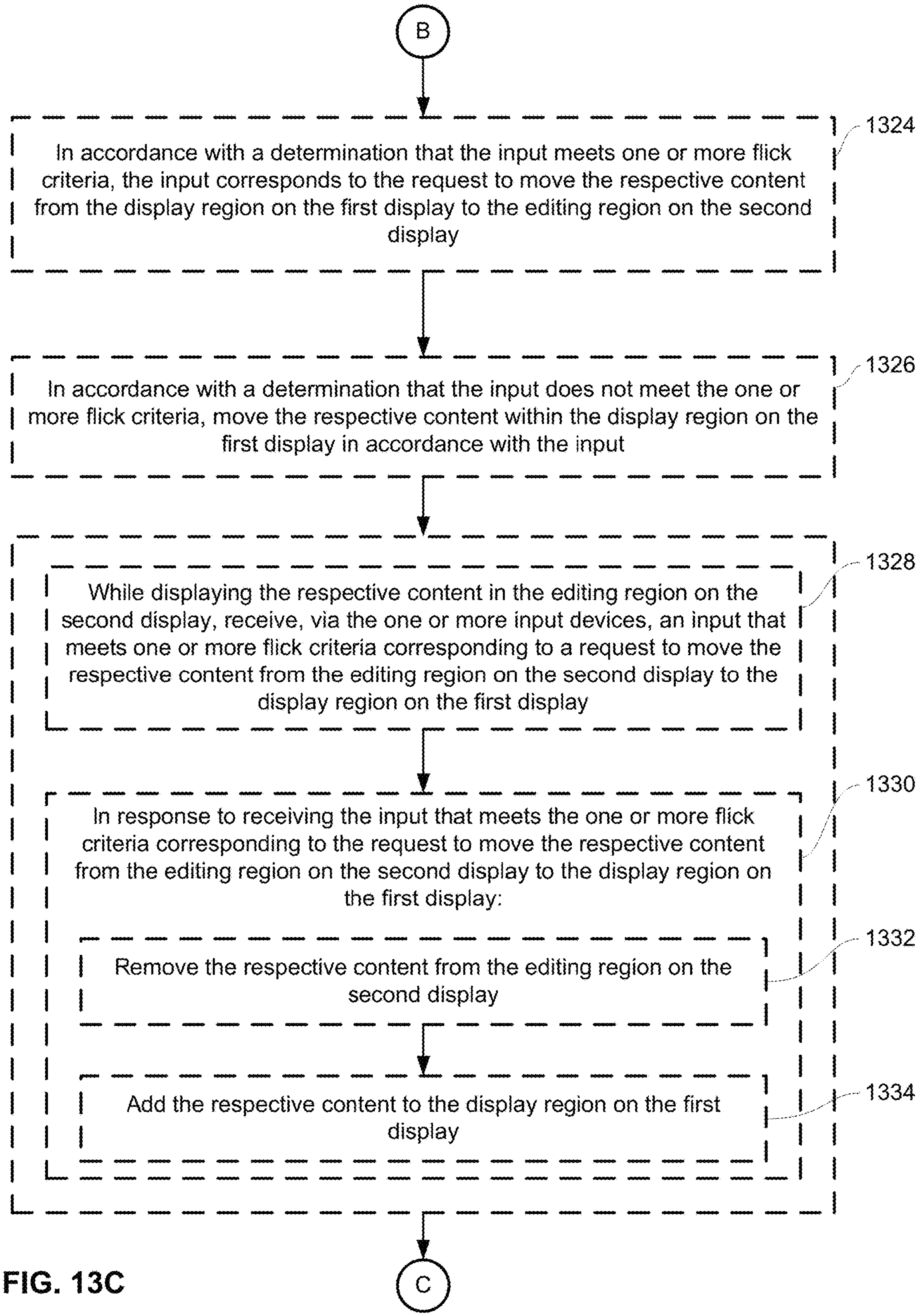
Figure 13D:
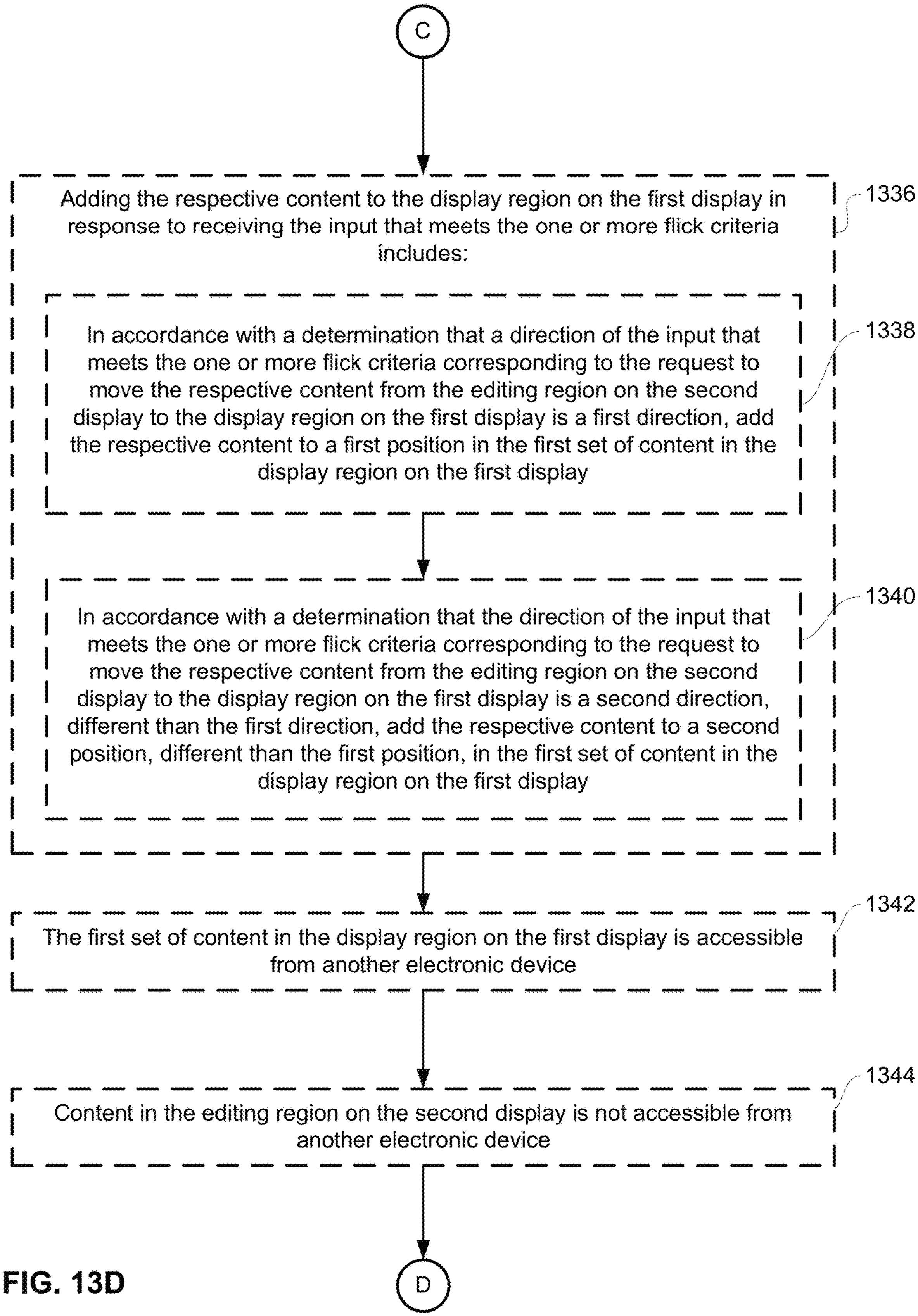
Figure 13E:
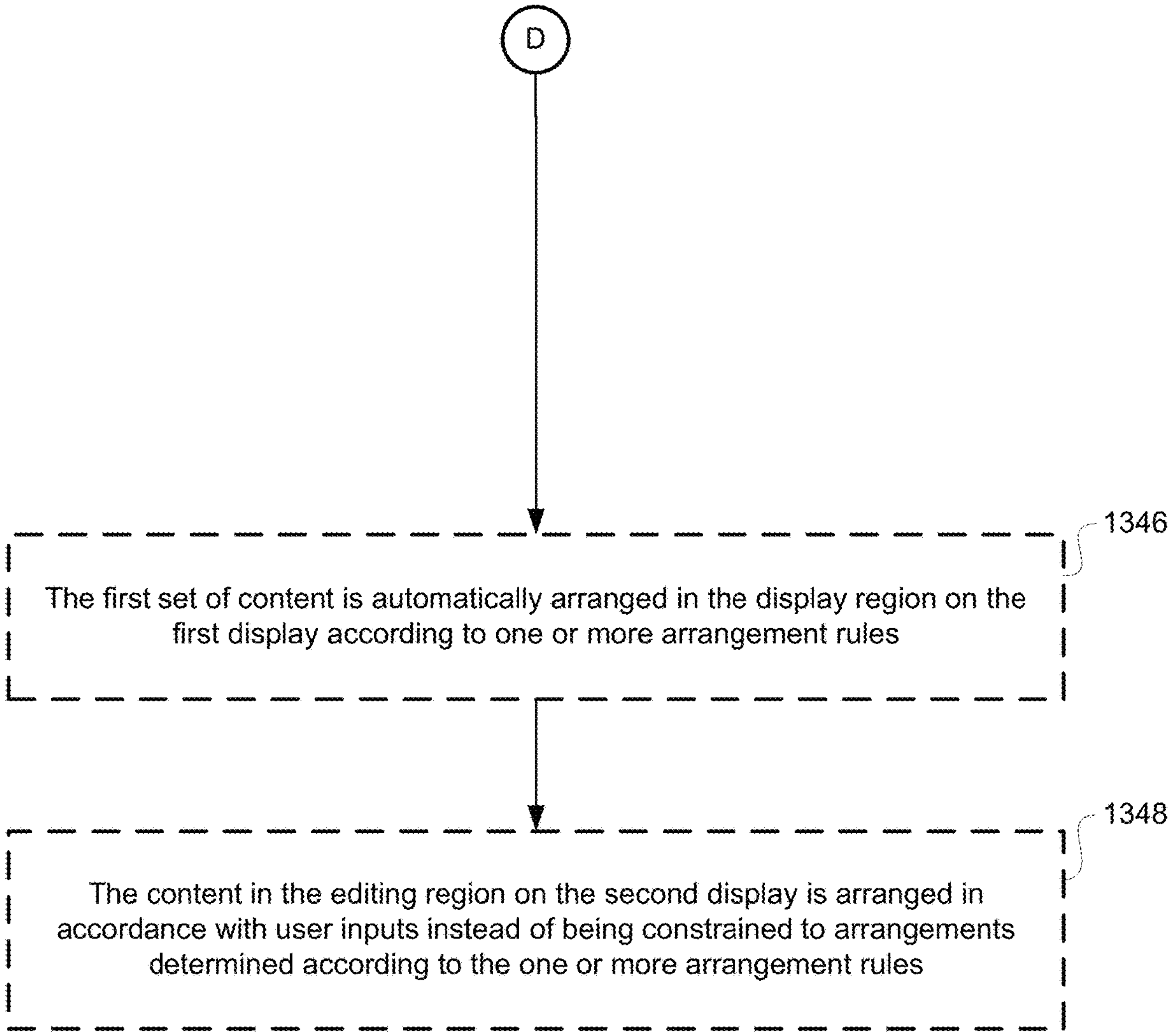

FIGS. 12A-12R illustrate exemplary ways in which an electronic device facilitates the display or keeping private of content on multiple displays in accordance with some embodiments of the disclosure. The embodiments in these figures are used to illustrate the processes described below, including the processes described with reference to FIGS. 13A-13E.

FIG. 12A illustrates exemplary device 500 with touch screens 504-1 and 504-2, such as described with reference to FIGS. 5A-5H. Touch screens 504-1 and 504-2 optionally display one or more user interfaces that include various content. In the example illustrated in FIG. 12A, touch screens 504-1 and 504-2 display content display and editing features. Specifically, touch screen 504-1 displays a display region for displaying content while touch screen 504-2 concurrently displays an editing region for editing content. In some embodiments, content (e.g., pictures, videos, music) in the display region on touch screen 504-1 is for display on the electronic device and/or another electronic device with which the electronic device is in communication, and is optionally not editable while being displayed in the display region on touch screen 504-1. Further, in some embodiments, content in the editing region on touch screen 504-2 is editable while being displayed in the editing region on touch screen 504-2, and is optionally not for display on another electronic device with which the electronic device is in communication. In some circumstances, the electronic device communicates with the other electronic device as part of a chat or video chat session.

In FIG. 12A, the display region includes content A 1206, content B 1208, content C 1210 and content D 1212, and the editing region includes no content. Content in the display region is optionally displayed according to one or more rules of arrangement. For example, content in the display region optionally must be displayed in a single row, with equal spacing between content items, equally-sized content items, etc., as shown in FIG. 12A. Other rules for arranging content in the display region are also within the scope of the disclosure.

In some embodiments, content is movable between the display region on touch screen 504-1 and the editing region on touch screen 504-2. However, content is optionally only moved between the display and editing regions in response to detecting an input that flicks the content between the regions. For example, in FIGS. 12B-12C, contact 1003 is detected on content B 1208, followed by a downward-leftward swipe of contact 1003 on touch screen 504-1. In the example of FIG. 12C, this swipe of contact 1003 does not satisfy flick criteria (e.g., the swipe is not a "flick) because, for example, the input is detected for more than the threshold amount of time and/or the input has a speed that is less than the speed threshold. As a result, electronic device 500 has interpreted the swipe, not as an input to move content B 1208 to the editing region on touch screen 504-2, but rather an input to move content B 1208 within the display region on touch screen 504-1, and has moved content B 1208 within the display region in accordance with the swipe, as shown in FIG. 12C.

In contrast, looking at FIGS. 12B and 12D, contact 1003 is detected on content B 1208, followed by a downward-leftward swipe of contact 1003 on touch screen 504-1. In the example of FIG. 12D, this swipe of contact 1003 does satisfy flick criteria (e.g., the swipe is a "flick) because, for example, the contact that makes up the input has a speed greater than a speed threshold, such as 1, 3 or 5 cm/s, the movement of the contact is less than a movement threshold, such as 3, 5 or 10 cm, liftoff of the contact is detected within a time threshold, such as 0.2, 0.5 or 0.8 seconds, of touch-down of the contact, etc. As a result, electronic device 500 removes content B 1208 from the display region on touch screen 504-1, and adds content B 1208 to the editing region on touch screen 504-2, as shown in FIG. 12D. In some embodiments, content B 1208 is placed within the editing region in accordance with the direction of the flick. For example, a flick down and to the right places the content on a right side of the editing region, while a flick down and to the left places the content on a left side of the editing region. In some embodiments, an upward flick does not move the content 1208 into the editing region (e.g., because the flick is away from the editing region). Further, in FIG. 12E, the electronic device 500 rearranges the remaining content in the display region to satisfy the above-mentioned arrangement rules of the display region by shifting content C 1210, content D 1212 and content E 1214 (previously not within the display area of touch screen 504-1) to the left to fill the void left by content B 1208.

In some embodiments, content in the display region on touch screen 504-1 and content in the editing region on touch screen 504-2 are independently scrollable and/or movable. For example, in FIG. 12F, a right-to-left swipe of contact 1003 is detected in the display region on touch screen 504-1. In response, the electronic device 500 horizontally scrolls the content in the display region (e.g., to hide content A 1206 and content C 1210, and to reveal content G 1218 and content H 1220), without affecting content B 1208 in the editing region on touch screen 504-2, as shown in FIG. 12F. Similarly, as will be shown below, movement and/or manipulation of content in the editing region on touch screen 504-2 optionally does not affect the display of content in the display region on touch screen 504-1.

As previously described, content in the editing region on touch screen 504-2 is editable in various ways. For example, in FIG. 12G, a generic editing input (e.g., color edit, resolution edit, etc.) directed to content B 1208 is detected by the electronic device 500 (e.g., represented by contact 1003 labeled with "edit"). In response, the electronic device 500 edits content B 1208 in accordance with the editing input to result in content B' 1208. Further, in FIG. 12H, a rotation/scaling input directed to content B' 1208 is detected by the electronic device (e.g., represented by contact 1003 labeled with "rotate/scale"). In response, the electronic device 500 rotates and scales content B' 1208, as shown in FIG. 12H. Throughout the editing, scaling, rotation (or other manipulation inputs) of content B' 1208, the display of content E 1214, content F 1216, content G 1218 and content H 1220 in the display region on touch screen 504-1 remains unchanged.

In some embodiments, multiple content items are able to be added to the editing region on touch screen 504-2. Further, in some embodiments, content in the editing region on touch screen 504-2 is arranged in accordance with user inputs instead of being constrained to arrangements determined according to the one or more arrangement rules in effect in the display region on touch screen 504-1. For example, in FIGS. 121-12J, contact 1003 is detected on content G 1218, followed by a downward-rightward flick of content G 1218. In response, the electronic device 500 removes content G 1218 from the display region on touch screen 504-1 and adds content G 1218 to the editing region on touch screen 504-2 (e.g., similar to as described with reference to FIGS. 12B and 12D-12E). Further, in accordance with the downward-rightward direction of the flick of contact 1003, the electronic device 500 displays content G 1218 in a portion of the editing region to which the flick of contact 1003 was directed (e.g., a right side of the editing region). Finally, the electronic device 500 has rearranged the remaining content in the display region on touch screen 504-1 to reveal content I 1222 (previously not shown in the display region), as shown in FIG. 12K (e.g., similar to as described with reference to FIG. 12E).

As previously described, content in the editing region on touch screen 504-2 is movable and editable without affecting the display of content in the display region on touch screen 504-1, and is movable and editable without being constrained to the arrangement rules in effect in the display region. For example, in FIGS. 12K-12L, a downward-leftward movement of content G 1218 is detected, and in response, the electronic device 500 moves content G 1218 towards and overlapping content B' 1208, as shown in FIG. 12L.

Just as content is moved from the display region on touch screen 504-1 to the editing region on touch screen 504-2 in response to flick gestures, content is moved from the editing region on touch screen 504-2 to the display region on touch screen 504-2 in response to flick gestures. If, however, an input is not a flick, content in the editing region is optionally instead merely moved within the editing region, and is not moved to the display region. Further, in some embodiments, if the input is a flick, but is not directed towards the display region on touch screen 504-1 (e.g., the flick is directed towards the right/left sides of touch screen 504-2, or the bottom side of touch screen 504-2), the content is also merely moved within the editing region in accordance with the input, and is not moved to the display region on touch screen 504-1.

For example, in FIGS. 12M-12N, an upward-rightward swipe of content B' 1208 is detected. However, the swipe is not a flick (e.g., does not satisfy the above-described flick criteria). As a result, content B' 1208 is moved upward and rightward within the editing region on touch screen 504-2, and is not moved to the display region on touch screen 504-1, as shown in FIG. 12N. In contrast, in FIGS. 12O-12P, an upward-rightward swipe of content B' 1208 is detected where the swipe is a flick (e.g., does satisfy the above-described flick criteria). As a result, as shown in FIG. 12P, the electronic device 500 has removed content B' 1208 from the editing region on touch screen 504-2, and has added content B' 1208 to the display region on touch screen 504-1. Further, the electronic device 500 has added content B' 1208 to the collection of content in the display region at a location in the collection (e.g., a location in the collection that is a valid location according to the arrangement rules in effect in the display region) towards which the flick was directed. Specifically, the flick was directed towards the right-most position in the row of content in the display region, as shown in FIG. 12P. As a result, content B' 1208 is added to the right-most position in the row of content in the display region, and content I 1222 has been moved off-screen (e.g., to the right), as shown in FIG. 12P.

In a similar manner, in FIGS. 12Q-12R, an upward-leftward swipe of content B' 1208 is detected in the editing region, where the swipe is a flick (e.g., does satisfy the above-described flick criteria). As a result, as shown in FIG. 12R, the electronic device 500 has removed content B' 1208 from the editing region on touch screen 504-2, and has added content B' 1208 to the display region on touch screen 504-1. Further, the electronic device 500 has added content B' 1208 to the collection of content in the display region at a location in the collection (e.g., a location in the collection that is a valid location according to the arrangement rules in effect in the display region) towards which the flick was directed. Specifically, the flick was directed towards the second position in the row of content in the display region, as shown in FIG. 12R. As a result, content B' 1208 is added to the second position in the row of content in the display region, content F 1216 and content H 1220 are shifted to the right, and content I 1222 has been moved off-screen (e.g., to the right), as shown in FIG. 12R.

FIGS. 13A-13I are flow diagrams illustrating a method of facilitating the display or keeping private of content on multiple displays in accordance with some embodiments of the disclosure. The method 1300 is optionally performed at an electronic device such as device 100, device 300, or device 500 as described above with reference to FIGS. 1A-1B, 2-3, 4A-4B and 5A-5H. Some operations in method 1300 are, optionally, combined and/or the order of some operations is, optionally, changed.

As described below, the method 1300 provides ways of facilitating the display or keeping private of content on multiple displays. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a first display, a second display, and one or more input devices (e.g., a phone, tablet computer, laptop, etc. including two touch screens or two displays) concurrently displays (1302) a display region (1304), on the first display, for displaying content, the display region including a first set of content, and an editing region (1306), on the second display, for editing content, as shown in FIG. 12A. For example, content in the display region on the first display is for display on the electronic device and/or another electronic device with which the electronic device is in communication, and is optionally not editable while being displayed in the display region on the first display. The content optionally includes content such as pictures, videos, music, etc. The electronic device is optionally communicating with the other electronic device as part of a chat or video chat session. In some embodiments, content in the editing region on the second display is editable while being displayed in the editing region on the second display, and is optionally not for display on another electronic device with which the electronic device is in communication. For example, a user is able to place content in the display region on the first display to make that content viewable by the other electronic device, though no longer editable by the electronic device, and is able to place content in the editing region on the second display to make that content editable by the electronic device, though no longer viewable by the other electronic device.

While concurrently displaying the display region and the editing region, the electronic device optionally receives (1308), via the one or more input devices, an input corresponding to a request to move respective content from the display region on the first display to the editing region on the second display (e.g., a touchdown of a contact detected on the content in the display region on the first display followed by a swipe of that contact/content towards the editing region on the second display, the swipe having a speed and movement greater than a speed threshold and a movement threshold, and having a direction within a direction range of the direction of the editing region with respect to the location of the content on the first display), as shown in FIGS. 12C-12D. In some embodiments, if the speed or movement of the swipe are not greater than the respective thresholds, or if the direction of the swipe is outside of the respective direction range, the content is not moved to the editing region on the second display, but rather is moved within the display region on the first display in accordance with the movement of the contact, such as in FIG. 12C. In response to receiving the input (1310), the electronic device optionally removes (1312) the respective content from the display region on the first display and adds (1314) the respective content to the editing region on the second display, as shown in FIG. 12E. The device optionally enables rearranging content included in the editing region based on detected gestures or touch inputs detected in the editing region on the second display, such as swipes that move the contact on which the swipes are detected in accordance with the directions of the swipes. The above-described manner of making content displayable or editable depending on the display on which it is included allows the electronic device to facilitate such categorization of content by the user, which simplifies interactions between the user and the device and enhances the operability of the device and makes the user-device interface more efficient (e.g., by helping the user to interact with content using fewer inputs provided to the device due, for example, to a reduction in erroneous categorization inputs provided to the device), which, additionally, reduces power usage and improves battery life of the device by enabling the user to use the device more quickly and efficiently.

In some embodiments, while concurrently displaying the display region and the editing region, the electronic device receives (1316), via the one or more input devices, a scrolling input for scrolling the first set of content on the first display (e.g., a sideways swipe detected on the first display), as in FIG. 12F. In response to receiving the scrolling input, the electronic device optionally scrolls (1318) the first set of content without scrolling content in the editing region on the second display (e.g., the content on the top display is scrollable independently of the content on the bottom display), as shown in FIG. 12F. In some embodiments, a sideways swipe detected on the bottom display scrolls through the content displayed on the bottom display without scrolling through the content displayed on the top display. The above-described manner of allowing content on the top and bottom displays to be scrolled independently allows the electronic device to provide individual tailoring of the display of content depending on whether it is for display (e.g., on the top display) or editing (e.g., on the bottom display) while also allowing interactions to occur with respect to one type of content while maintaining the current state of the other type of content, which simplifies interactions between the user and the device and enhances the operability of the device and makes the user-device interface more efficient, which, additionally, reduces power usage and improves battery life of the device by enabling the user to use the device more quickly and efficiently.

While displaying the respective content in the editing region on the second display, the electronic device optionally receives (1320), via the one or more input devices, an editing input for editing the respective content (e.g., an input drawing directly on the respective content, an input adjusting the color of the respective content, etc.), as shown in FIGS. 12G-12H. In some embodiments, in response to receiving the editing input, the electronic device edits (1322) the respective content item in accordance with the editing input, as shown in FIG. 12G. The above-described manner of allowing content on the bottom display to be edited allows the electronic device to provide editing capabilities while maintaining the state of the content on the first display, which simplifies interactions between the user and the device and enhances the operability of the device and makes the user-device interface more efficient, which, additionally, reduces power usage and improves battery life of the device by enabling the user to use the device more quickly and efficiently.

In accordance with a determination that the input meets one or more flick criteria (e.g., the contact that makes up the input has a speed greater than a speed threshold, such as 1, 3 or 5 cm/s, the movement of the contact is less than a movement threshold, such as 3, 5 or 10 cm, liftoff of the contact is detected within a time threshold, such as 0.2, 0.5 or 0.8 seconds, of touchdown of the contact, etc.), the input optionally corresponds to the request to move the respective content from the display region on the first display to the editing region on the second display (1324), as shown in FIG. 12D. In some embodiments, content is moved from the display region on the top display to the editing region on the bottom display only if the input is a flick gesture starting at the content and moving towards the bottom display. The above-described manner of moving content from the display region to the editing region using a flick gesture allows the electronic device to provide for an easy manner to move content from the display region to the editing region, which simplifies interactions between the user and the device and enhances the operability of the device and makes the user-device interface more efficient (e.g., by reducing the number of inputs needed to edit content), which, additionally, reduces power usage and improves battery life of the device by enabling the user to use the device more quickly and efficiently.

In some embodiments, in accordance with a determination that the input does not meet the one or more flick criteria, the electronic device moves (1326) the respective content within the display region on the first display in accordance with the input, as shown in FIG. 12C. For example, if the input is not a flick input because the input is detected for more than the threshold amount of time and/or the input has a speed that is less than the speed threshold, the electronic device interprets the input to move the content within the display region on the first display without transferring it to the editing region on the second display. The above-described manner of moving content within the display region allows the electronic device to continue to respond to user inputs in an expected manner when those inputs are not flick inputs, which simplifies interactions between the user and the device and enhances the operability of the device and makes the user-device interface more efficient (e.g., by operating in accordance with user input), which, additionally, reduces power usage and improves battery life of the device by enabling the user to use the device more quickly and efficiently.

While displaying the respective content in the editing region on the second display, the electronic device optionally receives (1328), via the one or more input devices, an input that meets one or more flick criteria corresponding to a request to move the respective content from the editing region on the second display to the display region on the first display (e.g., a flick gesture starting at the content and moving towards the first display), as shown in FIGS. 12O-12P. In some embodiments, in response to receiving the input that meets the one or more flick criteria corresponding to the request to move the respective content from the editing region on the second display to the display region on the first display (1330), the electronic device removes (1332) the respective content from the editing region on the second display and adds (1334) the respective content to the display region on the first display, as shown in FIG. 12P. In some embodiments, content is moved from the editing region on the bottom display to the display region on the top display only if the input is a flick gesture starting at the content and moving towards the top display. If the input is not a flick gesture, the electronic device optionally interprets the input to move the content within the editing region of the bottom display without transferring it to the display region of the top display, such as in FIG. 12N. The above-described manner of moving content from the editing region to the display region using a flick gesture allows the electronic device to provide for an easy manner to move content from the editing region to the display region, which simplifies interactions between the user and the device and enhances the operability of the device and makes the user-device interface more efficient (e.g., by reducing the number of inputs needed to display content), which, additionally, reduces power usage and improves battery life of the device by enabling the user to use the device more quickly and efficiently.

In some embodiments, adding the respective content to the display region on the first display in response to receiving the input that meets the one or more flick criteria includes (1336), in accordance with a determination that a direction of the input that meets the one or more flick criteria corresponding to the request to move the respective content from the editing region on the second display to the display region on the first display is a first direction, adding (1338) the respective content to a first position in the first set of content in the display region on the first display, as shown in FIG. 12P. In accordance with a determination that the direction of the input that meets the one or more flick criteria corresponding to the request to move the respective content from the editing region on the second display to the display region on the first display is a second direction, different than the first direction, the electronic device optionally adds (1340) the respective content to a second position, different than the first position, in the first set of content in the display region on the first display, as shown in FIG. 12R. In some embodiments, the position in the collection of content on the first display into which the content is added from the editing region on the second display depends on the direction of the flick adding the content to the display region. For example, a flick from the editing region towards the first display that is directed towards a first (e.g., leftward) position in the collection of content on the first display optionally results in the content being added at the first position in the collection, and a flick from the editing region towards the first display that is directed towards a second (e.g., rightward) position in the collection of content on the first display optionally results in the content being added at the second position in the collection. The above-described manner of setting the location of content in the display region using a flick gesture allows the electronic device to provide for an easy manner to place content in the display region, which simplifies interactions between the user and the device and enhances the operability of the device and makes the user-device interface more efficient (e.g., by reducing the number of inputs needed to display content at a particular location in the display region), which, additionally, reduces power usage and improves battery life of the device by enabling the user to use the device more quickly and efficiently.

The first set of content in the display region on the first display is optionally accessible from another electronic device (1342), as shown in FIGS. 12A-12R. In some embodiments, the content displayed in the display region on the first display is shared with other users, such as other electronic devices with which the electronic device is in communication. For example, during a video conference, other electronic devices that are participating in the video conference are optionally able to view the content that is contained within the display region on the first display. The above-described manner of sharing content in the display region allows the electronic device to provide for an easy manner to share content with other devices or users, which simplifies interactions between the user and the device and enhances the operability of the device and makes the user-device interface more efficient (e.g., by reducing the number of inputs needed to share content), which, additionally, reduces power usage and improves battery life of the device by enabling the user to use the device more quickly and efficiently.

In some embodiments, content in the editing region on the second display is not accessible from another electronic device (1344), as shown in FIGS. 12A-12R. In some embodiments, the content displayed in the editing region on the second display is not shared with other users (e.g., the editing region is a private workspace), such as other electronic devices with which the electronic device is in communication. For example, during a video conference, other electronic devices that are participating in the video conference are optionally not able to view the content that is contained within the editing region on the second display. The above-described manner of making content in the editing region private allows the electronic device to provide for an easy manner to hide content from other devices or users, which simplifies interactions between the user and the device and enhances the operability of the device and makes the user-device interface more efficient (e.g., by reducing the number of inputs needed to hide content), which, additionally, reduces power usage and improves battery life of the device by enabling the user to use the device more quickly and efficiently.

The first set of content is optionally automatically arranged in the display region on the first display according to one or more arrangement rules (1346), as shown in FIGS. 12A-12R. In some embodiments, the electronic device arranges the content in the display region in a structured grid or row, does not allow for free positioning of the content within the display region, and/or does not allow scaling of the content in the display region. The above-described manner of displaying content in the display region according to arrangement rules allows the electronic device to automatically display content in an organized manner, which simplifies interactions between the user and the device and enhances the operability of the device and makes the user-device interface more efficient (e.g., by reducing the number of inputs needed to display content in an organized manner), which, additionally, reduces power usage and improves battery life of the device by enabling the user to use the device more quickly and efficiently.

In some embodiments, the content in the editing region on the second display is arranged in accordance with user inputs instead of being constrained to arrangements determined according to the one or more arrangement rules (1348), as shown in FIGS. 12D-12R. For example, the electronic device does not arrange the content in the editing region in a structured grid or row, does allow for free positioning of the content within the editing region, and/or does allow scaling of the content in the editing region. In some embodiments, the electronic device arranges content in the display region according to a first set of rules, and arranges content in the editing region according to a second set of rules, different than the first set of rules. The above-described manner of displaying content in the editing region not according to the arrangement rules allows the electronic device to provide the user with a workspace that the user is able to utilize as desired, which simplifies interactions between the user and the device and enhances the operability of the device and makes the user-device interface more efficient (e.g., by giving the user the freedom to place or edit the content as they wish), which, additionally, reduces power usage and improves battery life of the device by enabling the user to use the device more quickly and efficiently.

It should be understood that the particular order in which the operations in FIGS. 13A-13E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1700, 1900 and 2100) are also applicable in an analogous manner to method 1300 described above with respect to FIGS. 13A-13E. For example, the display and editing regions, content, displays, inputs, etc. described above with reference to method 1300 optionally have one or more of the characteristics of the display and editing regions, content, displays, inputs, etc. described herein with reference to other methods described herein (e.g., methods 700, 900, 1100, 1500, 1700, 1900 and 2100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 13A-13E are, optionally, implemented by components depicted in FIGS. 1A-1B. For example, displaying operations 1302, 1304 and 1306, receiving operation 1308, removing operation 1312 and adding operation 1314 are, optionally, implemented by event sorter 170, event recognizer 180, and event handler 190. Event monitor 171 in event sorter 170 detects a contact on touch screen 504-1, 504-2, and event dispatcher module 174 delivers the event information to application 136-1. A respective event recognizer 180 of application 136-1 compares the event information to respective event definitions 186, and determines whether a first contact at a first location on the touch screen 504 corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Graphical Input Coordinate Space for Applications

Users interact with electronic devices in many different manners, including interacting with applications that may be available (e.g., stored or otherwise available) on the electronic devices. For example, a user may provide inputs to various applications to view information from those applications. The embodiments described below provide ways in which an electronic device facilitates the display of information from applications using a shared graphical input coordinate space in accordance with some embodiments of the disclosure, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
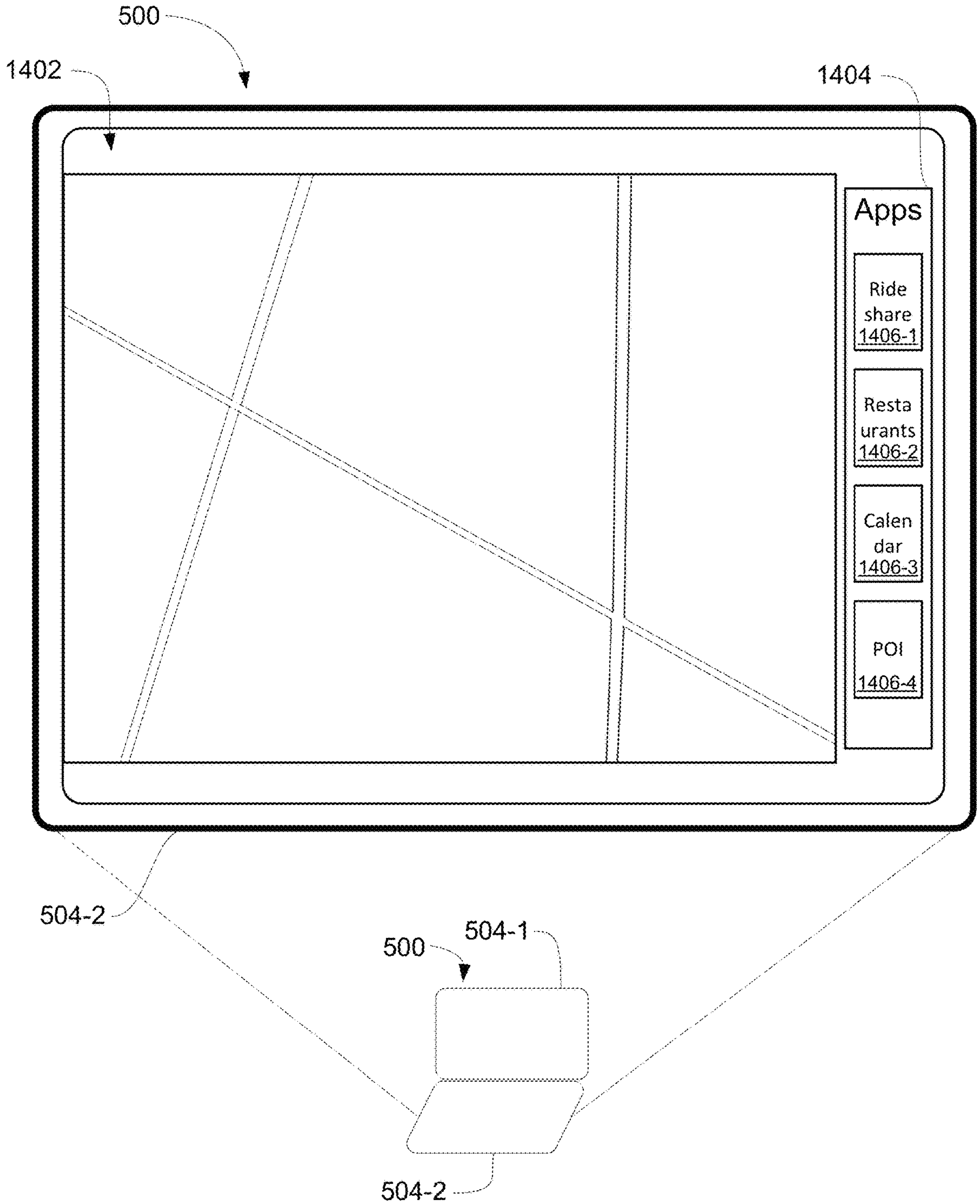
FIGS. 14A-14M illustrate exemplary ways in which an electronic device facilitates the display of information from applications using a shared graphical input coordinate space in accordance with some embodiments of the disclosure.
Figure 14B:
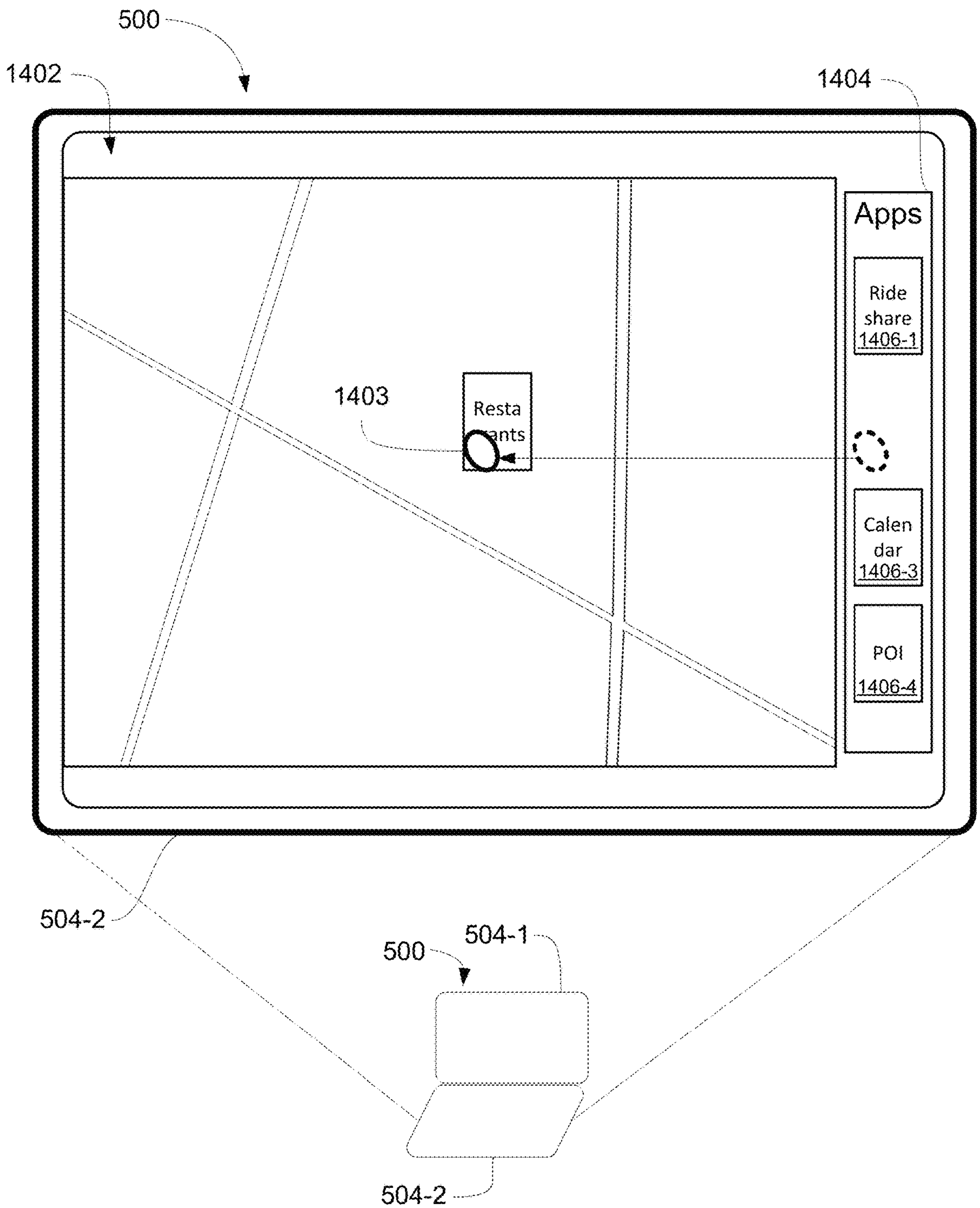

FIGS. 14A-14M illustrate exemplary ways in which an electronic device facilitates the display of information from applications using a shared graphical input coordinate space in accordance with some embodiments of the disclosure. The embodiments in these figures are used to illustrate the processes described below, including the processes described with reference to FIGS. 15A-15F FIG. 14A illustrates exemplary device 500 with touch screens 504-1 and 504-2, such as described with reference to FIGS. 5A-5H. Touch screens 504-1 and 504-2 optionally display one or more user interfaces that include various content. In the example illustrated in FIG. 14A, touch screen 504-1 or 504-2 (touch screen 504-2 is illustrated as displaying the content in FIG. 14A) displays graphical input coordinate space features. Specifically, touch screen 504-2 displays a map 1402 (e.g., a street map) and an application dock 1404 that includes representations 1406 of applications that are able to use map 1402 as an input space and display information on map 1402, as will be described below. In the example of FIG. 14A, the applications that are available in dock 1404 include a ride-sharing application (1406-1) (e.g., for viewing information about and/or arranging transportation), a restaurant application (1406-2) (e.g., for viewing information about and/or contacting restaurants), a calendar application (1406-3) (e.g., for viewing information about and/or creating events in a calendar accessible on device 500) and a points-of-interest application (1406-4) (e.g., for viewing information about and/or contacting points-of-interest, such as airports, museums, parks, etc.).

Figure 14C:
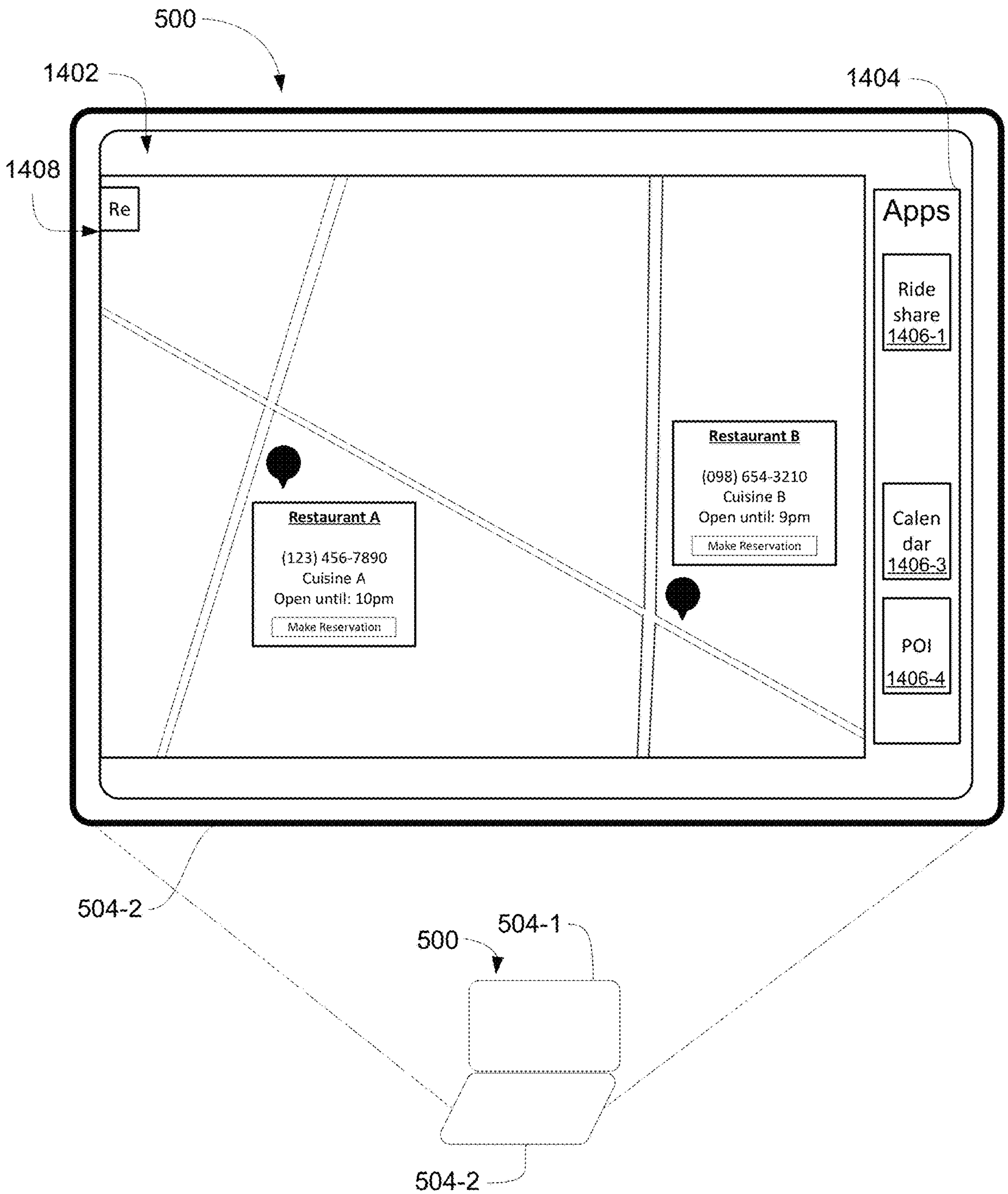

As mentioned above, the applications in dock 1404 are optionally able to use map 1402 as an input space and display information on map 1402. For example, in FIG. 14B, device 500 detects contact 1403 and dragging of representation 1406-2 for the restaurants application away from dock 1404 and towards and onto map 1402 (e.g., optionally including liftoff of contact 1403 while representation 1406-2 is over map 1402). In response, device 500 provides map 1402 as an input space to the restaurants application, which displays, on map 1402, various information from the restaurants application that correspond to the portion of map 1402 that is displayed on touch screen 504-2, such as shown in FIG. 14C. For example, in FIG. 14C, the restaurant application has added, to map 1402, information (e.g., phone numbers, hours of operation, type of cuisine, etc.) about Restaurants A and B at the locations of those restaurants on map 1402. In the example of FIG. 14C, the information about those restaurants also includes buttons selectable to make reservations at those restaurants. Further, device 500 displays an active application section 1408, which includes representations of the applications that are currently displaying information on map 1402. In FIG. 14C, because the restaurants application is the only one currently displaying information on map 1402, active application section 1408 includes a representation "Re" of the restaurants application.

In some embodiments, multiple applications are able to be dragged onto map 1402, sequentially or concurrently, to display additional information on map 1402. For example, in FIG. 14D, the ride-sharing application is dragged onto map 1402, as described previously, while the restaurants application is displaying information on map 1402. In response, device 500 updates map 1402 to additionally display information from the ride-sharing application, as shown in FIG. 14E. For example, the ride-sharing application takes as inputs map 1402 as a whole, as well as the information that was being displayed by the restaurant application on map 1402 (e.g., because that information was being displayed on map 1402 when the ride-sharing application was dragged to map 1402). Thus, in FIG. 14E, the ride-sharing application has updated the information displayed about restaurants A and B with ride-sharing information from the ride-sharing application that corresponds to those restaurants (e.g., the estimated time of arrival at those restaurants using a ride booked through the ride-sharing application, and buttons for booking those rides). Additionally, the ride-sharing application has displayed additional information on map 1402 from the ride-sharing application, such as the current locations on map 1402 of two vehicles available for booking using the ride-sharing application, as represented by the images of cars on map 1402. Finally, device 500 has updated the active application section 1408 to display a representation of the ride-sharing application "Ri" as well as the representation of the restaurants application "Re". In some embodiments, as shown in FIG. 14E, the order of display of the representations in the active application section 1408 corresponds to the order in which information from those applications was displayed on map 1402. For example, representation "Re" is displayed in the top position in active application section 1408, and representation "Ri" is displayed in the next bottom position in active application section 1408, because the restaurants application was dragged onto map 1402 (and, thus, displayed its information) first, and the ride-sharing application was dragged onto map 1402 (and, thus, displayed its information) second. If the ride-sharing application had instead been dragged onto map 1402 first, and the restaurants application had instead been dragged onto map 1402 second, active application section 1408 would optionally display representation "Ri" in the top position and representation "Re" in the next bottom position.

Figure 14D:
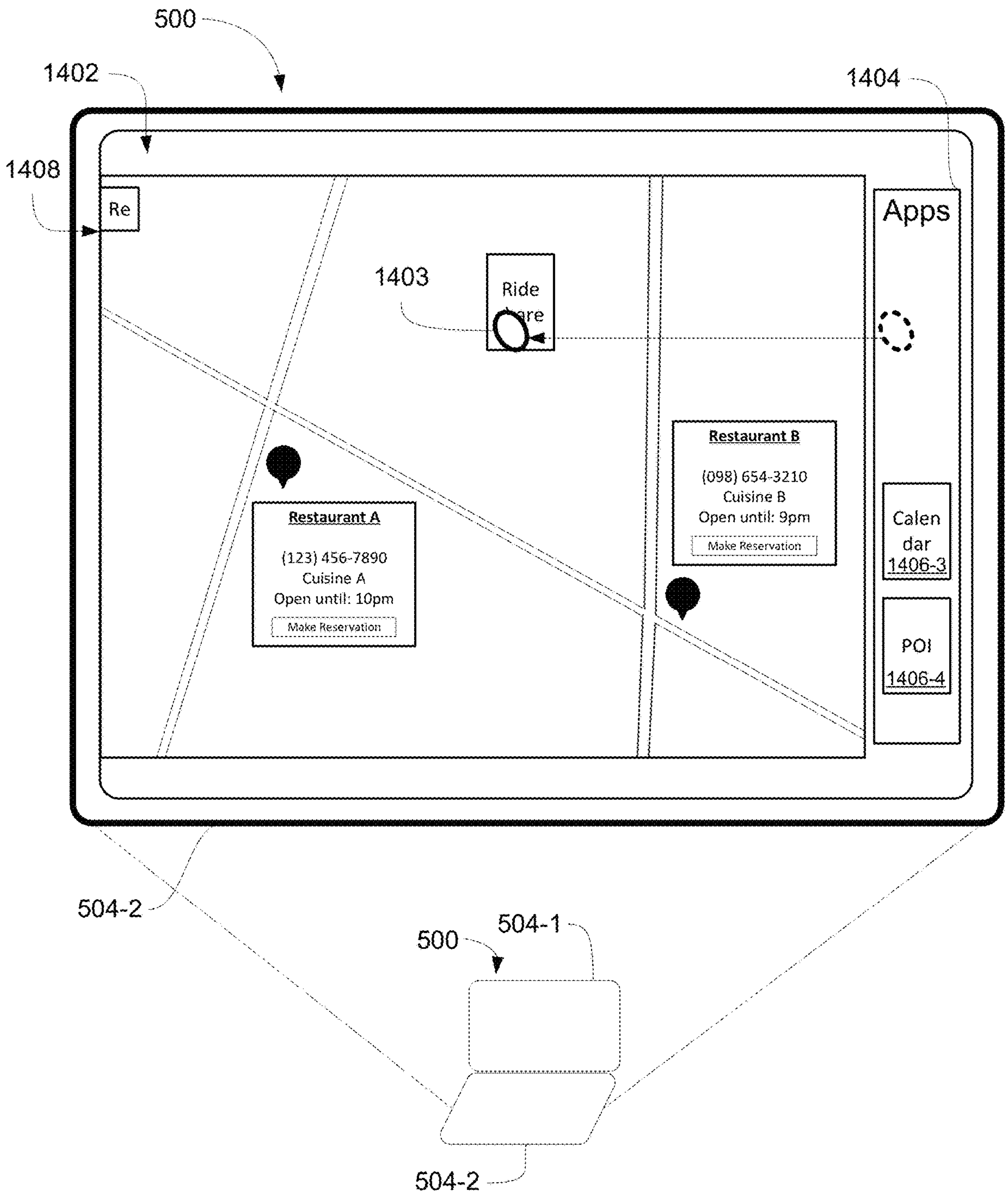
Figure 14E:
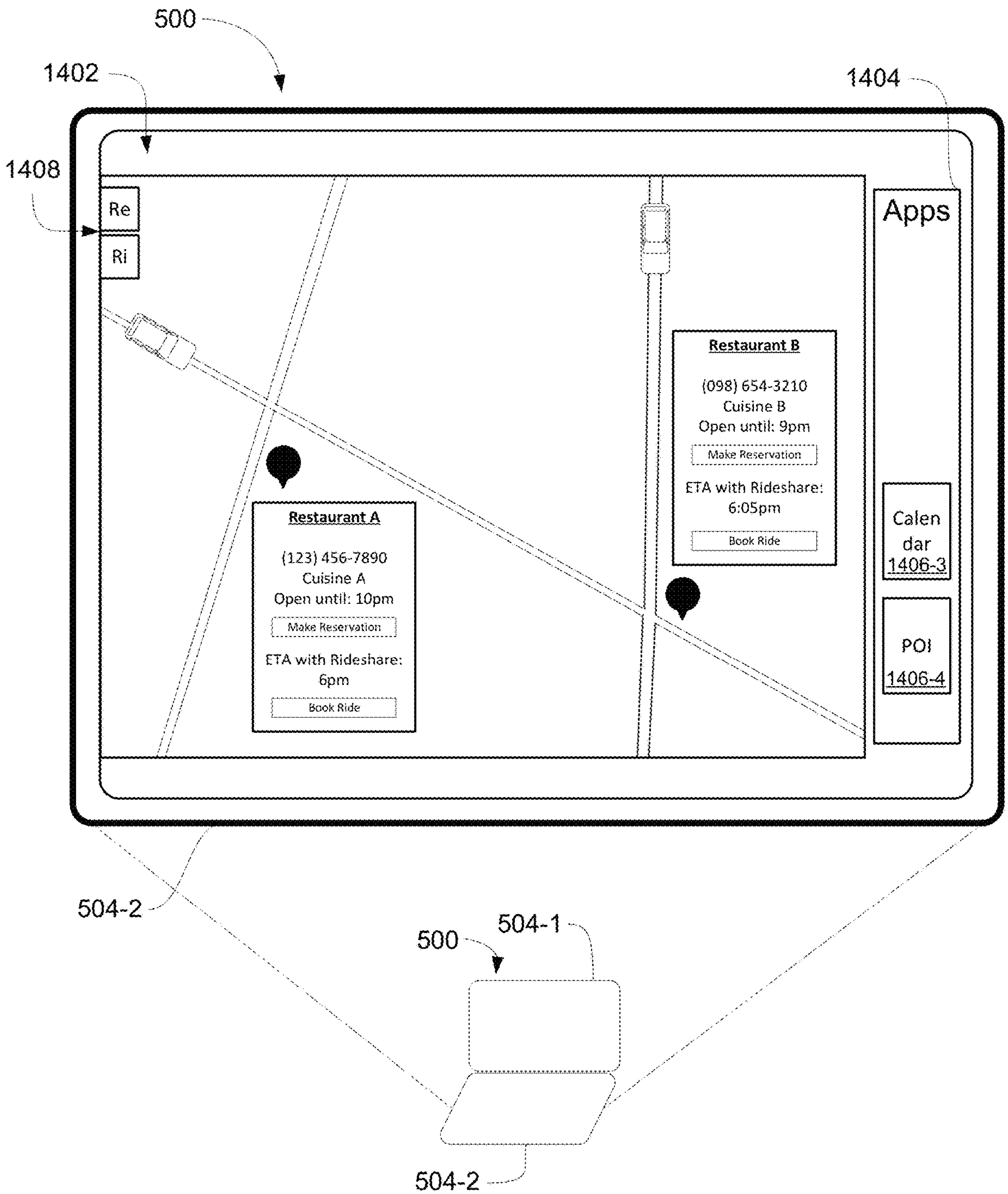
Figure 14F:
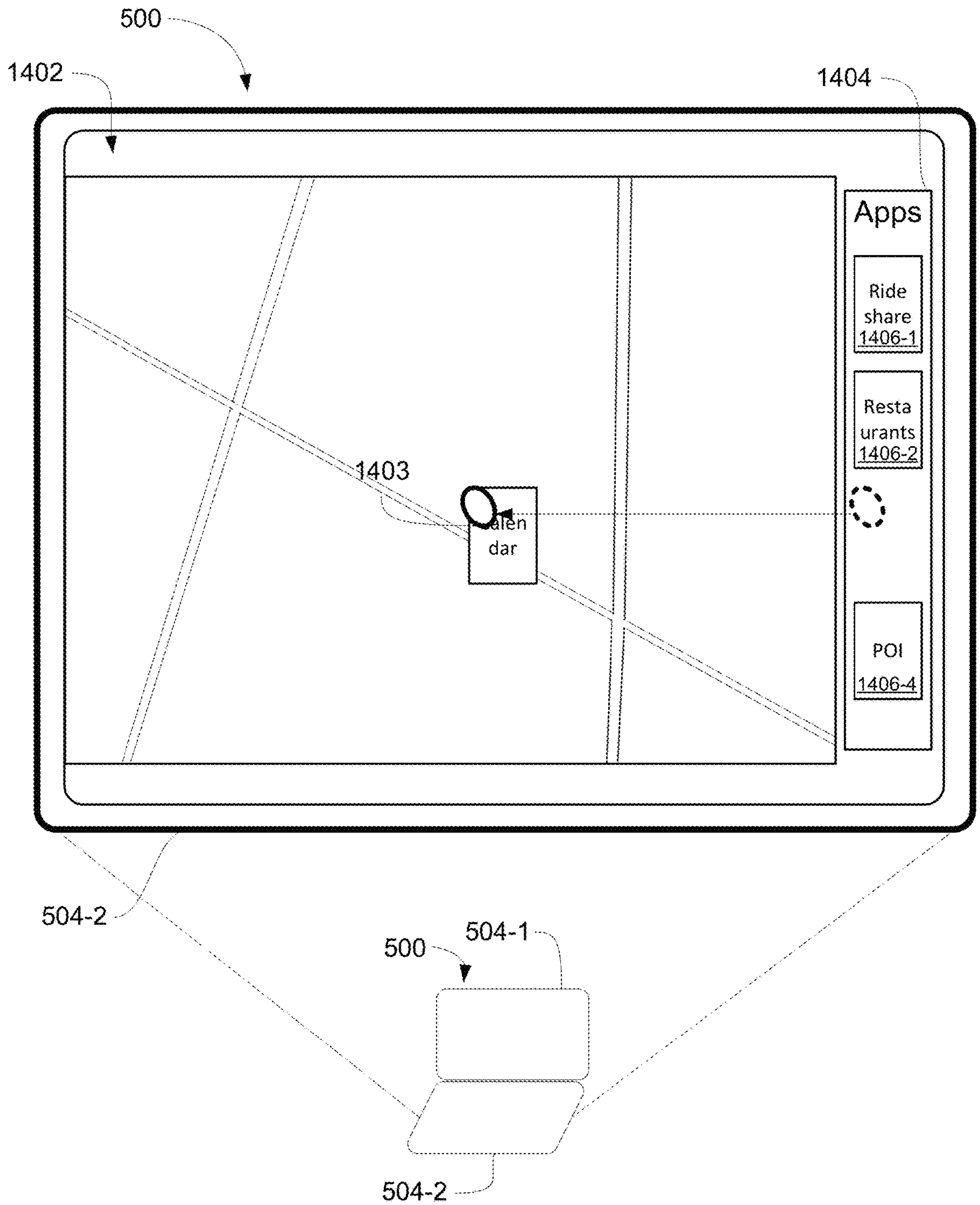
Figure 14G:
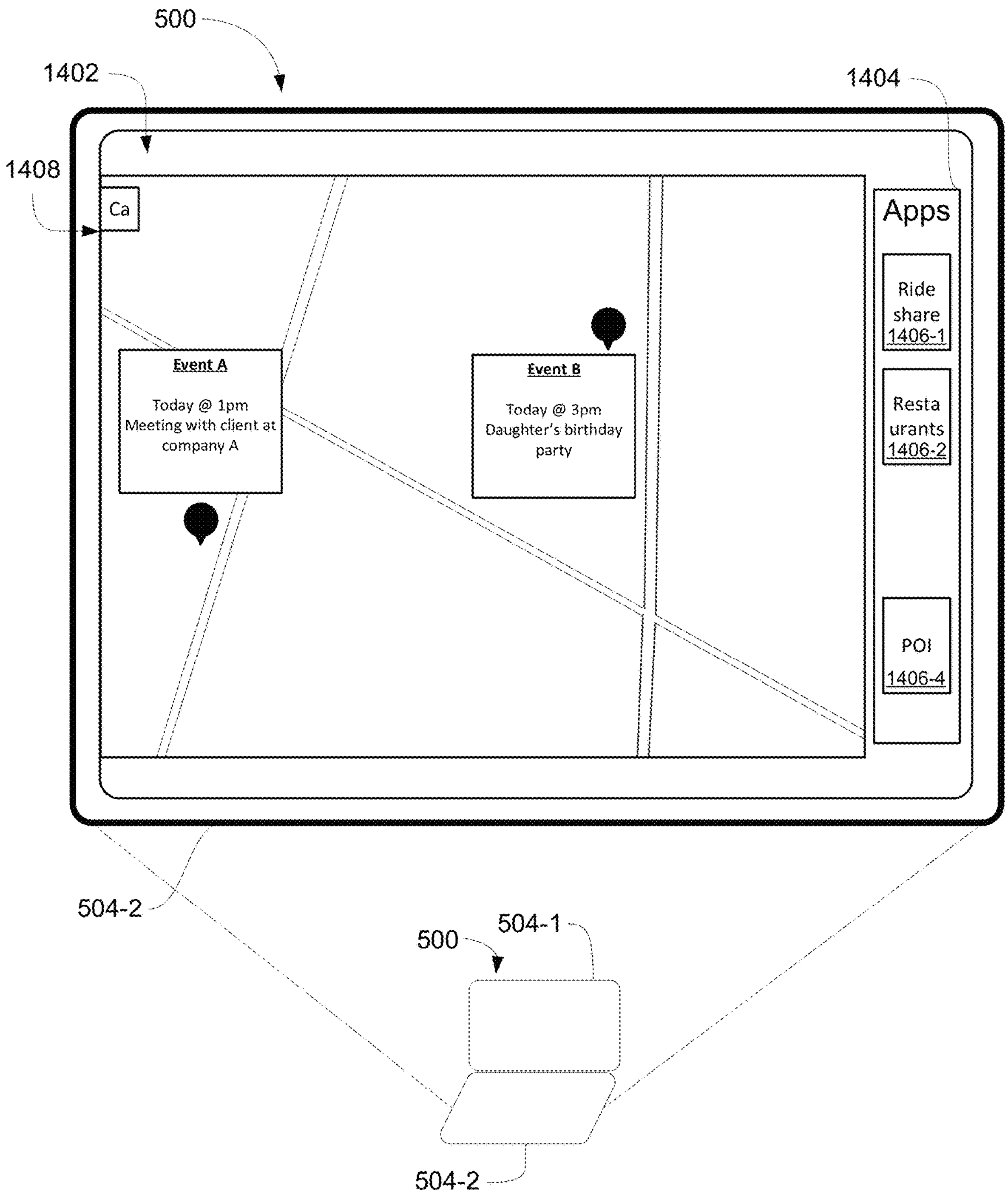

FIGS. 14F-14I illustrate the display of information from the calendar application followed by the display of information from the restaurants application. For example, in FIG. 14F, the calendar application is dragged onto map 1402, as described previously, while map 1402 is not displaying information from any application. In response, device 500 provides map 1402 as an input space to the calendar application, which displays, on map 1402, various information from the calendar application that correspond to the portion of map 1402 that is displayed on touch screen 504-2, such as shown in FIG. 14G. For example, in FIG. 14G, the calendar application has added, to map 1402, information (e.g., time, description, etc.) about Events A and B in the user's calendar at the locations of those events on map 1402. Further, device 500 displays in active application section 1408 a representation "Ca" of the calendar application.

Figure 14H:
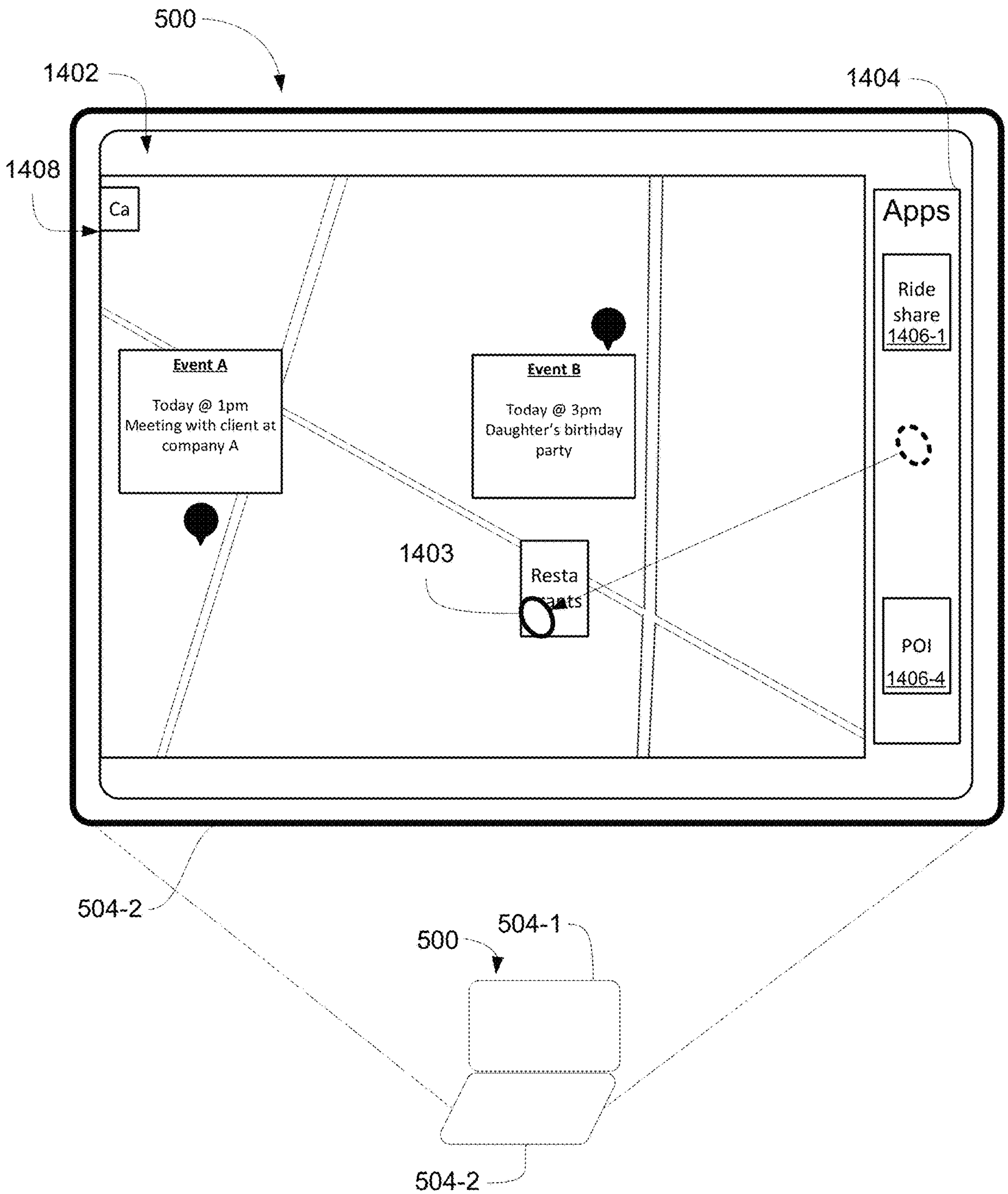
Figure 14I:
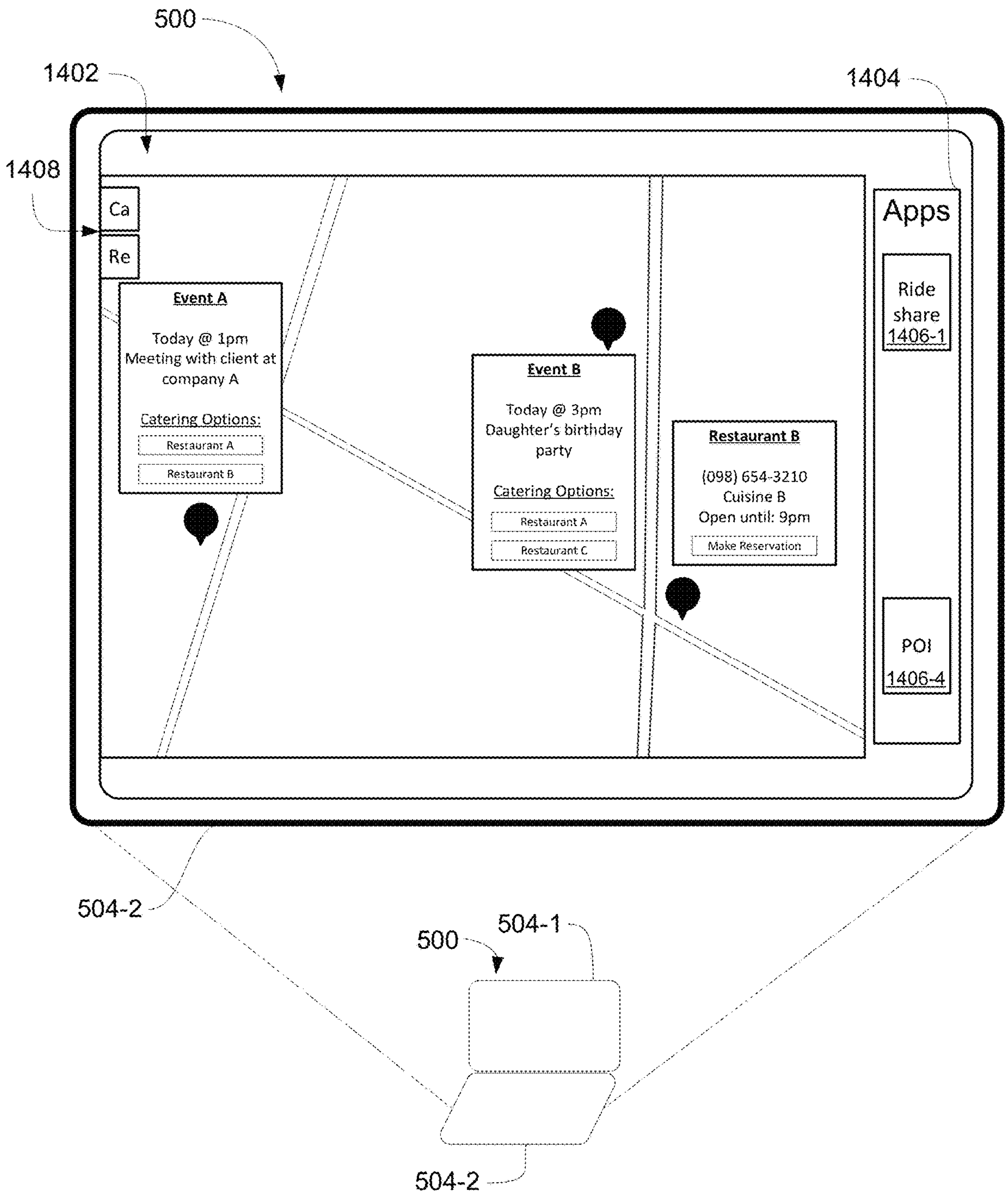
Figure 14J:
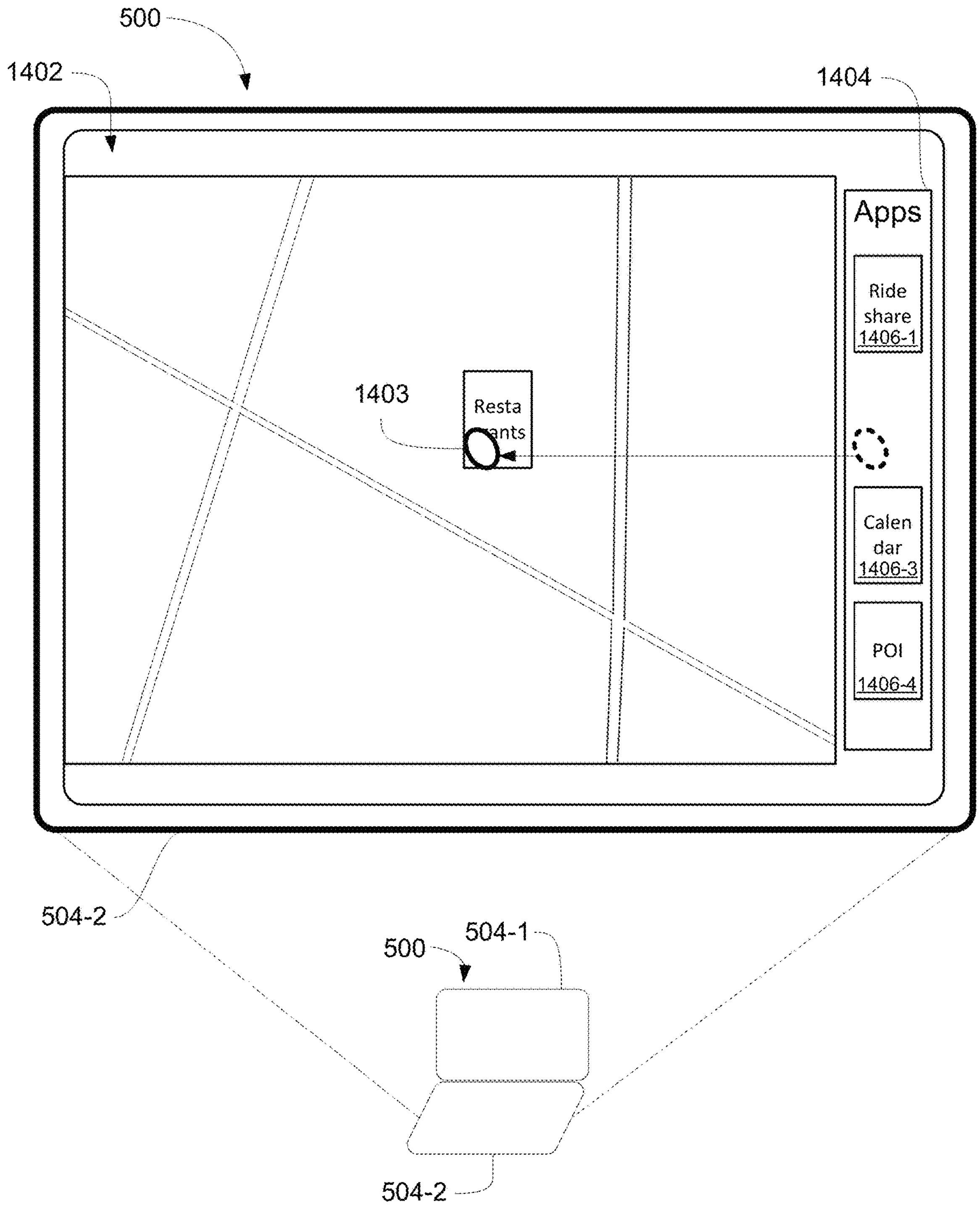
Figure 14K:
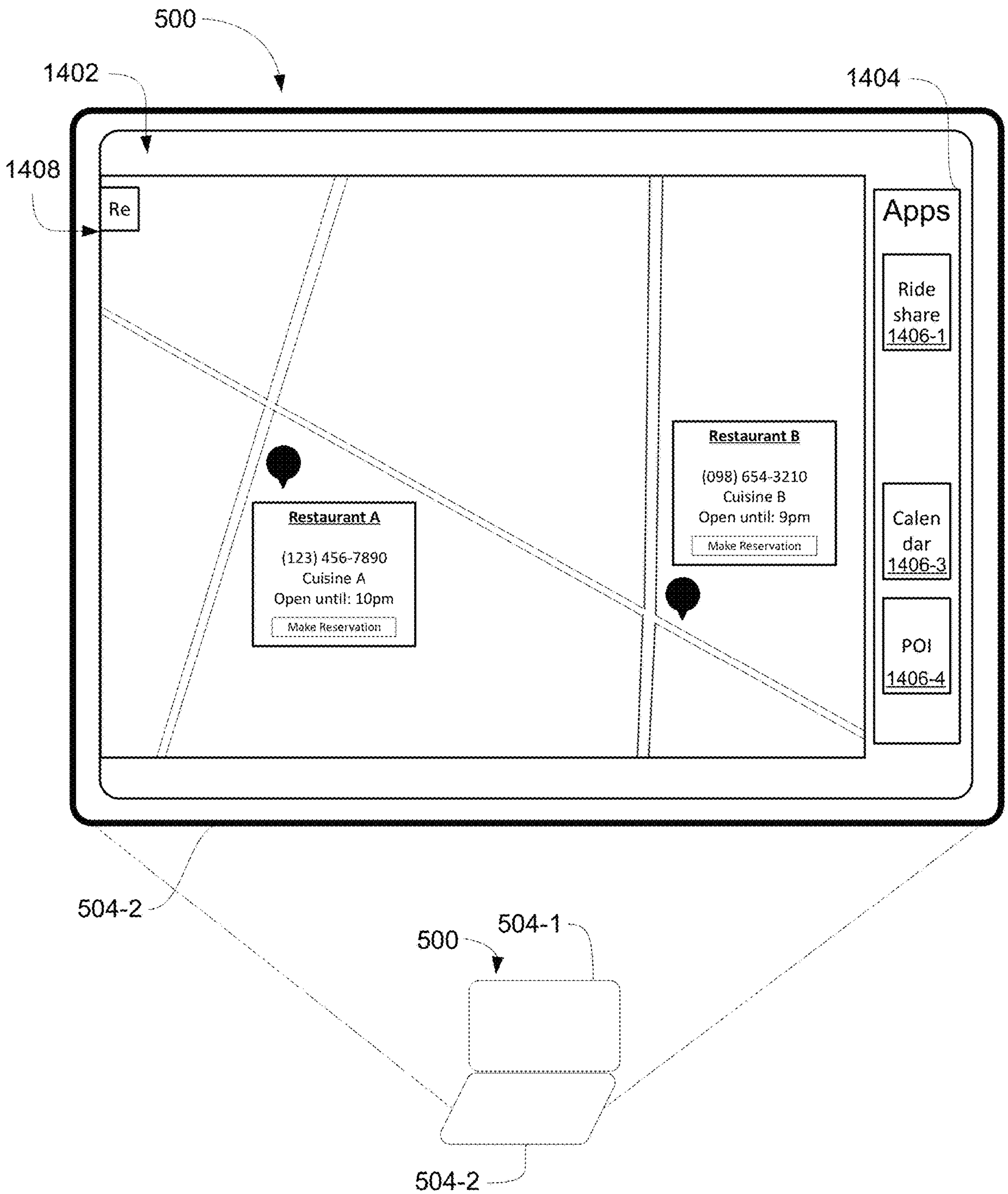
Figure 14L:
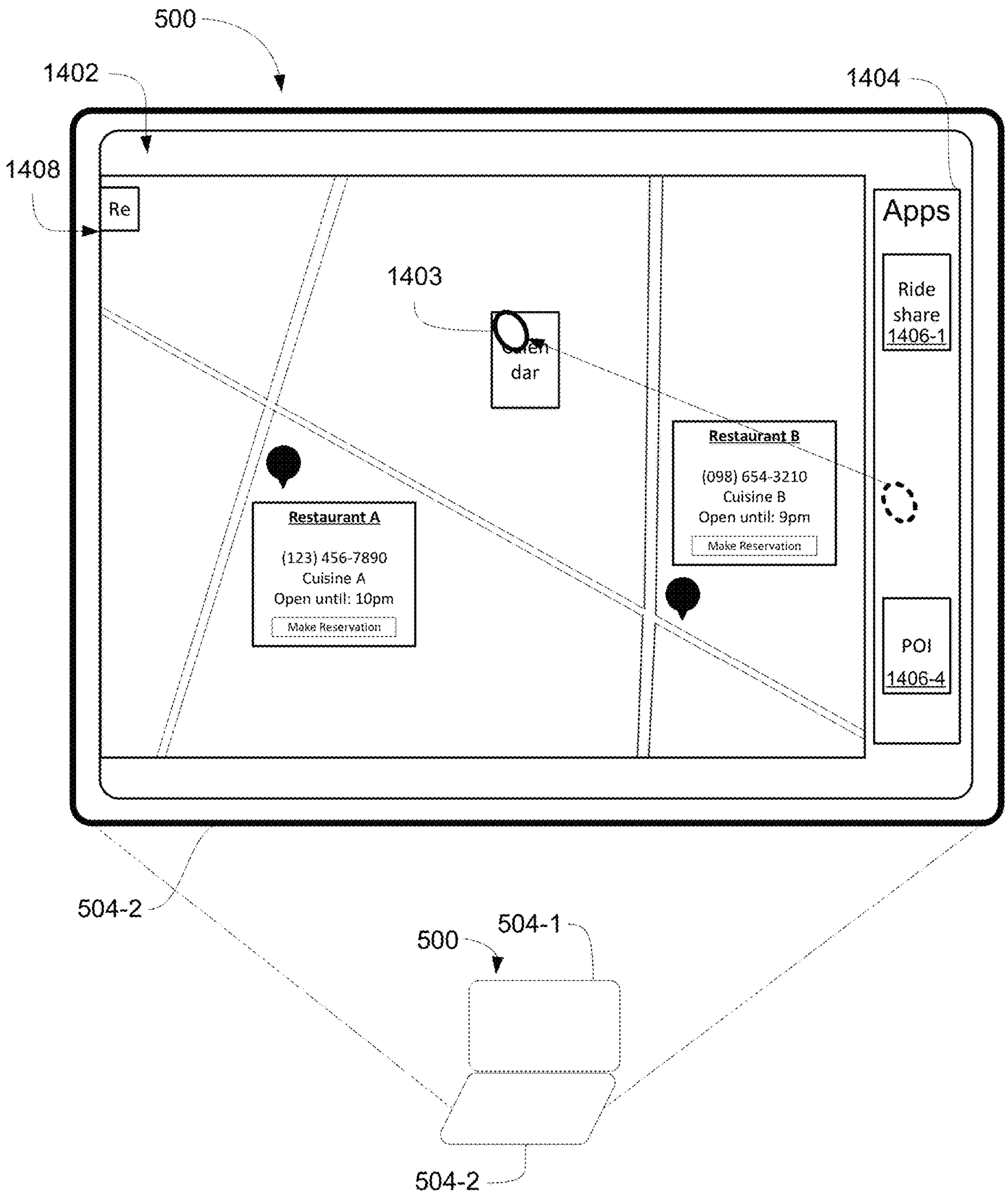

In FIG. 14H, the restaurants application is dragged onto map 1402, as described previously, while the calendar application is displaying information on map 1402. In response, device 500 updates map 1402 to additionally display information from the restaurants application, as shown in FIG. 14I. For example, the restaurants application takes as inputs map 1402 as a whole, as well as the information that was being displayed by the calendar application on map 1402 (e.g., because that information was being displayed on map 1402 when the restaurants application was dragged to map 1402). Thus, in FIG. 14I, the restaurants application has updated the information displayed about Events A and B with restaurants information from the restaurants application that corresponds to those events (e.g., information about which restaurants are available for catering those events, and selectable buttons for arranging for such catering). Additionally, the restaurants application has displayed additional information on map 1402 from the restaurants application, such as information about Restaurant B displayed at the location of Restaurant B on map 1402 (e.g., as described with reference to FIG. 14C). Finally, device 500 has updated the active application section 1408 to display a representation of the restaurants application "Re" as well as the representation of the calendar application "Ca".

Figure 14M:
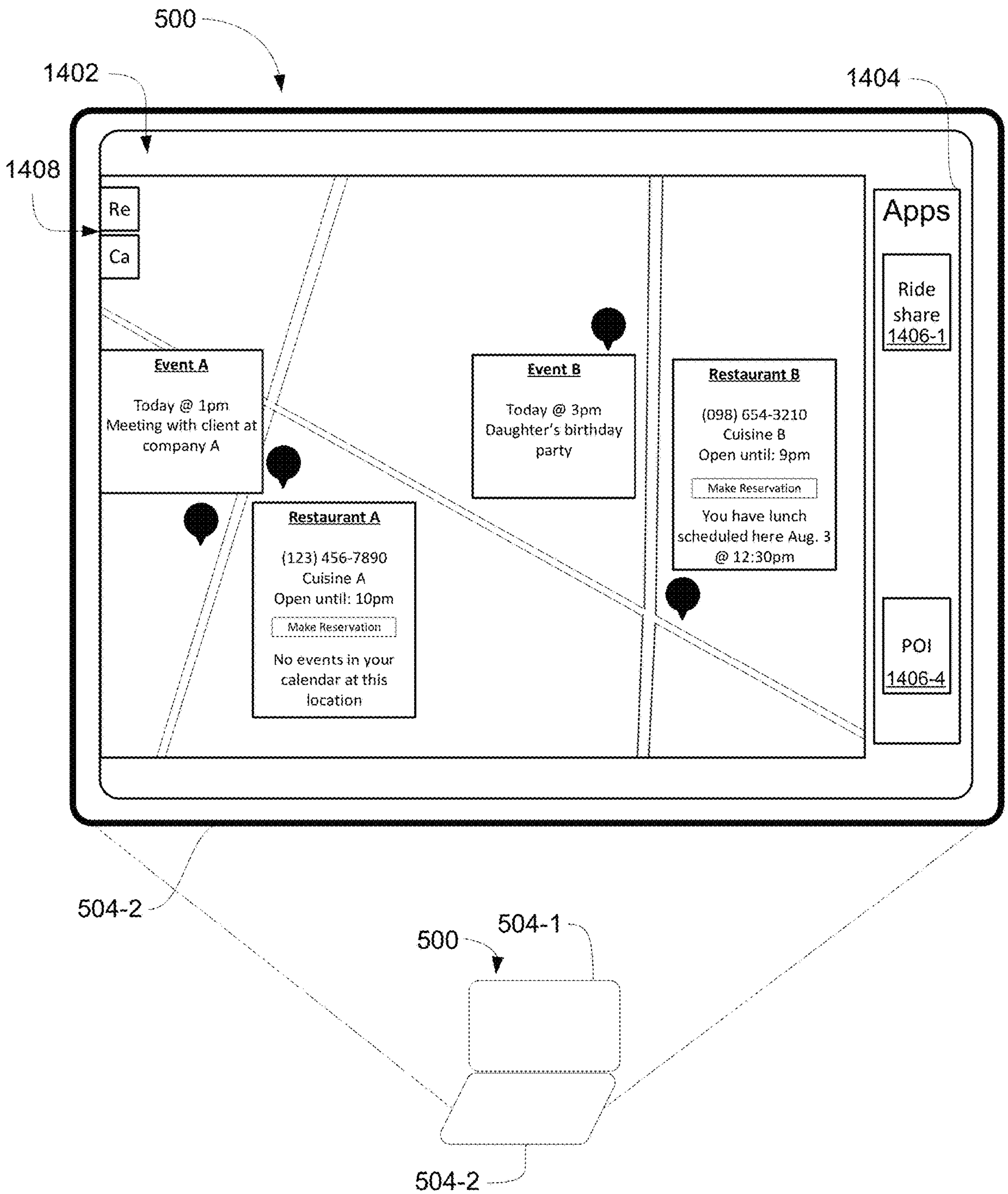
Figure 15A:
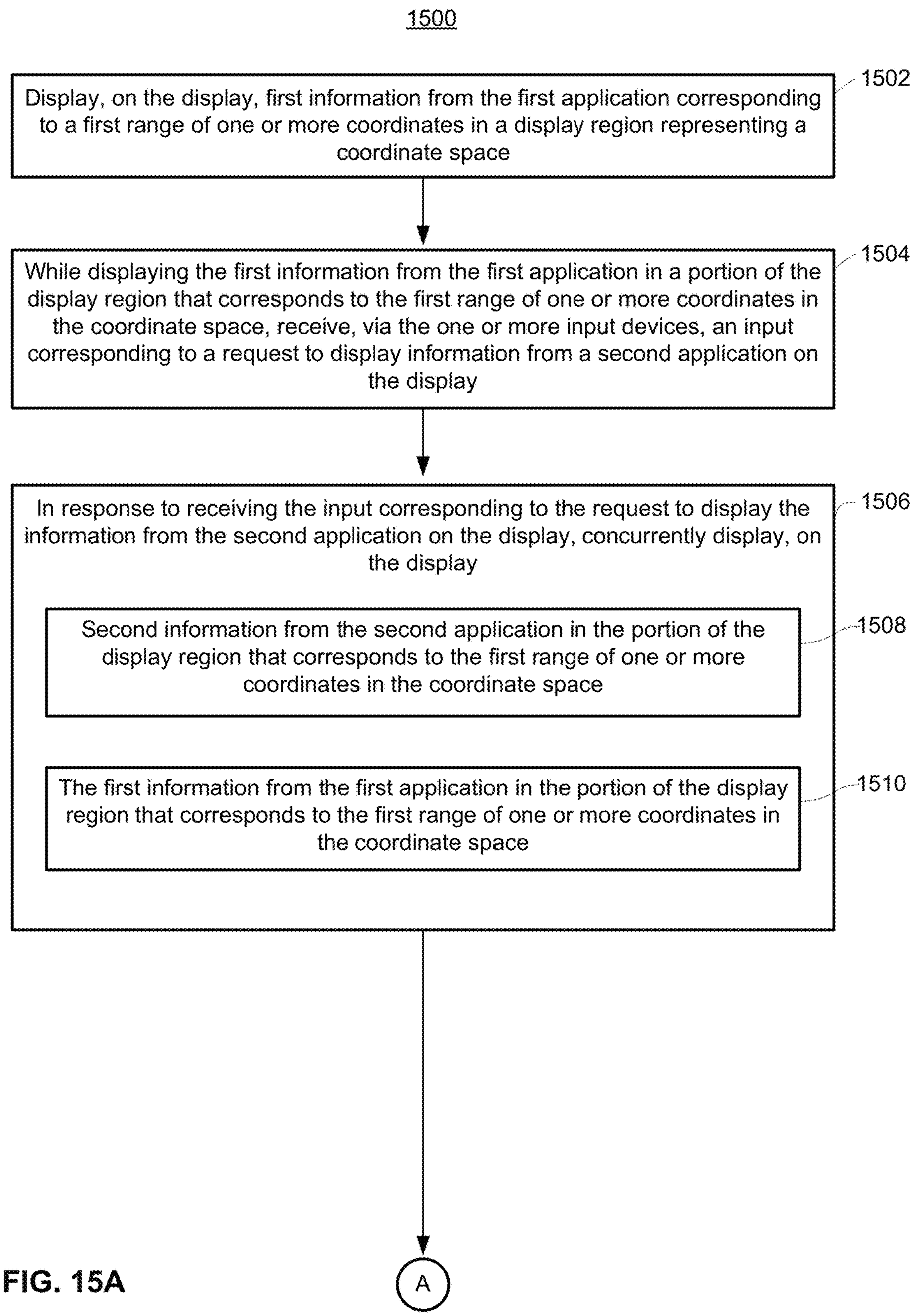
FIGS. 15A-15F are flow diagrams illustrating a method of facilitating the display of information from applications using a shared graphical input coordinate space in accordance with some embodiments of the disclosure.
Figure 15B:
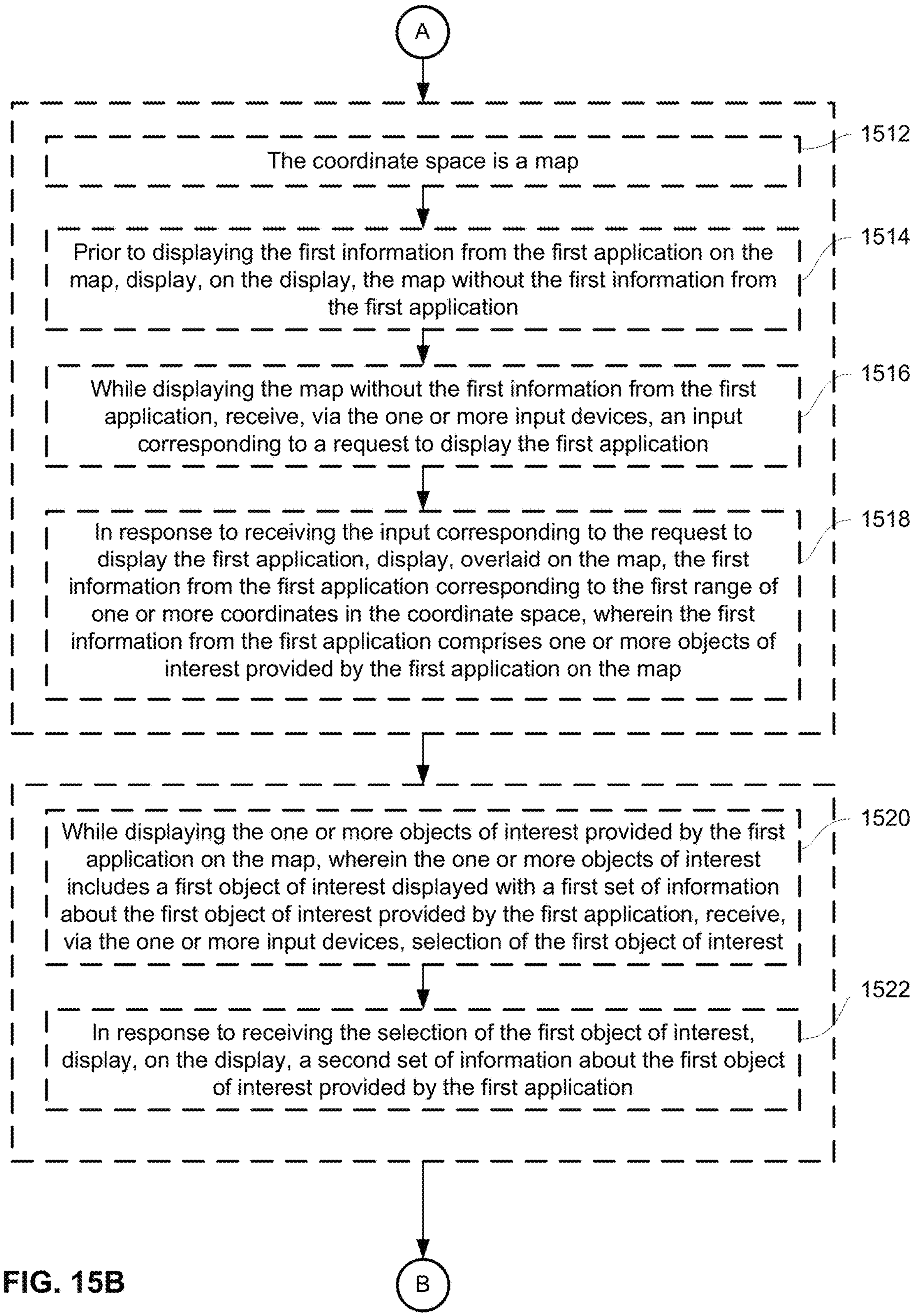
Figure 15C:
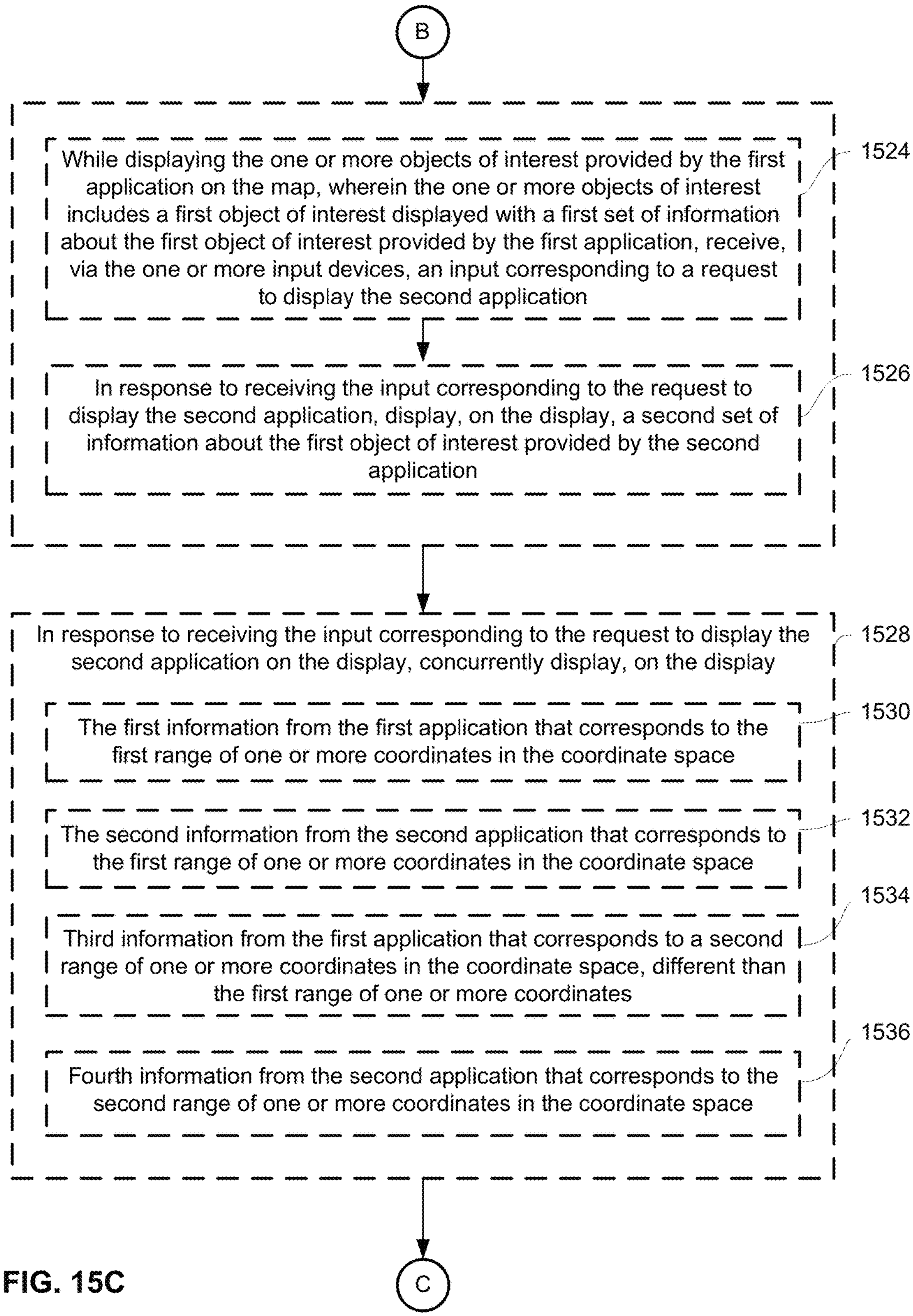
Figure 15D:
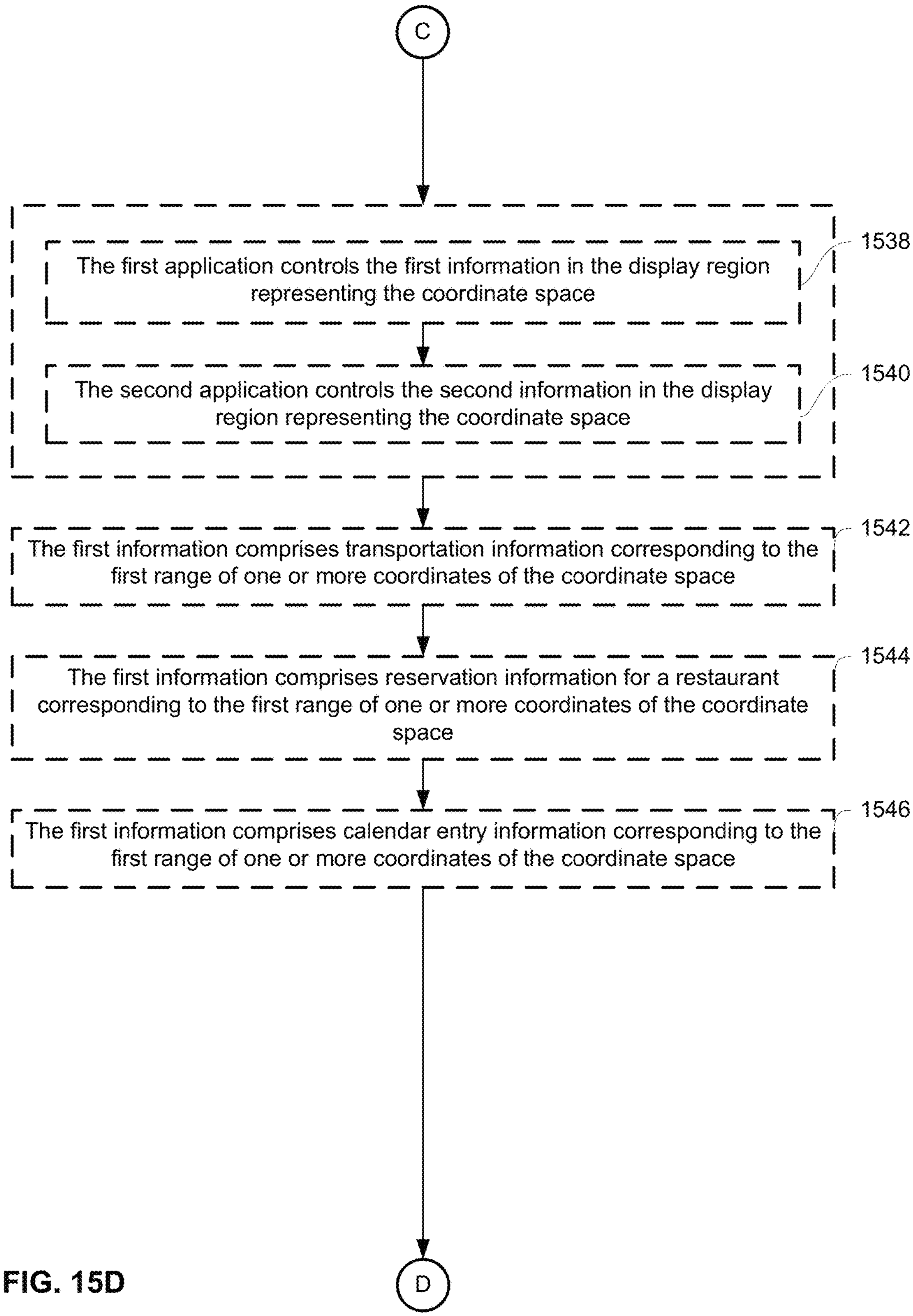
Figure 15E:
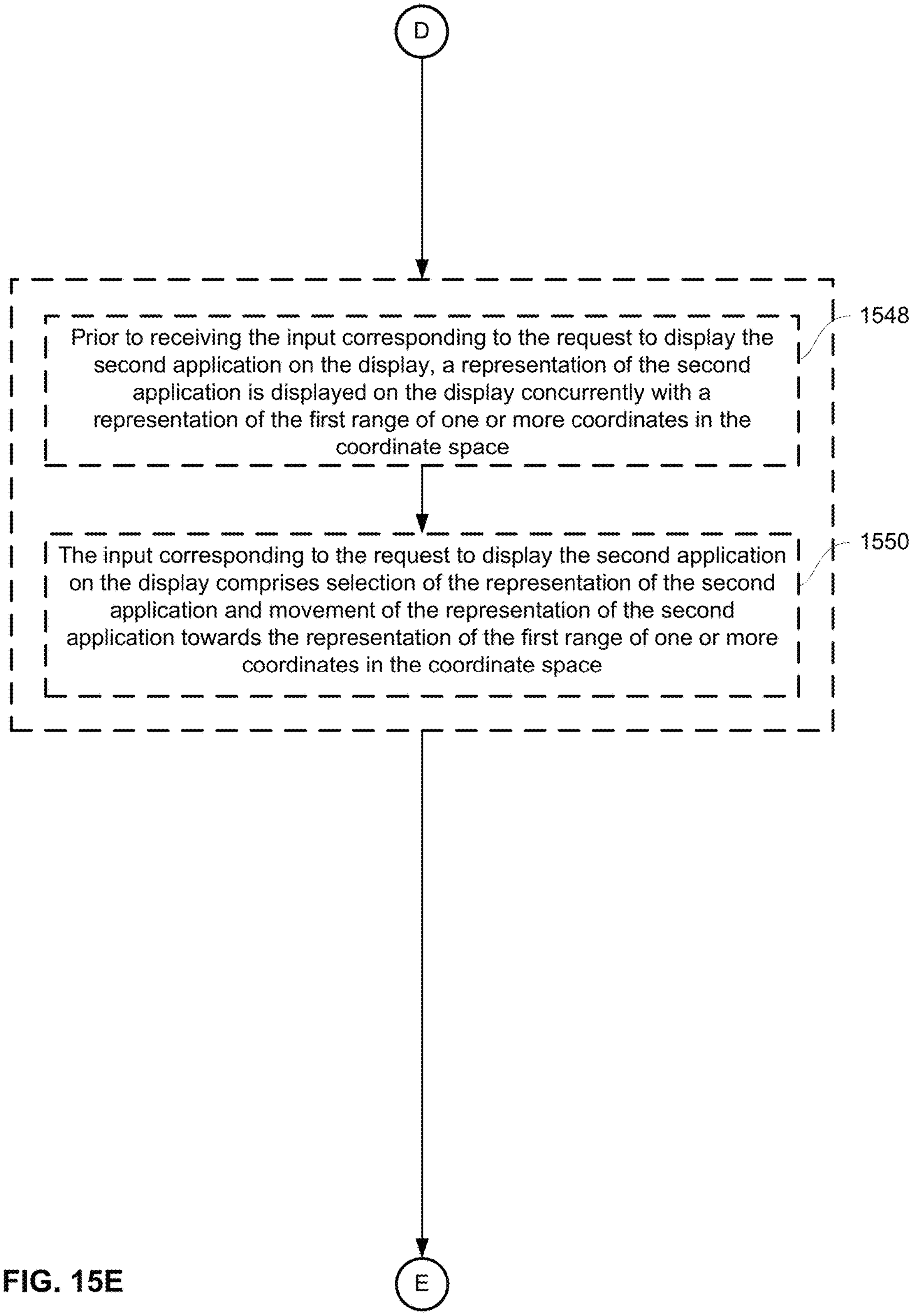
Figure 15F:
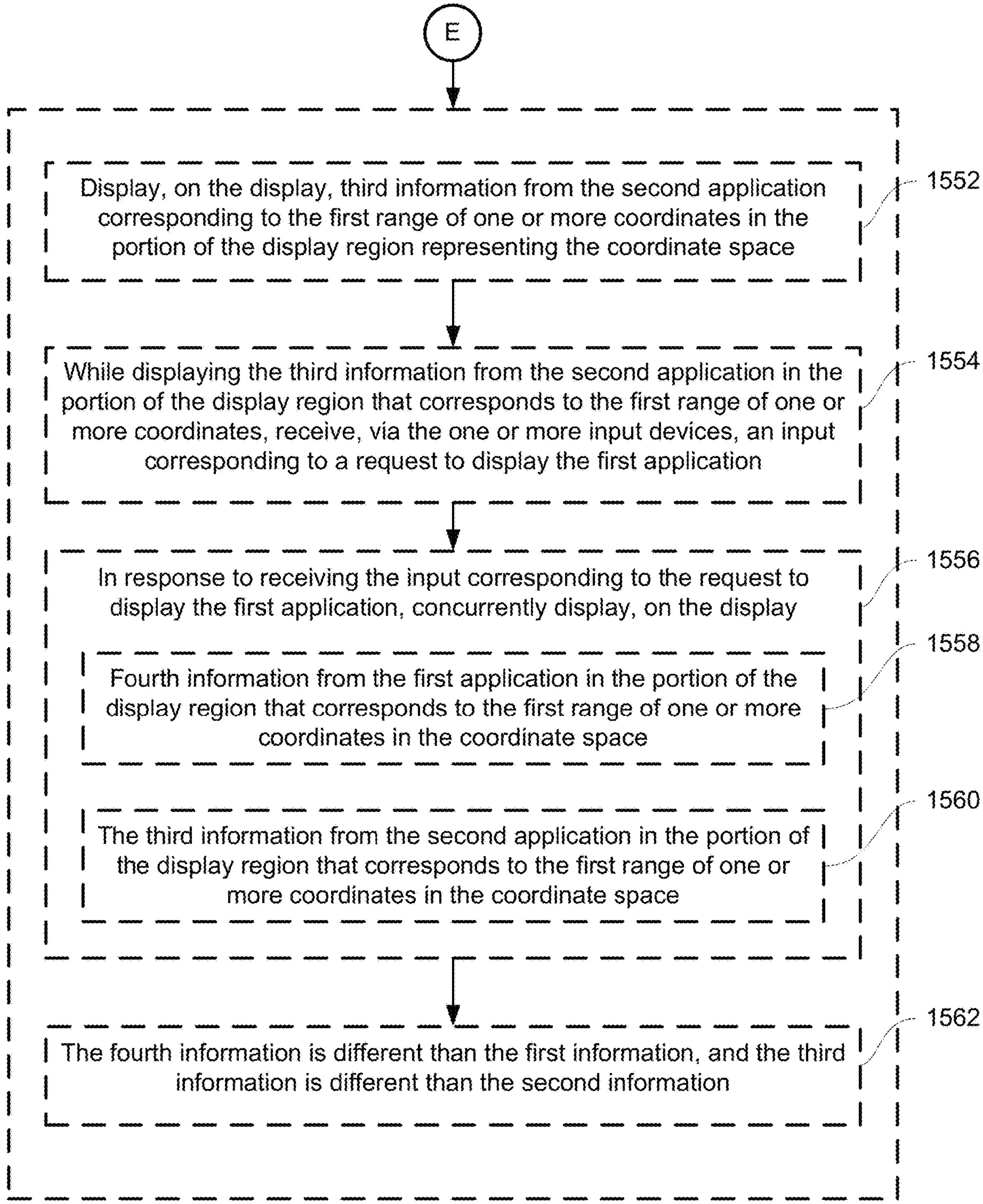

In some embodiments, because the information displayed by a prior application is provided to a next-displayed application as an input, as described above, the order in which the applications are displayed on map 1402 affects the information that is displayed on map 1402. For example, in FIGS. 14J-14K, the restaurants application is dragged onto map 1402 and displays information on map 1402, as described with reference to FIG. 14C. Next, the calendar application is dragged onto map in FIG. 14L, and displays information on map 1402 as shown in FIG. 14M. Notably, in FIG. 14M, the same applications are displaying information on map 1402 as in FIG. 14I, but the order of the display of applications in FIG. 14M is: 1) restaurants application; and 2) calendar application, which is the reverse of the order that is illustrated in FIG. 14I, which is: 1) calendar application; and 2) restaurants application. In FIG. 14M, the calendar application has updated the restaurant information with information from the user's calendar (e.g., information about whether the user has an event at that restaurant in their calendar), and has additionally added information about events in the user's calendar that relate to map 1402 (e.g., as described with reference to FIG. 14G). The information displayed on map 1402 in FIG. 14M is different than the information displayed on map 1402 in FIG. 14I. This is optionally due to the fact that the information displayed by the first (or prior) application is provided as an input to the second (or next) application, which optionally affects the information displayed by the second (or next) application (e.g., the second application optionally displays information corresponding to the information displayed by the first application, such as providing catering options to events that are already displayed on map 1402, or providing calendar information to restaurants that are already displayed on map 1402).

FIGS. 15A-15F are flow diagrams illustrating a method of facilitating the display of information from applications using a shared graphical input coordinate space in accordance with some embodiments of the disclosure. The method 1500 is optionally performed at an electronic device such as device 100, device 300, or device 500 as described above with reference to FIGS. 1A-1B, 2-3, 4A-4B and 5A-5H. Some operations in method 1500 are, optionally, combined and/or the order of some operations is, optionally, changed.

As described below, the method 1500 provides ways of facilitating the display of information from applications using a shared graphical input coordinate space. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display and one or more input devices (e.g., electronic device 500, a phone, tablet computer, laptop, etc. including a touch screen or a display, such as touch screen 504-2 in FIG. 14A, or a set-top box in communication with a television) displays (1502), on the display, first information from the first application corresponding to a first range of one or more coordinates in a display region representing a coordinate space, such as the restaurant information displayed in FIG. 14C on map 1402. The input coordinate space is optionally a coordinate space, such as a map 1402, that is displayable on the display. The input coordinate space is optionally displayed first, then the first application is optionally displayed as overlaid over the input coordinate space such that the input coordinate space continues to be displayed, and one or more user interface elements/objects of the first application are displayed over the input coordinate space, such as in FIG. 14C. The user interface elements/objects of the first application optionally display information related to one or more coordinates of the input coordinate space, and the user interface elements/objects are optionally displayed at those one or more coordinates on the displayed input coordinate space, such as the restaurants displayed in FIG. 14C. For example, the input coordinate space is optionally a map, and the first application is optionally a restaurant reservation application. When displayed, the first application optionally displays information about making reservations at various restaurants at the locations of the various restaurants in the displayed input coordinate space.

In some embodiments, while displaying the first information from the first application in a portion of the display region that corresponds to the first range of one or more coordinates in the coordinate space, the electronic device receives (1504), via the one or more input devices, an input corresponding to a request to display information from a second application on the display (e.g., without closing the first application, and cumulative to displaying the first application on the electronic device), such as dragging the ride-share application onto map 1402 in FIG. 14D. Once opened, the second application is optionally displayed as overlaid over the input coordinate space and the first application, such as shown in FIG. 14E.

In some embodiments, in response to receiving the input corresponding to the request to display the information from the second application on the display, the electronic device concurrently displays (1506), on the display: second information from the second application in the portion of the display region that corresponds to the first range of one or more coordinates in the coordinate space (1508) and the first information from the first application in the portion of the display region that corresponds to the first range of one or more coordinates in the coordinate space (1510), such as in FIG. 14E where device 500 displays both restaurant information and ride-sharing information for the restaurants displayed by the restaurants application in FIG. 14C. The information displayed in the user interface elements of the first application are optionally provided as inputs to the second application when the second application is opened, and the second application optionally displays one or more user interface elements based on those inputs. The user interface elements of the second application optionally display information related to one or more coordinates of the input coordinate space, and the user interface elements are optionally displayed at those one or more coordinates on the displayed input coordinate space. For example, if the user has selected a particular restaurant for focus in the first application (e.g., resulting in a user interface element of the first application being displayed at the location of the restaurant on the input coordinate space, and including information for making a reservation at the restaurant), and the second application is an application for arranging transportation to the restaurant, when the second application is opened, the second application optionally displays a user interface object at the location of the restaurant on the input coordinate space that includes information for arranging transportation to the restaurant to arrive in time for the reservation at the restaurant, such as the ETA and "Book Ride" buttons shown in FIG. 14E.

The above-described manner of displaying different information from different applications on a shared input coordinate space allows the electronic device to present information to the user in an ordered fashion, which simplifies interactions between the user and the device and enhances the operability of the device and makes the user-device interface more efficient (e.g., by helping the user to view more information using fewer inputs provided to the device due at least in part to consistent presentation of information to the user), which, additionally, reduces power usage and improves battery life of the device by enabling the user to use the device more quickly and efficiently.

In some embodiments, the coordinate space is a map (1512) (e.g., a map of a given geography, such as a city or a neighborhood in a city), such as map 1402 in FIGS. 14A-14M. In some embodiments, prior to displaying the first information from the first application on the map (e.g., prior to displaying the restaurant/reservation objects on the map), the electronic device displays (1514), on the display, the map without the first information from the first application (e.g., displaying only the map without any restaurant reservation and/or transportation objects on the map), such as displaying the map 1402 in FIG. 14A. In some embodiments, while displaying the map without the first information from the first application, the electronic device receives (1516), via the one or more input devices, an input corresponding to a request to display the first application (e.g., an input to open the first application and, thus, overlay the map with an application layer corresponding to the first application), such as the dragging of the Restaurants application over map 1402 in FIG. 14B.

In some embodiments, in response to receiving the input corresponding to the request to display the first application, the electronic device displays (1518), overlaid on the map, the first information from the first application corresponding to the first range of one or more coordinates in the coordinate space, wherein the first information from the first application comprises one or more objects of interest provided by the first application on the map (e.g., displaying objects generated by the first application on the map at locations on the map that correspond to those objects), such as the restaurants and their corresponding information displayed on map 1402 in FIG. 14C. For example, in the case of a restaurant review/reservation application, representations of one or more recommended restaurants are optionally displayed on the map at the locations of those restaurants in response to the request to display/launch the restaurant review/reservation application. In some embodiments, those representations include information about the restaurants, a mechanism for making reservations at those restaurants, etc.

The above-described manner of progressively displaying application-generated information on the map allows the electronic device to present information to the user in an ordered fashion, which simplifies interactions between the user and the device and enhances the operability of the device and makes the user-device interface more efficient (e.g., by helping the user to view more information using fewer inputs provided to the device due at least in part to consistent presentation of information to the user), which, additionally, reduces power usage and improves battery life of the device by enabling the user to use the device more quickly and efficiently.

In some embodiments, while displaying the one or more objects of interest provided by the first application on the map, wherein the one or more objects of interest includes a first object of interest (e.g. Restaurant A in FIG. 14C) displayed with a first set of information about the first object of interest provided by the first application (e.g., displaying a representation of a restaurant at a location of the restaurant on the map, where the representation includes the address of the restaurant, the phone number for the restaurant and a summary of reviews of the restaurant, such as the phone number, cuisine, hours and reservation button displayed for Restaurant A in FIG. 14C), the electronic device receives (1520), via the one or more input devices, selection of the first object of interest (e.g., a tap input detected on the first representation), such as selection of the Restaurant A representation shown in FIG. 14C.

In some embodiments, in response to receiving the selection of the first object of interest, the electronic device displays (1522), on the display, a second set of information about the first object of interest provided by the first application, such as adding to or replacing the information shown about Restaurant A in FIG. 14C with additional information about Restaurant A. In some embodiments, expanding the representation of the restaurant at the location of the restaurant on the map includes additional information about the restaurant, such as information/affordances selectable to make reservations at the restaurant, information about the menu items at the restaurant, individual reviews of the restaurant (as opposed to a summary of reviews of the restaurant, etc.).

The above-described manner of displaying additional information about a selected object of interest allows the electronic device to avoid displaying information until the user expresses interest, which simplifies interactions between the user and the device and enhances the operability of the device and makes the user-device interface more efficient (e.g., by reducing the display of unnecessary information by the device), which, additionally, reduces power usage and improves battery life of the device by enabling the user to use the device more quickly and efficiently.

In some embodiments, while displaying the one or more objects of interest provided by the first application on the map, wherein the one or more objects of interest includes a first object of interest displayed with a first set of information about the first object of interest provided by the first application (e.g., a representation of a restaurant on the map displayed at a location on the map where the restaurant is located), such as Restaurant A in FIG. 14C, the electronic device receives (1524), via the one or more input devices, an input corresponding to a request to display the second application (e.g., an input to open the second application and, thus, overlay the map and the first application layer with an application layer corresponding to the second application), such as the dragging of the Ride-Share application onto map 1402 in FIG. 14D.

In some embodiments, in response to receiving the input corresponding to the request to display the second application, the electronic device displays (1526), on the display, a second set of information about the first object of interest provided by the second application, such as the ETA and "Book Ride" information shown about Restaurant A in FIG. 14E. The object(s) of interest defined/displayed by the first application on the map are optionally provided as inputs to the second application, which then displays information it has about those object(s) of interest at the location on the map where those object(s) of interest are located. In some embodiments, the object(s) displayed by the first application are expanded to include the information from the second application, such as shown in FIG. 14E, and in some embodiments, the object(s) from the second application are displayed alongside the object(s) from the first application. For example, if the first application displays restaurant information for a given restaurant as described above, and the second application is a transportation application (e.g., taxi or ride-sharing application), displaying the second application over the first application (and the representation of the restaurant) optionally causes display, at the location of the restaurant on the map, information/affordances selectable to arrange for transportation to the restaurant using the transportation application, such as the "Book Ride" button for Restaurant A shown in FIG. 14E. This transportation information is optionally displayed concurrently with (e.g., supplements) the restaurant information displayed by the first application.

The above-described manner of displaying further information from another application on the device allows the electronic device to display additional information in a progressive and ordered manner, which simplifies interactions between the user and the device and enhances the operability of the device and makes the user-device interface more efficient (e.g., by helping the user to view more information using fewer inputs provided to the device due at least in part to consistent presentation of information to the user), which, additionally, reduces power usage and improves battery life of the device by enabling the user to use the device more quickly and efficiently.

In some embodiments, in response to receiving the input corresponding to the request to display the second application on the display, the electronic device concurrently displays (1528), on the display: the first information from the first application that corresponds to the first range of one or more coordinates in the coordinate space (1530), such as the Restaurant A information in FIG. 14E, the second information from the second application that corresponds to the first range of one or more coordinates in the coordinate space (1532) (e.g., restaurant and transportation information is displayed for a first location on the map), such as the Restaurant A transportation information shown in FIG. 14E, third information from the first application that corresponds to a second range of one or more coordinates in the coordinate space, different than the first range of one or more coordinates (1534), such as the Restaurant B information in FIG. 14E, and fourth information from the second application that corresponds to the second range of one or more coordinates in the coordinate space (1536) (e.g., different restaurant and transportation information is displayed for a second location on the map), such as the Restaurant B transportation information shown in FIG. 14E. In this way, multiple objects of interest are optionally concurrently displayed for multiple application layers simultaneously.

The above-described manner of concurrently displaying information about multiple objects from multiple application layers allows the electronic device to present relevant information from multiple sources concurrently, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the first application controls the first information in the display region representing the coordinate space (1538) (e.g., the content of the first information, the placement of the first information on the coordinate space, etc.), such as the restaurant information displayed by the Restaurants application in FIG. 14E. For example, a restaurant application optionally controls which restaurants to display on the map, what information to include about those restaurants, etc.

In some embodiments, the second application controls the second information in the display region representing the coordinate space (1540) (e.g., the content of the second information, the placement of the second information on the coordinate space, etc.), such as the ride-sharing information displayed by the Ride-Share application in FIG. 14E. For example, a transportation application optionally controls which transportation options to display on the map, what information to include about those transportation options, where to display those transportation options on the map (e.g., to indicate the location of taxis, ridesharing cars, etc.), etc. In some embodiments, the information displayed by the first application is provided as an input to the second application to inform what is displayed by the second application, such that the display of information about restaurant A by application A optionally results in the display of transportation information for restaurant A by application B, such as shown in FIG. 14E.

The above-described manner of having the applications individually control their displayed information on the shared coordinate space allows the electronic device to ensure consistent presentation of application-specific information on the shared coordinate space, which simplifies interactions between the user and the device and enhances the operability of the device and makes the user-device interface more efficient (e.g., by helping the user to view more information using fewer inputs provided to the device due at least in part to consistent presentation of information to the user), which, additionally, reduces power usage and improves battery life of the device by enabling the user to use the device more quickly and efficiently.

In some embodiments, the first information comprises transportation information corresponding to the first range of one or more coordinates of the coordinate space (1542) (e.g., information/affordances selectable to make transportation arrangements to a given restaurant, such as ridesharing or taxi arrangements), such as the transportation information (e.g., car locations, ride-share ETAs, "Book Ride" buttons) shown in FIG. 14E.

The above-described manner of displaying transportation information on the map allows the electronic device to present easily-accessible transportation information to the user, which simplifies interactions between the user and the device and enhances the operability of the device and makes the user-device interface more efficient (e.g., by helping the user to access transportation information using fewer inputs), which, additionally, reduces power usage and improves battery life of the device by enabling the user to use the device more quickly and efficiently.

In some embodiments, the first information comprises reservation information for a restaurant corresponding to the first range of one or more coordinates of the coordinate space (1544) (e.g., information/affordances selectable to make reservations at a given restaurant), such as the restaurant information (e.g., restaurant names, phone numbers, cuisine, hours, reservation buttons) shown in FIG. 14C.

The above-described manner of displaying restaurant reservation information on the map allows the electronic device to present easily-accessible reservation information to the user, which simplifies interactions between the user and the device and enhances the operability of the device and makes the user-device interface more efficient (e.g., by helping the user to access reservation information using fewer inputs), which, additionally, reduces power usage and improves battery life of the device by enabling the user to use the device more quickly and efficiently.

In some embodiments, the first information comprises calendar entry information corresponding to the first range of one or more coordinates of the coordinate space (1546) (e.g., information about events included in a calendar of the user, displayed at locations that correspond to those events on the map), such as the Event A and Event B information shown by the Calendar application in FIG. 14G. For example, if the user has a meeting at location A at 12 pm, and a meeting at location B at 2 pm, information about the user's meeting at location A is optionally displayed at location A on the map, and information about the user's meeting at location B is optionally displayed at location B on the map, such as shown in FIG. 14G.

The above-described manner of displaying calendar information on the map allows the electronic device to present easily-accessible calendar information to the user, which simplifies interactions between the user and the device and enhances the operability of the device and makes the user-device interface more efficient (e.g., by helping the user to access calendar information using fewer inputs), which, additionally, reduces power usage and improves battery life of the device by enabling the user to use the device more quickly and efficiently.

In some embodiments, prior to receiving the input corresponding to the request to display the second application on the display, a representation of the second application is displayed on the display concurrently with a representation of the first range of one or more coordinates in the coordinate space (1548), such as representations 1406 shown in dock 1404 next to map 1402 in FIG. 14C. A dock (e.g., 1404) of applications is optionally displayed concurrently with the map (e.g., 1402) and/or information that is already displayed on the map (e.g., restaurant information in FIG. 14C). The dock of applications optionally includes representations (e.g., 1406) of one or more applications, including the first and second applications, that are selectable to display/launch the corresponding applications over the map.

In some embodiments, the input corresponding to the request to display the second application on the display comprises selection of the representation of the second application and movement of the representation of the second application towards the representation of the first range of one or more coordinates in the coordinate space (1550), such as the dragging of representation 1406-1 to map 1402 in FIG. 14D. In some embodiments, an input pulls the second application into/over the map that is displayed alongside the dock of applications such that the effect is that of bringing the application to the content/input to that application, as opposed to bringing the content/input to the application (e.g., which would occur if the content/input were dragged to the application icon).

The above-described manner of displaying an application dock and providing for display of the applications in that dock allows the electronic device to provide an intuitive and efficient way for a user to display an application over a coordinate space, which simplifies interactions between the user and the device and enhances the operability of the device and makes the user-device interface more efficient (e.g., by helping the user to efficiently layer the applications on the coordinate space), which, additionally, reduces power usage and improves battery life of the device by enabling the user to use the device more quickly and efficiently.

In some embodiments, the electronic device displays (1552), on the display, third information from the second application corresponding to the first range of one or more coordinates in the portion of the display region representing the coordinate space (e.g., displaying, on the map, objects/information from the second application, such as a transportation/ridesharing application), such as the display of the locations of calendar events in FIG. 14G. In some embodiments, displaying this information from the second application includes displaying locations of taxis/ridesharing cars on the map, such as shown in FIG. 14E.

In some embodiments, while displaying the third information from the second application in the portion of the display region that corresponds to the first range of one or more coordinates, the electronic device receives (1554), via the one or more input devices, an input corresponding to a request to display the first application (e.g., an input to open the first application and, thus, overlay the map and the second application layer with an application layer corresponding to the first application), such as the dragging of the Restaurants application to map 1402 in FIG. 14H.

In some embodiments, in response to receiving the input corresponding to the request to display the first application, the electronic device concurrently displays (1556), on the display: fourth information from the first application in the portion of the display region that corresponds to the first range of one or more coordinates in the coordinate space (1558) (e.g., restaurant information that is newly displayed from the restaurant application that was just displayed/launched), such as the catering options shown for Events A and B in FIG. 14I, and the third information from the second application in the portion of the display region that corresponds to the first range of one or more coordinates in the coordinate space (1560) (e.g., the transportation information that was displayed on the map by the second application prior to the display of the first application), such as the event information for Events A and B in FIG. 14I.

In some embodiments, the fourth information is different than the first information, and the third information is different than the second information (1562). In some embodiments, the resulting information displayed when the map is first overlaid with the first application and then the second application is optionally different than the resulting information displayed when the map is first overlaid with the second application and then the first application, such as shown in FIGS. 14I and 14M where the resulting display of information on map 1402 when the Calendar application is first displayed on map 1402 followed by the Restaurants application (e.g., FIG. 14I) is different than the resulting display of information on map 1402 when the Restaurants application is first displayed on map 1402 followed by the Calendar application (e.g., FIG. 14M). For example, in the case that the first application is a restaurant review/reservation application and the second application is a transportation application, first overlaying the map with the restaurant application optionally causes one or more restaurants of interest to be displayed on the map (along with information about those restaurants), and then overlaying the map and the restaurant application with the transportation application optionally causes additional display of transportation information for those previously-displayed restaurants, as the restaurants displayed by the restaurant application are optionally provided as inputs to the transportation application. In contrast, first overlaying the map with the transportation application optionally causes one or more representations of transportation options (e.g., taxis, ridesharing cars, bus stops, etc.) to be displayed on the map, and then overlaying the map and the transportation application with the restaurant application optionally causes additional display of restaurant information for those previously-displayed transportation options (e.g., restaurants close to the bus stops, restaurants close to the user's current location, restaurants to which the previously-displayed transportation options are able to transport the user), because, as above, as the transportation options displayed by the transportation application are optionally provided as inputs to the restaurant application. As such, the order in which the various applications are displayed optionally affects the resulting information that is displayed on the map.

The above-described manner of displaying different information based on the order in which the applications were displayed allows the electronic device to provide a flexible, robust and predictable result to the user (e.g., one in which the currently-displayed information is provided as an input to the next-displayed application), which simplifies interactions between the user and the device and enhances the operability of the device and makes the user-device interface more efficient (e.g., by providing logically consistent interaction with the user), which, additionally, reduces power usage and improves battery life of the device by enabling the user to use the device more quickly and efficiently.

It should be understood that the particular order in which the operations in FIGS. 15A-15F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1700, 1900 and 2100) are also applicable in an analogous manner to method 1500 described above with respect to FIGS. 15A-15F. For example, the content, electronic devices, user interfaces, applications, user interactions, etc., described above with reference to method 1500 optionally have one or more of the characteristics of the content, electronic devices, user interfaces, applications, user interactions, etc. described herein with reference to other methods described herein (e.g., methods 700, 900, 1100, 1300, 1700, 1900 and 2100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 15A-15F are, optionally, implemented by components depicted in FIGS. 1A-1B. For example, displaying operations 1502 and 1506, and receiving operation 1504 are, optionally, implemented by event sorter 170, event recognizer 180, and event handler 190. Event monitor 171 in event sorter 170 detects a contact on touch screen 504-1, 504-2, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Indications of Notifications

Users interact with electronic devices in many different manners, including interacting with indications of notifications presented on the electronic devices. For example, a user may wish to interact with, view more information about, or dismiss an indication of a notification. The embodiments described below provide ways in which an electronic device facilitates the display of indications of notifications across multiple displays in accordance with some embodiments of the disclosure, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
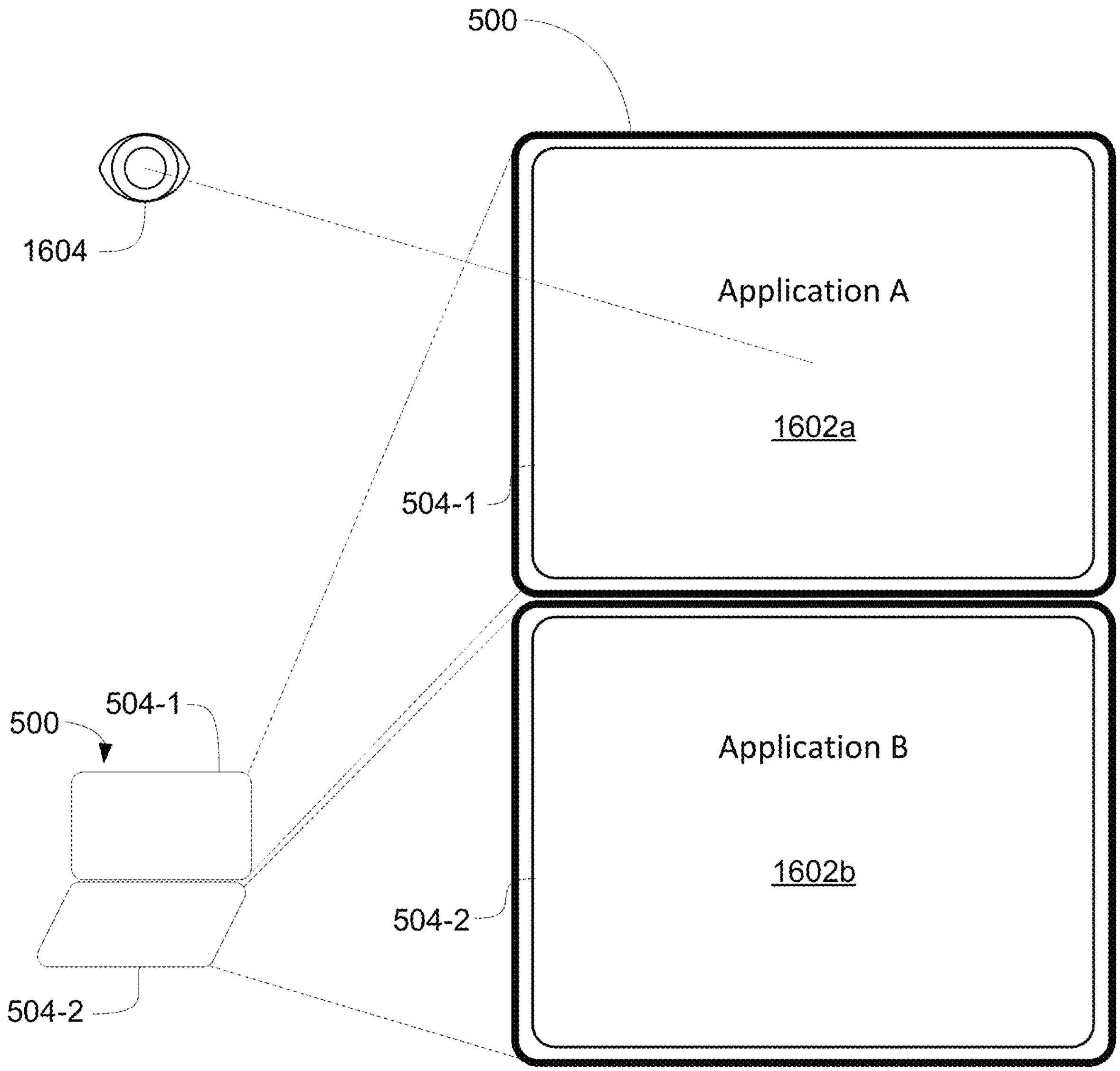
FIGS. 16A-16AA illustrate exemplary ways in which an electronic device presents indications of notifications in accordance with some embodiments of the disclosure.

FIGS. 16A-16AA illustrate exemplary ways in which an electronic device presents indications of notifications in accordance with some embodiments of the disclosure. The embodiments in these figures are used to illustrate the processed described below, including the processes described with reference to FIGS. 17A-17I.

FIGS. 16A-16D illustrate presenting a notification on one of the touch screens of an electronic device based on where the user is looking, as detected by a gaze detector of the electronic device.

FIG. 16A illustrates exemplary device 500 with touch screens 504-1 and 504-2, such as described with reference to FIGS. 5A-5H. Touch screens 504-1 and 504-2 optionally display one or more user interfaces that include various content. In the example illustrated in FIG. 16A, the first touch screen 504-1 presents a user interface 1602*a* of "Application A" and the second touch screen 504-2 presents a user interface 1602*b* of "Application B". Electronic device 500 includes a gaze detection sensor that detects that the user's gaze 1604 is directed towards the first touch screen 504-1.

Figure 16B:
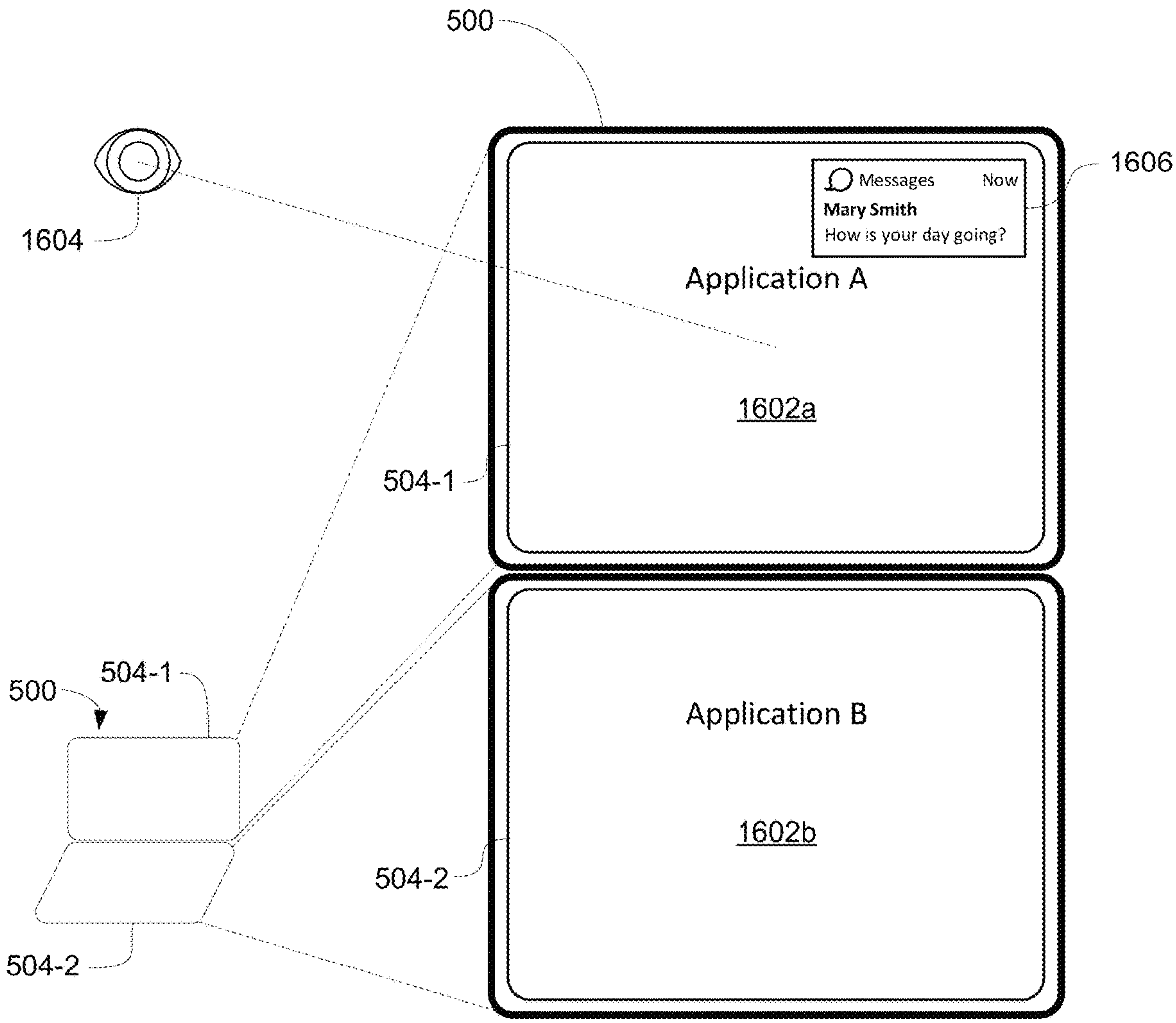

FIG. 16B illustrates presentation of an indication 1606 of a notification at the electronic device 500 while the user's gaze 1604 is directed towards the first touch screen 504-1. In response to detecting that the user's gaze 1604 is directed towards the first touch screen 504-1 when a notification generating event occurs at device 500 (e.g., device 500 receives a text message), the electronic device 500 presents the indication 1606 of the notification on the first touch screen 504-1.

Figure 16C:
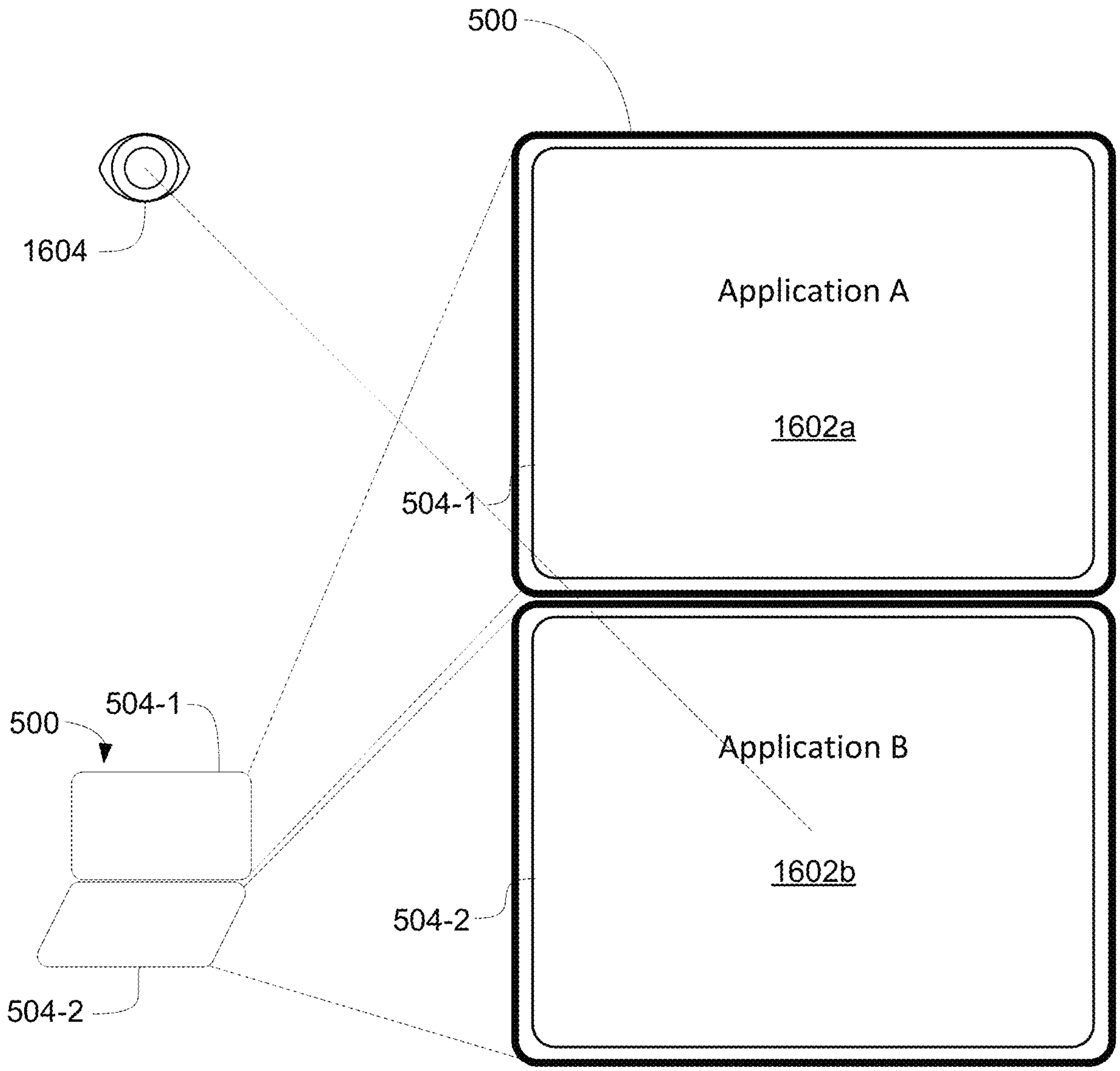
Figure 16D:
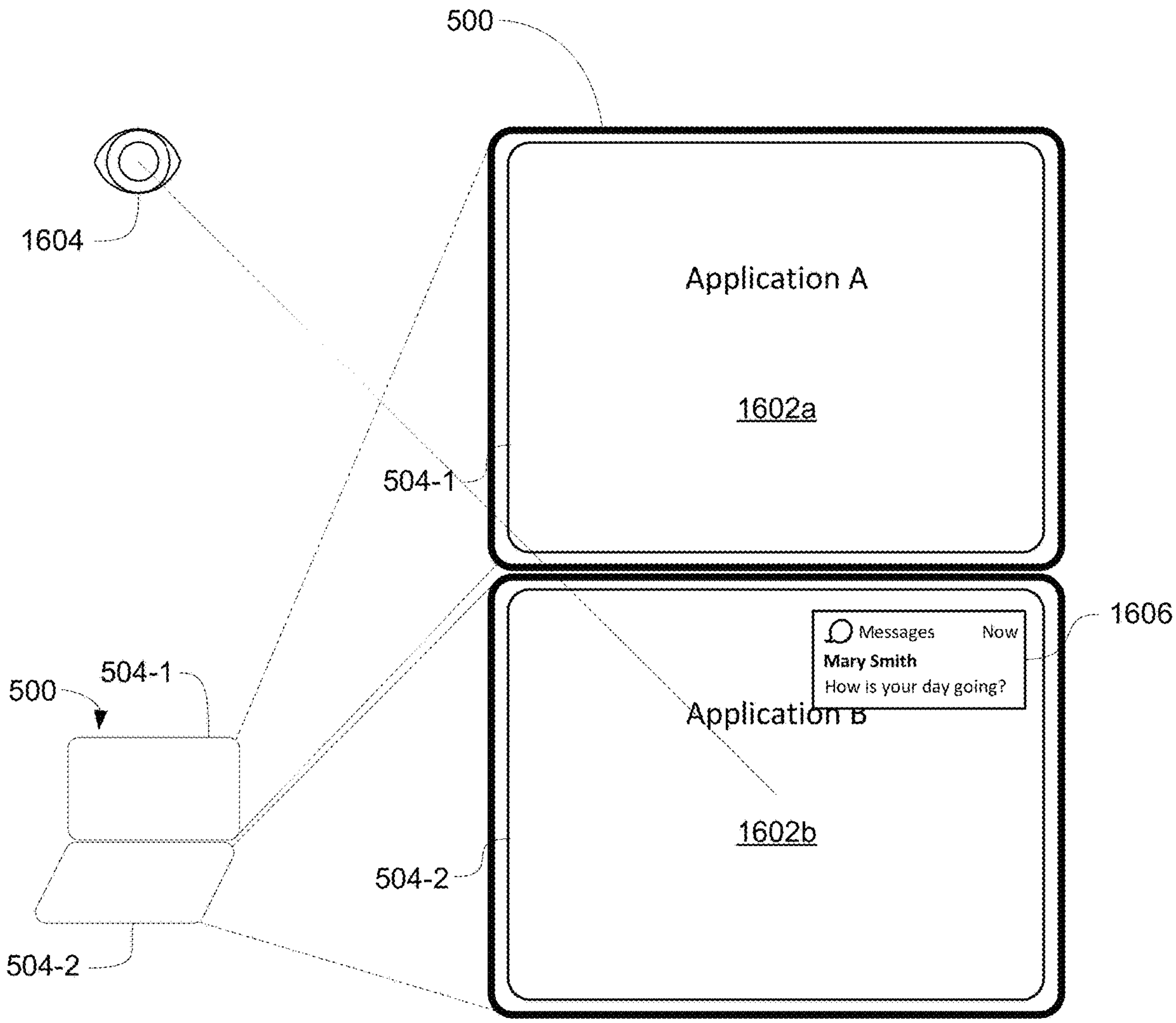

In FIG. 16C, the user's gaze 1604 is directed towards the second touch screen 504-2. In response to detecting the user's gaze 1604 towards the second touch screen 504-2 when a notification generating event occurs at device 500 (e.g., device 500 receives a text message), the electronic device 500 presents the indication of a notification 1606 on the second touch screen 504-2, as shown in FIG. 16D. Thus, the electronic device 500 determines which touch screen 504-1 or 504-2 to present the indication of the notification 1606 based on the user's gaze 1604.

FIGS. 16E-16K illustrate the electronic device 500 presenting an indication of a notification on one of the touch screens 504-1 or 504-2 of the electronic device depending on which touch screen presents a user interface of an application that is active on the electronic device 500.

Figure 16E:
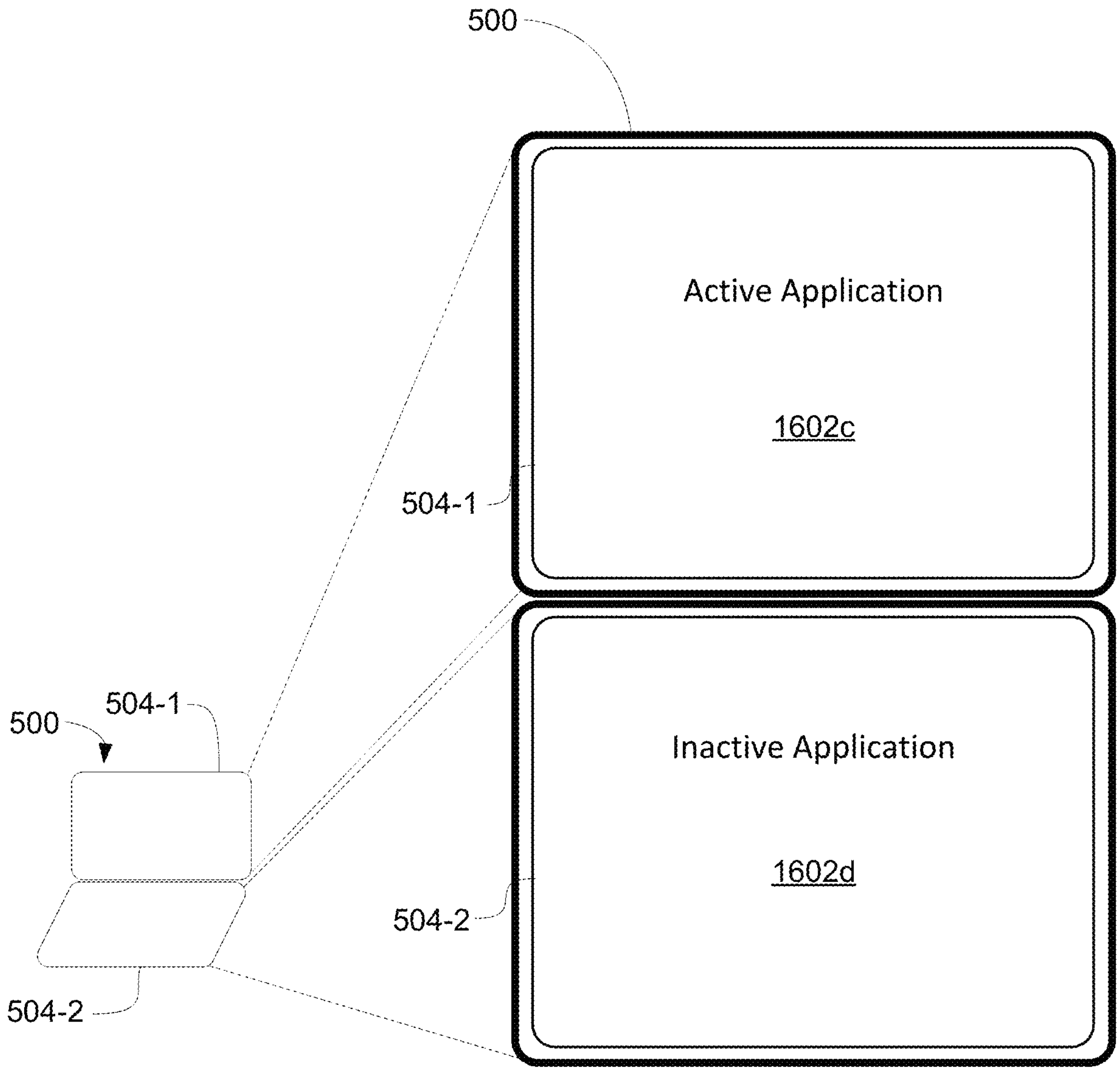
Figure 16F:
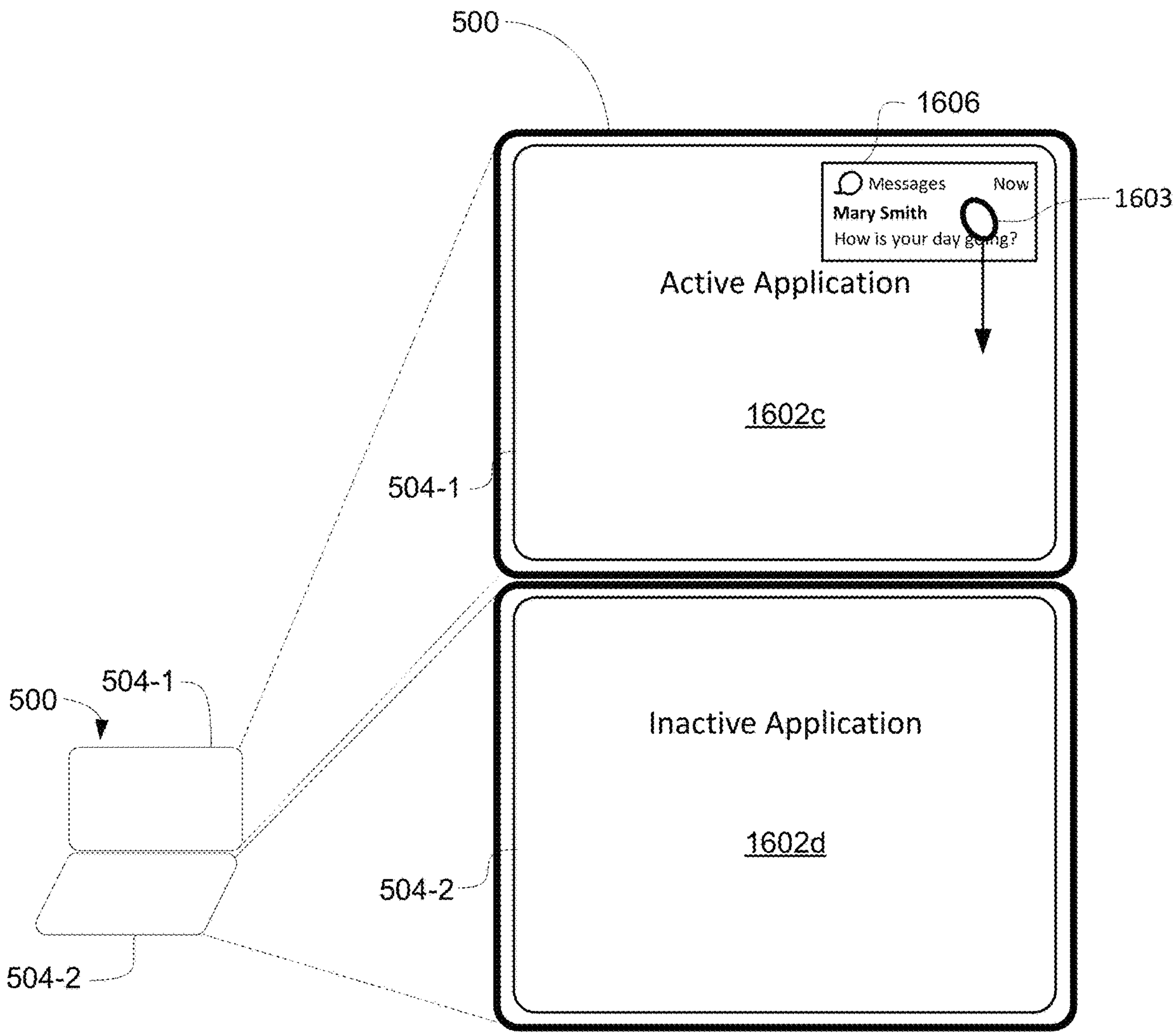

In FIG. 16E, the electronic device presents the user interface of an active application 1602*c* on the first touch screen 504-1 and the user interface of an inactive application 1602*d* on the second touch screen 504-2. In some embodiments, an active application is an application that currently has the input focus of one or more input devices in communication with the electronic device 500 or an application that the user of the electronic device 500 is currently interacting with, while an inactive application does not. As shown in FIG. 16F, the electronic device 500 presents the indication 1606 of the notification on the first touch screen 504-1 because that is the touch screen that displays the user interface 1602*c* of the active application when the notification generating event occurs at device 500. The user selects (e.g., with contact 1603) the indication 1606 of the notification and performs a flick or swipe gesture towards the second touch screen 504-2, as shown in FIG. 16F.

Figure 16G:
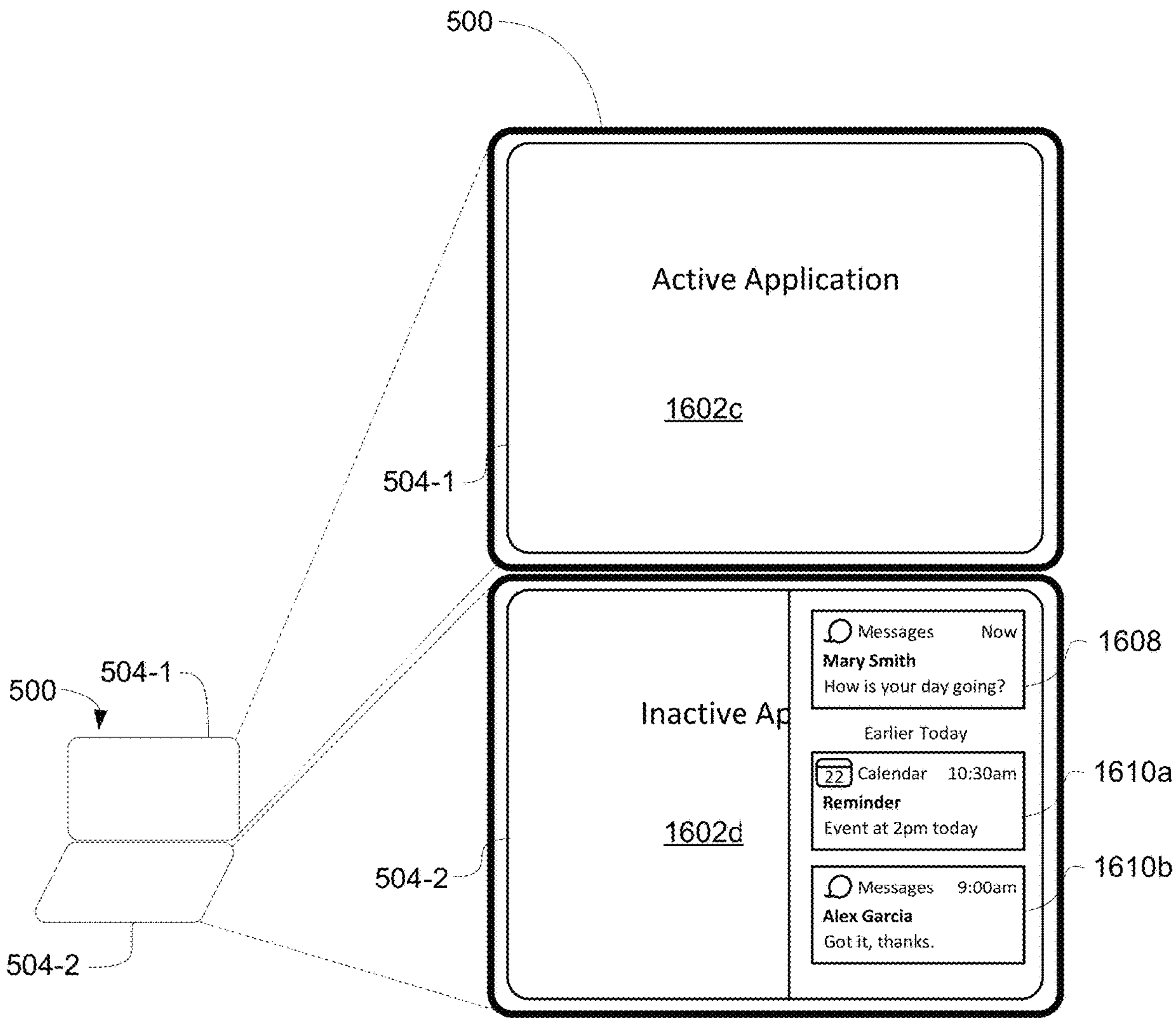

In response to detection of the gesture, the electronic device 500 presents a second indication 1608 of the notification on the second touch screen 504-2, as shown in FIG. 16G. The second indication 1608 of the notification is presented in a notification history user interface that includes indications 1610*a* and 1610*b* of previously-received notifications, sorted in order of newest to oldest. In some embodiments, the notification history user interface is overlaid on the inactive application 1602*d* user interface.

Figure 16H:
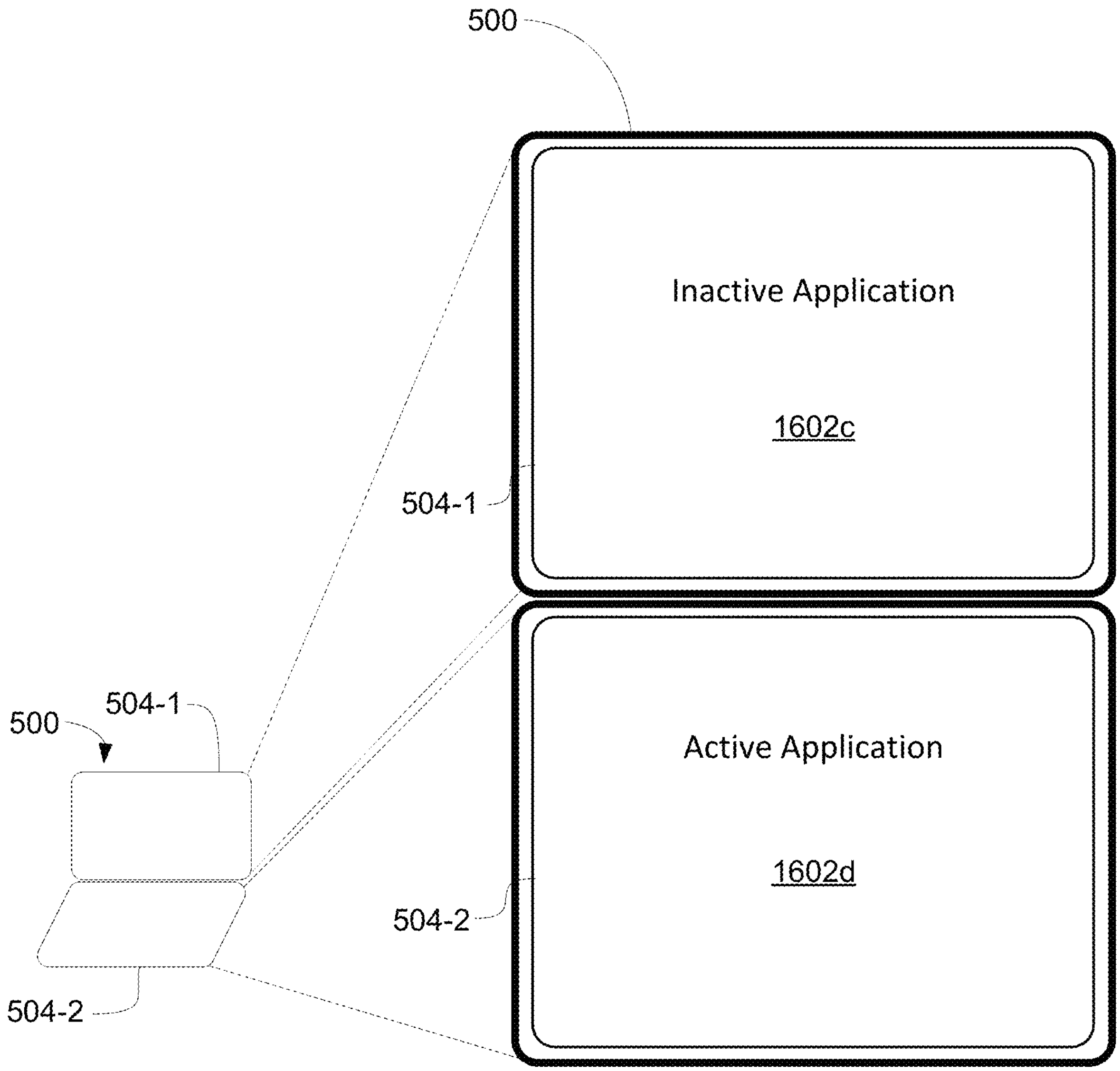
Figure 16I:
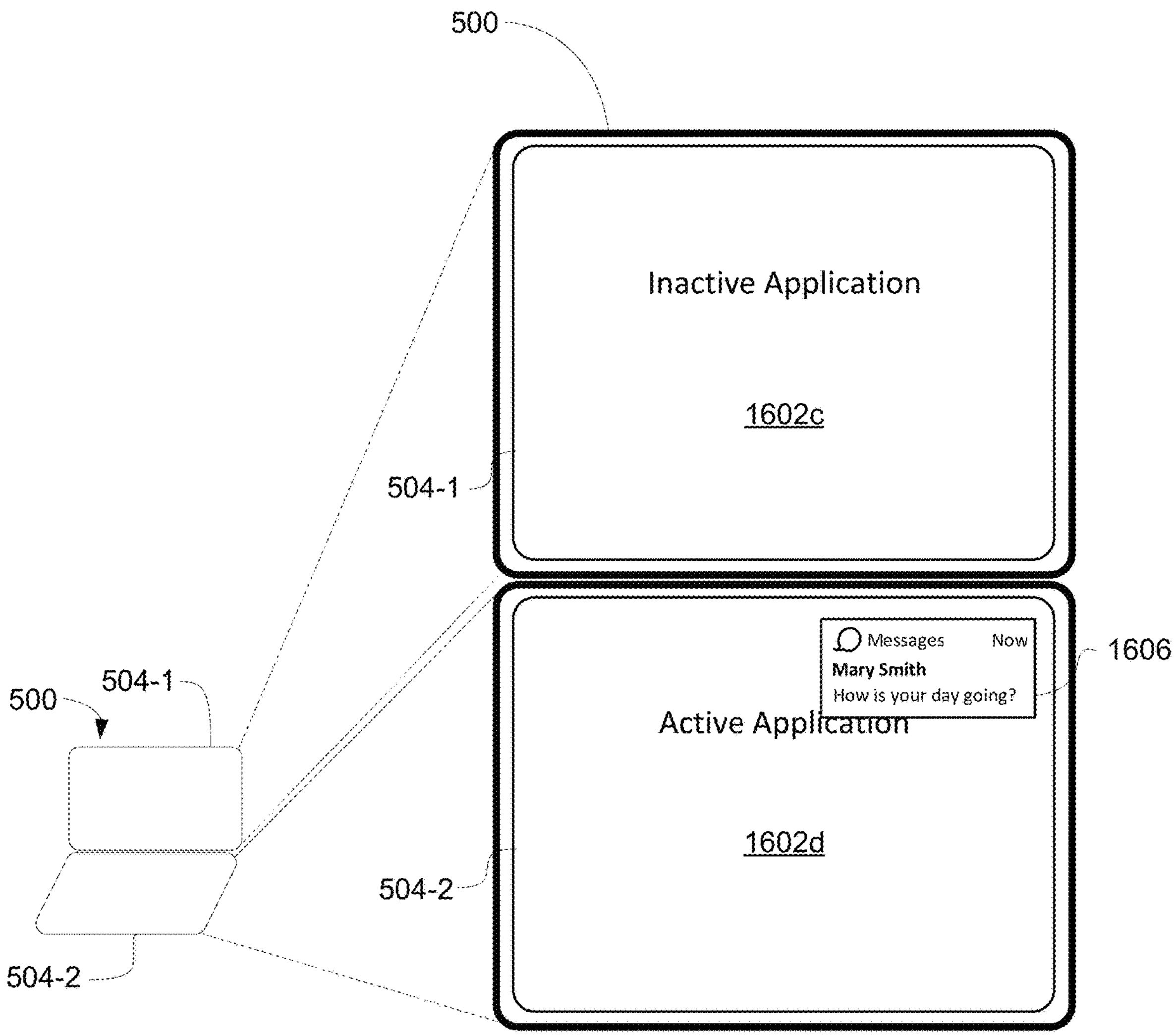

In FIG. 16H, the electronic device 500 presents a user interface of an inactive application 1602*c* on the first touch screen 504-1 and a user interface of an active application 1602*d* on the second touch screen 504-2. As shown in FIG. 16I, the electronic device 500 presents the indication 1606 of the notification on the second touch screen 504-2 because that is the touch screen that displays the user interface 1602*d* of the active application when the notification generating event occurs at device 500. Thus, the electronic device 500 is able to present indications of notifications on the touch screen that presently presents the user interface of an active application on the electronic device.

Figure 16J:
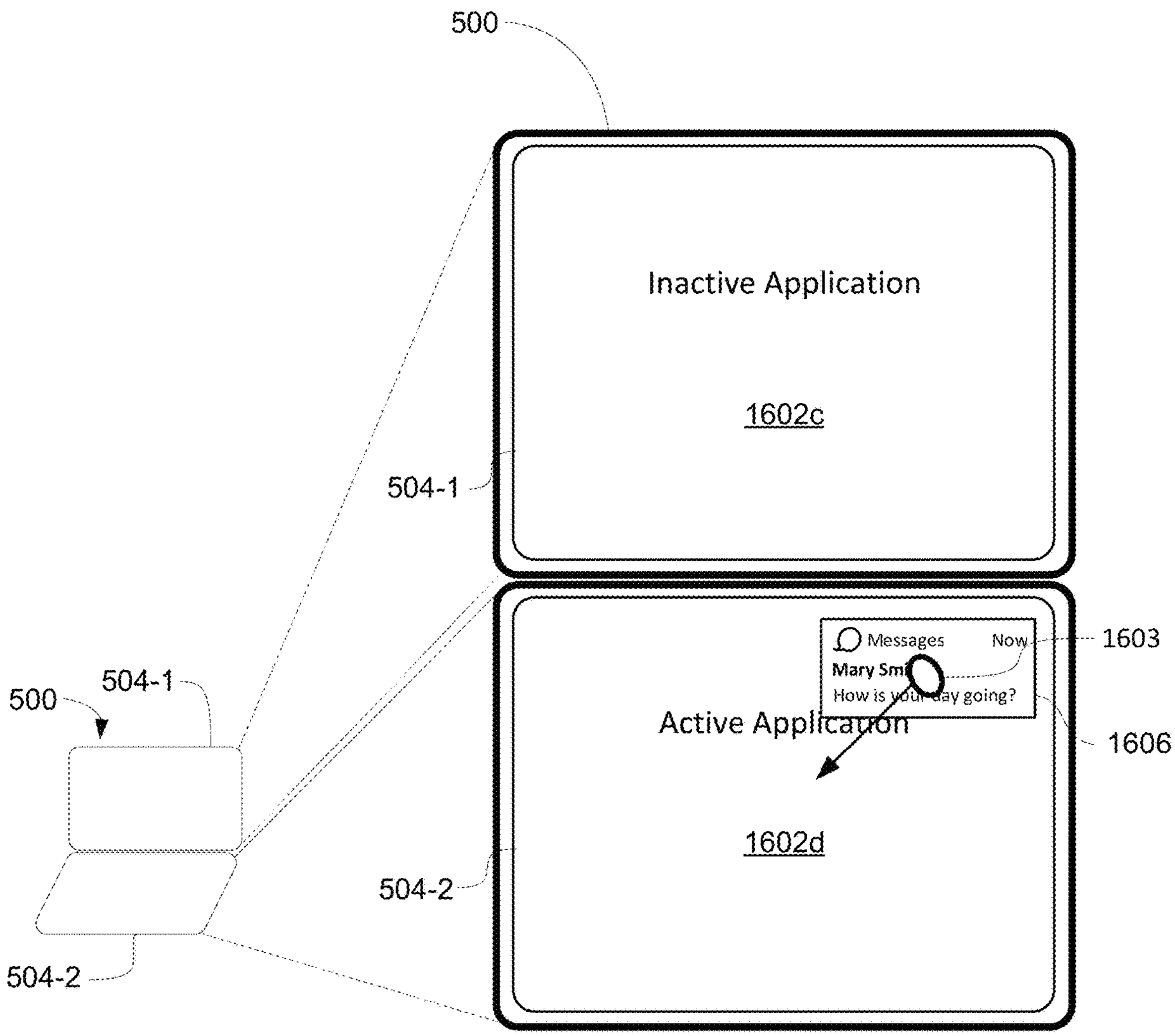
Figure 16K:
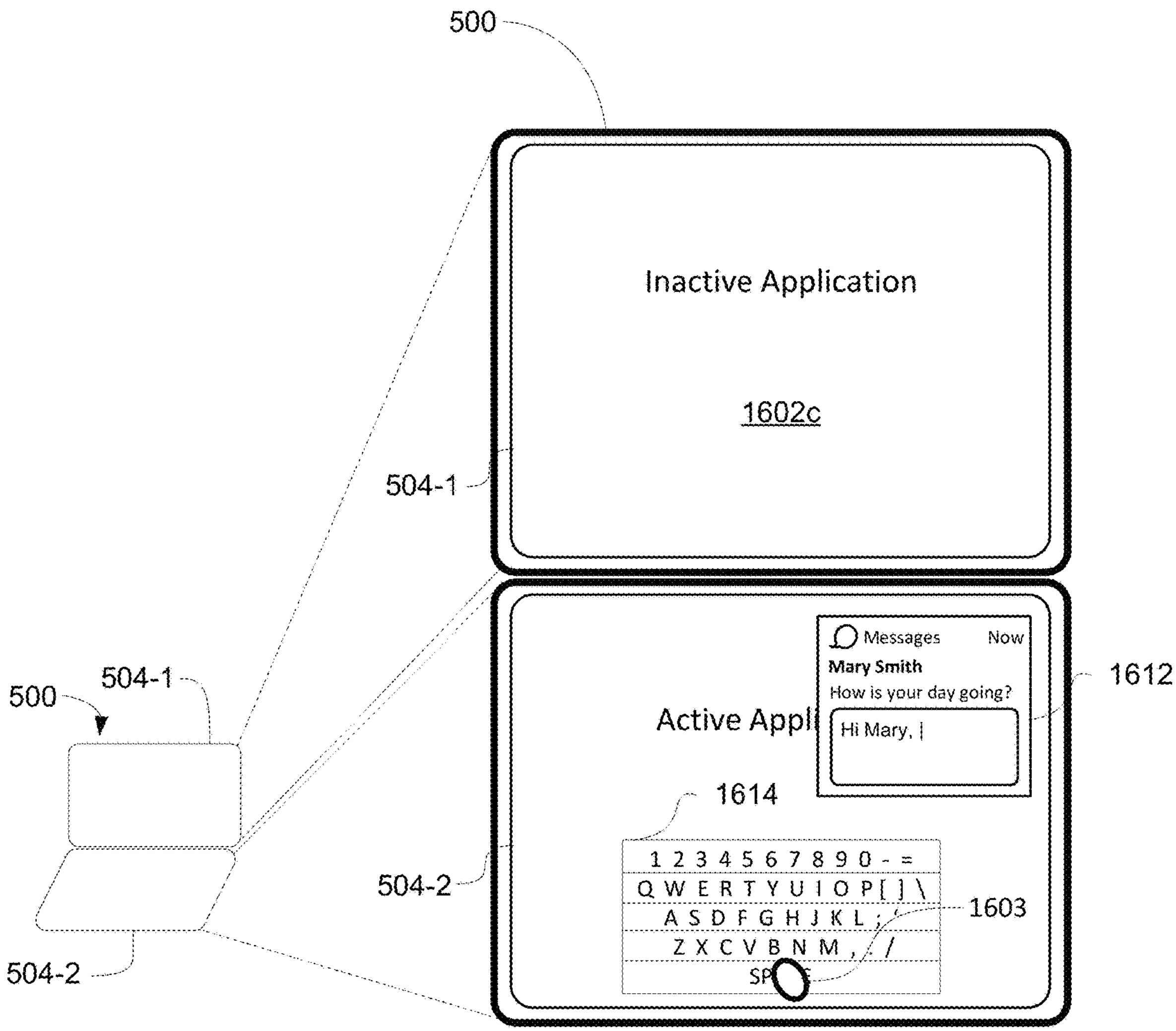

FIGS. 16J-16P illustrate exemplary ways in which the electronic device 500 facilitates interaction with indications of notifications. In FIG. 16J, the user selects (e.g., with contact 1603) the indication 1606 of the notification and drags or swipes the indication 1606 of the notification towards the center of the second touch screen 504-2 (e.g., the touch screen on which the indication 1606 is displayed). As shown in FIG. 16K, in response to detecting the gesture, the electronic device 500 presents an expanded indication 1612 of the notification including a text entry field and a soft keyboard 1614. The user is able to select (e.g., with contact 1603) one or more soft keys of the soft keyboard 1614 to compose a message to send in response to the received message indicated by the notification.

Figure 16L:
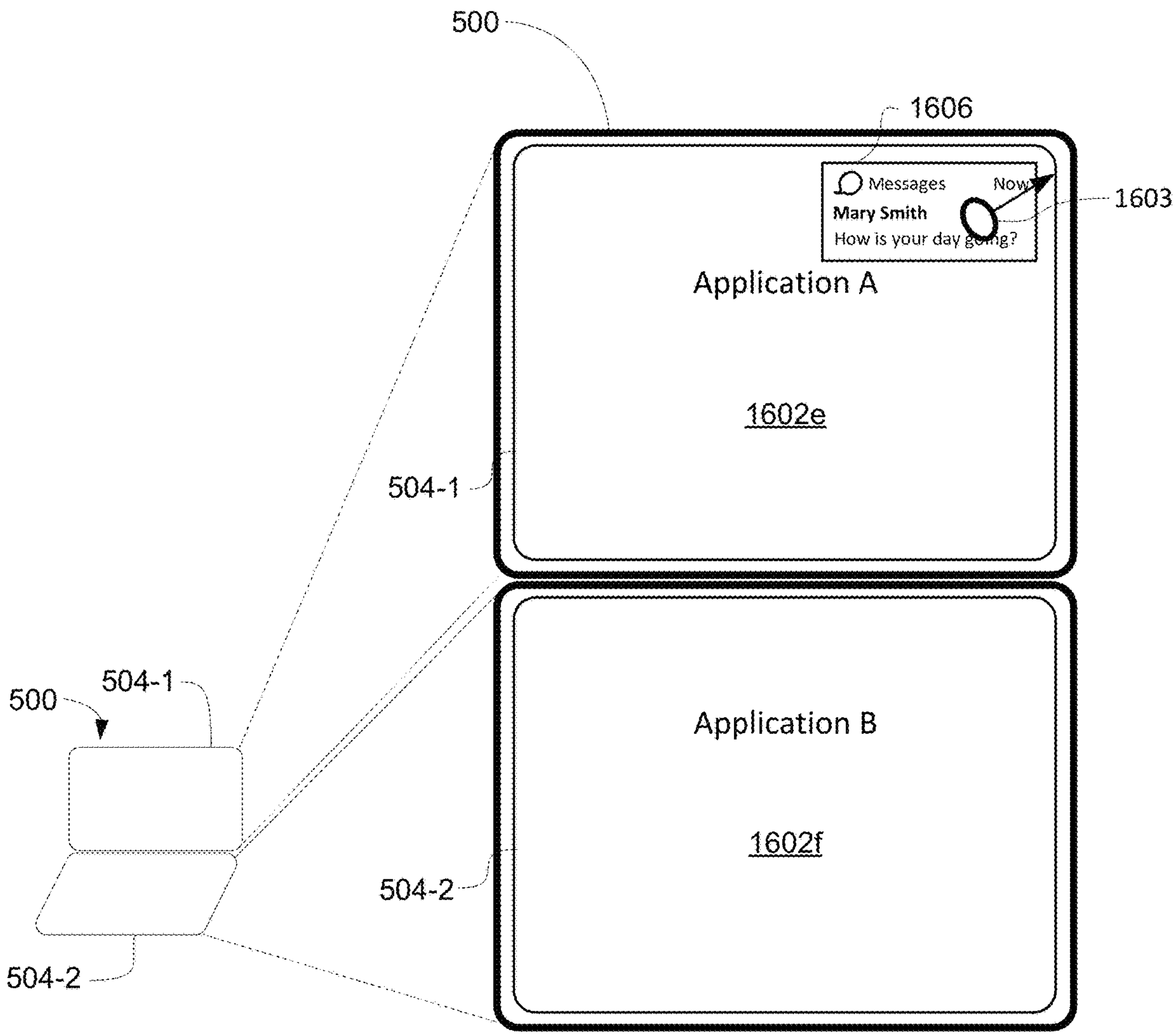
Figure 16M:
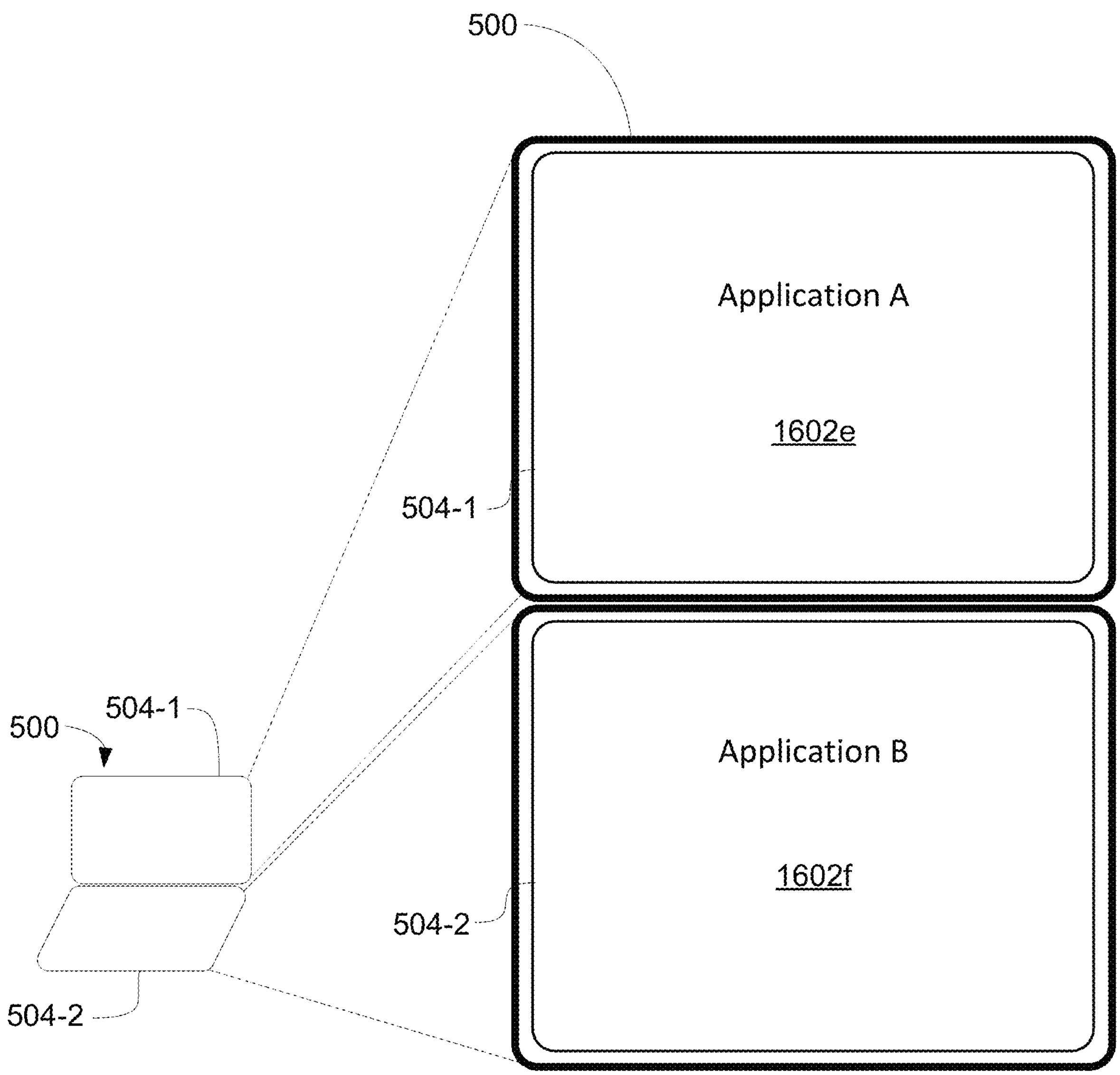

In FIG. 16L, the electronic device 500 presents 1606 an indication of a notification on touch screen 504-1. The user selects (e.g., with contact 1603) the indication 1606 of the notification and drags or flicks the indication 1606 of the notification towards the edge of the touch screen 504-1. As shown in FIG. 16M, in response to detecting the gesture, the electronic device 500 ceases displaying the indication of the notification.

Figure 16N:
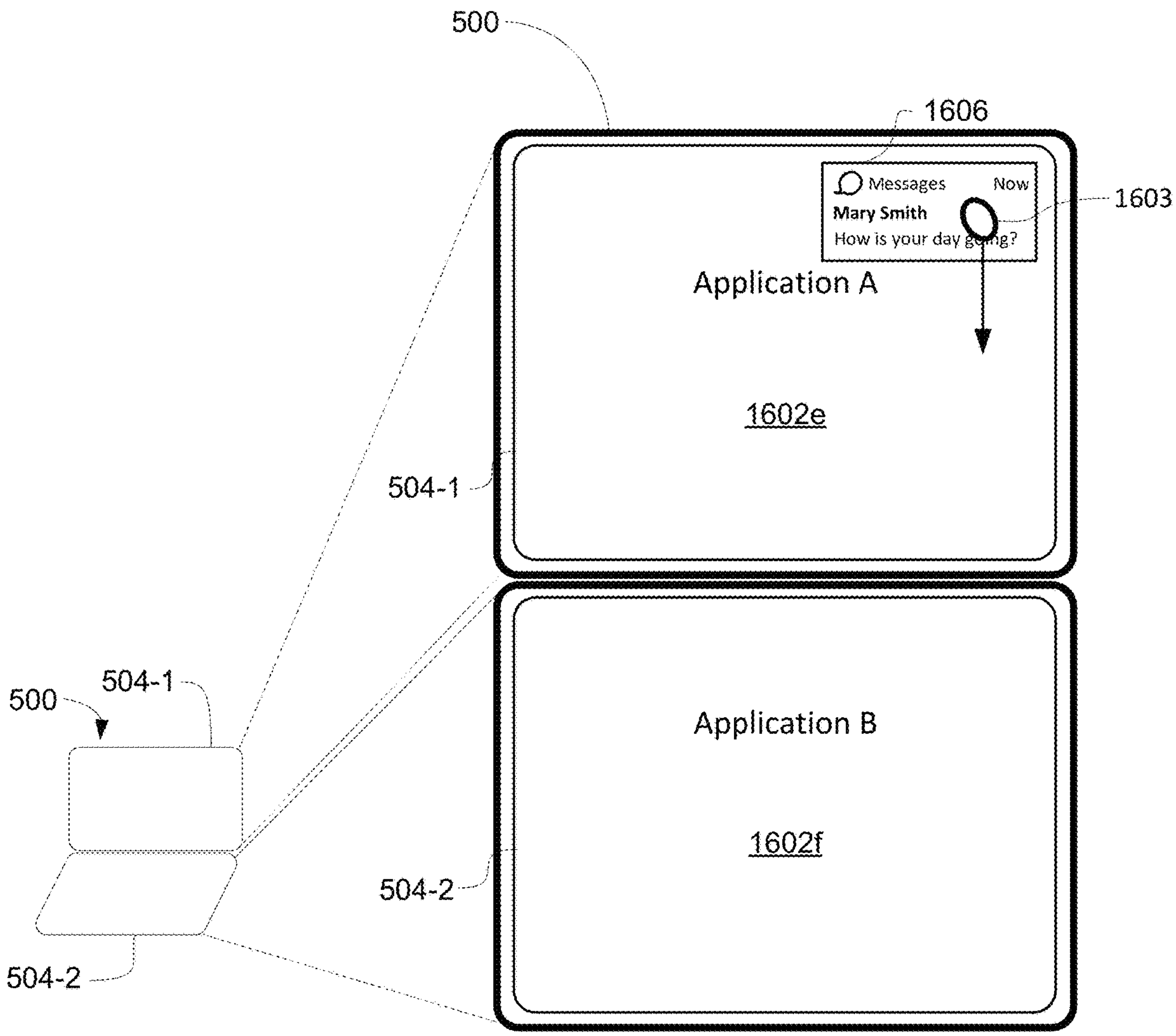
Figure 16O:
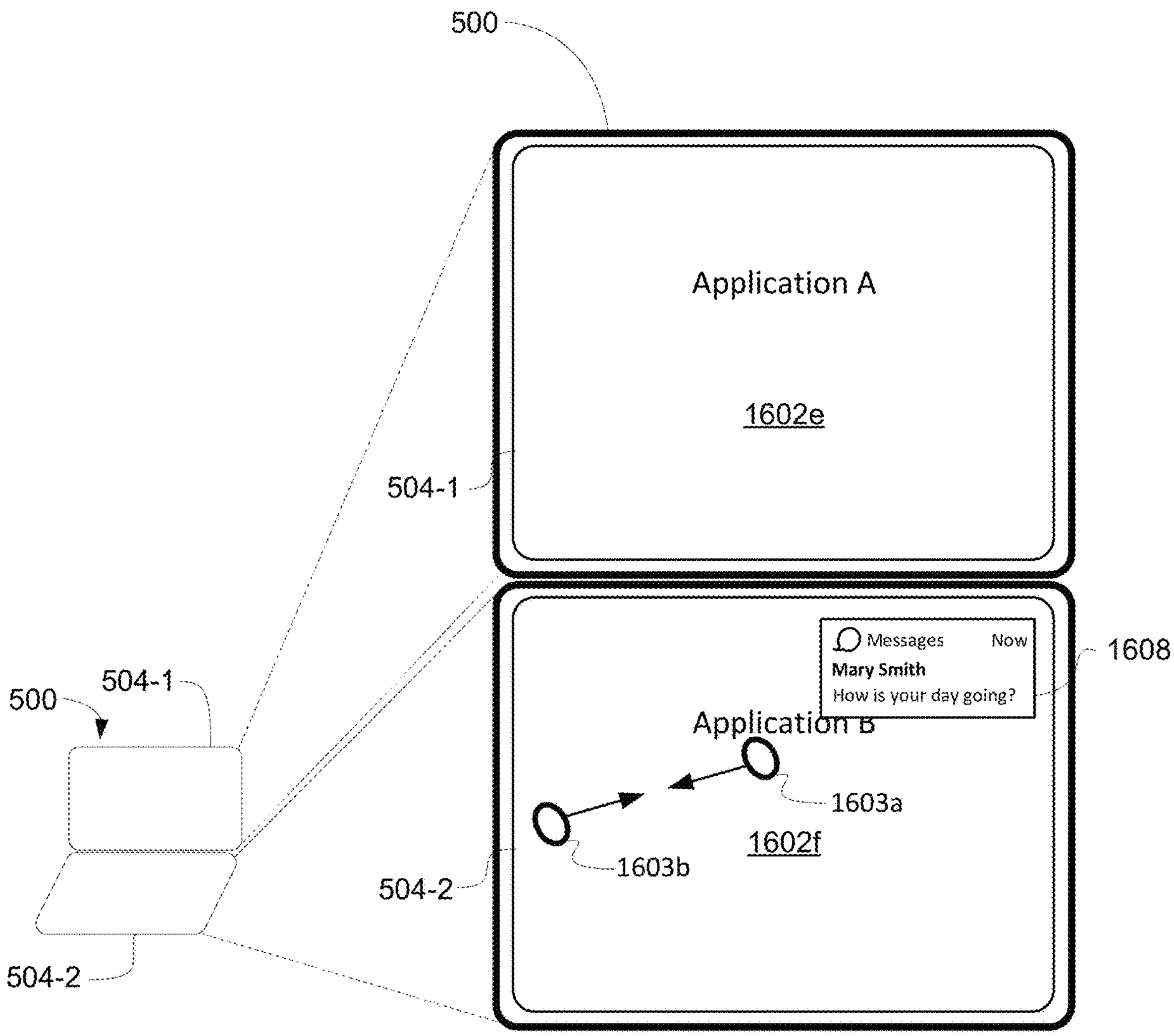

In FIG. 16N, the electronic device 500 presents the indication 1606 of the notification on the first touch screen 504-1. The user selects (e.g., with contact 1603) the indication 1606 of the notification and drags or flicks the indication 1606 of the notification towards the second touch screen 504-2. As shown in FIG. 16O, in response to the detecting the gesture, the electronic device 500 presents the indication 1608 of the notification on the second touch screen 504-2.

As shown in FIG. 16O, while displaying the indication 1608 of the notification on the second touch screen 504-2, the electronic device detects contacts 1603*a* and 1603*b* and movement of the contacts together (e.g., a "pinch" or zoom-out gesture) for making the user interface of application B 1602*f* on touch screen 504-2 smaller (e.g., take up less space on touch screen 504-2). In response to detecting the gesture, as shown in FIG. 16P, the electronic device 500 reduces the size of the user interface of "Application B" (to create smaller user interface 1602*g*) and expands the indication 1616 of the notification on touch screen 504-2.

Figure 16P:
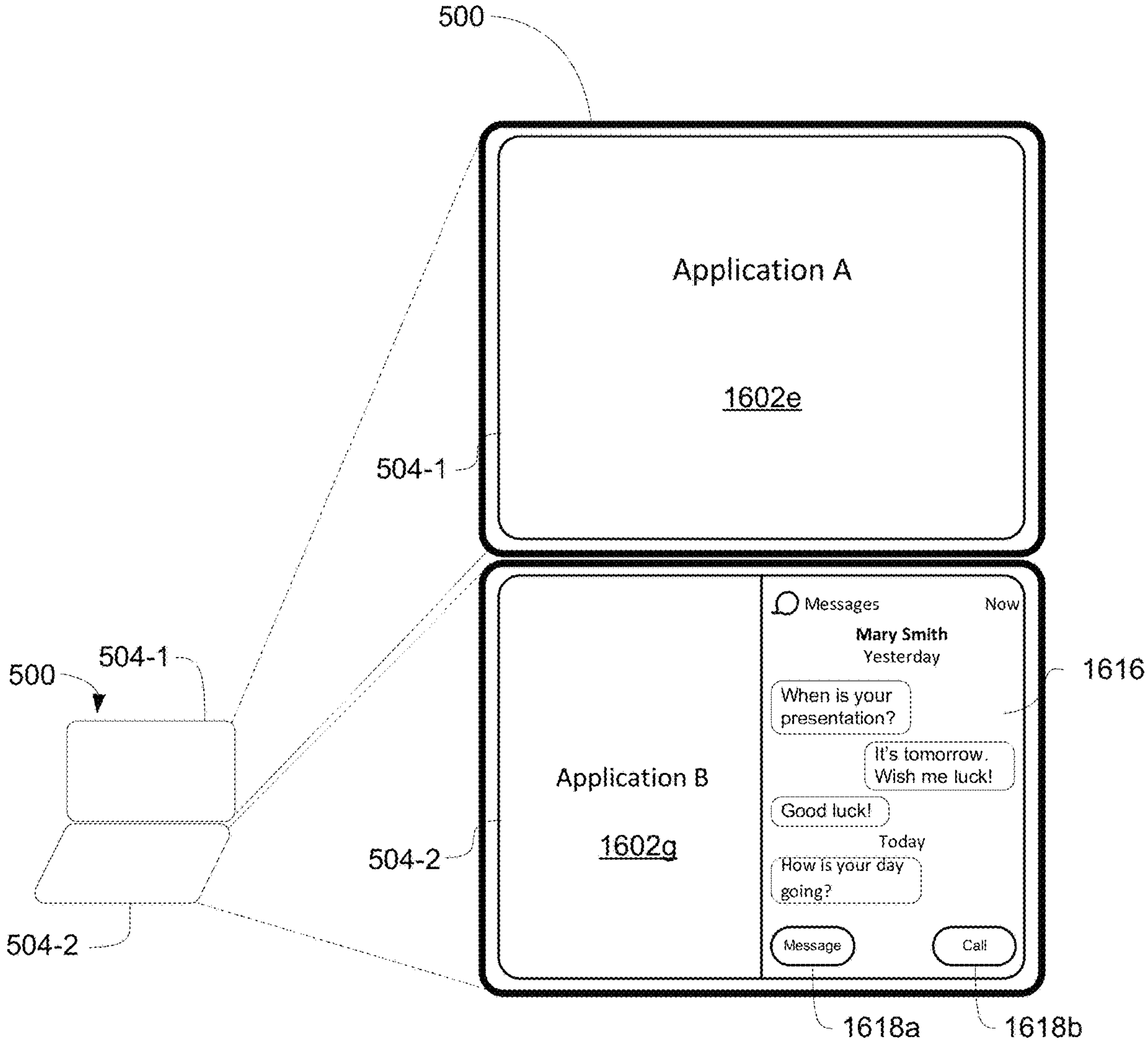

As shown in FIG. 16P, the indication 1616 of the notification now includes a conversation history including previous messages sent and received at electronic device 500 with the contact that just sent the message indicated by the notification. The indication 1616 further includes a selectable option 1618*a* to present a messaging user interface where the user is able to write a message back to the contact and a selectable option 1618*b* to call (e.g., a voice call, a video conference call, etc.) the contact. Thus, the electronic device 500 allows the user to interact with indications of notifications in several ways.

FIGS. 16Q-16V illustrate exemplary interactions with indications of calendar notifications, such as event invitations.

Figure 16Q:
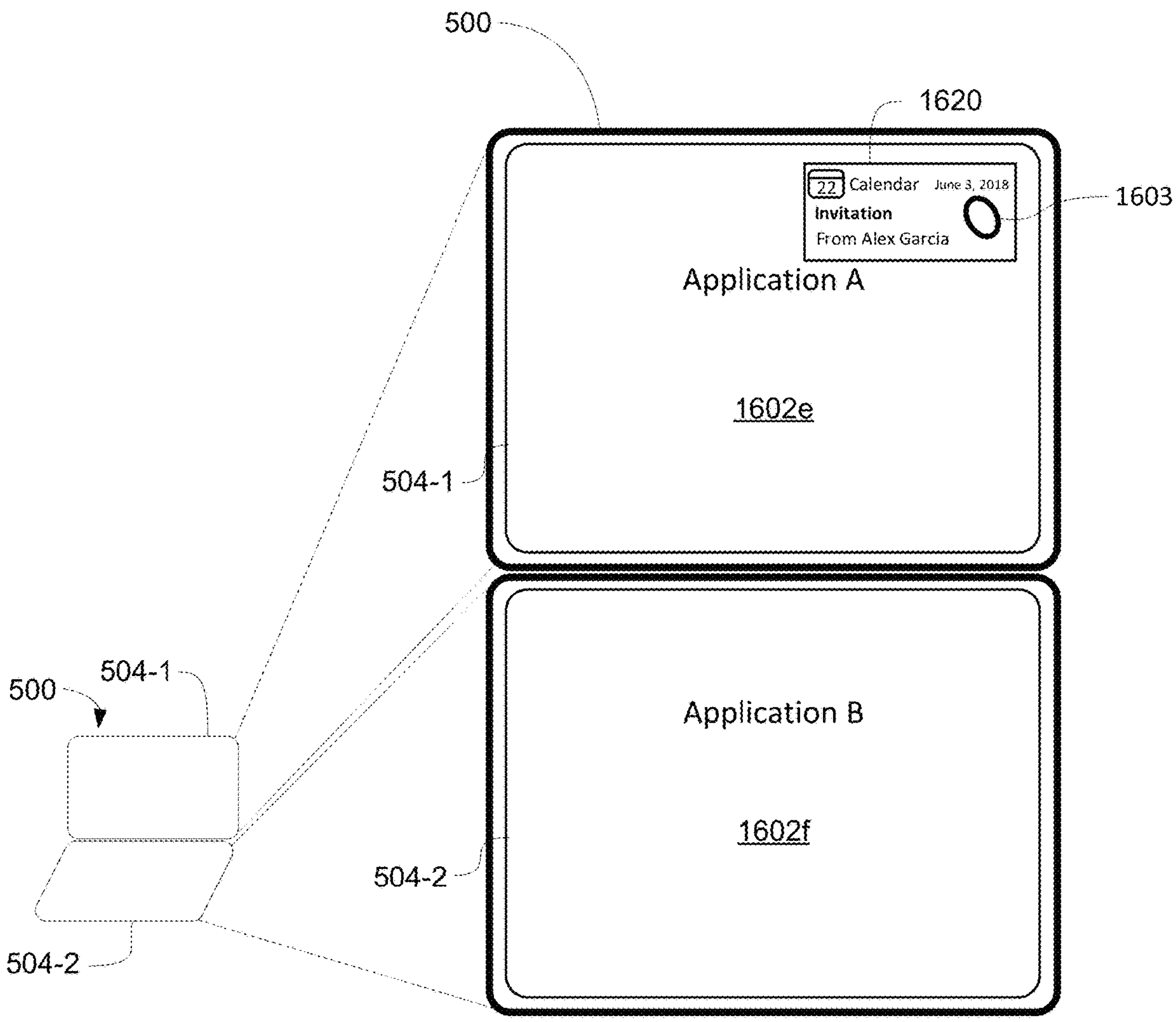
Figure 16R:
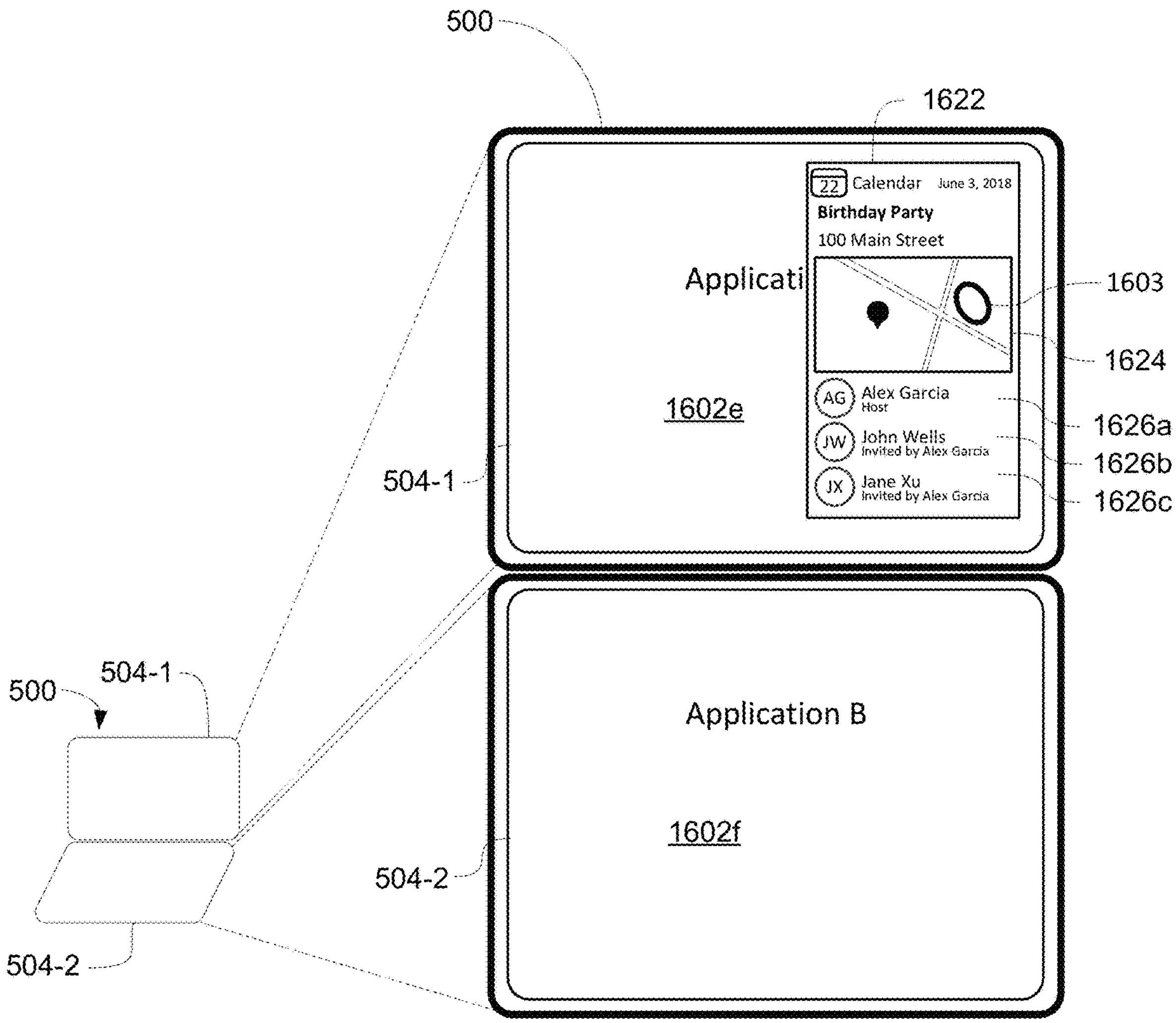

As shown in FIG. 16Q, the electronic device 500 presents an indication 1620 of a calendar notification on the first touch screen 504-1 (e.g., in response to a calendar notification generating event, such as receiving an invitation to an event). The user selects (e.g., with a tap of contact 1603) the indication 1620 of the notification. As shown in FIG. 16R, in response to the user's selection, the electronic device 500 presents additional information about the notification.

In FIG. 16R, the electronic device 500 presents an expanded indication 1622 of the notification. The expanded indication 1622 of the notification includes a map 1624 indicating the location of the event associated with the notification and representations 1626*a-c* of individuals associated with the event. For example, one of the individuals "Alex Garcia" is the individual who created the event invitation received at the electronic device 500 and the remaining individuals are individuals who also received the event invitation. As shown in FIG. 16R, the user selects (e.g., with contact 1603) the map 1624. In response to the user's selection, as shown in FIG. 16S, the electronic device 500 presents a detailed view of the map and another expanded indication of the notification.

Figure 16S:
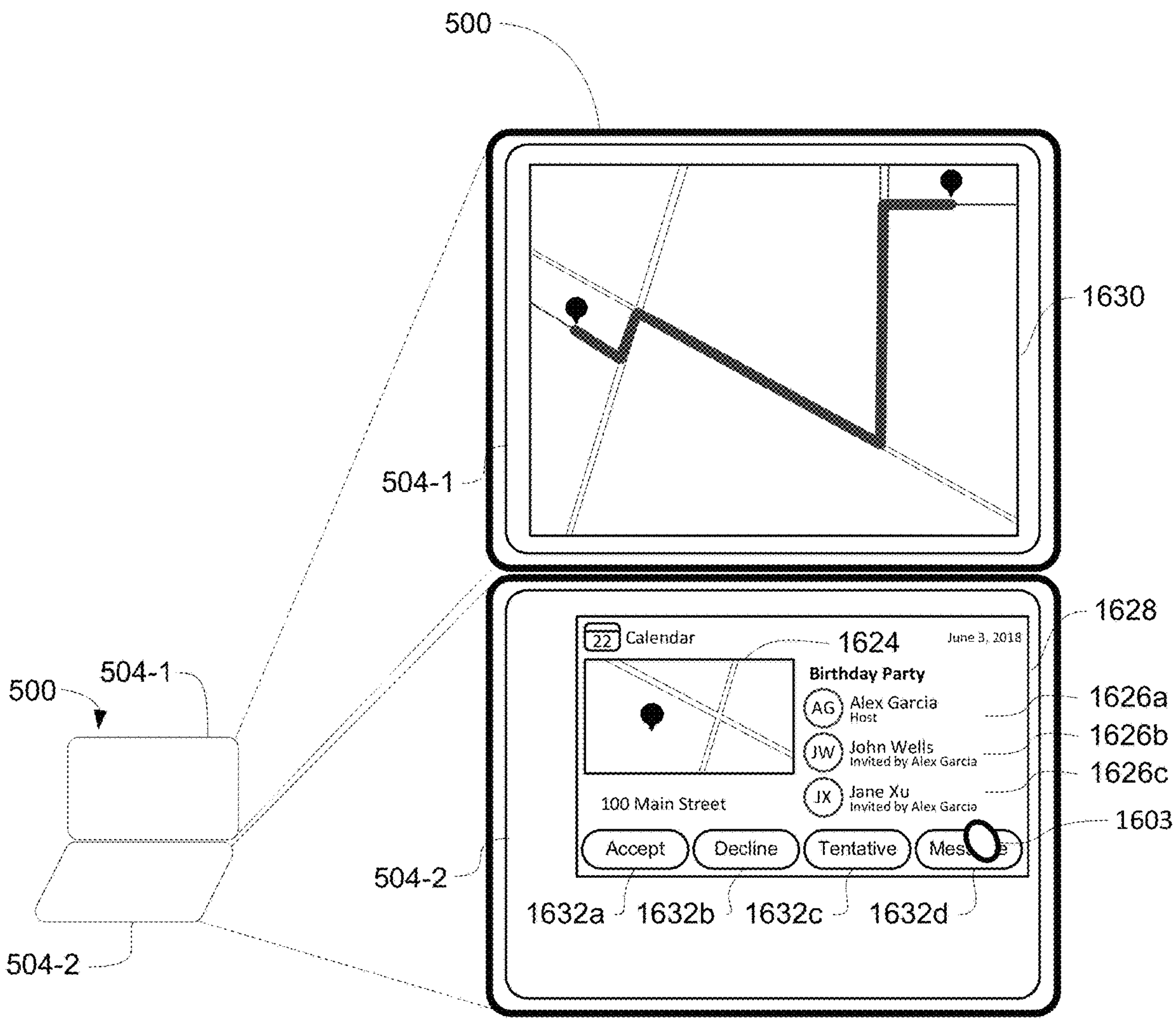

FIG. 16S illustrates a map user interface 1630 shown on touch screen 504-1 and an expanded indication 1628 of the notification shown on touch screen 504-2 displayed in response to the user's selection in FIG. 16R. The map user interface 1630 includes an overview of a route from the location of the electronic device 500 to the location of the event associated with the notification. The expanded indication 1628 of the notification includes indications 1626*a-c* of the individuals associated with the event, and a map 1624 indicating a detailed view of the location of the event. As shown in FIG. 16S, the maps user interface 1630 illustrates a larger geographic area than the map 1624 included in the expanded indication 1628 of the notification. The expanded indication 1628 of the notification includes a plurality of selectable options 1632*a-d* (e.g., "Accept", "Decline", "Tentative", and "Message") that, when selected, cause the electronic device 500 to perform the indicated action related to the event invitation.

As shown in FIG. 16S, the user selects (e.g., with contact 1603) the selectable option 1632*d* to message the individuals associated with the event. In response to the user's selection, as shown in FIG. 16T, the electronic device 500 presents a messaging user interface within the expanded indication 1628 of the notification.

Figure 16T:
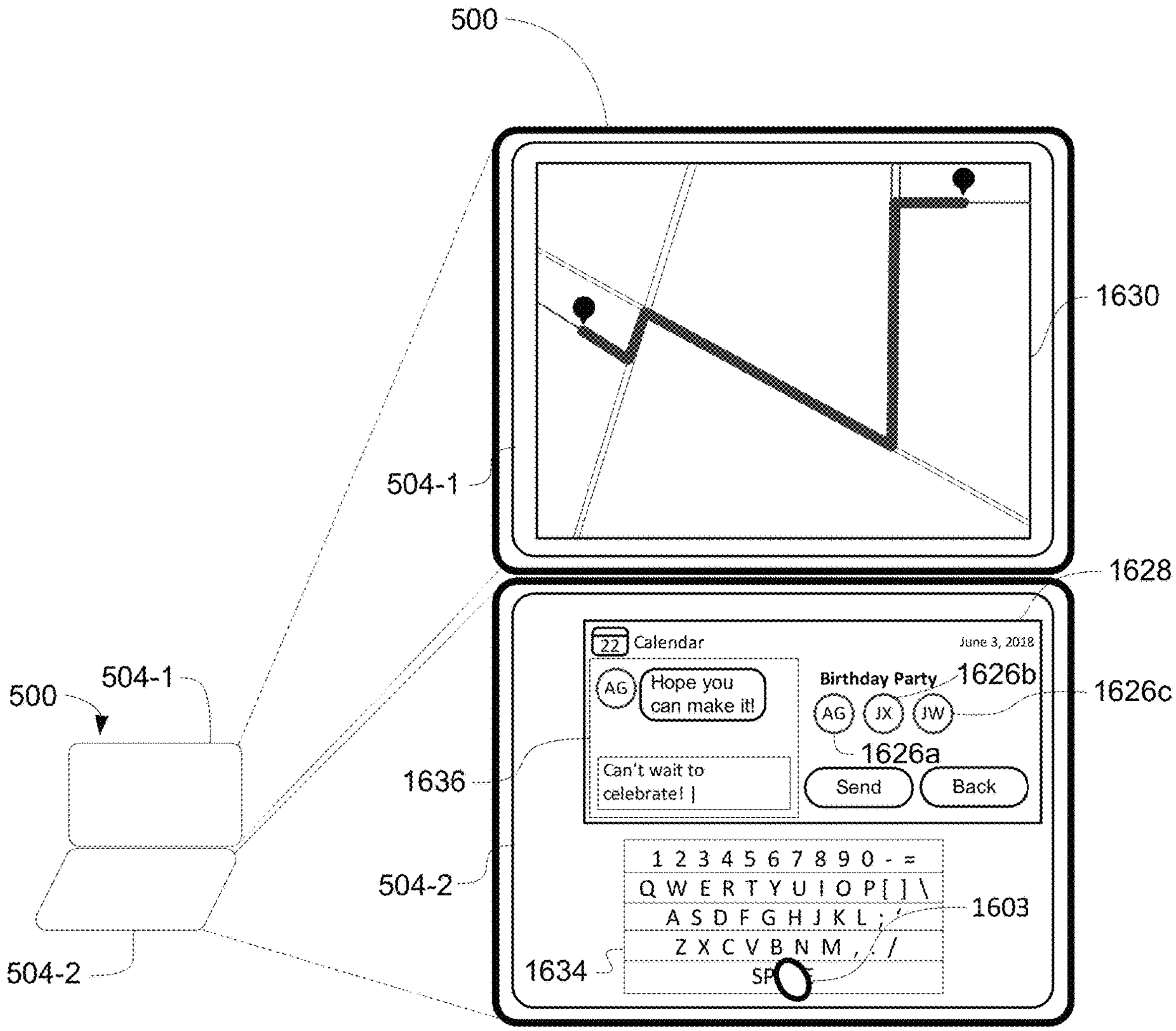

FIG. 16T illustrates the messaging user interface 1636 within the expanded indication 1628 of the notification that is presented by the electronic device 500 in response to the user's selection in FIG. 16S. The electronic device 500 continues to display the maps user interface 1630 on the first touch screen 504-1 and displays the messaging user interface 1636 within the expanded indication 1628 of the notification. The messaging user interface 1636 includes a message that was sent by an individual associated with the event invitation to the other individuals associated with the event invitation, including the user of the electronic device 500 and a text entry field in which the user is able to enter a reply message to the individuals associated with the event invitation. The electronic device 500 also displays, on the second touch screen 504-2, a soft keyboard 1634 for entering text in response to selection (e.g., with contact 1603) of one or more soft keys of the soft keyboard 1634.

Figure 16U:
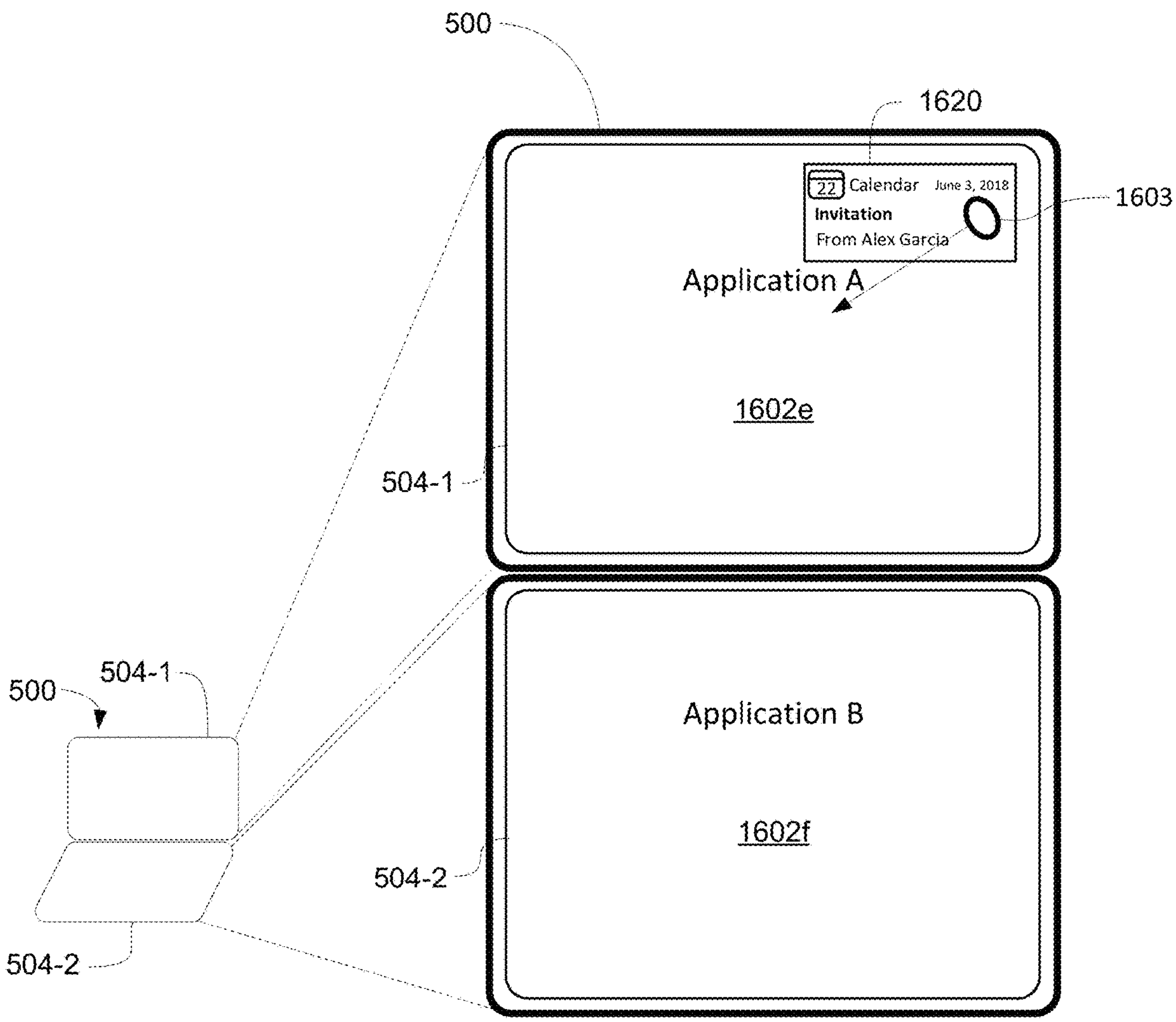
Figure 16V:
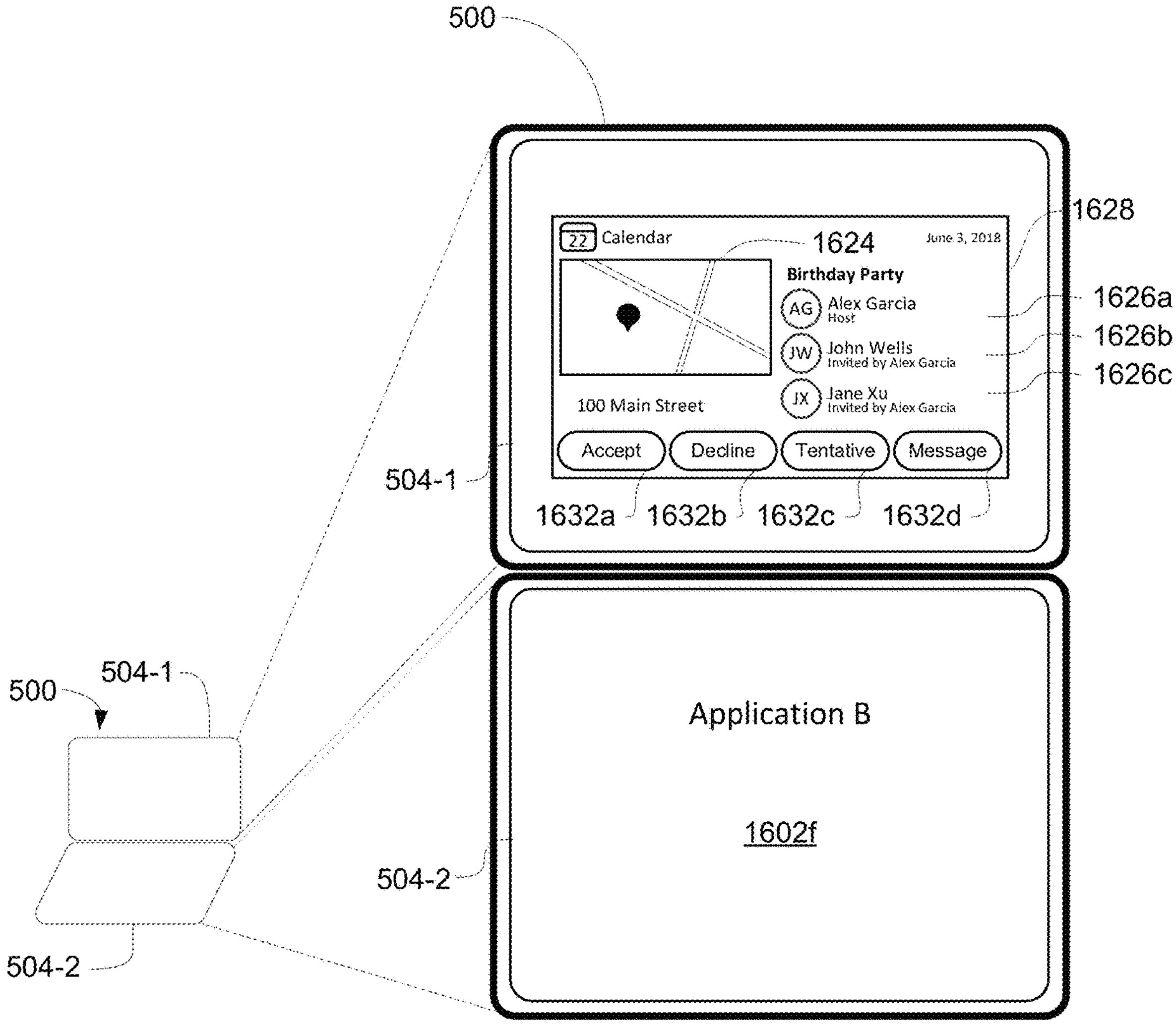

FIGS. 16U-V illustrate another way the electronic device 500 facilitates interaction with an indication 1620 of a calendar notification, such as an event invitation. In FIG. 16U, the electronic device 500 presents the indication 1620 of the notification on the first touch screen 504-1. As shown in FIG. 16U, the user selects (e.g., with contact 1603) the indication 1620 of the notification and flicks or drags it towards the middle of the first touch screen 504-1. In response to detecting the gesture, as shown in FIG. 16V, the electronic device 500 presents an expanded indication of the notification on the first touch screen 504-1.

FIG. 16V illustrates the expanded indication 1628 of the notification that is presented in response to detecting the gesture illustrated in FIG. 16U. The expanded indication 1628 of the notification includes indications 1626*a-c* of the individuals associated with the event invitation, a map 1624 indicating the location of the event, and a plurality of selectable options 1632*a-d* that, when selected, cause the electronic device 500 to perform the action indicated. Thus, the electronic device 500 allows the user to interact with an indication of a calendar notification by updating the indication of the notification and other user interfaces of the electronic device to show various content and perform actions related to the event invitation.

Figure 16W:
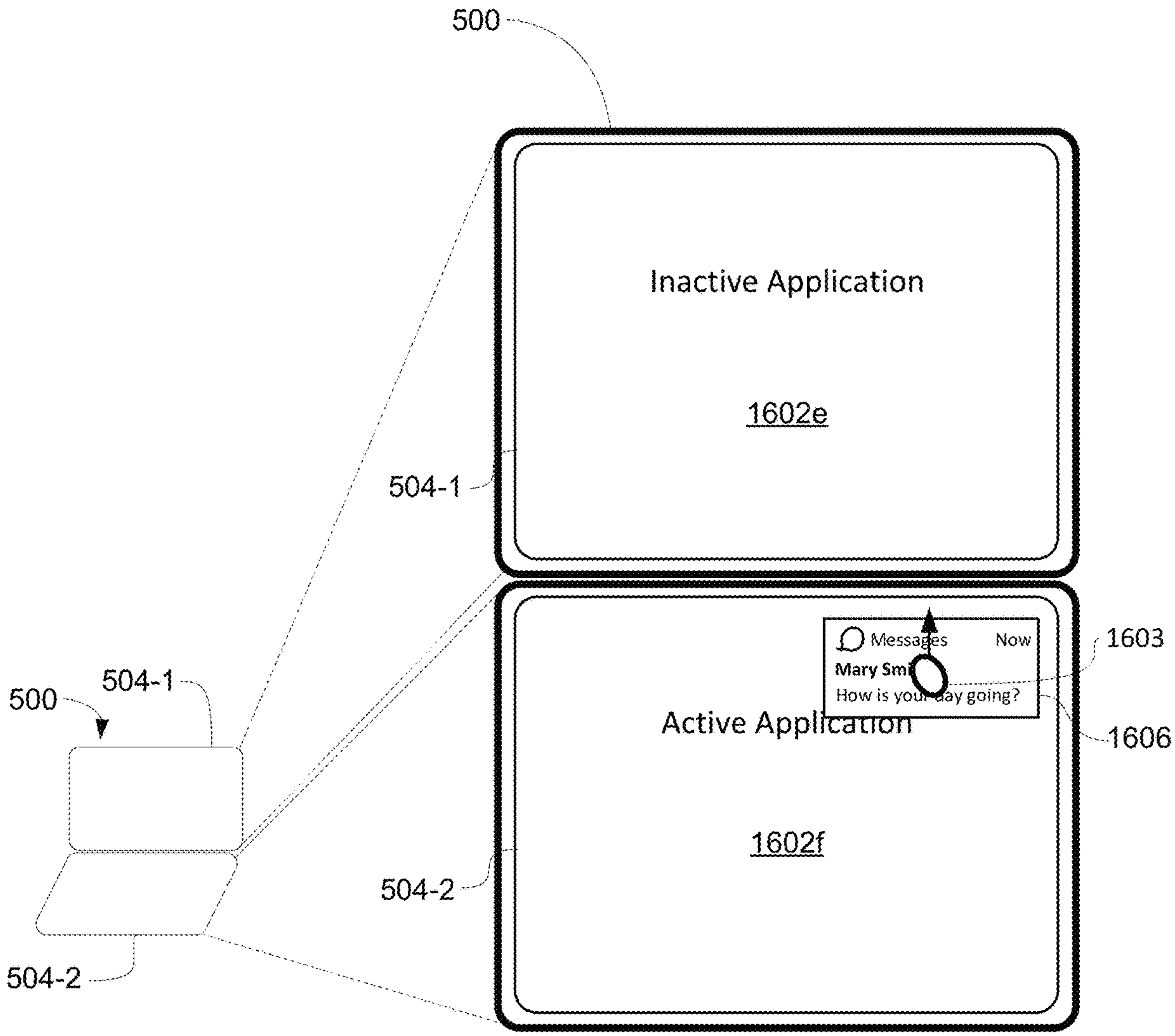

FIGS. 16W-16AA illustrate additional interactions with indications of notifications presented by the electronic device 500. In FIG. 16W, the electronic device 500 presents an indication 1606 of a notification on the second touch screen 504-2. As shown in FIG. 16W, the user selects (e.g., with contact 1603) the indication 1606 of the notification and flicks or drags the indication 1606 of the notification towards the first touch screen 504-1. In response to the gesture, the electronic device 500 presents the indication of the notification on the first touch screen 504-1, as shown in FIG. 16X.

Figure 16X:
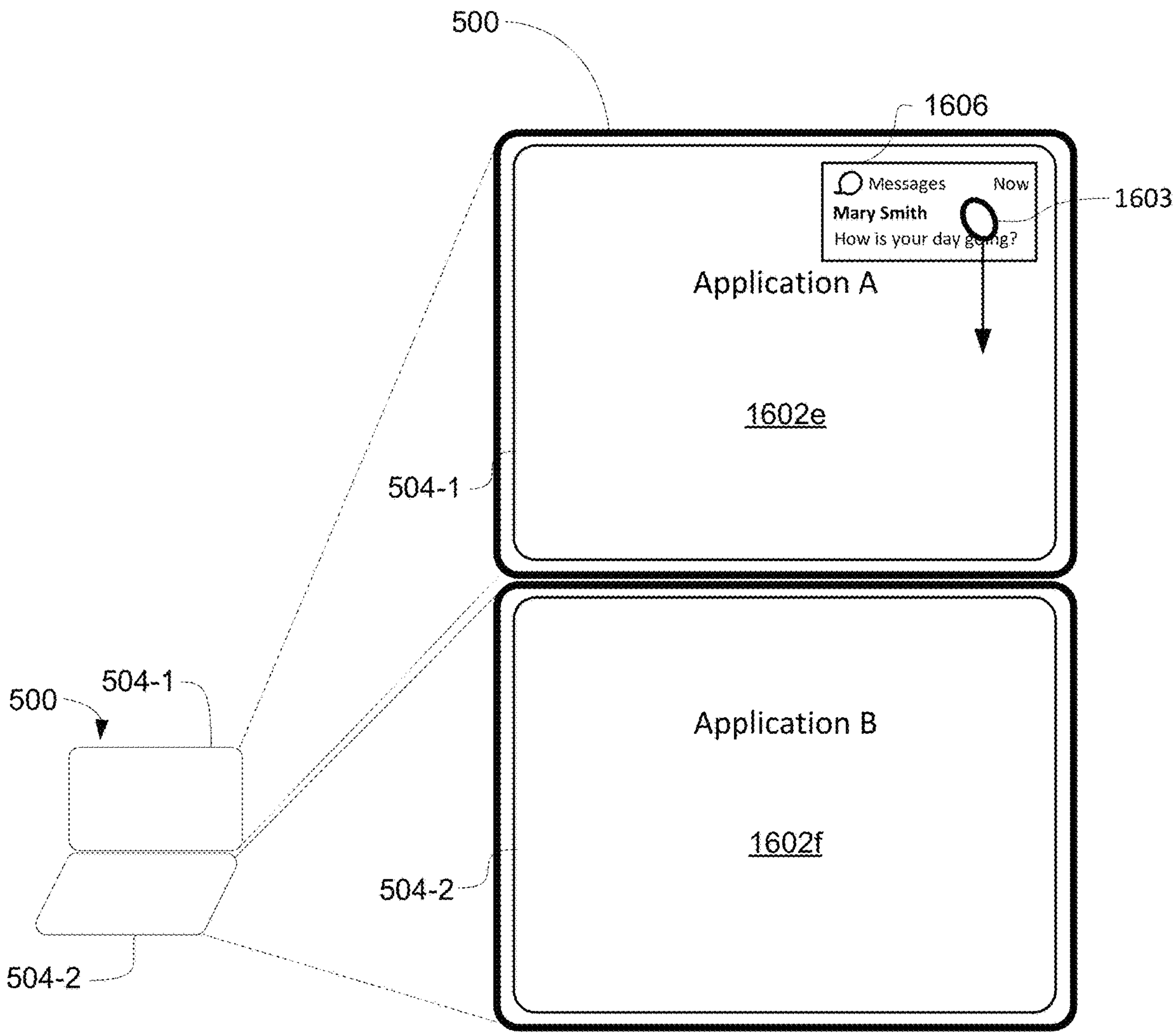

FIG. 16X illustrates presentation of the indication 1606 of the notification on the first touch screen 504-1 of the electronic device 500 in response to the gesture performed in FIG. 16W. As shown in FIG. 16X, the user selects (e.g., with contact 1603) the indication 1606 of the notification and drags or flicks the indication 1606 of the notification back towards the second touch screen 504-2. In response to detecting the gesture, the electronic device 500 presents an expanded indication of the notification on the second touch screen 504-2, as shown in FIG. 16Y.

Figure 16Y:
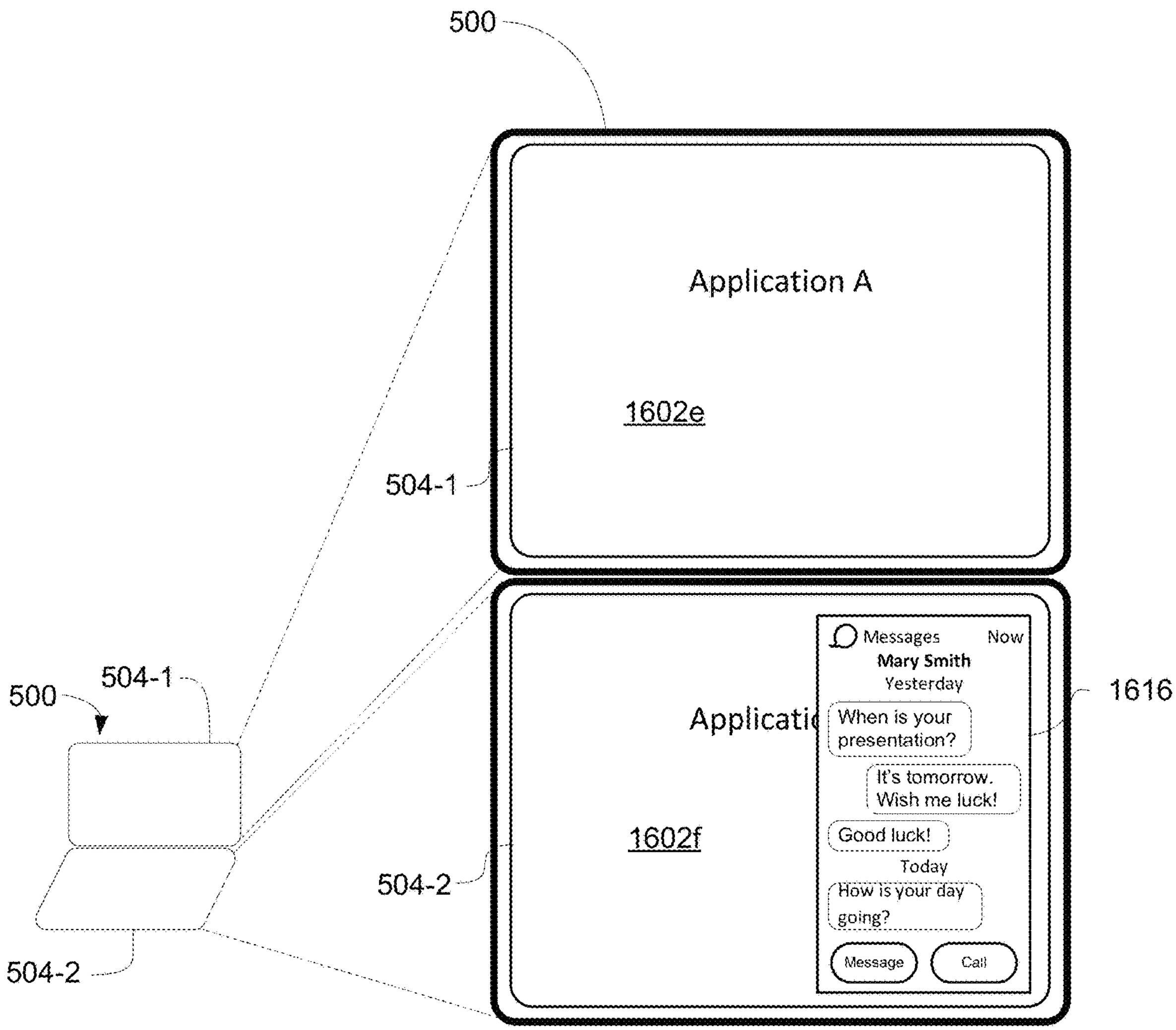

FIG. 16Y illustrates an expanded indication 1616 of the notification displayed on the second touch screen 504-2 in response to the gesture illustrated in FIG. 16X. As shown in FIG. 16Y, the expanded indication 1616 of the notification includes a conversation history of the message that the notification indicates, as previously described with reference to FIG. 16P.

Figure 16Z:
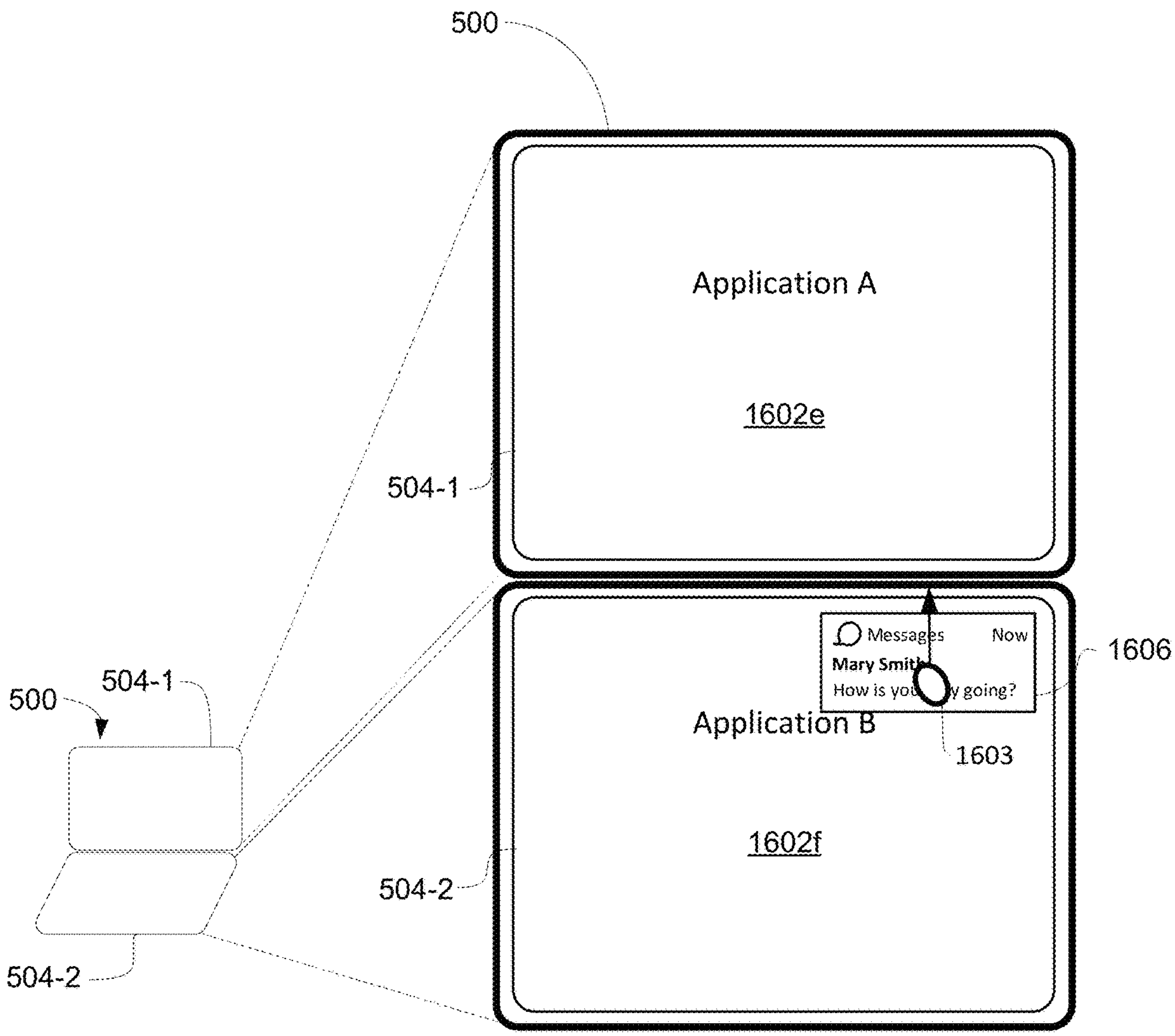
Figure 16A:
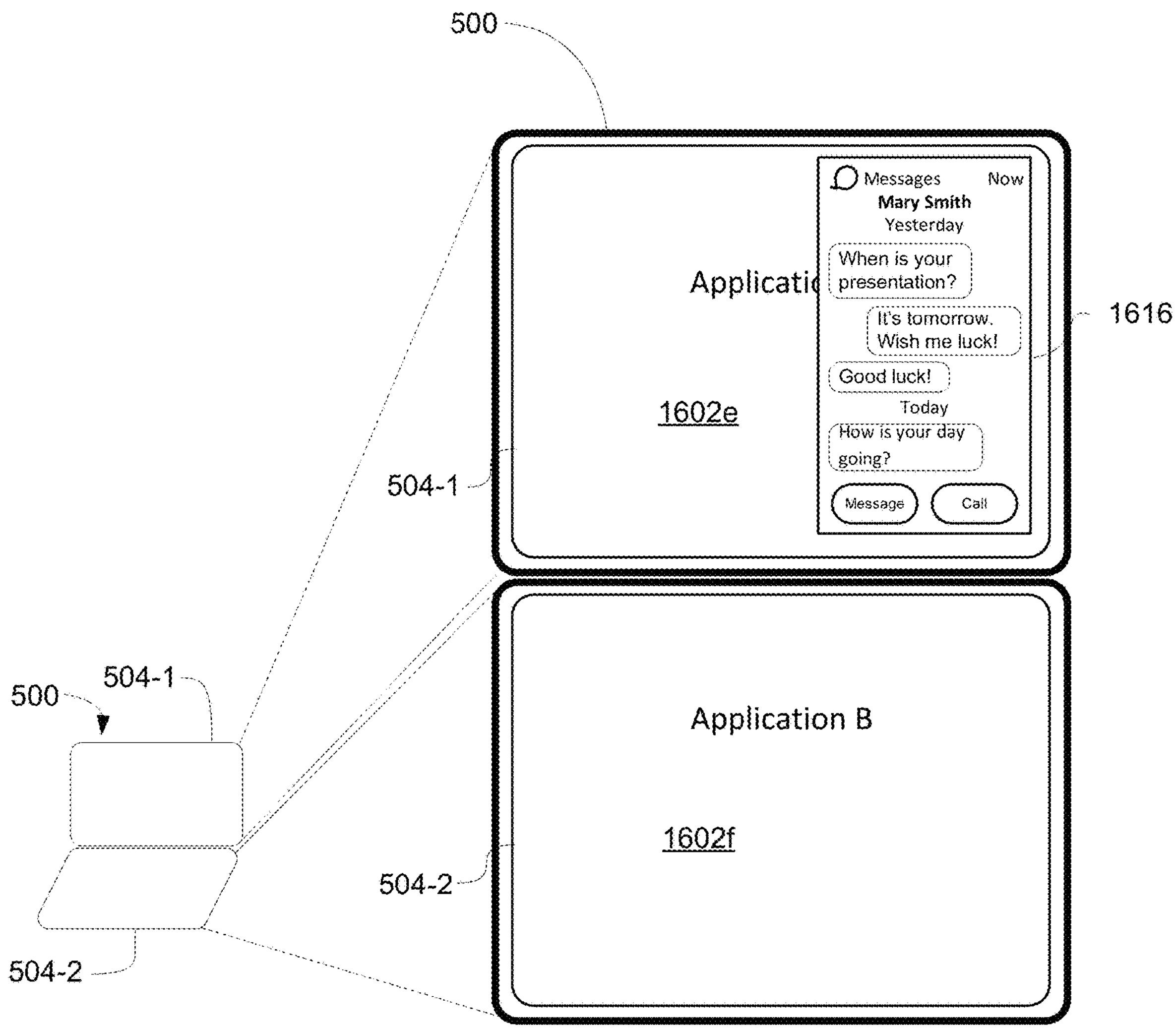
Figure 17A:
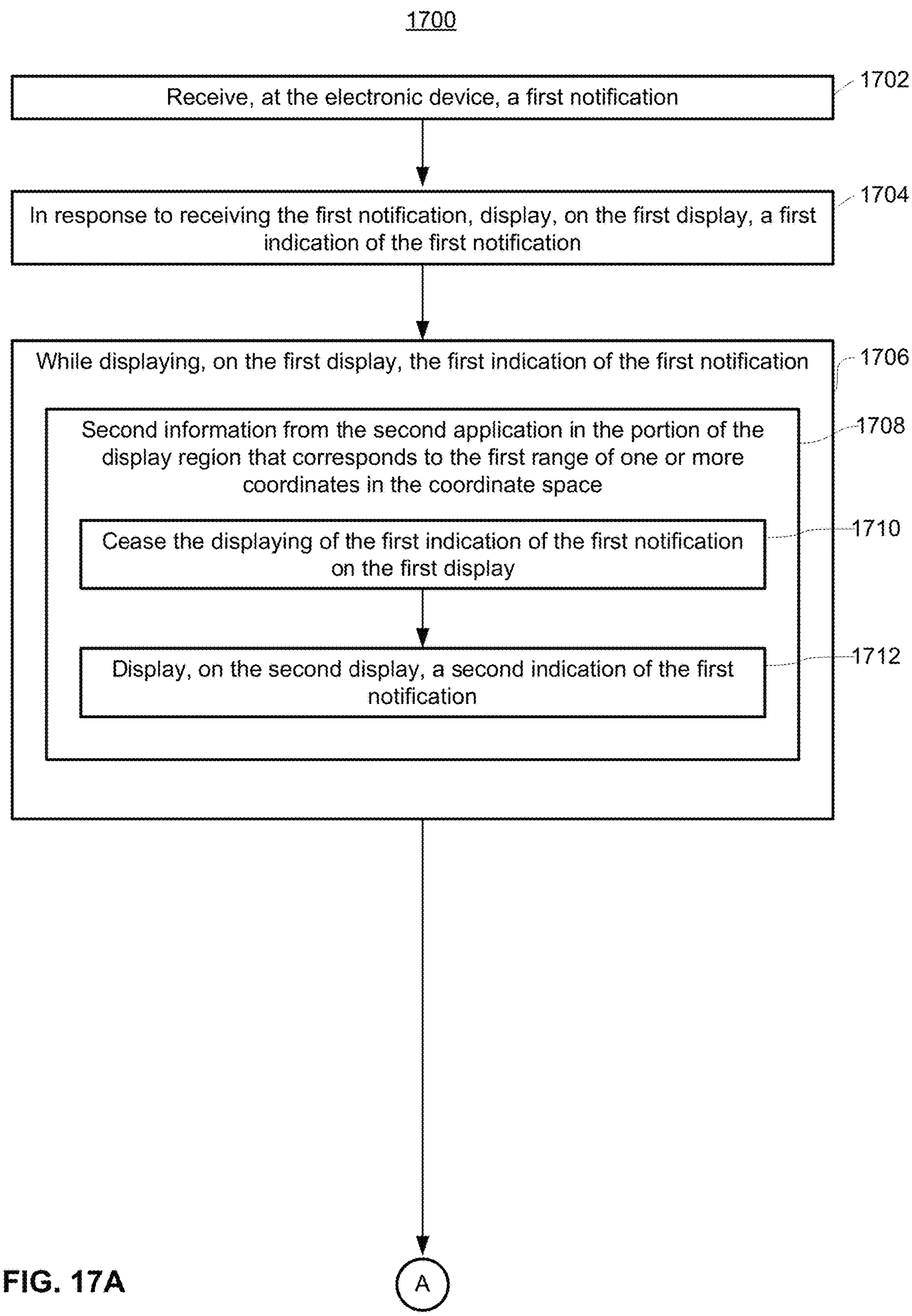
Figure 17B:
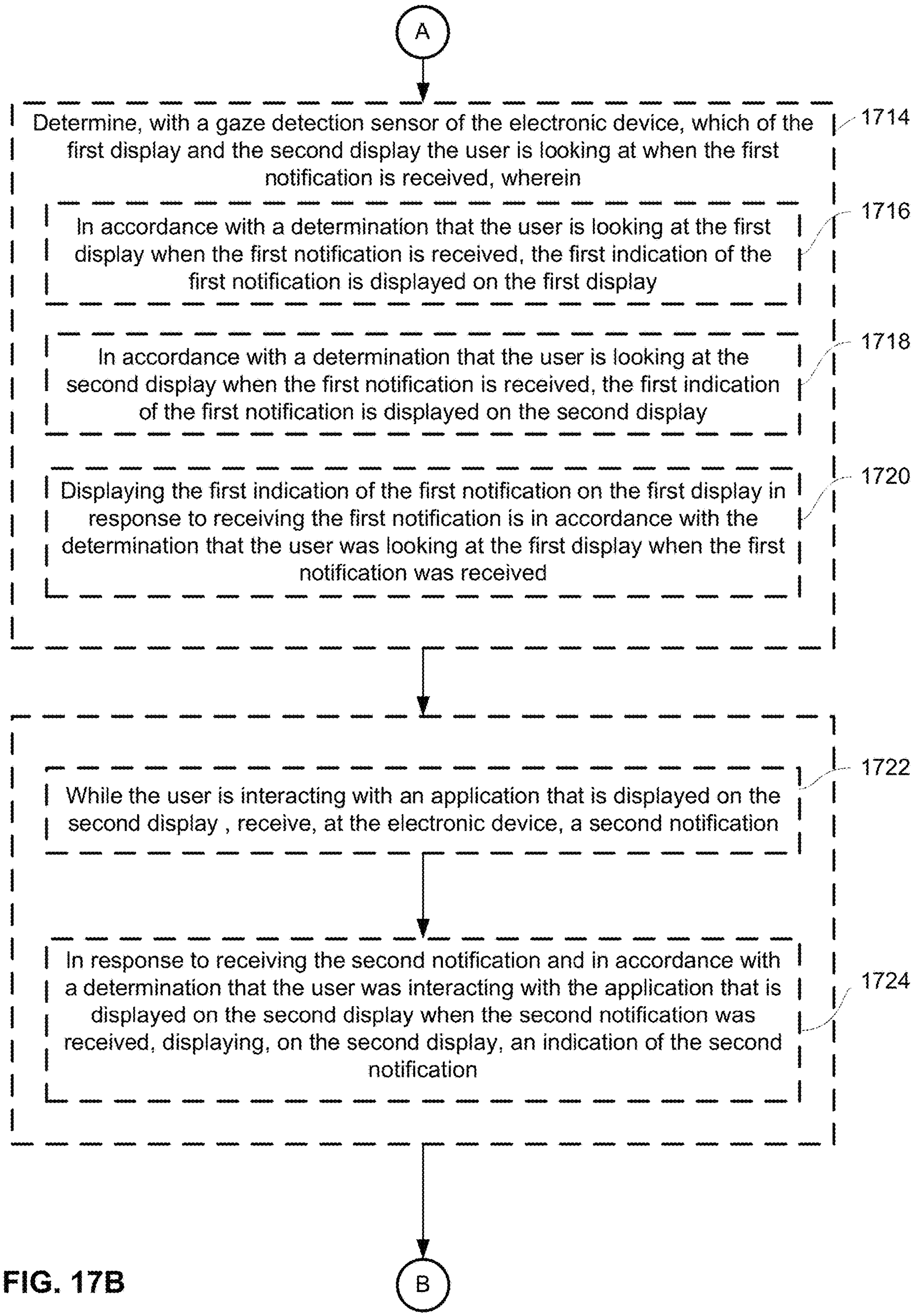
Figure 17C:
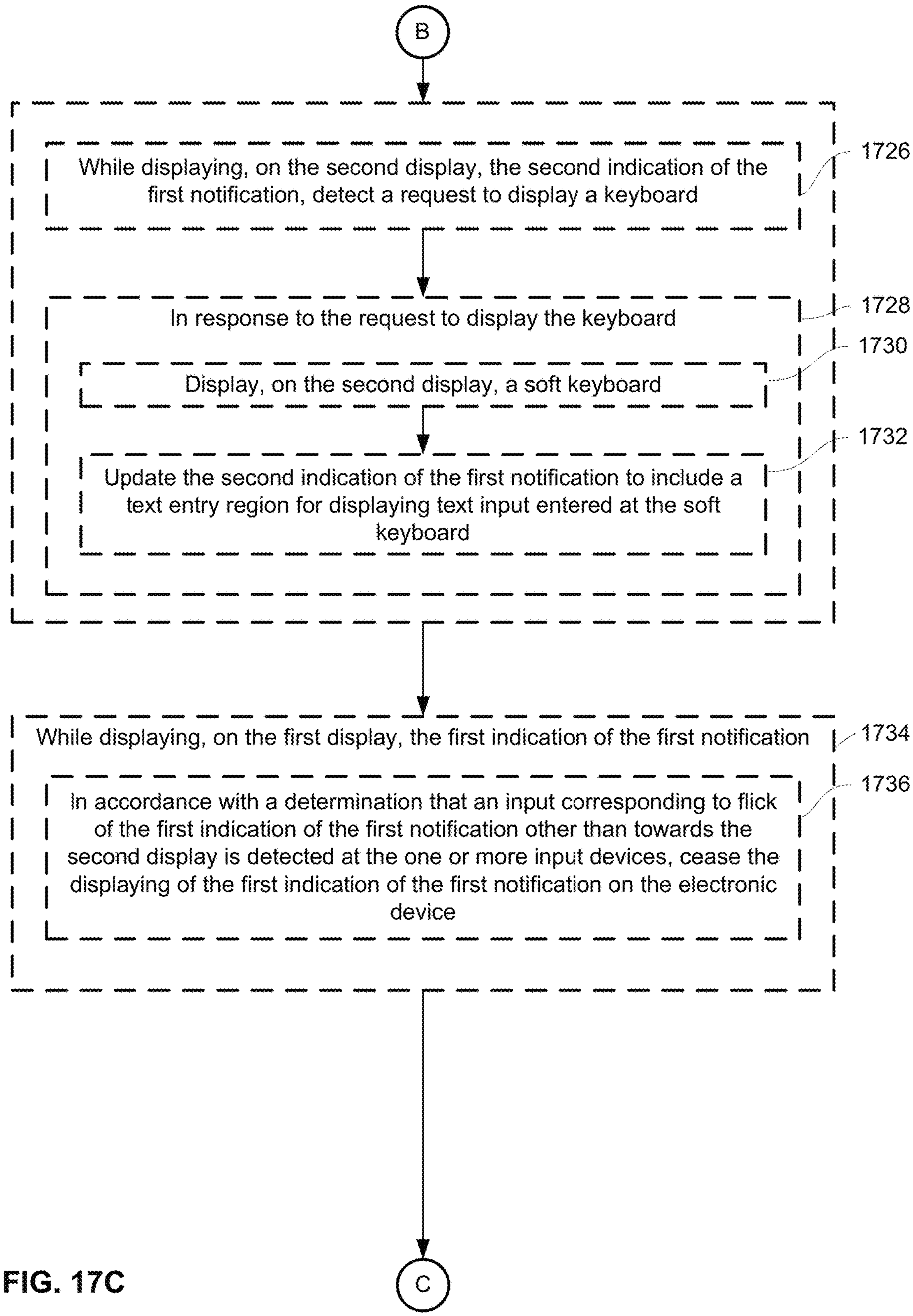
Figure 17D:
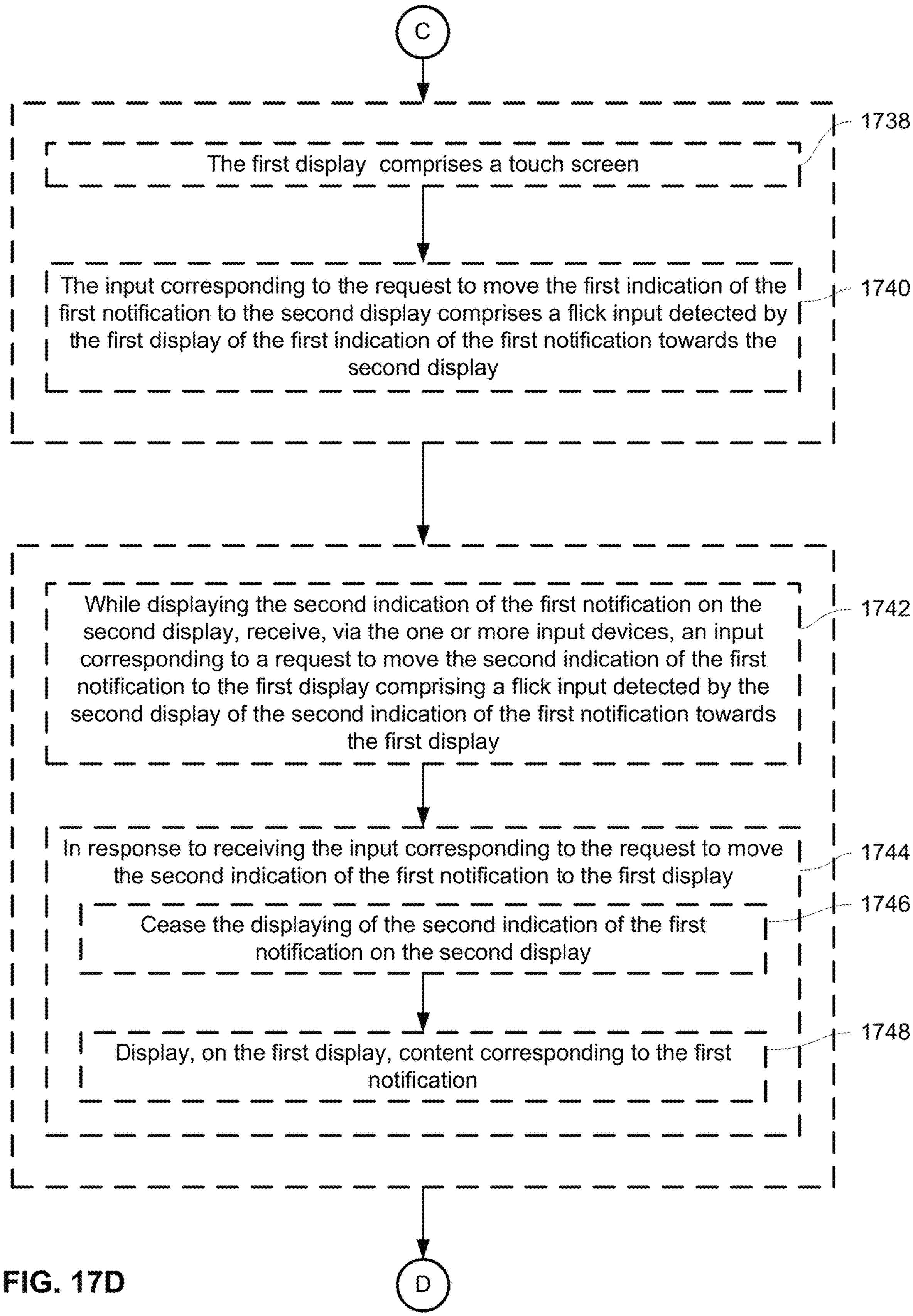
Figure 17E:
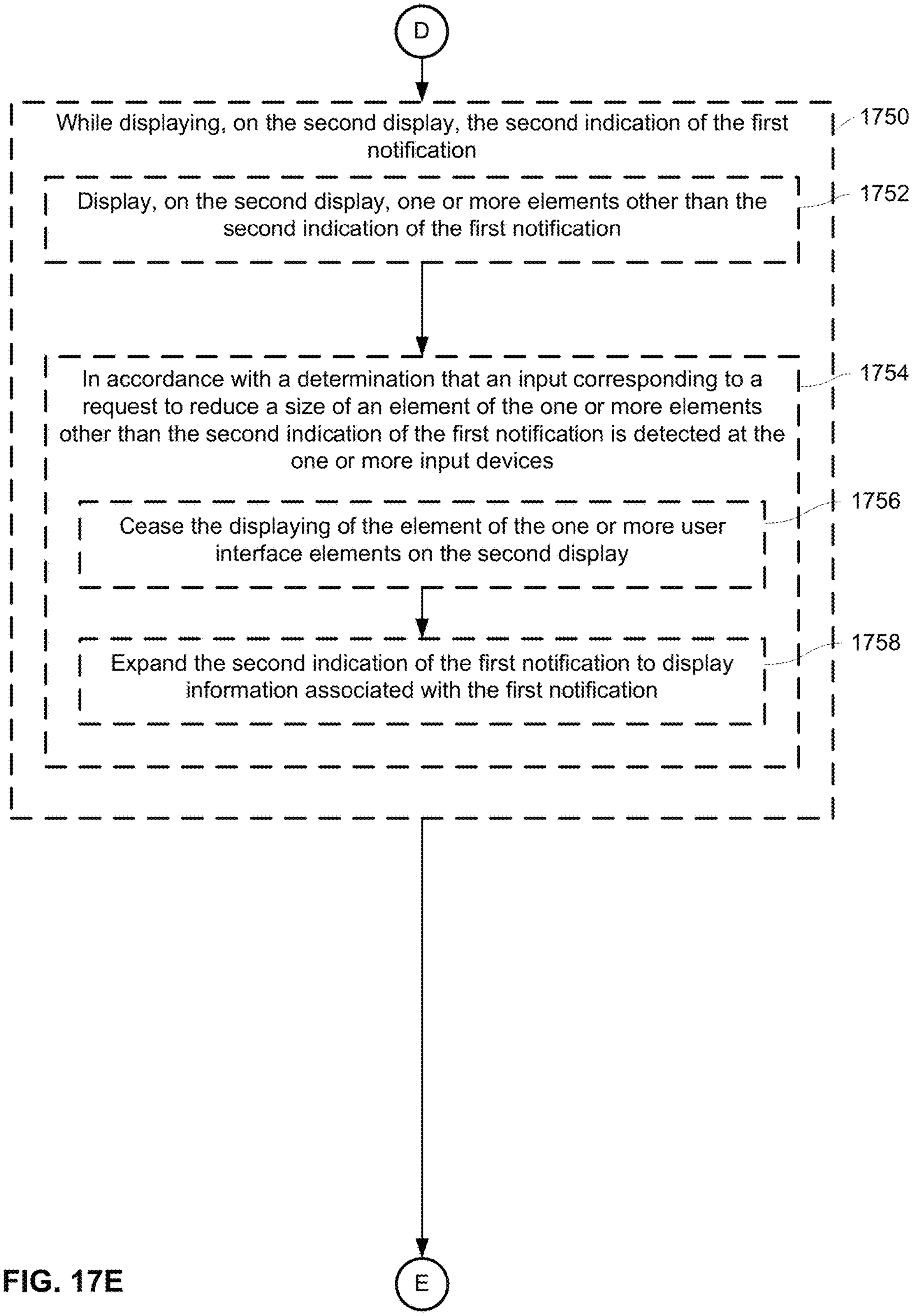
Figure 17F:
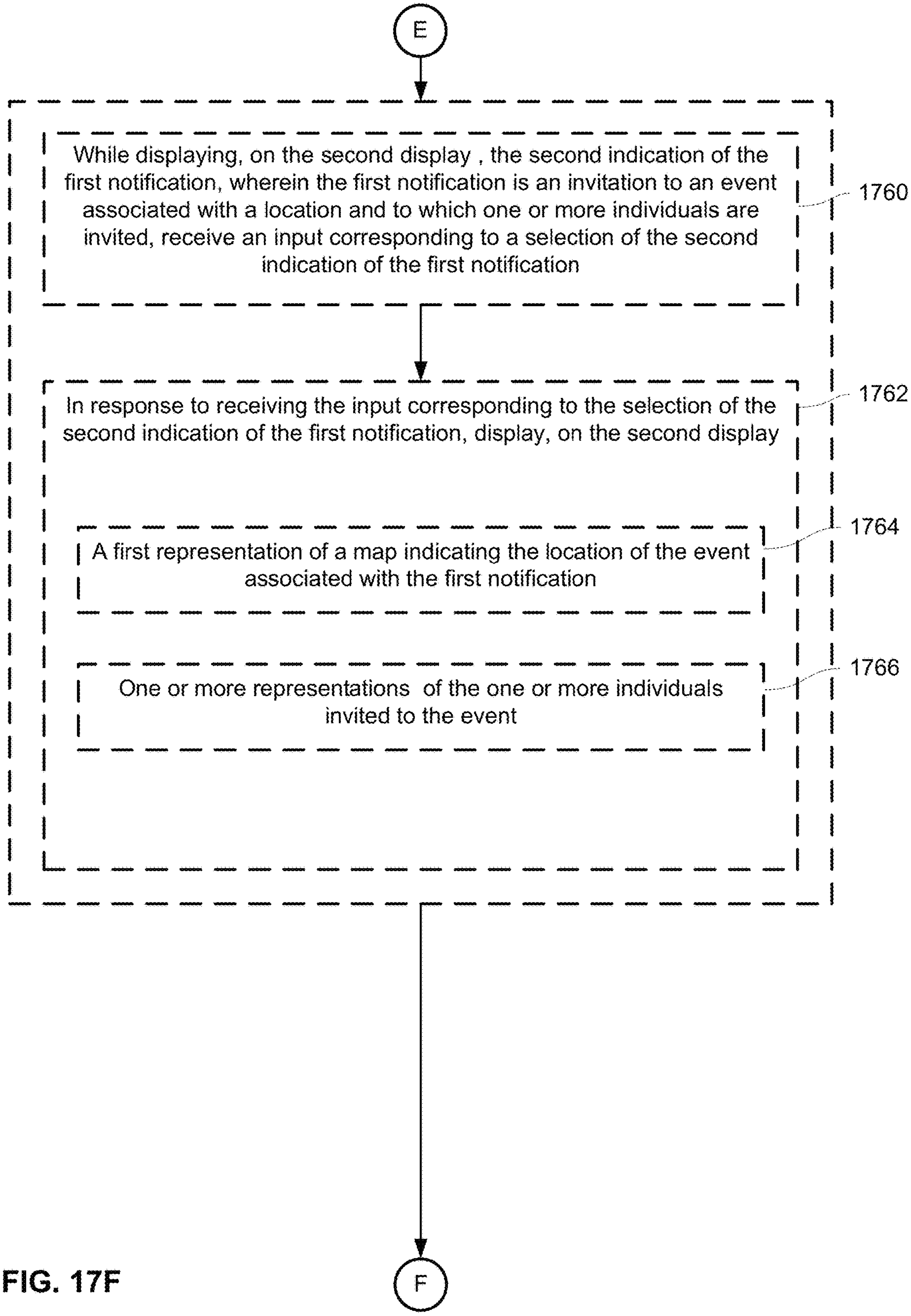
Figure 17H:
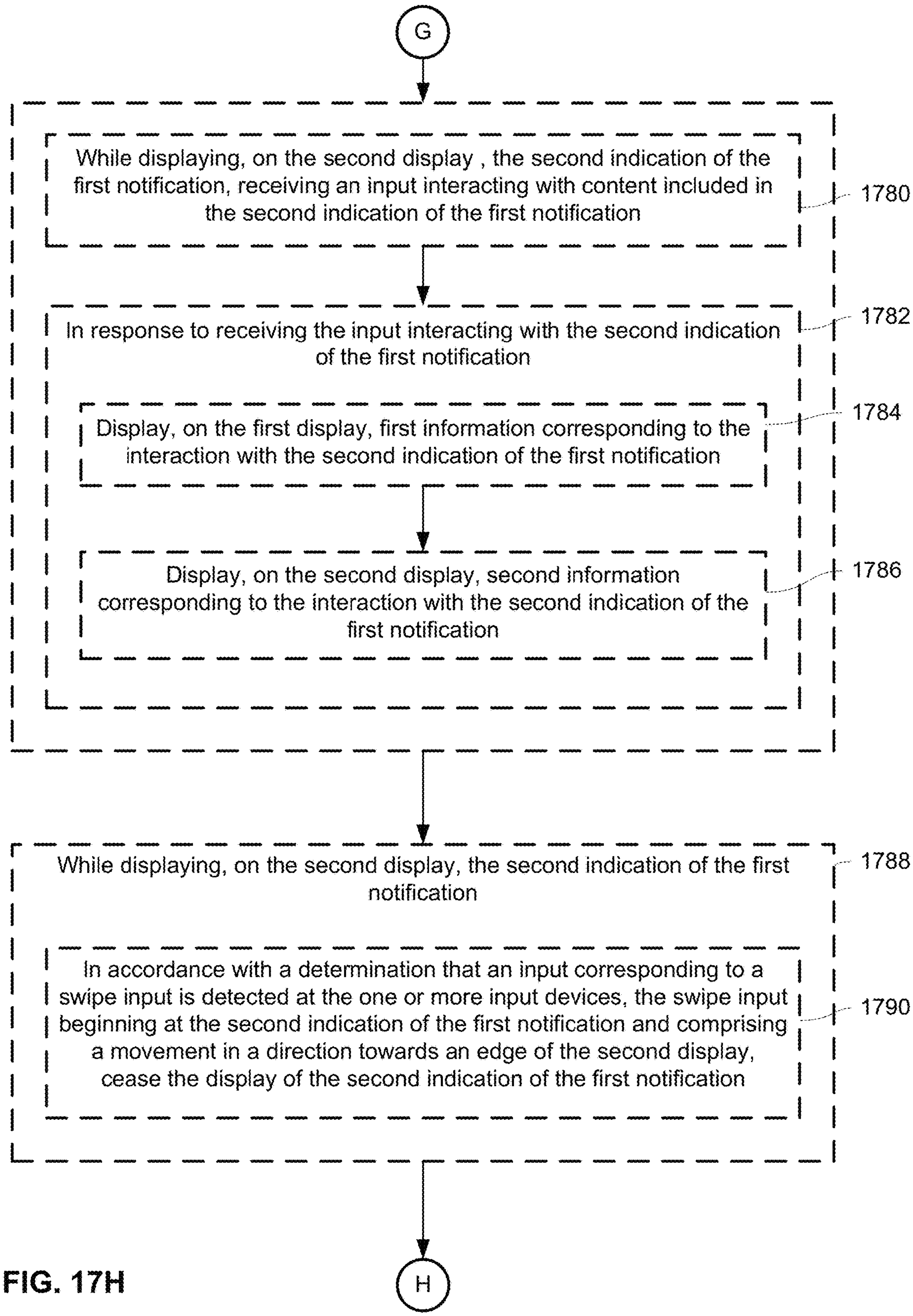
Figure 17I:
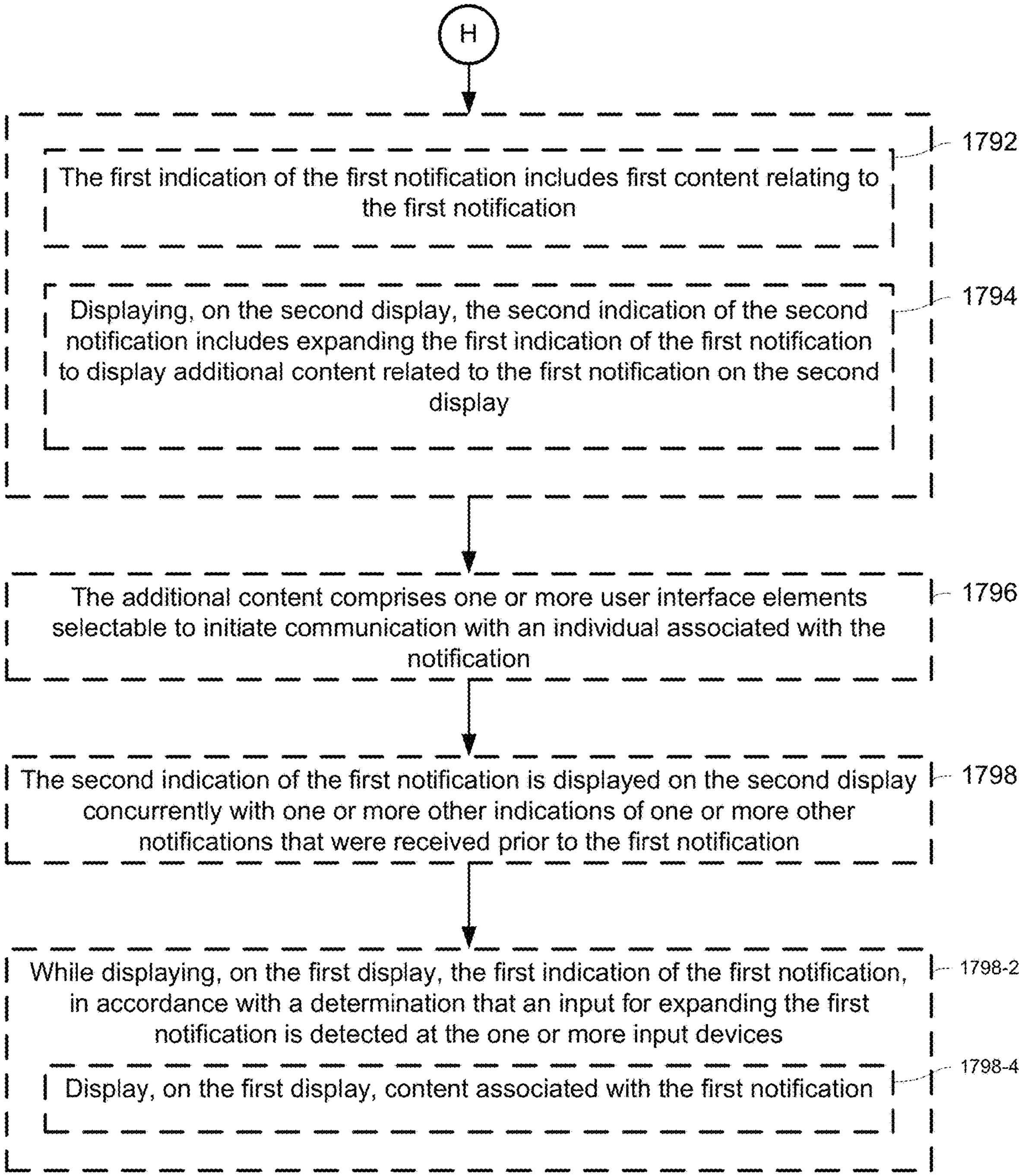

In some embodiments, in response to a user input to move an indication of a notification to a different touch screen, the electronic device 500 displays an expanded indication of the notification on the other touch screen. In FIG. 16Z, the electronic device 500 displays an indication 1606 of a notification on the second touch screen 504-2 of the electronic device 500. The user selects (e.g., with contact 1603) the indication 1606 of the notification and flicks or drags the indication of the notification towards the first touch screen 504-1. In response to detecting the gesture, the electronic device 500 displays an expanded indication of the notification on the first touch screen 504-1, as shown in FIG. 16AA.

FIG. 16AA illustrates an expanded indication 1616 of the notification on the first touch screen 504-1 of the electronic device 500 in response to the gesture illustrated in FIG. 16Z. The expanded indication 1616 includes a conversation history, as described above with reference to FIGS. 16P and 16Y.

FIGS. 17A-17I are flow diagrams illustrating a method of presenting indications of notifications in accordance with some embodiments of the disclosure. The method 1700 is optionally performed at an electronic device, such as device 100, device 300, or device 500 described above with reference to FIGS. 1A-1B, 2-3, 4A-4B and 5A-5H. Some operations in method 1700 are, optionally combined and/or the order of some operations is, optionally, changed.

As described below, the method 1700 provides ways of presenting indications of notifications. The method reduces the cognitive burden on a user when interacting with a user interface of the device of the disclosure, thereby creating a more efficient human-machine interface. For battery-operated devices, increasing the efficiency of the user's interaction with the user interface conserves power and increases the time between battery charges.

In some embodiments, an electronic device in communication with a first display, a second display, and one or more input devices (e.g., electronic device 500, a phone, tablet computer, laptop, etc. including two or more touch screens or two or more displays, or a set-top box connected to two or more televisions) receives (1702), at the electronic device, a first notification 1606 illustrated in FIG. 16B (e.g., receiving a notification over a wired or wireless connection or from one or more applications running on the electronic device). In some embodiments, the notification includes a message and/or one or more controls associated with actions related to the message.

In some embodiments, in response to receiving the first notification, the electronic device displays (1704), on the first display, a first indication 1606 of the first notification (e.g., one or more of an icon, text, and/or controls associated with the notification), such as in FIG. 16B. In some embodiments, a sound is played by a speaker included in or connected to the electronic device when the indication of the notification is displayed.

In some embodiments, while displaying, on the first display, the first indication of the first notification: in accordance with a determination that an input, such as contact 1603 illustrated in FIG. 16F, corresponding to a request to move the first indication of the first notification to the second display is detected at the one or more input devices (e.g., a touchscreen, a mouse, a trackpad, a keyboard, etc.): the electronic device ceases (1710) the displaying of the first indication of the first notification on the first display and displays (1712), on the second display, a second indication 1608 of the first notification, such as in FIG. 16G. In some embodiments, the input optionally comprises a flicking gesture detected at the location of the first indication on the first display, which is optionally a touch screen, where the flicking gesture is directed from the location of the first indication on the first display towards the second display. In some embodiments, the second indication optionally includes the same visual content (e.g., text, icons, and/or controls associated with actions related to the indication) as the first indication. In some embodiments, it appears as though the indication of the notification "moves" from the first display to the second display in response to the user input to move the indication. In some embodiments, if no input is detected with respect to the indication of the notification on the first display for a predetermined amount of time (e.g., 3, 5 or 10 seconds) after the indication is displayed, the indication ceases to be displayed on the first display (and was never displayed on the second display). If, however, the indication of the notification is moved to the second display within the above predetermined time of being displayed on the first display, the indication optionally remains displayed on the second display indefinitely, or until the user provides input to cease displaying the indication on the second display.

The above-described manner of allowing user input for moving an indication of a notification from one display associated with an electronic device to another display associated with the electronic device allows the electronic device to provide the user with an efficient way to organize information displayed at the electronic device, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the electronic device determines (1714), with a gaze detection sensor (e.g., one or more visible light or infrared cameras) of the electronic device, which of the first display and the second display the user is looking at when the first notification is received. In accordance with a determination that the user is looking at the first display 504-1 when the first notification is received, the first indication 1606 of the first notification is displayed on the first display (1716), such as in FIG. 16B, and in accordance with a determination that the user is looking at the second display 504-2 when the first notification is received, the first indication 1606 of the first notification is displayed on the second display (1718), such as in FIG. 16D.

In some embodiments, displaying the first indication 1606 of the first notification on the first display 504-2 in response to receiving the first notification is in accordance with the determination that the user was looking at the first display when the first notification was received (1720). In some embodiments, when the user is looking at the first display when the first notification is received, the first indication of the notification is displayed on the first display rather than the second display, and when the user is looking at the second display when the first notification is received, the first indication of the notification is displayed on the second display rather than the first display.

The above-described method of displaying the notification indication on the display that the user is looking at allows the electronic device to present information to the user at a location where the user can easily see it, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, while the user is interacting with (e.g., entering an input to control, entering text into, etc.) an application, such as presenting the active application user interface 1602*d* as in FIG. 16I, that is displayed on the second display 504-2 (e.g., the bottom screen), the electronic device receives (1722), at the electronic device, a second notification (e.g., receiving a notification over a wired or wireless connection from one or more applications running on the electronic device). In some embodiments, the notification includes a message and/or one or more controls associated with actions related to the message.

In some embodiments, in response to receiving the second notification and in accordance with a determination that the user was interacting with the application 1602*d* that is displayed on the second display 504-2 when the second notification was received, the electronic device displays (1724), on the second display, an indication 1606 of the second notification (e.g., one or more of an icon, text, and/or controls associated with the second notification), such as in FIG. 16I. In some embodiments, a sound is played by a speaker included in or connected to the electronic device when the indication of the second notification is displayed. The indication of the second notification optionally initially appears on the second display without first appearing on the first display when the user is interacting with an application on the second display. In some embodiments, if the user was not interacting with the application on the second display when the second notification was received, the indication of the second notification is displayed on the first display rather than the second display in response to receiving the second notification.

The above-described method of displaying the indication of the second notification on the second display when the user is interacting with an application displayed on the second display allows the electronic device to present information where the user can easily see it, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 16J, while displaying, on the second display 504-2, the second indication of the first notification 1606, the electronic device detects (1726) a request to display a keyboard, such as movement of contact 1603 (e.g., a swipe input from the second indication of the first notification in a direction towards the center of the second display, a swipe input from the second indication of the first notification in a downward direction, selection of a soft button for displaying a soft keyboard, or an input via a voice command, a mouse, or another input device of the electronic device).

In some embodiments, in response to the request to display the keyboard (1728), such as illustrated in FIG. 16J: the electronic device displays (1730), such as in FIG. 16K, on the second display 504-2, a soft keyboard 1614 (e.g., the soft keyboard is optionally displayed in a region of the second display corresponding to the direction of the swipe input for displaying the soft keyboard). For example, in response to a swipe input from the second indication of the first notification, the soft keyboard is optionally displayed at a location on the second display closer to the center of the display than the location of the second indication.

In some embodiments, the electronic device updates (1732) the second indication 1612 of the first notification to include a text entry region for displaying text input entered at the soft keyboard 1614, such as in FIG. 16K. In some embodiments, the user is able to use the soft keyboard to enter text input into the second indication of the first notification. In some embodiments, the first notification is a notification that the electronic device has received a message and the user is able to reply to the message using the soft keyboard.

The above-described manner of displaying a soft keyboard for entering text input into the second indication of the first notification allows the electronic device to provide a way for the user to enter input in response to the first notification, which simplifies interactions between the user and the electronic device and enhances the operability of the electronic device and makes the user-device interface more efficient (e.g., by providing the user a way to respond to a notification directly from the indication of the notification), which, additionally, reduces power usage and improves battery life of the device enabling the user to use the device more quickly and efficiently.

In some embodiments, such as in FIGS. 16L-M, while displaying, on the first display 504-2, the first indication 1606 of the first notification (1734): in accordance with a determination that an input corresponding to flick of the first indication of the first notification other than towards the second display, such as movement of contact 1603 illustrated in FIG. 16L (e.g., a swipe input or a flick input in an upward direction (e.g., towards the top edge of the top display) from the first indication of the first notification, or towards the left/right edges of the top display, not towards the bottom display) is detected at the one or more input devices, (e.g., at the first display, which is optionally a touch screen), the electronic device ceases (1736) the displaying of the first indication of the first notification on the electronic device, such as in FIG. 16L. In some embodiments, the notification ceases to be displayed on the first display and is not displayed on the second display. Thus, the electronic device optionally dismisses the first indication of the first notification if the user flicks the first indication away from the bottom display rather than towards the bottom display.

The above-described manner of allowing user input for easily dismissing an indication of a notification allows the electronic device to provide the user with the ability to control what is displayed on the finite space on the first and second displays, which simplifies interactions between the user and the device and enhances the operability of the device and makes the user-device interface more efficient (e.g., by reducing the unnecessary display of information), which, additionally, reduces power usage and improves battery life of the device by enabling the user to use the device more quickly and efficiently.

In some embodiments, such as in FIGS. 16F-16G the first display 504-2 (e.g., the top display) comprises a touch screen (1738), and the input corresponding to the request to move the first indication of the first notification to the second display (e.g., the bottom display) comprises a flick input, such as movement of contact 1603 illustrated in FIG. 16F (e.g., a downward motion at a speed above a predetermined threshold speed and/or having a length less than a predetermined threshold length) detected by the first display of the first indication 1616 of the first notification towards the second display 504-2 (1740). In some embodiments, the flick input begins on top of the displayed first indication of the first notification and includes a downward motion (e.g., a downward flick). Optionally, the electronic device ceases the display of the first indication of the first notification on the first display in response to receiving the flick input. In some embodiments, the notification "moves" from the top screen to the bottom screen only after the flick input is received. The second indication of the first notification is optionally displayed in a notification area (e.g., in a peripheral area) on the bottom screen until further interaction with the notification is received.

The above-described method of moving the indication of the notification from the top display to the bottom display in response to a flick input allows the electronic device to preserve screen space on the bottom display by not displaying the indication of the notification on the bottom display until receiving a request to do so. In this way, the user is able to ignore a notification they do not wish to interact with rather than having to enter an input to remove the indication of the notification from the bottom display, which simplifies interactions between the user and the device and enhances the operability of the device and makes the user-device interface more efficient (e.g., by helping the user to interact with the electronic device using fewer inputs provided to the device), which, additionally, reduces power usage and improves battery life of the device by enabling the user to use the device more quickly and efficiently.

In some embodiments, such as in FIG. 16Z, while displaying the second indication 1606 of the first notification on the second display 504-2 (e.g., the bottom display), the electronic device receives (1742), via the one or more input devices (e.g., a touch screen included in the second display or the second display, which is optionally a touch screen), an input, such as movement of contact 1603 illustrated in FIG. 16Z, corresponding to a request to move (e.g., and optionally also expand the contents of) the second indication 1606 of the first notification to the first display 504-2 comprising a flick input, such as movement of contact 1603 illustrated in FIG. 16Z (e.g., a contact at a location on the second display at which the second indication of the first notification is displayed and an upward motion at a speed above a predetermined threshold speed and/or having a length less than a predetermined threshold length) detected by the second display 504-2 of the second indication 1606 of the first notification towards the first display 504-1 (e.g., a flick of the second indication of the first notification back towards the top display).

In some embodiments, such as in FIGS. 16Z-16AA in response to receiving the input, such as movement of contact 1603 illustrated in FIG. 16Z, corresponding to the request to move the second indication 1606 of the first notification to the first display 504-1 (1744): the electronic device ceases (1746) the displaying of the second indication of the first notification on the second display 504-2 and displays (1748), on the first display, content 1616 corresponding to the first notification, such as in FIG. 16AA. In some embodiments, the content includes information not included in the first indication of the first notification or the second indication of the first notification. For example, the indication(s) of the first notification optionally include text corresponding to an event invitation (e.g., the name of the event, the name of the individual who sent the invitation, a location of the event, and a time and date of the event) and the content of the notification optionally includes further information about the event not included in the first and/or second indications (e.g., the names of other invitees, a user interface for sending a message to one or more event invitees and/or the event organizer, a message associated with event, a map of the location of the event, etc.).

The above-described method of allowing the user to input an upward flick to move the notification from the bottom display to the top display and automatically expand the contents of the notification on the top display allows the electronic device to efficiently present further information about the notification on the top display after the notification has been moved to the bottom display in response to an upward flicking motion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 16O-16P while displaying, on the second display 504-2 (e.g., the bottom display), the second indication 1608 of the first notification (1750): the electronic device displays (1752), on the second display, one or more elements other than the second indication of the first notification, such as the user interface 1602*f* of Application B, (e.g., one or more application windows, a soft keyboard, and/or one or more soft buttons or affordances for performing an operation on the electronic device (e.g., a toolbar)).

In some embodiments, such as in FIGS. 16O-P, in accordance with a determination that an input corresponding to a request to reduce a size of an element of the one or more elements other than the second indication of the first notification is detected at the one or more input devices, such as movement of contacts 1603*a-b* illustrated in FIG. 16O (1754) (e.g., an input to hide one of the displayed elements): the electronic device ceases (1756) the displaying of the element of the one or more user interface elements on the second display and expands (1758) the second indication 1616 of the first notification to display information associated with the first notification, such as in FIG. 16P. Although FIG. 16P illustrates reducing the size of the user interface 1602*g* of Application B, it should be understood that in some embodiments, the electronic device ceases the display of the user interface 1602*g* of Application B. In some embodiments, the second indication expands into the space where the other element had been displayed before it was dismissed.

The above-described manner of creating room for the second indication of the first notification in response to the input for moving the indication of the first notification from the first display to the second display allows the electronic device to use the second display for content when no notification is displayed on the second display and then make room for the notification when the user requests to display it on the second display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 16Q-16S, while displaying, on the second display (e.g., the bottom display), the second indication 1620 of the first notification, wherein the first notification is an invitation to an event (e.g., generated by another user of another electronic device and transmitted to the electronic device by way of a wired or wireless connection) associated with a location and to which one or more individuals are invited, the electronic device receives (1760) an input corresponding to a selection of the second indication of the first notification, such as contact 1603 illustrated in FIG. 16Q (e.g., a tap detected on the second indication on the second display, a touch screen).

In some embodiments, in response to receiving the input corresponding to the selection (e.g., with contact 1603 illustrated in FIG. 16Q) of the second indication of the first notification, the electronic device displays (1762), on the second display: a first representation 1624 of a map indicating the location of the event associated with the first notification (1764) (e.g., a visual depiction of a map including the location of the event and optionally including one or more other nearby landmarks) and one or more representations 1626*a-c* (e.g., avatars, initials, or other images associated with the one or more individuals invited to the event either transmitted to the electronic device or stored on the electronic device) of the one or more individuals invited to the event (1766) (e.g., one or more other individuals invited to the event and/or the event organizer), as shown in FIG. 16S. Although FIGS. 16Q-R illustrate the indications 1620-1622 as being presented on the top display 504-1, it is understood that in some embodiment, the indications 1620-1622 are displayed on the bottom display 504-2.

The above-described manner of displaying relevant information associated with an event invitation of the notification allows the electronic device to present information to the user in an efficient and elegant manner, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 16R, while displaying, on the second display (e.g., the bottom display), the first representation 1624 of the map, the electronic device receives (1768) an input (e.g., contact 1603) corresponding to a selection of the first representation 1624 of the map (e.g., a tap on the first representation of the map detected on the second display, a touch screen). Although FIG. 16R illustrates presentation of the first representation 1624 of the map on the top display 504-1, it is understood that in some embodiments, the first representation 1624 of the map is displayed on the bottom display 504-2.

In some embodiments, such as in FIGS. 16R-S, in response to receiving the input (e.g., contact 1603 illustrated in FIG. 16R) corresponding to the selection of the first representation 1624 of the map (1770): the electronic device displays (1772), on the first display 504-1 (e.g., the top display), a first view 1630 (e.g., a route overview) of the map, the first view comprising an overview of navigation directions (e.g., one or more of driving, walking, transit, or other types of directions) from a location of the electronic device (e.g., based on a GPS receiver of the electronic device and/or information from a network connection of the electronic device) to the location of the event, such as in FIG. 16S. In some embodiments, the first view of the map comprises a map including the location of the electronic device and the location of the event with the route of travel visually distinguished (e.g., highlighted) on the map.

In some embodiments, such as in FIG. 16S, the electronic device displays (1774), on the second display 504-2, a second view 1624 (e.g., a destination detail view) of the map, the second view including the location of the event and illustrating a geographic area surrounding the location of the event smaller than a geographic area illustrated by the first view of the map. In some embodiments, the second view of the map is a zoomed in view of the event location. The second view of the map optionally includes information not shown in the first view of the map about one or more landmarks within the geographic area of the second view of the map, and optionally does not include the navigation directions included in the first view of the map.

The above-described manner of displaying a route overview on the first display while concurrently displaying a detailed view of the event location on the second display in response to the above selection input allows the electronic device to concurrently display different relevant information associated with the notification, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 16S-16T, while displaying, on the second display 504-2 (e.g., the bottom display), the second indication 1628 of the first notification, the electronic device receives (1776) an input, such as selection of option 1632*d* with contact 1603, for communicating with (e.g., via email, video conference, instant messaging, etc.) the one or more individuals associated with the event (e.g., selection of a user interface element/affordance within the second indication of the first notification for sending an e-mail, instant message, SMS message, or other type of communication to the one or more individuals invited to the event). In some embodiments, this input is a selection of one of the representations of the individuals displayed with the second indication of the first notification.

In some embodiments, such as in FIGS. 16S-T, in response to receiving the input, such as selection of option 1632*d* with contact 1603, for communicating with the one or more individuals, the electronic device displays (1778), within the second indication 1628 of the first notification, a messaging user interface 1636 for communicating with the one or more individuals associated with the event. A group messaging interface is optionally displayed within the second indication of the first notification. In some embodiments, a soft keyboard is also displayed on the bottom display in response to the input for providing text input to the messaging interface. The soft keyboard is optionally displayed on the second display (e.g., the bottom display) outside of the second indication of the first notification. In some embodiments, the messaging user interface replaces the text or other content of the second indication of first notification.

The above-described manner of enabling group communication within the indication of the notification associated with the event allows the user to efficiently initiate communication with the individuals associated with the event, which simplifies interactions between the user and the device and enhances the operability of the device and makes the user-device interface more efficient (e.g., by helping the user to interact with the electronic device and/or other individuals using fewer inputs provided to the device), which, additionally, reduces power usage and improves battery life of the device by enabling the user to use the device more quickly and efficiently.

In some embodiments, such as in FIG. 16R, while displaying, on the second display (e.g., the bottom display), the second indication 1622 of the first notification, the electronic device receives (1780) an input, such as contact 1603, interacting with content included in the second indication 1622 of the first notification (e.g., selecting (e.g., by way of a touch input, a cursor input via a mouse or pointer device, or a keyboard input) a user interface element (e.g., a soft button or affordance) included in the indication of the first notification). In some embodiments, the user interface element is a symbol, image, or a soft button associated with one or more aspects of the notification (e.g., location of the event, one or more individuals associated with the event, a time and/or date of the event, etc.) In some embodiments, the user interacts with the content of the indication in manner different from resizing the indication of the first notification. In some embodiments, these interactions include an input for viewing driving directions to the event (e.g., by selecting an indication to display the driving directions or by entering a swipe input from the notification towards the center of the second display). In some embodiments, the input is for viewing additional information about one or more of the individuals invited to the event (e.g., contact information, RSVP status) and/or contacting one or more individuals invited to the event (e.g., by sending a message or E-mail). Although FIG. 16R illustrates the second indication 1622 of the first notification on the first display 504-2, it is understood that in some embodiments, the electronic device 500 presents the second indication 1622 of the first notification on the second display 504-2.

In some embodiments, such as in FIGS. 16R-S, in response to receiving the input 1603 interacting with the second indication 1622 of the first notification (1782): the electronic device displays (1784), on the first display 504-2 (e.g., the top display), first information 1630 corresponding to the interaction with the second indication of the first notification (e.g., the first information occupies the full first display, causing the ceasing of display of other content not related to the notification on the first display); and displays (1786), on the second display (e.g., the bottom display), second information 1624 corresponding to the interaction with the second indication 1622 of the first notification, such as in FIG. 16S. In some embodiments, the second information is different from the first information, a subset of the first information, or includes user interface elements selectable to change which first information is displayed on the first display. Optionally, the first information and second information are related to navigation directions to a location associated with the event and the first information includes an overview of the navigation directions. In some embodiments, the second information includes information pertaining to one or more locations along the navigation directions, details about the location of the event, and/or user interface elements for altering the route of the navigation directions displayed on the first display.

The above-described manner of displaying information associated with the indication of the notification on the first display and the second display allows the electronic device to display information associated with the notification in response to an input received at the indication of the notification, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, while displaying, such as in FIG. 16L, on the second display, the second indication 1606 of the first notification (1788): in accordance with a determination that an input corresponding to a swipe input 1603 is detected at the one or more input devices, the swipe input beginning at the second indication of the first notification and comprising a movement in a direction towards an edge of the second display the electronic device ceases (1790) the display of the second indication of the first notification (e.g., the user "swipes" the second indication of the first notification off of the second display), such as in FIG. 16M. Although FIG. 16M illustrates presentation of the second indication 1606 of the notification on the first display 504-1, it is understood that in some embodiments, the electronic device 500 presents the second indication 1606 of the notification on the second display 504-2. As an example, when the second indication of the second notification is displayed in the middle of the second display and a swipe input is received at the center of the second display including a movement towards an edge of the second display. In some embodiments, the second indication of the first indication is displayed at an edge of the second display and the swipe is directed towards the edge of the second display closest to the second indication of the first notification.)

The above-described manner of dismissing the notification in response to a swipe allows the electronic device to cease the display of the notification, allowing the user to focus on other content displayed at the electronic device, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the first indication of the first notification includes first content relating to the first notification (1792). In some embodiments, when the notification is associated with an event invitation or calendar alert, the first indication includes information about the event including the name of the event, the time and date of the event, and/or an indication that the notification is associated with a calendar application.

In some embodiments, such as in FIG. 16Y, displaying, on the second display 504-2, the second indication 1616 of the second notification includes expanding the first indication 1606 of the first notification to display additional content related to the first notification on the second display (1794). In some embodiments, when the indication of the notification moves from the first display to the second display, it also expands to show additional content and/or information associated with the notification. For example, when the first notification is associated with an event invitation, expanding the indication of the first notification includes displaying additional information such as a list of people invited to the event, a location of the event (e.g., a map illustrating the event location), adjacent appointments on the calendar, etc.

The above-described manner of automatically expanding the indication of the notification when moving it to the bottom display allows the electronic device to efficiently present additional information associated with the notification to the user, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 16Y, the additional content comprises one or more user interface elements (e.g., soft buttons or affordances) selectable to initiate communication (e.g., e-mail, instant message, SMS, telephone call, video conference, and/or other modes of communication) with an individual associated with the notification (1796), such as the "Message" and "Call" buttons included in indication 1616 in FIG. 16Y. As an example, an individual is optionally associated with an electronic device that transmitted the notification to the electronic device (e.g., via a wired or wireless network connection), such as the sender of the notification to the electronic device, or one or more individuals who are participating in an event in the case that the notification is associated with the event, such as being an invitation to the event.

The above-described manner of automatically providing communication capabilities with individuals associated with the notification allows the electronic device to efficiently facilitate communication between the user of the electronic device and other individuals, which simplifies interactions between the user and the device and enhances the operability of the device and makes the user-device interface more efficient (e.g., by helping the user to interact with the electronic device using fewer inputs provided to the device), which, additionally, reduces power usage and improves battery life of the device by enabling the user to use the device more quickly and efficiently.

In some embodiments, such as in FIG. 16G, the second indication 1608 of the first notification is displayed on the second display (e.g., in response to the input corresponding to the request to move the first indication of the first notification to the second display) concurrently with one or more other indications 1610*a-b* of one or more other notifications that were received prior to the first notification (1798) (e.g., displaying a collection of previously-received notifications. In some embodiments, the notifications are presented in order from newest (e.g., most recently received) to oldest (e.g., least recently received).

The above-described method of maintaining on the second display a collection of previously-received notifications (e.g., with which the user is able to subsequently interact) allows the user to view notifications they may have missed or ignored prior to receiving the first notification, possibly including notifications related to the first notification, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 16U-V, while displaying, on the first display 504-1 (e.g., the top display), the first indication 1620 of the first notification, in accordance with a determination that an input, such as movement of contact 1603, for expanding the first notification is detected at the one or more input devices (1798-2) (e.g., a swipe input of the notification towards the center of the first display): the electronic device 500 displays (1798-4), on the first display 504-1, content 1628 associated with the first notification. Swiping the indication of the notification towards the center of the top display instead of towards the bottom display (e.g., to park the notification) or towards an outer edge of the top display (e.g., to dismiss the notification) optionally results in the notification expanding on the top display to show content associated with the notification (e.g., content not previously shown on the first indication of the first notification) that, in some embodiments, includes content the user is able to interact with corresponding to the notification. For example, the notification is optionally associated with an event and the content includes information such as the location of the event, the time and date of the event, a list of individuals associated with the event, optionally including one or more affordances for communicating with the individuals, RSVP'ing to the event, obtaining driving directions to the location of the event, etc.

The above-described manner of expanding the notification on the first display allows the user to review information associated with the notification, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

It should be understood that the particular order in which the operations in FIGS. 17A-17I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1900 and 2100) are also applicable in an analogous manner to method 1700 described above with respect to FIGS. 17A-17I. For example, the content, electronic devices, user interfaces, notifications, user interactions, etc., described above with reference to method 1700 optionally have one or more of the characteristics of the content, electronic devices, user interfaces, notifications, user interactions, etc. described herein with reference to other methods described herein (e.g., methods 700, 900, 1100, 1300, 1500, 1900, and 2100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 17A-17I are, optionally, implemented by components depicted in FIGS. 1A-1B. For example, receiving operations 1702, 1722, 1742, 1760, 1768, 1776, and 1780, and displaying operations 1704, 1712, 1720, 1724, 1730, 1748, 1752, 1762, 1772, 1774, 1778, 1784, 1786, 1794, and 1798-4 are, optionally, implemented by event sorter 170, event recognizer 180, and event handler 190. Event monitor 171 in event sorter 170 detects a contact on touch screen 504-1, 504-2, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Coordinated Content User Interfaces

Users interact with electronic devices in many different manners, including interacting with content presented on the electronic devices. For example, a user may wish to view or interact with content that is related to the content being presented on the electronic devices. The embodiments described below provide ways in which an electronic device presents, across multiple displays, representations of items of content that are related to content presented on the electronic device, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 18A-18EE illustrate exemplary ways in which an electronic device presents representations of items of content that are related to content presented on the electronic device in accordance with some embodiments of the disclosure. The embodiments in these figures are used to illustrate the processed described below, including the processes described with reference to FIGS. 19A-19O.

FIGS. 18A-18J illustrate an electronic device 500 facilitating various interactions with the representations of items of content related to content presented by the electronic device.

Figure 18A:
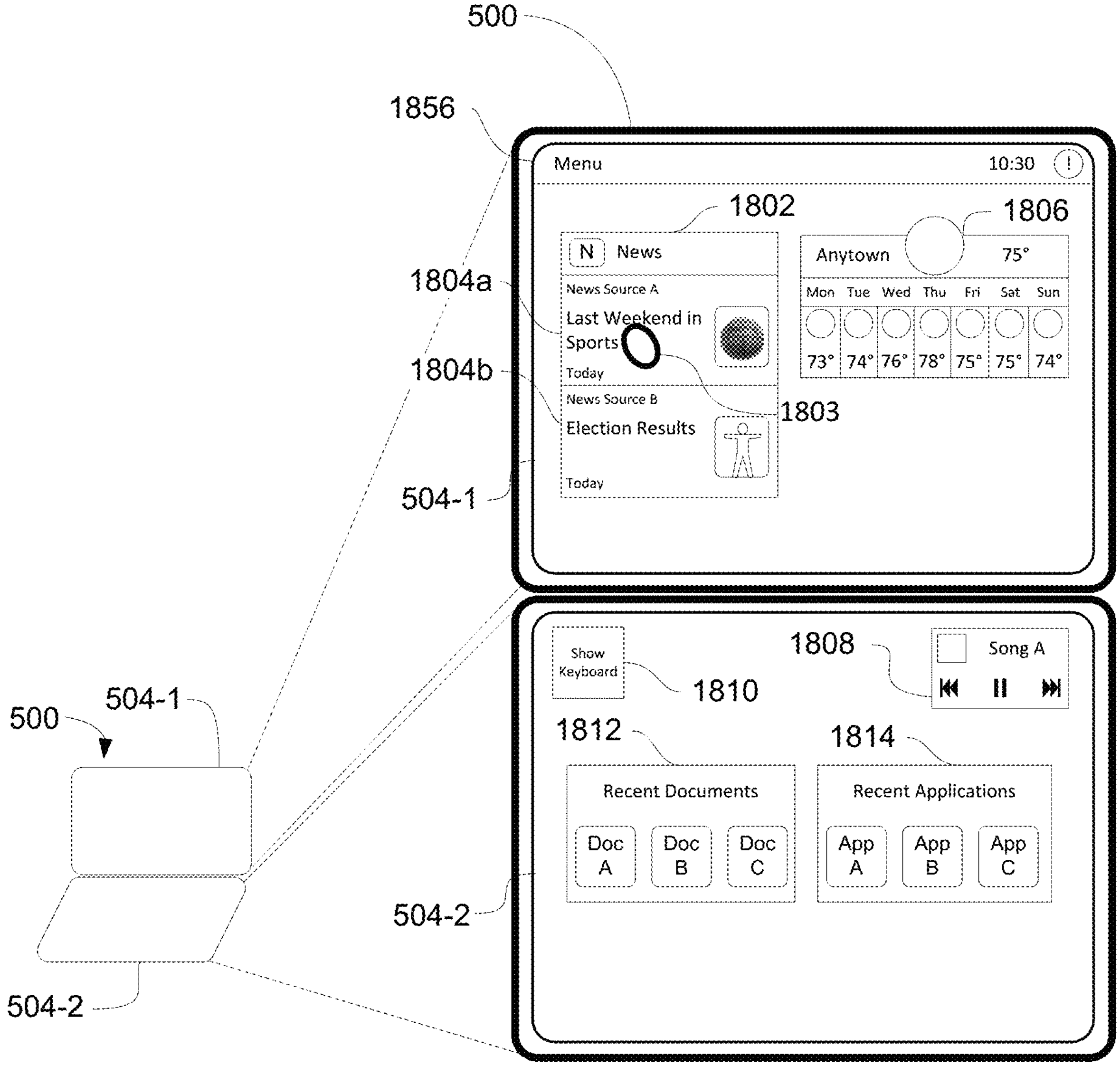
FIGS. 18A-18EE illustrate exemplary ways in which an electronic device presents representations of items of content that are related to content presented on the electronic device in accordance with some embodiments of the disclosure.

FIG. 18A illustrates exemplary device 500 with touch screens 504-1 and 504-2, such as described with reference to FIGS. 5A-5H. Touch screens 504-1 and 504-2 optionally display one or more user interfaces that include various content. In the example illustrated in FIG. 18A, the electronic device 500 presents a home screen user interface on the touch screens 504-1 and 504-2. The first touch screen 504-1 presents information external or not specific to the electronic device 500, such as a news application or widget 1802 and a weather application or widget 1806 and a menu bar 1856. The second touch screen 504-2 presents information associated with the electronic device 500, such as a media player 1808, a plurality of recent documents 1812, a plurality of recent applications 1814, and a keyboard button 1810 that, when selected, causes the electronic device 500 to present a soft keyboard, as described below with reference to process 2100. As shown in FIG. 18A, the user selects (e.g., with contact 1803) a representation 1804*a* of a news article. In response to the user's selection, the electronic device 500 presents the article and content related to the article, as shown in FIG. 18B.

Figure 18B:
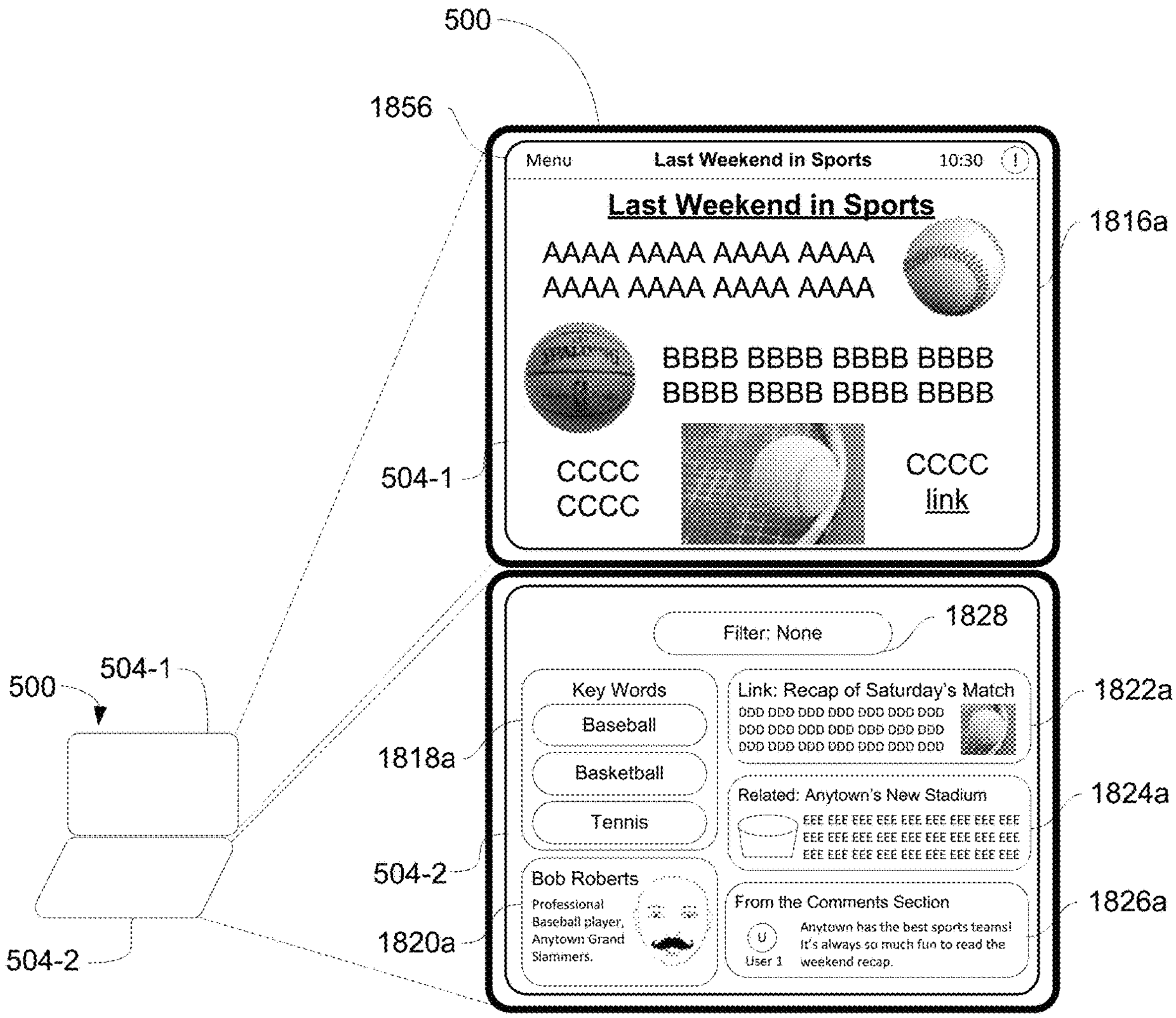

FIG. 18B illustrates a news article 1816*a* and representations 1818*a*-1826*a* of content related to the article. The first touch screen 504-1 presents the article, including text and images of the article. The second touch screen 504-2 presents the representations of content related to the article, including a plurality of key words 1818*a* related to the article, a person 1820*a* related to the article, a preview of a link 1822*a* included in the article, another article 1824*a* related to the article 1816*a*, and a comment 1826*a* on the article. As shown in FIG. 18B, while the electronic device 500 presents the article 1816*a* and the related content 1818*a*-1826*a*, the electronic device 500 continues to display the menu bar 1856 on the first touch screen 504-1.

Figure 18C:
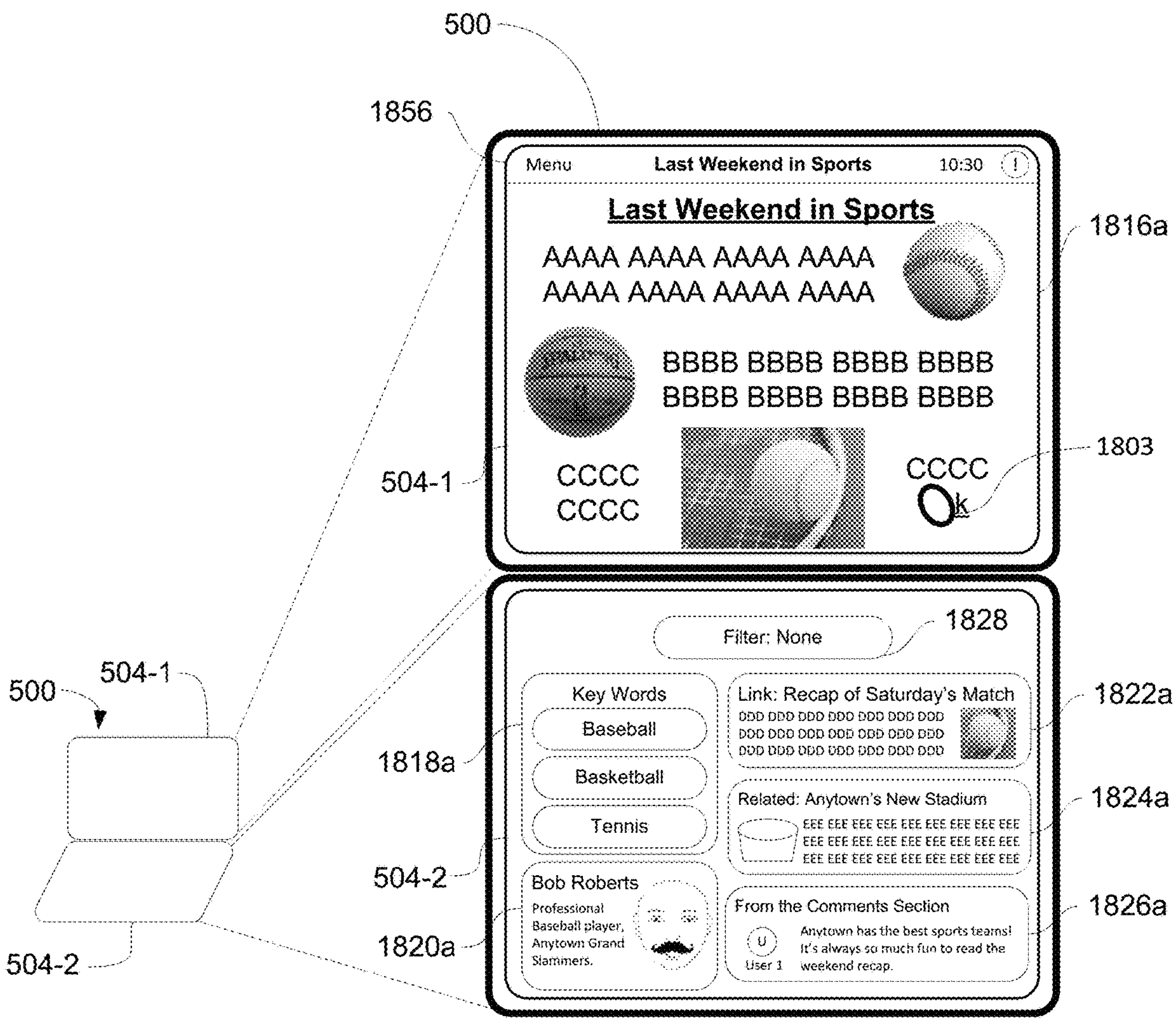

As shown in FIG. 18C, the user selects (e.g., with contact 1803) a link included in the article 1816*a* that is presented on the first touch screen 504-1. In response to the user's selection, as shown in FIG. 18D, the electronic device 500 presents the linked content on the first touch screen 504-1 and updates the second touch screen 504-2 to present content related to the linked content.

Figure 18D:
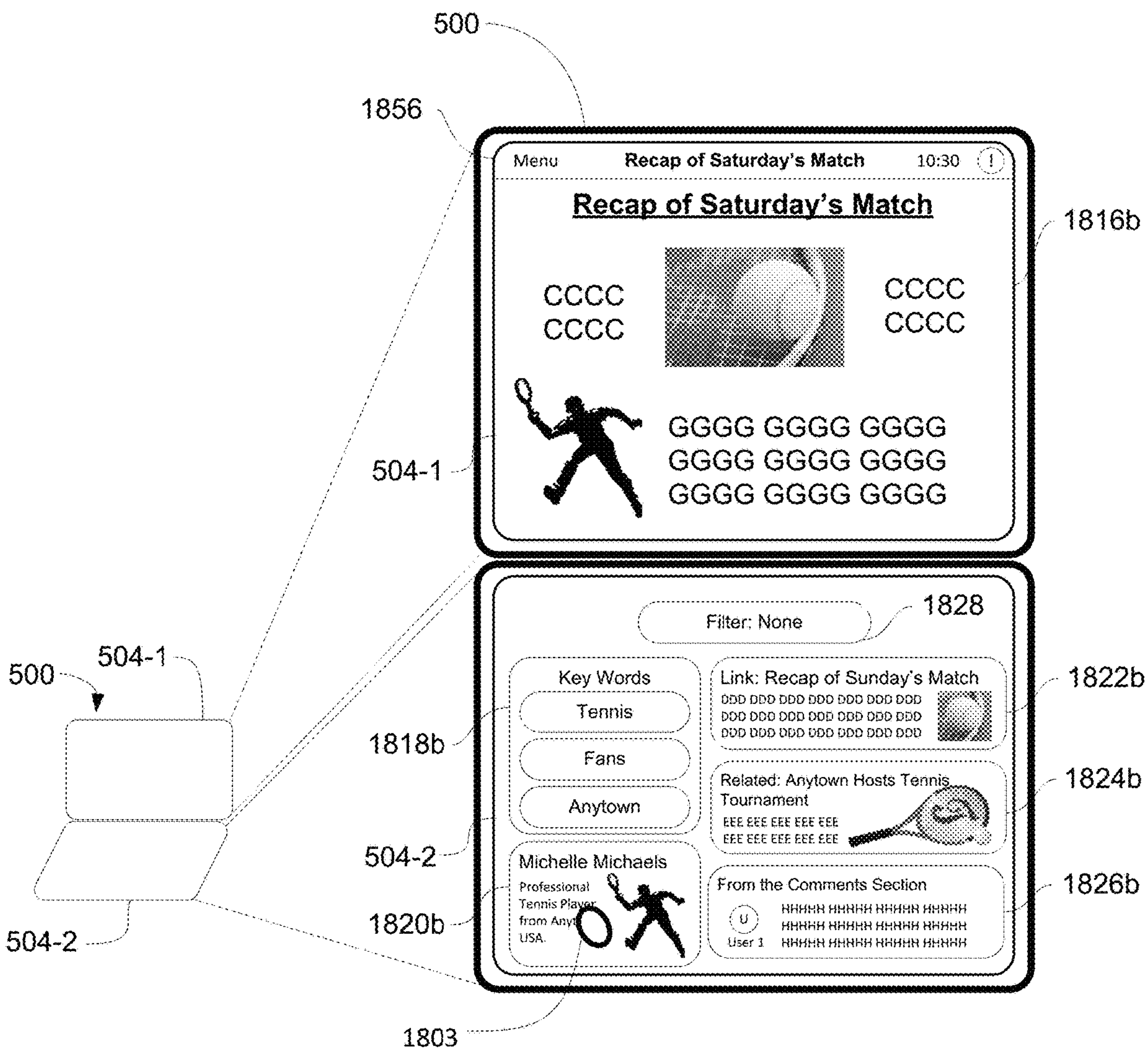

FIG. 18D illustrates presentation of the linked article 1816*b* and representations 181*b*-1826*b* of content related to the linked article. The first touch screen 504-1 presents the linked article 1816*b*, including text and images of the article. The second touch screen 504-2 presents the representations of content related to the article, including a plurality of key words 1818*b* related to the article, a person 1820*b* related to the article, a preview of a link 1822*b* included in the article, another article 1824*b* related to the article 1816*b*, and a comment 1826*b* on the article. As shown in FIG. 18D, the user selects (e.g., with contact 1803) the person 1820*b* (shown on touch screen 504-2) related to the linked article 1816*b*. In response to the user's selection, the electronic device 500 presents an expanded representation of the person 1820*b* on the second touch screen 504-2 while continuing to display the linked article 1816*b* on the first touch screen 504-1, as shown in FIG. 18E.

Figure 18E:
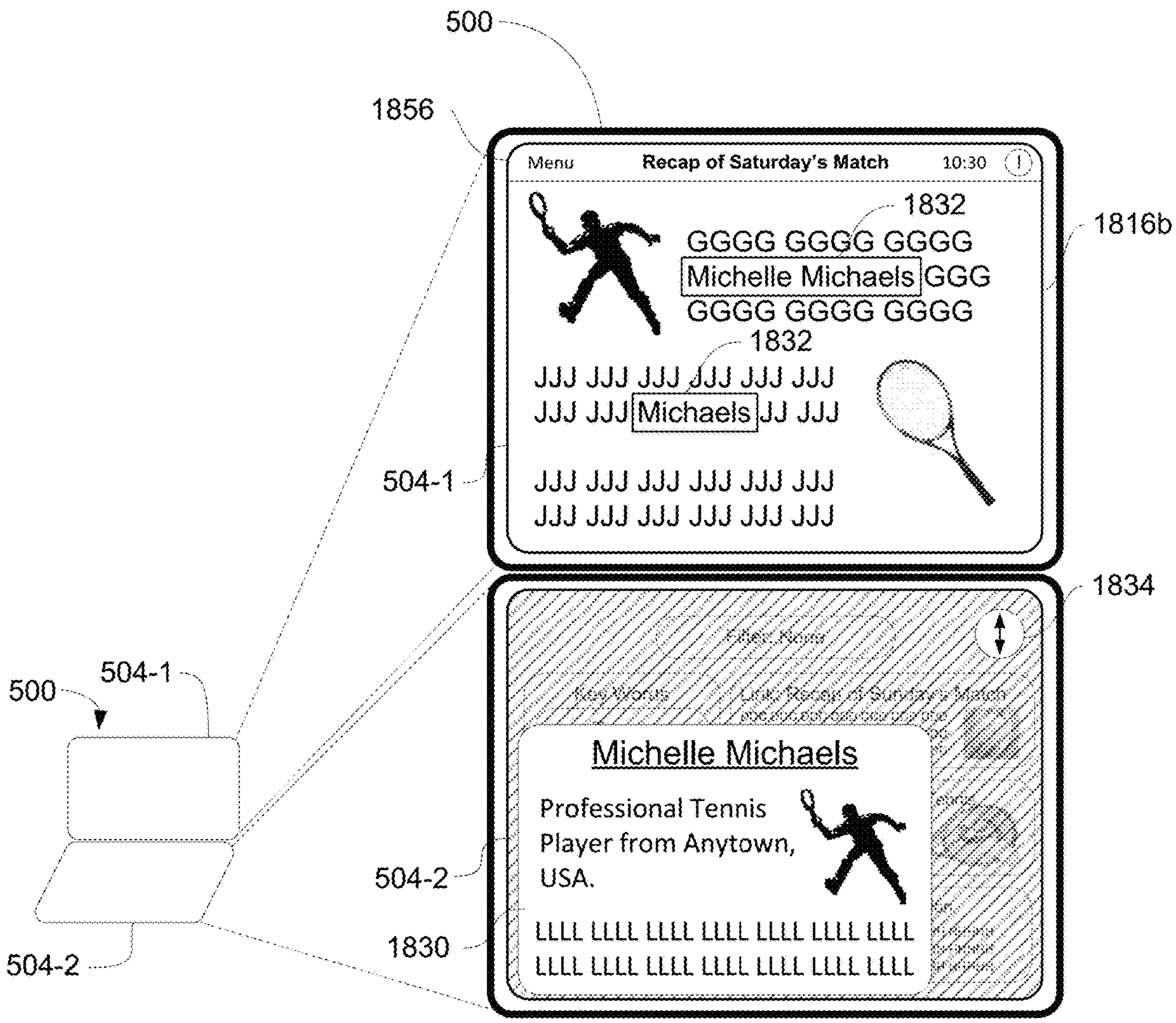

FIG. 18E illustrates the expanded representation 1830 of the person related to the linked article 1816*b*. The electronic device 500 continues to present the linked article 1816*b* on the first touch screen 504-1 and scrolls the linked article 1816*b* to a section that mentions (or is related or corresponds to) the person described in the expanded representation 1830. The electronic device highlights or otherwise visually distinguishes the sections 1832 that mention the person related to the linked article 1816*b*. While displaying the linked article 1816*b* on the first touch screen 504-1 and the expanded representation 1830 of the person related to the linked article on the second touch screen 504-2, the electronic device 500 also presents a selectable option 1834 that, when activated, causes the electronic device 500 to switch which content is displayed on each touch screen.

Figure 18F:
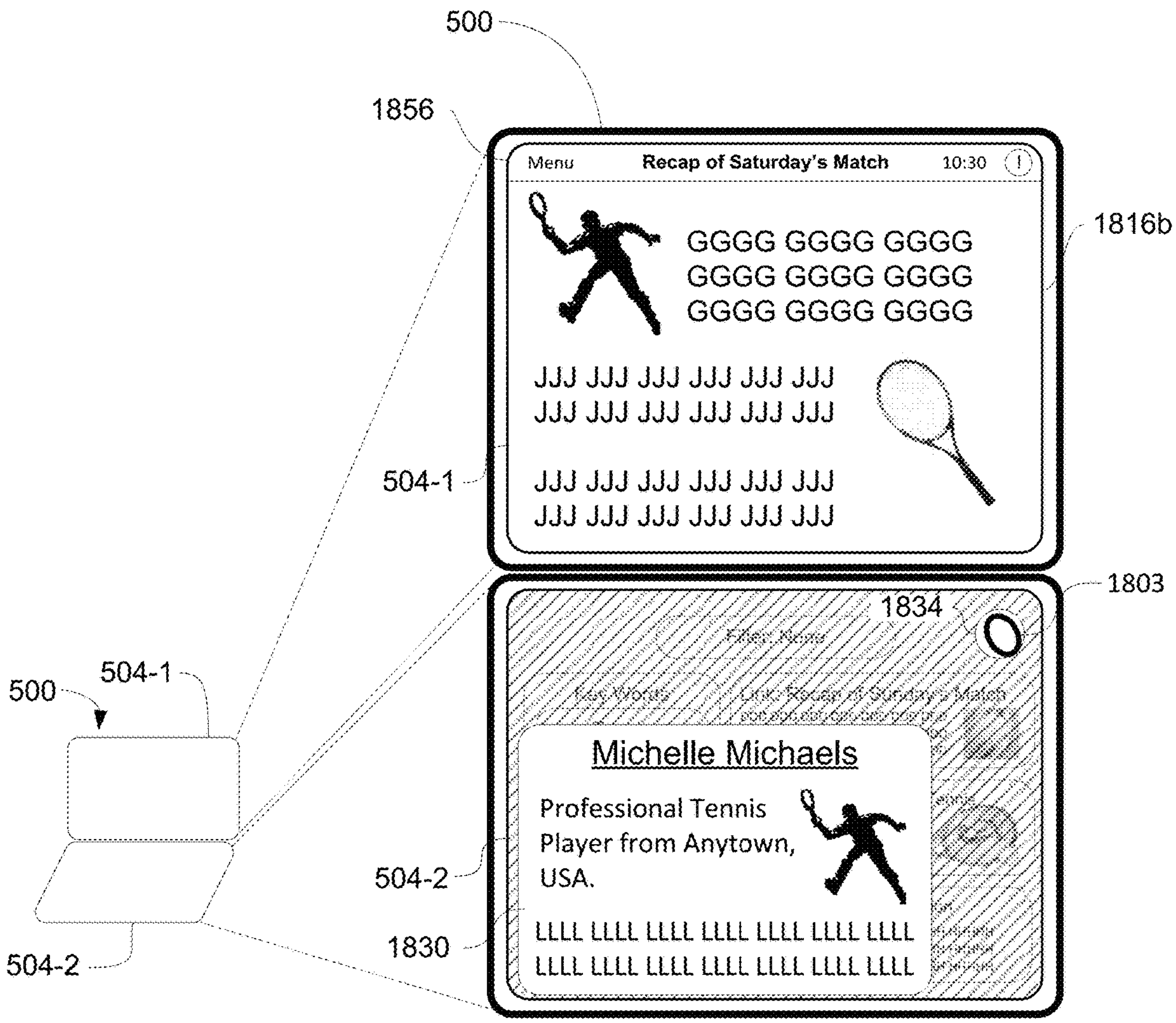

As shown in FIG. 18F, the user selects (e.g., with contact 1803) the option 1834 to switch which content is displayed on each touch screen. In response to the user's selection, as shown in FIG. 18G, the electronic device 500 presents the linked article 1816*b* on the second touch screen 504-2 and the content 1830 about the person related to the linked article on the first touch screen 504-1.

Figure 18G:
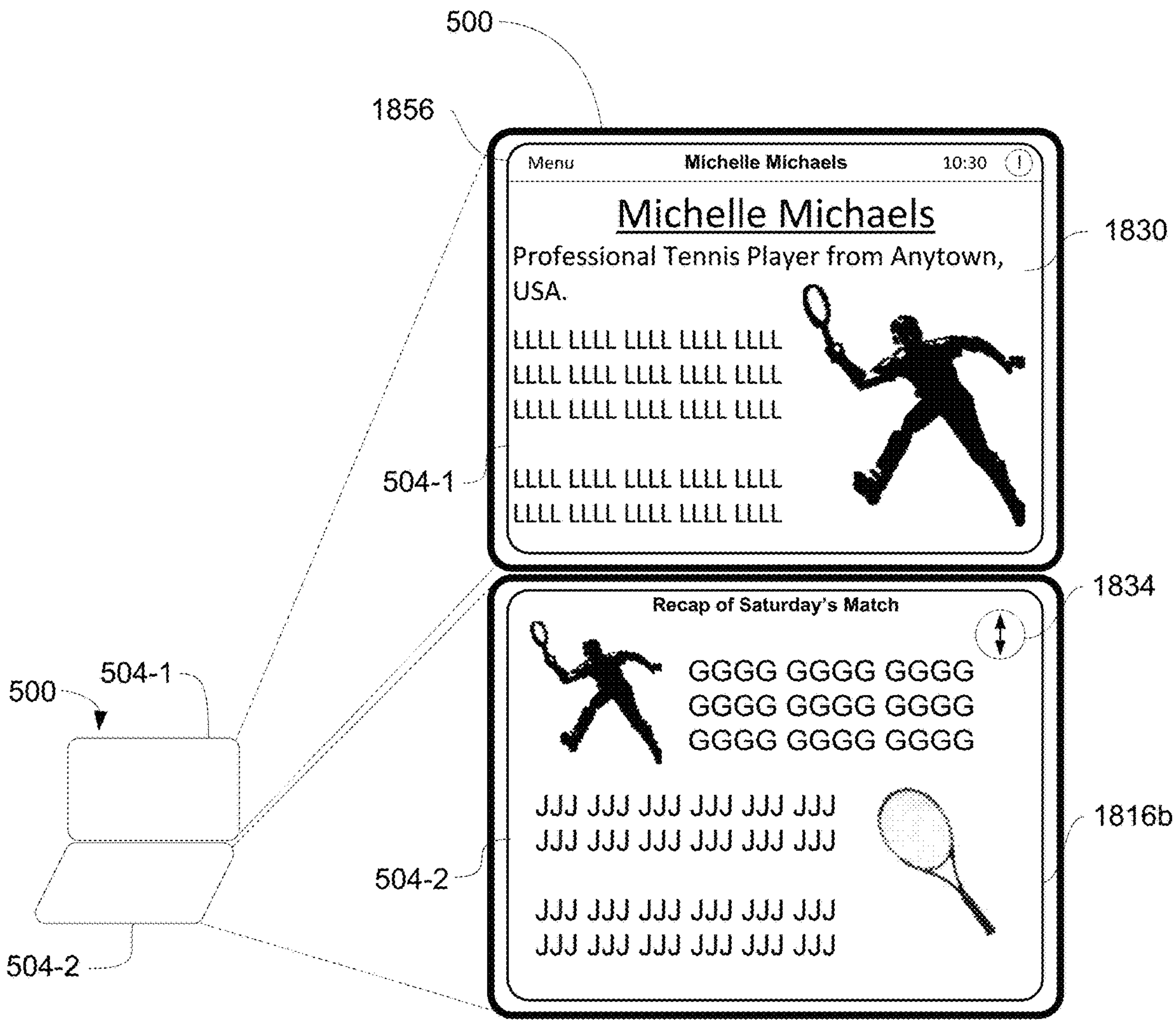

FIG. 18G illustrates presentation of the content 1830 about the person related to the linked article on the first touch screen 504-1 and presentation of the linked article 1616*b* on the second touch screen 504-2 in response to the user's selection illustrated in FIG. 18F.

Figure 18H:
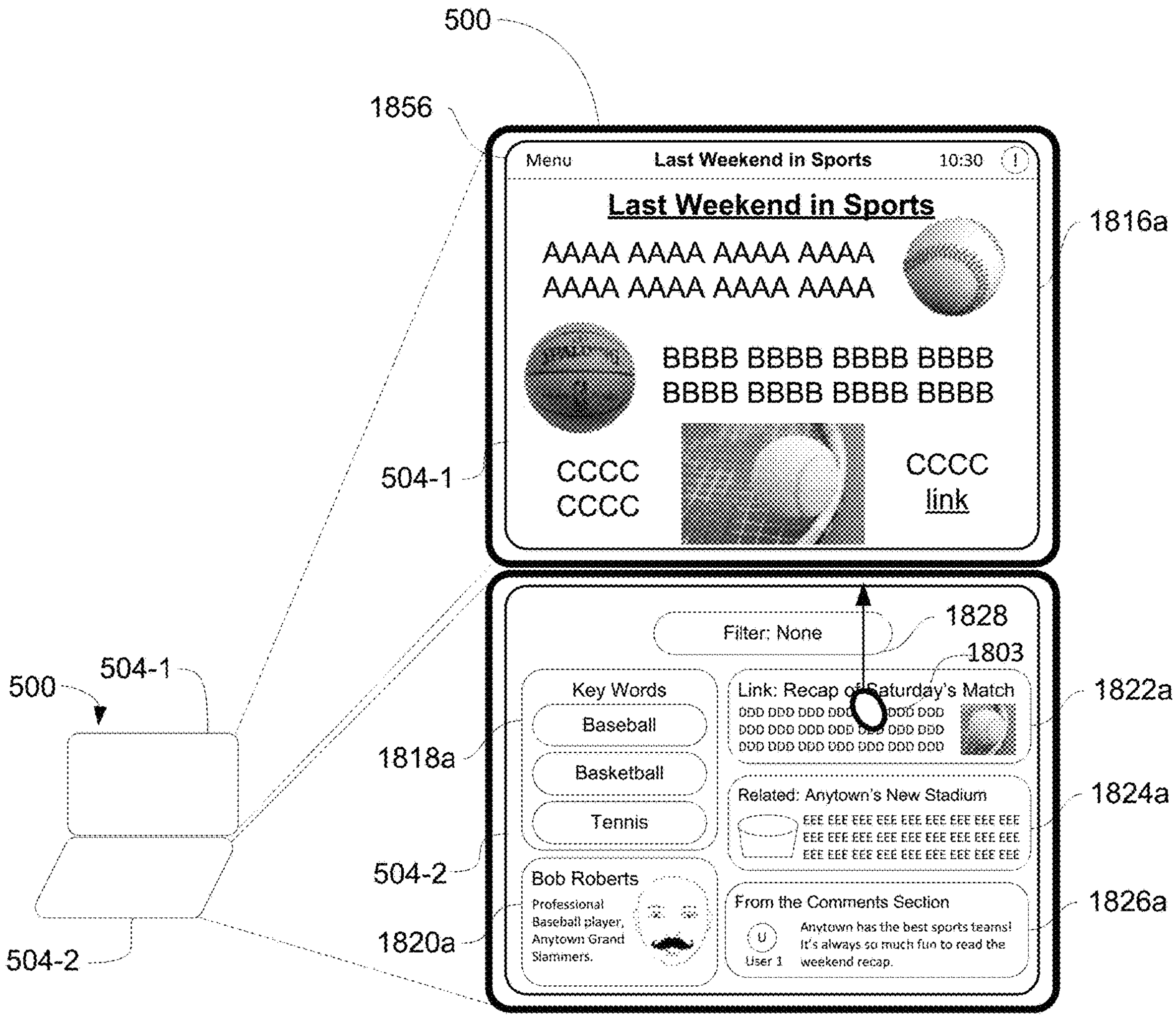
Figure 18I:
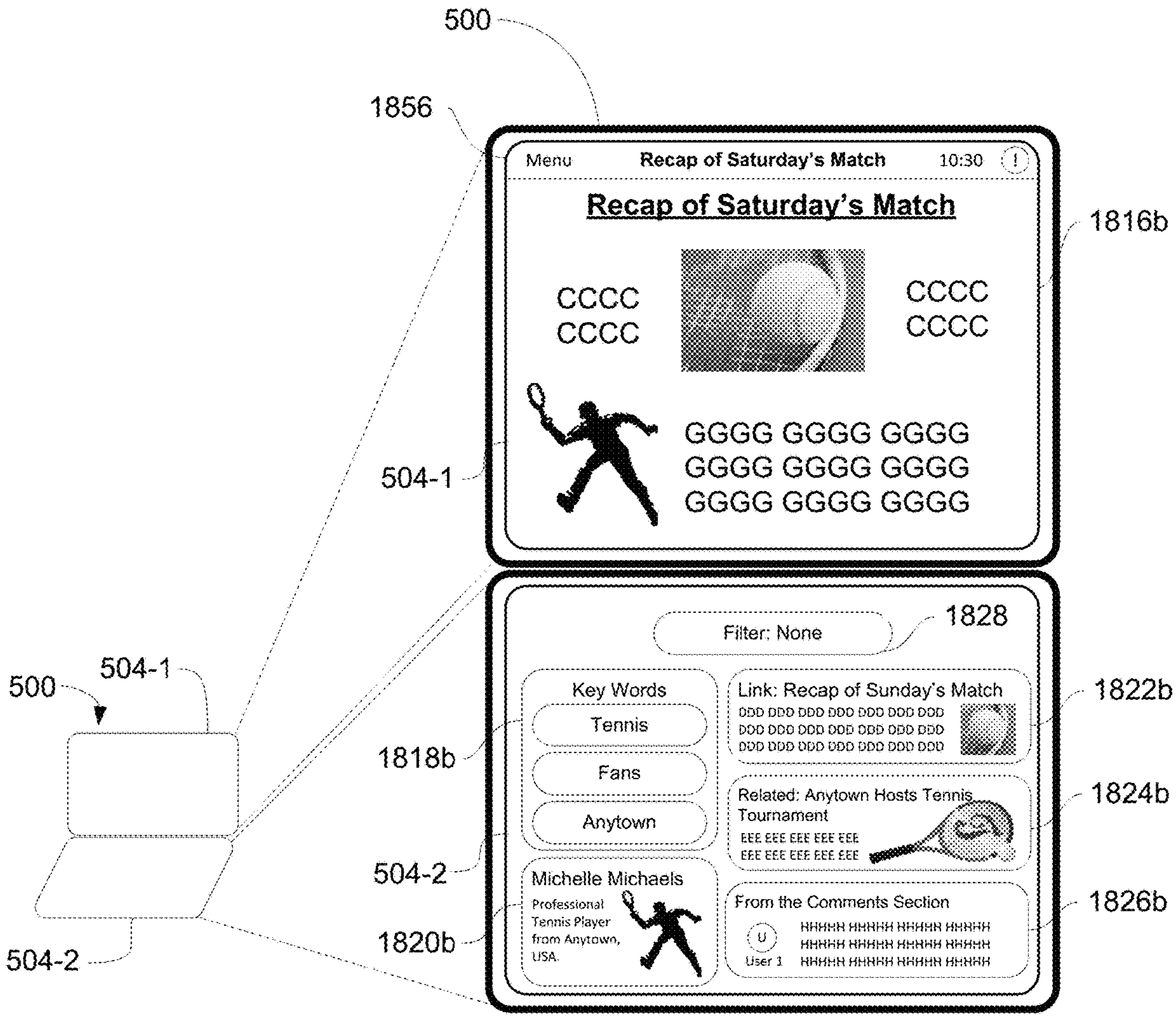

FIG. 18H illustrates presentation of the article 1816*a* on the first touch screen 504-1 and presentation of the related content 1818*a*-1826*a* on the second touch screen 504-1. As shown in FIG. 18H, the user selects (e.g., with contact 1803) a representation 1822*a* of a linked article and drags or flicks the linked article towards the first touch screen 504-1. In response to detecting the gesture, the electronic device 500 presents the linked article on the first touch screen 504-1 and presents content related to the linked article on the second touch screen 504-2, as shown in FIG. 18I. Thus, the electronic device 500 facilitates viewing and interacting with content related to an item of content that is being presented on the electronic device.

FIG. 18I illustrates presentation of the linked article 1816*b* on the first touch screen 504-1 and representations 1818*b*-1826*b* of content related to the linked article on the second touch screen 504-2 in response to the gesture illustrated in FIG. 18H.

Figure 18J:
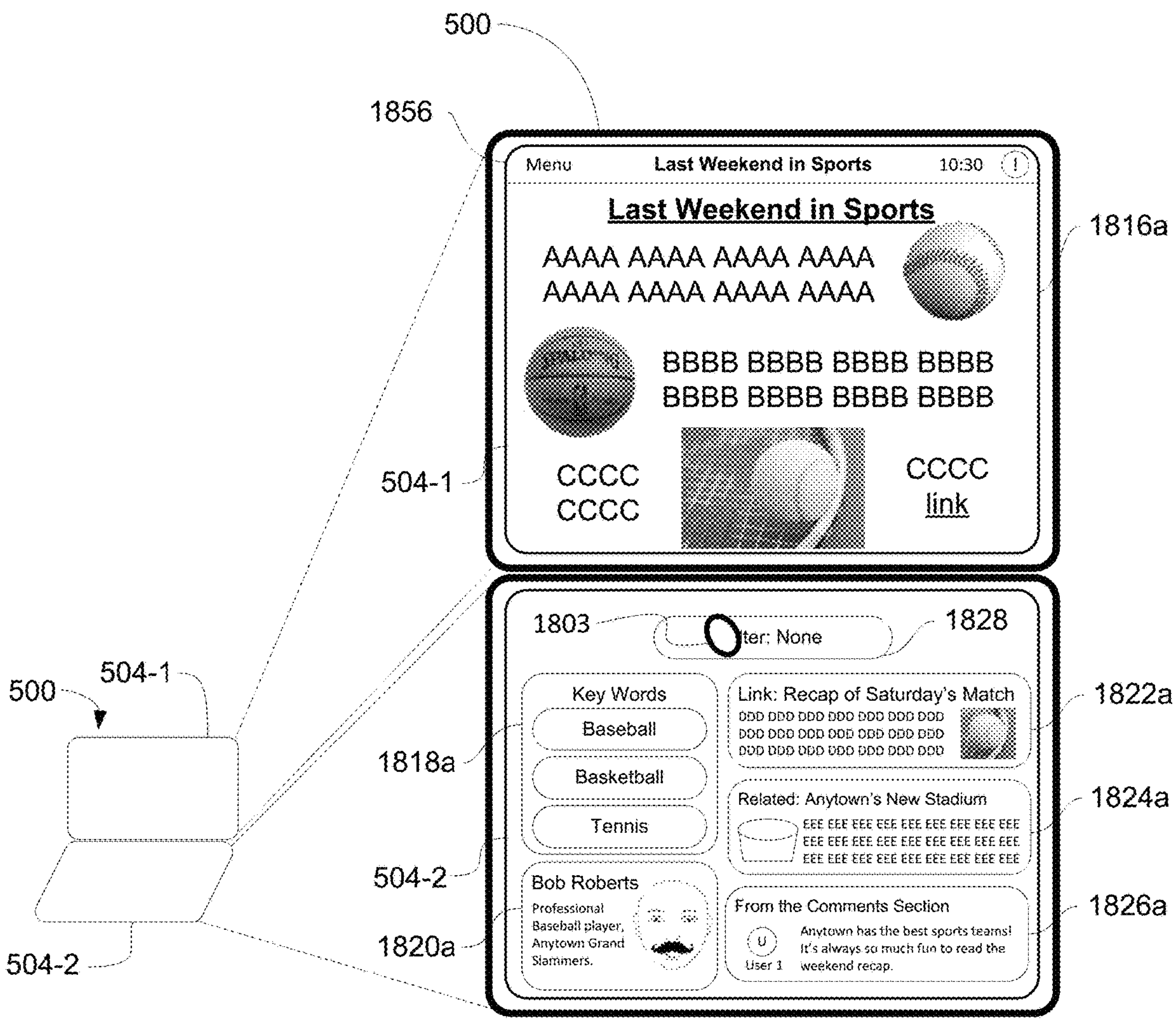
Figure 18K:
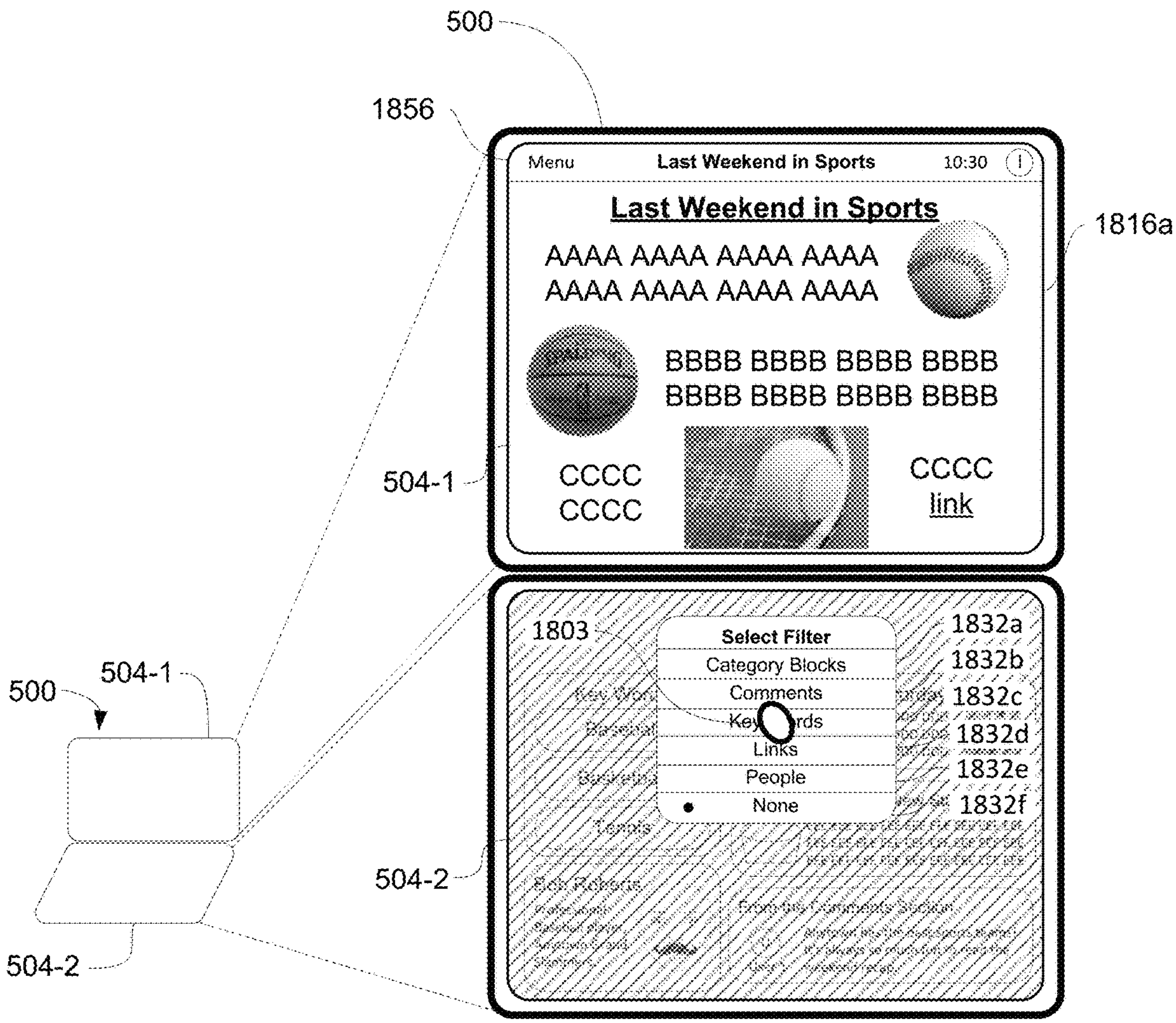
Figure 18L:
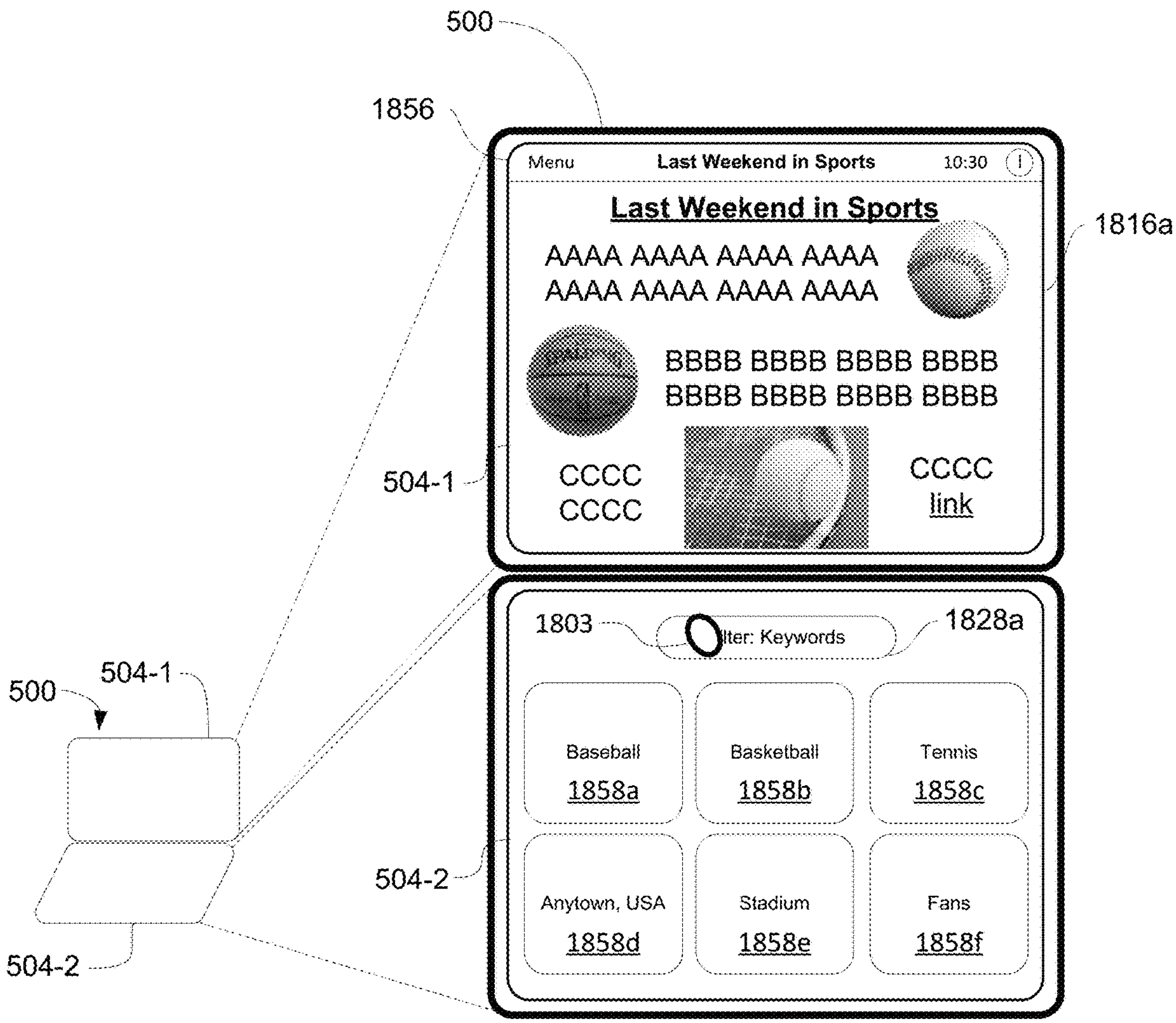
Figure 18M:
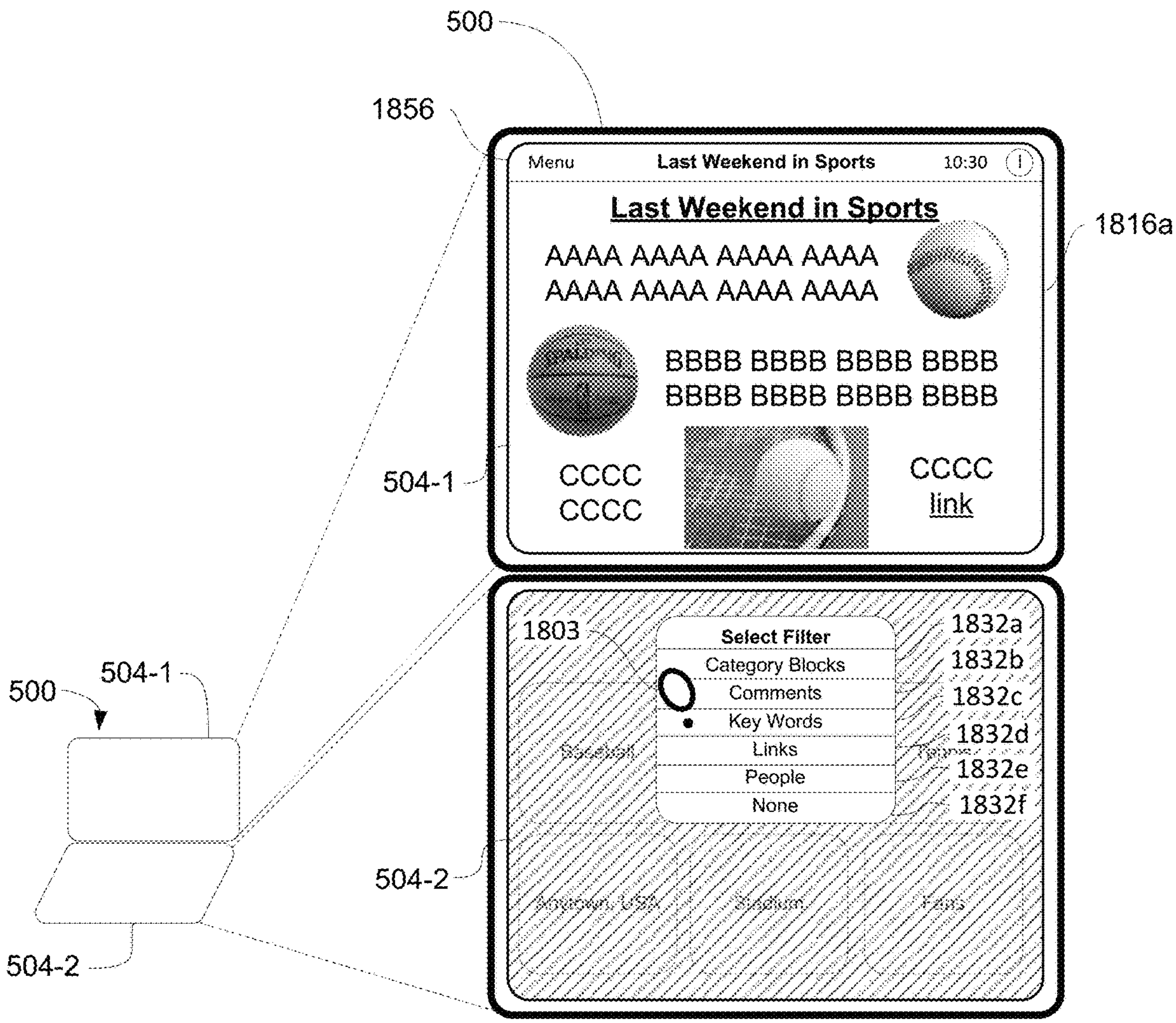
Figure 18N:
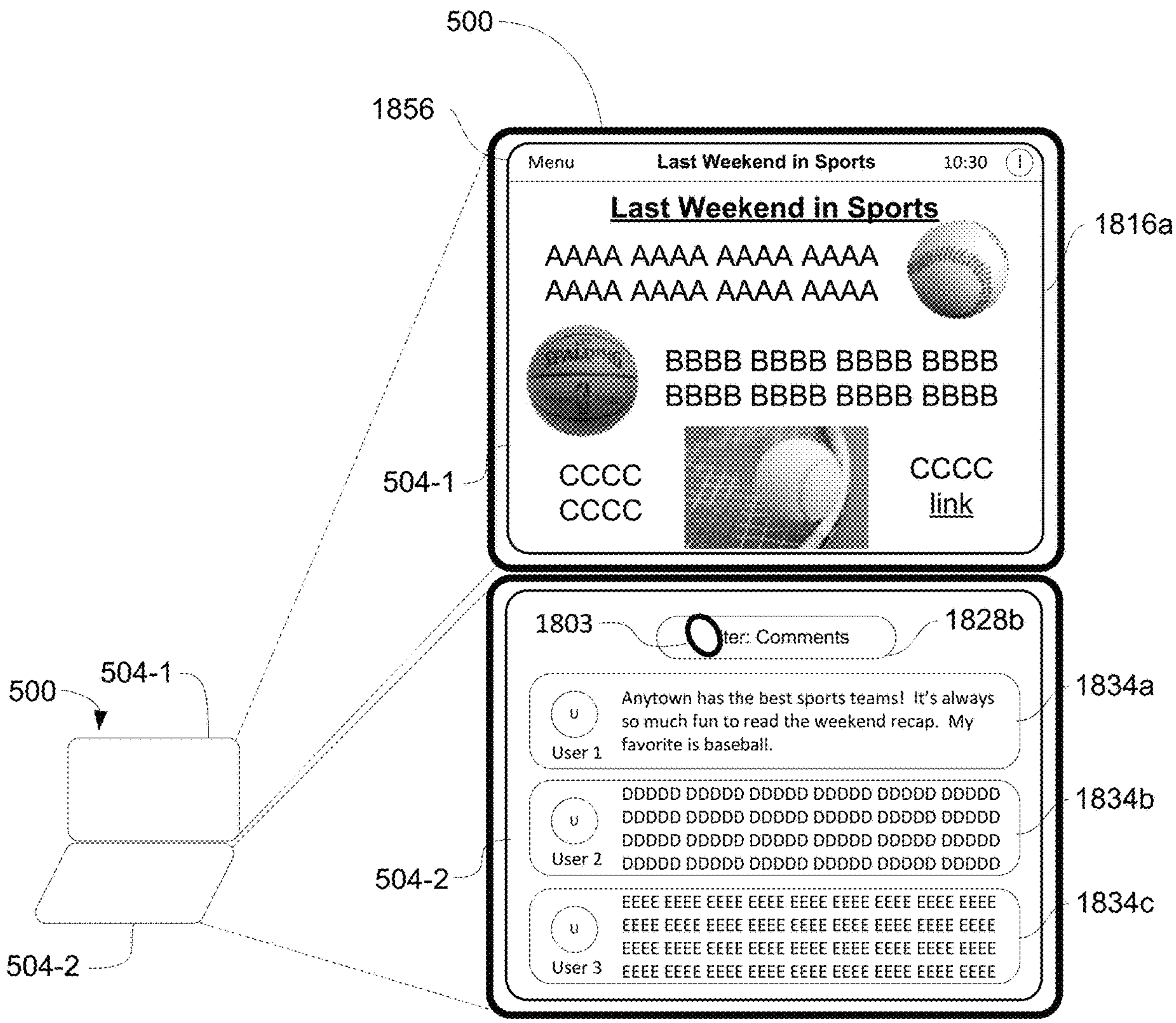
Figure 18O:
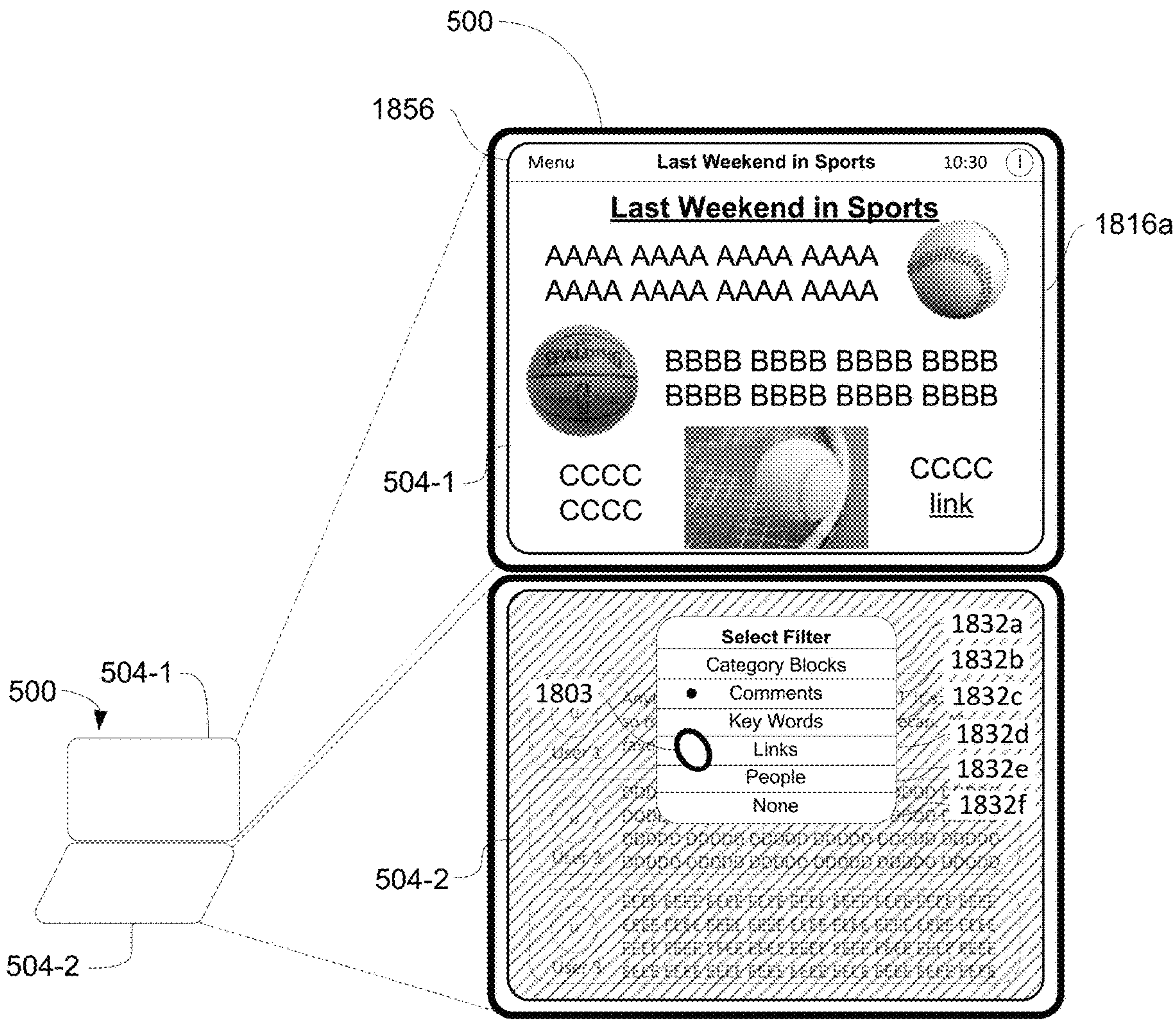
Figure 18P:
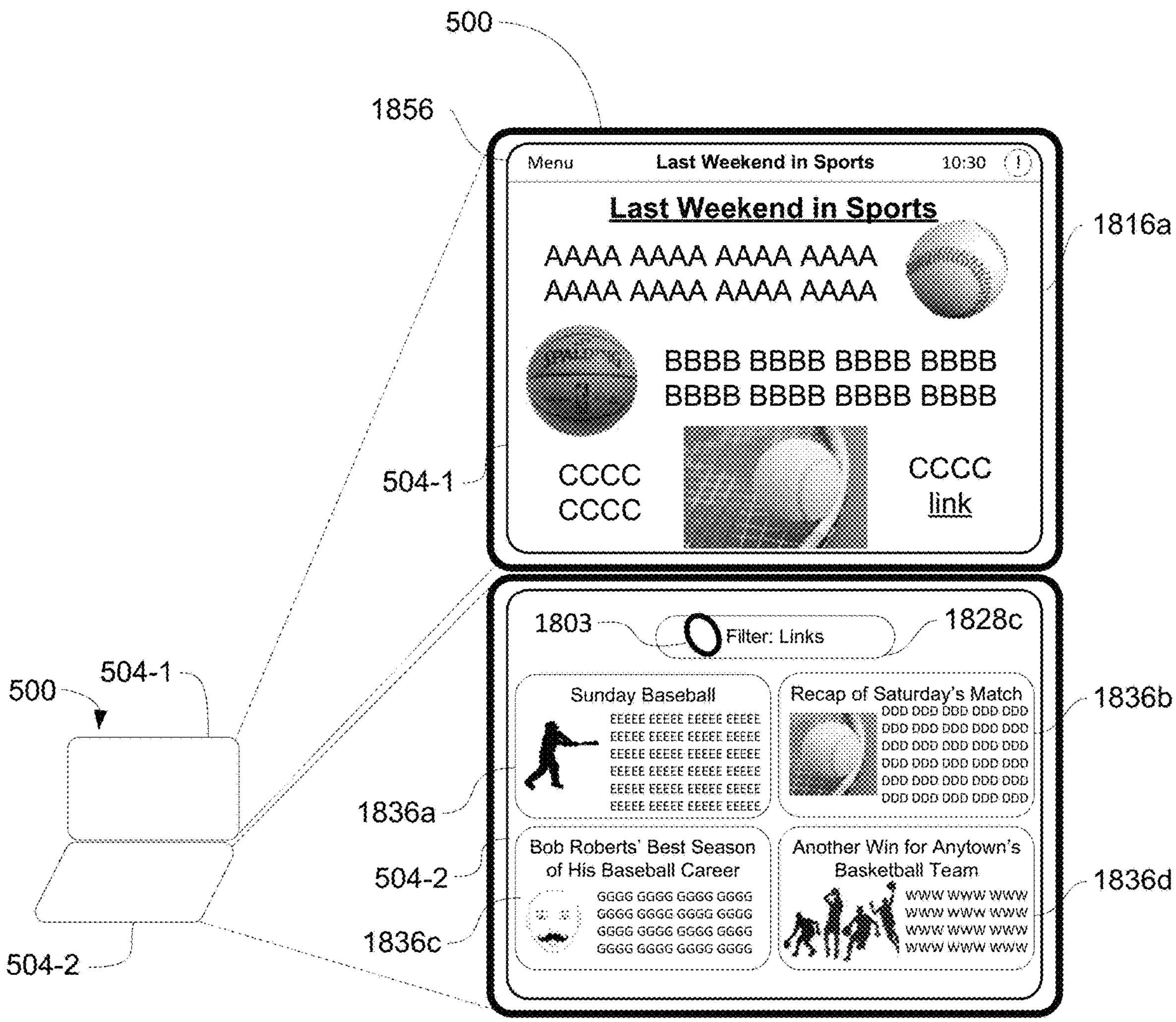
Figure 18Q:
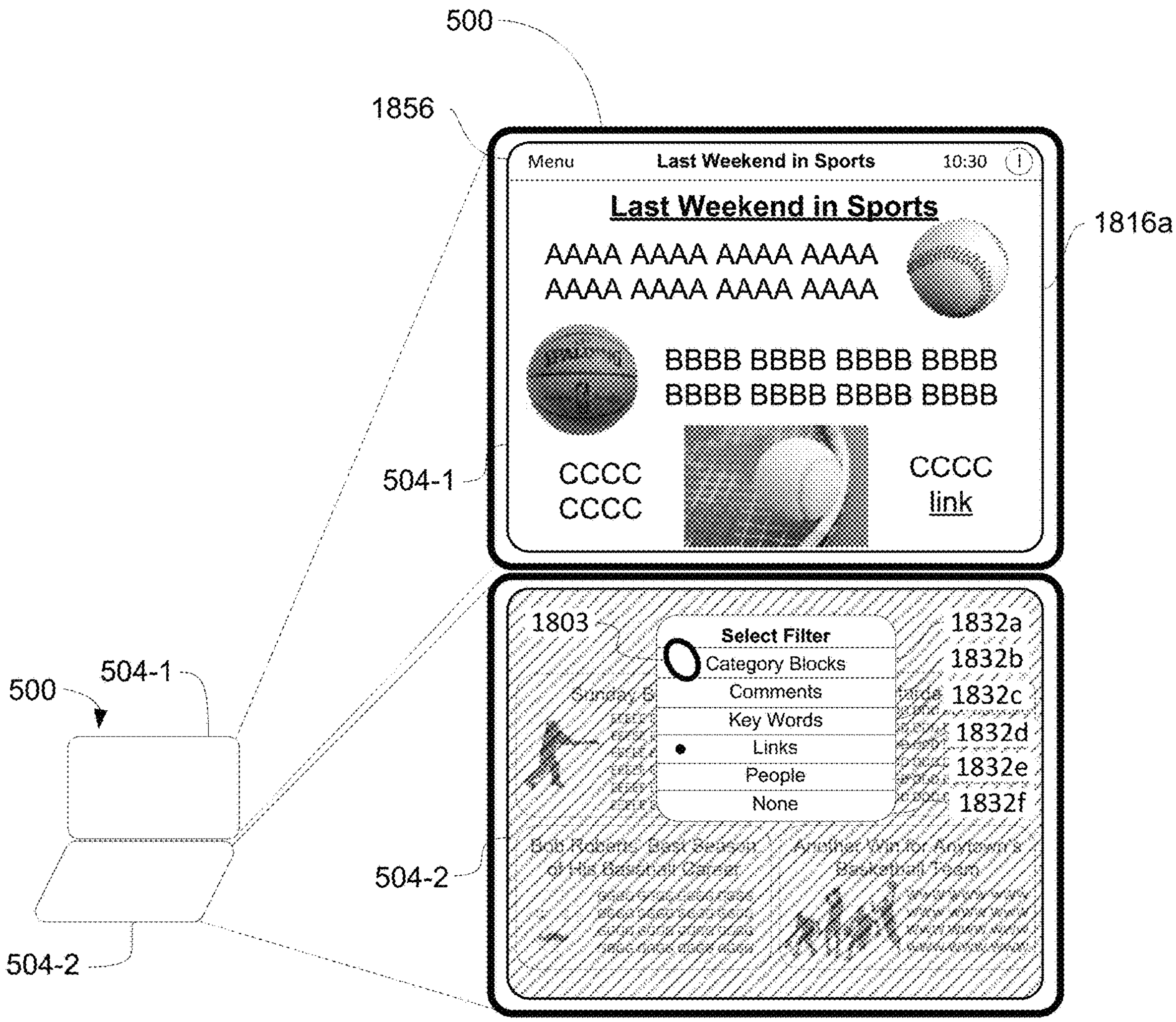
Figure 18R:
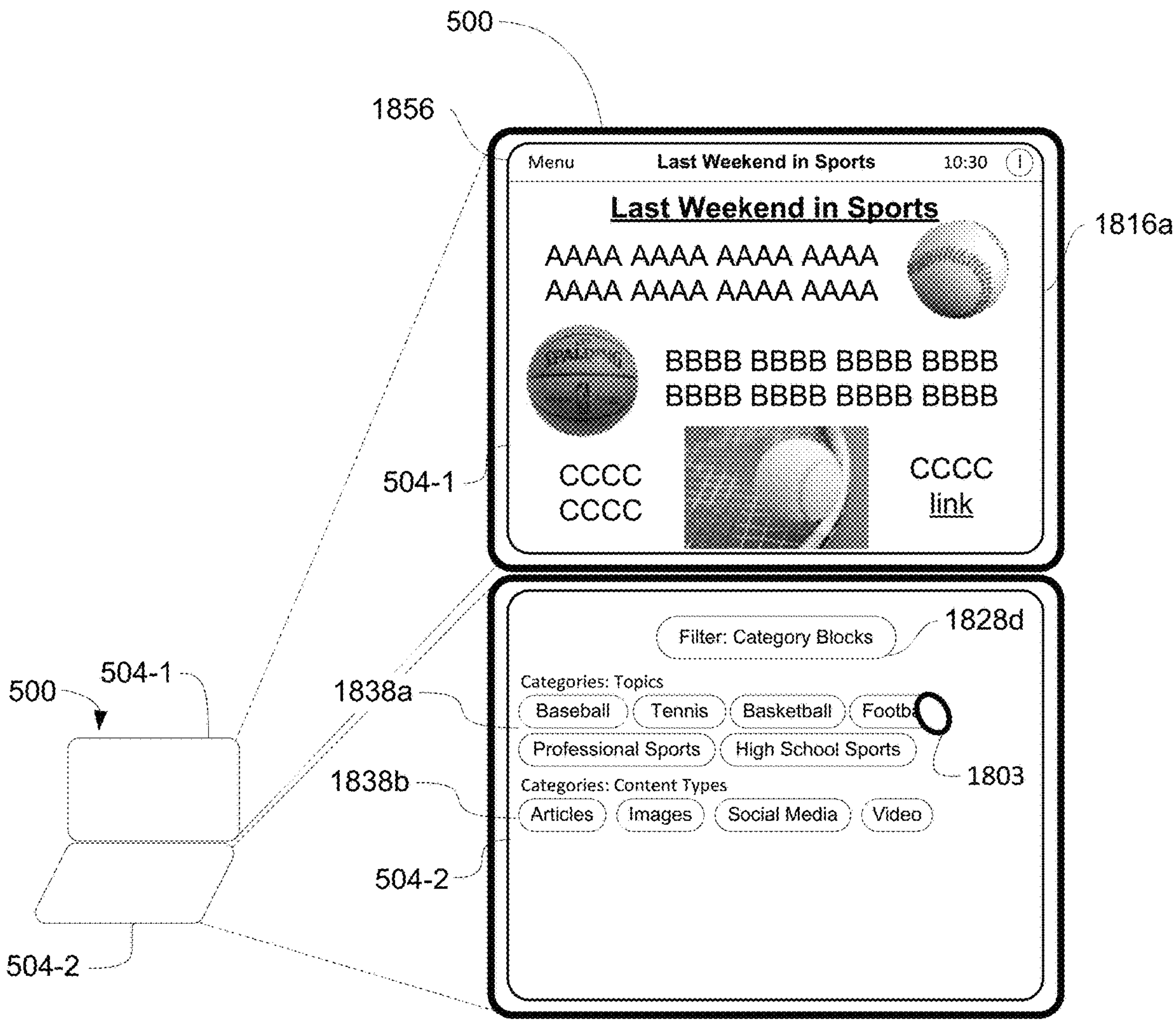
Figure 18S:
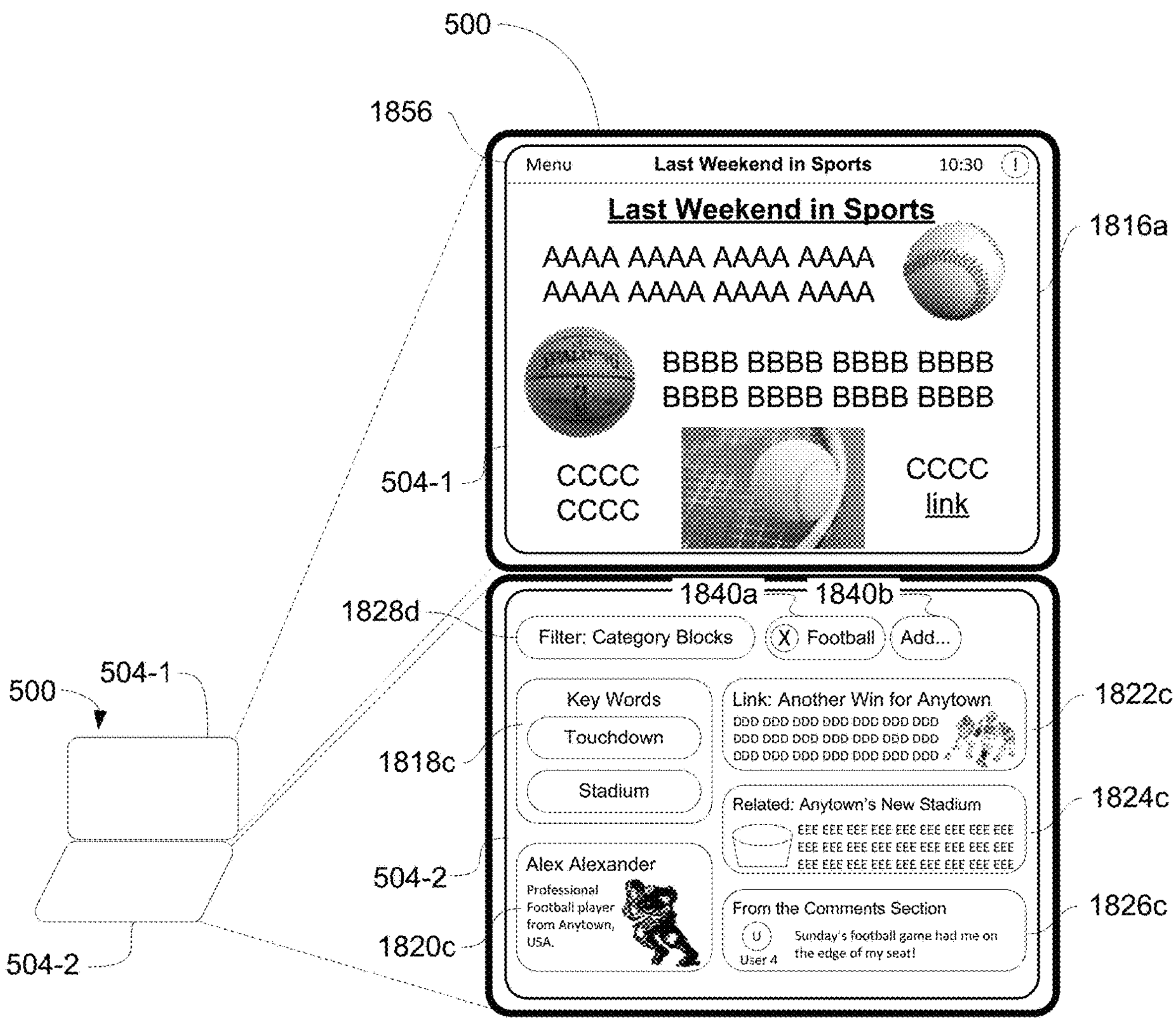
Figure 18T:
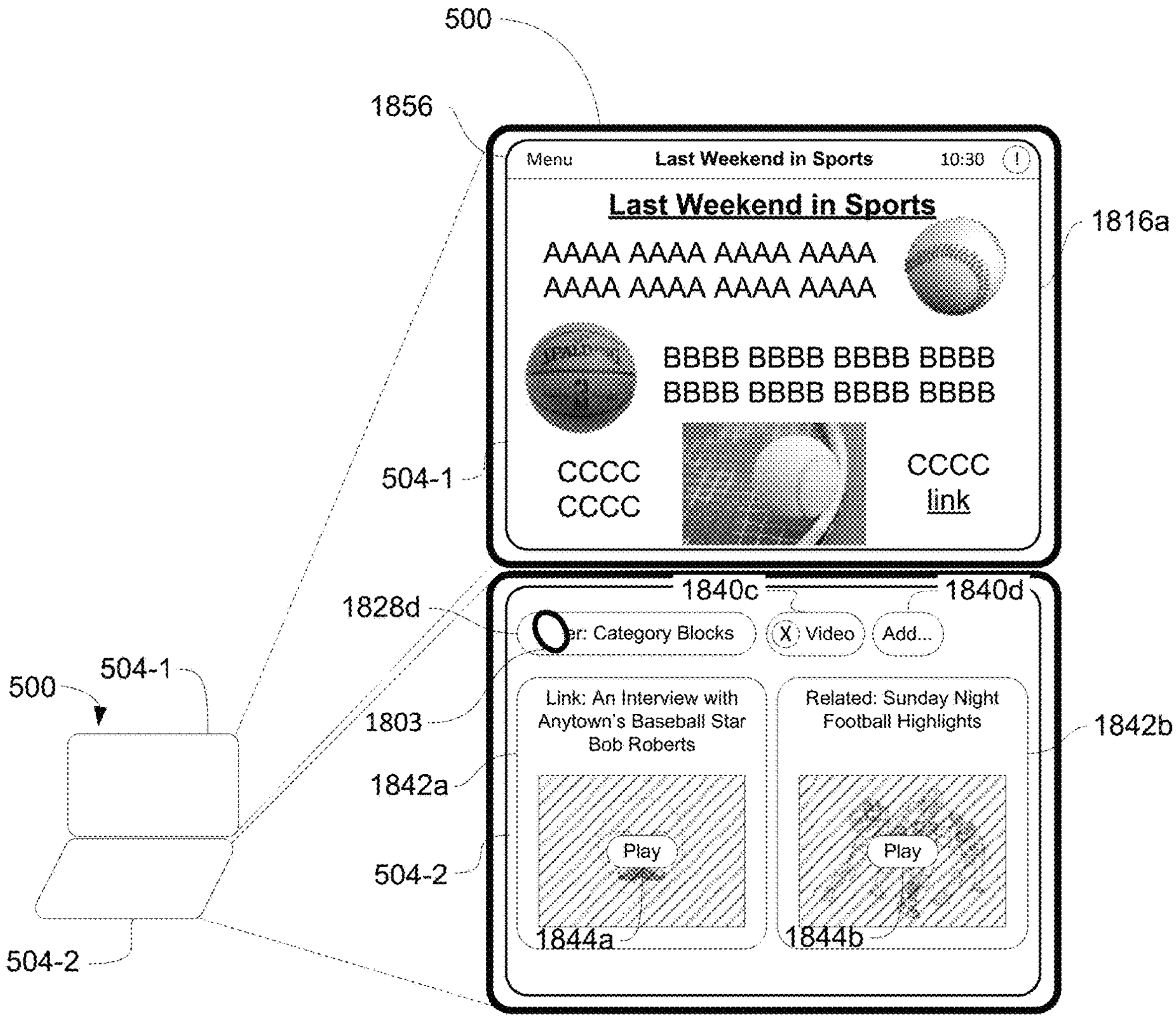
Figure 18U:
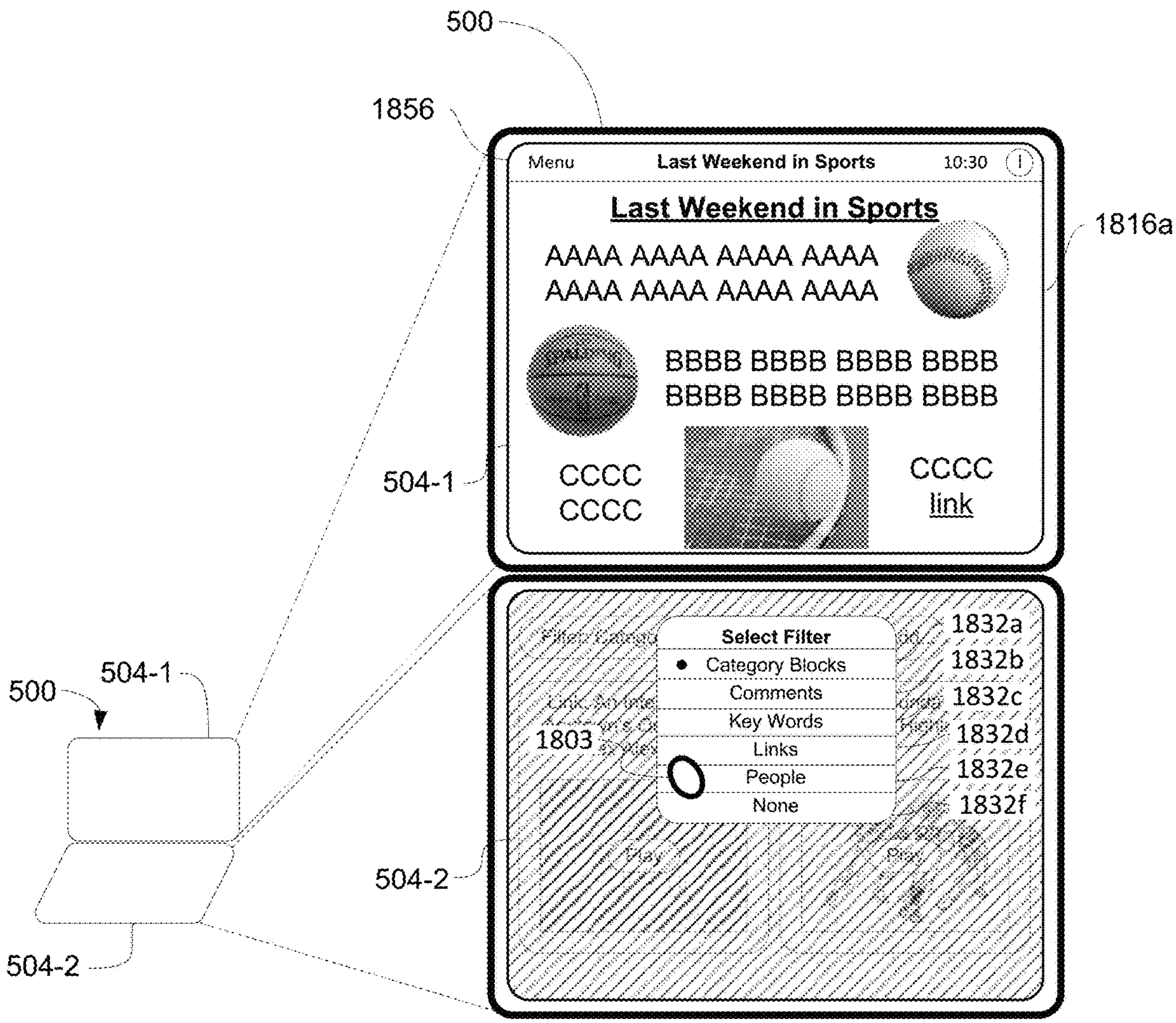
Figure 18V:
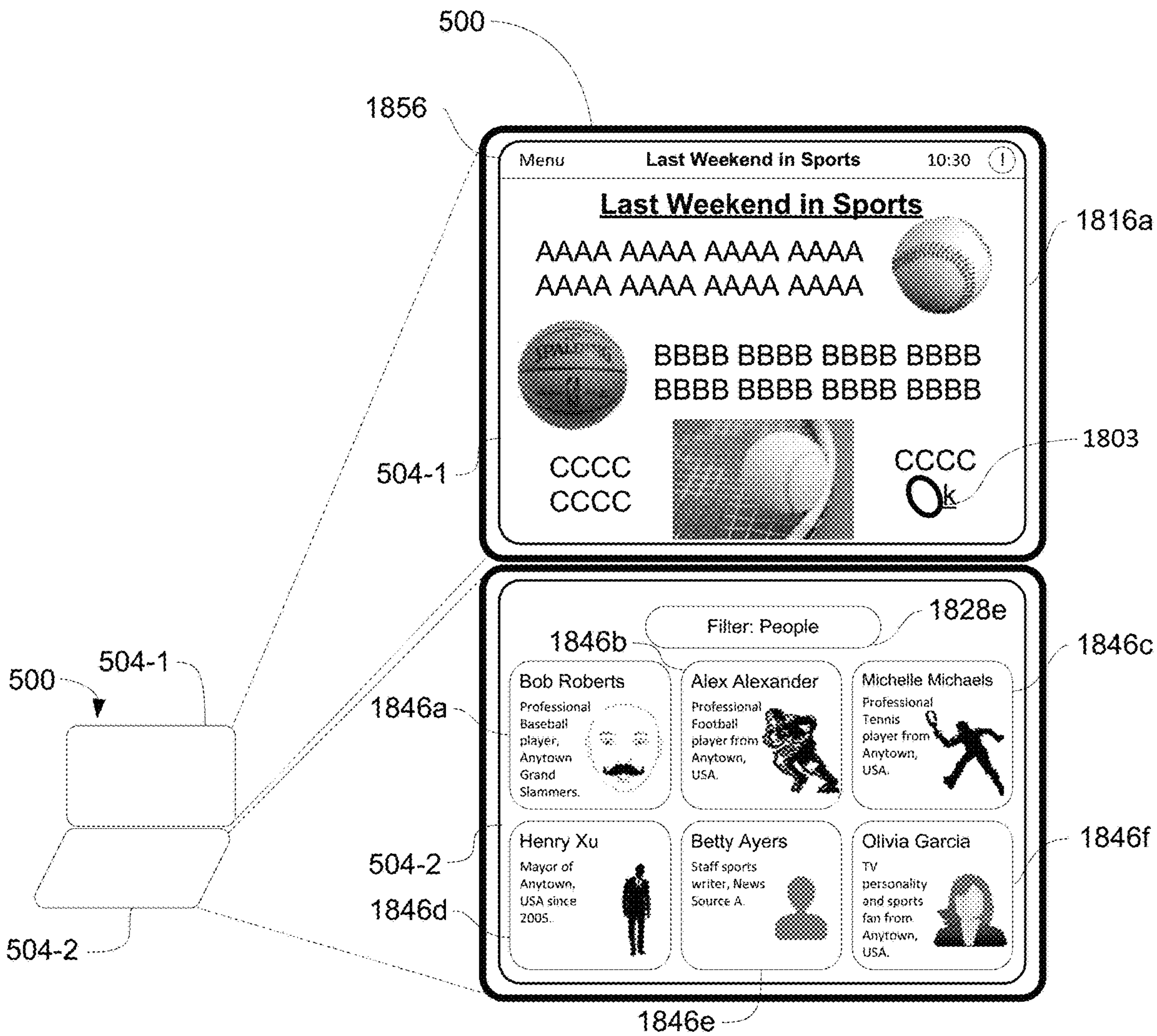
Figure 18W:
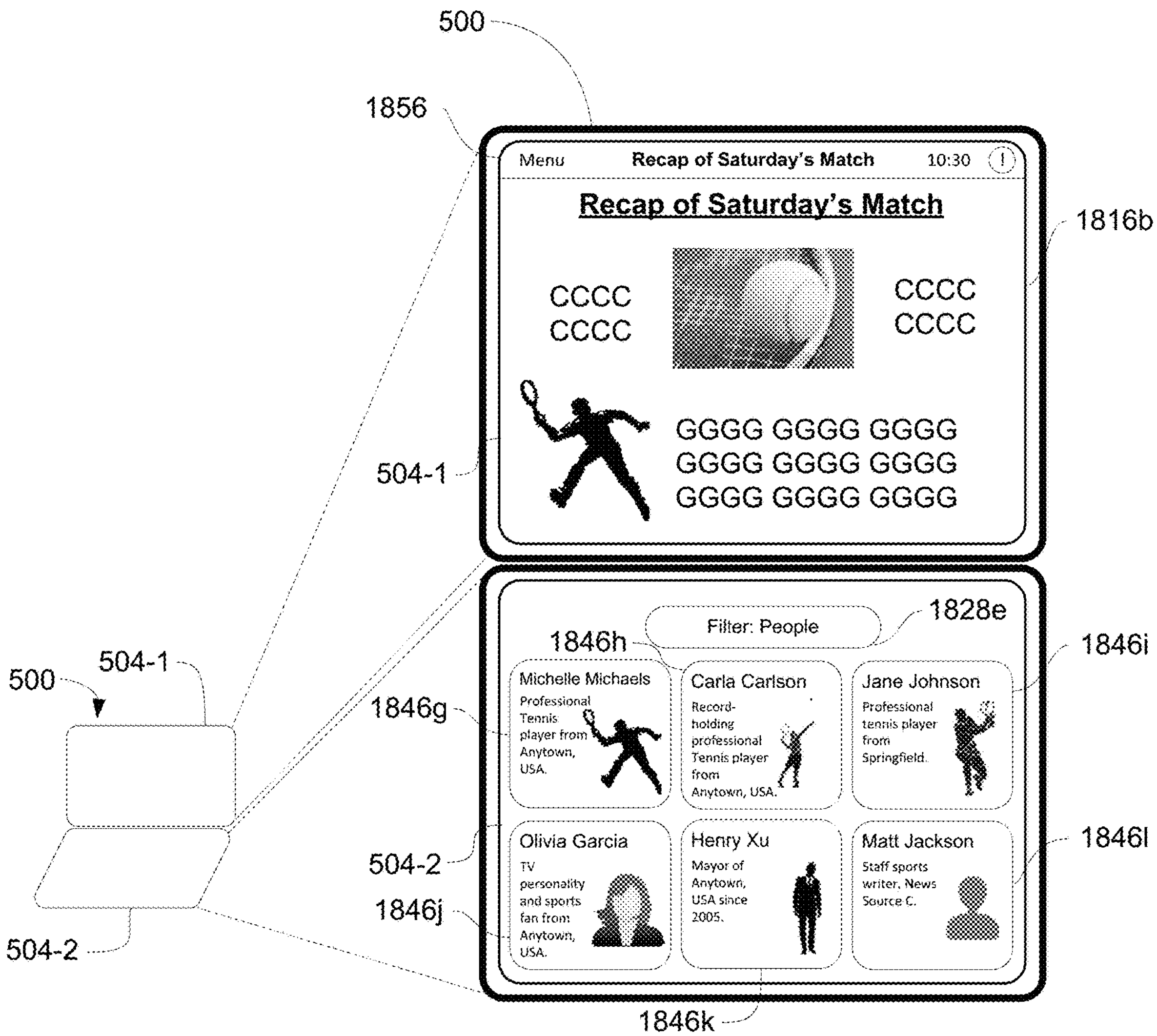

FIGS. 18J-18W illustrate ways of filtering the related content while presenting an item of content on the electronic device 500.

As shown in FIG. 18J, while the electronic device 500 presents an article 1816*a* on the first touch screen 504-1 and representations 1818*a*-1826*a* of content related to the article on the second touch screen 504-2, the user selects (e.g., with contact 1803) an option 1823 that, when activated, causes the electronic device 500 to filter the content related to the article, as shown in FIG. 18K.

FIG. 18K illustrates a plurality of filters 1832*a-e* that the electronic device 500 is able to apply to the content related to the article 1816*a* presented on the first touch screen 504-1 of the electronic device. As shown in FIG. 18K, the user selects (e.g., with contact 1803) the keywords filter 1832*c*. In response to the user's selection, as shown in FIG. 18L, the electronic device 500 presents on the second touch screen 504-2 key words related to the article 1816*a* that is presented on the first touch screen 504-1 (e.g., and ceases to display other content related to article 1816*a* being displayed on the first touch screen 504-1).

FIG. 18L illustrates presentation of keywords 1858*a-f* related to an article 1816*a* presented on the first touch screen 504-1 in response to the user's selection in FIG. 18K. The electronic device 500 continues to display the article 1816*a* on the first touch screen 504-1 while displaying the keywords 1858*a-f* related to the article on the second touch screen 504-2. As shown in FIG. 18L, the user selects (e.g., with contact 1803) the option 1828*a* to change the filter of the related content.

In FIG. 18M, the user selects (e.g., with contact 1803) the comments filter 1832*c*. In response to the user's selection, as shown in FIG. 18N, the electronic device 500 presents on the second touch screen 504-2 a plurality of comments on the article 1816*a* that is presented on the first touch screen 504-1 (e.g., and ceases to display other content related to article 1816*a* being displayed on the first touch screen 504-1).

FIG. 18N illustrates presentation of comments 1834*a-c* on the article 1816*a* presented on the first touch screen 504-1 in response to the user's selection in FIG. 18M. The electronic device 500 continues to display the article 1816*a* on the first touch screen 504-1 while displaying the comments 1834*a-c* on the second touch screen 504-2. As shown in FIG. 18N, the user selects (e.g., with contact 1803) the option 1828*b* to change the filter of the related content.

In FIG. 18O, the user selects (e.g., with contact 1803) the links filter 1832*d*. In response to the user's selection, as shown in FIG. 18P, the electronic device 500 presents on the second touch screen 504-2 a plurality of representations of links included in the article 1816*a* presented on the first touch screen 504-1 (e.g., and ceases to display other content related to article 1816*a* being displayed on the first touch screen 504-1).

FIG. 18P illustrates presentation of links 1836*a-d* included in the article 1816*a* presented on the first touch screen 504-1 in response to the user's selection in FIG. 18O. The electronic device 500 continues to display the article 1816*a* on the first touch screen 504-1 while displaying previews of links 1836*a-d* included in the article 1816*a* on the second touch screen 504-2. As shown in FIG. 18P, the user selects (e.g., with contact 1803) the option 1828*c* to change the filter of the related content.

In FIG. 18Q, the user selects (e.g., with contact 1803) the category blocks filter 1832*b*. In response to the user's selection, as shown in FIGS. 18R-18T, the electronic device 500 presents on the second touch screen 504-2 content according to a category that is associated with the article 1816*a* presented on the first touch screen 504-1.

FIG. 18R illustrates a plurality of selectable categories that, if selected, cause the electronic device 500 to present content related to the article 1816*a* in the selected category. The categories include a plurality of topics 1838*a* and content types 1838*b*. As shown in FIG. 18R, the user selects (e.g., with contact 1803) the "football" topic category. In response, the electronic device 500 presents on the second touch screen 504-2 content related to the article 1816*a* that is in the selected topic category, as shown in FIG. 18S.

FIG. 18S illustrates presentation of content 1818*c*-1826*c* that is related to the article 1816*a* and is in the selected category (e.g., football). The electronic device 500 continues to display the article 1816*a* on the first touch screen 504-1 and displays the related content 1818*c*-1826*c* on the second touch screen 504-2. As shown in FIG. 18S, the related content 1818*c*-1826*c* is in the selected topic category, "Football". While presenting the related content 1818*c*-1826*c* on the second touch screen 504-2, the electronic device 500 also presents a selectable option 1840*a* to remove the selected category and a selectable option 1840*b* to filter the related content with another filter.

FIG. 18T illustrates presentation of content 1842*a-b* that is related to the article 1816*a* and is in a video content type category. The electronic device 500 continues to display the article 1816*a* on the first touch screen 504-1 while displaying the related content 1842*a*-1842*b*. The related content includes a first video 1842*a* related to the article 1816*a* and a second video 1842*b* related to the article 1816*a*. Each video 1842*a*-1842*b* includes a selectable option 1844*a-b* that, when selected, causes the electronic device 500 to play the video on touch screen 504-2. As shown in FIG. 18T, the user selects (e.g., with contact 1803) the option 1828*b* to change the filter of the content related to the article 1816*a*.

In FIG. 18U, the user selects (e.g., with contact 1803) the people filter 1832*e*. In response to the user's selection, as shown in FIG. 18V, the electronic device 500 presents on the second touch screen 504-2 representations of people related to the article 1816*a*.

FIG. 18V illustrates presentation of the article 1816*a* on the first display 504-1 and presentation of representations 1846*a*-1846*f* of people related to the article on the second touch screen 504-2. The people include people mentioned in the article 1816*a* and people associated with creation of the article, such as the article's author Betty Ayers 1846*e*. As shown in FIG. 18V, the user selects (e.g., with contact 1803) a link in the article 1816*a*. In response to the user's selection, as shown in FIG. 18W, the electronic device 500 presents the linked article on the first touch screen 504-1 and presents representations of people related to the linked article on the second touch screen 504-2.

FIG. 18W illustrates presentation of the linked article 1816*b* on the first touch screen 504-1 and representations 1846*g*-1845*l* of people related to the linked article 1816*b* in response to the user's selection in FIG. 18V. Thus, when the electronic device 500 detects an input to change the content that is displayed on the first touch screen 504-1, the content displayed on the second touch screen 504-2 updates to be related to the content of the first touch screen with the same related content filter (e.g., the people filter) that was in effect when the input to change the content on touch screen 504-1 was detected.

Thus, the electronic device 500 allows the user to select a filter to filter the content related to content that is presented on the electronic device 500.

Figure 18X:
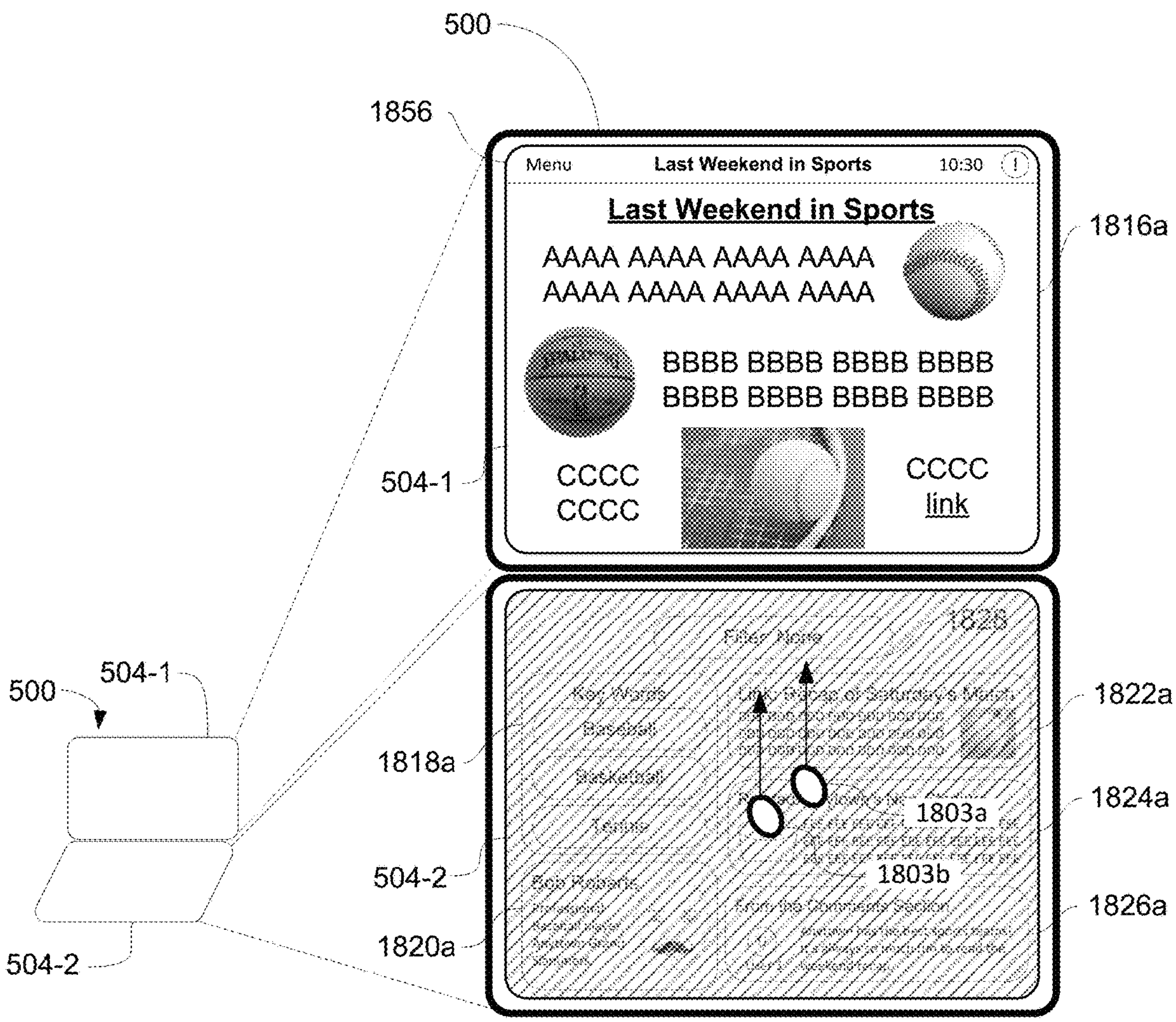
Figure 18Y:
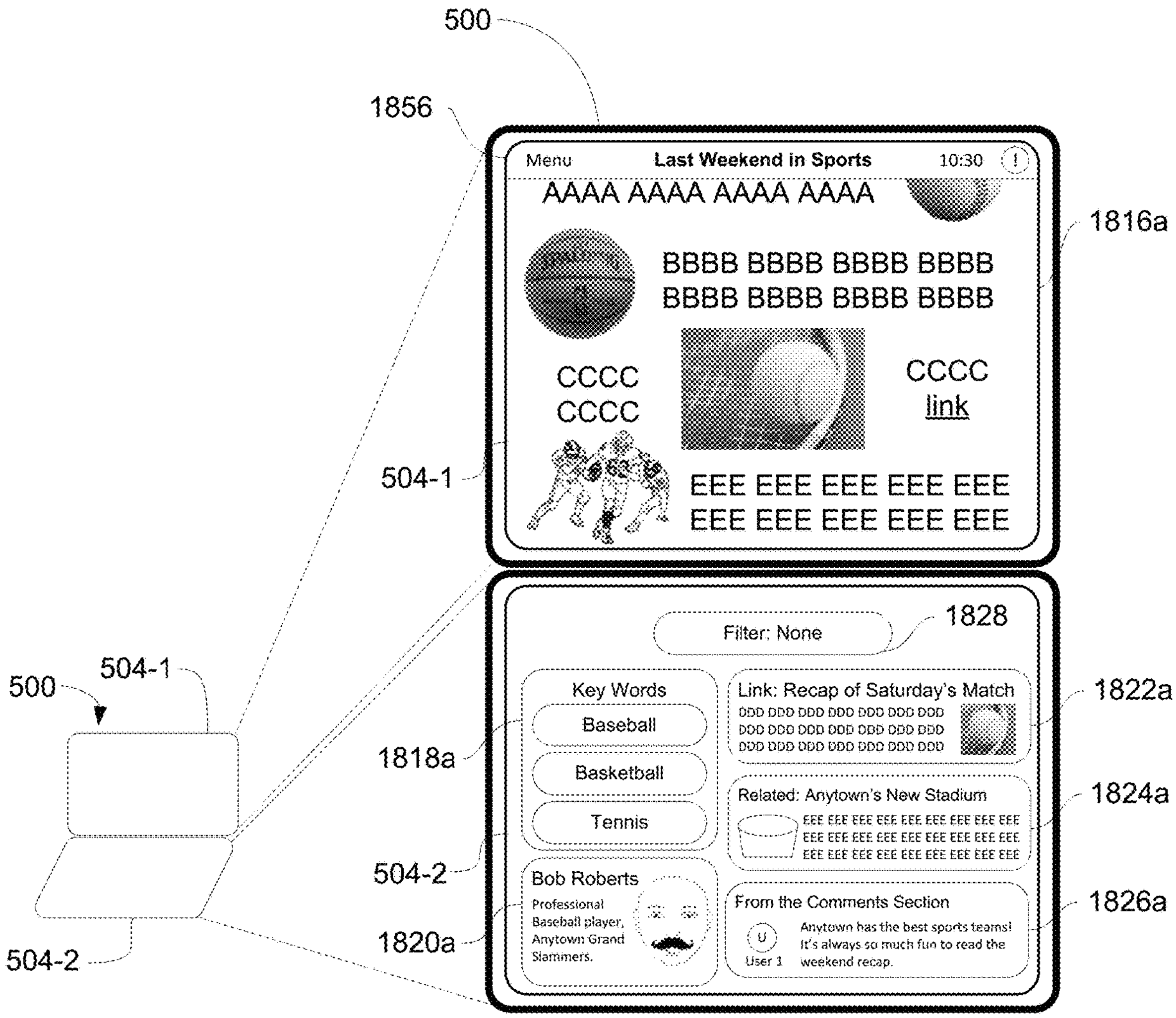

FIGS. 18X-18AA illustrate ways the electronic device 500 facilitates navigation of content presented on the electronic device 500. In FIG. 18X, while presenting an article 1816*a* on the first touch screen 504-1 and content related to the article on the second touch screen 504-2, the electronic device 500 detects two contacts 1803*a-b* on the second touch screen 504-2 and movement of the contacts. In response to detecting the movement of the two contacts, as shown in FIG. 18Y, the electronic device 500 scrolls the article 1816*a* on the first touch screen 504-1. While detecting the movement of the contacts 1803*a-b* the electronic device 500 greys out the second touch screen 504-2.

FIG. 18Y illustrates the article 1816*a* scrolled to a new location in the article in response to detecting the gesture illustrated in FIG. 18X. As shown in FIG. 18Y, the electronic device 500 continues to display the content 1818*a*-1826*a* related to the article 1816*a* on the second touch screen 504-2 while displaying the scrolled article 1816*a* on the first touch screen 504-1. Thus, the electronic device 500 facilitates use of the second touch screen 504-2 as a trackpad to navigate the content presented on the first touch screen 504-1.

Figure 18Z:
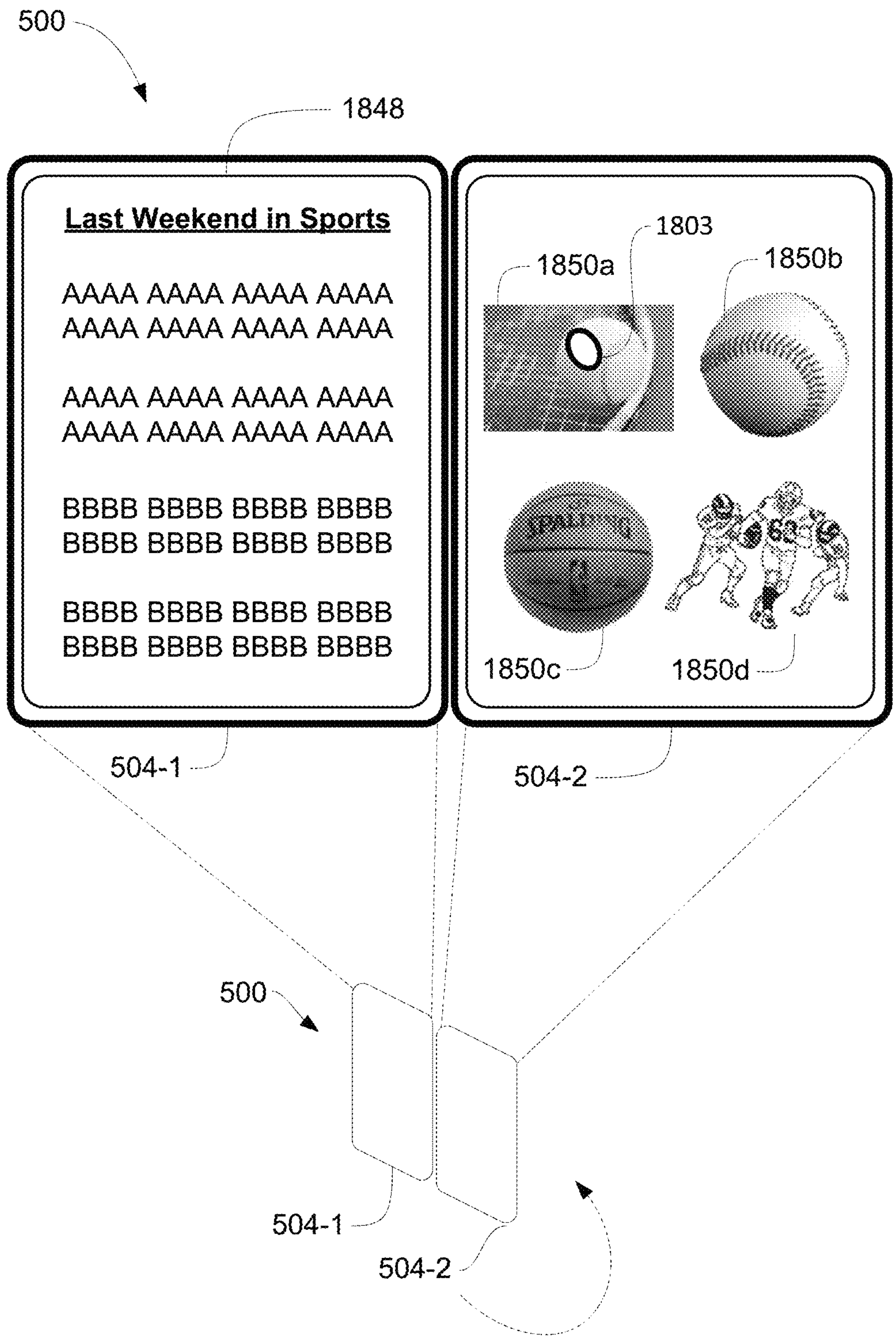
Figure 18A:
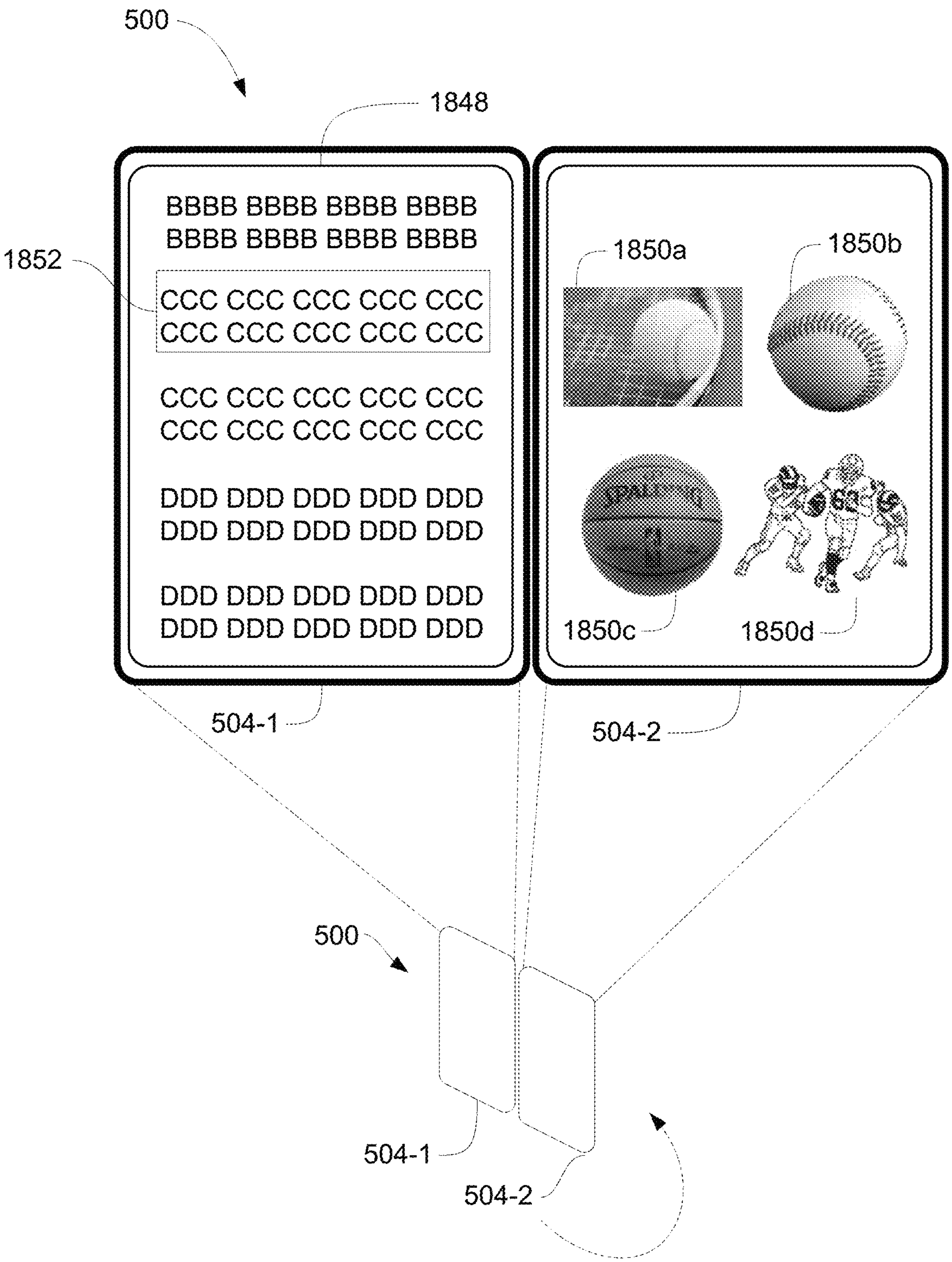
Figure 18B:
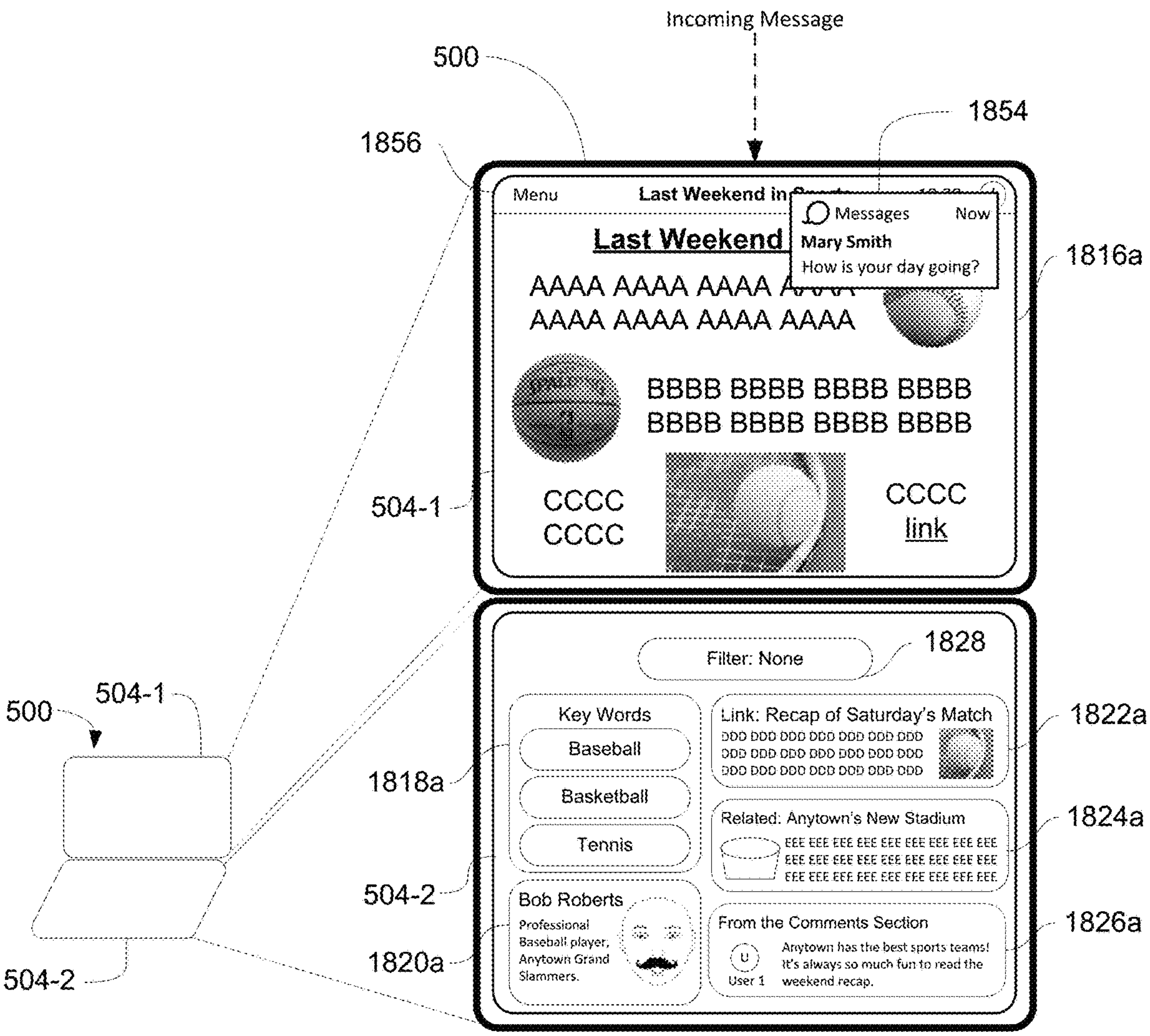
Figure 18C:
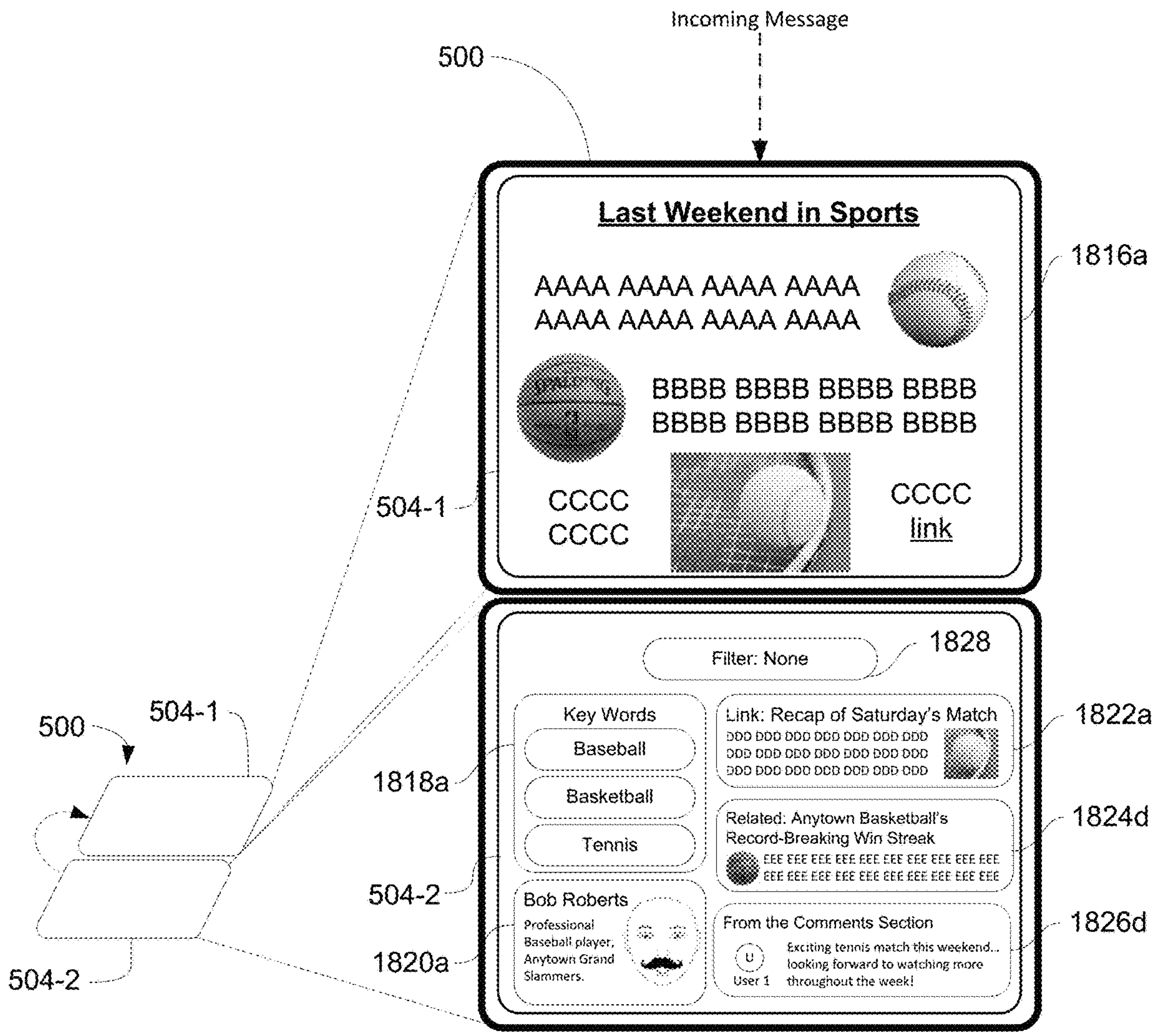
Figure 18D:
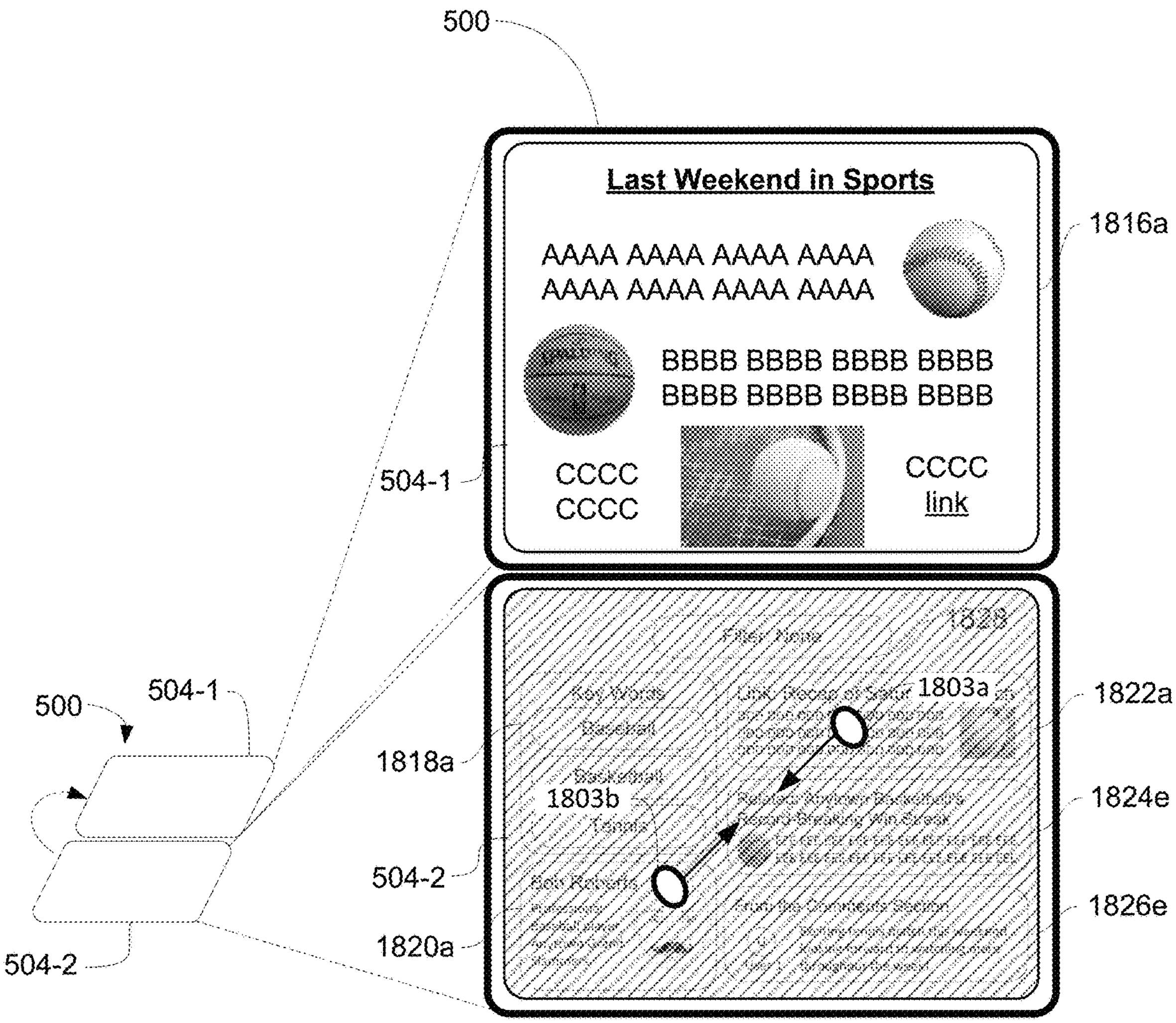
Figure 18E:
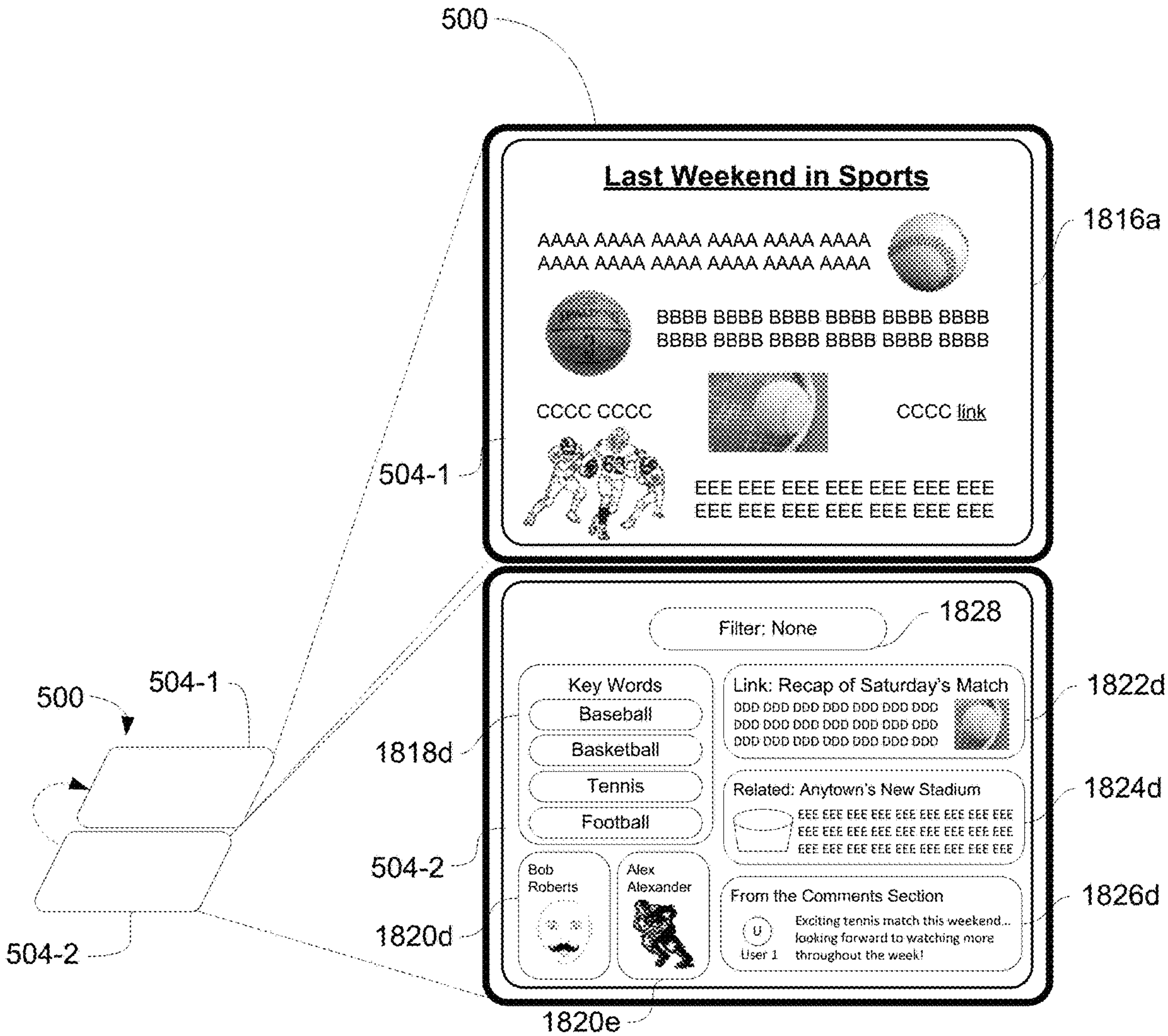

FIGS. 18Z-18AA illustrate presentation of the article 1816*a* when the electronic device 500 is rotated into a flattened book orientation. As shown in FIG. 18Z, in response to detecting that the electronic device 500 has been flattened and rotated into the book orientation, the electronic device 500 presents the text 1848 of the article on the first touch screen 504-1 (e.g., without the images of the article) and the images 1850*a*-1850*d* of the article on the second touch screen 504-2 (e.g., without the text of the article). While in the book orientation, the electronic device 500 ceases display of the menu bar (e.g., menu bar 1856 illustrated in FIGS. 18A-18Y) on the first touch screen 504-1. As shown in FIG. 18Z, the user selects (e.g., with contact 1803) one of the images 1850*a* on touch screen 504-2. In response to the user's selection, as shown in FIG. 18AA, the electronic device 500 scrolls the text 1848 of the article shown on touch screen 504-1 to the portion related to the selected image 1850*a*.

FIG. 18AA illustrates presentation of the article in response to detecting the user's selection in FIG. 18Z. The electronic device 500 continues to present the text 1848 of the article on the first electronic device 504-1 and the images 1850*a*-1850*d* of the article on the second display 504-2 and scrolls the text 1848 of the article to display a portion 1852 of the article related to the selected image 1850*a*. The first electronic device 500 visually distinguishes (e.g., highlights or boxes) the portion 1852 of the text 1848 of the article related to the selected image.

FIGS. 18BB-18EE illustrate presentation of an article 1816*a* and related content to the article, and treatment of a notification, when the electronic device 500 is flattened. In FIG. 18BB, while the electronic device 500 is in a clamshell configuration, the electronic device 500 receives an indication of a notification (e.g., an incoming text message). In response to the indication of the notification, the electronic device 500 presents an indication 1854 of the notification on touch screen 504-1. Additional ways of presenting and facilitating interaction with indications of notifications are described with reference to process 1700.

FIG. 18CC illustrates the electronic device 500 in a flattened configuration. While in the flattened configuration, the electronic device 500 continues to present the article 1816*a* and the content 1818*a*-1826*a* related to the article. While the electronic device 500 is in the flattened configuration, the content 1818*a*-1826*a* related to the article 1816*a* is related to the portion of the article 1816*a* presently displayed on the first touch screen 504-1, rather than also including content that is related to portions of the article not presently displayed on touch screen 504-1, as in FIG. 18BB for example. For instance, the "Anytown's new stadium" related article 1824*a* that was shown on touch screen 504-2 in FIG. 18BB is replaced with the "Anytown Basketball's Record-Breaking Win Streak" related article 1824*e* on touch screen 504-2 in FIG. 18CC because the portion of the article 1816*a* related to the article 1824*a* is not being displayed on touch screen 504-1 in FIG. 18CC, and the portion of the article 1816*a* related to the article 1824*e* is displayed on touch screen 504-1 in FIG. 18CC. When an indication of a notification is received by the electronic device 500 while in the flattened configuration, the indication of the notification is not presented, as shown in FIG. 18CC.

In FIG. 18DD, the electronic device 500 detects two contact 1803*a-b* on the second touch screen 504-2 and movement of the contacts towards each other (e.g., a pinch or zoom out gesture). In response to detecting the gesture, as shown in FIG. 18EE, the electronic device 500 zooms out the article 1816*a* on touch screen 504-1 and updates the related content on touch screen 504-2 to include content related to portions of the article 1816*a* that are made visible when the article 1816*a* is zoomed out. As shown in FIG. 18DD, while the electronic device 500 detects movement of contacts 1803*a-b*, the electronic device 500 greys out the second touch screen 504-2.

FIG. 18EE illustrates the zoomed-out view of article 1816*a* and the related content 1818*d*-1826*d* presented in response to the gesture detected in FIG. 18DD. As shown in FIG. 18EE, the text size and image size of article 1816*a* is reduced, allowing space for more text and images of the article 1816*a* to be shown on touch screen 504-1. The related content on touch screen 504-2 is updated to include a keyword 1818*d* (e.g., "Football"), a person 1820*e*, and a related article 1824*d* related to the now-visible portion of the article 1816*a* that were not displayed in FIG. 18DD (e.g., because they are related to portions of article 1816*a* that were not visible on touch screen 504-1 in FIG. 18DD). Thus, while in the flattened configuration, the electronic device 500 does not present indications of notifications and focuses the related content on the visible portion of the article 1816*a*.

Figure 19A:
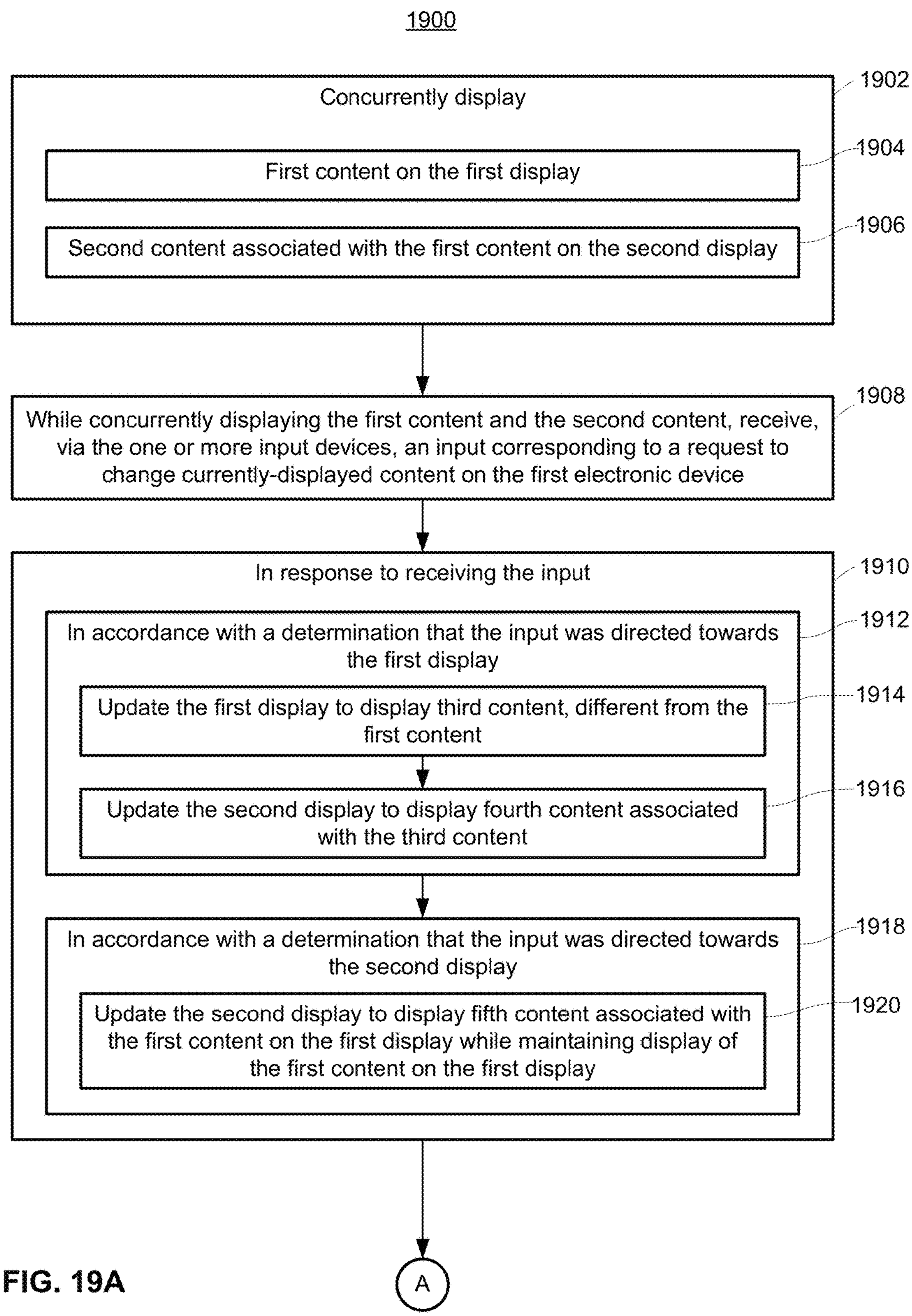
FIGS. 19A-19O are flow diagrams illustrating a method of presenting representations of items of content that are related to content presented on the electronic device in accordance with some embodiments of the disclosure.
Figure 19B:
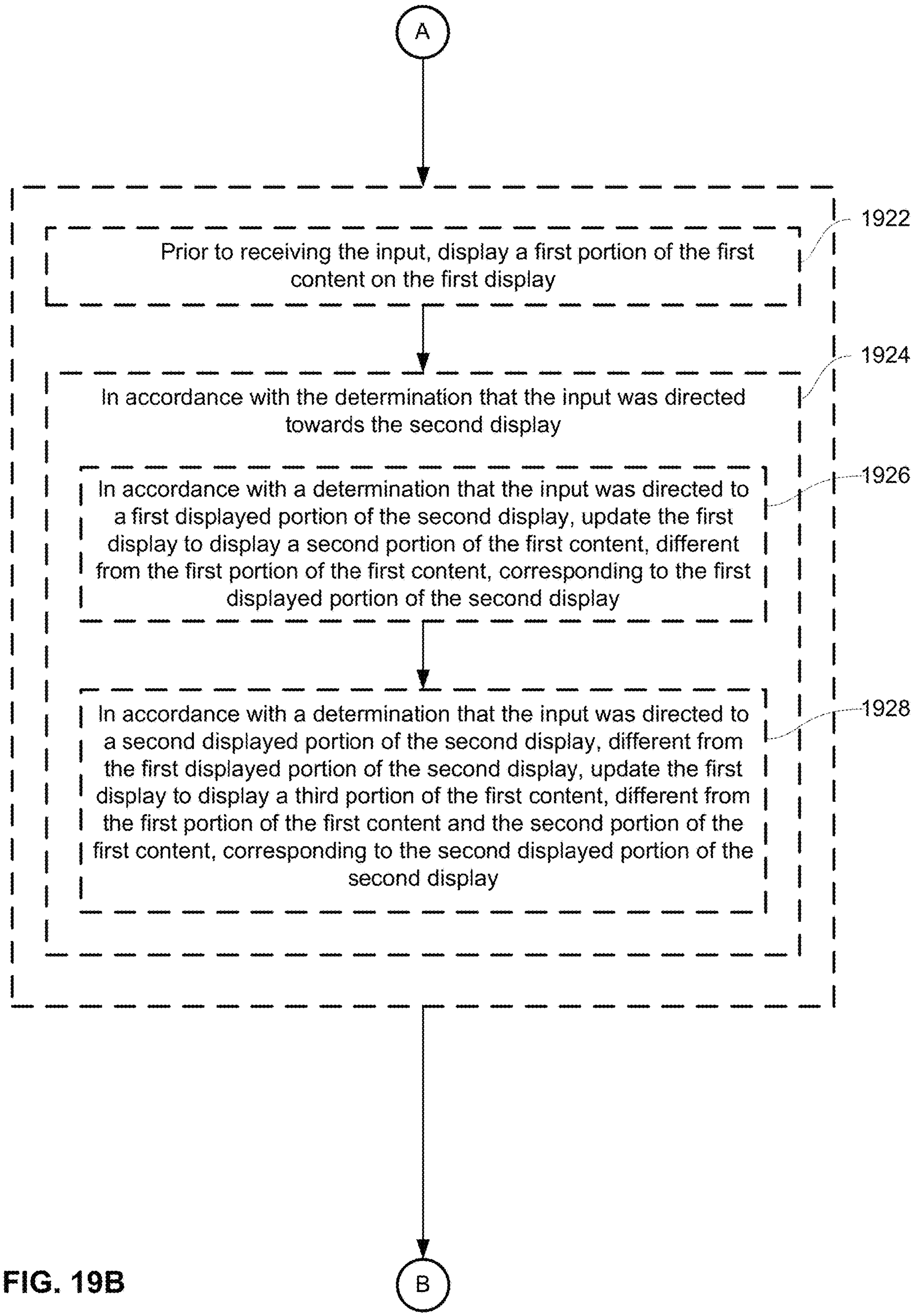
Figure 19C:
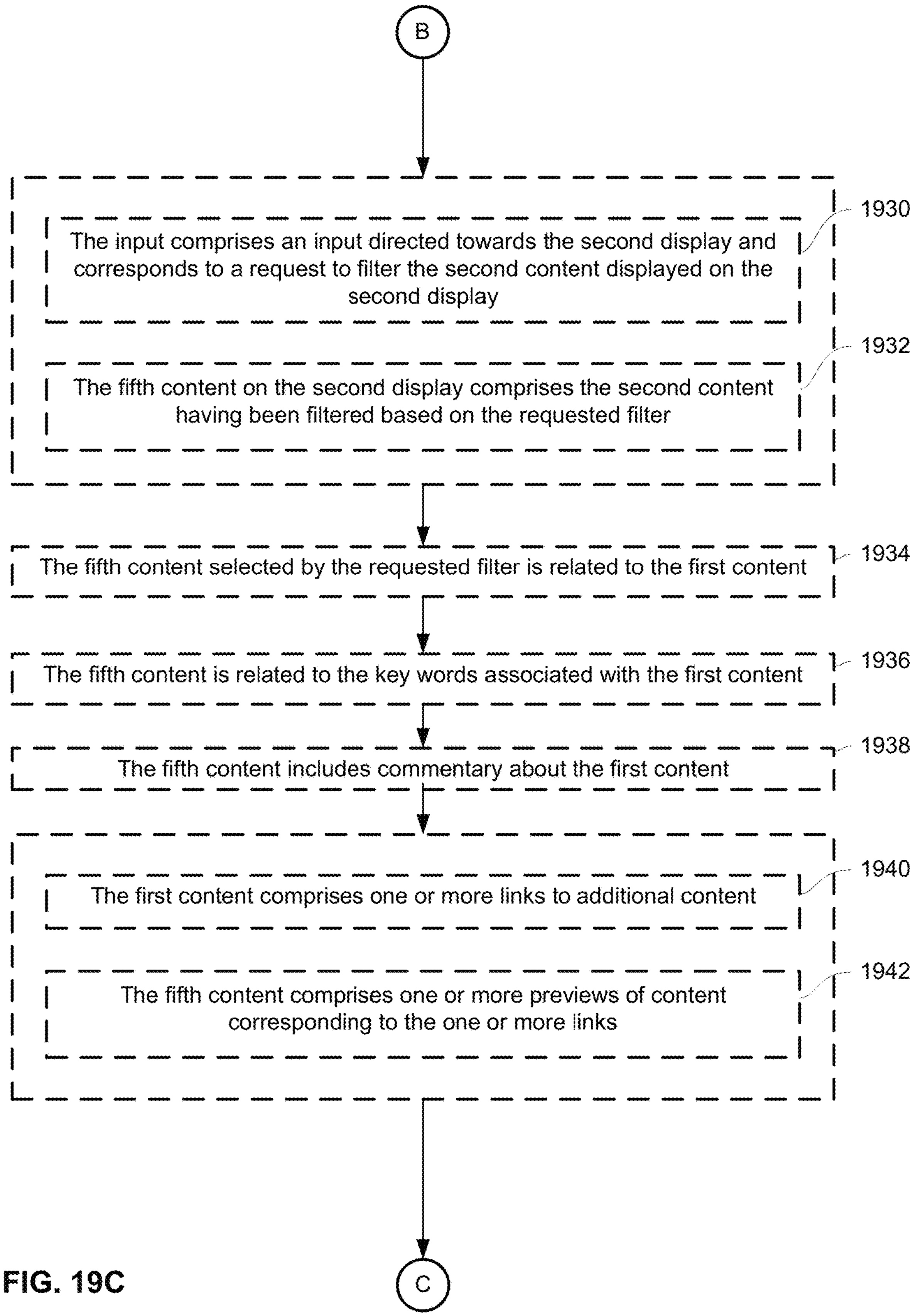
Figure 19D:
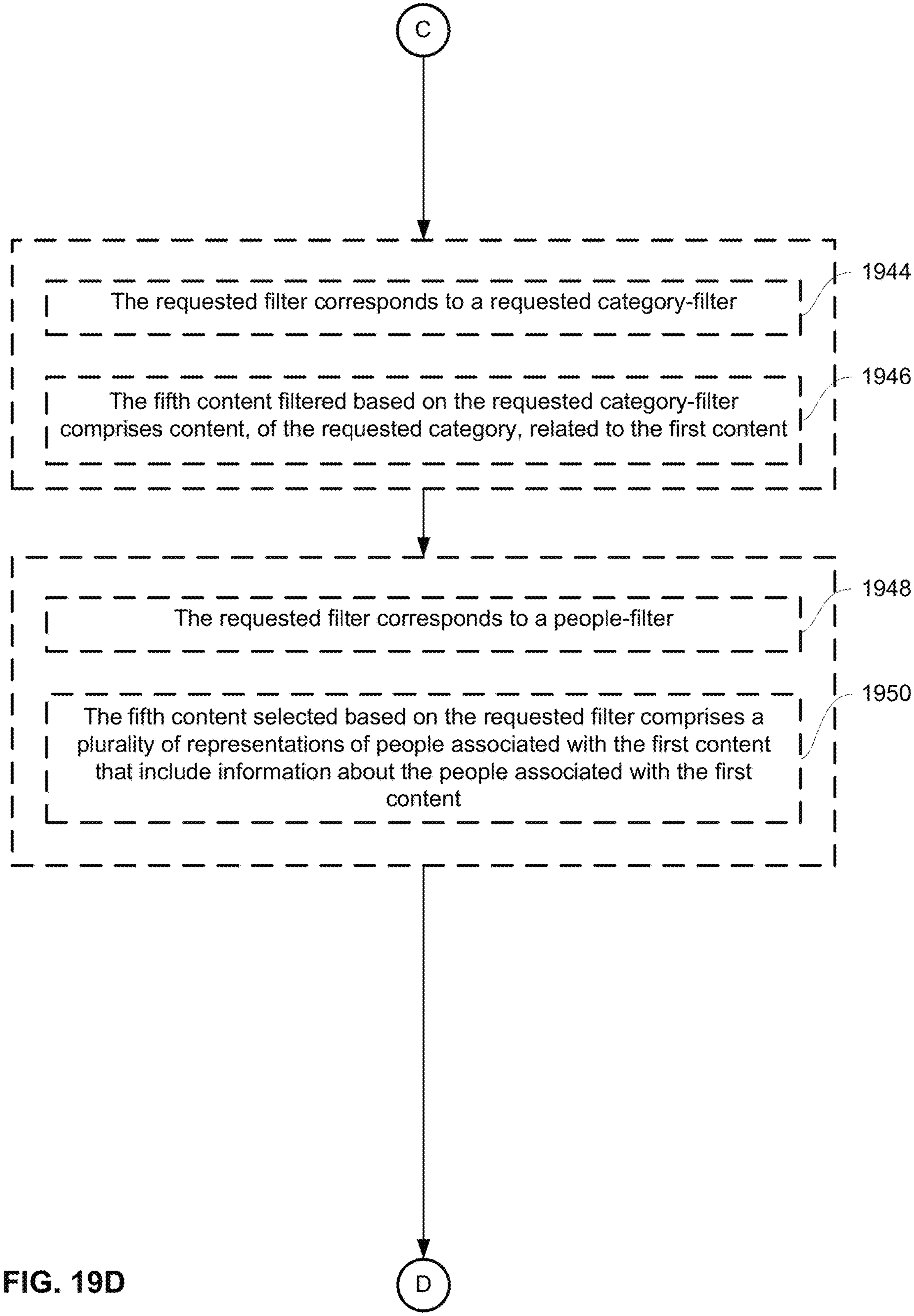
Figure 19E:
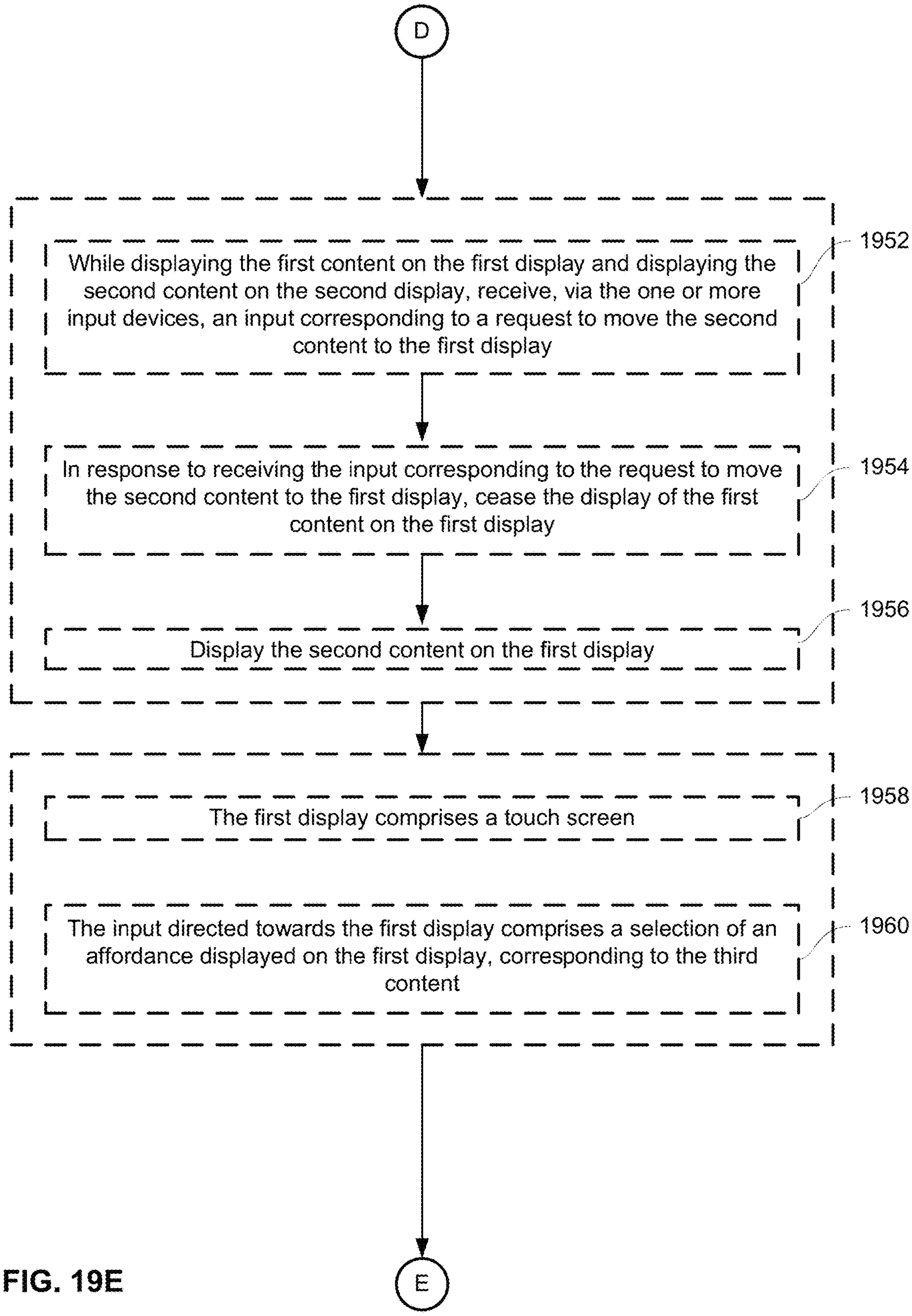
Figure 19F:
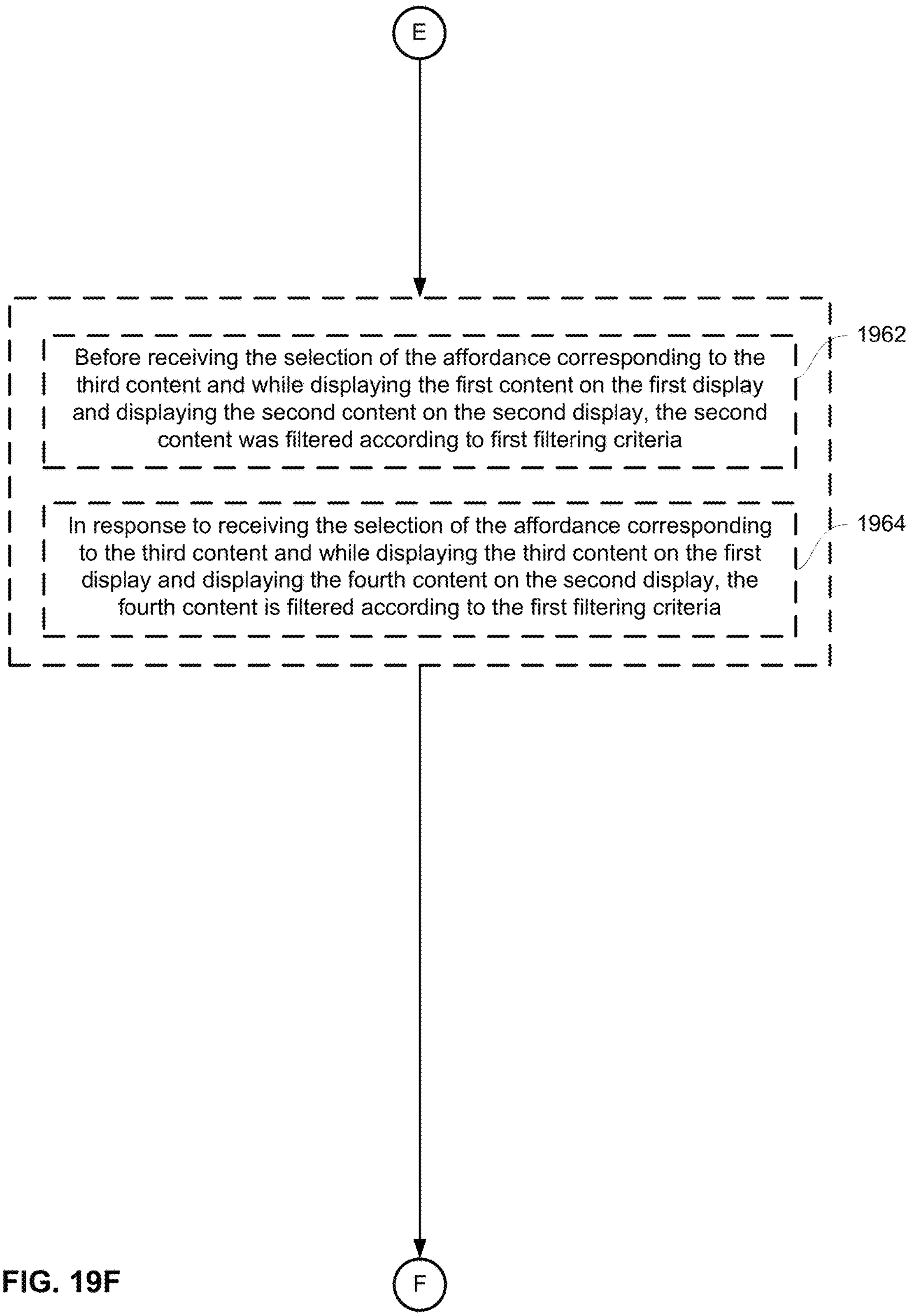
Figure 19G:
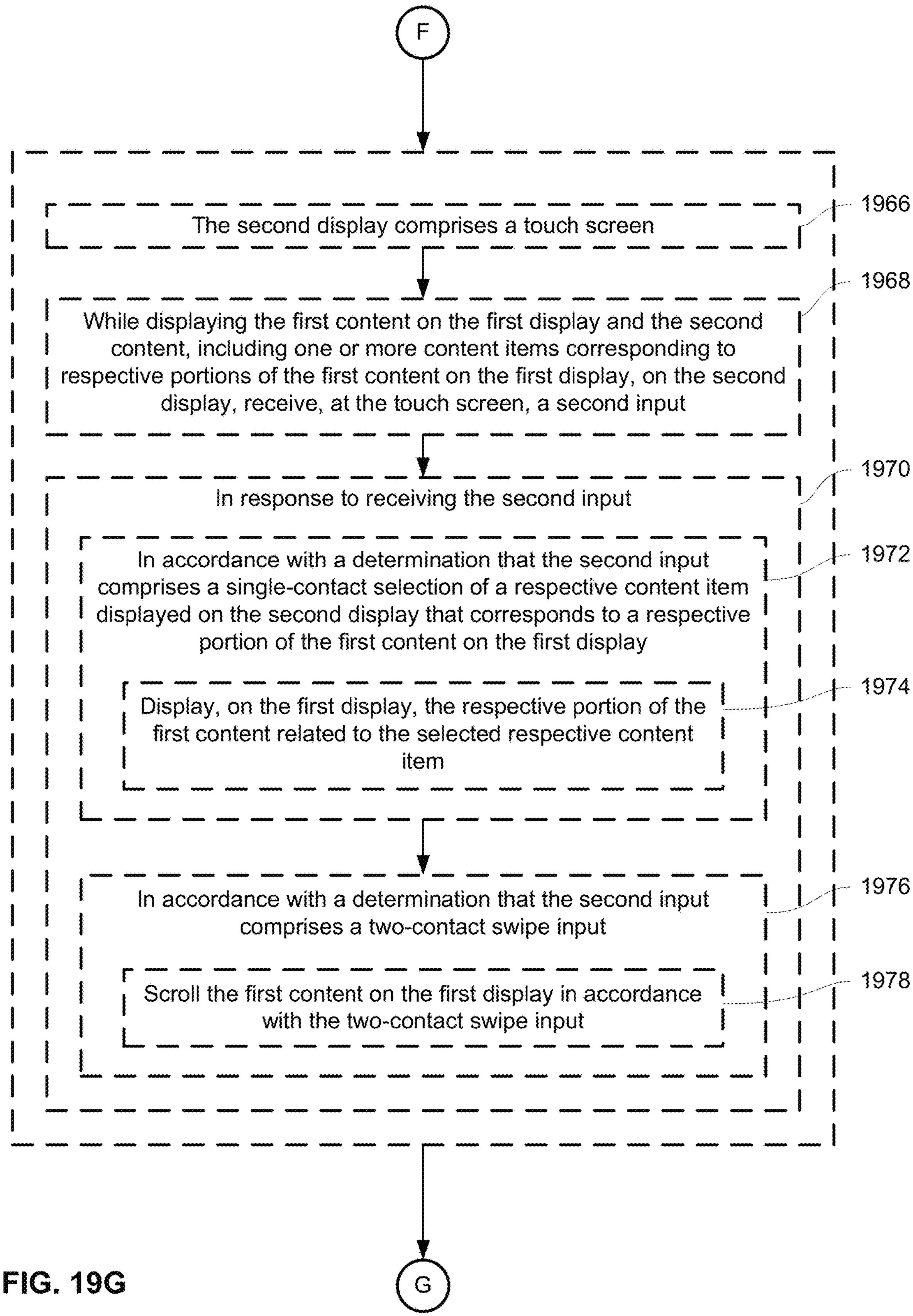
Figure 19H:
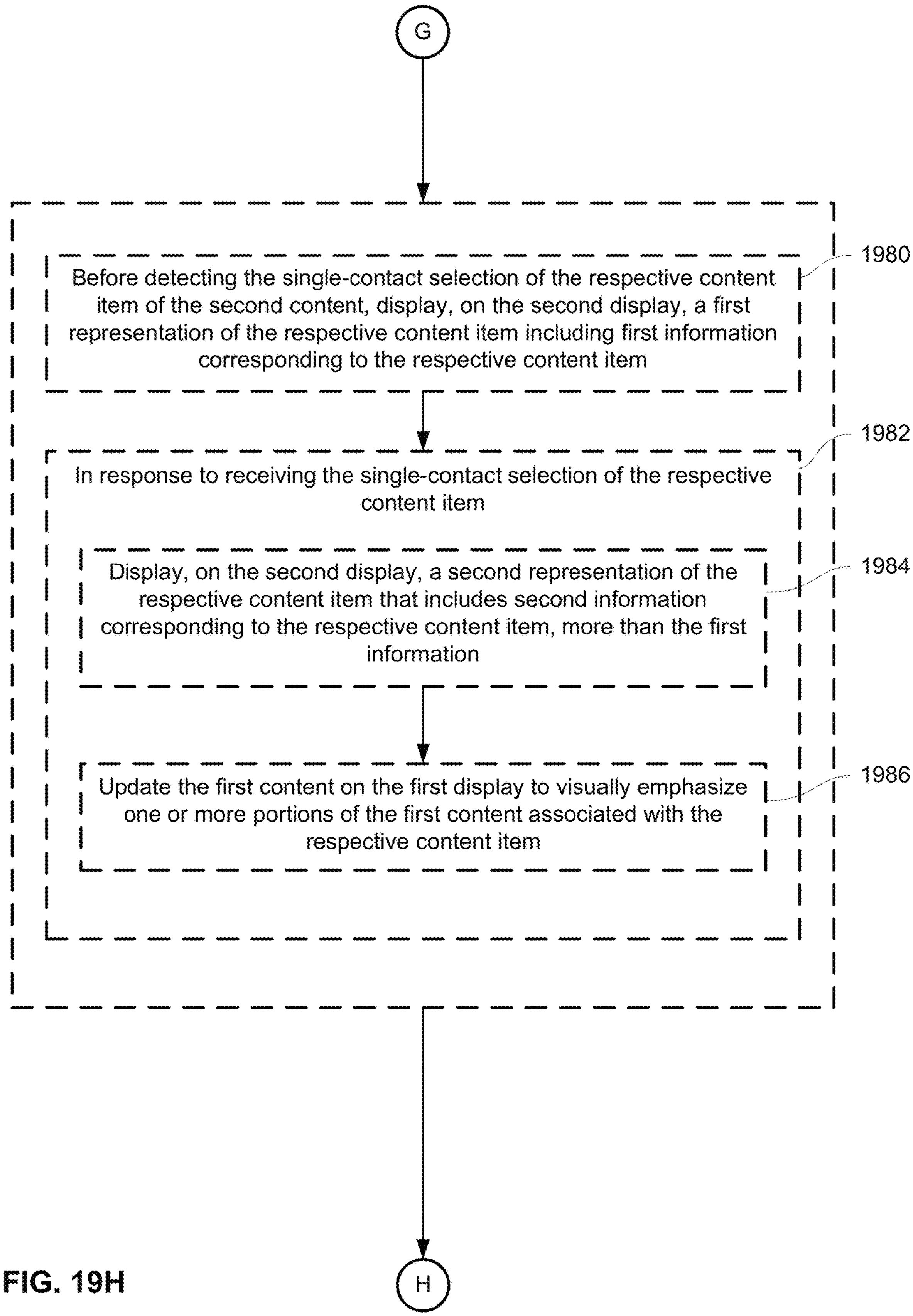
Figure 19I:
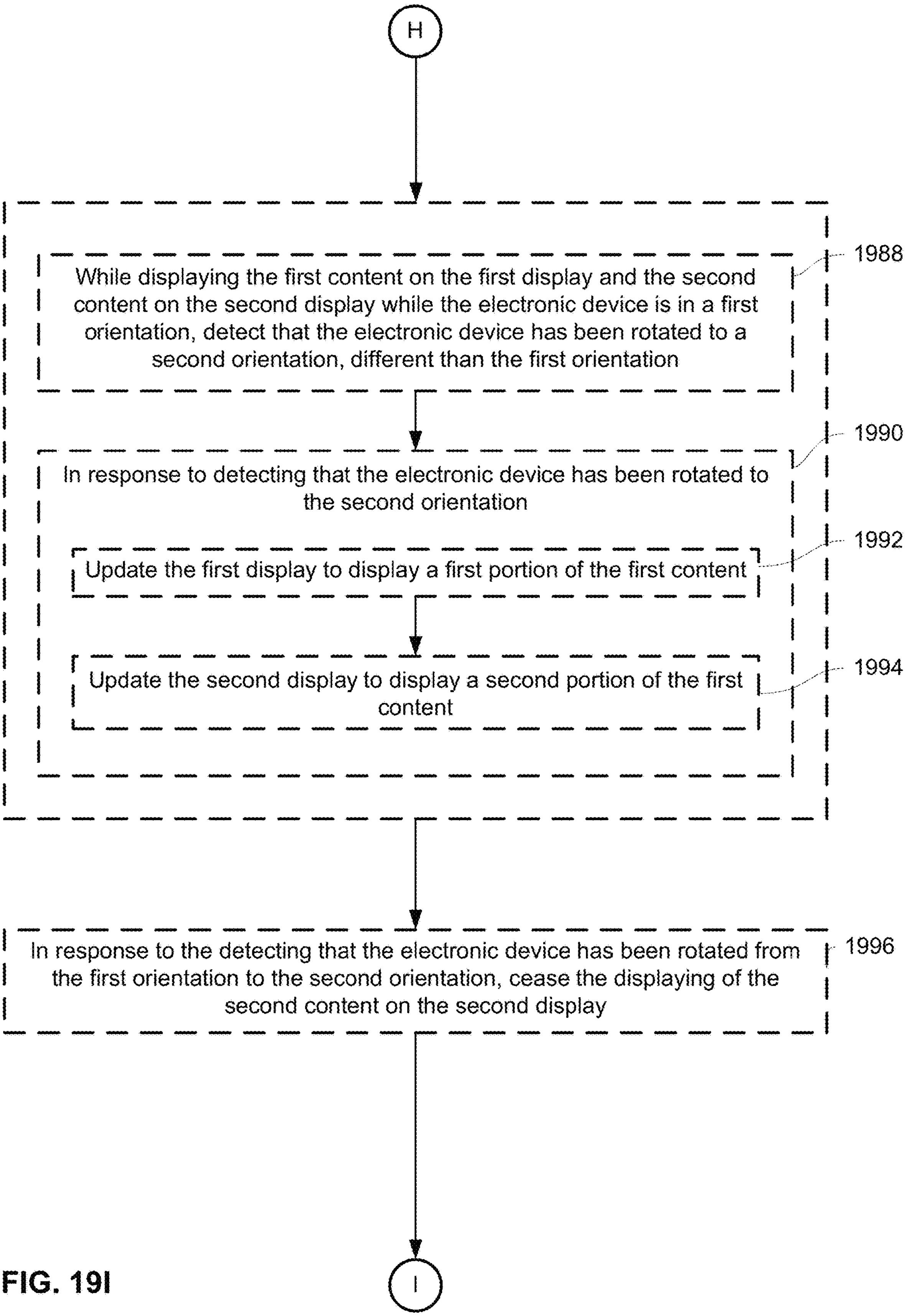
Figure 19J:
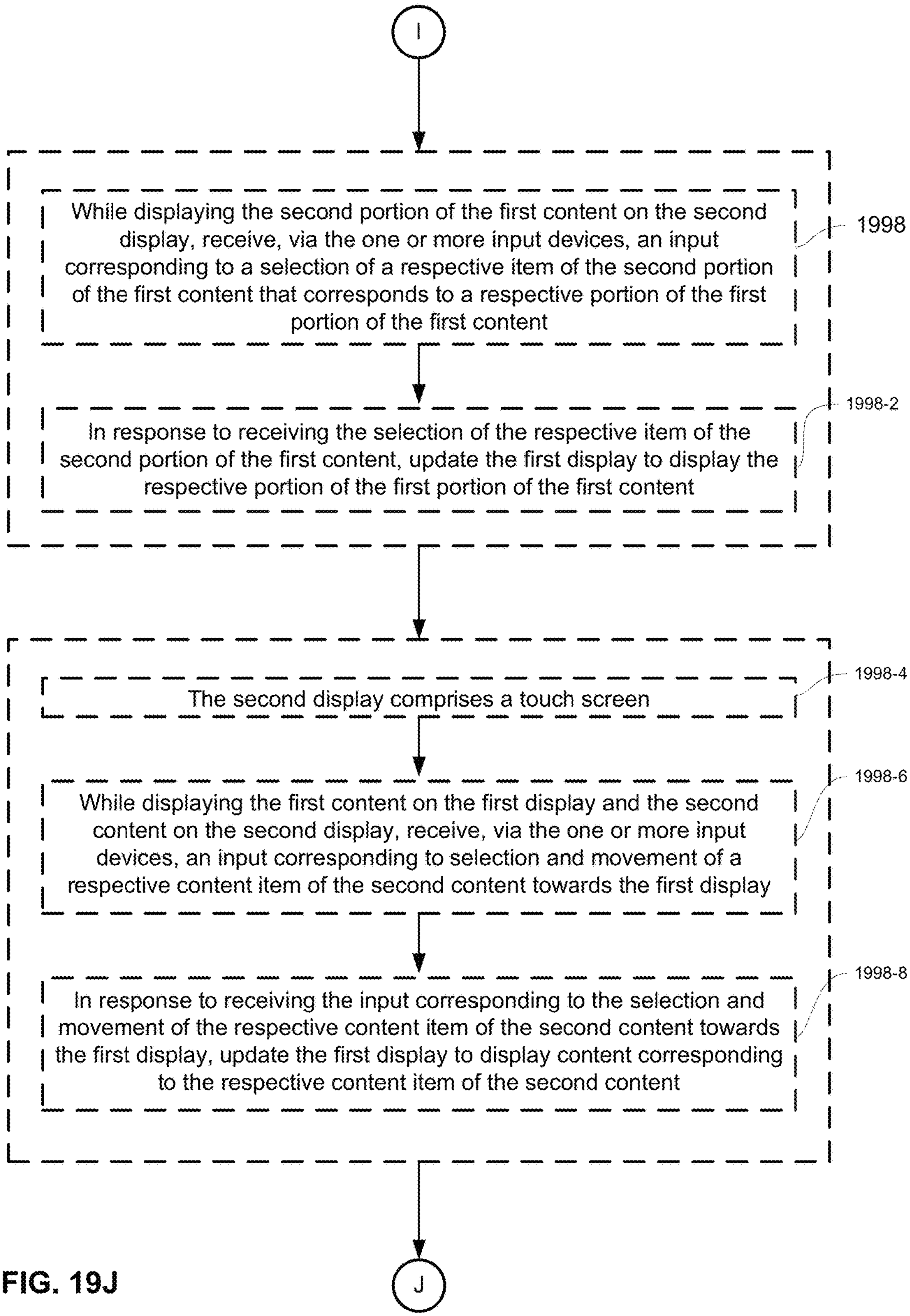
Figure 19K:
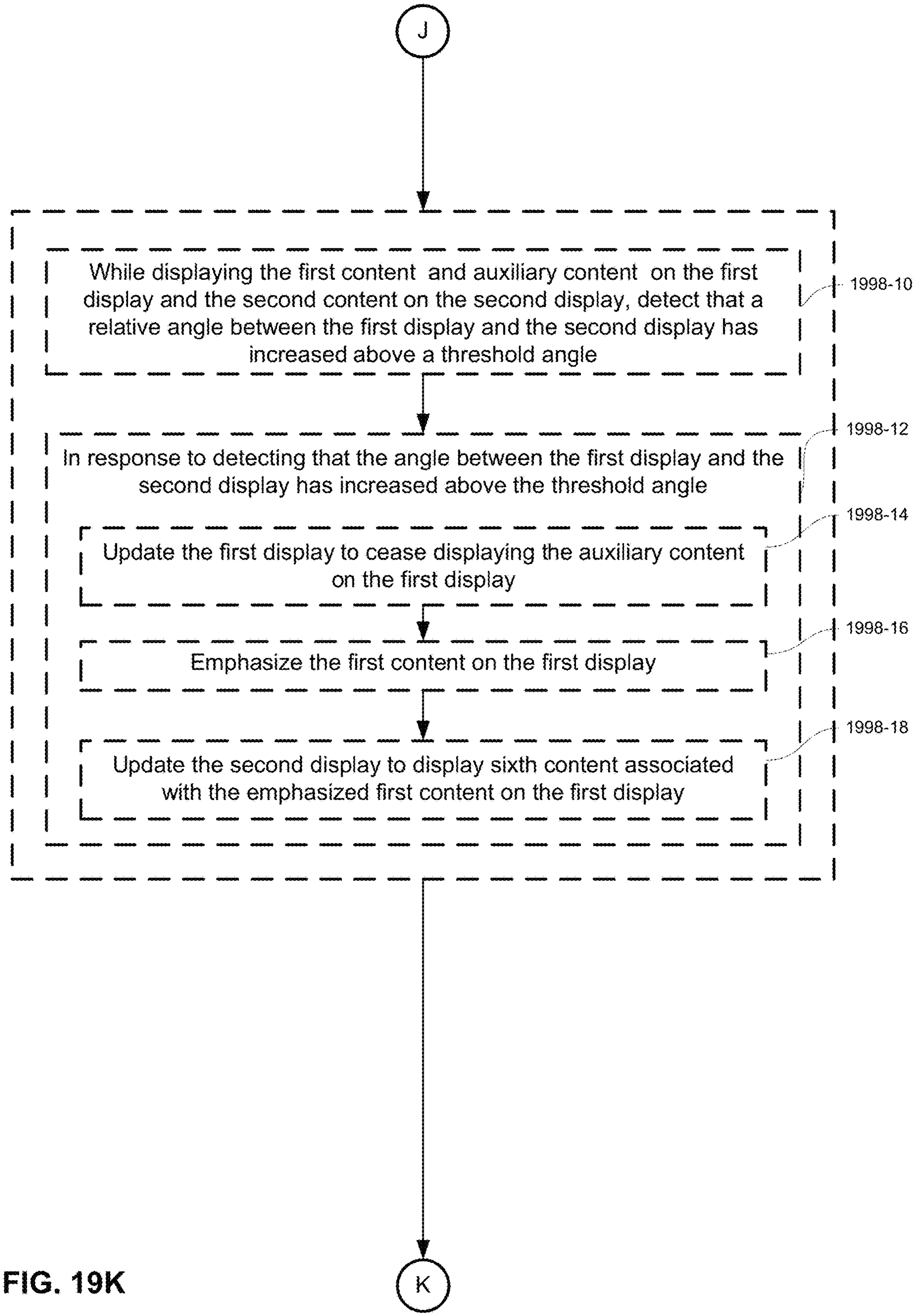
Figure 19L:
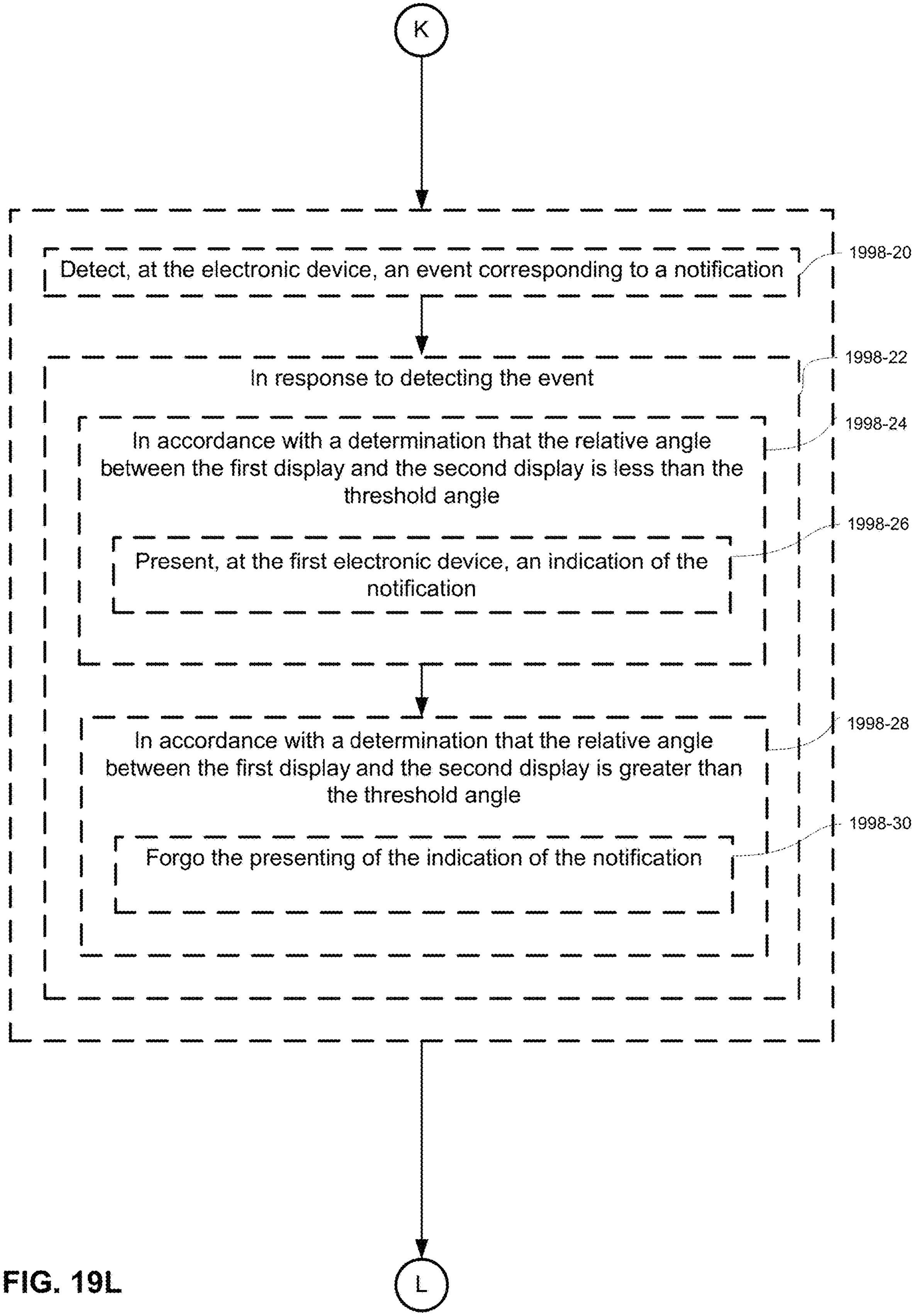
Figure 19M:
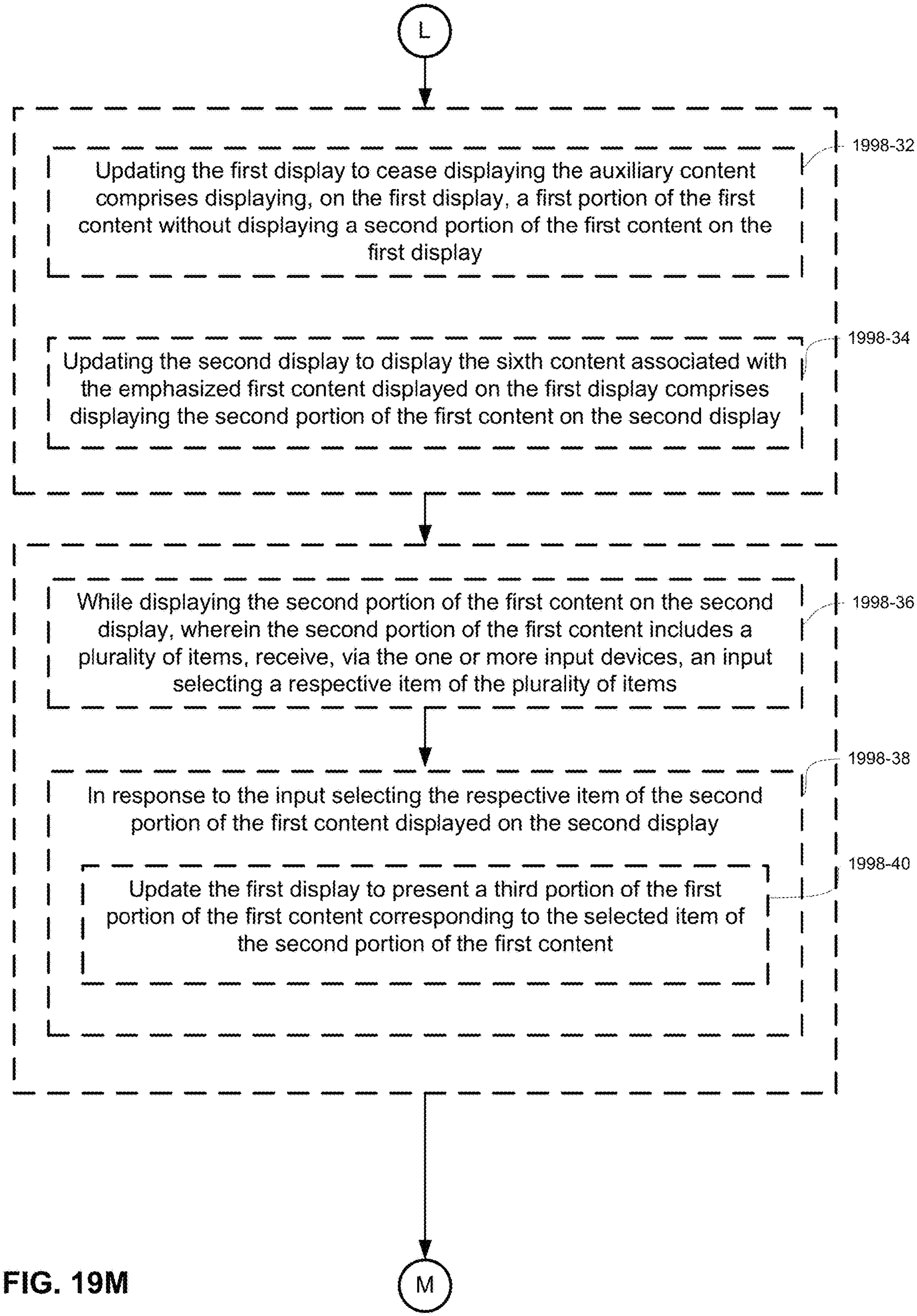
Figure 19N:
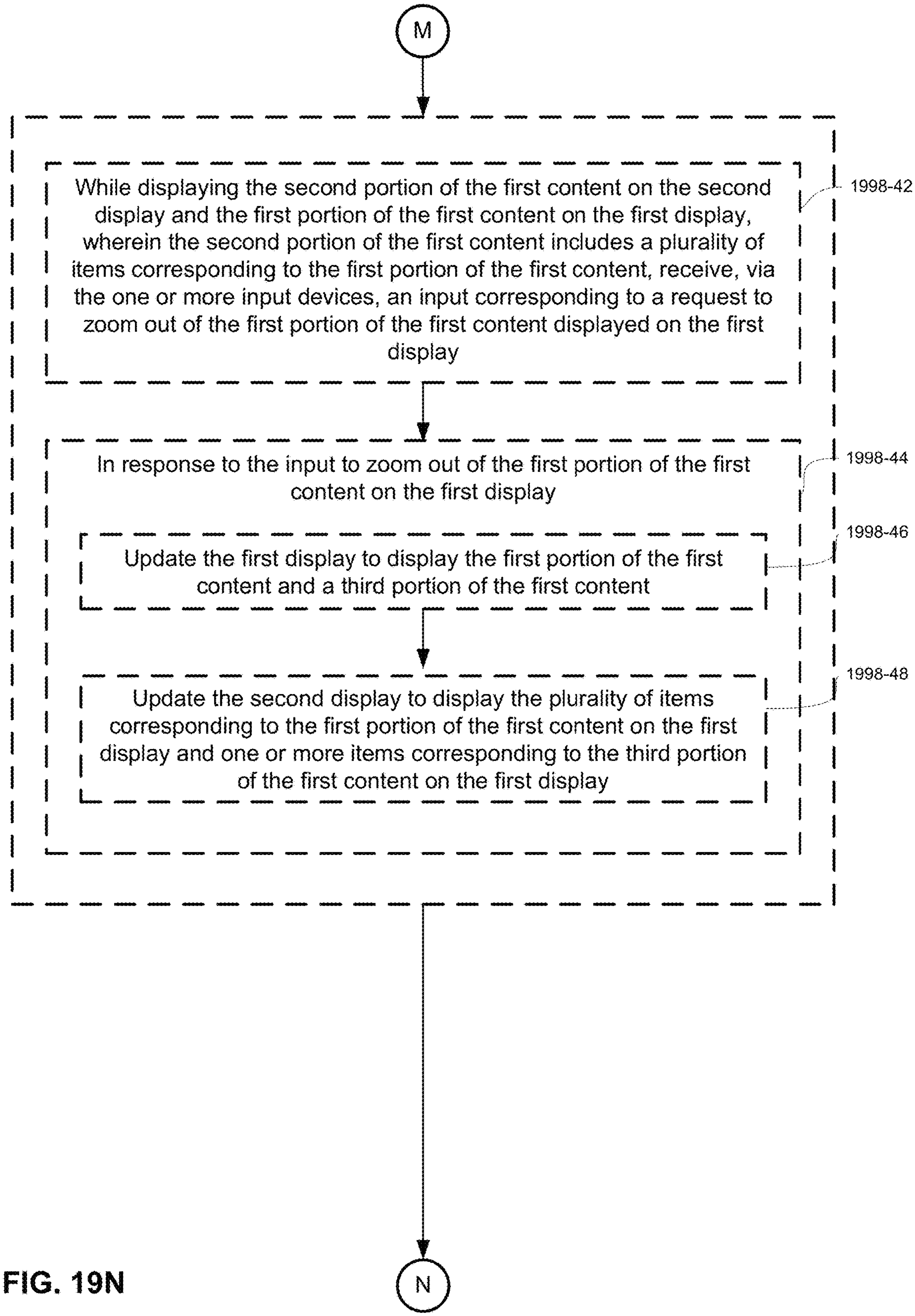
Figure 19O:
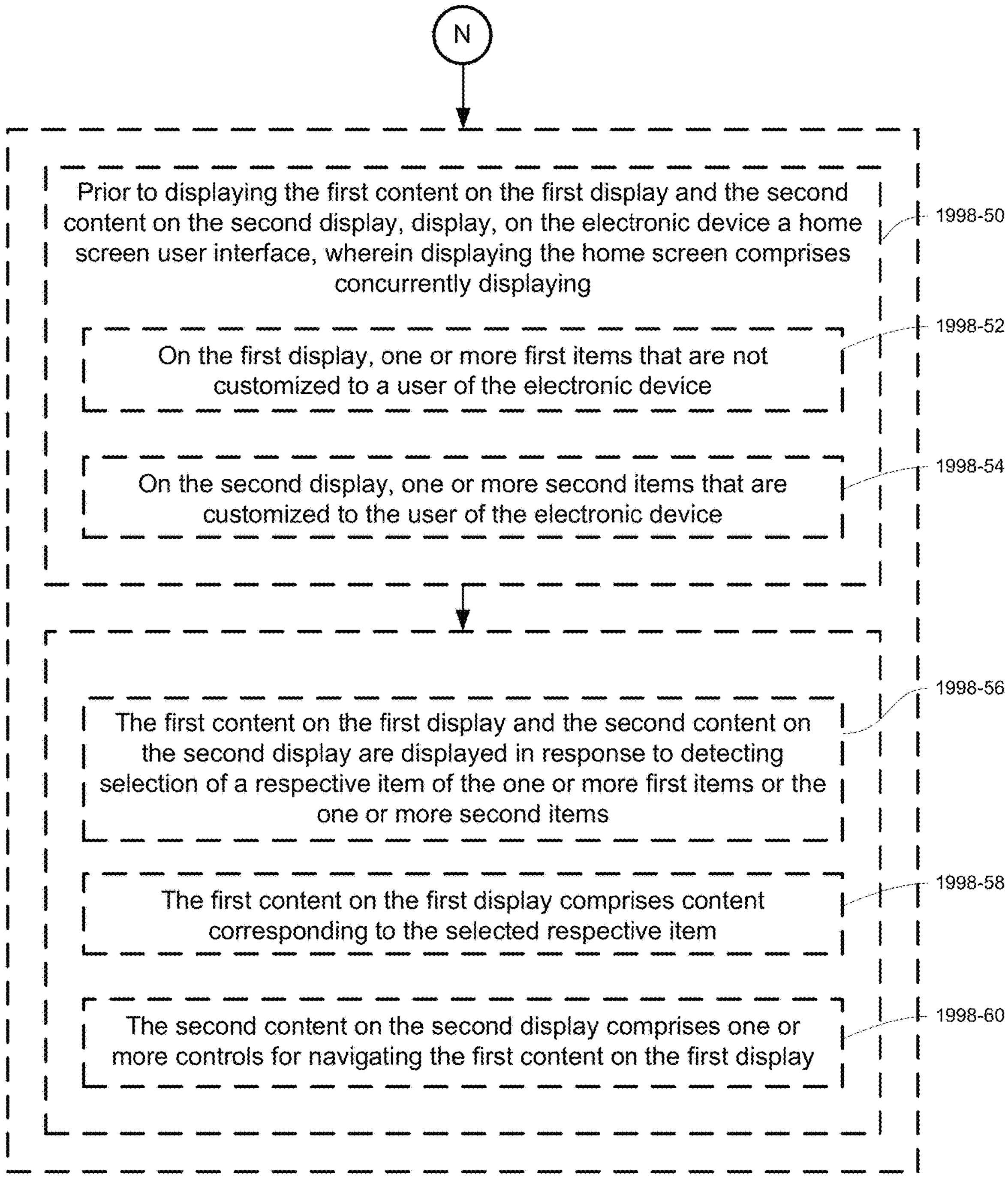

FIGS. 19A-19O are flow diagrams illustrating a method of presenting representations of items of content that are related to content presented on the electronic device in accordance with some embodiments of the disclosure. The method 1900 is optionally performed at an electronic device, such as device 100, device 300, or device 500 described above with reference to FIGS. 1A-1B, 2-3, 4A-4B and 5A-5H. Some operations in method 1900 are, optionally combined and/or the order of some operations is, optionally, changed.

As described below, the method 1900 provides ways of presenting representations of items of content that are related to content presented on the electronic device. The method reduces the cognitive burden on a user when interacting with a user interface of the device of the disclosure, thereby creating a more efficient human-machine interface. For battery-operated devices, increasing the efficiency of the user's interaction with the user interface conserves power and increases the time between battery charges.

In some embodiments, such as in FIG. 18B, an electronic device 500 in communication with a first display 504-1 (e.g., the top display), a second display 504-2 (e.g., the bottom display), and one or more input devices (e.g., electronic device 500, a phone, table, laptop, etc. including two or more touch screens or two or more displays, or a set-top box connected to two or more televisions) concurrently displays (1902) first content 1816*a* (e.g., one or more user interfaces of one or more applications running on the electronic device, one or more files or documents, etc., such as a news article having text and one or more images related to the text) on the first display 504-1 (1904) and second content 1818*a*-1826*a* associated with the first content on the second display (1906). In some embodiments, when the first content is a news article displayed by an internet browser or a news application, the second content optionally includes related news articles, definitions of terms used in the news article, previews of links included in the article and other related content.

In some embodiments, such as in FIGS. 18C-18E while concurrently displaying the first content 1816*a* and the second content 1818*a*-1826*a*, the electronic device receives (1908), via the one or more input devices, an input (e.g., a touch input received by a touch screen) corresponding to a request to change currently-displayed content on the first electronic device (e.g., selecting a link or other indication of content not currently displayed by the electronic device).

In some embodiments, such as in FIGS. 18C-D in response to receiving the input such as contact 1803 illustrated in FIG. 18C (1910): in accordance with a determination that the input 1803 was directed towards the first display 504-1 (1912): the electronic device updates (1914) the first display 504-1 to display third content 1816*b*, different from the first content 1816*a* and updates (1916) the second display to display fourth content 1818*b*-1826*b* associated with the third content 1816*b*. In some embodiments, a touch is received on the top display, which is optionally a touch screen, a pointer is used to make a selection on the top display, or a key is entered on a keyboard corresponding to the top display. In some embodiments, when an indication of third content displayed on the top display is selected (e.g., a link to view the third content), the third content replaces the first content on the top display. In some embodiments, when the first content is replaced by the third content on the top display, the content displayed on the bottom display is also updated to reflect the change of the content on the top display. For example, when the third content is a news article displayed by an internet browser or a news application, the fourth content optionally includes related news articles, definitions of terms used in the news article, previews of links included in the article and other related content.

In some embodiments, such as in FIGS. 18D-E in accordance with a determination that the input such as contact 1803 illustrated in FIG. 18D was directed towards the second display 504-2 (1918): the electronic device 500 updates (1920) the second display 504-2 to display fifth content 1830 associated with the first content 1816*b* on the first display 504-1 while maintaining display of the first content 1816*b* on the first display 504-1.

In some embodiments, a touch is received on the bottom display, which is optionally a touch screen, or a pointer is used to make a selection on the bottom display. In some embodiments, when an indication of fifth content displayed on the bottom display is selected (e.g., a link to view the fifth content), the fifth content, which is related to the first content concurrently displayed on the top display, is displayed on the bottom display. In some embodiments, changing the content displayed on the bottom display in response to the input directed to the bottom display does not change the content displayed on the top display. In some embodiments, the request to view the fifth content includes changing a category of related content displayed on the bottom display (e.g., from related news articles to related videos), a selection of a link displayed on the bottom display to view additional content related to the first content on the top display, etc.

The above-described manner of updating content in a coordinated and consistent manner allows the electronic device to present information to the user in an ordered fashion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18D-E, prior to receiving the input such as contact 1803 illustrated in FIG. 18D, the electronic device 500 displays (1922) a first portion of the first content 1816*b* on the first display. In some embodiments, in accordance with the determination that the input 1803 was directed towards the second display 504-2 (1924): in accordance with a determination that the input 1803 was directed to a first displayed portion 1820*b* of the second display 504-2 (e.g., selection of a first link on the second display), the electronic device 500 updates (1926) the first display 504-1 to display a second portion 1832 of the first content 1816*b*, different from the first portion of the first content 1816*b*, corresponding to the first displayed portion of the second display.

In some embodiments, such as in FIGS. 18Z-18AA, in accordance with a determination that the input, such as contact 1803 illustrated in FIG. 18Z, was directed to a second displayed portion 1850*a* of the second display 504-2, different from the first displayed portion 1820*b* of the second display 504-2 (e.g., selection of a second link on the second display), the electronic device 500 updates (1928) the first display 504-1 to display a third portion 1852 of the first content 1848, different from the first portion 1816*b* of the first content and the second portion 1832 of the first content, corresponding to the second displayed portion 1850*a* of the second display 504-2 (e.g., scrolling the first content from one part of the first content to another part of the first content that is associated with the input detected on the second display, such as a link that was selected on the second display).

In some embodiments, in response to an input at the second display (e.g., the bottom display) for updating the second display to display fifth content, the first display is updated to display a portion of the first content associated with the fifth content (e.g., the second portion of the first content displayed on the first display is associated with the fifth content displayed on the second display). Optionally, the second display includes a plurality of keywords related to the first content and in response to the selection of one of the keywords, a portion of the first content related to the selected keyword is displayed on the first display. For example, if the first content on the first display is a news article, the second content on the second display is optionally a list of keywords or other items related to different portions of the news article. Selection of one of the keywords or other items on the second display optionally causes the news article on the first display to be scrolled to a portion of the news article that is related to the selected keyword/item on the second display. If a different keyword/item is selected on the second display, the portion of the news article that is scrolled to on the first display is optionally different (e.g., the news article is scrolled to a portion relating to the different selected keyword/item).

The above-described manner of shifting the portion of the first content displayed on the first display to a portion corresponding to a selection received at the second display allows the user to control the display of content on the first display using the second display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18K-L, the input, such as contact 1803 illustrated in FIG. 18K, comprises an input directed towards the second display 504-2 and corresponds to a request to filter the second content displayed on the second display 504-2 (1930) (e.g. selection of a filter affordance displayed on the second display, such as a request to filter keywords on the second display related to a news article on the first display to be technology-related keywords only).

In some embodiments, such as in FIG. 18L, the fifth content 1858*a-f* on the second display 504-2 comprises the second content 1818*a*-1826*a* having been filtered based on the requested filter 1832*c* (1932). In some embodiments, in response to an input selecting a filter on the second display, the electronic device displays, on the second display, content selected by the filter. In some embodiments, the second display includes one or more of key words in the first content, commentary on the first content, links included in the first content, category blocks of content related to the first content, people related to the first content, and/or other content. When the user requests a filter (e.g., technology-related content filter), the content on the second display is optionally updated to display content related to the requested filter without displaying content not related to the requested filter. For example, when the technology-related content filter is requested, the second display displays one or more of key words, commentary on the first content, links included in the first content, and category blocks of content related to the technology discussed in the article displayed on the first display.

The above-described manner of selecting a filter to control the fifth content to display on the second display allows the user to control the relationship between the first content and the fifth content, allowing the user to view the desired fifth content while reserving the first display to display the first content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18L the fifth content 1858*a-f* selected by the requested filter 1832*c* is related to the first content 1816*a* (1934). In some embodiments, the updated content displayed on the second display is optionally related to the first content displayed on the first display and filtered by the requested filter. That is to say, in some embodiments, the fifth content displayed on the second display is related to the first content displayed on the first display and filtered in accordance with the selected filter. For example, when the first content is a news article and the second display displays one or more links presented in the news article and the user requests the technology-related content filter, the second display is optionally updated to present links presented in the first article that are related to technology.

The above-described manner of selecting a filter to control the fifth content to display on the second display allows the user to control which the relationship between the first content and the fifth content, allowing the user to view the desired fifth content while reserving the first display to display the first content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18L, the fifth content 1858*a-f* is related to the key words associated with the first content 1816*a* (1936) (e.g., a list of the key words related to the first content). Optionally, the list includes further information related to each key word such as key word definitions, links to other content related to the key words, images illustrating the key words, and/or other key word-specific content. For example, the first display optionally displays a news article that is related to one or more topics, one or more people, one or more locations, one or more other current events, and other types of information. The keywords displayed on the second display optionally include keywords related to the information in the article. For example, if the article is about the launch of a new technology product, the keywords optionally include words such as the name of the company, the name of the city and/or state where the company is located, the names of one or more people who provided comment for the article, the name of the product, the name of the general categories of products (e.g., mobile devices, smartphones, etc.), and other keywords. In some embodiments, the user is able to request a keywords filter to display keywords related to the requested filter. The user is optionally able to, additionally or alternatively, select a filter to filter the types of keywords to be displayed. For example, requesting a technology-related content filter optionally causes the second display to update to include keywords pertaining to the underlying technology of the new product.

The above-described manner of presenting information related to key words of the first content on the second display while displaying the first content on the first display allows the user to view the key words related to the article on the second display while viewing the content on the first display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18N, the fifth content 1834*a* includes commentary (e.g., comments or content written in response to the first content optionally published and/or generated by an entity different from the entity that published and/or generated the first content) about the first content 1816*a* (1938). In some embodiments, the content displayed on the first display comprises an article provided by a content provider, and the content displayed on the second display comprises one or more comments or opinions created by other users about the article, such as critical reviews of the article, social media comments about the article, etc. In some embodiments, when the user requests a filter to filter the content displayed on the second display, the second display is optionally updated to include commentary pertaining to the requested filter. For example, selecting the technology-related content filter optionally causes the second display to display commentary related to the technology mentioned in the article displayed on the first display.

The above-described manner of displaying commentary about the content displayed on the first display on the second display allows the user of the electronic device to concurrently view the commentary while reading the content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18P the first content (e.g., an article) comprises one or more links 1836*a-d* (e.g., a hyperlink or other electronic reference address) to additional content (1940) (e.g., additional articles, blog posts, web sites, or other content), and the fifth content 1836*a-d* comprises one or more previews of content corresponding to the one or more links (1942) (e.g., one or more of an image related to the additional content accessible by the respective link and/or a sample of the additional content accessible by the respective link). Optionally, the electronic device displays, on the second display, previews of content linked in the first content displayed on the first display. For example, when the first content is a news article including links to other content (e.g., other news articles, websites related to the subject-matter of the news article, etc.), the second display optionally displays those links and previews of the additional content of those links. The previews optionally include a portion (e.g., a few sentences of text included in the additional content, one or more images included in the additional content, a title of the additional content, etc.) of the additional content that is presented when the link is selected. In some embodiments, when the user selects one of the links or the link previews from the second display, the additional content is optionally presented to the user either on the first display or on the second display.

The above-described manner of presenting, on the second display, previews of content linked in the first content displayed on the first display allows the user to view information about content linked in the first content while viewing the first content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18S the requested filter corresponds to a requested category-filter 1832*a* (1944) (e.g., a filter to display, on the second display, content related to the first content displayed on the first display sorted by category). In some embodiments, the categories include categories of content types such as selection of a "web pages" filter to show only web pages on the second display that are related to the first content on the first display and/or categories of topic types, such selection of a "people" filter to show only people on the second display that are related to the first content on the first display.

In some embodiments, such as in FIG. 18S, the fifth content 1818*c*-1826*c* filtered based on the requested category-filter 1832*a* comprises content, of the requested category, related to the first content 1816*a* (1946). In some embodiments, the user is able to browse content such as articles, blog posts, and web pages on the second display that are related to the article, blog post, or web page displayed on the first display and filtered by a requested category-filter.

The above-described manner of presenting related content to the user on the second display allows the user to simultaneously view content on the first display while also viewing related content on the second display in response to a selection of a content item of a plurality of content items displayed while viewing the first content on the first display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18V, the requested filter corresponds to a people-filter 1832*e* (1948) (e.g., a filter to display, on the second display, information about people associated with the first content displayed on the first display). In some embodiments, people associated with the first content include people mentioned in, related to, involved in creating, or having some other relationship to the first content.

In some embodiments, such as in FIG. 18V, the fifth content 1846*a-f* selected based on the requested filter 1832*e* comprises a plurality of representations (e.g., images of and/or blocks of text about) of people associated with the first content 1816*a* that include information about the people associated with the first content (1950). In some embodiments, the content on the second display includes pictures of people associated with the first content on the first display, along with names, biographies, etc. of those people. In some embodiments, the information about the people associated with the first content on the first display is provided by a different entity than the entity the created, published, or provided the first content. For example, when the first content is a news article, the fifth content optionally includes information about one or more people mentioned in the news article and/or involved in creating the news article (e.g., the author).

The above-described manner of presenting a plurality of representations of people related to the first content on the second display which are selectable to display further information about each of those people while maintaining display of the first content allows the user to browse information related to the first content in response to input received at the second display while separately viewing the first content on the first display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18F, while displaying the first content 1816*b* on the first display 504-1 and displaying the second content 1830 on the second display 504-2, the electronic device receives (1952), via the one or more input devices, an input such as selection of option 1834 with contact 1803 corresponding to a request to move the second content 1830 to the first display 504-1 (e.g., selection of an affordance on the second display for moving the related content on the second display to the first display to replace the content on the first display).

In some embodiments, such as in FIGS. 18F-G in response to receiving the input such as selection 1803 of option 1834 in FIG. 18F corresponding to the request to move the second content 1830 to the first display 504-1, the electronic device 500 ceases (1954) the display of the first content 1816*b* on the first display 504-1 and displays (1956) the second content 1830 on the first display 5041. In some embodiments, the second display ceases the display of the second content that was related to the content that was displayed on the first display, and the second content is now optionally displayed on the first display. The second display optionally displays the first content, effectively switching the function of the two displays. In some embodiments, the second display continues to display the second content, such that the second display displays a different portion of the second content than a portion of the second content that is displayed on the first display. For example, while displaying a news article on the first display and content related to the news article on the second display including a preview of a link included in the article, the electronic device optionally detects an input corresponding to a request to view the contents of the link on the first display. In response to the request, the content accessible by the link is optionally displayed on the first display. The second display optionally displays one or more of a different portion of the content accessible by the link, additional content related to the content accessible by the link, or some other content.

The above-described manner of moving the second content to the first display allows the user to view the related content in an ergonomic manner, making it easier for the user to interact with the content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 18C-D the first display 504-1 (e.g., the top display) comprises a touch screen (1958) (e.g., the first display is a touch screen). In some embodiments, the input directed towards the first display comprises a selection 1803 of an affordance (e.g., a tap), displayed on the first display 504-1, corresponding to the third content 1816*b* (1960). In some embodiments, in response to a tap detected by the first display on a link corresponding to the third content, the content on the first display changes and the content on the second display changes such that it is related to the newly displayed content on the first display. For example, while displaying a news article including a link to additional content on the first display, the electronic device optionally detects selection of the link. In response to the selection of the link, the electronic device optionally updates the first display to display the additional content accessible by the link and updates the second display to display content related to the additional content accessible by the link.

The above-described manner of updating the content of the second display when the content of the first display is updated allows the user to view content related to the updated content of the first display, on the second display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 18V-W, before receiving the selection 1803 of the affordance corresponding to the third content 1816*b* and while displaying the first content 1816*a* on the first display 504-1 (e.g., the top display) and displaying the second content 1846*a*-1846*f* on the second display 504-2 (e.g., the bottom display), the second content 1846*a*-1846*f* was filtered according to first filtering criteria 1832*e* (1962). In some embodiments, the filters optionally control the relationship between the second content displayed on the second display and the first content displayed on the first display. In some embodiments, the filters include key words in the first content, opinions on the first content, links included in the first content, category blocks of content related to the first content, people related to the first content, and/or other filters. For example, the first content is optionally a news article h and the selected filter is optionally technology-related information. The second display optionally displays one or more links, keywords, or other content related to the technology discussed in the article.

In some embodiments, such as in FIGS. 18V-W, in response to receiving the selection 1803 of the affordance corresponding to the third content 1816*b* and while displaying the third content 1816*b* on the first display 504-1 and displaying the fourth content 1846*g*-1 on the second display 504-2, the fourth content 1846*g*-1 is filtered according to the first filtering criteria 1832*e* (1964). In some embodiments, when the content displayed on the second display is selected based on a filter and the content displayed on the top display is updated, the updated content displayed on the second display is selected based on the previously-selected filter, thereby maintaining the relationship between the content on the first display and the content on the second display, even as the content on the first display changes. For example, in response to the selection of a link to additional content that was displayed on the second display, the first display is optionally updated to display the additional content and the second display is optionally updated to display content related to the additional content, filtered to display technology-related related content.

The above-described manner of maintaining a filter for selecting the content displayed on the second display enables the electronic device to present content on the second display that is of interest to the user based on content the user was previously viewing, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the second display 504-2 (e.g., the bottom display) comprises a touch screen (1966) (e.g., the bottom display is a touch screen). In some embodiments, while displaying the first content on the first display and the second content, including one or more content items corresponding to respective portions of the first content on the first display, on the second display, the electronic device receives (1968), at the touch screen, a second input (e.g., detecting one or more contacts on the touch screen).

In some embodiments, such as in FIGS. 18D-E and 18X-Y in response to receiving the second input, such as contact 1803 illustrated in FIG. 18D or movement of contacts 1803*a-b* illustrated in FIG. 18X, (1970): in accordance with a determination that the second input comprises a single-contact 1803 selection of a respective content item 1820*b* displayed on the second display 504-2, such as in FIGS. 18D-E, (e.g., a tap detected at a location of the second display upon which the item of content is displayed) that corresponds to a respective portion of the first content 1816*b* on the first display (1972): the electronic device 500 displays (1974), on the first display 504-2 (e.g., the top display), the respective portion 1832 of the first content 1816*b* related to the selected respective content item 1820*b*. In some embodiments, selecting items of content displayed on the second display causes the electronic device to scroll the first content, allowing the user to navigate the first content using the related content items displayed on the second display.

In some embodiments, such as in FIGS. 18X-Y, in accordance with a determination that the second input comprises a two-contact 1803*a-b* swipe input (1976) (e.g., detecting, with the second display, two concurrent contacts and movements of those contacts, including movement in the same direction): the electronic device 500 scrolls (1978) the first content 1816*a* on the first display in accordance with the two-contact swipe input. In some embodiments, the first content scrolls in the direction corresponding to the direction of the received two-finger swipe input (e.g., the same direction or in the opposite direction as though the user is dragging the content) and at a speed corresponding to the speed of the received two-finger swipe input. In some embodiments, the user is able to navigation the content displayed on the first display using two-finger touch input at the second display. In some embodiments, when the electronic device detects a single-contact input at the bottom touch screen, the input is treated as a request to select an item of content displayed on the bottom touch screen. For example, the bottom touch screen optionally displays a list of keywords used in an article displayed on the top display. In response to a one-contact input selecting one of the key words, the electronic device optionally updates the top display to present a portion of the article pertaining to the selected key word. When the electronic device detects a two-contact swipe input (e.g., two-finger scrolling) at the bottom touch screen, the electronic device optionally updates the top display to scroll the article presented on the top display in accordance with the detected two-contact swipe.

The above-described manner of providing various ways for the user to navigate the first content displayed on the first display using inputs entered at the second display allows the user to scroll the first content thematically and spatially, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. D-E, before detecting the single-contact 1803 selection of the respective content item 1820*b* of the second content such as in FIG. 18D, the electronic device 500 displays (1980), on the second display 504-2, a first representation 1820*b* of the respective content item including first information corresponding to the respective content item (e.g., an icon, a thumbnail, a summary, an image, a body of text, etc.). The second display optionally displays a representation of each item of the second content in the same manner or in a variety of manners.

In some embodiments, such as in FIG. 18E, in response to receiving the single-contact selection 1803 of the respective content item 1820*b* (1982) such as in FIG. 18D: the electronic device 500 displays (1984), on the second display 504-2, a second representation 1830 (e.g., an updated icon, thumbnail, summary, image, body of text, etc.) of the respective content item that includes second information corresponding to the respective content item, more than the first information. In some embodiments, in response to being selected, the item of content expands. The expanding optionally includes occupying more space on the second display and/or updating to include more information than was previously displayed.

In some embodiments, such as in FIG. 18E, the electronic device 500 updates (1986) the first content 504-2 on the first display to visually emphasize (e.g., change a color (e.g., highlight) or a size (e.g., enlarge)) one or more portions 1832 (e.g., words, figures, sections, etc.) of the first content 1816*b* associated with (e.g., pertaining to the same topic as) the respective content item 1830. In some embodiments, selecting an item of content on the second display causes that item to expand on the bottom display and causes the first display to be updated to include content corresponding to the selected item. For example, the first display optionally displays a news article and the bottom display displays content associated with the news article, including the name of and an image of a person mentioned in the news article. In response to an input selecting the text and/or image associated with the person mentioned in the article, the first display is optionally updated to present a portion of the news article pertaining to the person and the second display is optionally updated to display more information about that person (e.g., additional images of the person, text about the person such as a biography, etc., links to one or more additional items of content related to the person, etc.).

The above-described manner of concurrently expanding the second content displayed on the second display while distinguishing a portion of the first content related to the selected content allows the electronic device to present additional information related to a selected item of the second content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 18Y-Z while displaying the first content 1816*a* on the first display 504-1 and the second content 1818*a*-1826*a* on the second display 504-2 while the electronic device 500 is in a first orientation as illustrated in FIG. 18Y, the electronic device 500 detects (1988) that the electronic device 500 has been rotated to a second orientation, different than the first orientation (e.g., rotating the device 90 degrees such that the top and bottom displays are now side-by-side) such as in FIG. 18Z. In some embodiments, in response to detecting that the electronic device 500 has been rotated to the second orientation (1990): the electronic device 500 updates (1992) the first display 504-1 to display a first portion 1848 of the first content (e.g., one of a text portion or an image portion).

In some embodiments, the electronic device 500 updates (1994) the second display 504-2 to display a second portion 1850*a-d* of the first content (e.g., the other of the text portion or the image portion). In some embodiments, rotating the device from a clamshell orientation (e.g., one display is on top of the other) to a book orientation (e.g., the displays are side-by-side) causes the first content to be displayed on both the first display and the second display such that different types of content of the first content are displayed on each display. For example, the first display optionally displays one of the text or images from the first content while the second display optionally displays the other of the text or images from the first content. When the first display and second display are updated to display respective portions of the first content, the second display optionally ceases to display the second content and the first display optionally ceases to display the second portion of content, which is now optionally displayed on the second display.

The above-described method of dividing the first content between the first display and the second display in response to detecting a rotation of the electronic device allows the electronic device to update its user interface to suit its current orientation, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In response to the detecting that the electronic device has been rotated from the first orientation illustrated in FIG. 18Y to the second orientation illustrated in FIG. 18Z, the electronic device 500 ceases (1996) the displaying of the second content 1818*a*-1826*a* on the second display 504-2. In some embodiments, the second display no longer displays the second content related to the first content and instead displays part of the first content only.

The above-described manner of updating the second display to display part of the first content in place of the second content related to the first content allows the first content to be divided between the two displays while reducing visual cluttering of having the related second content also displayed on the second display, allowing the user to view more of the first content on the electronic device at a time, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18Z, while displaying the second portion 1850*a-d* of the first content on the second display 504-2, the electronic device 500 receives (1998), via the one or more input devices (e.g., a touch screen incorporated into the second display), an input corresponding to a selection 1803 of a respective item 1850*a* of the second portion of the first content that corresponds to a respective portion of the first portion of the first content (e.g., selection of an image of the first content that is related to a portion of text of the first content).

In some embodiments, such as in FIG. 18AA in response to receiving the selection 1803 of the respective item 1850*a* of the second portion of the first content, the electronic device 500 updates (1998-2) the first display 504-1 to display the respective portion 1852 of the first portion of the first content (e.g., text associated with the selected image). In some embodiments, the text corresponding to the image refers to the image, comprises a caption of the image, or is associated with the image in some other way. For example, the first content is optionally a news article including text and images, with various portions of the text being associated with the images. In response to selection of one of the images on the second display, the first display is optionally updated to present the text that is associated with the selected image.

The above-described manner of navigating the text portion of the first content based on selection of an image portion of the first content allows the user to select a text portion of the first content to be presented based on the images of the content which enables the user to quickly find a portion of interest within the first content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the second display 504-2 (e.g., the bottom display) comprises a touch screen (1998-4). In some embodiments, such as in FIG. 18H, while displaying the first content 1816*a* on the first display 504-1 and the second content 1818*a*-1826*a* on the second display 504-2, the electronic device 500 receives (1998-6), via the one or more input devices (e.g., a touch input received a touch screen incorporated into the second display), an input 1803 corresponding to selection and movement of a respective content item 1822*a* of the second content towards the first display.

In some embodiments, such as in FIG. 18I, in response to receiving the input 1803 corresponding to the selection and movement of the respective content item 1822*a* of the second content towards the first display 504-1, the electronic device 500 updates (1998-8) the first display 504-1 to display content 1816*b* corresponding to the respective content item 1822*a* of the second content. In some embodiments, for example, the first content is optionally a news article and the second content is optionally a plurality of representations (e.g., text and/or images corresponding to) of items of content (e.g., other articles, web pages, electronic books, etc.) related to the news article, such as links to other news articles. In response to an input selecting and moving one of the links displayed on the second display towards the first display, the first display is optionally updated to display the content of the link (e.g., the user "pushes" or "drags" the link from the second display to the first display). In some embodiments, when the first display is updated to display the respective item of content, the second display is updated to display content related to the respective item of content.

The above-described method of presenting a portion of the second content on the first display in response to an input pushing the portion of content towards the first display allows the first electronic device to update the first display to present information interesting to the user in an ergonomic and space-efficient way, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIGS. 18BB-18CC, while displaying the first content 1816*a* (e.g., a news article) and auxiliary content 1856 (e.g., a toolbar for editing/marking up the news article, icons for sharing the news article with others, icons for saving or printing the news article, etc., or other content that is optionally associated with display of the news article on the top display) on the first display 504-1 and the second content 1818*a*-1826*a* on the second display 504-2, the electronic device 500 detects (1998-10) that a relative angle (e.g., defined by a hinge joining the first display and the second display) between the first display 504-1 and the second display 504-2 has increased above a threshold angle (e.g., a threshold angle associated with flattening the device). For example, the threshold angle optionally has a value of 180 degrees, plus or minus some number (e.g., 5, 10, or another amount) of degrees. In other words, the displays of the electronic device have optionally been "flattened".

In some embodiments, such as in FIGS. 18BB-CC, in response to detecting that the angle between the first display 504-1 and the second display 504-2 has increased above the threshold angle (1998-12) (e.g., when the device is flattened): the electronic device updates (1998-14) the first display 504-1 to cease displaying the auxiliary content 1856 on the first display 504-1 and emphasizes (1998-16) the first content 1816*a* on the first display 504-1. In some embodiments, the first content expands to fill the first display, and content, if any, that was previously displayed with the first content on the first display is no longer displayed on the first display.

In some embodiments, the electronic device updates (1998-18) the second display 504-2 to display sixth content 1824*d* and 1826*d* associated with the emphasized first content on the first display (e.g., including ceasing display of the second content that was previously displayed on the second display). The sixth content is optionally related to the expanded portion of the first content being displayed on the first display. In some embodiments, the sixth content differs from the second content, which is optionally related to the first content, including portions of the first content not presently displayed on the first display. In contrast, the sixth content is optionally only content related to the portion of the first content that is now displayed on the first display. For example, if the first content is a news article, the sixth content is optionally a first set of key words related to the text of the article presently displayed by the first display (e.g., in contrast to the second content, which is optionally a second set of key words related to all of the text of the article, irrespective of whether that text is displayed on the first display). In some embodiments, when a request to present a different portion of the first content (e.g., an input to scroll the first content) is detected at the electronic device, the first display optionally updates to display the different portion of the first content and the second display optionally updates to display new content associated with the different portion of the first content.

The above-described manner of increasing the amount of first content and second content displayed on the first display and second display, respectively, in response to detecting that the device has been flattened allows the first electronic device to present more of the first and second content at a time, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the electronic device detects (1998-20), at the electronic device, an event corresponding to a notification (e.g., an event that would normally cause the electronic device to generate a notification, such as receiving an instant message or the like), such as the incoming message illustrated in FIGS. 18BB-CC.

In some embodiments, such as in FIG. 18BB, in response to detecting the event (1998-22): in accordance with a determination that the relative angle between the first display 504-1 and the second display 504-2 is less than the threshold angle (1998-24) (e.g., the device is in a folded configuration, such as in a clamshell configuration), the electronic device 500 presents (1998-26), at the first electronic device, an indication 1854 of the notification. In some embodiments, the indication includes one or more of a visual indication comprising text and/or images related to the notification, a sound, and/or tactile feedback.

In some embodiments, such as in FIG. 18CC, in accordance with a determination that the relative angle between the first display 504-1 and the second display 504-2 is greater than the threshold angle (1998-28) (e.g., the device is in a flattened configuration), the electronic device forgoes (1998-30) the presenting of the indication of the notification (e.g., notifications are silenced while the device is in the flattened configuration. The electronic device optionally presents the indication of the notification when it returns to the folded configuration.

The above-described manner of silencing notifications while the electronic device is in the flattened configuration allows the electronic device to present the first content without using screen space to present notification indications thereby reserving space for more of the first content, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18Z, updating (1998-32) the first display 504-1 to cease displaying the auxiliary content 1856 comprises displaying, on the first display 504-1, a first portion 1848 of the first content (e.g., text) without displaying a second portion 1850*a-d* of the first content (e.g., images) on the first display 504-1.

In some embodiments, such as in FIG. 18Z, updating (1998-34) the second display 504-2 to display the sixth content associated with the emphasized first content 1848 displayed on the first display 504-1 comprises displaying the second portion 1850*a-d* of the first content on the second display 504-2 (e.g., the second content comprises the second portion of the first content). In some embodiments, the first display displays the text portion of the first content while the second display displays the image portion of the first content so that the two types of content are viewable side-by-side. For example, the first content is optionally a news article including text and images. When the electronic device is flattened, the first display is optionally updated to display the text of the article and the second display is optionally updated to display the images of the article that are related to the text that is presently displayed on the first display (e.g., not images related to the text of the article that is not currently displayed on the first display). In some embodiments, when the first display is updated to display a different portion of text from the article, the second display is optionally also updated to display images related to the different portion of text from the article that is currently displayed on the first display.

The above-described manner of displaying the first portion of the first content on the first display while displaying the second portion of the first content on the second display allows the user to view the two portions of the first content concurrently, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, such as in FIG. 18Z, while displaying the second portion 1850*a-d* of the first content on the second display 504-2, wherein the second portion 1850*a-d* of the first content includes a plurality of items (e.g., images corresponding to the text content displayed on the first display), the electronic device 500 receives (1998-36), via the one or more input devices, an input 1803 selecting a respective item 1850*a* of the plurality of items (e.g., an image of the plurality of images).

In some embodiments, in response to the input 1803 selecting the respective item 1850*a* of the second portion of the first content displayed on the second display 504-2 (1998-38) (e.g., the second display optionally displays images from the first content and the electronic device receives an input selecting one of the images), such as in FIG. 18Z, the electronic device updates (1998-40) the first display 504-1 to present a third portion 1852 (e.g., a portion of text) of the first portion 1848 of the first content corresponding to the selected item 1850*a* of the second portion of the first content, such as in FIG. 18AA. In some embodiments, selecting an image displayed on the second display causes the text displayed on the first display to scroll to a portion of text associated with the selected image. In some embodiments, the text is one or more of a caption of the selected image, a portion of the text that refers to the selected image, or related to the selected image in some other way. For example, the first content is optionally a news article including text and images. The first display optionally displays the text of the article while the second display optionally displays a plurality of images from the article, including but not limited to one or more images related to the portion of text currently being displayed on the first display. In response to detecting the selection of an image related to a portion of text of the article that is not presently displayed on the first display, the electronic device optionally updates the first display to display the portion of the article's text that is related to the selected image.

The above-described manner of displaying a different portion of the first content displayed on the first display in response to selecting an item of the second portion of the first content displayed on the second display allows the user to navigate the first content based on the information displayed on the second display, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, while displaying the second portion 1805*a-d* of the first content on the second display 504-2 and the first portion 1848 of the first content on the first display 504-1, wherein the second portion 1850*a-d* of the first content includes a plurality of items corresponding to the first portion of the first content (e.g., images corresponding to the text content displayed on the first display), the electronic device receives (1998-42), via the one or more input devices, an input corresponding to a request to zoom out (e.g., to display more content at a smaller size) of the first portion of the first content displayed on the first display (e.g., the input to zoom out is received at the first display, such as a pinch gesture to zoom out of the content displayed on the first display), in a manner similar to the movement of contacts 1803*a-b* illustrated in FIG. 18DD.

In some embodiments, such as in FIG. 18EE in response to the input to zoom out (e.g., to display more content at a smaller size) of the first portion of the first content 1816*a* on the first display (1998-44), the electronic device 500 updates (1998-46) the first display 504-2 to display the first portion of the first content and a third portion of the first content (e.g., displaying more of the first content on the first display, because the content (e.g., text) is now displayed at a smaller size). FIG. 18EE illustrates zooming out of article 1816*a* while displaying related content 1818*d*-1826*d* on the second display. In some embodiments, while displaying text 1848 on the first display 504-1 and images 1850*a-d* on the second display 504-2, such as in FIG. 18AA, the electronic device

500 receives an input to zoom out the text 1848 and displays additional text on the first display 504-1 in response to the input.

In some embodiments, such as in FIG. 18EE, the electronic device 500 updates (1998-48) the second display 504-2 to display the plurality of items 1818*d*-1826*d* corresponding to the first portion of the first content 1816*a* on the first display 504-1 and one or more items 1820*e* corresponding to the third portion of the first content on the first display. In some embodiments, in response to an input to zoom out of the first content, increase the number of images of the first content displayed on the second display. For example, the first portion of the first content is optionally a news article and the second portion of the first content is optionally one or more images that appear in the news article. In response to detecting an input to zoom out of the news article on the first display, the electronic device optionally decreases the size of each displayed image on the second display and displays additional images on the second display that correspond to the now-visible portion of the news article on the first display. FIG. 18EE illustrates displaying an additional content item 1820*e* on the second display 504-2 in response to the input to zoom the content 1816*a* out. In some embodiments, in response to receiving the request to zoom out while displaying text 1848 on the first display 504-1 and images 1850*a-d* on the second display 504-2, such as in FIG. 18AA, the electronic device 500 displays additional figures on the second display 504-2 in response to the input.

The above-described manner of zooming out of the second portion of the first content in response to an input to zoom out of the first content allows the user to view more items of the second portion of the first content, allowing the user to view more of the second portion of the first content at once, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, prior to displaying the first content 1816*a* on the first display 504-1 (e.g., the top display) and the second content 1818*a*-1826*a* on the second display 504-2 (e.g., the bottom display), such as in FIG. 18B, the electronic device 500 displays (1998-50), on the electronic device a home screen user interface, such as in FIG. 18A (e.g., a user interface including a plurality of icons representing applications, files, or other content selectable to display the represented application, file, or other content). In some embodiments, displaying the home screen comprises concurrently displaying: on the first display 504-1, one or more first items 1802 and 1806 (e.g., icons, status information, news information, time information, weather information) that are not customized to a user of the electronic device (1998-52) (e.g., icons associated with applications or information that do not change in accordance with user actions or the profile of the specific user with which the electronic device is configured, such as a weather icon or information, a news icon or information, or a time icon or information, among others) and on the second display 504-2, one or more second items 1808,1812, and 1814 (e.g., icons, status information, news information, time information, weather information, items related to recent activities of the user, recent documents created, edited or viewed by the user, music controls for music currently being played by the user, widgets for applications designated by the user) that are customized to the user of the electronic device 500 (1998-54) (e.g., icons associated with applications or information that is able to be changed in accordance with user actions or preferences, such as items related to recent activity on the electronic device, recent documents or files, music controls, user-selected widgets, among others). Thus, in some embodiments, in the home screen user interface, the top display includes generic information that might be useful for inclusion on a home screen, and the bottom display includes user-specific information that might be useful for inclusion on a home screen.

In some embodiments, the first content 1816*a* on the first display 504-1 and the second content 1818*a*-1826*a* on the second display 504-2 illustrated in FIG. 18B are displayed in response to detecting selection 1803 (e.g., a tap entered using a touch screen, a click entered using a mouse or trackpad, a keyboard command, a voice command, etc.) of a respective item 1804*a* of the one or more first items or the one or more second items (1998-56), as illustrated in FIG. 18A. In some embodiments, the first content on the first display comprises content corresponding to the selected respective item (1998-58) (e.g., the selected respective item is an icon for presenting the first content).

In some embodiments, the second content 1818*a*-1826*a* on the second display comprises one or more controls for navigating the first content on the first display (1998-60), such as scrolling the content 1816*a* as shown in FIG. 18E in response to selection of an item of content 1820*b* as shown in FIG. 18D. In some embodiments, the second content is selectable to navigate the first content. For example, the selected respective item is optionally an affordance selectable to display a news application. In some embodiments, the news application optionally includes a user interface for presenting, on the first display, previews of one or more articles (e.g., trending articles, recent articles, articles recommended based on the user's reading history, etc.) and presenting, on the second display, one or more affordances for navigating the news application (e.g., affordances to browse articles based on topic, publisher, date, browsing history, or other criteria). While running the news application, the electronic device optionally presents a news article on the first display and related content on the second display that is selectable to navigate to related portions of the article. For example, the related content optionally includes one or more keywords and the selection of one of the keywords on the second display optionally causes the first display to update to display a portion of the article related to the selected keyword.

The above-described manner of presenting an item of content on the first display while displaying representations of related content on the second display in response to a selection of a home screen icon allows the user to view related items of content concurrently with the selected item of content which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

It should be understood that the particular order in which the operations in FIGS. 19A-19O have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1700, and 2100) are also applicable in an analogous manner to method 1900 described above with respect to FIGS. 19A-19O. For example, the content, electronic devices, user interfaces, user interactions, etc., described above with reference to method 1900 optionally have one or more of the characteristics of the content, electronic devices, user interfaces, user interactions, etc. described herein with reference to other methods described herein (e.g., methods 700, 900, 1100, 1300, 1500, 1700, and 2100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 19A-19O are, optionally, implemented by components depicted in FIGS. 1A-1B. For example, receiving operations 1908, 1952, 1968, 1998, 1998-6, 1998-36, and 1998-42 and displaying operations 1904, 1922, 1956, 1974, 1980, 1984, and 1998-32 are, optionally, implemented by event sorter 170, event recognizer 180, and event handler 190. Event monitor 171 in event sorter 170 detects a contact on touch screen 504-1, 504-2, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Soft Keyboard User Interfaces

Users interact with electronic devices in many different manners, including entering text at one or more user interfaces presented by the electronic devices. For example, a user may wish to enter text using a soft keyboard presented on the electronic devices. The embodiments described below provide ways in which an electronic device presents user interfaces including soft keyboards across multiple displays, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 20A:
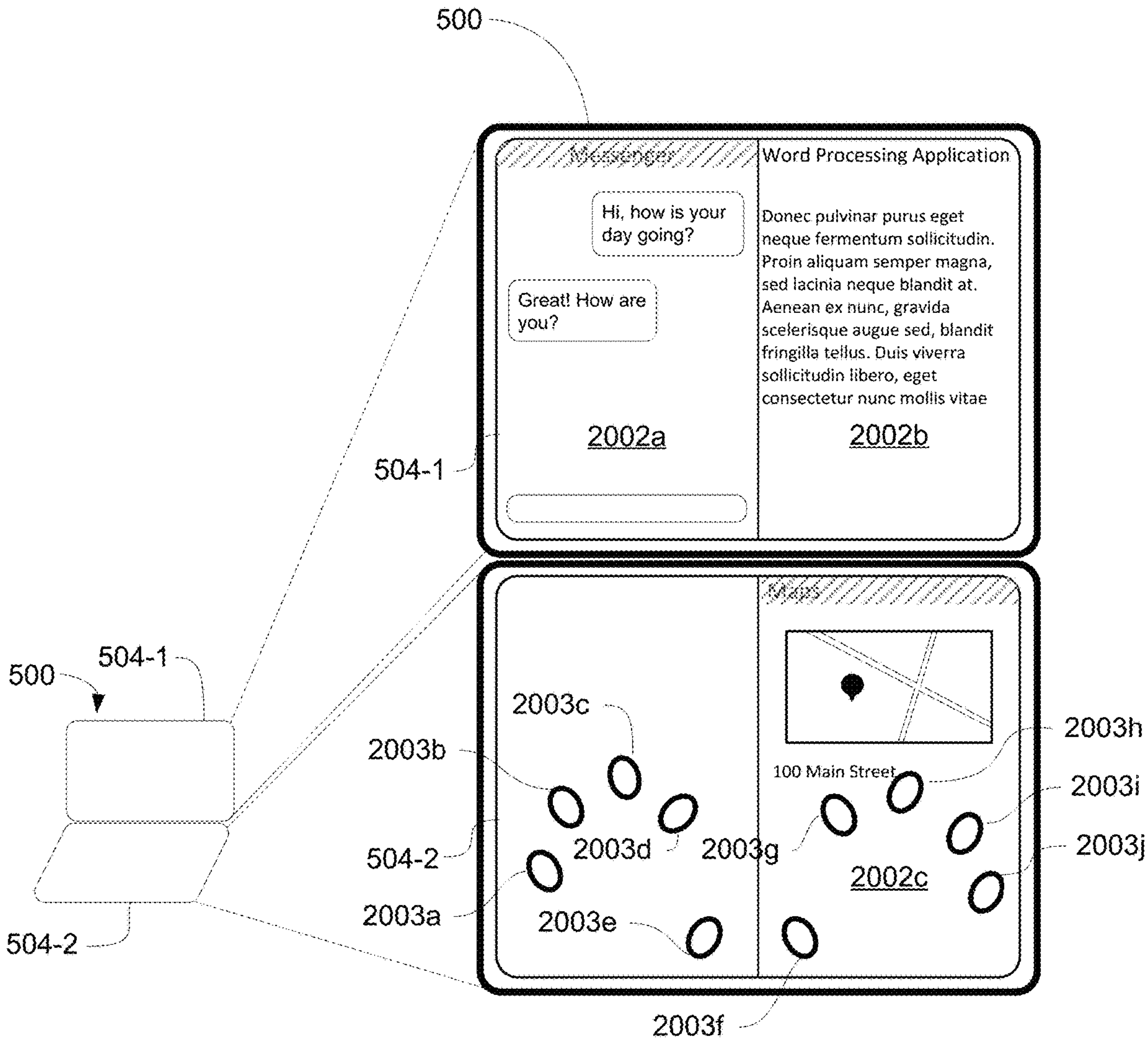
FIGS. 20A-20CC illustrate exemplary ways in which an electronic device presents user interfaces including a soft keyboard in accordance with some embodiments of the disclosure.
Figure 20B:
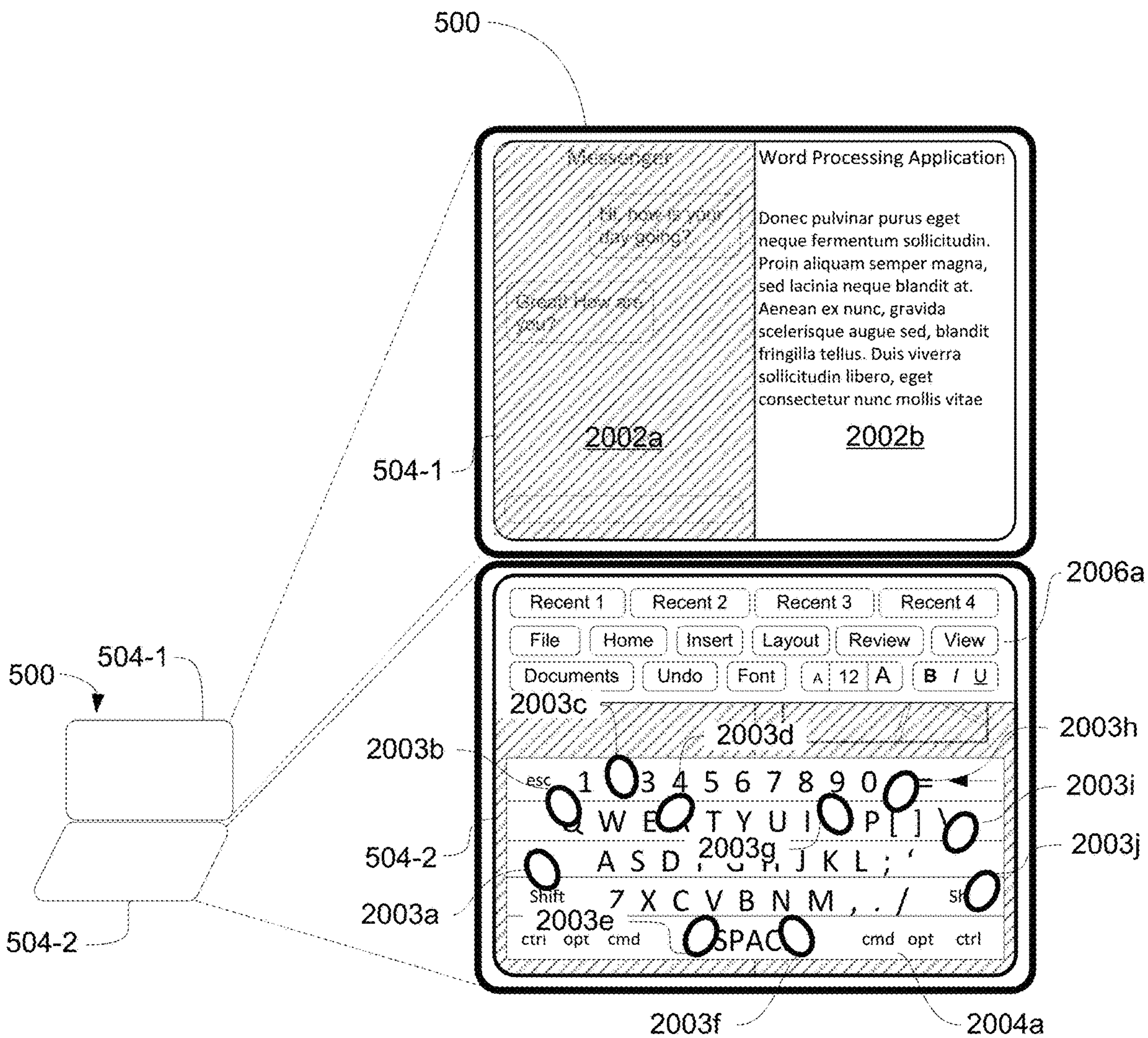
Figure 20C:
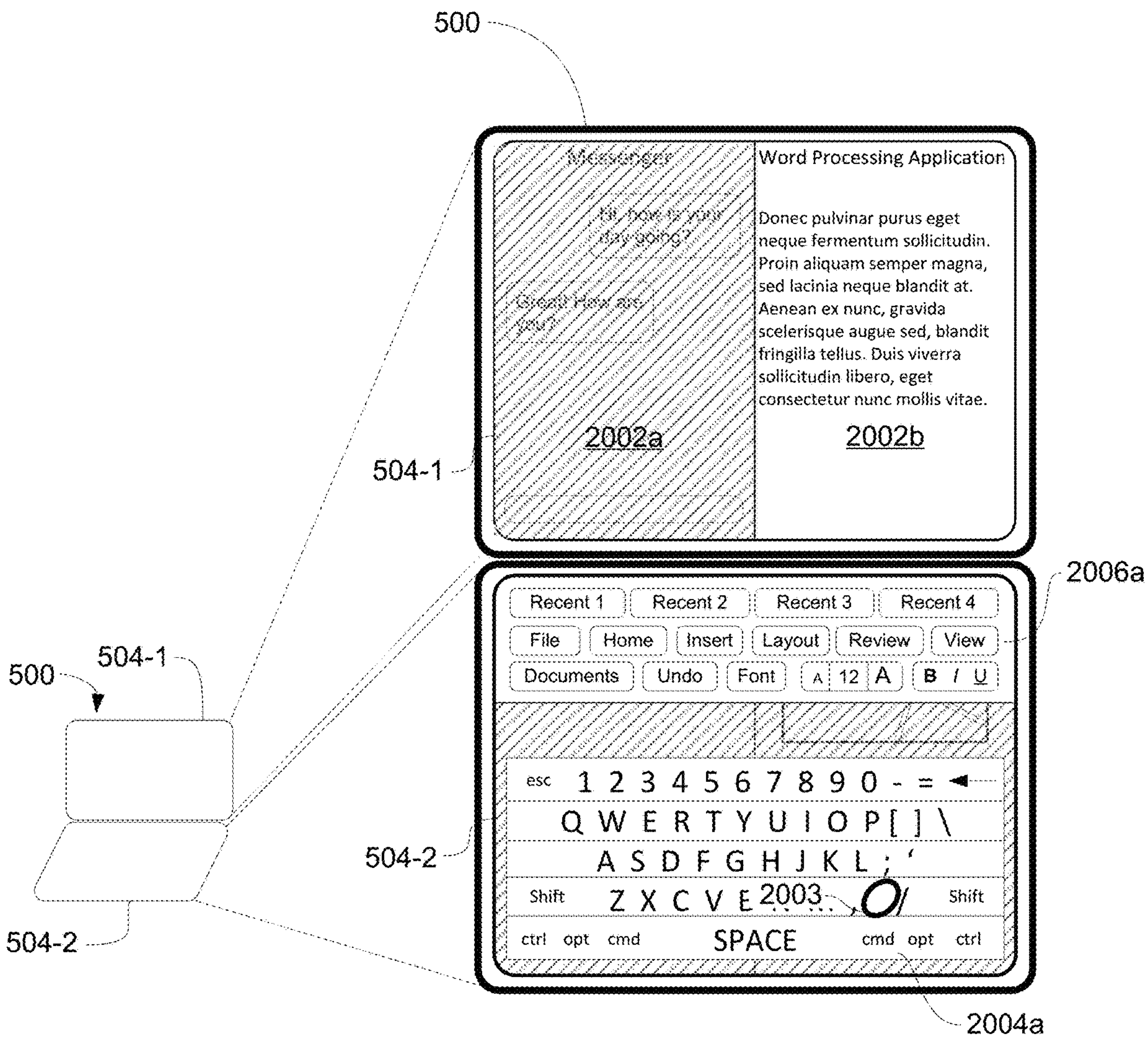

FIGS. 20A-20CC illustrate exemplary ways in which an electronic device presents user interfaces including a soft keyboard in accordance with some embodiments of the disclosure. The embodiments in these figures are used to illustrate the processed described below, including the processes described with reference to FIGS. 21A-21N.

FIG. 20A illustrates exemplary device 500 with touch screens 504-1 and 504-2, such as described with reference to FIGS. 5A-5H. Touch screens 504-1 and 504-2 optionally display one or more user interfaces that include various content. In the example illustrated in FIG. 20A, the electronic device 500 presents a messaging user interface 2002*a* and a word processing user interface 2002*b* on the first touch screen 504-1 and a maps user interface 2002*c* on the second touch screen 504-2. As shown in FIG. 20A, the electronic device 500 detects a plurality of contacts 2003*a-j* on the second touch screen 504-2 in the shape of a user setting their hands/finger tips on the second touch screen 504-2. In response to the detected contacts 2002*a-j*, as shown in FIG. 20B, the electronic device 500 presents a soft keyboard and a tool bar on the second touch screen 504-2.

FIG. 20B illustrates presentation of the soft keyboard 2004*a* and toolbar 2006*a* in response to detection of the contacts 2003*a-j* illustrated in FIG. 20A. In the example illustrated in FIG. 20B, the word processing application 2002*b* has the input focus of the soft keyboard 2004*a*. Therefore, the word processing application user interface 2002*b* has an active appearance (e.g., not greyed out), while the messaging application user interface 2002*a* has an inactive appearance (e.g., greyed out). Also, the toolbar 2006*a* includes selectable options related to the word processing application 2002*b*.

As shown in FIG. 20C, in response to detecting a contact 2003 at a key of the soft keyboard 2004*a*, the electronic device 500 enters the character or performs the operation corresponding to the key at which the contact was detected in the word processing user interface 2002*b* (and not the messaging interface 2002*a*). For example, in FIG. 20C, the user selects (e.g., with contact 2003) the period key and, in response, the electronic device enters a period in the word processing application user interface 2002*b*.

Figure 20D:
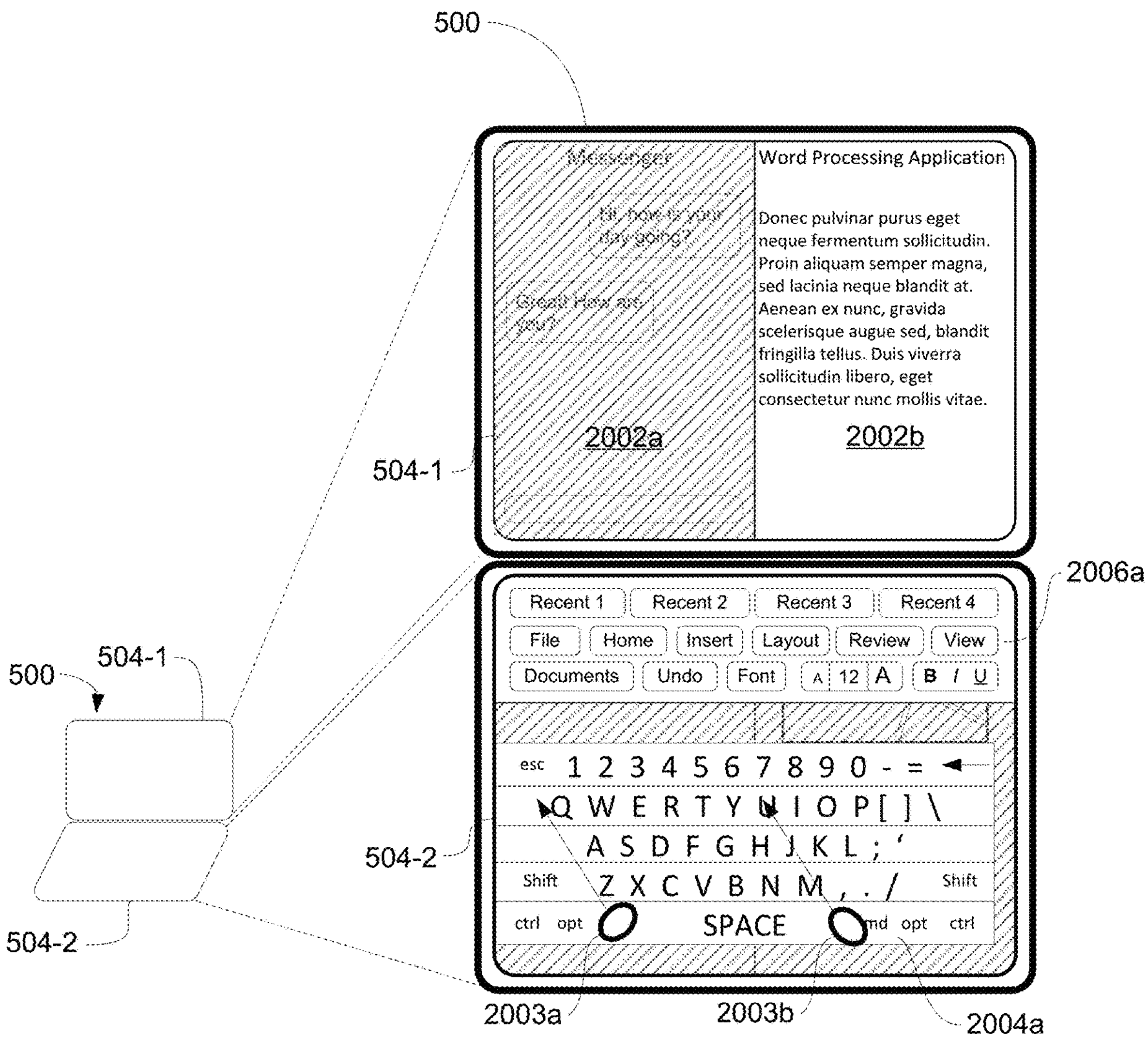

In FIG. 20D, the electronic device 500 detects contacts 2003*a* and 2003*b* at the space bar of the soft keyboard 2004*a* and movement of the contacts towards the messaging user interface 2002*a*. In response to the detected movement of the contacts 2003*a* and 2003*b*, the soft keyboard 2004*a* optionally shifts its position on the second electronic device 504-2 and, as shown in FIG. 20E, the electronic device 500 changes the soft keyboard focus from the word processing application 2002*b* to the messaging application 2002*a*.

Figure 20E:
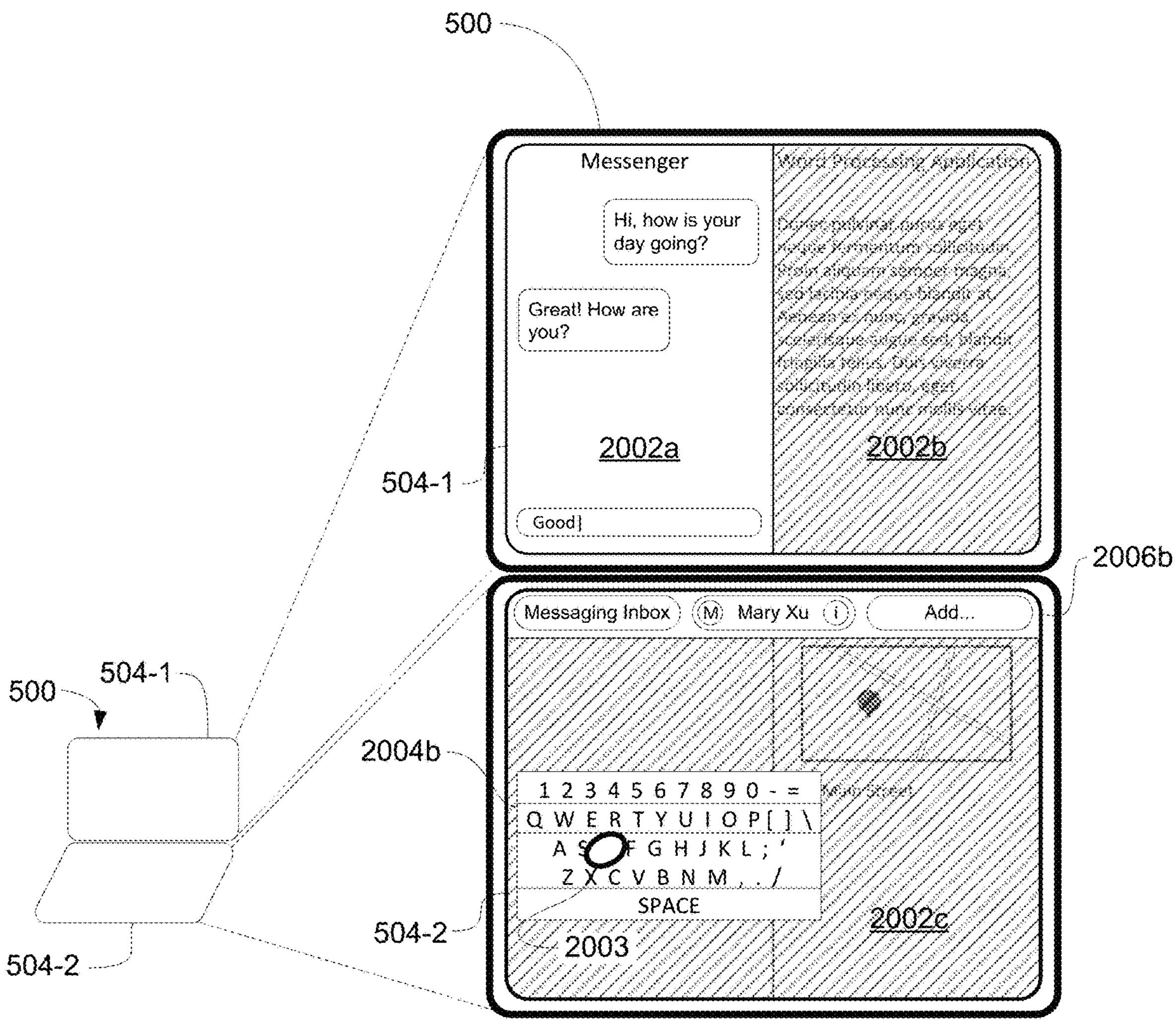

FIG. 20E illustrates the electronic device 500 after it changed the keyboard focus from the word processing application 2002*b* to the messaging application 2002*a*. The messaging application user interface 2002*a* has an active appearance and the word processing application user interface 2002*b* has an inactive appearance. The toolbar 2006*b* includes selectable options that, when activated, cause the electronic device 500 to perform operations related to the messaging application.

As shown in FIG. 20E, the soft keyboard 2004*b* is presented at a smaller size that is closer to the size of the messaging user interface 2002*a* based on the context of the messaging application. In other words, when the application that has the input focus of the soft keyboard 2004*b* changes, the size and/or functionality of the soft keyboard changes to match the context of the application that now has the keyboard focus. When the word processing application 2002*b* had the input focus of the soft keyboard in FIG. 20D, for example, electronic device 500 presented a full-size soft keyboard 2002*a*. Now that the messaging application 2002*a* has the input focus of the soft keyboard in FIG. 20E, the electronic device 500 presents an application-sized keyboard 2002*b*. The size of the toolbar 2006*b* is also reduced to match the size of the soft keyboard and to include tools related to the messaging application 2002*a* (e.g., one row of buttons in FIG. 20E, as opposed to three rows of buttons in FIG. 20D).

In response to detecting a contact 2003 at the soft keyboard 2004*b*, the electronic device 500 enters a character or performs an operation corresponding the key at the location of the contact, such as entering the character "d" in the messaging user interface 2002*a* (and not the word processing interface 2002*b*) in response to the user's contact 2003 illustrated in FIG. 20E.

Figure 20F:
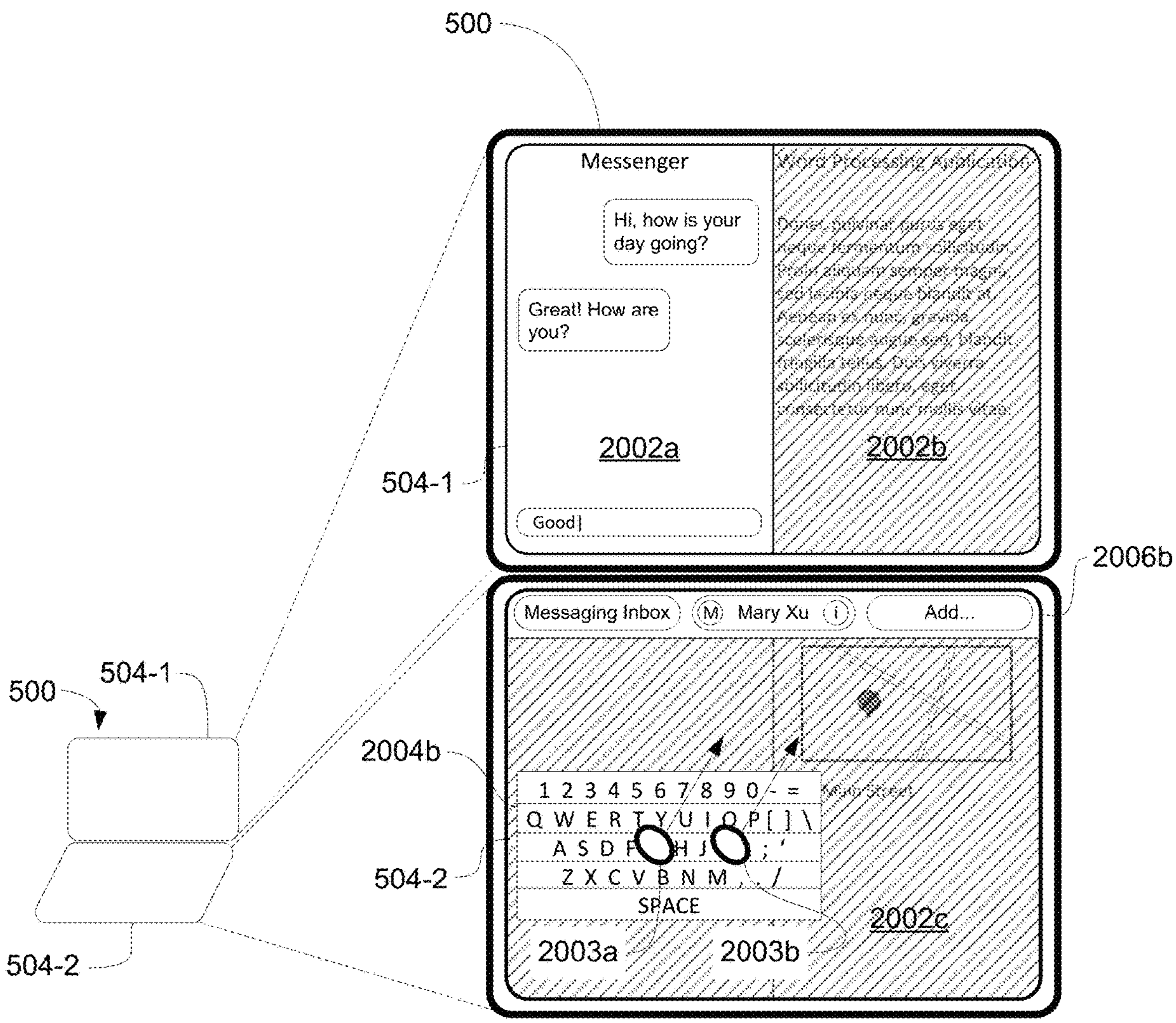

FIG. 20F illustrates the electronic device 500 detecting two contacts 2003*a* and 2003*b* and substantially similar movement of the two contacts on the second touch screen 504-2. As shown in FIG. 20F, the contacts 2003*a* and 2003*b* are detected at locations that are not the space bar of the soft keyboard 2004*b*. In response to detecting the contacts 2003*a-b* and the movement of the contacts, as shown in FIG. 20G, the electronic device 500 moves the soft keyboard 2004*b* within the second touch screen 504-2 in accordance with the movement of the contacts without changing which application on touch screen 504-1 has the current keyboard focus.

Figure 20G:
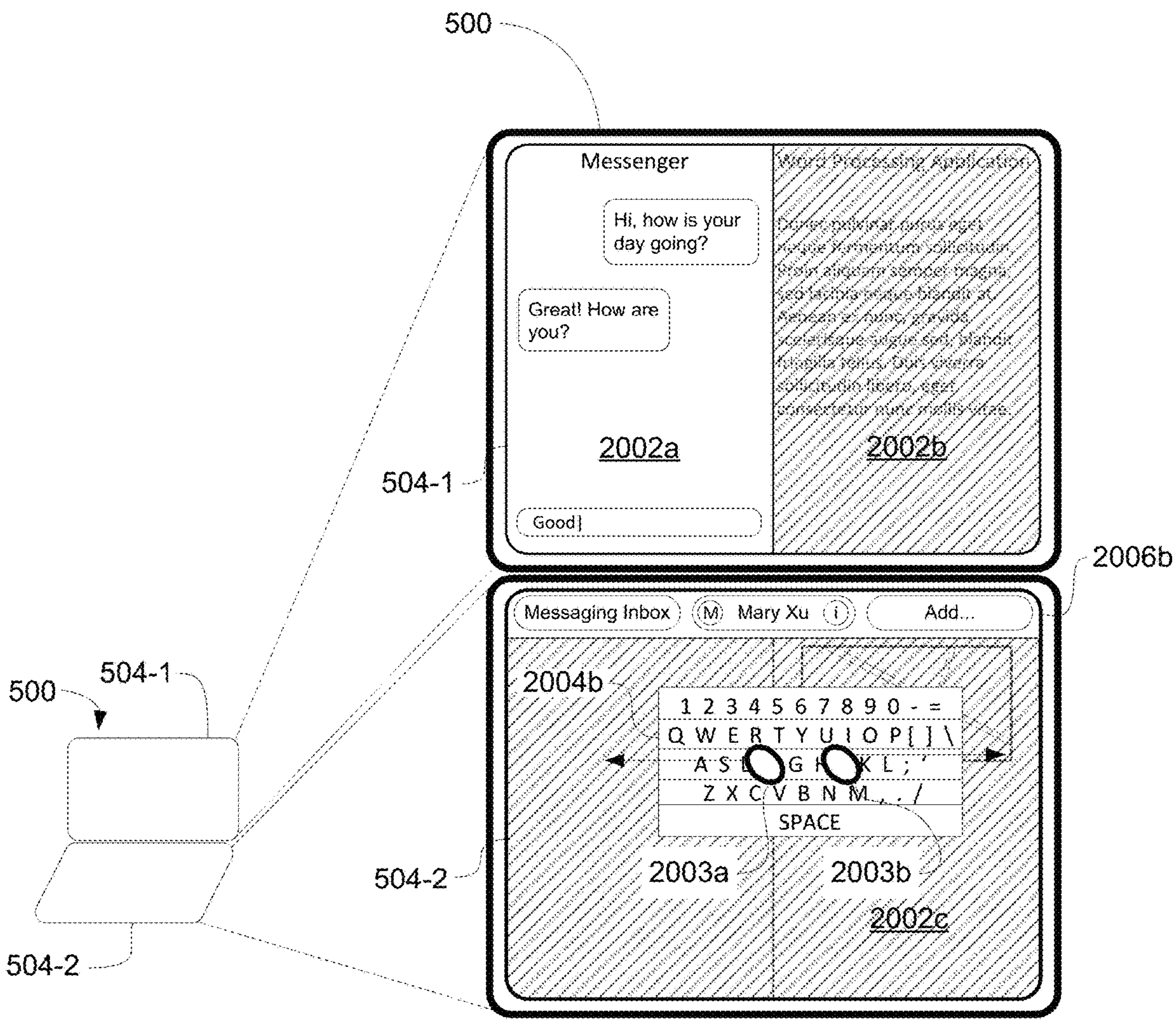
Figure 20H:
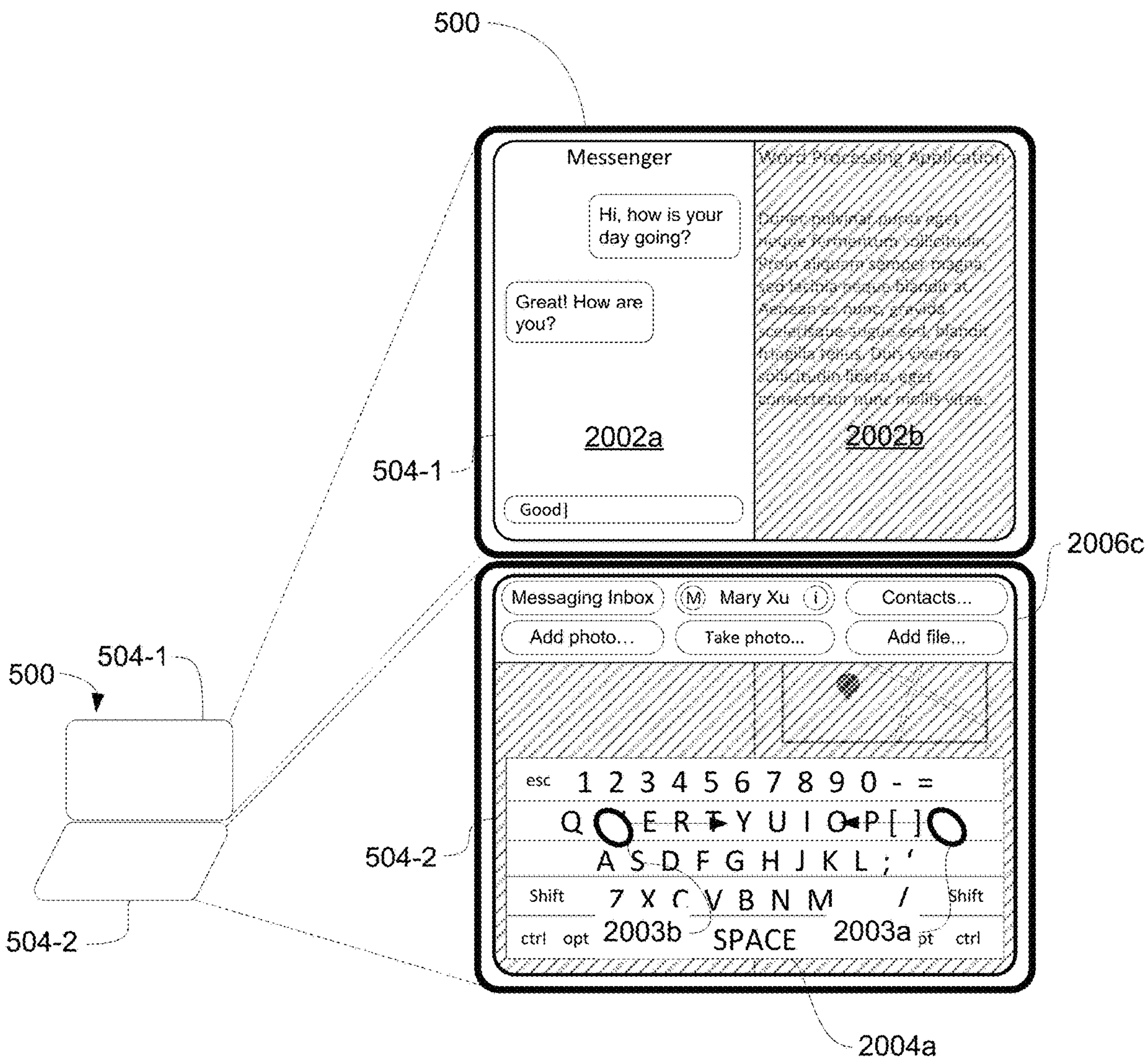

FIGS. 20G-20L illustrate ways in which the electronic device 500 resizes the soft keyboard 2004. As shown in FIG. 20G, the electronic device 500 detects two contacts 2003*a-b* at locations of the soft keyboard 2004*b* and movement of the two contacts away from each other (e.g., a de-pinch or zoom in gesture). In response to detecting the gesture, the electronic device 500 increases the size of the soft keyboard, as shown in FIG. 20H.

FIG. 20H illustrates presentation of a full-size soft keyboard 2004*a* in response to detecting the gesture illustrated in FIG. 20G. As shown in FIG. 20H, the toolbar 2006*c* is also resized to include additional buttons related to the messaging application user interface 2002*a* in response to detecting the gesture to resize the soft keyboard, such as buttons to "Add photo . . . ," "Take photo . . . ," or "Add file . . . ". Resizing the soft keyboard 2004*a* increases the size of the soft keyboard and increases the number of keys to include function keys such as "shift," "ctrl," "opt," and "esc." As shown in FIG. 20H, the electronic device 500 detects two contacts 2003*a-b* on the soft keyboard 2004*a* and movement of the contacts 2003*a-b* towards one another (e.g., a pinch or zoom out gesture). In response to detecting the gesture, as shown in FIG. 20I, the electronic device 500 resizes the soft keyboard to the application-sized soft keyboard 2004*b* described above with reference to FIG. 20G and resizes toolbar 2006*b*.

Figure 20I:
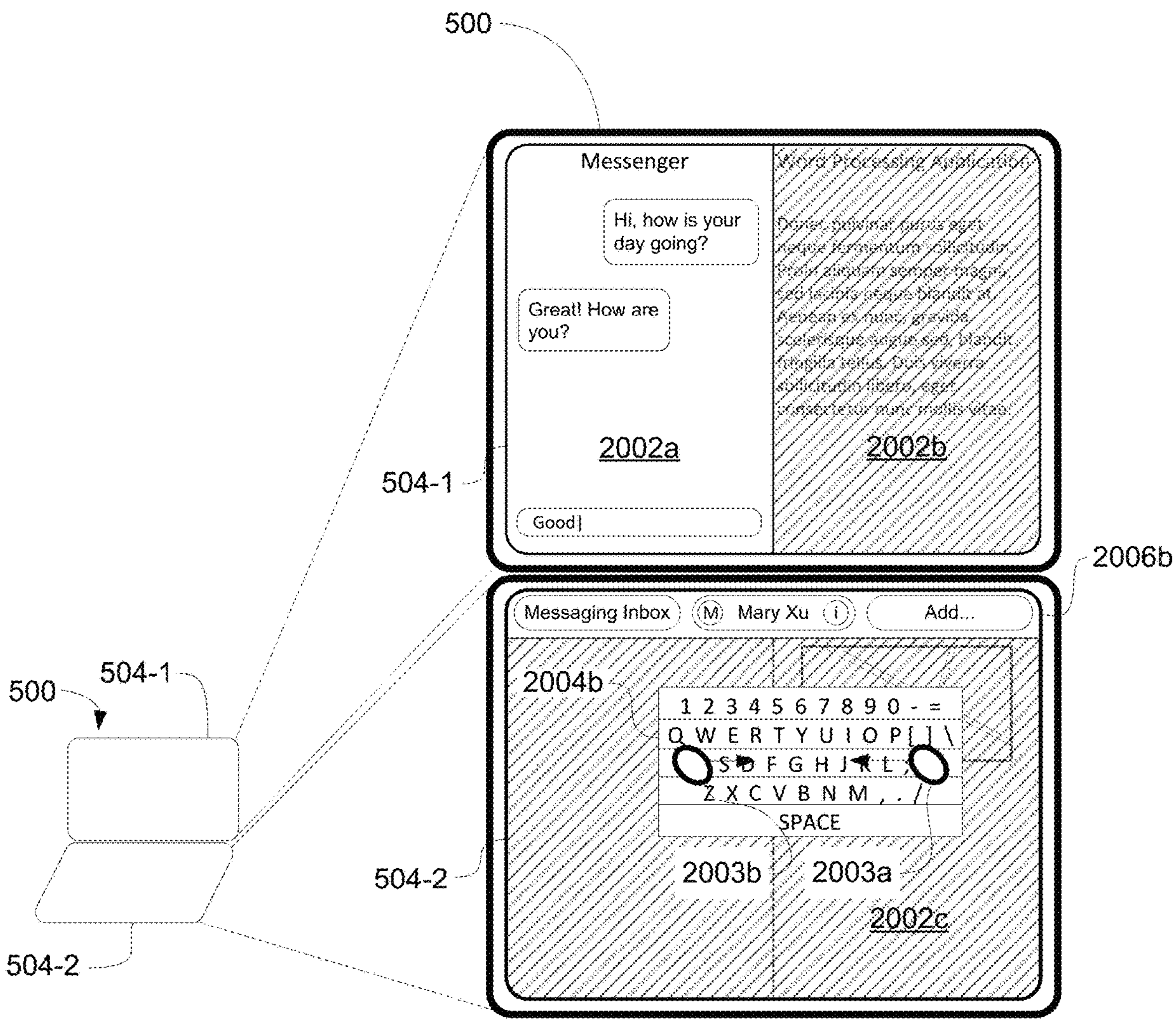

As shown in FIG. 20I, the electronic device 500 again detects two contacts 2003*a-b* and movement of the two contacts towards each other (e.g., a pinch or zoom out gesture). In response to detecting the gesture, as shown in FIG. 20J, the electronic device 500 decreases the size of the soft keyboard and toolbar.

Figure 20J:
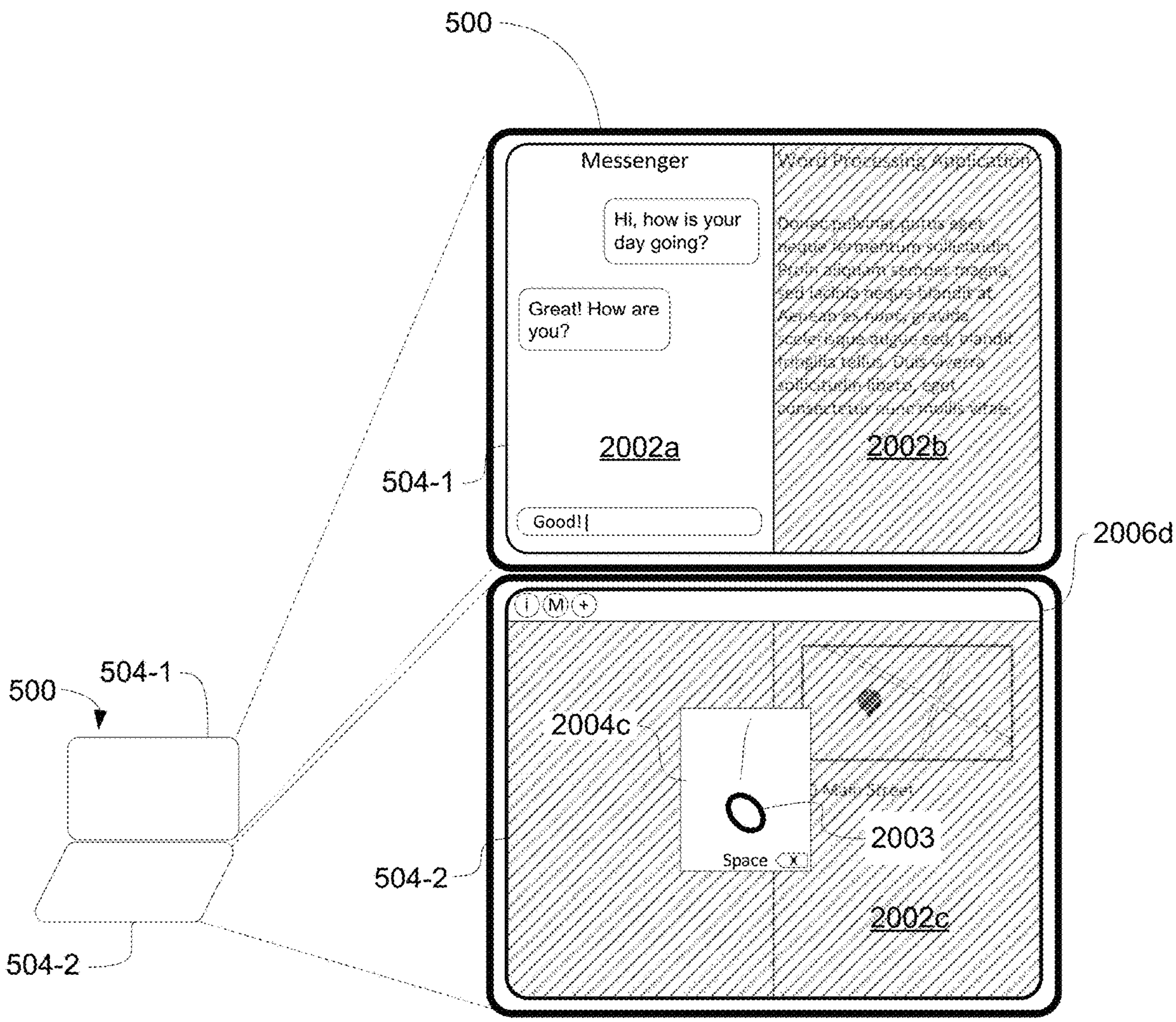

FIG. 20J illustrates presentation of a handwriting soft keyboard 2004*c* in response to detecting the gesture illustrated in FIG. 20I. As shown in FIG. 20J, the toolbar 2006*d* also decreases in size in response to detecting the gesture illustrated in FIG. 20I. Rather than including the "Messaging Inbox" button, the button related to the contact with whom the electronic device 500 is messaging, and the "Add . . . " button that are included in the toolbar 2006*b*, the toolbar 2006*d* includes smaller buttons to increase the space on the second touch screen 504-2 not used for the soft keyboard 2004*c* and toolbar 2006*d*. In response to detecting movement of one or more contacts in the handwriting soft keyboard 2004*c*, the electronic device 500 enters, in the messaging user interface 2002*a* (e.g., because that is the interface with the current keyboard focus), one or more characters corresponding to the detected movement. For example, in response to detecting a sequence of contacts and movements of contacts in the shape of an exclamation point, the electronic device 500 enters an exclamation point in the messaging user interface 2002*a*, as shown in FIG. 20J.

Figure 20K:
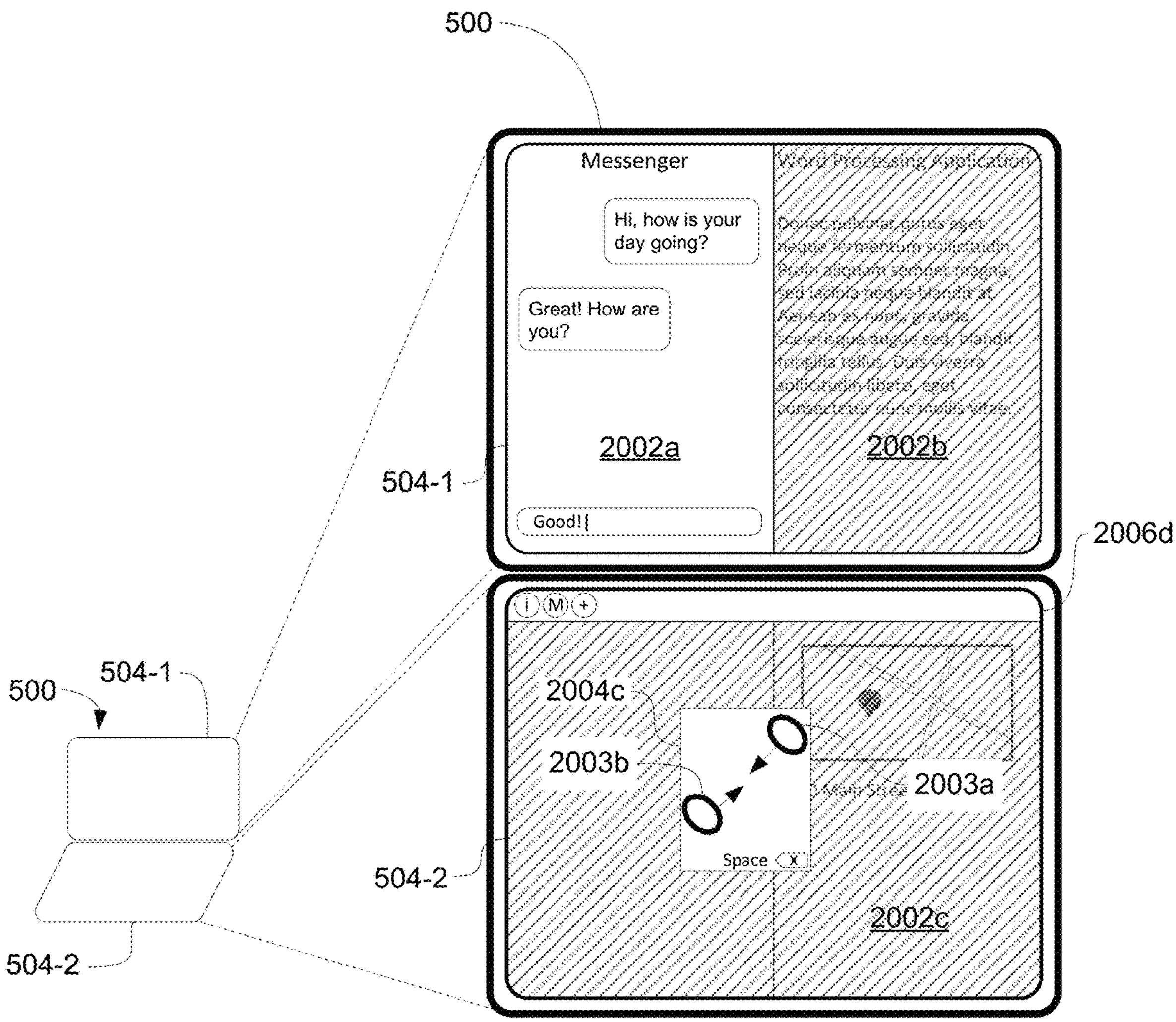

In FIG. 20K, the electronic device 500 detects two contacts 2003*a-b* and movement of the two contacts towards each other (e.g., a pinch or zoom out gesture) within the handwriting soft keyboard 2004C. In response to detecting the gesture, as shown in FIG. 20L, the electronic device 500 ceases display of the soft keyboard 2004*c* on touch screen 504-2 and instead displays a selectable button on touch screen 504-2 that when activated causes the electronic device 500 to present the soft keyboard on touch screen 504-2.

Figure 20L:
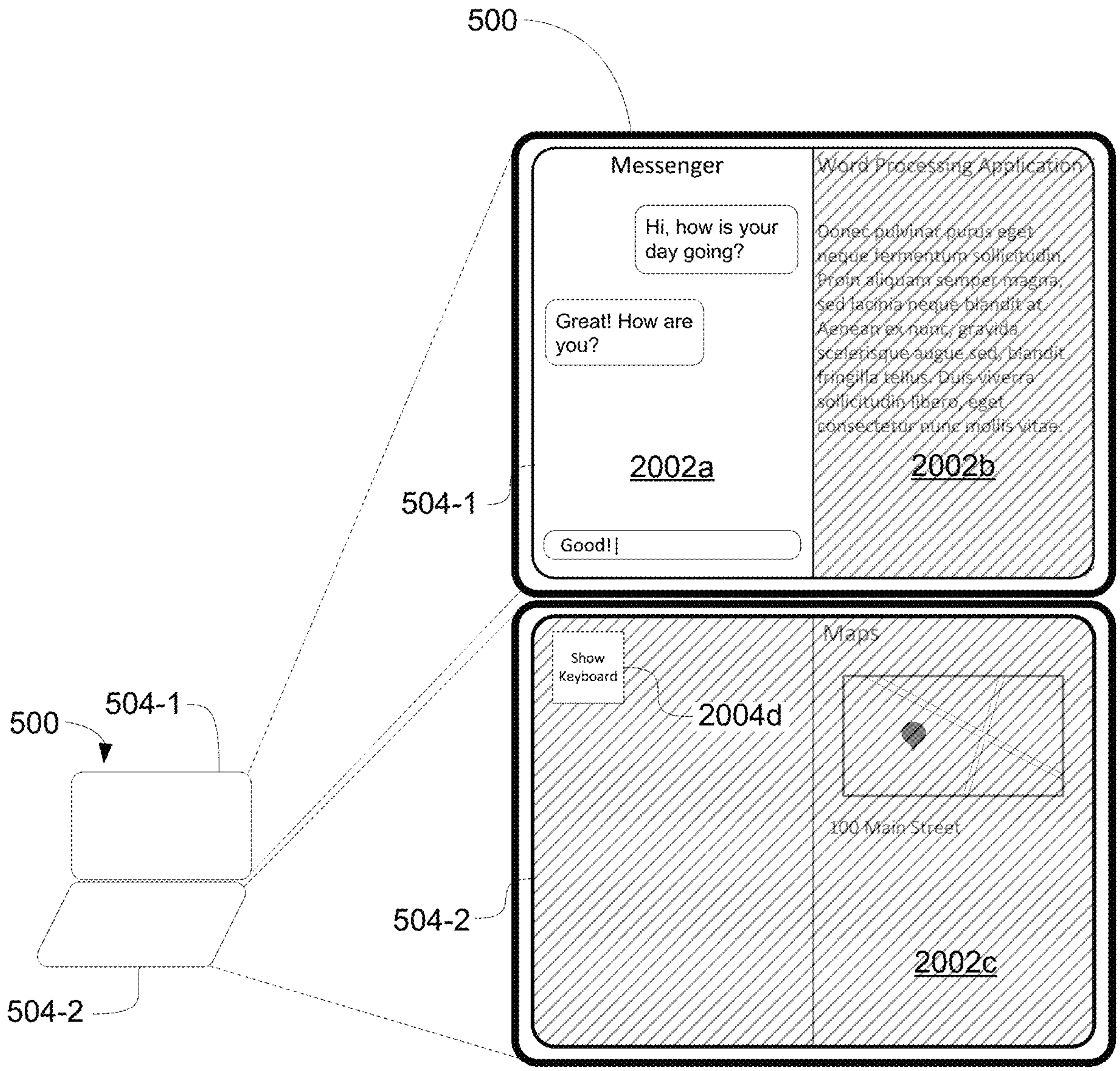

FIG. 20L illustrates a soft keyboard button 2004*d* presented by the electronic device 500 in response to detecting the gesture illustrated in 20K. In addition to ceasing the display of the soft keyboard 2004*c*, the electronic device 500 also ceases the display of the toolbar 2006*d*.

Figure 20M:
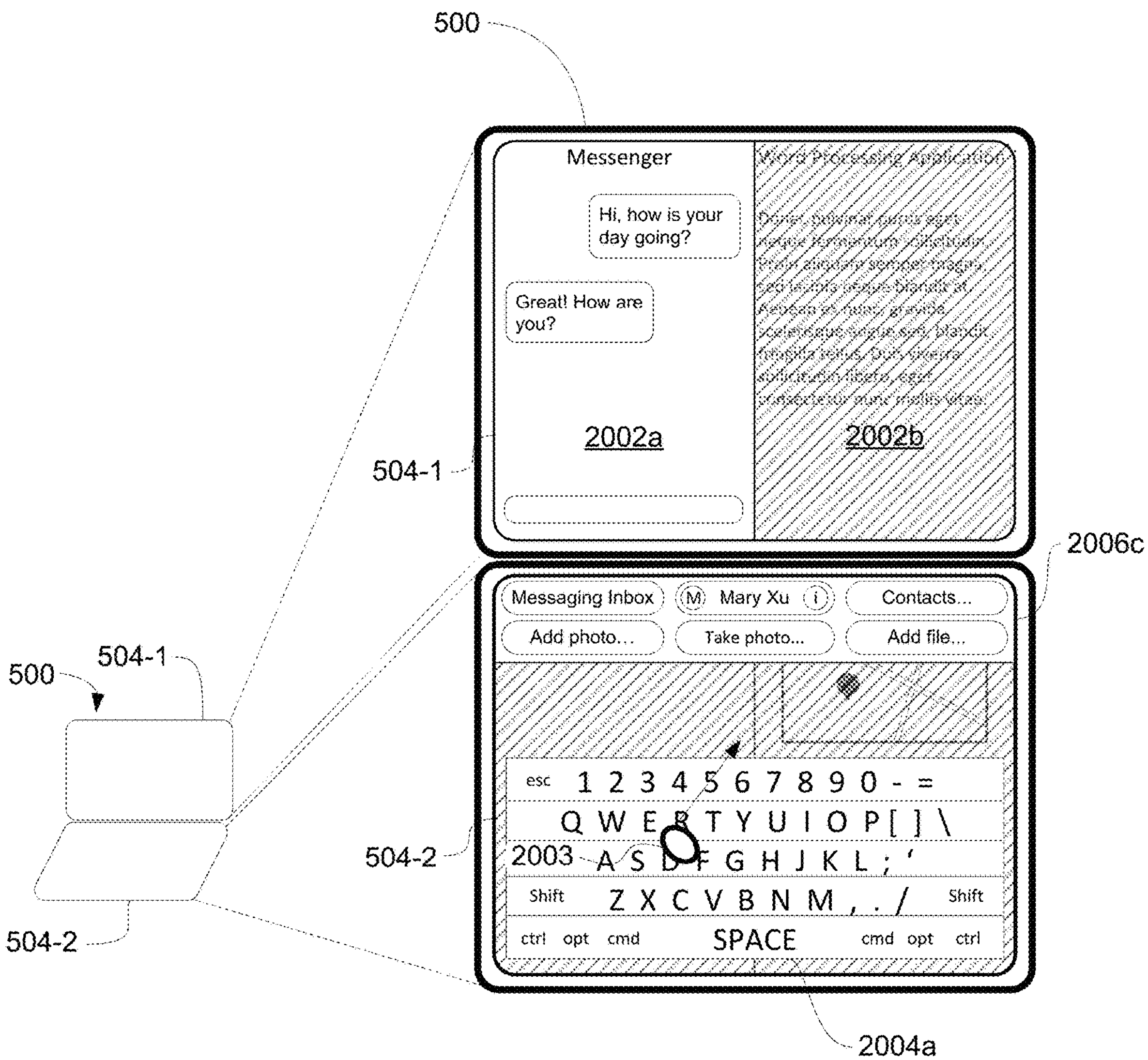

FIG. 20M illustrates the electronic device 500 presenting a soft keyboard 2004*a* on the second touch screen 504-2. The electronic device 500 detects a contact 2003 and movement of the contact towards the word processing user interface 2002*b*, as shown in FIG. 20M. In response to detecting the gesture, as shown in FIG. 20N, the electronic device 500 changes the keyboard focus from the messaging application 2002*a* to the word processing application 2002*b*.

Figure 20N:
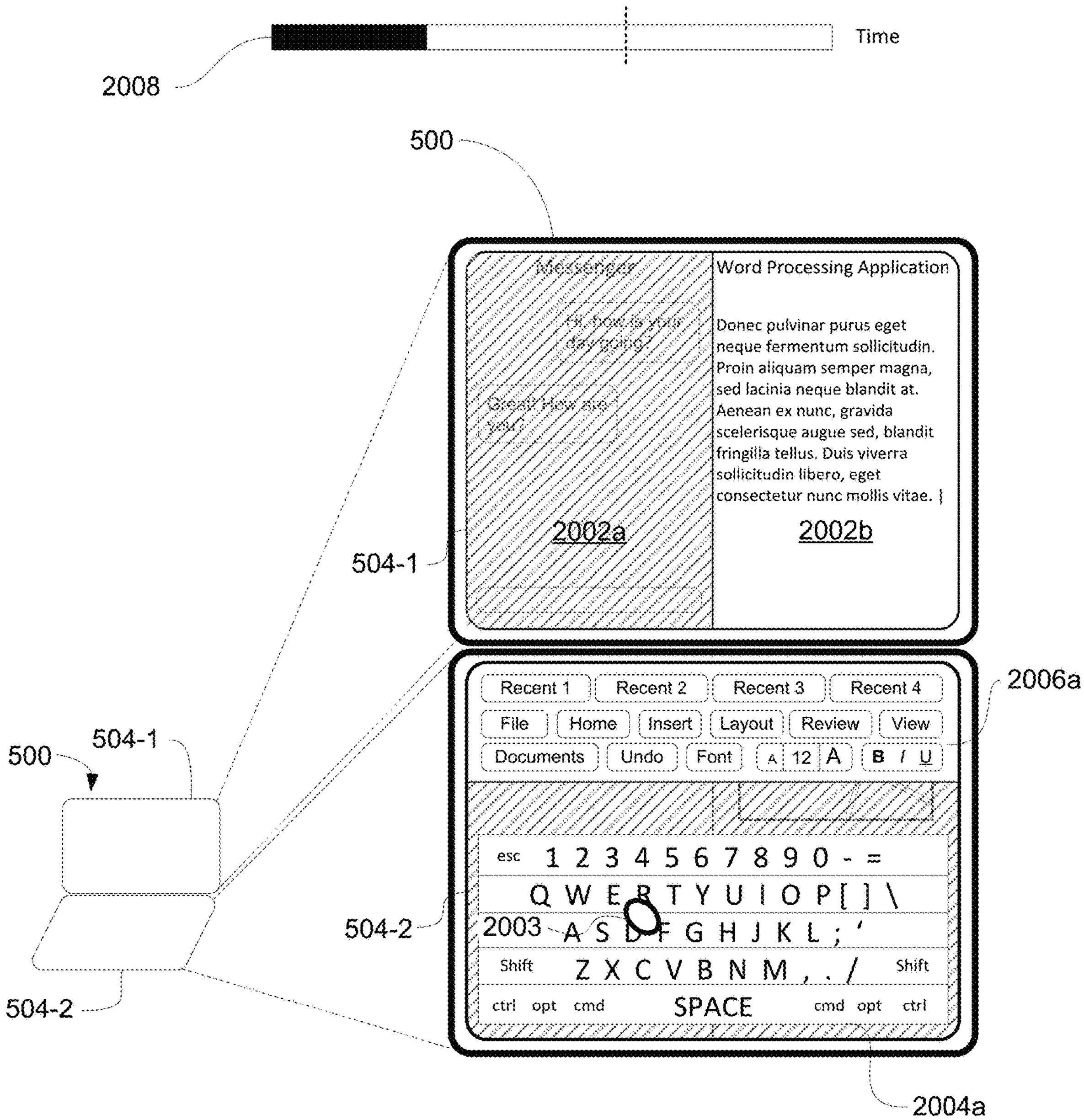

FIG. 20N illustrates the electronic device 500 presenting the word processing user interface 2002*b* with an active appearance after receiving the soft keyboard input focus in response to detecting the gesture illustrated in FIG. 20M. In response to the change of the input focus of the soft keyboard, the electronic device 500 updates the messaging user interface 2002*a* to have an inactive appearance. The toolbar 2006*a* is updated to include buttons related to the word processing application, as previously described.

FIGS. 20N-20Q illustrate exemplary ways the electronic device 500 presents and moves a cursor on the first touch screen 504-1 in response to one or more gestures detected on the soft keyboard displayed on the second touch screen 504-2.

Figure 20O:
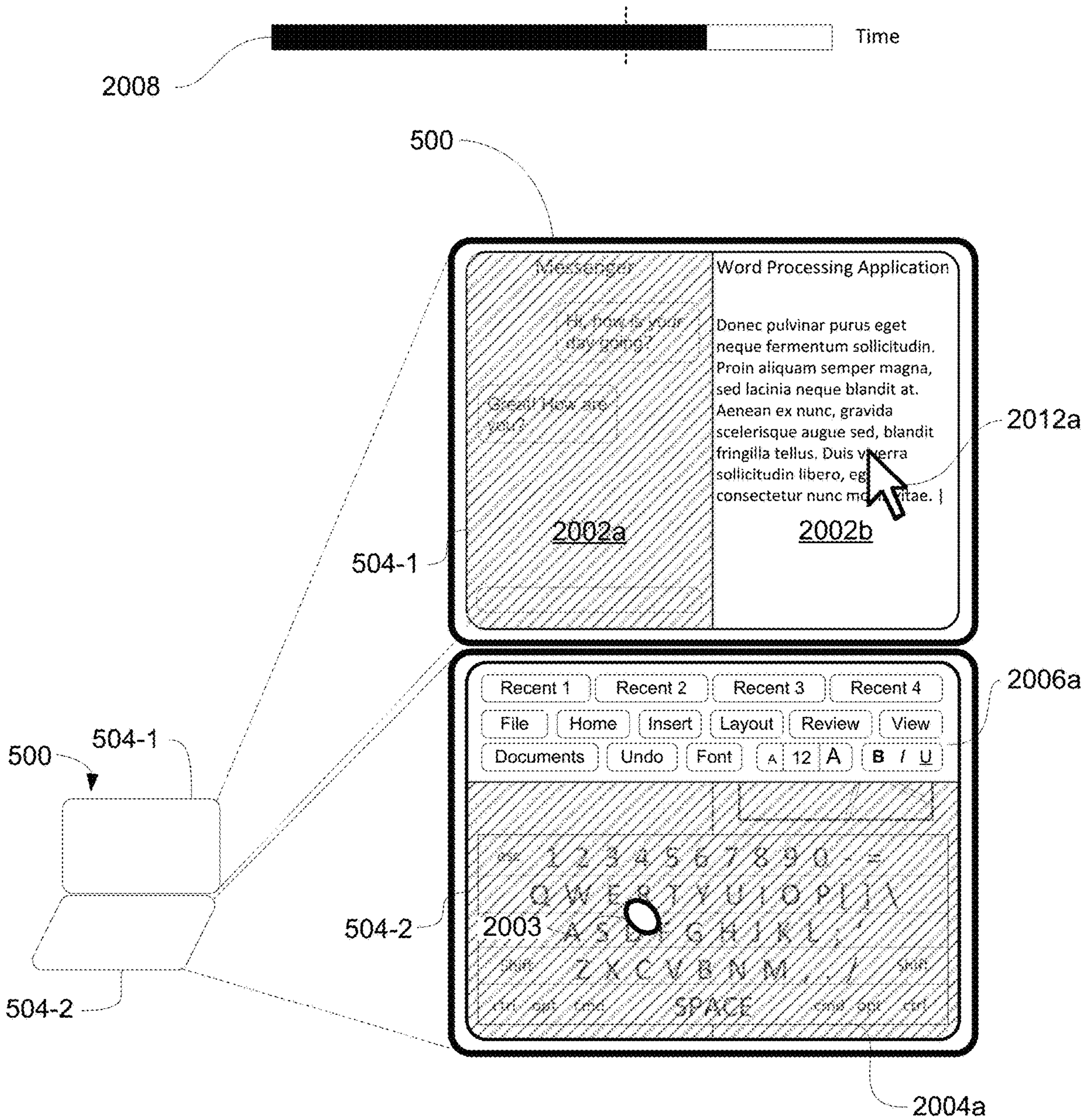

As shown in FIG. 20N, the electronic device 500 detects a contact 2003 at the soft keyboard and continues to detect the contact for the time 2008 that the contact 2003 is held on the second touch screen 504-2 of the electronic device 500. As shown in FIG. 20O, the electronic device 500 continues to detect the contact 2003 for an amount of time 2008 that reaches a threshold amount of time for presenting a cursor on the first touch screen 504-1. In response to detecting the contact 2003 for the threshold amount of time 2008, the electronic device 500 presents, on the first touch screen 504-1 within the word processing user interface 2002*b* (e.g., because that is the interface with the current keyboard focus), a cursor 2012*a*. While displaying the cursor 2012*a* on the first touch screen 504-1, the electronic device 500 displays the soft keyboard 2004*a* on the second touch screen 504-2 with an inactive (e.g., greyed out) appearance. As shown in FIG. 20O, the cursor 2012*a* is initially displayed at an enlarged size to make it easier for the user to locate because the cursor 2012*a* was previously not displayed and the user may not know where the cursor 2012*a* will be initially displayed.

Figure 20P:
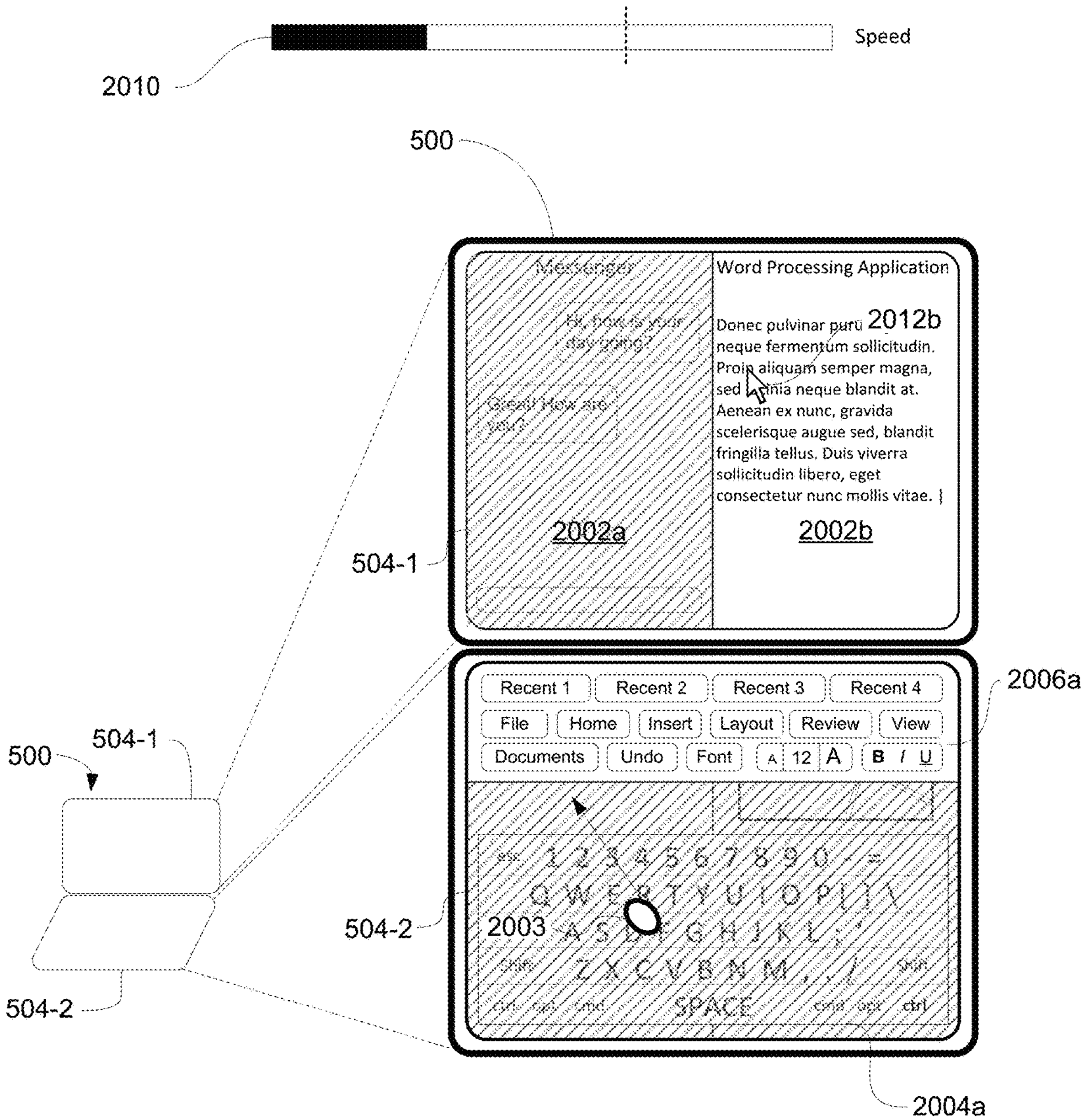

FIG. 20P illustrates presentation of the cursor 2012*b* in the user interface of the word processing application. As opposed to the cursor 2012*a* illustrated in FIG. 20O, the cursor 2012*b* illustrated in FIG. 10P is displayed at a reduced size after initially appearing at an enlarged size, as illustrated in FIG. 20O. In FIG. 20P, the electronic device 500 continues to display the soft keyboard 2004*a* with an inactive appearance. While displaying the cursor 2012*b* in the user interface of the word processing application, the electronic device 500 detects movement of contact 2003 at a speed 2010 that is below a predetermined threshold speed. In response to detecting the movement of the contact 2003 at the speed 2010 below the predetermined threshold speed, the electronic device 500 moves the cursor 2012*b* within the user interface 2002*b* of the word processing application in accordance with the movement of contact 2003 (as shown in FIGS. 20O-20P).

Figure 20Q:
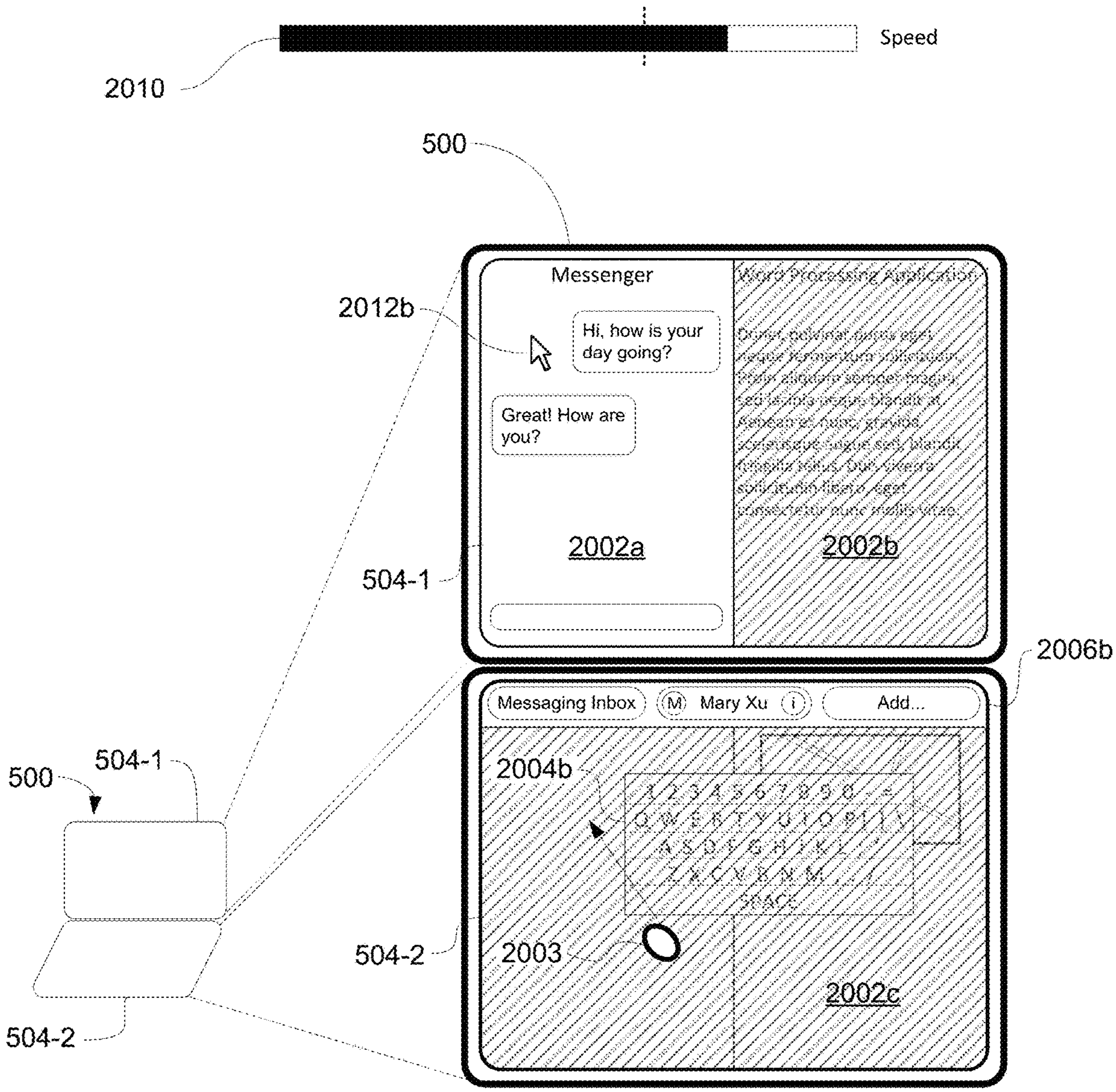

In FIG. 20Q, the electronic device 500 detects movement of a contact 2003 within keyboard 2004*a* at a speed 2010 that exceeds the predetermined speed threshold. In response to the detecting the movement of the contact at the speed 2010 above the predetermined speed threshold, the electronic device 500 changes the keyboard focus from the word processing application 2002*b* to the messaging application 2002*a* (e.g., because the messaging user interface 2002*a* is to the left of the word processing user interface 2002*b*, and the movement of contact 2003 is towards the left) and displays the cursor 2012*b* in the user interface of the messaging application 2002*a*. Once within interface 2002*a*, movements of contact 2003 within the soft keyboard on touch screen 504-2 that have speeds less than the above-mentioned speed threshold will optionally cause movement of the cursor within interface 2002*a*. If movement of contact 2003 within the soft keyboard is detected with speed higher than the speed threshold, and that movement is towards the right, the cursor will optionally move from interface 2002*a* back to interface 2002*b*.

Figure 20R:
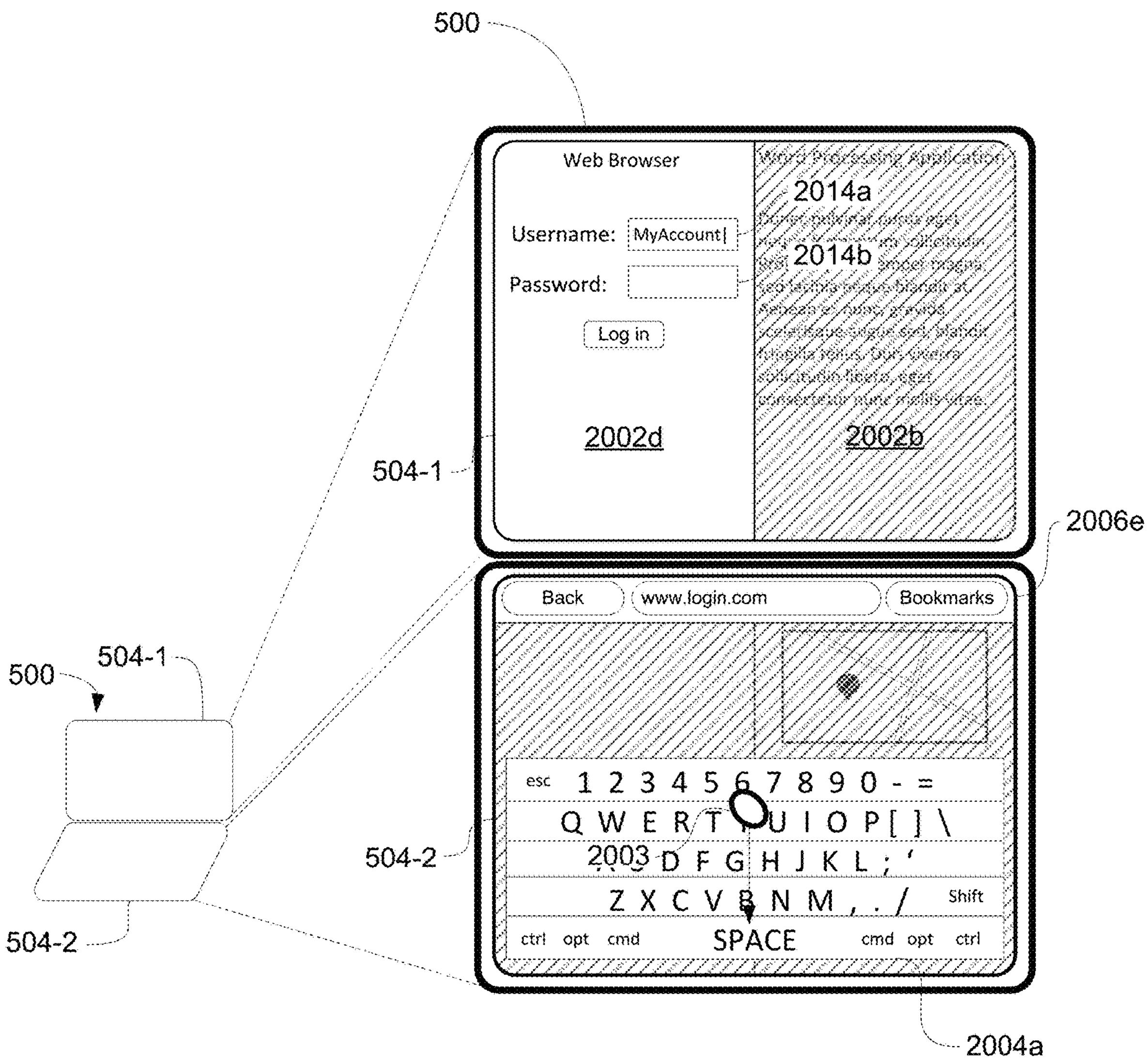

FIG. 20R illustrates presentation of a web browsing user interface 2002*d* on the first touch screen 504-1. While presenting the web browsing user interface 2002*d*, the first electronic device 500 presents a toolbar 2006*e* with web browsing-specific tools. The web browsing user interface includes two text entry fields 2014*a* and 2014*b*. In the example illustrated in FIG. 20R, the first text entry field 2014*a* has the input focus of the soft keyboard. As shown in FIG. 20R, the electronic device 500 detects a contact 2003 and movement of the contact in a downward direction within soft keyboard 2004*a*. In response to the detected gesture, as shown in FIG. 20S, the electronic device 500 changes the input focus of the soft keyboard from the first text entry field 2012*a* to the second text entry field 2012*b*.

Figure 20S:
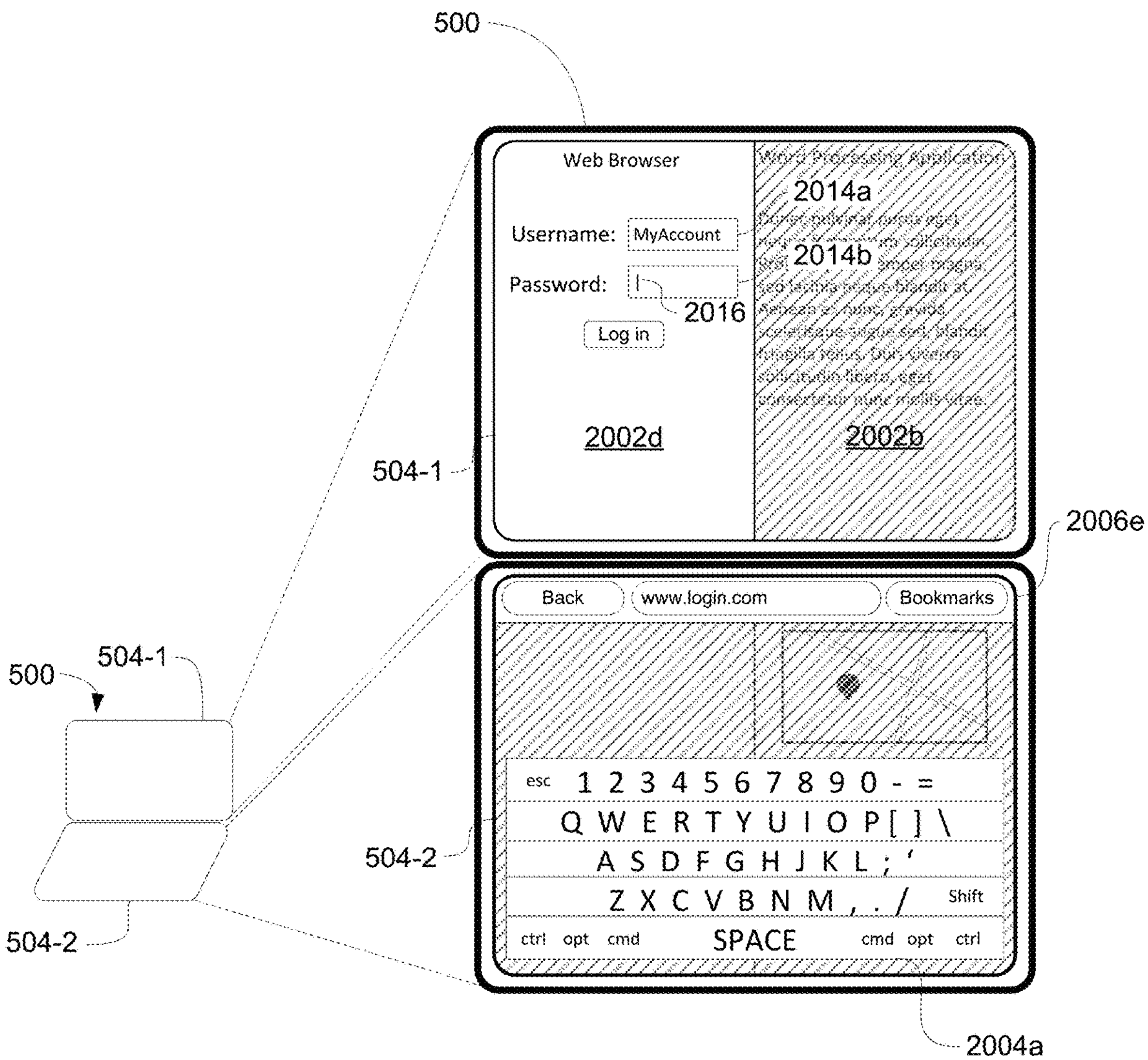

FIG. 20S illustrates the electronic device 500 after it changes the input focus of the soft keyboard from the first text entry field 2014*a* to the second text entry field 2014*b* in response to detecting the gesture illustrated in FIG. 20R. As shown in FIG. 20S, the electronic device presents the insertion marker 2016 in the second text entry field 2014*b*, thus indicating that the second text entry field 2014*b* has the input focus of the soft keyboard, and that text entry at soft keyboard 2004*a* will optionally now be provided to the second text entry field 2012*b*.

Figure 20T:
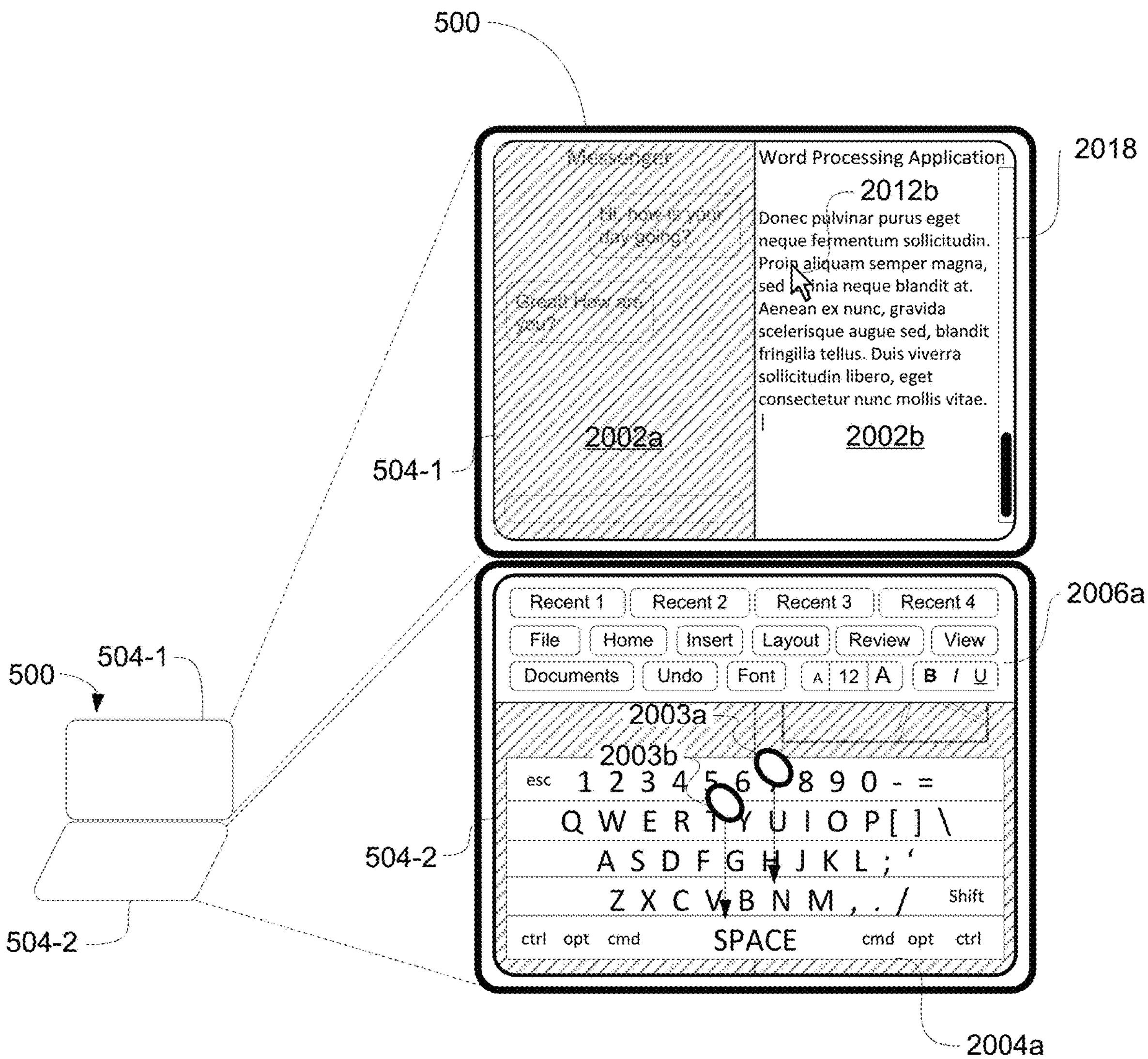
Figure 20U:
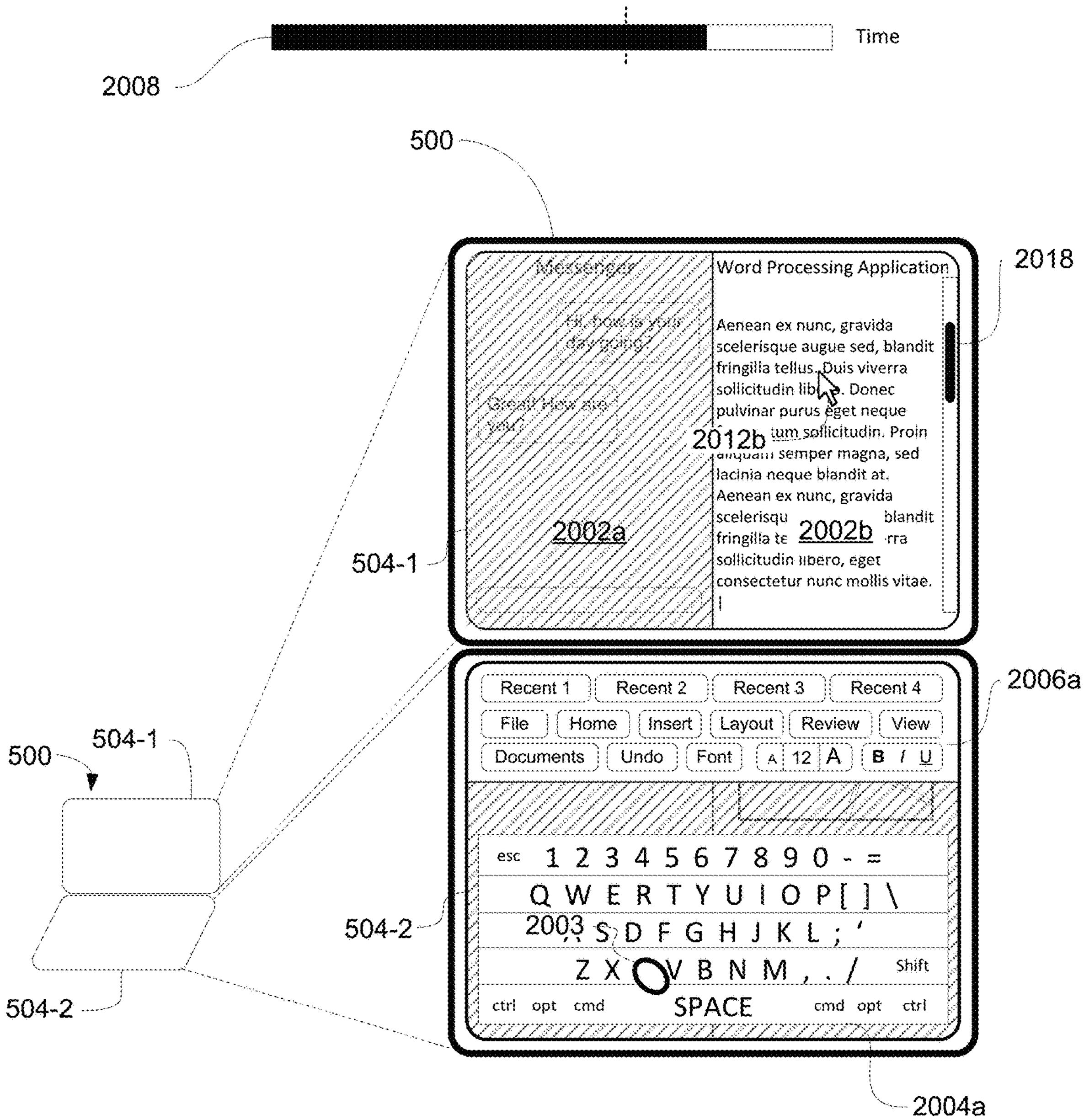

FIG. 20T illustrates the electronic device 500 scrolling content in response to a gesture detected at the soft keyboard 2004*a*. The electronic device 500 detects two contacts 2003*a-b* at locations of the second touch screen 504-2 that present the soft keyboard 2004*a* and movements of the contacts 2003*a-b* in a downwards direction. In response to detecting the contacts and the movement of the contacts, the electronic device 500 scrolls the word processing user interface 2002*b* in accordance with the movement of the contacts, as shown in FIG. 20U (e.g., because the word processing user interface 2002*b* had the keyboard focus when the contacts 2003*a-b* and their movements were detected). In some embodiments, soft keyboard 2004*a* is greyed out while the electronic device 500 detects movement of contacts 2003*a-b* in a manner similar to the greyed out appearance of soft keyboard 2004*b*.

As shown in FIG. 20U, in response to detecting the gesture in FIG. 20T, the electronic device 500 scrolls the content of the word processing application user interface up and updates the position of the scroll bar 2018 in accordance with the scrolling. As also shown in FIG. 20U, the electronic device 500 detects a contact 2003 at the soft keyboard for an amount of time 2008 that exceeds the predetermined threshold of time (e.g., 0.5, 1, or 2 seconds, or some other device-defined or user-defined amount of time). In response to detecting the contact 2003 for the time that exceeds the predetermined threshold amount of time, the electronic device 500 presents the cursor 2012*b* in the user interface 2002*b* of the word processing application, as described above with reference to FIG. 20O.

Figure 20V:
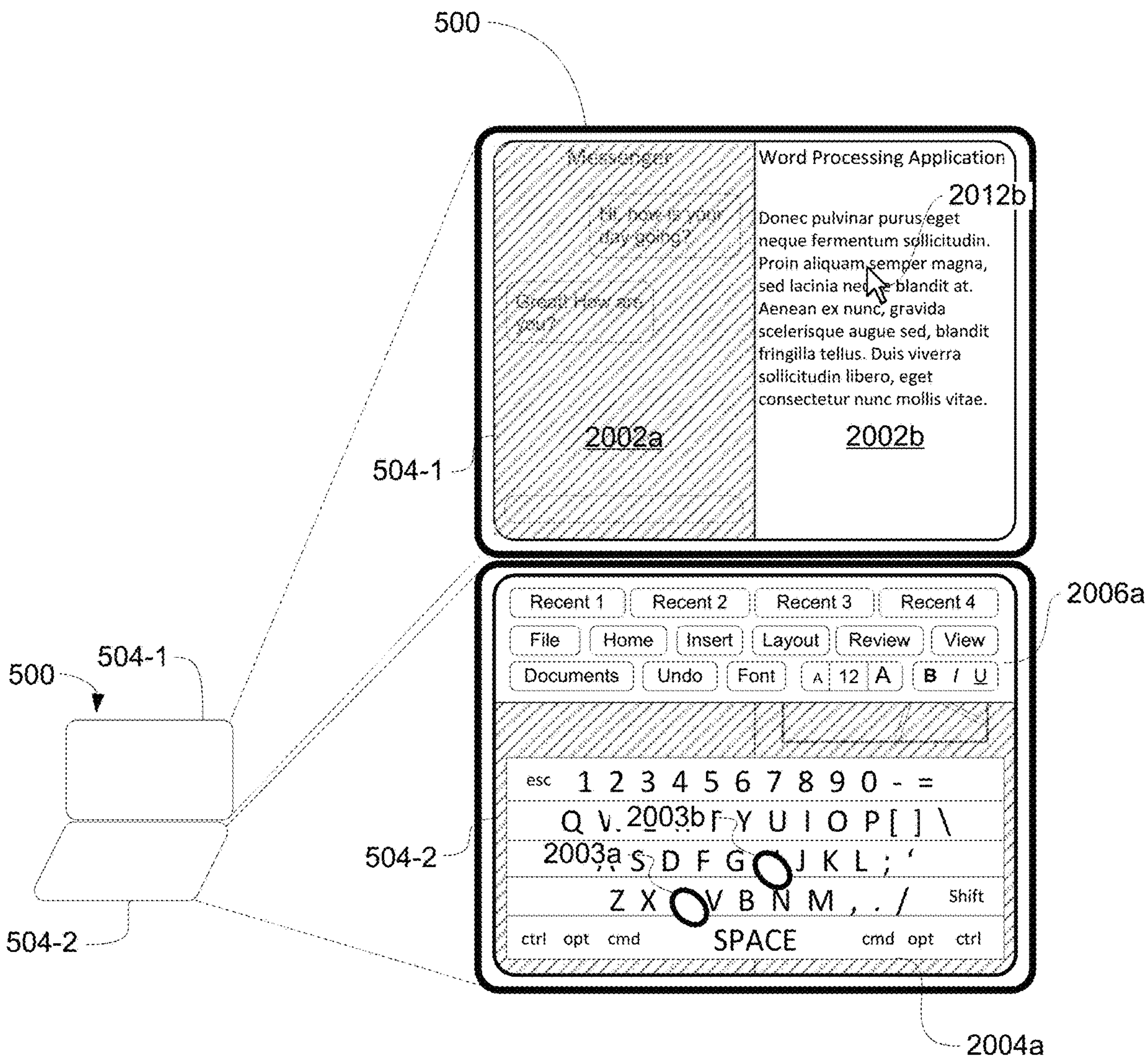

In FIG. 20V, the electronic device 500 detects two contacts 2003*a* and 2003*b* at an area of the second touch screen 504-2 where the soft keyboard is displayed. One of the two contacts 2003*a* or 2003*b* is the same contact 2003 illustrated in FIG. 10U that continues to be detected when the other contact is made by the user.

Figure 20W:
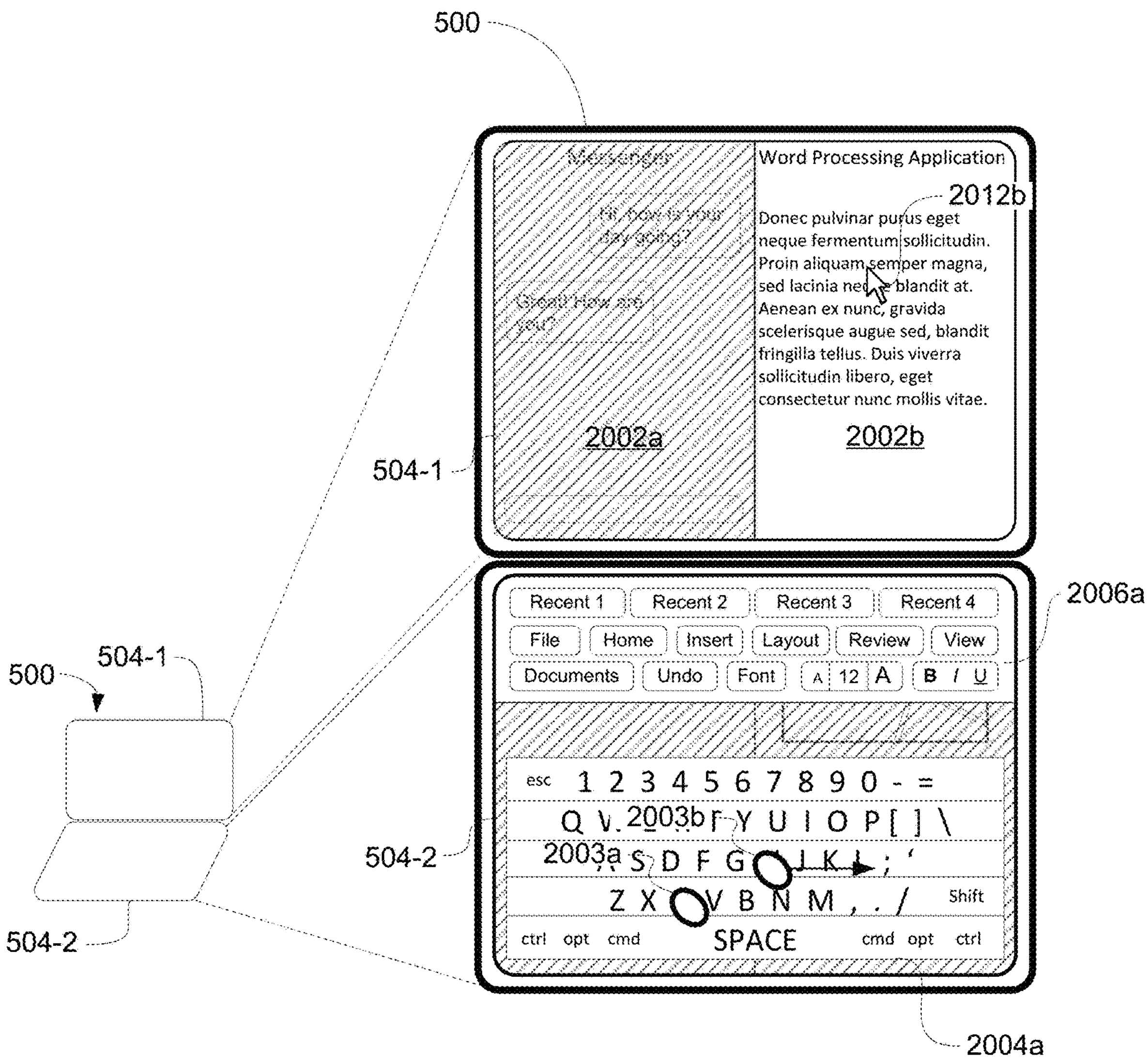
Figure 20X:
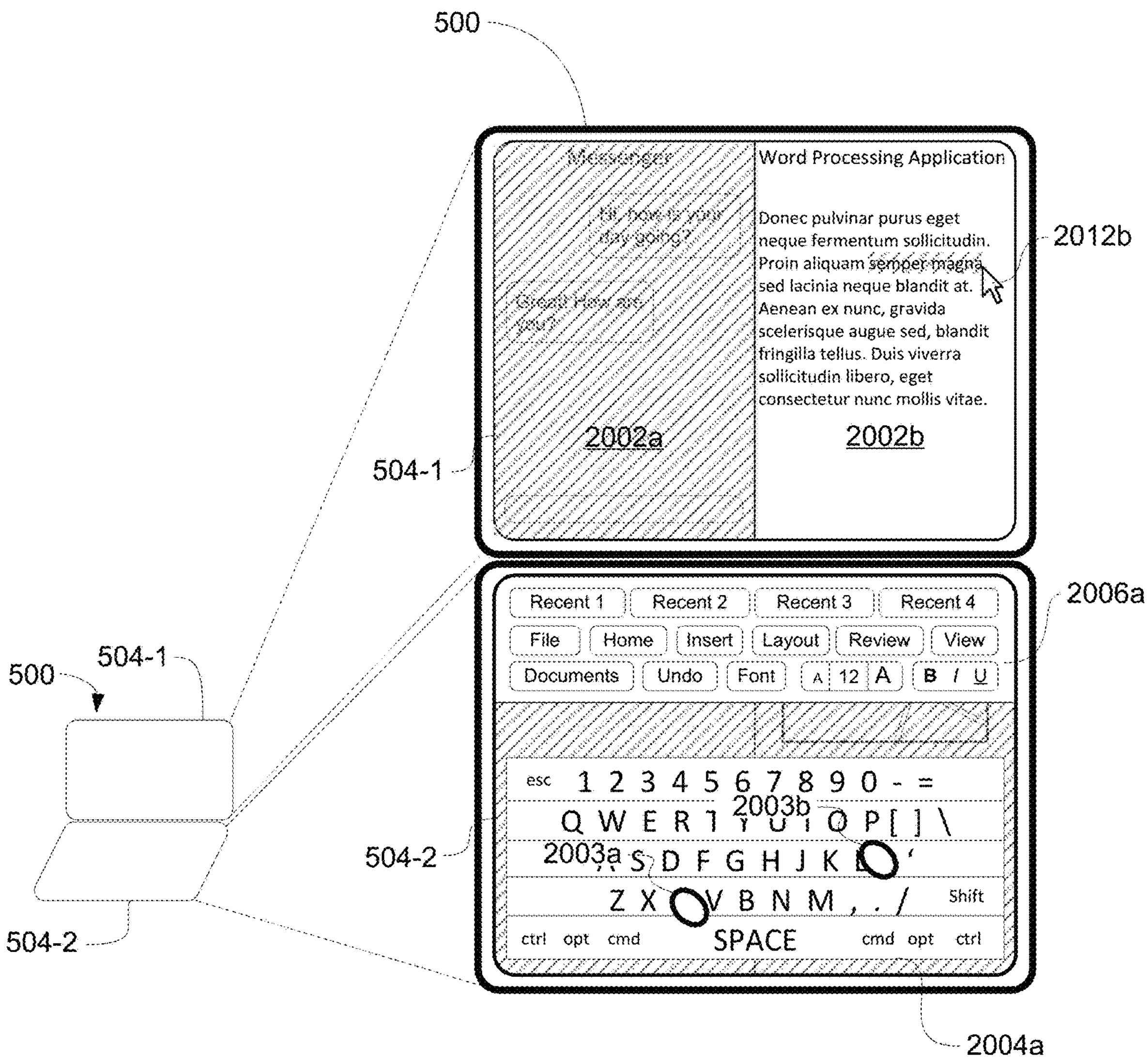

In FIG. 20W, the electronic device 500 detects movement of one of the contacts 2003*b*. As shown in FIG. 20X, in response to detecting the movement of the contact 2003*b*, the electronic device 500 highlights text in word processing interface 2002*b* in accordance with the movement of the contact. Thus, device 500 facilitates highlighting of text using gestures including concurrent detection of two contacts within soft keyboard 2004*a*.

Figure 20Y:
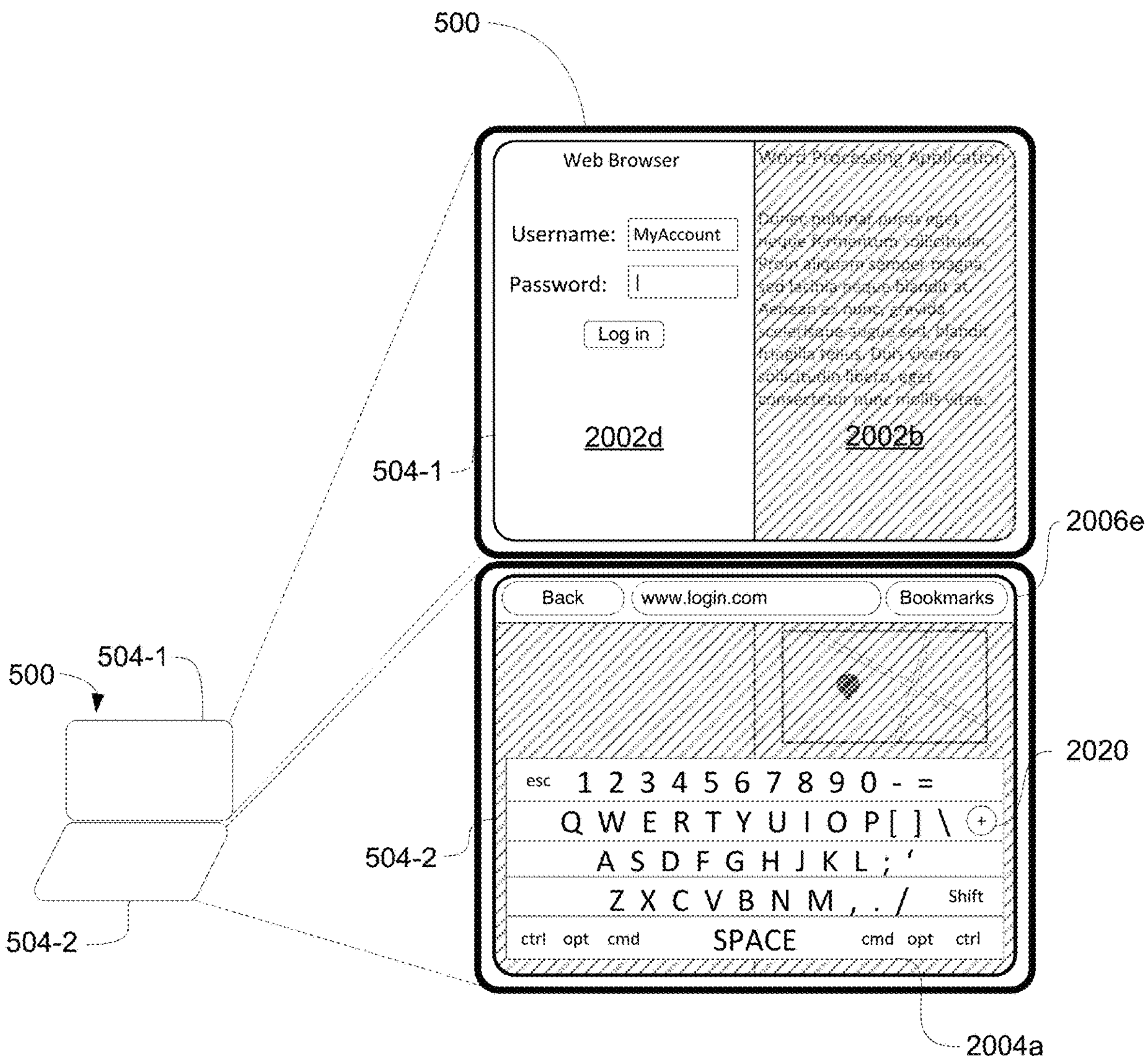

FIG. 20Y illustrates presentation of the web browsing user interface 2002*d* on the first touch screen 504-1 and presentation of the soft keyboard 2004*a* on the second touch screen 504-2. As shown in FIG. 20Y, the soft keyboard 2004*a* includes a button 2020 that, when selected, causes the electronic device 500 to present the application that has the input focus of the soft keyboard at a full-screen size.

Figure 20Z:
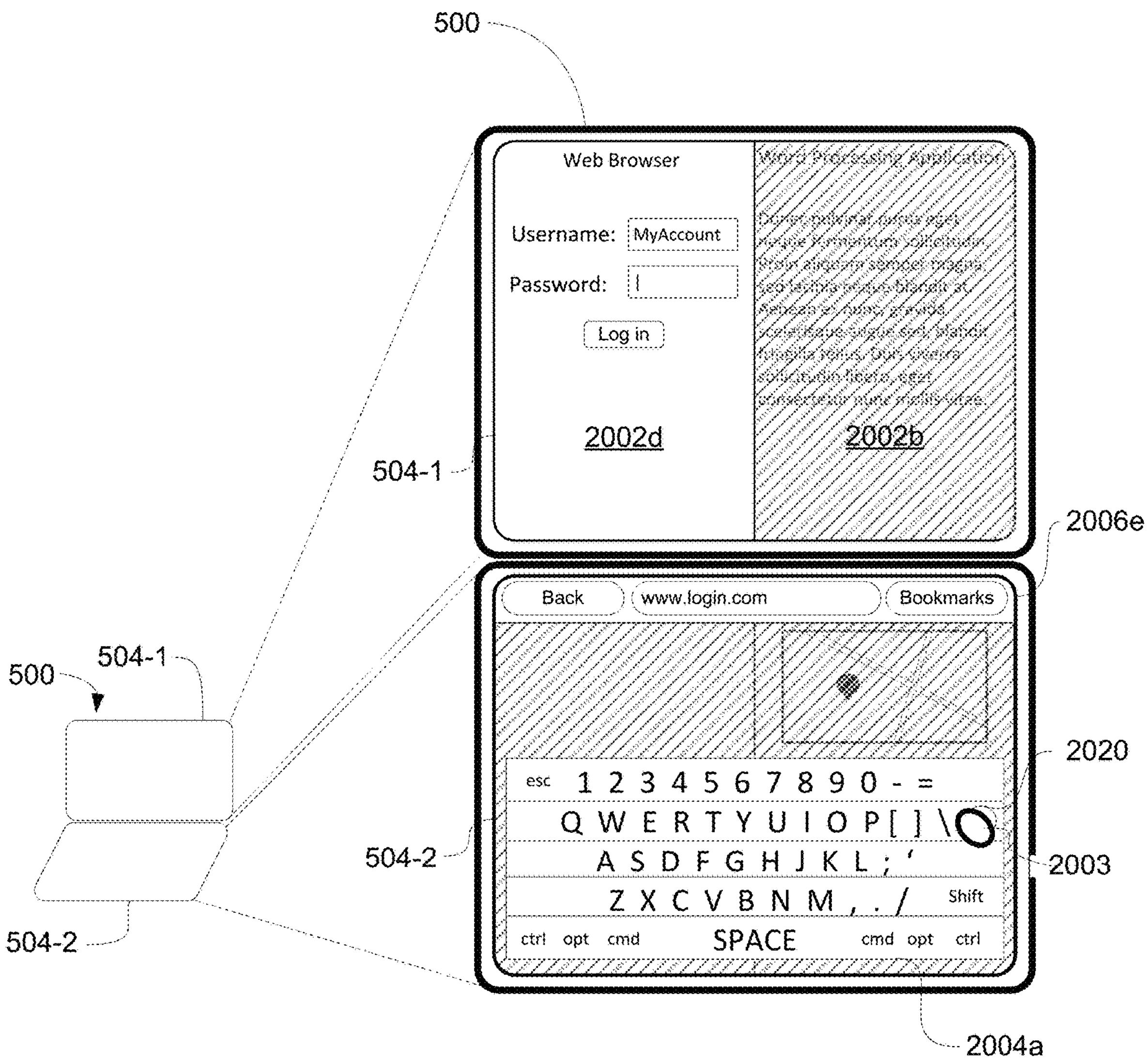
Figure 20A:
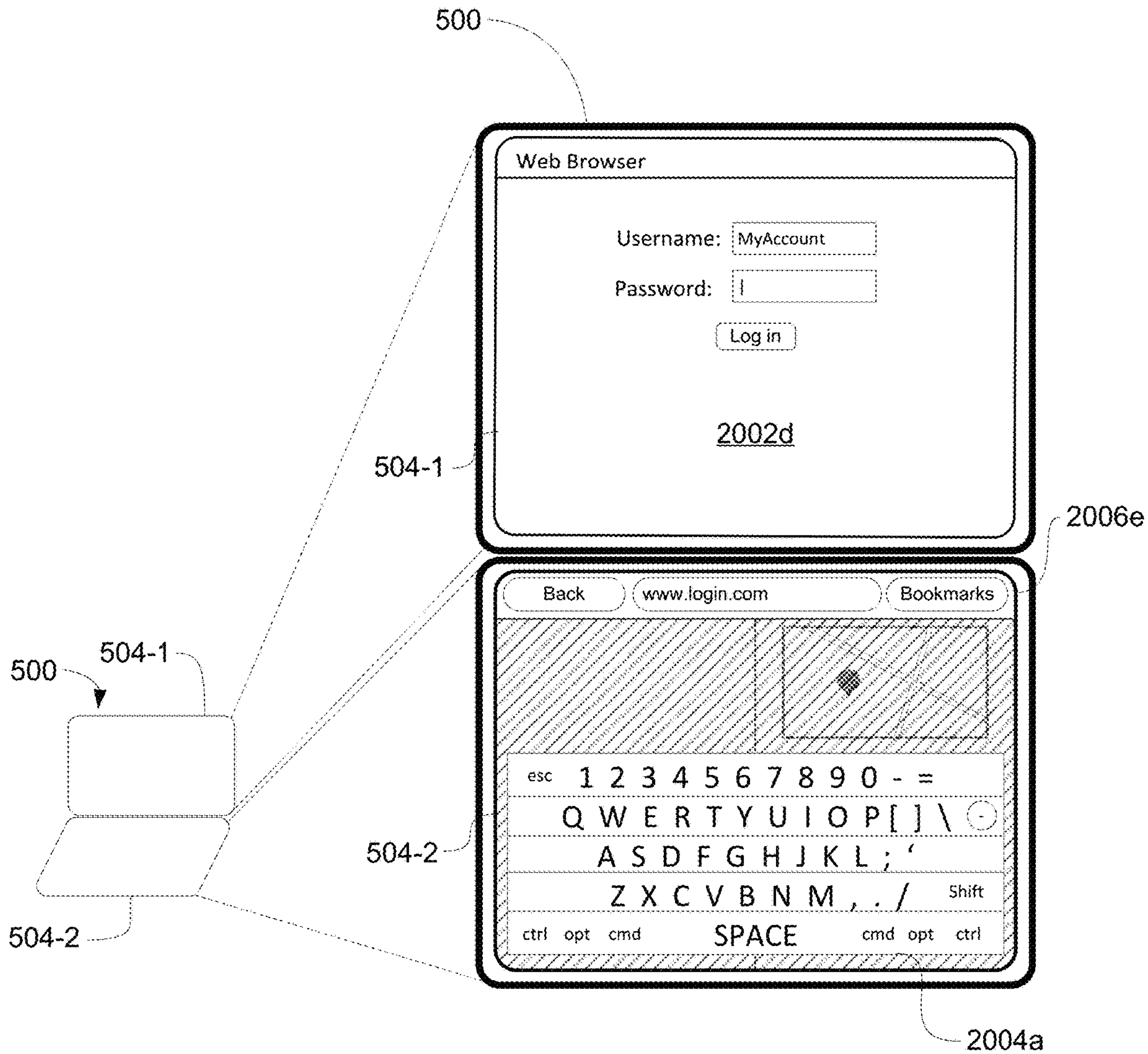
Figure 20B:
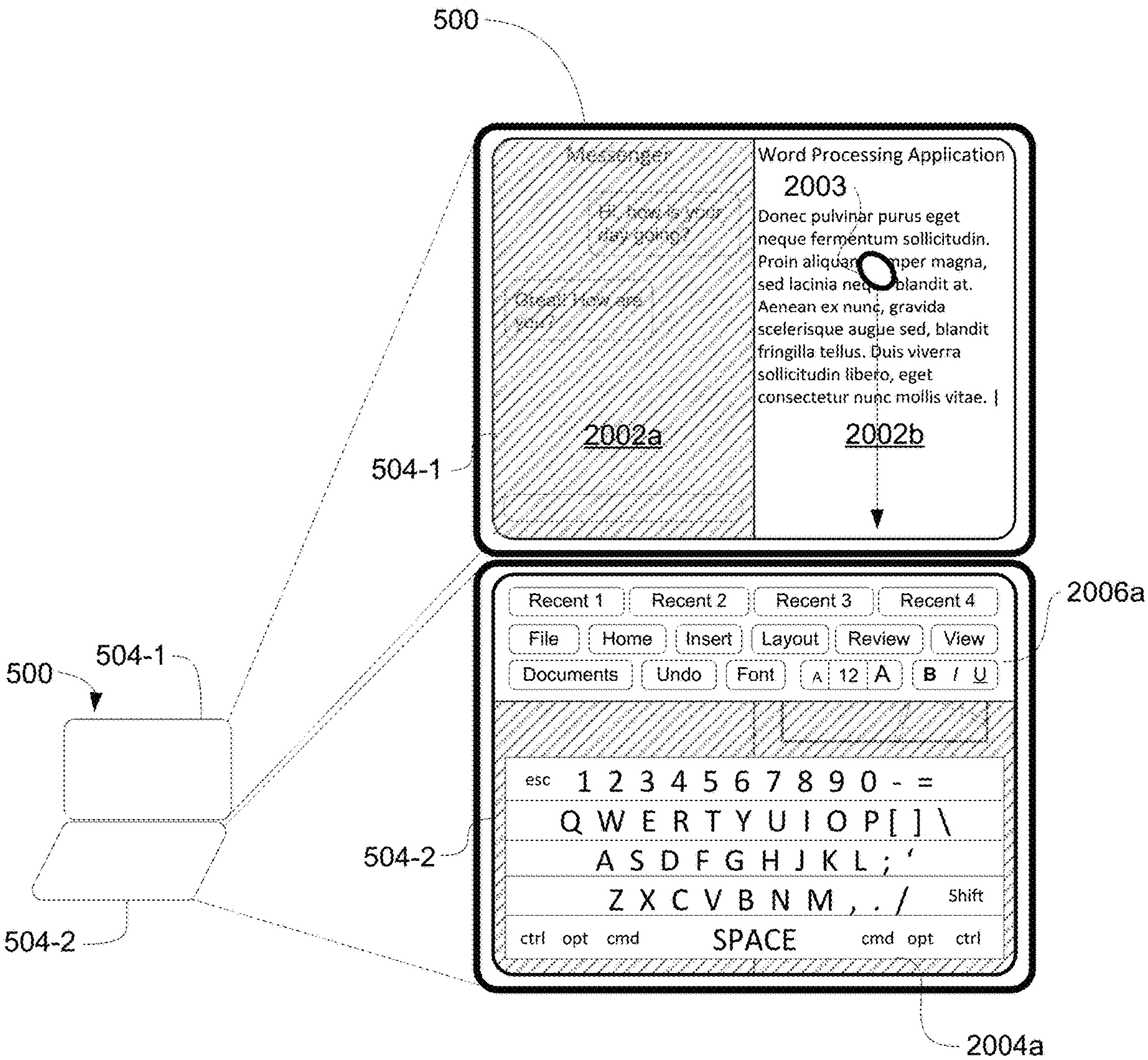
Figure 20C:
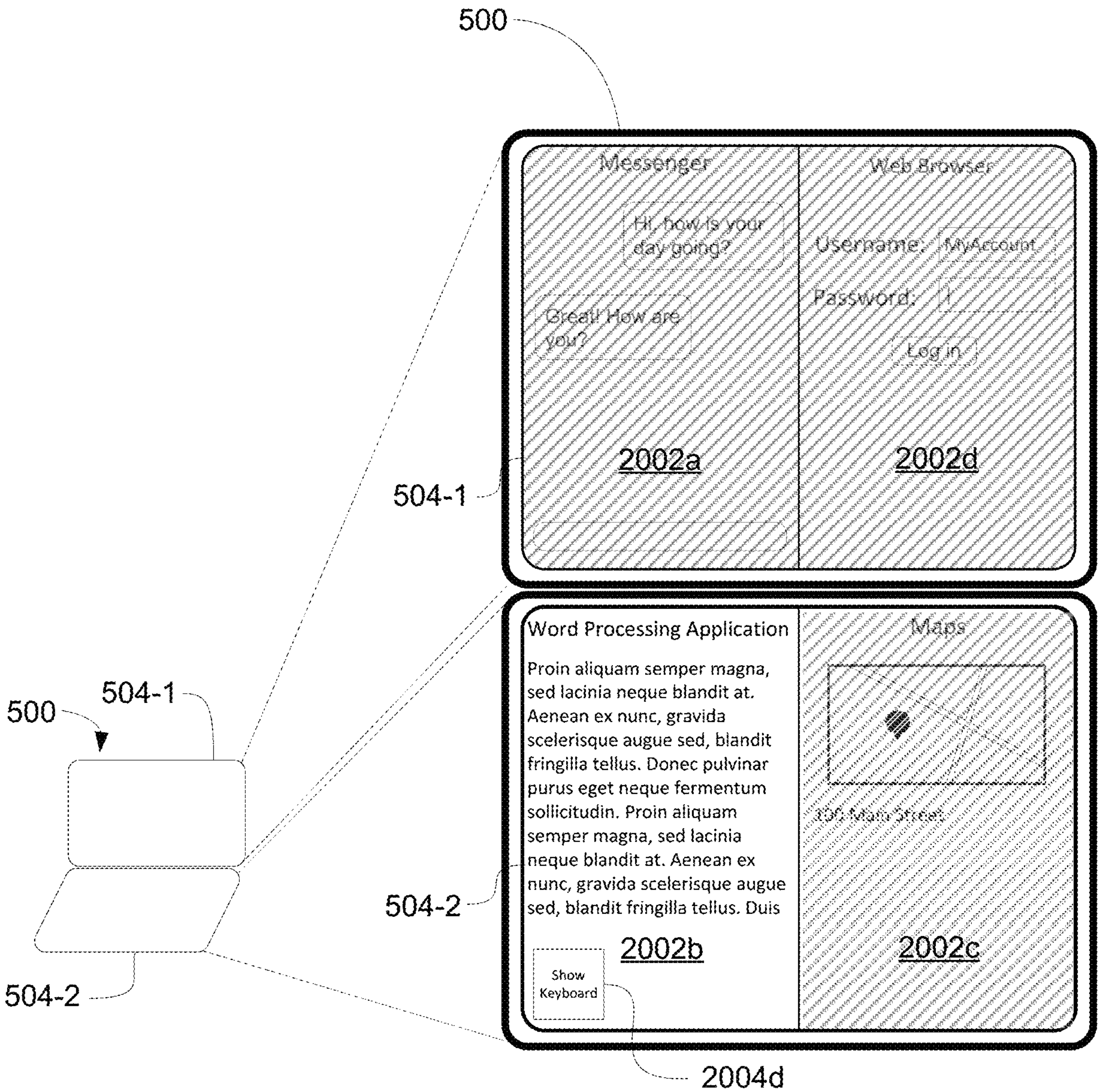

As shown in FIG. 20Z, the user selects (e.g., with contact 2003) the button 2020 to present the application with the keyboard focus in at a full-screen size. In response to the user's selection, as illustrated in FIG. 20AA, the electronic device 500 displays the web browsing user interface 2002*d* at a full-screen size on touch screen 504-1, and stops displaying the word processing user interface 2002*b* on touch screen 504-1.

In FIG. 20BB, while displaying the word processing user interface 2002*b*, the first touch screen 504-1 detects a contact 2003 in the word processing user interface 2004*a* and movement of the contact (e.g., drag or flick) towards the second touch screen 504-2. In response to detecting the contact and movement of the contact, the electronic device presents the word processing user interface 2002*b* on the second touch screen 504-2 and hides the soft keyboard, as shown in FIG. 20CC. Also shown in FIG. 20CC, after ceasing the display of the soft keyboard on touch screen 504-2, the electronic device 500 displays the keyboard button 2004*d* on touch screen 504-2 selectable to re-display the soft keyboard on touch screen 504-2. As shown in FIG. 20CC, the word processing user interface 2002*b* appears in a location on the second touch screen 504-2 where no application user interface was previously displayed. The electronic device 500 displays the web browsing user interface 2002*d* at a location on the first touch screen 504-1 where the word processing user interface 2002*b* was previously displayed because now that the word processing application 2002*b* is not displayed on the first touch screen 504-1, there is room to display the web browsing user interface 2002*d* which, for example, was previously hidden. As shown in FIG. 20CC, in some embodiments, although the soft keyboard is no longer displayed on the electronic device 500, the word processing application 2002*b* continues to be displayed with the bright appearance, while the other applications 2002*a* and 2002*c-d* are greyed out because the user last interacted with the word processing application and/or to make it easier for the user to see where the word processing application user interface 2002*b* was moved to.

Figure 21A:
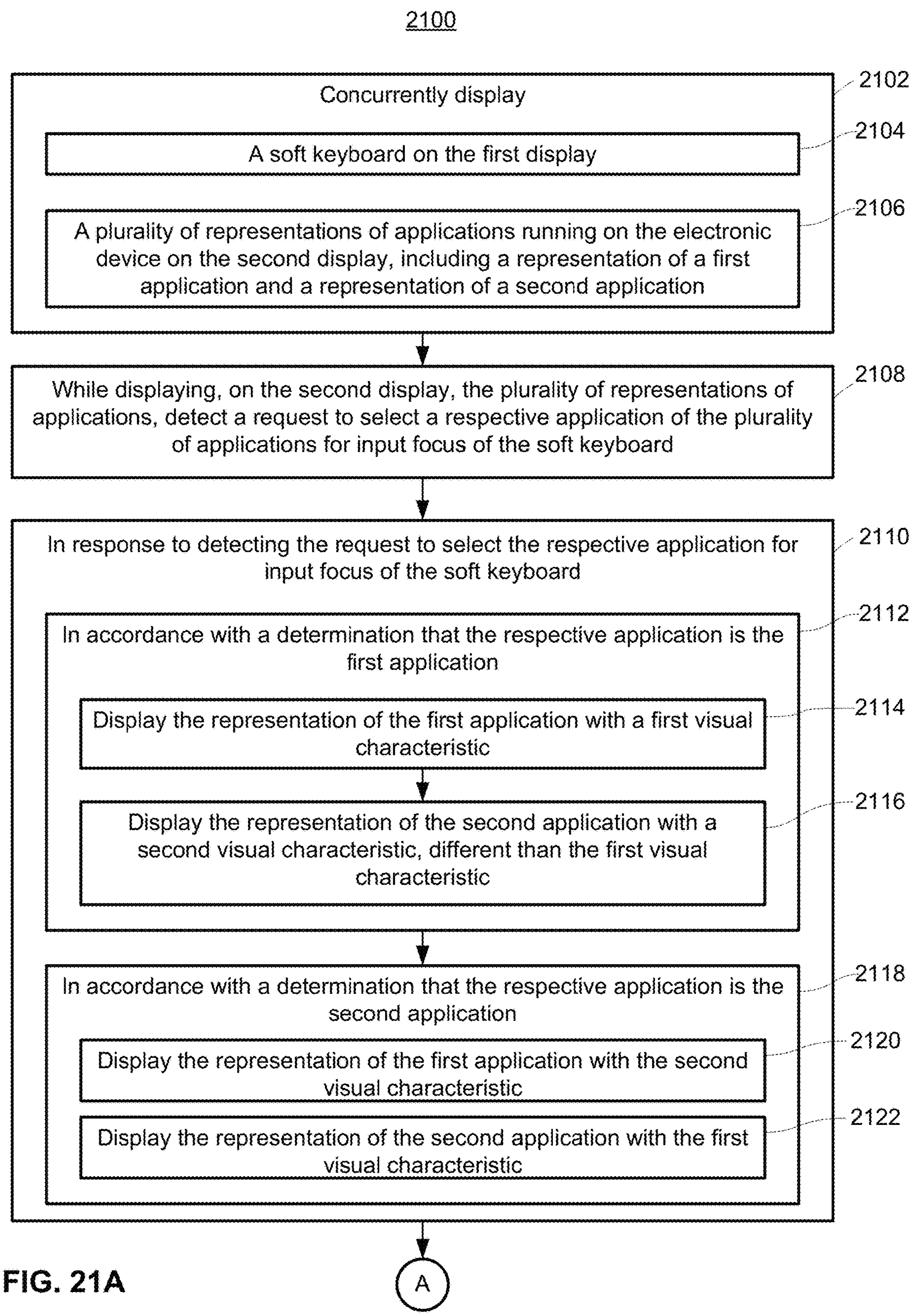
FIGS. 21A-21N are flow diagrams illustrating a method of presenting user interfaces including a soft keyboard in accordance with some embodiments of the disclosure.
Figure 21B:
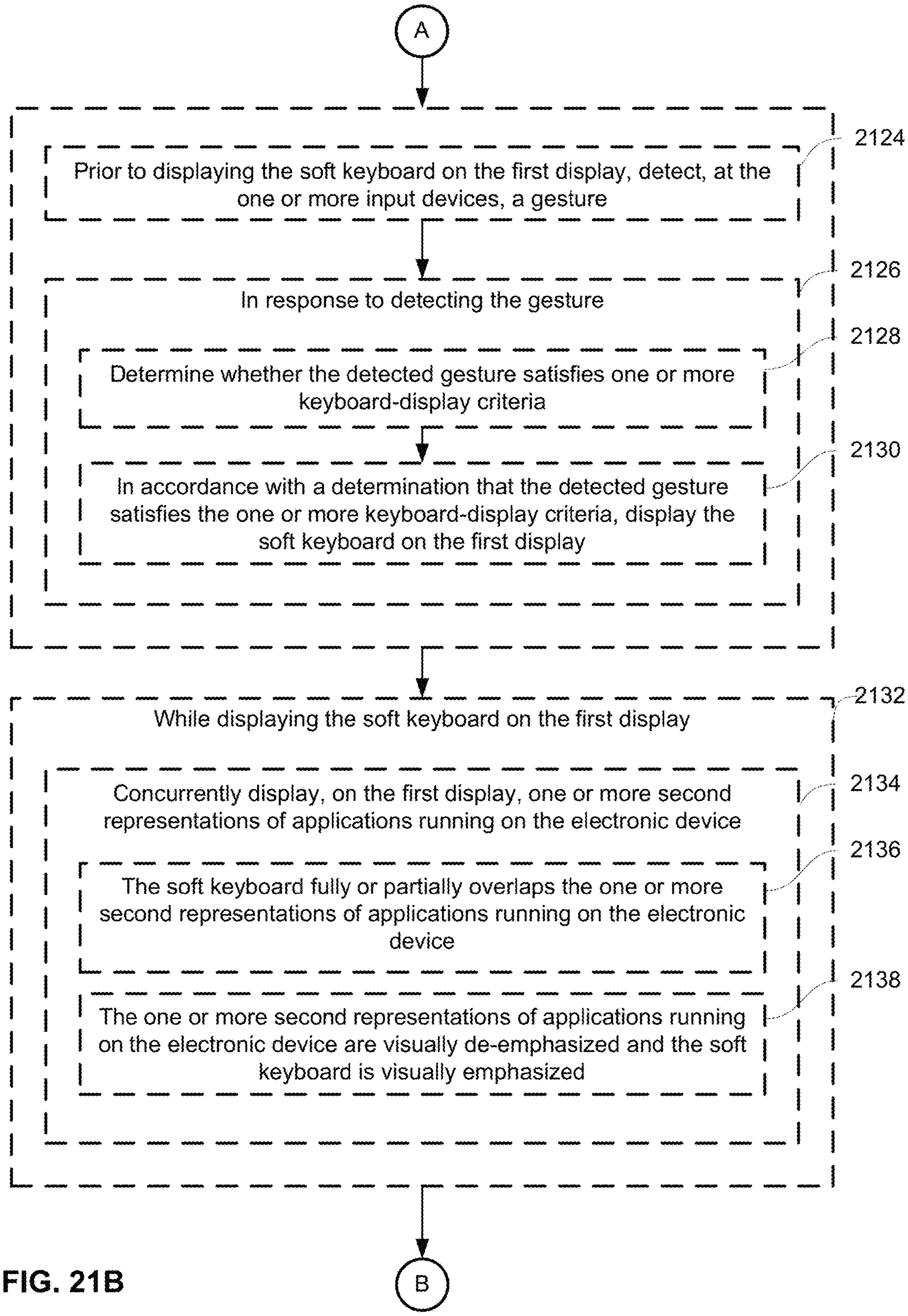
Figure 21C:
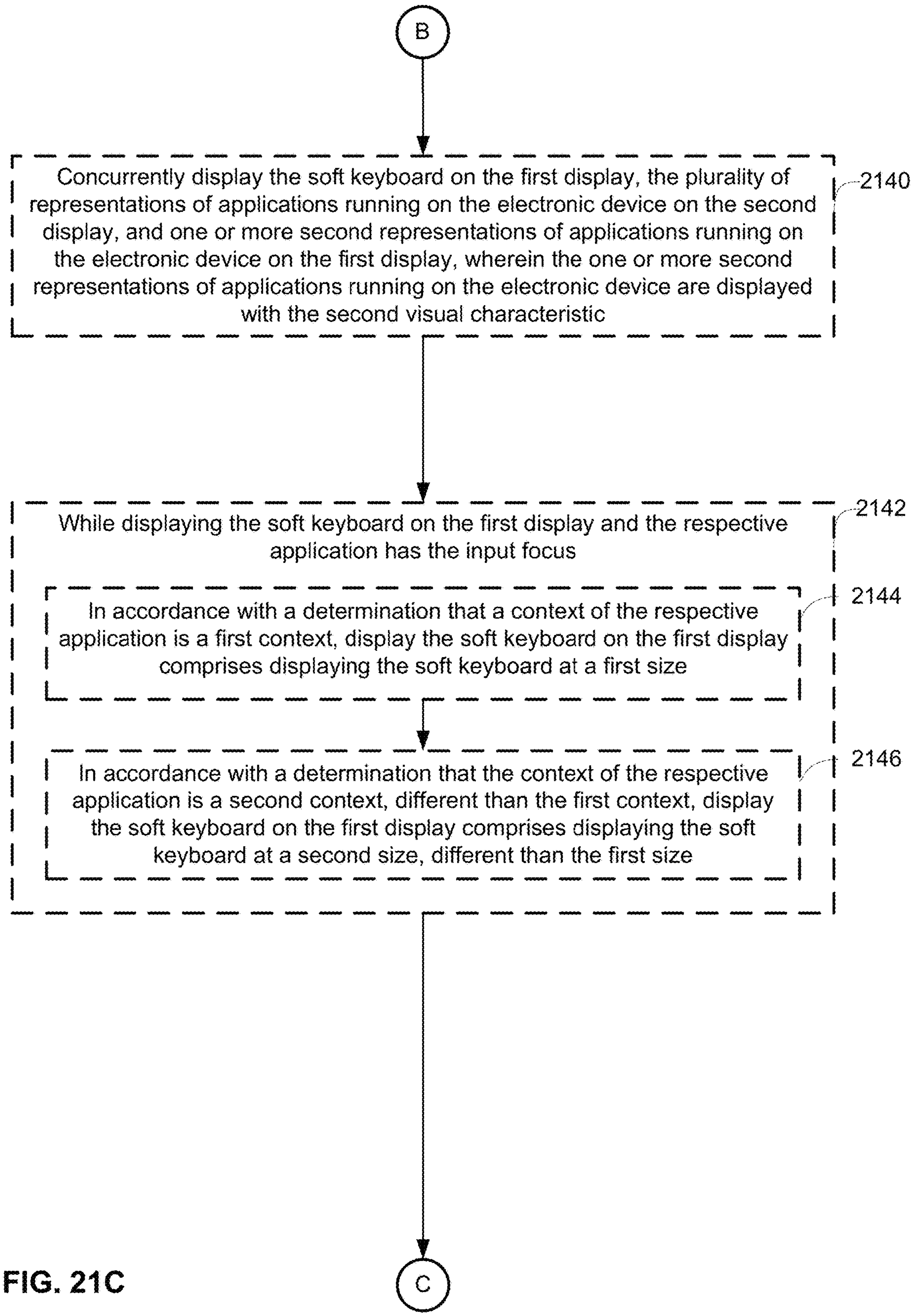
Figure 21D:
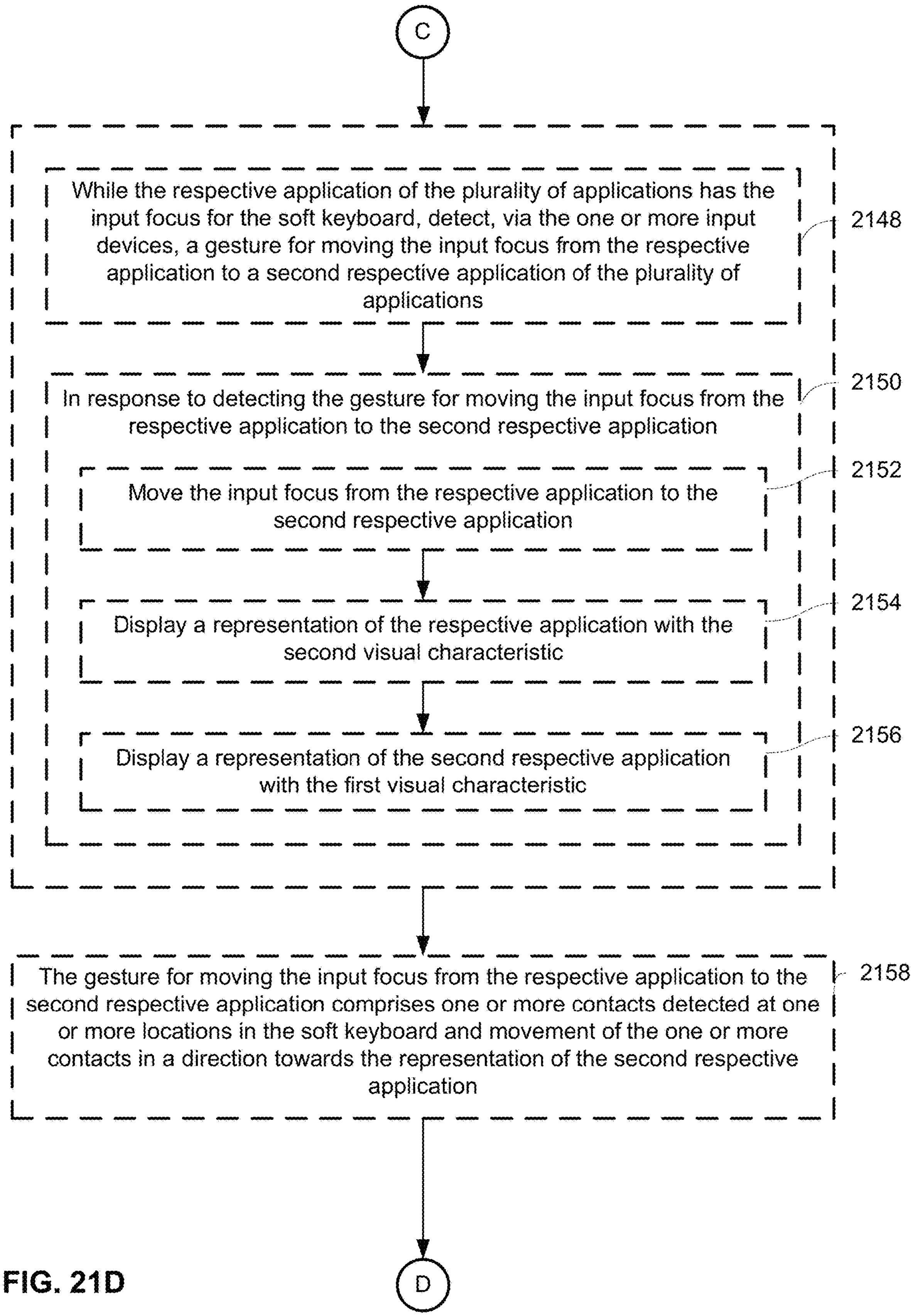
Figure 21E:
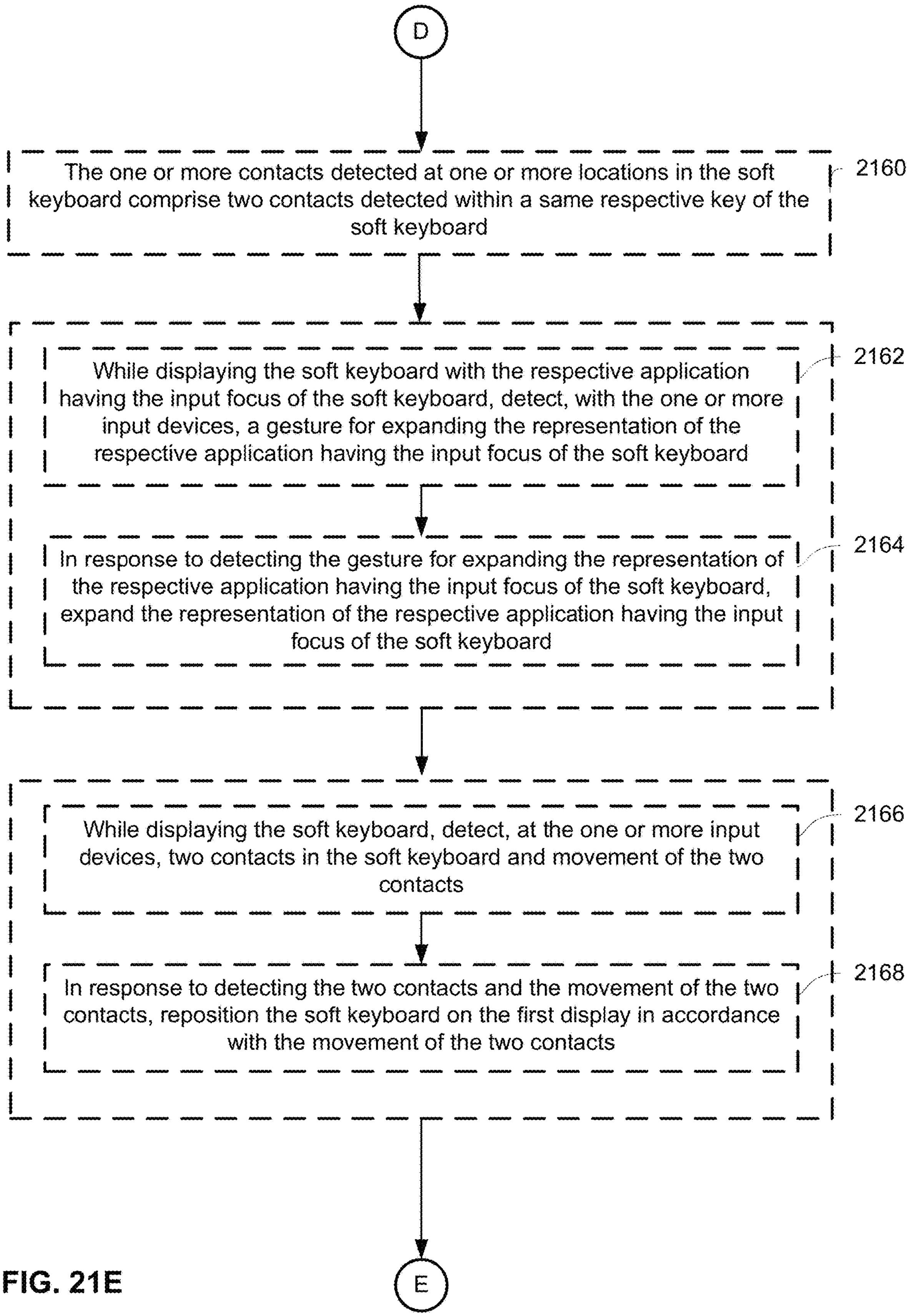
Figure 21F:
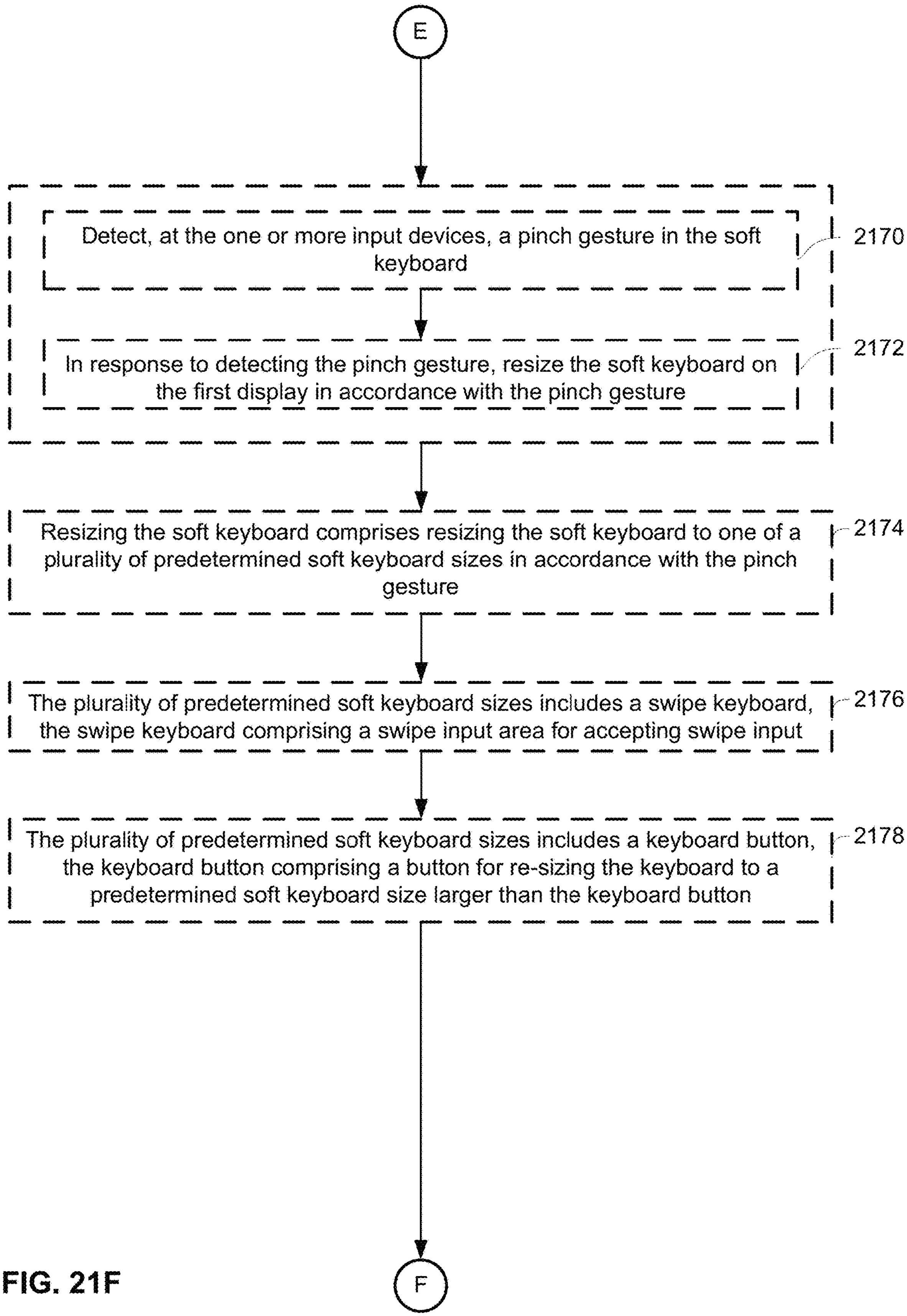
Figure 21G:
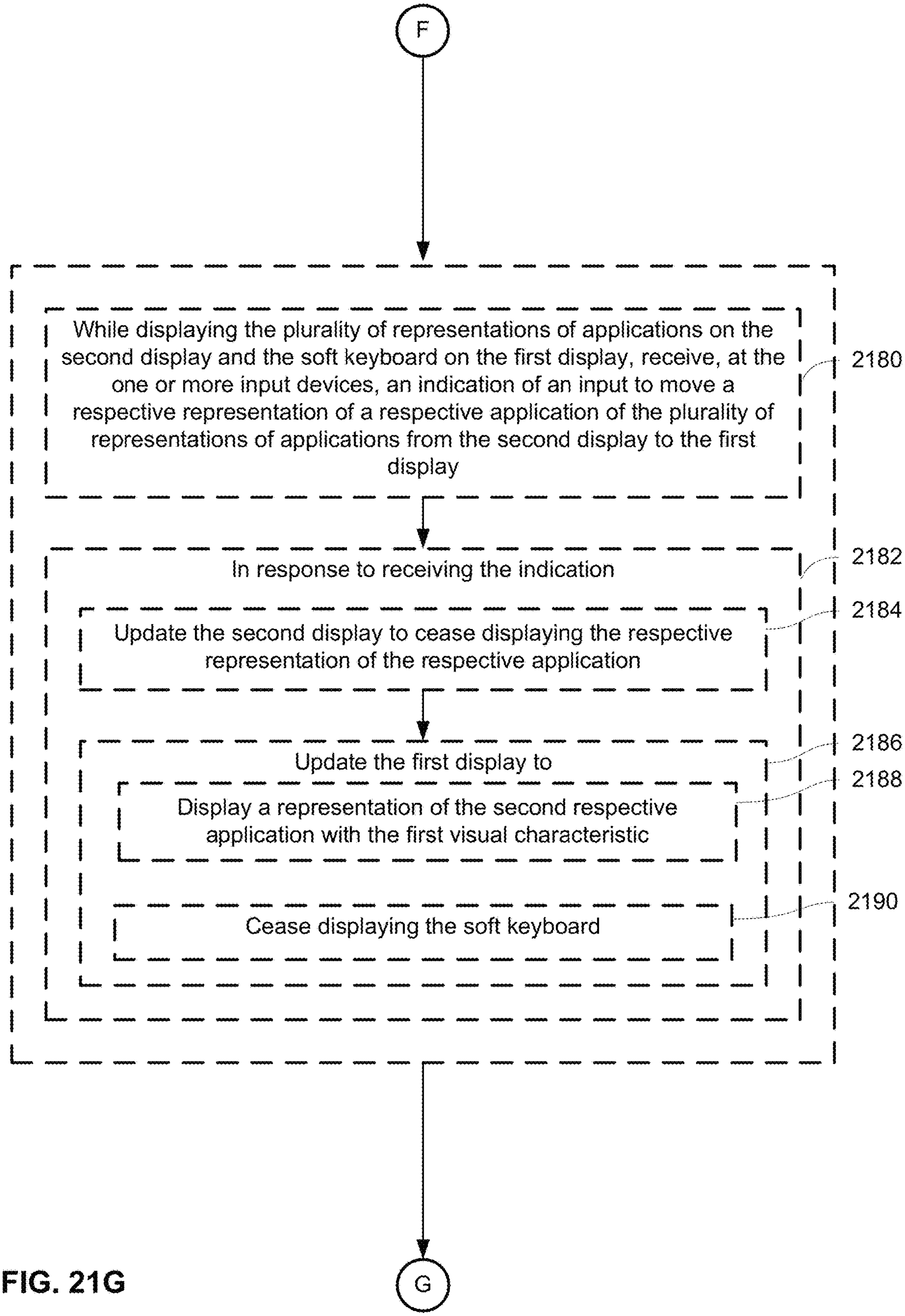
Figure 21H:
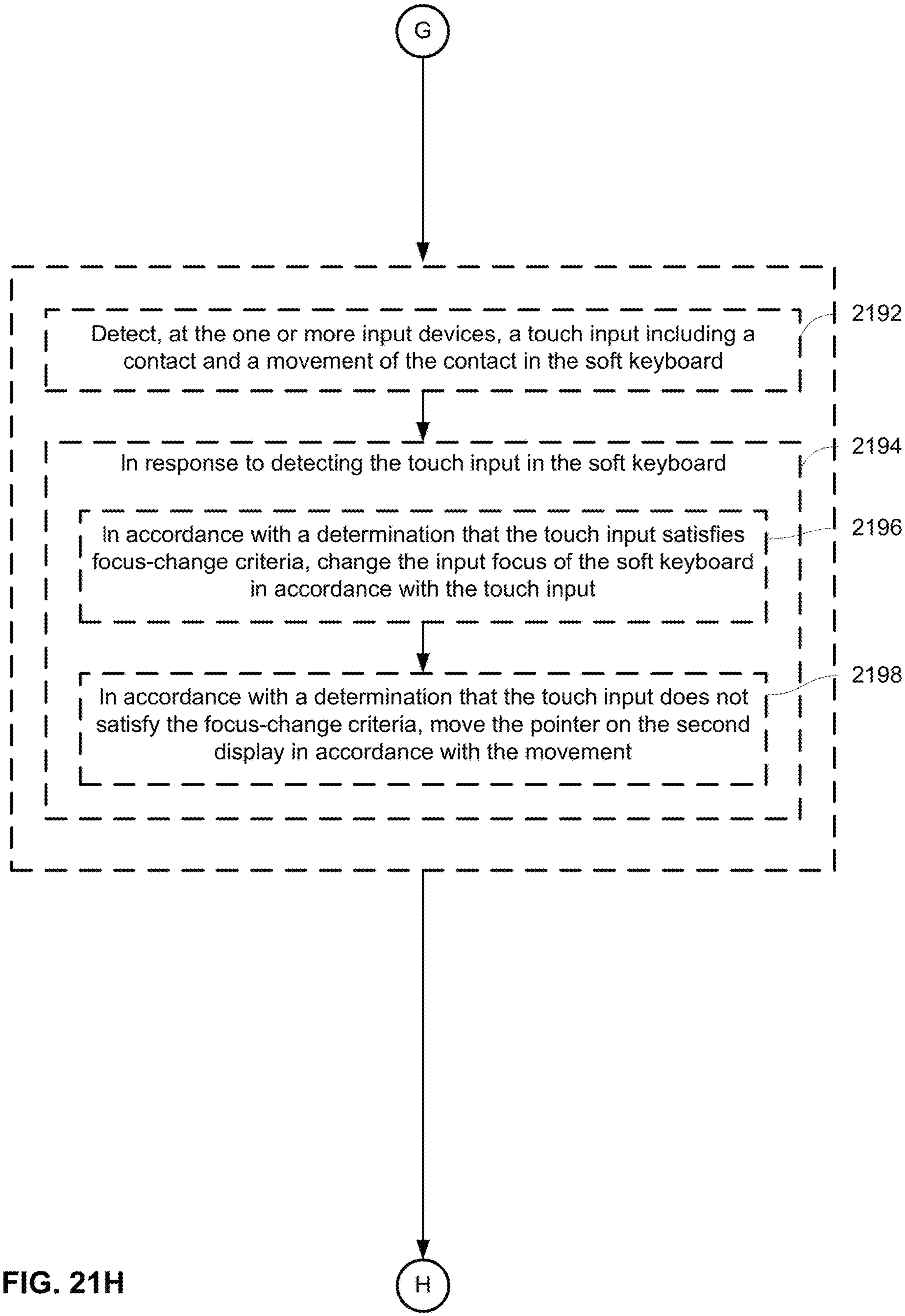
Figure 21I:
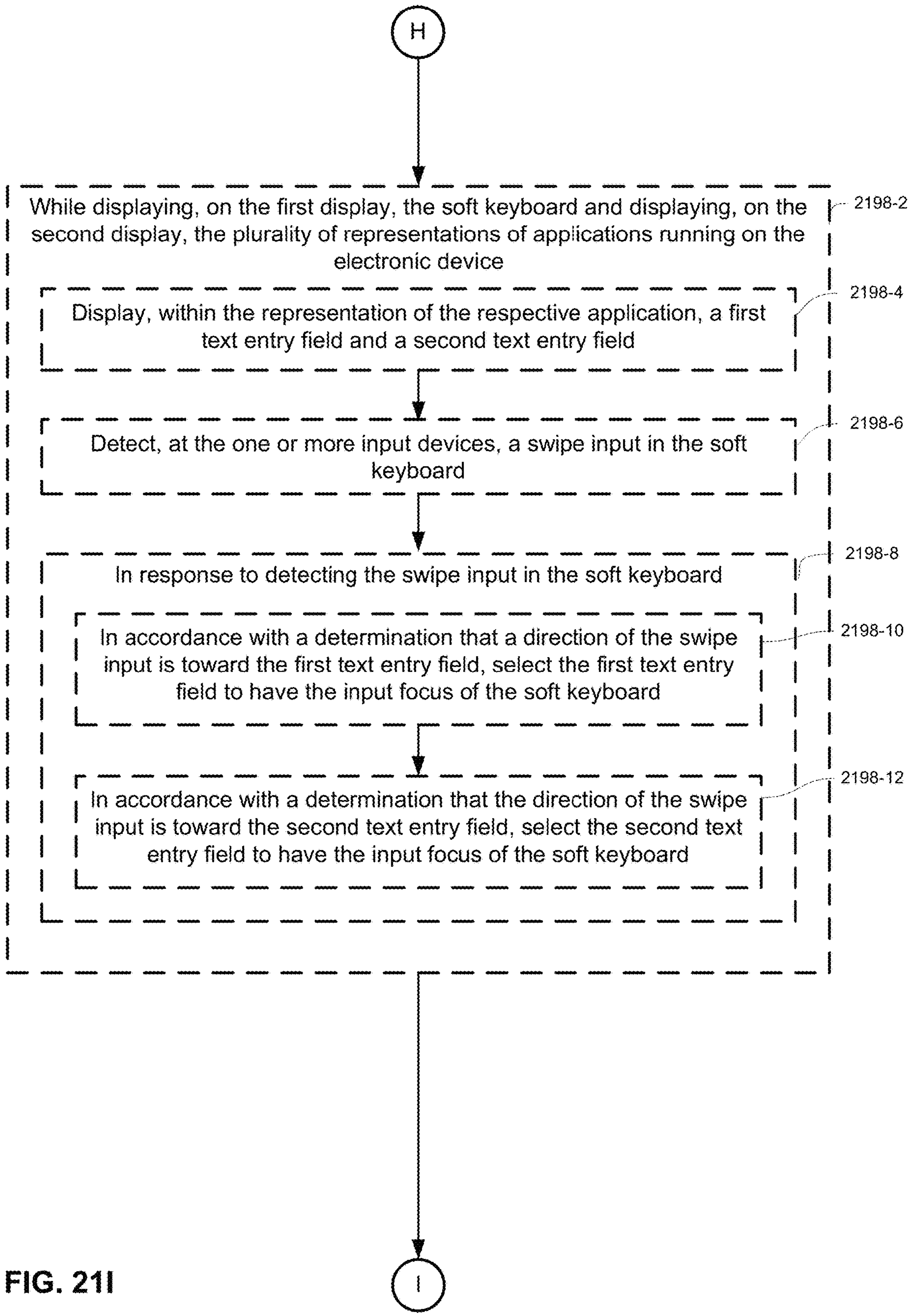
Figure 21J:
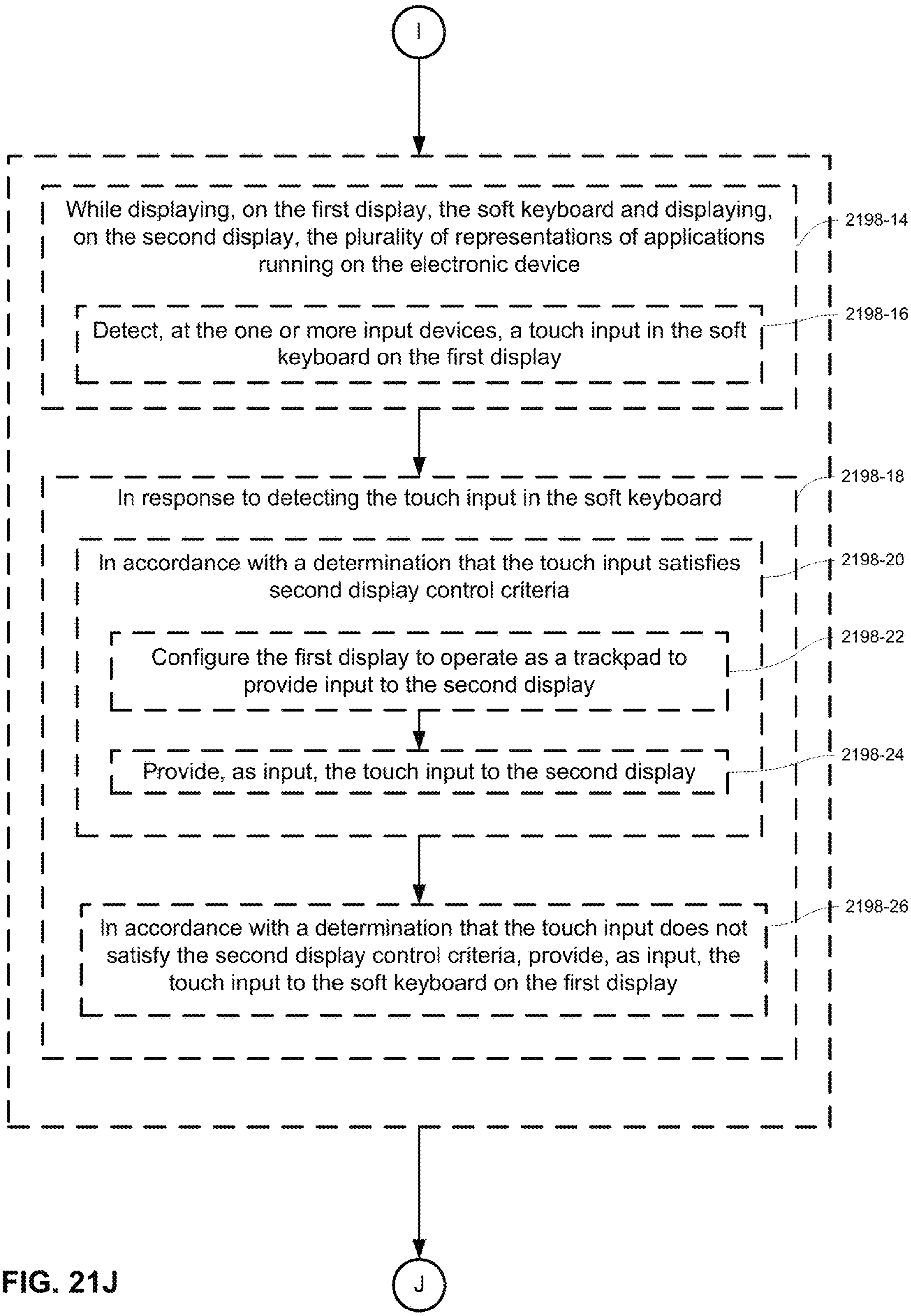
Figure 21K:
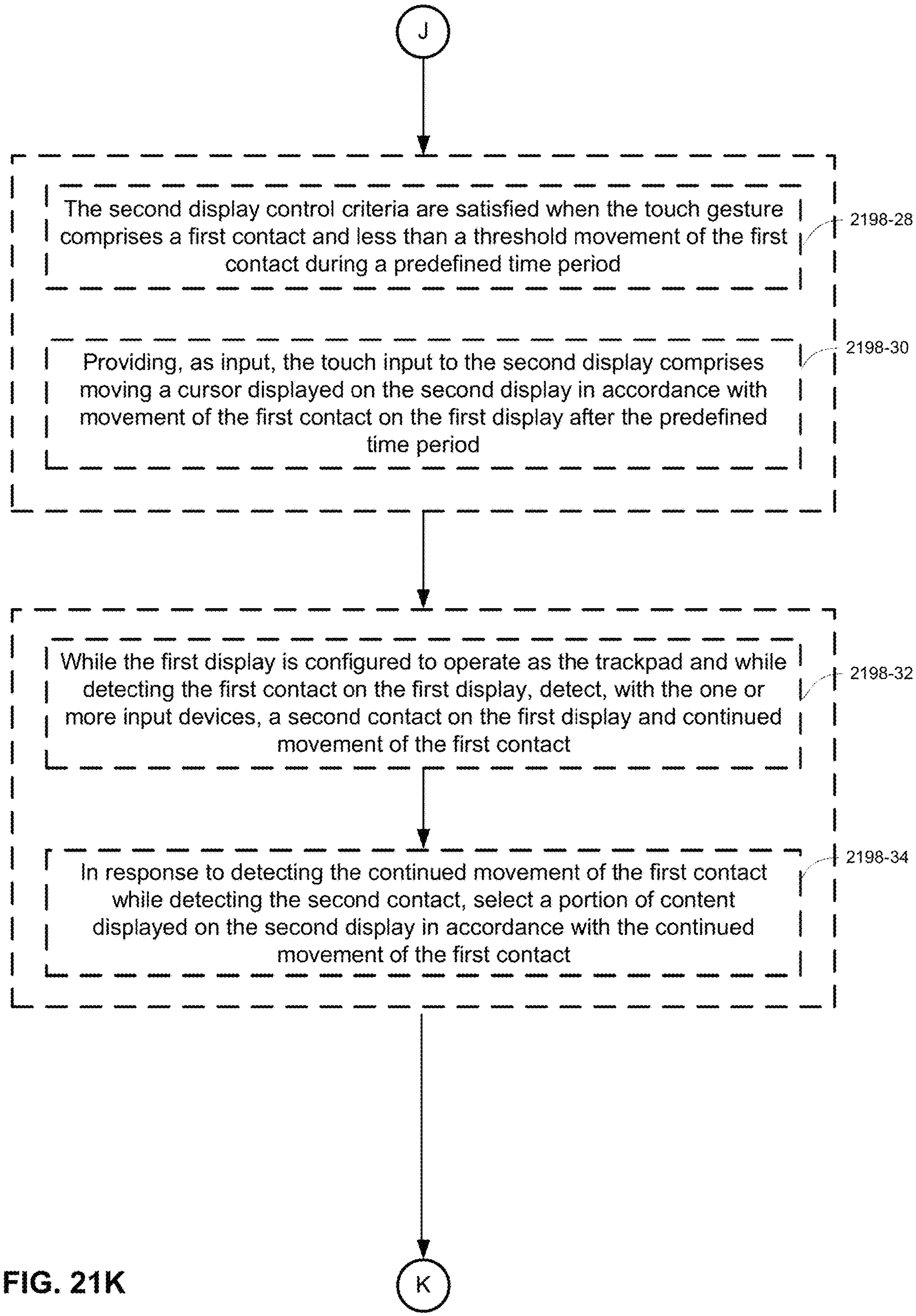
Figure 21L:
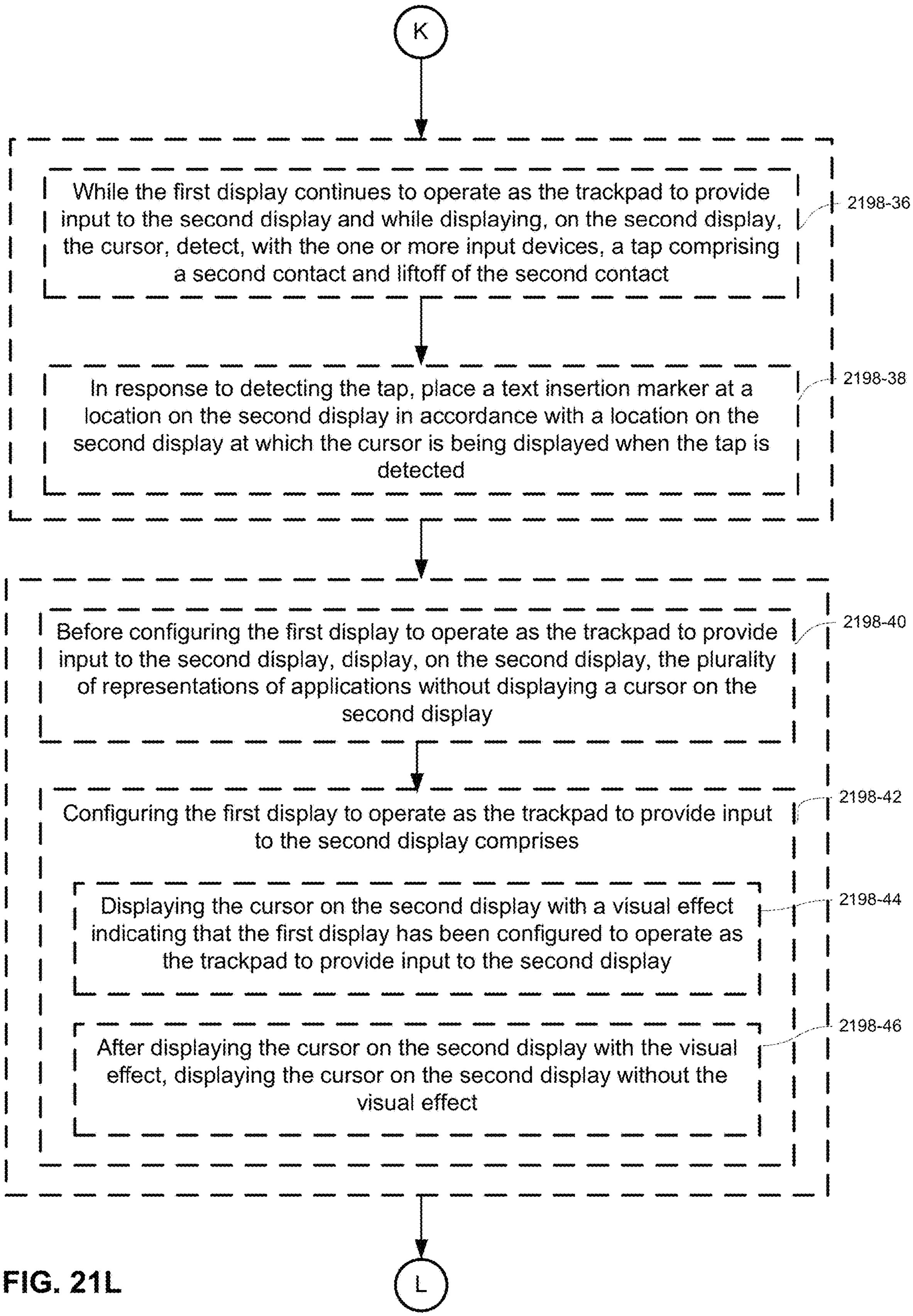
Figure 21N:
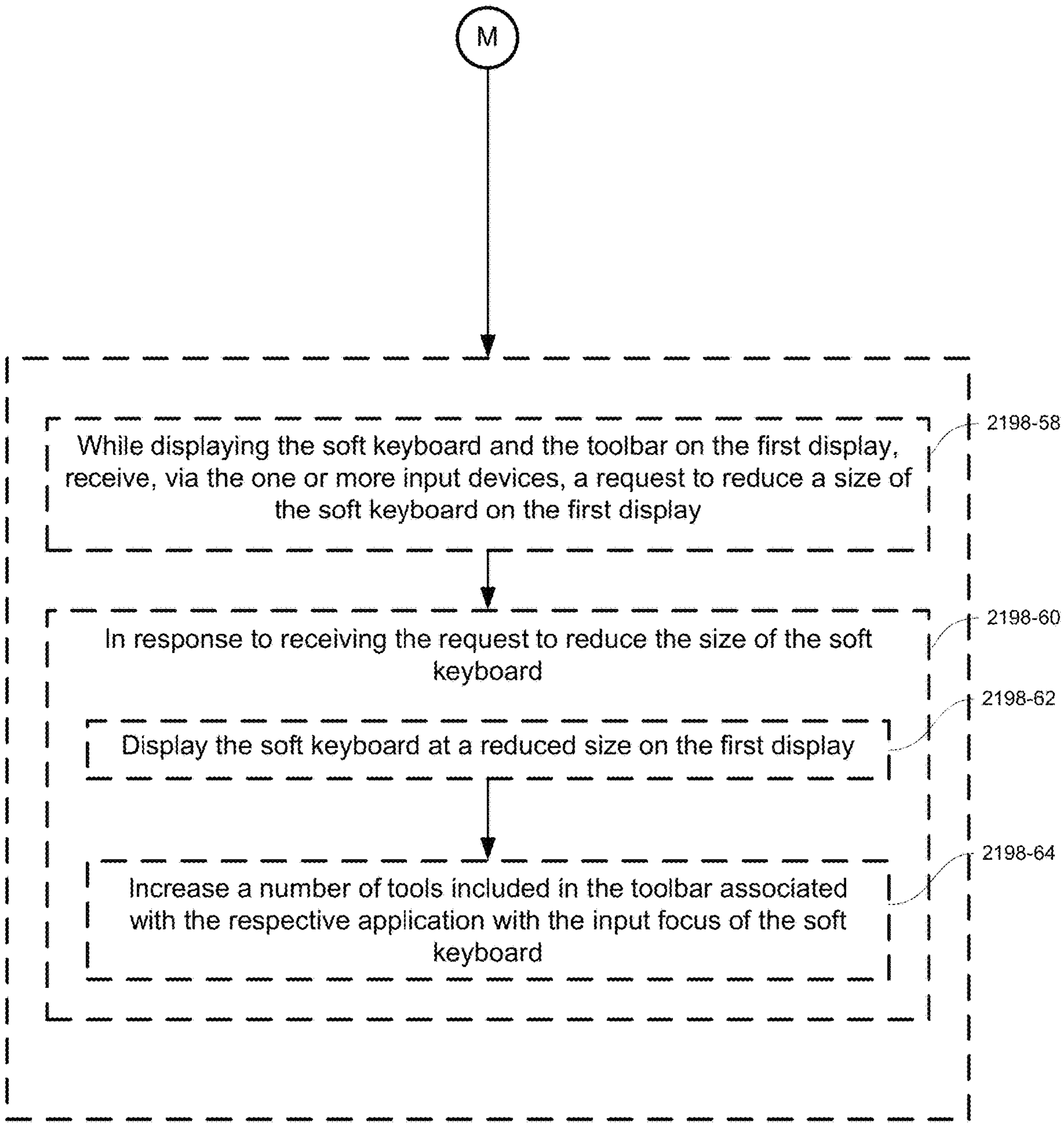

FIGS. 21A-21N are flow diagrams illustrating a method of presenting user interfaces including a soft keyboard in accordance with some embodiments of the disclosure. The method 2100 is optionally performed at an electronic device, such as device 100, device 300, or device 500 described above with reference to FIGS. 1A-1B, 2-3, 4A-4B and 5A-5H. Some operations in method 2100 are, optionally combined and/or the order of some operations is, optionally, changed.

As described below, the method 2100 provides ways of presenting user interfaces including a soft keyboard. The method reduces the cognitive burden on a user when interacting with a user interface of the device of the disclosure, thereby creating a more efficient human-machine interface. For battery-operated devices, increasing the efficiency of the user's interaction with the user interface conserves power and increases the time between battery charges.

In some embodiments, an electronic device 500 in communication with a first display 504-2, a second display 504-1, and one or more input devices (e.g., electronic device 500, a phone, table, laptop, etc. including two or more touch screens or two or more displays, or a set-top box connected to two or more televisions) concurrently displays (2102) a soft keyboard 2004*a* on the first display 504-2 (2104) (e.g., a representation of an alphanumeric keyboard displayed on the first display that is usable to enter text input to one or more applications currently running on the electronic device or user interfaces displayed by the electronic device) and a plurality of representations 2002*a* and 2002*b* (e.g., windows) of applications running on the electronic device on the second display 504-1 (e.g., the top display), including a representation of a first application 2002*a* and a representation of a second application 2002*b* (2106). In some embodiments, the first display is the bottom display. In some embodiments, the electronic device displays, on the second display, a first window (e.g., including a user interface of the first application) for the first application running on the electronic device and a second window (e.g., including a user interface of the second application) for the second application running on the second device. In some embodiments, the first display also displays one or more applications running on the electronic device while displaying the soft keyboard. In some embodiments, the second display is the top display.

In some embodiments, while displaying, on the second display 504-1, the plurality of representations 2002*a-b* of applications, the electronic device 500 detects (2108) a request to select a respective application of the plurality of applications for input focus of the soft keyboard, such as movement of contacts 2003*a-b* illustrated in FIG. 20D.

In some embodiments, in response to detecting the request to select the respective application 2002*a* for input focus of the soft keyboard (2110), in accordance with a determination that the respective application is the first application 2002*a* (2112), the electronic device displays (2114) the representation of the first application 2002*a* with a first visual characteristic (e.g., an indication of the input focus of the soft keyboard), such as in FIG. 20E. In some embodiments, the request is to associate the soft keyboard with the first application such that text entered at the soft keyboard will be input to the first application but not the second application. In some embodiments, an application window of the first application optionally has a color or style indicating that the first application has the focus of the soft keyboard.

In some embodiments, the electronic device 500 displays (2116) the representation of the second application 2002*b* with a second visual characteristic, different than the first visual characteristic (e.g., an indication that the second application does not have the input focus of the soft keyboard), as shown in FIG. 20E. In some embodiments, multiple applications not having the input focus of the soft keyboard are running on the electronic device, and the representations (e.g., application windows) of these applications optionally all have the indication that the applications do not have the input focus of the soft keyboard. The second indication is optionally a color or style of the application window that indicates that the application does not have the input focus of the soft keyboard. In some embodiments, the window border or the entire application user interface is optionally darkened or faded for applications that do not have the input focus of the soft keyboard in comparison to the window border or application user interface of the first application having the input focus of the soft keyboard.

In some embodiments, in accordance with a determination that the respective application is the second application 2002*b* (2118), such as in FIGS. 20M-N, the electronic device 500 displays (2120) the representation of the first application 2002*a* with the second visual characteristic, such as in FIG. 20N. In some embodiments, the request is to associate the soft keyboard with the second application such that text entered at the soft keyboard will be input to the second application but not the first application. In some embodiments, the input focus of the soft keyboard is changed from the first application to the second application in response to a user input (e.g., selecting, using one or more input devices of the electronic device, the application window of the second application) to do so. In some embodiments, when an application changes from having the input focus of the soft keyboard to no longer having the input focus of the soft keyboard, the representation of that application changes to no longer have the visual characteristic of having the input focus of the soft keyboard and, instead, the representation of that application updates to have the characteristic of not having the input focus of the soft keyboard. In some embodiments, this change optionally includes darkening or fading the window of that application.

In some embodiments, the electronic device 500 displays (2122) the representation of the second application 2002*b* with the first visual characteristic, such as in FIG. 20*n*. In some embodiments, when an application changes from not having the input focus of the soft keyboard to having the input focus of the soft keyboard, the representation of that application changes to have the visual characteristic of having the input focus of the soft keyboard and updates to no longer have the visual characteristic of not having the input focus of the soft keyboard. In some embodiments, this change optionally includes brightening or un-fading the window of that application.

The above-described manner visually distinguishing a visual representation of an application when the application has the input focus of the soft keyboard allows the electronic device to present information to the user in an ordered fashion, which simplifies interactions between the user and the device and enhances the operability of the device and makes the user-device interface more efficient (e.g., by reducing erroneous keyboard input to an unintended application), which, additionally, reduces power usage and improves battery life of the device by enabling the user to use the device more quickly and efficiently.

In some embodiments, prior to displaying the soft keyboard 2004*a* on the first display 504-2, the electronic device 500 detects (2124), at the one or more input devices (e.g., at a touch screen incorporated into one or more of the bottom display and the top display), a gesture, such as contacts 2003*a-j* illustrated in FIG. 20A (e.g., a movement or series of movements of a detected contact, such as from a user's hand). In some embodiments, in response to detecting the gesture (2126), the electronic device 500 determines (2128) whether the detected gesture satisfies one or more keyboard-display criteria (e.g., shape of movement, magnitude of movement, speed of movement of the detected contact, etc.). In some embodiments, the gesture satisfies the one or more keyboard-display criteria if the gesture comprises multiple contacts detected on the bottom display arranged in a particular arrangement (e.g., the user sets down their hands in an area of the bottom display at which the soft keyboard is able to be displayed) or the gesture comprises selection of a text field with a tap gesture into which text is entered (e.g., on the top display, which is optionally also a touch screen).

In some embodiments, in accordance with a determination that the detected gesture satisfies the one or more keyboard-display criteria (e.g., the detected gesture is the gesture for displaying the soft keyboard), the electronic device 500 displays (2130) the soft keyboard 2004*a* on the first display 204-1. For example, in response to detecting a number of contacts (e.g., fingers) on the bottom display or in response to detecting a contact selecting a text entry field displayed on the bottom display or the top display, the electronic device optionally displays the soft keyboard on the bottom display. In some embodiments, if the gesture does not satisfy the keyboard-display criteria, the electronic device optionally responds to the gesture in another way in accordance with what is displayed on the display on which the gesture was detected. For example, if the gesture is a swipe gesture on the top display, the electronic device optionally forgoes displaying the soft keyboard on the bottom display and instead causes scrolling in the user interface displayed on the top display. Similarly, if the gesture is a swipe gesture on the bottom display, the electronic device optionally forgoes displaying the soft keyboard on the bottom display and instead causes scrolling in the user interface displayed on the bottom display.

The above-described manner of displaying the soft keyboard in response to a dedicated gesture allows the electronic device to use the first display to present other information or content to the user prior to displaying the soft keyboard and to then allow the user to enter input to the electronic device using the keyboard when the user requests to do so, which simplifies interactions between the user and the device and enhances the operability of the device and makes the user-device interface more efficient (e.g., by using screen space for displaying content when the user does not request to use the soft keyboard), which, additionally, reduces power usage and improves battery life of the device by enabling the user to use the device more quickly and efficiently.

In some embodiments, such as in FIG. 20E, while displaying the soft keyboard 2004*b* on the first display 504-2 (2132) (e.g., bottom display), the electronic device 500 concurrently displays (2134), on the first display 504-2 (e.g., the bottom display), one or more second representations 2002*c* (e.g., windows) of applications running on the electronic device 500 (e.g., one or more application windows are displayed on the same display as the soft keyboard). In some embodiments, the soft keyboard 2004*b* fully or partially overlaps the one or more second representations 2002*c* of applications running on the electronic device (2136). The bottom display optionally also displays additional application windows that are adjacent to (e.g., not overlapped by) the soft keyboard. In some embodiments, the one or more second representations 2002*c* of applications running on the electronic device are visually de-emphasized (e.g., displayed with reduced contrast and/or with reduced brightness) and the soft keyboard 2004*b* is visually emphasized (2138) (e.g., displayed with increased contrast and/or increased brightness).

In some embodiments, the application windows displayed on the bottom display have a faded appearance compared to the soft keyboard, which is displayed with a bright appearance. In some embodiments, bottom display optionally displays one or more application windows of applications running on the electronic device. When the soft keyboard is not displayed on the bottom display, the one or more application windows are optionally displayed on the bottom display with full brightness and/or contrast. When the soft keyboard is displayed on the bottom display, the one or more application windows optionally continue to be displayed, but with a faded appearance. In some embodiments, displaying the application windows on the bottom display with a faded appearance while also displaying the soft keyboard on the bottom display causes the soft keyboard to be visually emphasized, thus indicating that it is available to accept user input, for example. In some embodiments, the faded appearance of the application windows on the bottom display is different from the second visual appearance of the application windows displayed on the top display of applications that do not have the input focus of the soft keyboard, such as being darker than or displayed with less contrast than the application windows on the top display that do not have the input focus of the soft keyboard, for example. Optionally, the faded appearance of the application windows on the bottom display is the same as the second visual appearance of the application windows displayed on the top display that do not have the input focus of the soft keyboard.

The above-described manner of displaying the soft keyboard with a bright appearance while displaying one or more application windows on the bottom display with a faded appearance allows the electronic device to indicate to the user that the soft keyboard will accept user input, which simplifies interactions between the user and the device and enhances the operability of the device and makes the user-device interface more efficient (e.g., by preventing inadvertent use of the soft keyboard and making the soft keyboard easier to see), which, additionally, reduces power usage and improves battery life of the device by enabling the user to use the device more quickly and efficiently.

In some embodiments, such as in FIG. 20E, the electronic device 500 concurrently displays (2140) the soft keyboard 2004*b* on the first display 504-2 (e.g., bottom display), the plurality of representations 2002*a-b* of applications running on the electronic device on the second display 504-1 (e.g., top display), and one or more second representations 2002*c* of applications running on the electronic device 500 on the first display 504-2 (e.g., one or more application windows are displayed on the bottom display while the soft keyboard is displayed on the first display), wherein the one or more second representations of applications running on the electronic device are displayed with the second visual characteristic. In some embodiments, the application windows displayed on the first display that do not have the input focus of the soft keyboard are displayed with the same visual characteristic as application windows displayed on the first display that do not have the input focus of the soft keyboard. For example, the application windows displayed on the bottom display or the top display that do not have the input focus of the soft keyboard are optionally displayed in darker colors or with lower contrast than the application window having the input focus of the soft keyboard. In some embodiments, part (e.g., a heading, a title bar, a tool bar, a content viewing portion) of the application windows of applications that do not have the input focus of the soft keyboard are de-emphasized in this way, though in some embodiments the whole window is de-emphasized in this way.

The above-described manner of displaying the application windows of applications without keyboard focus with the same visual characteristic whether the application window is on the first display or the second display allows the electronic device to present a unified visual experience which simplifies interactions between the user and the device and enhances the operability of the device and makes the user-device interface more efficient (e.g., using the same visual characteristic for application windows that do not have keyboard focus makes it clear to the user where the keyboard text will be entered, thereby reducing erroneous input), which, additionally, reduces power usage and improves battery life of the device by enabling the user to use the device more quickly and efficiently.

In some embodiments while displaying the soft keyboard on the first display 504-2 and the respective application has the input focus (2142), in accordance with a determination that a context of the respective application 2002*b* is a first context (e.g., expected length of text input based on which application the first application is), the electronic device displays (2144) the soft keyboard 2004*a* on the first display 504-2 comprises displaying the soft keyboard 2004*a* at a first size (e.g., a keyboard having first dimensions and/or including a first number of characters visible at one time), as shown in FIG. 20D. In some embodiments, the size of the keyboard is selected based on the expected length of the input text based on the first application (e.g., a text message or filling out a form versus an email or word processing application).

In some embodiments, in accordance with a determination that the context of the respective application 2002*a* is a second context (e.g., expected length of text input based on which application the first application is), different than the first context, the electronic device 500 displays (2146) the soft keyboard 2004*b* on the first display 504-2 comprises displaying the soft keyboard 2004*b* at a second size, different than the first size (e.g., a keyboard having second dimensions and/or including a second number of characters visible at one time), as shown in FIG. 20E. In some embodiments, the size of the keyboard is selected based on the expected length of the input text based on the second application (e.g., a text message or filling out a form versus an email or word processing application). In some embodiments, a "large" keyboard with large dimensions and a large number of keys is associated with word processing applications, e-mail applications, and the like. In some embodiments, a "small" keyboard with small dimensions and a small number of keys is associated with short messaging applications, web browsing (e.g., entering a URL or filling out a web form), and the like. The user optionally enters an input (e.g., selects a soft button displayed by the electronic device, speaks a voice command, performs a gesture, or enters a shortcut) to change the size of the keyboard.

The above-described manner of displaying a keyboard with a size based on the context of the application with keyboard focus allows the electronic device to conserve screen space with a smaller keyboard when appropriate and provide a larger keyboard when appropriate which simplifies interactions between the user and the device and enhances the operability of the device and makes the user-device interface more efficient (e.g., predicting when the user will need a larger keyboard versus conserving screen space when the user does not need a larger keyboard), which, additionally, reduces power usage and improves battery life of the device by enabling the user to use the device more quickly and efficiently.

In some embodiments, such as in FIG. 20D, while the respective application 2002*b* of the plurality of applications has the input focus for the soft keyboard 2004*a*, the electronic device 500 detects (2148) (e.g., at a touch screen incorporated into one or more of the first display and the second display), via the one or more input devices, a gesture, such as movement of contacts 2003*a-b*, for moving the input focus from the respective application 2002*b* to a second respective application 2002*a* of the plurality of applications.

In some embodiments, the user changes which window has the keyboard focus by performing a gesture associated with changing the keyboard focus from one application to another. For example, the gesture for selecting an application for input focus of the soft keyboard optionally comprises one or more of detecting a flick gesture over the soft keyboard, one or more contacts selecting and moving the soft keyboard towards the respective application, two contacts selecting and moving the soft keyboard towards the respective application, and one or more contacts selecting the soft keyboard at a predetermined location of the soft keyboard (e.g., the edges of the soft keyboard or anywhere on the soft keyboard other than the space bar) and movement of the contacts. In some embodiments, when the electronic device detects that the movement is towards a text field that does not have the input focus of the soft keyboard displayed in the window of the respective application that has the input focus of the soft keyboard, the electronic device makes the text field have the input focus of the soft keyboard. In other words, the user is optionally able to provide a moving gesture over the soft keyboard to update which text field and/or which application window has the input focus of the soft keyboard.

In some embodiments, in response to detecting the gesture 2003*a-b* for moving the input focus from the respective application 2002*b* to the second respective application 2002*a* (2150) illustrated in FIG. 20D, the electronic device 500 moves (2152) the input focus from the respective application 2002*b* to the second respective application 2002*a*, as shown in FIG. 20E, the electronic device 500 displays (2154) a representation of the respective application

2002*b* with the second visual characteristic (e.g., the visual characteristic indicative that the respective application does not have the input focus of the soft keyboard), and displays (2156) a representation of the second respective application 2002*a* with the first visual characteristic (e.g., the visual characteristic indicative that the second respective application has the input focus of the soft keyboard).

The above-described manner of using gestures for switching which application has keyboard focus allows the electronic device to provide an efficient way of changing which application has keyboard focus and enhances the operability of the device and makes the user-device interface more efficient (e.g., providing an improved way of changing which application has the keyboard focus), which, additionally, reduces power usage and improves battery life of the device by enabling the user to use the device more quickly and efficiently.

In some embodiments, such as in FIG. 20D, the gesture for moving the input focus from the respective application 2002*b* to the second respective application 2002*a* comprises one or more contacts 2003*a-b* detected at one or more locations in the soft keyboard 2004*a* and movement of the one or more contacts in a direction towards the representation 2002*a* of the second respective application (2158) (e.g., touch input for dragging the keyboard changes the keyboard focus from one application to another application or from one text field to another text field within one application). In some embodiments, the application and/or text entry field that receives the keyboard focus is determined based on the direction of the movement (e.g., movement to the left causes an application displayed in a window to the left of the application that currently has keyboard focus to receive the keyboard focus, etc.). For example, when the electronic device detects movement of one or more contacts on the soft keyboard towards a third application window, the electronic device determines that the third application window has the input focus of the soft keyboard.

The above-described manner of changing which application and/or text entry field has the keyboard focus by detecting touch input for moving the keyboard allows the electronic device to change which application has keyboard focus in response to a gesture received at a location on the first display that includes the keyboard and enhances the operability of the device and makes the user-device interface more efficient (e.g., providing a way of changing which application has the keyboard focus in response to a gesture received at the keyboard itself), which, additionally, reduces power usage and improves battery life of the device by enabling the user to use the device more quickly and efficiently.

In some embodiments, such as in FIG. 20D, the one or more contacts 2003*a-b* detected at one or more locations in the soft keyboard 2004*a* comprise two contacts detected within a same respective key (e.g., the space bar) of the soft keyboard 2004*a* (2160). In some embodiments, the electronic device detects a gesture including two contacts at the space bar of the soft keyboard and movement of those two contacts and, in response, changes the input focus of the soft keyboard in accordance with the movement of the two contacts. In some embodiments, the keyboard does not move in response to the two-contact gesture, and only the input focus of the keyboard changes.

The above-described manner of changing which application and/or text entry field has the keyboard focus by detecting two contacts at a respective key of the soft keyboard and movement of those contacts allows the electronic device to change which application has keyboard focus in response to a gesture received at the soft keyboard and enhances the operability of the device and makes the user-device interface more efficient (e.g., providing a way of changing which application has the keyboard focus in response to a gesture received at the keyboard itself), which, additionally, reduces power usage and improves battery life of the device by enabling the user to use the device more quickly and efficiently.

In some embodiments, such as in FIG. 20Z while displaying the soft keyboard 2004*a* with the respective application 2002*d* having the input focus of the soft keyboard 2004*a*, the electronic device 500 detects (2162), with the one or more input devices (e.g., at a touch screen incorporated into one or more of the first display and the second display), a gesture such as selection of option 2020 with contact 2003 illustrated in FIG. 20Z for expanding the representation of the respective application having the input focus of the soft keyboard (e.g., a gesture for expanding the representation to a "full screen" size that covers all or most of the top display). In some embodiments, the gesture is detected within the soft keyboard.

In some embodiments, in response to detecting the gesture 2003 for expanding the representation of the respective application 2002*d* having the input focus of the soft keyboard 2004*a* illustrated in FIG. 20Z, the electronic device expands (2164) the representation 2002*d* of the respective application having the input focus of the soft keyboard 2004*a*, as shown in FIG. 20AA. In some embodiments, the device expands the window that currently has keyboard focus to a "full screen" size in response to detecting a gesture at the soft keyboard displayed on the bottom display.

The above-described manner of providing for a gesture for expanding a window of the application that has keyboard focus to a "full screen" size allows the electronic device to present more information pertaining to a program that is currently accepting keyboard input in response to a gesture performed at the soft keyboard and enhances the operability of the device and makes the user-device interface more efficient (e.g., providing an improved way of expanding a window of the application has the keyboard focus to a "full screen" size), which, additionally, reduces power usage and improves battery life of the device by enabling the user to use the device more quickly and efficiently.

In some embodiments, such as in FIG. 20F while displaying the soft keyboard 2004*b*, the electronic device 500 detects (2166), at the one or more input devices (e.g., at a touch screen incorporated into the first display or the second display), two contacts 2003*a-b* in the soft keyboard 2004*b* and movement of the two contacts 2003*a-b* (e.g., detecting one or more contacts at locations on the bottom display including the soft keyboard and motion of the one or more contacts, such as detecting a swipe or a contact movement). In some embodiments, the input for repositioning the soft keyboard is a two-finger swipe or two-finger movement originating at the location of the soft keyboard on the bottom display.

In some embodiments, in response to detecting the two contacts 2003*a-b* and the movement of the two contacts 2003*a-b*, the electronic device 500 repositions (2168) the soft keyboard 2004*b* on the first display 504-2 in accordance with the movement of the two contacts, as shown in FIG. 20G. The keyboard optionally moves across the first display as though the detected contacts "drag" the keyboard to reposition it. In some embodiments, detection of a single contact and movement of the single contact within the soft keyboard does not reposition the keyboard, and instead optionally causes selection of a key within the soft keyboard to input a character corresponding to the key into the window that has the current input focus.

The above-described manner of repositioning the soft keyboard allows the electronic device to customize the location of the soft keyboard in response to user input and makes the user-device interface more efficient (e.g., improving the ergonomics of the soft keyboard, thereby allowing the user to enter input faster), which, additionally, reduces power usage and improves battery life of the device by enabling the user to use the electronic device more quickly and efficiently.

In some embodiments, such as in FIG. 20H the electronic device detects (2170), at the one or more input devices (e.g., the first display includes or is a touch screen), a pinch gesture 2003*a-b* in the soft keyboard 2004*a* (e.g., a gesture comprising two contacts at locations on the first display including the soft keyboard and movement of the two contacts in opposite directions). In some embodiments, in response to detecting the pinch gesture, the electronic device 500 resizes (2172) the soft keyboard 2004*b* on the first display 504-2 in accordance with the pinch gesture, such as in FIG. 20I (e.g., based on the size of the pinch or de-pinch).

In some embodiments, a pinch includes inward movement of the two contacts and a de-pinch includes outward movement of the two contacts. In some embodiments, resizing the soft keyboard includes one or more of scaling the size of the soft keys and changing the number of soft keys displayed at once. For example, in response to a de-pinch, the size of the soft keyboard optionally increases, which optionally increases the number of soft keys that are concurrently displayed and/or scales up the size of the soft keys. In response to a pinch, the size of the soft keyboard optionally decreases, which optionally decreases the number of soft keys that are concurrently displayed and/or scales down the size of the soft keys.

The above-described manner of resizing the soft keyboard allows the electronic device to customize the size of the soft keyboard in response to user input and makes the user-device interface more efficient (e.g., improving the ergonomics of the soft keyboard and/or displaying more information), which, additionally, reduces power usage and improves battery life of the device by enabling the user to use the electronic device more quickly and efficiently.

In some embodiments, resizing the soft keyboard comprises resizing the soft keyboard to one of a plurality of predetermined soft keyboard sizes 2004*a*, 2004*b*, or 2004*c* illustrated in FIGS. 20H-J in accordance with the pinch gesture (2174). The predetermined soft keyboard sizes optionally include a button, a swipe keyboard, an app-sized keyboard (e.g., sized at the same width and/or height as the application window that has current input focus), a full size keyboard, a full screen keyboard, etc. Each predetermined size optionally includes an associated keyboard size and an associated number of keys displayed at once and one or more of these attributes are unique to each predetermined soft keyboard size. In some embodiments, the keyboard is displayed at a smaller predetermined size in response to an inward pinch gesture and the keyboard is displayed at a larger predetermined size in response to an outward pinch gesture. The keyboard optionally continues to change size as the gesture continues to be performed.

The above-described manner of resizing the soft keyboard to one of a plurality of predetermined sizes allows the electronic device to more efficiently resize the keyboard and makes the device function more efficiently (e.g., quickly resizing the keyboard conserves computing power and takes less time than dynamic resizing), which, additionally, reduces power usage and improves battery life of the electronic device by conserving computing power.

In some embodiments, such as in FIG. 20J, the plurality of predetermined soft keyboard sizes includes a swipe keyboard 2004*c*, the swipe keyboard comprising a swipe input area for accepting swipe input (2176). In some embodiments, the swipe keyboard is a relatively small keyboard that accepts touch input from the user including handwritten characters. In some embodiments, the swipe input comprises one or more contacts and movement of each contact that define the shapes of handwritten characters. For example, the electronic device detects movement of one or more contacts and matches the movements to characters to convert the handwritten text to typed text displayed on the electronic device. Additionally or alternatively, in some embodiments, the swipe keyboard comprises a small-sized soft keyboard that accepts swipes over the soft keys, thereby allowing the user to type characters without lifting off between characters.

The above-described manner of resizing the soft keyboard to a swipe keyboard allows the electronic device to accept user-input characters in a reduced amount of space and makes the user-device interface more efficient (e.g., using more display space to display information, allowing the user to view more information at once), which, additionally, reduces power usage and improves battery life of the device by enabling the user to use the electronic device more quickly and efficiently.

In some embodiments, such as in FIG. 20L, the plurality of predetermined soft keyboard sizes includes a keyboard button 2004*d*, the keyboard button comprising a button for re-sizing the keyboard to a predetermined soft keyboard size, such as one of keyboards 2004*a-c* illustrated in FIGS. 20H-J, larger than the keyboard button 2004*d* (2178). In some embodiments, the soft keyboard is replaced with a button selectable to display the soft keyboard on the first display. When the keyboard button is selected, the soft keyboard is displayed at a predetermined size that is optionally a size associated with selection of the keyboard button (e.g., selecting the keyboard button causes the soft keyboard to be displayed at a same size each time it is selected), at a size that is the same as the size at which the soft keyboard was most recently displayed before it was reduced to the keyboard button, or at a size selected in accordance with the application and/or text field that currently has the input focus of the soft keyboard (e.g., a large size for applications such as e-mail, word processing, and the like or a small size for applications such as short messaging, instant messaging, web browsing, or the like). In some embodiments, the keyboard button is the smallest predetermined soft keyboard size.

The above-described manner of resizing the soft keyboard to a keyboard button allows the electronic device to reduce the amount of space on the first display used for displaying the soft keyboard and makes the user-device interface more efficient (e.g., using more display space to display information, allowing the user to view more information on the first display at once), which additionally reduces power usage and improves battery life of the electronic device by enabling the user to use the electronic device more quickly and efficiently.

In some embodiments, such as in FIG. 20BB, while displaying the plurality of representations 2002*a* and 2002*b* of applications on the second display 504-1 (e.g., top display) and the soft keyboard 2004*a* on the first display 504-1 (e.g., bottom display), the electronic device 500 receives (2180), at the one or more input devices, an indication of an input such as movement of contact 2003 (e.g., a swipe gesture) to move a respective representation 2002*b* of a respective application of the plurality of representations of applications from the second display 504-1 to the first display 504-2 (e.g., a swipe gesture to "move" an application window from the second display to the first display, such as a swipe of the respective representation down towards the bottom display).

In some embodiments, in response to receiving the indication (2182) illustrated in FIG. 20BB, the electronic device 500 updates (2184) the second display 504-1 to cease displaying the respective representation 2002*b* of the respective application, as shown in FIG. 20CC, and updates (2186) the first display 504-2 to display a representation 2002*b* of the respective application (2188) (e.g., the application window on the first display includes the same content that was included in the application window on the second display) and cease displaying the soft keyboard 2004*a* (2190). In some embodiments, the application window takes the place of the soft keyboard on the first display. The electronic device optionally ceases the display of other soft controls (e.g., a soft trackpad, one or more soft buttons) displayed on the first display when ceasing the display of the soft keyboard. For example, while displaying the soft keyboard on the bottom display and an application window on the top display, the electronic device optionally detects a downward swipe gesture on the application window for moving the application window to the bottom display. In response to the swipe gesture, the electronic device optionally ceases displaying the soft keyboard on the bottom display and the application window on the top display, and optionally displays the application window on the bottom display.

The above-described manner of moving an application window from the second display to the first display and replacing the soft keyboard allows the electronic device to display more information at once and makes the user-device interface more efficient, which additionally reduces power usage and improves battery life of the electronic device by enabling the user to use the electronic device more quickly and efficiently.

In some embodiments, such as in FIGS. 20P-20Q the electronic device 500 detects (2192), at the one or more input devices (e.g., the first display includes or is a touch screen), a touch input 2003 including a contact and a movement of the contact in the soft keyboard 2004*b* (e.g., a flick or swipe on the soft keyboard on the bottom display). In some embodiments, in response to detecting the touch input 2003 in the soft keyboard 2004*b* (2194), in accordance with a determination that the touch input satisfies focus-change criteria (e.g., the touch input is a flick, a speed of the movement of the contact is above a predetermined threshold speed, and/or a duration of the movement of the contact is below a predetermined time threshold, etc.), the electronic device 500 changes (2196) the input focus of the soft keyboard 2004*b* in accordance with the touch input, such as in FIG. 20Q. In some embodiments, the electronic device changes the input focus of the soft keyboard in response to detecting a flick. In some embodiments, the respective application is selected based on the direction of the flick. In other words, the electronic device selects the respective application window located in the direction of the flick.

In some embodiments, in accordance with a determination that the touch input 2003 does not satisfy the focus-change criteria (e.g., the touch input is not a flick (e.g., it is a slower swipe), the speed of the movement of the contact is below the predetermined threshold, the duration of the movement of the contact is above the predetermined time threshold, etc.), the electronic device 500 moves (2198) the pointer 2012*b* on the second display 504-1 in accordance with the movement, such as in FIG. 20P. In some embodiments, the electronic device displays and moves a pointer in response to detecting a movement of a contact on the first display. In this way, the first display functions as a trackpad in response to detecting a movement of a contact at a location of the soft keyboard that is not a flick. In some embodiments, the electronic device displays the cursor in response to detecting the slower swipe for controlling the cursor (e.g., the cursor is not displayed prior to receiving the input). In some embodiments, the cursor is already displayed on the top display prior to receiving the slower swipe input for controlling the cursor.

The above-described manner of changing the input focus of the soft keyboard or controlling a pointer allows the electronic device to accept a number of different inputs based on different gestures performed at the soft keyboard and makes the user-device interface more efficient (e.g., the user is able to perform different operations based on different gestures received at one general location of the electronic device), which additionally reduces power usage and improves battery life of the electronic device by enabling the user to use the electronic device more quickly and efficiently.

In some embodiments, such as in FIGS. 20R-20S while displaying, on the first display 504-2, the soft keyboard 2004*a* and displaying, on the second display 504-1, the plurality of representations 2002*b* and 2002*d* of applications running on the electronic device 500 (2198-2): the electronic device 500 displays (2198-4), within the representation of the respective application, a first text entry field 2014*a* and a second text entry field 2014*b* (e.g., sections of the user interface in which text is able to be entered by the user) and detects (2198-6), at the one or more input devices (e.g., the second display includes or is a touch screen), a swipe input 2003 in the soft keyboard 2004*a*. In some embodiments, the swipe begins at the soft keyboard. The swipe is a movement of the contact having one or more predetermined characteristics such as speed, length, and duration.

In some embodiments, in response to detecting the swipe input in the soft keyboard (2198-8), in accordance with a determination that a direction of the swipe input is toward the first text entry field 2014*b*, the electronic device selects (2198-10) the first text entry field 2014*b* to have the input focus of the soft keyboard, such as in FIG. 20R. In some embodiments, in accordance with a determination that the direction of the swipe input is toward the second text entry field, the electronic device selects (2198-12) the second text entry field to have the input focus of the soft keyboard. Likewise, if the electronic device 500 were to detect an upward swipe in the soft keyboard 2004*a* while text entry filed 2014*b* has the input focus of the soft keyboard 2004*a*, the electronic device 500 would change the keyboard focus to text entry field 2014*a*. In some embodiments, in response to receiving a swipe at a location on the first display including the soft keyboard, the electronic device changes the keyboard focus to the text entry field toward which the swipe is directed. While displaying the soft keyboard on the first display and the plurality of application windows on the second display, the electronic device optionally detects a swipe at a location on the first display including the soft keyboard and, in response to the swipe, optionally updates the input focus of the soft keyboard to be in a text entry field in the direction of the swipe. For example, a downward swipe optionally causes the input focus of the soft keyboard to be directed to a text entry field beneath the text entry field that currently has the input focus of the soft keyboard.

The above-described manner of selecting a text entry field for the input focus of the soft keyboard allows the electronic device to change the input focus of the soft keyboard in response to a swipe received at a location on the first display having the soft keyboard and makes the user-device interface more efficient (e.g., the user is able to change the input focus using a gesture at the soft keyboard, which is close to where the user enters touch input to use the soft keyboard), which additionally reduces power usage and improves battery life of the electronic device by enabling the user to use the electronic device more quickly and efficiently.

In some embodiments, while displaying, on the first display, the soft keyboard and displaying, on the second display, the plurality of representations of applications running on the electronic device (2198-14), the electronic device detects (2198-16), at the one or more input devices (e.g., at a touch screen incorporated into one or more of the first display and the second display), a touch input in the soft keyboard on the first display.

In some embodiments, in response to detecting the touch input in the soft keyboard (2198-18), in accordance with a determination that the touch input 2003 illustrated in FIG. 20O satisfies second display control criteria (2198-20) (e.g., finger movement having a particular shape, duration, or length; a predetermined number of concurrent contacts (e.g., a two-finger touch), a touch and hold for an amount of time equal to or exceeding a predetermined threshold amount of time, etc.), the electronic device configures (2198-22) the first display 504-2 to operate as a trackpad to provide input to the second display 504-1 and provides (2198-24), as input, the touch input 2003 to the second display (e.g., subsequent touch input causes an action to be performed on the top display, such as controlling a cursor displayed on the top display, scrolling or zooming content on the top display, making a selection on the top display, etc.). While the operation on the second display is being controlled with a gesture detected at the first display, the soft keyboard is optionally faded in its appearance on the first display. In some embodiments, different actions are performed on the second display depending on which gesture is detected at the first display. As an example, in response to a two-finger swipe received at the first display, the electronic device scrolls the content displayed on the second display. Other gestures and operations are possible.

In some embodiments, such as in FIG. 20J, in accordance with a determination that the touch input 2003 does not satisfy the second display 504-1 control criteria, the electronic device 500 provides (2198-26), as input, the touch input to the soft keyboard 2004*c* on the first display 504-2. In some embodiments, the electronic device enters a character corresponding to a key selected by the touch input or performs another operation with the keyboard in accordance with the touch input.

The above-described manner of controlling an operation on the second display allows the electronic device to control an operation at the second display in response to a gesture detected at the first display and makes the user-device interface more efficient (e.g., the user is able to control an operation at the second display using a gesture at the first display, which is close to where the user enters touch input to use the soft keyboard), which additionally reduces power usage and improves battery life of the electronic device by enabling the user to use the electronic device more quickly and efficiently.

In some embodiments, such as in FIG. 20O, the second display 504-1 control criteria are satisfied when the touch gesture 2003 comprises a first contact 2003 and less than a threshold movement of the first contact during a predefined time 2008 period (2198-28) (e.g., 0.5, 1 or 2 seconds), and providing, as input, the touch input to the second display comprises moving a cursor 2012*a*-*b* displayed on the second display 504-1 in accordance with movement of the first contact 2003 on the first display 504-2 after the predefined time 2008 period (2198-30) such as in FIG. 20P. In some embodiments, the threshold duration of time is longer than an expected duration of time of a contact for selecting a key of the soft keyboard to enter text at the electronic device. For example, in response to detecting a contact having a duration less than the predetermined threshold, the electronic device optionally enters keyboard input in accordance with the location of the contact and in response to detecting a contact having a duration of time greater than the predetermined threshold, the electronic device optionally displays a cursor on the top display and optionally moves the cursor in accordance with subsequent movement of the contact. In some embodiments, the cursor is displayed on the top display prior to detecting the first contact. In some embodiments, the cursor is displayed on the top display in response to detecting the first contact.

The above-described manner of detecting a gesture for controlling an operation at the top display allows the electronic device to distinguish between the user performing the gesture and a request to enter text using the soft keyboard and makes the user-device interface more efficient (e.g., the user is able to control an operation at the second display using a gesture at the first display without interfering with use of the soft keyboard), which additionally reduces power usage and improves battery life of the electronic device by enabling the user to use the electronic device more quickly and efficiently.

In some embodiments, such as in FIGS. 20V-X while the first display 504-2 is configured to operate as the trackpad and while detecting the first contact 2003*b* on the first display, the electronic device detects (2198-32), with the one or more input devices, a second contact 2003*a* on the first display and continued movement of the first contact 2003*b* as illustrated in FIG. 20U. The electronic device optionally detects a movement of the second contact while detecting the movement of the first contact. In some embodiments, the second contact does not move while the first contact continues to move.

In some embodiments, in response to detecting the continued movement of the first contact 2003*b* while detecting the second contact 2003*a*, the electronic device 500 selects (2198-34) (e.g., highlighting, emphasizing, etc.) a portion of content (e.g., text, images, or other content) displayed on the second display 504-1 in accordance with the continued movement of the first contact 2003*b* such as in FIG. 20X (e.g., while the second contact is detected, the movement of the first contact controls which content is selected). In some embodiments, the movement of the second contact controls which content is selected. In response to detecting the first contact for the threshold period of time, the electronic device optionally displays a cursor on the top display and, in response to detecting the second contact, the electronic device optionally selects and highlights text displayed on the top display in accordance with the movement of the first contact. For example, if, while the second contact is being detected, the movement of the first contact includes a movement to the right, the electronic device optionally selects and highlights text that is to the right of the displayed cursor.

The above-described manner of selecting content displayed at the top display allows the electronic device to select a portion of content displayed by the top display in response to a gesture received at the bottom display (e.g., the user is able to control the selection of content displayed on the top display using a gesture at the bottom display, which is close to the location where text input at the soft keyboard is received), which additionally reduces power usage and improves battery life of the electronic device by enabling the user to use the electronic device more quickly and efficiently.

In some embodiments, such as in FIG. 20V while the first display continues to operate as the trackpad to provide input to the second display and while displaying, on the second display, the cursor 2012*b*, the electronic device detects (2198-36), with the one or more input devices, a tap comprising a second contact such as 2003*a* and liftoff of the second contact. In some embodiments, the first contact is held in place while the tap is detected. In some embodiments, the electronic device detects liftoff of the first contact and detects the tap within a threshold amount of time (e.g., 0.5 seconds or 1 second) for continuing to operate the first display as a trackpad to provide input to the second display. In other words, the tap is optionally detected without any other concurrent contacts or the tap is optionally detected while the first contact continues to be held.

In some embodiments, such as in FIG. 20V, in response to detecting the tap 2003*a*, the electronic device 500 places (2198-38) a text insertion marker at a location on the second display in accordance with (e.g., proximate to) a location on the second display at which the cursor is being displayed when the tap is detected, such as at the location of cursor 2012*b* illustrated in FIG. 20V. In some embodiments, the insertion marker is placed at the location of the cursor, at the start or end of a word displayed at a location where the cursor is displayed, or at the start or end of a line of text located next to the cursor. In some embodiments, the first display remains in the trackpad mode until the threshold amount of time (e.g., 05 seconds or 1 second) for continuing to operate the first display as a trackpad has passed after the liftoff of the first contact and liftoff of the second contact (e.g., the first display optionally transitions away from operating as the trackpad after the threshold amount of time has passed while no touch input is detected at the first display. After placing the insertion marker, when the electronic device returns to the soft keyboard mode, the user is optionally able to enter one or more characters at the location of the insertion marker using the soft keyboard.

The above-described manner of placing the insertion marker allows the electronic device to place the insertion marker at the second display in response to a gesture received at the first display (e.g., the user optionally places the insertion marker displayed on the second display using a gesture at the first display, which is close to the location where text input at the soft keyboard is received), which additionally reduces power usage and improves battery life of the electronic device by enabling the user to use the electronic device more quickly and efficiently.

In some embodiments, such as in FIGS. 20N-P before configuring the first display 504-2 to operate as the trackpad to provide input to the second display 504-1, the electronic device 500 displays (2198-40), on the second display 504-1, the plurality of representations 2002*a*-2002*b* of applications without displaying a cursor 2012*a*-*b* on the second display 504-1. The electronic device optionally displays the cursor on the top display in response to detecting a touch input that satisfies the second (e.g., top) display control criteria. In some embodiments, prior to detecting the touch input that satisfies the second display control criteria, the cursor is not displayed on the top display.

In some embodiments, such as in FIG. 20O configuring the first display 504-2 to operate as the trackpad to provide input to the second display 504-1 comprises (2198-42) displaying the cursor 2012*a* on the second display 504-1 with a visual effect indicating that the first display 504-2 has been configured to operate as the trackpad to provide input to the second display 504-1 (2198-44) (e.g., enlarging then shrinking, being displayed in a bright color, displaying an animation, etc.) and after displaying the cursor 2012*a* on the second display 504-1 with the visual effect, as shown in FIG. 20P, displaying the cursor 2012*b* on the second display 504-1 without the visual effect (2198-46) (e.g., after a predetermined amount of time (e.g., 0.5 seconds, 1 second, etc.), the appearance of the cursor is updated to be displayed without the visual effect). For example, if the visual effect comprises enlarging then shrinking, the cursor is optionally updated to be displayed at a constant size. If the visual effect comprises being displayed in a bright color, the cursor is optionally updated to be displayed at a different color (e.g., black, white, or another neutral color optionally with a different colored border). If the visual effect comprises an animation, the cursor is optionally updated to no longer include the animation.

The above-described manner of displaying the cursor with a visual effect when it is first displayed on the top display allows the electronic device to display the cursor in a way that such that it is easily located by the user, which simplifies interactions between the user and the electronic device (e.g., the user is able to more quickly locate, and thereby use, the cursor), which additionally reduces power usage and improves battery life of the electronic device by enabling the user to use the electronic device more quickly and efficiently.

In some embodiments, such as in FIG. 20D, while displaying, on the first display 504-2, the soft keyboard 2004*a* and displaying, on the second display 504-1, the plurality of representations 2002*a-b* of applications running on the electronic device 500 with the respective application 2002*b* having the input focus of the soft keyboard, the electronic device 500 displays (2198-48), on the first display 504-2 a toolbar 2006*a* associated with the respective application 2002*b* (e.g., a visually distinguished section of the user interface including one or more affordances for performing operations associated with an application running on the electronic device or the operating system of the electronic device).

In some embodiments, such as in FIG. 20D in accordance the determination that the respective application is the first application 2002*b*, the toolbar 2006*a* includes one or more first tools associated with the first application 2002*b* (2198-50) (e.g., affordances for performing actions in the first application) and, as shown in FIG. 20E, in accordance with the determination that the respective application is the second application 2002*a*, the toolbar 2006*b* includes one or more second tools associated with the second application 2002*a* (e.g., affordances for performing actions in the second application), the second tools different from the first tools (2198-52). In some embodiments, the toolbar is updated to include tools associated with the application that has the current input focus of the soft keyboard.

In some embodiments, while displaying the soft keyboard 2004*a* illustrated in FIG. 20H and the toolbar 2006*a* on the first display 504-2, the electronic device 500 receives (2198-54), via the one or more input devices, an input moving the soft keyboard to the toolbar, such as in a manner similar to movement of contact 2003*a-b* illustrated in FIG. 20F (e.g., receiving a voice input, a keyboard input, or a touch input (e.g., a predetermined gesture or selection of a user interface element for collapsing the toolbar)). Dragging the soft keyboard towards the toolbar (e.g., using a mouse or a touch input) optionally causes the toolbar to collapse, in some embodiments, in response to the soft keyboard colliding with/overlapping with the toolbar on the first display.

In some embodiments, in response to receiving the input moving the soft keyboard to the toolbar, the electronic device reduces (2198-56) a size of the toolbar on the first display 504-2 (e.g., reduce the size of the affordances associated with the actions or the number of tools displayed), such as ceasing the display of toolbar 2006*c* illustrated in FIG. 20H and displaying on the first display 504-2 the toolbar 2006*b* illustrated in FIG. 20G. In some embodiments, reducing the size of the toolbar comprises reducing its size while maintaining the number of tools in the toolbar (e.g., each tool is displayed at a smaller size). In some embodiments, reducing the size of the toolbar comprises reducing the number of tools in the toolbar (e.g., updating the toolbar to include fewer rows of tools or shortening the one or more rows of tools of the toolbar). As an example, when a word processing application has the input focus of the soft keyboard, the toolbar includes tools related to word processing, such as font settings, copy, paste, etc. As another example, when an e-mail application has the current input focus of the soft keyboard, the toolbar includes tools related to e-mail, such as a files tray to embed files (e.g., photos, videos, documents, or other file types) into an e-mail and text formatting tools (e.g., font size, font color, font style, copy, paste, cut, etc.). In some embodiments, the toolbar is updated depending on which text field has current input focus of the soft keyboard. For example, when a "to" field of an e-mail application has the current input focus of the soft keyboard, the toolbar includes a "contacts" tray including visual representations (e.g., avatars, photos, other images, etc.) of contacts stored on the electronic device with the contacts included in the e-mail displayed with a visual distinction.

The above-described manner of updating a toolbar displayed by the electronic device allows the electronic device to present shortcuts for performing operations related to the application that has the current input focus of the soft keyboard and makes the user-device interface more efficient (e.g., by presenting shortcuts for operations the user is more likely to want to perform), which, additionally reduces power usage and improves battery life of the device by enabling the user to use the device more quickly and efficiently.

In some embodiments, such as in FIG. 20I, while displaying the soft keyboard 2004*b* and the toolbar 2006*b* on the first display 504-2 (e.g., while displaying the reduced-size toolbar in response to the movement of the keyboard to/over the original toolbar, or while displaying the original toolbar before the keyboard was moved to it to reduce its size), the electronic device receives (2198-58), via the one or more input devices, a request to reduce a size of the soft keyboard on the first display such as movement of contacts 2003*a-b* (e.g., a voice input, a keyboard input, or a touch input (e.g., a gesture or selection of a soft button for collapsing the soft keyboard).

In some embodiments, in response to receiving the request to reduce the size of the soft keyboard 2004*b* (2198-60), the electronic device displays (2198-62) the soft keyboard at a reduced size on the first display, such as displaying the soft keyboard 2004*c* illustrated in FIG. 20J, (e.g., updating the soft keyboard to include keys that are smaller or a smaller number of keys) and increases (2198-64) a number of tools included in the toolbar associated with the respective application with the input focus of the soft keyboard, such as displaying toolbar 2006*c* illustrated in FIG. 20H instead of toolbar 2006*b* illustrated in FIG. 20I. In some embodiments, the size of the soft keyboard changes between predetermined keyboard sizes. In some embodiments, the first display is updated to display additional parts of the toolbar where parts of the soft keyboard were previously displayed. In some embodiments, the electronic device displays, in the toolbar, one or more tools that were not displayed previously in response to the reduction in size of the soft keyboard. In some embodiments, the additional tools are displayed in addition to the tools that were originally displayed in the toolbar.

The above-described manner of updating the first display to include a smaller soft keyboard and a larger toolbar allows the electronic device to display additional tools and enhances the operability of the electronic device and makes the user-device interface more efficient (e.g., providing a way for the user to view and perform additional operations from the toolbar), which, additionally, reduces power usage and improves battery life of the device by enabling the user to use the device more quickly and efficiently.

It should be understood that the particular order in which the operations in FIGS. 21A-21N have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, 1700, and 1900) are also applicable in an analogous manner to method 2100 described above with respect to FIGS. 21A-21N. For example, the content, electronic devices, user interfaces, keyboards, user interactions, etc., described above with reference to method 2100 optionally have one or more of the characteristics of the content, electronic devices, user interfaces, keyboards, user interactions, etc. described herein with reference to other methods described herein (e.g., methods 700, 900, 1100, 1300, 1500, 1700, and 1900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 21A-21N are, optionally, implemented by components depicted in FIGS. 1A-1B. For example, receiving operations 2180, 2198-54, and 2198-58 and displaying operations 2102, 2114, 2116, 2120, 2122, 2130, 2134, 2140, 2144, 2146, 2154, 2156, 2188, 2198-4, 2198-40, 2198-44, 2198-46, 2198-48, and 2198-62 are, optionally, implemented by event sorter 170, event recognizer 180, and event handler 190. Event monitor 171 in event sorter 170 detects a contact on touch screen 504-1, 504-2, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to control and/or present information to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present or control information in a meaningful way to the user. Accordingly, use of such personal information data enables users to more personalized delivery of such services. Further, other uses for personal information data that benefit the user are also contemplated by the present disclosure. For instance, location data may be used to provide navigation directions to a location of interest to the user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting or sharing location data, the present technology can be configured to allow users to select to "opt in" or "opt out" of participation in the storage of personal information data in various situations during registration for services or anytime thereafter. In another example, users can select not to share location data. In addition to providing "opt in" and "opt out" options, the present disclosure contemplates providing notifications relating to the access or use of personal information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location information can be deleted after a user obtains directions to the location of an event.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at a first electronic device in communication with a first display and one or more input devices:
 displaying respective content on the first display; and
 after displaying the respective content on the first display, receiving a request to share the respective content with a user of a second electronic device;
 in response to receiving the request to share the respective content;
  initiating display of a video conference user interface of a video conference on the first display and initiating sharing of the respective content with the user of the second electronic device; and displaying the respective content on a second display in communication with the first electronic device;

while displaying the video conference user interface and sharing the respective content:

receiving, at the first electronic device, an indication of interaction by a user of the second electronic device with the respective content at the second electronic device; and in response to receiving the indication of the interaction by the user of the second electronic device with the respective content at the second electronic device, generating, at the first electronic device, an indication of one or more characteristics of the interaction of the user of the second electronic device with the respective content at the second electronic device;

while displaying the video conference user interface on the first display and the respective content on the second display, receiving a request to end the video conference; and in response to receiving the request to end the video conference, displaying the respective content on the first display.

2. The method of claim 1, further comprising:

at the first electronic device:

displaying the respective content in a shared space on the first display, wherein the shared space is displayed as visually between the first electronic device and the second electronic device; and displaying first private content not shared with the user of the second electronic device in a first private space visually extending in a first direction from the shared space towards the first electronic device.

3. The method of claim 2, wherein:

the first electronic device displays the respective content in the shared space from a first perspective, and the second electronic device displays the respective content in the shared space from a second perspective.

4. The method of claim 1, wherein:

the respective content is displayed on a second display in communication with the first electronic device in a shared space, the shared space comprising a first visual representation of a table between the first electronic device and the second electronic device on which the respective content is placed.

5. The method of claim 1, further comprising:

receiving, at the first electronic device, an indication of whether the user of the second electronic device is looking at a visual representation of the respective content displayed on the second electronic device; and in response to receiving the indication of whether the user of the second electronic device is looking at the visual representation of the respective content displayed on the second electronic device:

generating, at the first electronic device, an indication of whether the user of the second electronic device is looking at the respective content, wherein the indication is separate from the video conference user interface.

6. The method of claim 1, further comprising:

receiving, at the first electronic device, a user input comprising a touch on a portion of the respective content displayed by the first electronic device; and in response to receiving the user input, displaying a visual indication at the portion of the respective content that corresponds to the touch received on the portion of the respective content.

7. The method of claim 1, further comprising:

receiving an input corresponding to a user of the first electronic device pointing, with an elongated object, at a respective location in a three-dimensional representation of the respective content displayed at the first electronic device; and displaying, at the first electronic device, a visual distinction at the respective location of the respective content.

8. The method of claim 1, wherein:

the interaction by the user of the second electronic device with the respective content at the second electronic device comprises a touch input received at a location of the respective content, and generating, at the first electronic device, the indication of the one or more characteristics of the interaction of the user of the second electronic device with the respective content at the second electronic device comprises displaying a visual indication at the location in the respective content displayed by the first electronic device at which the touch input was received at the second electronic device.

9. The method of claim 1, wherein the respective content is displayed on the first display in the video conference user interface overlaid over video conference content.

10. The method of claim 9, wherein:

displaying the respective content on the first display over the video conference user interface comprises displaying the respective content on a transparent plane over the video conference user interface.

11. The method of claim 1, wherein:

the indication of the interaction by the user of the second electronic device with the respective content at the second electronic device comprises an indication of a location within the respective content at which the user of the second electronic device is looking, and generating, at the first electronic device, the indication of the one or more characteristics of the interaction of the user of the second electronic device with the respective content at the second electronic device comprises visually differentiating the location within the respective content corresponding to the location at which the user of the second electronic device is looking from a remainder of the respective content.

12. The method of claim 1, wherein:

in accordance with a determination that a first respective display of the first display and a second display in communication with the first electronic device is in a first orientation, initiating display of a video conference user interface on the first display includes displaying the video conference user interface on the first respective display; and in accordance with a determination that a second respective display of the first display and the second display is in a second orientation, different than the first orientation, initiating sharing of the respective content with the user of the second electronic device includes displaying the respective content on the second respective display.

13. The method of claim 1, further comprising:

while displaying, on the first display, the video conference user interface including video conference content, displaying the respective content on a second display in communication with the first electronic device.

14. The method of claim 1, further comprising: prior to receiving the request to share the respective content with the user of the second electronic device, displaying the respective content on the first display, wherein the request to share the respective content is received while displaying the respective content on the first display, wherein initiating the display of the video conference user interface on the first display and initiating the sharing of the respective content with the user of the second electronic device comprises:

ceasing the display of the respective content on the first display; and displaying the respective content on a second display in communication with the first electronic device.

15. The method of claim 14, further comprising:

after initiating the display of the video conference user interface on the first display and prior to sharing the respective content with the second electronic device:

displaying the respective content on the second display; and receiving an indication to confirm sharing the respective content with the user of the second electronic device, wherein sharing the respective content with the user of the second electronic device is in response to receiving the indication to confirm sharing the respective content with the user of the second electronic device.

16. The method of claim 1, further comprising:

while displaying, on the first display, the video conference user interface, concurrently displaying the respective content shared with the user of the second electronic device and a private space including private content not shared with the user of the second electronic device.

17. The method of claim 16, further comprising:

prior to displaying the private space including the private content on a second display, receiving a dragging input from an edge of the second display towards a center of the second display for displaying the private space, wherein the private space is displayed in response to the dragging input.

18. The method of claim 16, wherein the private space overlaps at least a portion of the respective content.

19. The method of claim 1, further comprising:

while displaying the video conference user interface on the first display, concurrently displaying, on a second display in communication with the first electronic device, the respective content, and a toolbar associated with the respective content, the toolbar including one or more of an affordance associated with a command for editing the respective content, an affordance displaying information associated with the respective content, and an affordance associated with a video conference command for the video conference user interface.

20. The method of claim 19 further comprising:

while displaying, on the second display, the toolbar and the respective content, receiving an input for operating the first electronic device in a focused mode; and in response to the input for operating the first electronic device in the focused mode, ceasing the display of the toolbar on the second display while continuing to display the respective content on the second display.

21. The method of claim 1, further comprising:

while displaying the video conference user interface on the first display and the respective content on a second display in communication with the first electronic device while a relative angle between the first display and the second display is bent, detecting a flattening of the relative angle between the first display and the second display; and in response to the flattening of the relative angle between the first display and the second display:

ceasing the display of the video conference user interface on the first display; and displaying the respective content on both the first display and the second display.

22. The method of claim 21, further comprising:

prior to detecting the flattening of the relative angle between the first display and the second display, concurrently displaying, on the second display, the respective content and a toolbar associated with the respective content, wherein the toolbar is displayed at a first edge of the second display that is between the first display and a second edge of the second display; and in response to the flattening of the relative angle between the first display and the second display, moving the toolbar to an edge of the second display other than the first edge of the second display.

23. The method of claim 1, further comprising:

while displaying the video conference user interface on the first display and the respective content on the second display, receiving one or more first interactions with the respective content from the user of the first electronic device and one or more second interactions with the respective content from the user of the second electronic device and displaying, on the second display, one or more indications of the one or more first interactions and one or more indications of the one or more second interactions concurrently with the respective content, wherein displaying the respective content on the first display in response to receiving the request to end the video conference comprises displaying the respective content on the first display concurrently with the one or more indications of the first interactions and the one or more indications of the second interactions.

24. The method of claim 1, further comprising:

while displaying the video conference user interface on the first display and the respective content on the second display, receiving one or more first interactions with the respective content from the user of the first electronic device and one or more second interactions with the respective content from the user of the second electronic device and displaying, on the second display, one or more indications of the one or more first interactions and one or more indications of the one or more second interactions concurrently with the respective content, wherein displaying the respective content on the first display in response to receiving the request to end the video conference comprises displaying the respective content on the first display concurrently with the one or more indications of the first interactions, without displaying the one or more indications of the second interactions.

25. The method of claim 1, further comprising:

while displaying the video conference user interface on the first display and the respective content on the second display, receiving one or more first interactions with the respective content from the user of the first electronic device and one or more second interactions with the respective content from the user of the second electronic device and displaying, on the second display, one or more indications of the one or more first interactions and one or more indications of the one or more second interactions concurrently with the respective content, wherein displaying the respective content on the first display in response to receiving the request to end the video conference comprises displaying the respective content on the first display without displaying the one or more indications of the first interactions and without displaying the one or more indications of the second interactions.

26. The method of claim 1, further comprising:

in response to receiving the request to end the video conference, displaying a prompt to save the respective content.

27. A first electronic device, comprising:

one or more processors;

memory; and one or more programs, wherein the one or more programs are stored in the memory and configured to be executed by the one or more processors, the one or more programs including instructions for:

displaying respective content on a first display in communication with the first electronic device; and after displaying the respective content on the first display, receiving a request to share the respective content with a user of a second electronic device;

in response to receiving the request to share the respective content;

initiating display of a video conference user interface of a video conference on a first display in communication with the first electronic device and initiating sharing of the respective content with the user of the second electronic device; and displaying the respective content on a second display in communication with the first electronic device;

while displaying the video conference user interface and sharing the respective content:

receiving, at the first electronic device, an indication of interaction by a user of the second electronic device with the respective content at the second electronic device; and in response to receiving the indication of the interaction by the user of the second electronic device with the respective content at the second electronic device, generating, at the first electronic device, an indication of one or more characteristics of the interaction of the user of the second electronic device with the respective content at the second electronic device;

while displaying the video conference user interface on the first display and the respective content on the second display, receiving a request to end the video conference; and in response to receiving the request to end the video conference, displaying the respective content on the first display.

28. The first electronic device of claim 27, the one or more programs further including instructions for:

displaying the respective content in a shared space on the first display, wherein the shared space is displayed as visually between the first electronic device and the second electronic device; and displaying first private content not shared with the user of the second electronic device in a first private space visually extending in a first direction from the shared space towards the first electronic device.

29. The first electronic device of claim 28, wherein:

the first electronic device displays the respective content in the shared space from a first perspective, and the second electronic device displays the respective content in the shared space from a second perspective.

30. The first electronic device of claim 27, wherein:

the respective content is displayed on a second display in communication with the first electronic device in a shared space, the shared space comprising a first visual representation of a table between the first electronic device and the second electronic device on which the respective content is placed.

31. The first electronic device of claim 27, the one or more programs further including instructions for:

receiving, at the first electronic device, an indication of whether the user of the second electronic device is looking at a visual representation of the respective content displayed on the second electronic device; and in response to receiving the indication of whether the user of the second electronic device is looking at the visual representation of the respective content displayed on the second electronic device:

generating, at the first electronic device, an indication of whether the user of the second electronic device is looking at the respective content, wherein the indication is separate from the video conference user interface.

32. The first electronic device of claim 27, the one or more programs further including instructions for:

receiving, at the first electronic device, a user input comprising a touch on a portion of the respective content displayed by the first electronic device; and in response to receiving the user input, displaying a visual indication at the portion of the respective content that corresponds to the touch received on the portion of the respective content.

33. The first electronic device of claim 27, the one or more programs further including instructions for:

receiving an input corresponding to a user of the first electronic device pointing, with an elongated object, at a respective location in a three-dimensional representation of the respective content displayed at the first electronic device; and displaying, at the first electronic device, a visual distinction at the respective location of the respective content.

34. The first electronic device of claim 27, wherein:

the interaction by the user of the second electronic device with the respective content at the second electronic device comprises a touch input received at a location of the respective content, and generating, at the first electronic device, the indication of the one or more characteristics of the interaction of the user of the second electronic device with the respective content at the second electronic device comprises displaying a visual indication at the location in the respective content displayed by the first electronic device at which the touch input was received at the second electronic device.

35. The first electronic device of claim 27, wherein the respective content is displayed on the first display in the video conference user interface overlaid over video conference content.

36. The first electronic device of claim 35, wherein:

displaying the respective content on the first display over the video conference user interface comprises displaying the respective content on a transparent plane over the video conference user interface.

37. The first electronic device of claim 27, wherein:

the indication of the interaction by the user of the second electronic device with the respective content at the second electronic device comprises an indication of a location within the respective content at which the user of the second electronic device is looking, and generating, at the first electronic device, the indication of the one or more characteristics of the interaction of the user of the second electronic device with the respective content at the second electronic device comprises visually differentiating the location within the respective content corresponding to the location at which the user of the second electronic device is looking from a remainder of the respective content.

38. The first electronic device of claim 27, wherein:

in accordance with a determination that a first respective display of the first display and a second display in communication with the first electronic device is in a first orientation, initiating display of a video conference user interface on the first display includes displaying the video conference user interface on the first respective display; and in accordance with a determination that a second respective display of the first display and the second display is in a second orientation, different than the first orientation, initiating sharing of the respective content with the user of the second electronic device includes displaying the respective content on the second respective display.

39. The first electronic device of claim 27, the one or more programs further including instructions for:

while displaying, on the first display, the video conference user interface including video conference content, displaying the respective content on a second display in communication with the first electronic device.

40. The first electronic device of claim 27, the one or more programs further including instructions for:

prior to receiving the request to share the respective content with the user of the second electronic device, displaying the respective content on the first display, wherein the request to share the respective content is received while displaying the respective content on the first display, wherein initiating the display of the video conference user interface on the first display and initiating the sharing of the respective content with the user of the second electronic device comprises:

ceasing the display of the respective content on the first display; and displaying the respective content on a second display in communication with the first electronic device.

41. The first electronic device of claim 40, the one or more programs further including instructions for:

after initiating the display of the video conference user interface on the first display and prior to sharing the respective content with the second electronic device:

displaying the respective content on the second display; and receiving an indication to confirm sharing the respective content with the user of the second electronic device, wherein sharing the respective content with the user of the second electronic device is in response to receiving the indication to confirm sharing the respective content with the user of the second electronic device.

42. The first electronic device of claim 27, the one or more programs further including instructions for:

while displaying, on the first display, the video conference user interface, concurrently displaying the respective content shared with the user of the second electronic device and a private space including private content not shared with the user of the second electronic device.

43. The first electronic device of claim 42, the one or more programs further including instructions for:

prior to displaying the private space including the private content on a second display, receiving a dragging input from an edge of the second display towards a center of the second display for displaying the private space, wherein the private space is displayed in response to the dragging input.

44. The first electronic device of claim 42, wherein the private space overlaps at least a portion of the respective content.

45. The first electronic device of claim 27, the one or more programs further including instructions for:

while displaying the video conference user interface on the first display, concurrently displaying, on a second display in communication with the first electronic device, the respective content, and a toolbar associated with the respective content, the toolbar including one or more of an affordance associated with a command for editing the respective content, an affordance displaying information associated with the respective content, and an affordance associated with a video conference command for the video conference user interface.

46. The first electronic device of claim 45, the one or more programs further including instructions for:

while displaying, on the second display, the toolbar and the respective content, receiving an input for operating the first electronic device in a focused mode; and in response to the input for operating the first electronic device in the focused mode, ceasing the display of the toolbar on the second display while continuing to display the respective content on the second display.

47. The first electronic device of claim 27, the one or more programs further including instructions for:

while displaying the video conference user interface on the first display and the respective content on a second display in communication with the first electronic device while a relative angle between the first display and the second display is bent, detecting a flattening of the relative angle between the first display and the second display; and in response to the flattening of the relative angle between the first display and the second display:

ceasing the display of the video conference user interface on the first display; and displaying the respective content on both the first display and the second display.

48. The first electronic device of claim 47, the one or more programs further including instructions for:

prior to detecting the flattening of the relative angle between the first display and the second display, concurrently displaying, on the second display, the respective content and a toolbar associated with the respective content, wherein the toolbar is displayed at a first edge of the second display that is between the first display and a second edge of the second display; and in response to the flattening of the relative angle between the first display and the second display, moving the toolbar to an edge of the second display other than the first edge of the second display.

49. The first electronic device of claim 27, the one or more programs further including instructions for:

while displaying the video conference user interface on the first display and the respective content on the second display, receiving one or more first interactions with the respective content from the user of the first electronic device and one or more second interactions with the respective content from the user of the second electronic device and displaying, on the second display, one or more indications of the one or more first interactions and one or more indications of the one or more second interactions concurrently with the respective content, wherein displaying the respective content on the first display in response to receiving the request to end the video conference comprises displaying the respective content on the first display concurrently with the one or more indications of the first interactions and the one or more indications of the second interactions.

50. The first electronic device of claim 27, the one or more programs further including instructions for:

while displaying the video conference user interface on the first display and the respective content on the second display, receiving one or more first interactions with the respective content from the user of the first electronic device and one or more second interactions with the respective content from the user of the second electronic device and displaying, on the second display, one or more indications of the one or more first interactions and one or more indications of the one or more second interactions concurrently with the respective content, wherein displaying the respective content on the first display in response to receiving the request to end the video conference comprises displaying the respective content on the first display concurrently with the one or more indications of the first interactions, without displaying the one or more indications of the second interactions.

51. The first electronic device of claim 27, the one or more programs further including instructions for:

while displaying the video conference user interface on the first display and the respective content on the second display, receiving one or more first interactions with the respective content from the user of the first electronic device and one or more second interactions with the respective content from the user of the second electronic device and displaying, on the second display, one or more indications of the one or more first interactions and one or more indications of the one or more second interactions concurrently with the respective content, wherein displaying the respective content on the first display in response to receiving the request to end the video conference comprises displaying the respective content on the first display without displaying the one or more indications of the first interactions and without displaying the one or more indications of the second interactions.

52. The first electronic device of claim 27, the one or more programs further including instructions for:

in response to receiving the request to end the video conference, displaying a prompt to save the respective content.

53. A non-transitory computer readable storage medium storing one or more programs, the one or more programs comprising instructions, which when executed by one or more processors of a first electronic device, cause the first electronic device to perform a method comprising:

displaying respective content on a first display, wherein the first display and one or more input devices are in communication with the first electronic device;

after displaying the respective content on the first display, receiving a request to share the respective content with a user of a second electronic device;

in response to receiving the request to share the respective content;

initiating display of a video conference user interface of a video conference on a first display in communication with the first electronic device and initiate sharing of the respective content with the user of the second electronic device; and displaying the respective content on a second display in communication with the first electronic device;

while displaying the video conference user interface and sharing the respective content:

receiving, at the first electronic device, an indication of interaction by a user of the second electronic device with the respective content at the second electronic device; and in response to receiving the indication of the interaction by the user of the second electronic device with the respective content at the second electronic device, generating, at the first electronic device, an indication of one or more characteristics of the interaction of the user of the second electronic device with the respective content at the second electronic device;

while displaying the video conference user interface on the first display and the respective content on the second display, receiving a request to end the video conference; and in response to receiving the request to end the video conference, displaying the respective content on the first display.

54. The non-transitory computer readable storage medium of claim 53, the instructions further causing the first electronic device to:

at the first electronic device:

display the respective content in a shared space on the first display, wherein the shared space is displayed as visually between the first electronic device and the second electronic device; and display first private content not shared with the user of the second electronic device in a first private space visually extending in a first direction from the shared space towards the first electronic device.

55. The non-transitory computer readable storage medium of claim 54, wherein:

the first electronic device displays the respective content in the shared space from a first perspective, and the second electronic device displays the respective content in the shared space from a second perspective.

56. The non-transitory computer readable storage medium of claim 53, wherein:

the respective content is displayed on a second display in communication with the first electronic device in a shared space, the shared space comprising a first visual representation of a table between the first electronic device and the second electronic device on which the respective content is placed.

57. The non-transitory computer readable storage medium of claim 53, the instructions further causing the first electronic device to:

receive, at the first electronic device, an indication of whether the user of the second electronic device is looking at a visual representation of the respective content displayed on the second electronic device; and in response to receiving the indication of whether the user of the second electronic device is looking at the visual representation of the respective content displayed on the second electronic device:

generate, at the first electronic device, an indication of whether the user of the second electronic device is looking at the respective content, wherein the indication is separate from the video conference user interface.

58. The non-transitory computer readable storage medium of claim 53, the instructions further causing the first electronic device to:

receive, at the first electronic device, a user input comprising a touch on a portion of the respective content displayed by the first electronic device; and in response to receiving the user input, display a visual indication at the portion of the respective content that corresponds to the touch received on the portion of the respective content.

59. The non-transitory computer readable storage medium of claim 53, the instructions further causing the first electronic device to:

receive an input corresponding to a user of the first electronic device pointing, with an elongated object, at a respective location in a three-dimensional representation of the respective content displayed at the first electronic device; and display, at the first electronic device, a visual distinction at the respective location of the respective content.

60. The non-transitory computer readable storage medium of claim 53, wherein:

the interaction by the user of the second electronic device with the respective content at the second electronic device comprises a touch input received at a location of the respective content, and generating, at the first electronic device, the indication of the one or more characteristics of the interaction of the user of the second electronic device with the respective content at the second electronic device comprises displaying a visual indication at the location in the respective content displayed by the first electronic device at which the touch input was received at the second electronic device.

61. The non-transitory computer readable storage medium of claim 53, wherein the respective content is displayed on the first display in the video conference user interface overlaid over video conference content.

62. The non-transitory computer readable storage medium of claim 61, wherein:

displaying the respective content on the first display over the video conference user interface comprises displaying the respective content on a transparent plane over the video conference user interface.

63. The non-transitory computer readable storage medium of claim 53, wherein:

the indication of the interaction by the user of the second electronic device with the respective content at the second electronic device comprises an indication of a location within the respective content at which the user of the second electronic device is looking, and generating, at the first electronic device, the indication of the one or more characteristics of the interaction of the user of the second electronic device with the respective content at the second electronic device comprises visually differentiating the location within the respective content corresponding to the location at which the user of the second electronic device is looking from a remainder of the respective content.

64. The non-transitory computer readable storage medium of claim 53, wherein:

in accordance with a determination that a first respective display of the first display and a second display in communication with the first electronic device is in a first orientation, initiating display of a video conference user interface on the first display includes displaying the video conference user interface on the first respective display; and in accordance with a determination that a second respective display of the first display and the second display is in a second orientation, different than the first orientation, initiating sharing of the respective content with the user of the second electronic device includes displaying the respective content on the second respective display.

65. The non-transitory computer readable storage medium of claim 53, the instructions further causing the first electronic device to:

while displaying, on the first display, the video conference user interface including video conference content, display the respective content on a second display in communication with the first electronic device.

66. The non-transitory computer readable storage medium of claim 53, the instructions further causing the first electronic device to:

prior to receiving the request to share the respective content with the user of the second electronic device, display the respective content on the first display, wherein the request to share the respective content is received while displaying the respective content on the first display, wherein initiating the display of the video conference user interface on the first display and initiating the sharing of the respective content with the user of the second electronic device comprises:

ceasing the display of the respective content on the first display; and displaying the respective content on a second display in communication with the first electronic device.

67. The non-transitory computer readable storage medium of claim 66, the instructions further causing the first electronic device to:

after initiating the display of the video conference user interface on the first display and prior to sharing the respective content with the second electronic device:

display the respective content on the second display; and receive an indication to confirm sharing the respective content with the user of the second electronic device, wherein sharing the respective content with the user of the second electronic device is in response to receiving the indication to confirm sharing the respective content with the user of the second electronic device.

68. The non-transitory computer readable storage medium of claim 53, the instructions further causing the first electronic device to:

while displaying, on the first display, the video conference user interface, concurrently display the respective content shared with the user of the second electronic device and a private space including private content not shared with the user of the second electronic device.

69. The non-transitory computer readable storage medium of claim 68, the instructions further causing the first electronic device to:

prior to displaying the private space including the private content on a second display, receive a dragging input from an edge of the second display towards a center of the second display for displaying the private space, wherein the private space is displayed in response to the dragging input.

70. The non-transitory computer readable storage medium of claim 68, wherein the private space overlaps at least a portion of the respective content.

71. The non-transitory computer readable storage medium of claim 53, the instructions further causing the first electronic device to:

while displaying the video conference user interface on the first display, concurrently display, on a second display in communication with the first electronic device, the respective content, and a toolbar associated with the respective content, the toolbar including one or more of an affordance associated with a command for editing the respective content, an affordance displaying information associated with the respective content, and an affordance associated with a video conference command for the video conference user interface.

72. The non-transitory computer readable storage medium of claim 71, the instructions further causing the first electronic device to:

while displaying, on the second display, the toolbar and the respective content, receive an input for operating the first electronic device in a focused mode; and in response to the input for operating the first electronic device in the focused mode, cease the display of the toolbar on the second display while continuing to display the respective content on the second display.

73. The non-transitory computer readable storage medium of claim 53, the instructions further causing the first electronic device to:

while displaying the video conference user interface on the first display and the respective content on a second display in communication with the first electronic device while a relative angle between the first display and the second display is bent, detect a flattening of the relative angle between the first display and the second display; and in response to the flattening of the relative angle between the first display and the second display:

cease the display of the video conference user interface on the first display; and display the respective content on both the first display and the second display.

74. The non-transitory computer readable storage medium of claim 73, the instructions further causing the first electronic device to:

prior to detecting the flattening of the relative angle between the first display and the second display, concurrently display, on the second display, the respective content and a toolbar associated with the respective content, wherein the toolbar is displayed at a first edge of the second display that is between the first display and a second edge of the second display; and in response to the flattening of the relative angle between the first display and the second display, move the toolbar to an edge of the second display other than the first edge of the second display.

75. The non-transitory computer readable storage medium of claim 53, the instructions further causing the first electronic device to:

while displaying the video conference user interface on the first display and the respective content on the second display, receiving one or more first interactions with the respective content from the user of the first electronic device and one or more second interactions with the respective content from the user of the second electronic device and display, on the second display, one or more indications of the one or more first interactions and one or more indications of the one or more second interactions concurrently with the respective content, wherein displaying the respective content on the first display in response to receiving the request to end the video conference comprises displaying the respective content on the first display concurrently with the one or more indications of the first interactions and the one or more indications of the second interactions.

76. The non-transitory computer readable storage medium of claim 53, the instructions further causing the first electronic device to:

while displaying the video conference user interface on the first display and the respective content on the second display, receive one or more first interactions with the respective content from the user of the first electronic device and one or more second interactions with the respective content from the user of the second electronic device and display, on the second display, one or more indications of the one or more first interactions and one or more indications of the one or more second interactions concurrently with the respective content, wherein displaying the respective content on the first display in response to receiving the request to end the video conference comprises displaying the respective content on the first display concurrently with the one or more indications of the first interactions, without displaying the one or more indications of the second interactions.

77. The non-transitory computer readable storage medium of claim 53, the instructions further causing the first electronic device to:

while displaying the video conference user interface on the first display and the respective content on the second display, receive one or more first interactions with the respective content from the user of the first electronic device and one or more second interactions with the respective content from the user of the second electronic device and display, on the second display, one or more indications of the one or more first interactions and one or more indications of the one or more second interactions concurrently with the respective content, wherein displaying the respective content on the first display in response to receiving the request to end the video conference comprises displaying the respective content on the first display without displaying the one or more indications of the first interactions and without displaying the one or more indications of the second interactions.

78. The non-transitory computer readable storage medium of claim 53, the instructions further causing the first electronic device to:

in response to receiving the request to end the video conference, display a prompt to save the respective content.

* * * * *

UNITED STATES PATENT AND TRADEMARK OFFICE

CERTIFICATE OF CORRECTION

PATENT NO. : 11,972,164 B2
APPLICATION NO. : 17/389041
DATED : April 30, 2024
INVENTOR(S) : Thomas Steven Hulbert et al.

It is certified that error appears in the above-identified patent and that said Letters Patent is hereby corrected as shown below:

In the Claims
In Column 184, Line 65, in Claim 1, please delete “content;” and insert -- content: --.
In Column 189, Line 28, in Claim 27, please delete “content;” and insert -- content: --.
In Column 194, Line 8, in Claim 53, please delete “content;” and insert -- content: --.

Signed and Sealed this
Eighteenth Day of November, 2025

John A. Squires
*Director of the United States Patent and Trademark Office*